US012204734B2

(12) United States Patent
Caro et al.

(10) Patent No.: US 12,204,734 B2
(45) Date of Patent: Jan. 21, 2025

(54) METHODS AND INTERFACES FOR INITIATING COMMUNICATIONS

(71) Applicant: Apple Inc., Cupertino, CA (US)

(72) Inventors: Pablo F. Caro, San Francisco, CA (US); Kaely Coon, San Francisco, CA (US); Vitalii Kramar, Woodinville, WA (US); Caelan G. Stack, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/899,510

(22) Filed: Aug. 30, 2022

(65) Prior Publication Data

US 2023/0063173 A1 Mar. 2, 2023

Related U.S. Application Data

(60) Provisional application No. 63/400,732, filed on Aug. 24, 2022, provisional application No. 63/334,604, (Continued)

(51) Int. Cl.

| | |
|---|---|
| ***G06F 3/0481*** | (2022.01) |
| ***G06F 1/3206*** | (2019.01) |
| ***G06F 1/3234*** | (2019.01) |
| ***G06F 3/01*** | (2006.01) |
| ***G06F 3/0346*** | (2013.01) |

(Continued)

(52) U.S. Cl.

CPC .......... *G06F 3/0481* (2013.01); *G06F 1/3206* (2013.01); *G06F 1/3265* (2013.01); *G06F 3/016* (2013.01); *G06F 3/0346* (2013.01); *G06F 3/04842* (2013.01); *G06F 3/04886* (2013.01); *G06F 3/04892* (2013.01); *G06F 3/14* (2013.01); *H04B 7/18517* (2013.01); *H04L 51/21* (2022.05); *H04M 1/724* (2021.01);

(Continued)

(58) Field of Classification Search

CPC .... G06F 3/0481; G06F 1/3206; G06F 1/3265; G06F 3/016; G06F 3/0346; G06F 3/04842; G06F 3/04886; G06F 3/04892; G06F 3/14; H04M 1/72436; H04M 1/724; H04M 7/0042; H04L 51/21; H04B 7/18517; H04W 52/0267

See application file for complete search history.

(56) References Cited

U.S. PATENT DOCUMENTS

| | | | |
|---|---|---|---|
| 5,146,231 | A | 9/1992 | Ghaem et al. |
| 5,303,286 | A | 4/1994 | Wiedeman |

(Continued)

FOREIGN PATENT DOCUMENTS

| | | | |
|---|---|---|---|
| CN | 102215295 | A | 10/2011 |
| CN | 102752448 | A | 10/2012 |

(Continued)

OTHER PUBLICATIONS

Invitation to Pay Additional Fees and Partial International Search Report received for PCT Patent Application No. PCT/US2022/042069, mailed on Dec. 22, 2022, 14 pages.

(Continued)

*Primary Examiner* — Sherrod L Keaton

(74) *Attorney, Agent, or Firm* — DLA Piper LLP (US)

(57) ABSTRACT

The present disclosure generally relates to methods and user interfaces for establishing communications.

45 Claims, 115 Drawing Sheets

Related U.S. Application Data filed on Apr. 25, 2022, provisional application No. 63/243,681, filed on Sep. 13, 2021, provisional application No. 63/239,403, filed on Aug. 31, 2021.

(51) Int. Cl.

| | |
|---|---|
| ***G06F 3/04842*** | (2022.01) |
| ***G06F 3/04886*** | (2022.01) |
| ***G06F 3/04892*** | (2022.01) |
| ***G06F 3/14*** | (2006.01) |
| ***H04B 7/185*** | (2006.01) |
| ***H04L 51/21*** | (2022.01) |
| ***H04M 1/724*** | (2021.01) |
| ***H04M 1/72436*** | (2021.01) |
| ***H04M 7/00*** | (2006.01) |
| ***H04W 52/02*** | (2009.01) |

(52) U.S. Cl.

CPC ..... *H04M 1/72436* (2021.01); *H04M 7/0042* (2013.01); *H04W 52/0267* (2013.01)

(56) References Cited

U.S. PATENT DOCUMENTS

| | | | |
|---|---|---|---|
| 5,446,465 | A | 8/1995 | Diefes et al. |
| 5,583,514 | A | 12/1996 | Fulop |
| 5,587,717 | A | 12/1996 | Jang |
| 5,812,932 | A | 9/1998 | Wiedeman et al. |
| 5,863,057 | A | 1/1999 | Wessels |
| 5,937,349 | A | 8/1999 | Andresen |
| 5,995,041 | A | 11/1999 | Bradley et al. |
| 6,006,068 | A | 12/1999 | Elkin et al. |
| 6,052,587 | A | 4/2000 | Moraes et al. |
| 6,108,538 | A | 8/2000 | Blasiak et al. |
| 6,147,644 | A | 11/2000 | Castles et al. |
| 6,157,896 | A | 12/2000 | Castles et al. |
| 6,169,881 | B1 | 1/2001 | Astrom et al. |
| 6,208,858 | B1 | 3/2001 | Antonio et al. |
| 6,240,366 | B1 | 5/2001 | Nagatsuma et al. |
| 6,263,280 | B1 | 7/2001 | Stingone, Jr. |
| 6,272,316 | B1 | 8/2001 | Wiedeman et al. |
| 6,278,861 | B1 | 8/2001 | Ward et al. |
| 6,317,689 | B1 | 11/2001 | Lee |
| 6,549,848 | B1 | 4/2003 | Green et al. |
| 6,580,452 | B1 | 6/2003 | Gangitano |
| 6,690,934 | B1 | 2/2004 | Conrad et al. |
| 6,763,226 | B1 | 7/2004 | Mczeal, Jr. |
| 6,992,991 | B2 | 1/2006 | Duske et al. |
| 7,184,744 | B1 | 2/2007 | Schnabel |
| 7,233,795 | B1 | 6/2007 | Ryden |
| 7,311,608 | B1 | 12/2007 | Danieli et al. |
| 7,865,205 | B1 | 1/2011 | Lundy et al. |
| 7,890,134 | B2 | 2/2011 | Richardson et al. |
| 8,095,665 | B1 | 1/2012 | Bau |
| 8,249,585 | B2 | 8/2012 | Tronc et al. |
| 8,254,970 | B1 | 8/2012 | Oshinsky et al. |
| 8,521,122 | B2 | 8/2013 | Scott et al. |
| 8,676,121 | B1 | 3/2014 | Monte et al. |
| 8,688,450 | B2 | 4/2014 | Lloyd et al. |
| 8,855,012 | B1 | 10/2014 | Suri |
| 8,971,946 | B2 | 3/2015 | Ahmed et al. |
| 9,037,164 | B2 | 5/2015 | Keerthi |
| 9,235,923 | B1 | 1/2016 | Robinson et al. |
| 9,325,852 | B2 | 4/2016 | Forstall et al. |
| 9,369,832 | B1 | 6/2016 | Noble et al. |
| 9,408,077 | B1 | 8/2016 | David et al. |
| 9,430,186 | B2 | 8/2016 | Faaborg et al. |
| 9,503,177 | B1 | 11/2016 | Shi et al. |
| 9,521,378 | B1 | 12/2016 | Palaganas et al. |
| 9,575,720 | B2 | 2/2017 | Faaborg et al. |
| 9,947,363 | B2 | 4/2018 | Moon et al. |
| 10,116,893 | B1 | 10/2018 | Reis et al. |
| 10,419,712 | B2 | 9/2019 | Arrasvuori et al. |
| 10,459,504 | B2 | 10/2019 | Veloso et al. |
| 10,511,707 | B2 | 12/2019 | Johnson et al. |
| 10,560,562 | B1 | 2/2020 | Tandon |
| 10,623,451 | B2 | 4/2020 | Rathod |
| 10,645,561 | B1 | 5/2020 | Guo et al. |
| 10,791,536 | B1 | 9/2020 | Murphy |
| 10,797,785 | B1 * | 10/2020 | Rhee .................. H04B 7/18517 |
| 10,853,410 | B2 | 12/2020 | Herz |
| 10,959,074 | B1 | 3/2021 | Shuman et al. |
| 11,003,315 | B2 | 5/2021 | Sung et al. |
| 11,144,176 | B2 | 10/2021 | Chang et al. |
| 11,349,559 | B1 | 5/2022 | Reuss et al. |
| 11,455,078 | B1 | 9/2022 | Goodrich et al. |
| 2002/0000931 | A1 | 1/2002 | Petronic et al. |
| 2003/0083816 | A1 | 5/2003 | Imakado et al. |
| 2004/0166811 | A1 | 8/2004 | Moon |
| 2004/0192368 | A1 | 9/2004 | Edwards et al. |
| 2004/0257275 | A1 | 12/2004 | Yee et al. |
| 2005/0143135 | A1 | 6/2005 | Brems et al. |
| 2006/0017612 | A1 | 1/2006 | Nagatani |
| 2006/0030334 | A1 | 2/2006 | Hashimoto |
| 2006/0095563 | A1 | 5/2006 | Benjamin et al. |
| 2006/0247915 | A1 | 11/2006 | Bradford et al. |
| 2006/0258365 | A1 | 11/2006 | Cha et al. |
| 2007/0047697 | A1 | 3/2007 | Drewry et al. |
| 2007/0109186 | A1 | 5/2007 | Fujiwara et al. |
| 2007/0123252 | A1 | 5/2007 | Tronc et al. |
| 2007/0130606 | A1 | 6/2007 | Jeong |
| 2007/0142028 | A1 | 6/2007 | Ayoub et al. |
| 2007/0188380 | A1 | 8/2007 | Duong et al. |
| 2008/0076410 | A1 | 3/2008 | Beyer |
| 2008/0153538 | A1 | 6/2008 | Oshaughnessy et al. |
| 2008/0165022 | A1 | 7/2008 | Herz et al. |
| 2008/0166011 | A1 | 7/2008 | Sever et al. |
| 2008/0168290 | A1 | 7/2008 | Jobs et al. |
| 2008/0168361 | A1 | 7/2008 | Forstall et al. |
| 2008/0168379 | A1 | 7/2008 | Forstall et al. |
| 2008/0303715 | A1 | 12/2008 | Wang et al. |
| 2008/0313686 | A1 | 12/2008 | Matvey |
| 2009/0049905 | A1 | 2/2009 | Lawhite et al. |
| 2009/0083382 | A1 | 3/2009 | Rosenberg et al. |
| 2009/0135062 | A1 | 5/2009 | Hori |
| 2009/0191854 | A1 | 7/2009 | Beason |
| 2009/0191893 | A1 | 7/2009 | Smith |
| 2009/0205041 | A1 | 8/2009 | Michalske |
| 2009/0241072 | A1 | 9/2009 | Chaudhri et al. |
| 2009/0262033 | A1 | 10/2009 | King et al. |
| 2009/0267828 | A1 | 10/2009 | Kobayashi et al. |
| 2009/0279674 | A1 | 11/2009 | Roberts |
| 2010/0062749 | A1 | 3/2010 | Yasuda et al. |
| 2010/0083159 | A1 | 4/2010 | Mountain et al. |
| 2010/0085255 | A1 | 4/2010 | Wakabayashi |
| 2010/0167672 | A1 | 7/2010 | Ahn et al. |
| 2010/0257490 | A1 | 10/2010 | Lyon et al. |
| 2010/0271312 | A1 | 10/2010 | Alameh et al. |
| 2010/0311385 | A1 | 12/2010 | Hurwitz |
| 2011/0013075 | A1 | 1/2011 | Kim et al. |
| 2011/0088003 | A1 | 4/2011 | Swink et al. |
| 2011/0092158 | A1 | 4/2011 | Plamondon |
| 2011/0130113 | A1 | 6/2011 | Takuno |
| 2011/0136428 | A1 | 6/2011 | Ritter |
| 2011/0157046 | A1 | 6/2011 | Lee et al. |
| 2011/0230161 | A1 | 9/2011 | Newman |
| 2011/0248948 | A1 | 10/2011 | Griffin et al. |
| 2011/0291974 | A1 | 12/2011 | Son et al. |
| 2011/0306292 | A1 | 12/2011 | Wilson et al. |
| 2012/0015622 | A1 | 1/2012 | Kuz et al. |
| 2012/0068899 | A1 | 3/2012 | Ayotte et al. |
| 2012/0124516 | A1 | 5/2012 | Friedman |
| 2012/0135715 | A1 | 5/2012 | Kang et al. |
| 2012/0140767 | A1 | 6/2012 | Brothers et al. |
| 2012/0237002 | A1 * | 9/2012 | Sennett ................ H04M 3/5116 379/45 |
| 2012/0239822 | A1 * | 9/2012 | Poulson .............. H04L 41/0654 709/239 |
| 2012/0302200 | A1 | 11/2012 | Esbensen |
| 2013/0045708 | A1 | 2/2013 | Nguyen et al. |
| 2013/0109425 | A1 | 5/2013 | Kerger et al. |
| 2013/0127665 | A1 | 5/2013 | Miller et al. |
| 2013/0135146 | A1 | 5/2013 | Ransom et al. |

(56) References Cited

U.S. PATENT DOCUMENTS

2013/0183924 A1 7/2013 Saigh et al.
2013/0197951 A1 8/2013 Watson et al.
2013/0205350 A1 8/2013 Ling et al.
2013/0225118 A1 8/2013 Jang et al.
2013/0231077 A1 9/2013 Cahill
2013/0271319 A1 10/2013 Trerise
2013/0271320 A1 10/2013 Trerise
2013/0295872 A1 11/2013 Guday et al.
2013/0295982 A1 11/2013 Lee et al.
2013/0301521 A1 11/2013 Abdi
2013/0315108 A1 11/2013 Lindner et al.
2013/0326642 A1 12/2013 Hajj et al.
2014/0022192 A1 1/2014 Hatanaka
2014/0028601 A1 1/2014 Moore et al.
2014/0039894 A1 2/2014 Shostak
2014/0064463 A1 3/2014 Reddy
2014/0134969 A1 5/2014 Jin et al.
2014/0213214 A1 7/2014 Reis
2014/0213236 A1 7/2014 Jimbo et al.
2014/0237393 A1 8/2014 Van Wie et al.
2014/0245783 A1 9/2014 Proud et al.
2014/0267543 A1 9/2014 Kerger et al.
2014/0327629 A1 11/2014 Jobs et al.
2015/0011220 A1 1/2015 Buckle et al.
2015/0018040 A1 1/2015 He et al.
2015/0040012 A1 2/2015 Faaborg et al.
2015/0052618 A1 2/2015 Michalske
2015/0063428 A1 3/2015 Lever
2015/0089398 A1 3/2015 Song et al.
2015/0097687 A1 4/2015 Sloo et al.
2015/0137972 A1 5/2015 Nepo
2015/0141072 A1 5/2015 Mumick
2015/0189091 A1 7/2015 Forstall et al.
2015/0257126 A1 9/2015 Herz
2015/0261496 A1 9/2015 Faaborg et al.
2015/0271317 A1 9/2015 Nelson et al.
2015/0319284 A1 11/2015 Leonessi
2015/0338524 A1 11/2015 Ben Moshe et al.
2015/0341759 A1 11/2015 Kerger et al.
2015/0350296 A1 12/2015 Yang et al.
2016/0014059 A1 1/2016 Rathod
2016/0056525 A1 2/2016 Hansryd et al.
2016/0057595 A1 2/2016 Ahmed et al.
2016/0062540 A1 3/2016 Yang et al.
2016/0065669 A1 3/2016 Van Dijkman et al.
2016/0066277 A1 3/2016 Yang et al.
2016/0088455 A1 3/2016 Bozik et al.
2016/0183098 A1 6/2016 Lim
2016/0191694 A1 6/2016 Kim et al.
2016/0234664 A1 8/2016 Vendrow et al.
2016/0277903 A1 9/2016 Poosala et al.
2016/0302083 A1 10/2016 Durick et al.
2016/0306051 A1 10/2016 Hirabayashi et al.
2016/0374047 A1 12/2016 Reis
2017/0006620 A1 1/2017 Reis
2017/0021260 A1 1/2017 Willett et al.
2017/0026110 A1 1/2017 Richardson et al.
2017/0026509 A1 1/2017 Rand
2017/0045623 A1 2/2017 Zlogar et al.
2017/0069191 A1 3/2017 Erkkila
2017/0150060 A1 5/2017 Herz
2017/0171636 A1 6/2017 Devlin et al.
2017/0180964 A1 6/2017 Mehta et al.
2017/0223162 A1 8/2017 Wilder et al.
2017/0330436 A1 11/2017 Williams et al.
2017/0332045 A1 11/2017 Metter et al.
2017/0357411 A1 12/2017 Williams et al.
2018/0035922 A1 2/2018 Kim et al.
2018/0040951 A1 2/2018 Uchiyama
2018/0088242 A1 3/2018 Eagling
2018/0092057 A1* 3/2018 Yamashita .......... H04W 60/005
2018/0095635 A1 4/2018 Valdivia et al.
2018/0176362 A1 6/2018 Cohen
2018/0192264 A1 7/2018 Kwok et al.
2018/0270000 A1 9/2018 Reis et al.
2018/0316416 A1 11/2018 Reis et al.
2018/0316885 A1 11/2018 Reis et al.
2018/0338026 A1 11/2018 Jon et al.
2018/0338035 A1 11/2018 Johnson et al.
2018/0338237 A1 11/2018 Maheswaranathan
2018/0338334 A1 11/2018 Jin et al.
2019/0049592 A1 2/2019 Koontz et al.
2019/0280788 A1 9/2019 Hardy et al.
2019/0318283 A1 10/2019 Kelly et al.
2019/0387092 A1 12/2019 Tessier
2020/0025944 A1 1/2020 Mellier et al.
2020/0053641 A1 2/2020 Lee et al.
2020/0119984 A1* 4/2020 Bouvet ............... H04L 65/1073
2020/0132644 A1 4/2020 Micalizzi et al.
2020/0187295 A1 6/2020 Li et al.
2020/0201540 A1 6/2020 Zambetti et al.
2020/0213436 A1 7/2020 Mumick
2020/0252780 A1 8/2020 Mcclendon et al.
2020/0304444 A1 9/2020 Aneja et al.
2020/0367069 A1 11/2020 Struhsaker et al.
2021/0006287 A1 1/2021 Peeters et al.
2021/0011173 A1 1/2021 Rhee
2021/0110682 A1 4/2021 Howard et al.
2021/0120394 A1* 4/2021 Martin .................... H04W 4/90
2021/0144539 A1 5/2021 Edge et al.
2021/0168581 A1 6/2021 Van Den Dungen
2021/0175963 A1 6/2021 Chang et al.
2021/0311203 A1 10/2021 Reis et al.
2021/0311613 A1 10/2021 Williams et al.
2022/0066048 A1 3/2022 Diggelen et al.
2022/0091737 A1 3/2022 Bower et al.
2022/0108595 A1 4/2022 Jiang et al.
2022/0116105 A1 4/2022 Robinson et al.
2022/0131822 A1 4/2022 Jon et al.
2022/0253136 A1 8/2022 Holder et al.
2022/0256631 A1 8/2022 Jain et al.
2023/0065219 A1 3/2023 Caro et al.
2023/0066232 A1 3/2023 Caro et al.
2023/0081032 A1 3/2023 Ardaud et al.
2023/0308538 A1 9/2023 Caro et al.
2023/0328171 A1 10/2023 Caro et al.
2024/0080389 A1 3/2024 Christopher
2024/0104859 A1 3/2024 Chand et al.
2024/0241627 A1 7/2024 Williams et al.

FOREIGN PATENT DOCUMENTS

CN 101938287 B 6/2013
CN 103297610 A 9/2013
CN 104168367 A 11/2014
CN 104641318 A 5/2015
CN 105283840 A 1/2016
CN 105453025 A 3/2016
CN 105554225 A 5/2016
CN 105786394 A 7/2016
CN 106104677 A 11/2016
EP 0963061 A2 12/1999
EP 2782297 A1 9/2014
EP 2981000 A1 2/2016
EP 3248180 A1 11/2017
EP 3676972 B1 2/2022
JP 2003-75525 A 3/2003
JP 2008-257363 A 10/2008
JP 2016-15624 A 1/2016
JP 2018-532298 A 11/2018
JP 2019-505117 A 2/2019
JP 10-191423 A 3/2024
JP 2000-40990 A 3/2024
JP 2001-320449 A 3/2024
JP 2004-96265 A 3/2024
JP 2013-239979 A 3/2024
KR 10-2015-0094197 A 8/2015
KR 10-2016-0018109 A 2/2016
KR 10-2016-0097913 A 8/2016
WO 2005/057890 A2 6/2005
WO 2007/139580 A1 12/2007
WO 2014/197339 A1 12/2014
WO 2014/200729 A2 12/2014
WO 2014/200731 A1 12/2014

(56) References Cited

FOREIGN PATENT DOCUMENTS

| | | | |
|---|---|---|---|
| WO | 2015/017043 | A1 | 2/2015 |
| WO | 2015/192277 | A1 | 12/2015 |
| WO | 2016/060848 | A1 | 4/2016 |
| WO | 2016/116814 | A1 | 7/2016 |
| WO | 2019/118020 | A1 | 6/2019 |
| WO | 2022/147146 | A1 | 7/2022 |

OTHER PUBLICATIONS

Non-Final Office Action received for U.S. Appl. No. 17/349,191, mailed on Dec. 21, 2022, 13 pages.
Non-Final Office Action received for U.S. Appl. No. 17/899,315, mailed on Dec. 22, 2022, 20 pages.
Non-Final Office Action received for U.S. Appl. No. 17/899,530, mailed on Jan. 3, 2023, 67 pages.
Chand et al., "A Mobile Application for Women's Safety: WoSApp", TENCON 2015—2015 IEEE Region 10 Conference doi:10.1109/TENCON.2015.7373171, Nov. 1-4, 2015, 5 pages.
Faiz et al., "Smart Vehicle Accident Detection and Alarming System Using A Smartphone", 2015 International Conference on Computer and Information Engineering (ICCIE), doi: 10.1109/CCIE.2015.7399319, Nov. 26-27, 2015, pp. 66-69.
Fernandes et al., "Mobile Application for Automatic Accident Detection and Multimodal Alert", 2015 IEEE 81st Vehicular Technology Conference (VTC Spring), doi: 10.1109NTCSpring.2015.7145935, May 11-14, 2015, 5 pages.
Inso et al., "Play It Safe A Personal Security Application on Android Platform", 2016 Fifth ICT International Student Project Conference (ICT-ISPC), doi: 10.1109/ICT-ISPC.2016.7519254, May 27-28, 2016, 4 pages.
Certificate of Examination received for Australian Patent Application No. 2019100525, mailed on Aug. 6, 2019, 2 pages.
Certificate of Examination received for Australian Patent Application No. 2019101260, mailed on Mar. 25, 2020, 2 pages.
Decision on Appeal received for U.S. Appl. No. 15/424,186, mailed on May 7, 2021, 12 pages.
Decision to Grant received for Danish Patent Application No. PA201870383, mailed on Jun. 3, 2020, 2 pages.
European Search Report received for European Patent Application No. 21179101.7, mailed on Sep. 28, 2021, 5 pages.
Examiner's Answer to Appeal Brief received for U.S. Appl. No. 15/424,186, mailed on Oct. 7, 2020, 8 pages.
Extended European Search Report received for European Patent Application No. 17810730.6, mailed on Nov. 29, 2019, 12 pages.
Final Office Action received for U.S. Appl. No. 15/424,186, mailed on Aug. 9, 2019, 18 pages.
Intention to Grant received for Danish Patent Application No. PA201870383, mailed on Feb. 11, 2020, 2 pages.
International Preliminary Report on Patentability received for PCT Patent Application No. PCT/US2017/035155, mailed on Dec. 20, 2018, 15 pages.
International Preliminary Report on Patentability received for PCT Patent Application No. PCT/US2018/033051, mailed on Nov. 28, 2019, 15 pages.
International Search Report and Written Opinion received for PCT Patent Application No. PCT/US2017/035155, mailed on Oct. 2, 2017, 19 pages.
International Search Report and Written Opinion Received for PCT Patent Application No. PCT/US2018/033051, mailed on Nov. 22, 2018, 22 pages.
Invitation to Pay Additional Fees and Partial International Search Report received for PCT Patent Application No. PCT/US2018/033051, mailed on Sep. 20, 2018, 14 pages.
Invitation to Pay Additional Fees received for PCT Patent Application No. PCT/US2017/035155, mailed on Aug. 3, 2017, 2 pages.
Invitation to Pay Search Fees received for European Patent Application No. 18730555.2, mailed on May 14, 2020, 3 pages.
Motorola Solutions, "Wave 7000 Push-to-Talk for Mobile Devices", XP055709564, Retrieved from the Internet: URL: https://learning.motorolasolutions.com/es/node/2426/download, Jul. 2016, pp. 1-54.
Non-Final Office Action received for U.S. Appl. No. 15/424,186, mailed on Jan. 11, 2019, 15 pages.
Non-Final Office Action received for U.S. Appl. No. 15/981,828, mailed on Jan. 7, 2020, 8 pages.
Notice of Acceptance received for Australian Patent Application No. 2018269510, mailed on Apr. 17, 2020, 3 pages.
Notice of Acceptance received for Australian Patent Application No. 2019250182, mailed on Mar. 11, 2021, 3 pages.
Notice of Acceptance received for Australian Patent Application No. 2020210262, mailed on Jan. 20, 2022, 3 pages.
Notice of Allowance received for Chinese Patent Application No. 201880036526.1, mailed on Apr. 22, 2021, 2 pages (1 page of English Translation and 1 page of Official Copy).
Notice of Allowance received for U.S. Appl. No. 15/981,828, mailed on Jul. 13, 2020, 8 pages.
Office Action received for Australian Patent Application No. 2017277838, mailed on Aug. 20, 2019, 3 pages.
Office Action received for Australian Patent Application No. 2017277838, mailed on Jun. 5, 2019, 3 pages.
Office Action received for Australian Patent Application No. 2018269510, mailed on Feb. 21, 2020, 3 pages.
Office Action received for Australian Patent Application No. 2019101260, mailed on Dec. 16, 2019, 3 pages.
Office Action received for Australian Patent Application No. 2019250182, mailed on Aug. 18, 2020, 4 pages.
Office Action received for Australian Patent Application No. 2019250182, mailed on Dec. 2, 2020, 5 pages.
Office Action received for Australian Patent Application No. 2020210262, mailed on Jul. 28, 2021, 6 pages.
Office Action received for Chinese Patent Application No. 201780033617.5, mailed on Apr. 2, 2021, 24 pages (13 pages of English Translation and 11 pages of Official Copy).
Office Action received for Chinese Patent Application No. 201780033617.5, mailed on Apr. 20, 2020, 24 pages (13 pages of English Translation and 11 pages of Official Copy).
Office Action received for Chinese Patent Application No. 201780033617.5, mailed on Sep. 29, 2020, 26 pages (15 pages of English Translation and 11 pages of Official Copy).
Office Action received for Chinese Patent Application No. 201780033617.5, mailed on Sep. 30, 2021, 16 pages (10 pages of English Translation and 6 pages of Official Copy).
Office Action received for Chinese Patent Application No. 201880036526.1, mailed on Aug. 21, 2020, 8 pages (3 pages of English Translation and 5 pages of Official Copy).
Office Action received for Danish Patent Application No. PA201770395, mailed on Apr. 11, 2019, 10 pages.
Office Action received for Danish Patent Application No. PA201770395, mailed on May 25, 2018, 10 pages.
Office Action received for Danish Patent Application No. PA201870383, mailed on Aug. 26, 2019, 3 pages.
Office Action received for Danish Patent Application No. PA202070167, mailed on Jul. 2, 2021, 5 pages.
Office Action received for European Patent Application No. 17810730.6, mailed on Aug. 18, 2021, 12 pages.
Office Action received for European Patent Application No. 18730555.2, mailed on Feb. 25, 2021, 9 pages.
Office Action received for European Patent Application No. 18730555.2, mailed on Sep. 7, 2020, 11 pages.
Office Action received for European Patent Application No. 21179101.7, mailed on Oct. 8, 2021, 10 pages.
Peters Jay, "The iPhone 13's rumored satellite link sounds like it's just for emergencies", The Verge, Available online at: https://apple.news/A-xX1QS6IT2m818PPKIL52Q, Aug. 30, 2021, 2 pages.
Pocketnow, "At&T Enhanced Push to Talk: A Guided Tour | Pocketnow", Retrieved from https://www.youtube.com/watch?v=aagcgg07EEc, Dec. 25, 2012, 1 page.
ProPTT2 Wearable App with Apple Watch, Retrieved from the Internet: <https://www.youtube.com/watch?v=iqOT30irl4A>, Mar. 29, 2017, 3 pages.

(56) References Cited

OTHER PUBLICATIONS

Qualcomm Toq—smartwatch—User Manual, Avaliable Online At: URL: https://toq.qualcomm.com/sites/default/files/qualcomm_toq_user_manual.pdf [retrieved on Jun. 25, 2015], Nov. 27, 2013, pp. 1-38.
Record of Oral Hearing received for U.S. Appl. No. 15/424,186, mailed on May 10, 2021, 12 pages.
Search Report and Opinion received for Danish Patent Application No. PA201770395, mailed on Sep. 5, 2017, 14 pages.
Search Report and Opinion received for Danish Patent Application No. PA201870383, mailed on Sep. 7, 2018, 8 pages.
Search Report and Opinion received for Danish Patent Application No. PA202070167, mailed on Nov. 25, 2020, 9 pages.
Team On the Run, "Push-To-Talk Feature for Android", Retrieved from the Internet: <https://www.youtube.com/watch?v=_dlrC7q92KQ>, Oct. 14, 2016, 3 pages.
Non-Final Office Action received for U.S. Appl. No. 17/899,315, mailed on Nov. 4, 2022, 20 pages.
Applicant-Initiated Interview Summary received for U.S. Appl. No. 17/899,315, mailed on Jan. 24, 2023, 3 pages.
Clark Mitchell, "Qualcomm's going toe-to-toe with Apple's satellite messaging feature", Available online at: https://www.theverge.com/2023/1/5/23538207/qualcomm-satellite-messaging-snapdragon-android, Jan. 6, 2023, 18 pages.
Non-Final Office Action received for U.S. Appl. No. 17/079,216, mailed on Jan. 11, 2023, 15 pages.
Applicant-Initiated Interview Summary received for U.S. Appl. No. 17/349,191, mailed on Feb. 15, 2023, 3 pages.
Applicant-Initiated Interview Summary received for U.S. Appl. No. 17/349,191, mailed on Feb. 21, 2023, 3 pages.
International Search Report and Written Opinion received for PCT Patent Application No. PCT/US2022/042069, mailed on Feb. 14, 2023, 22 pages.
Notice of Allowance received for U.S. Appl. No. 17/899,315, mailed on Feb. 24, 2023, 9 pages.
Office Action received for Australian Patent Application No. 2022202360, mailed on Feb. 17, 2023, 4 pages.
Applicant-Initiated Interview Summary received for U.S. Appl. No. 17/899,530, mailed on Feb. 3, 2023, 6 pages.
Extended European Search Report received for European Patent Application No. 22197430.6, mailed on Jan. 26, 2023, 8 pages.
Extended European Search Report received for European Patent Application No. 22197456.1, mailed on Feb. 2, 2023, 9 pages.
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Final Office Action received for U.S. Appl. No. 17/899,530, mailed on Mar. 8, 2023, 68 pages.
Applicant-Initiated Interview Summary received for U.S. Appl. No. 17/899,530, mailed on Apr. 3, 2023, 5 pages.
International Search Report and Written Opinion received for PCT Patent Application No. PCT/US2022/043183, mailed on Jan. 23, 2023, 17 pages.
Invitation to Pay Additional Fees received for PCT Patent Application No. PCT/US2022/043183, mailed on Nov. 30, 2022, 10 pages.
Notice of Acceptance received for Australian Patent Application No. 2022202360, mailed on Apr. 14, 2023, 3 pages.
Applicant Initiated Interview Summary received for U.S. Appl. No. 17/079,216, mailed on May 8, 2023, 2 pages.
Notice of Allowance received for U.S. Appl. No. 17/079,216, mailed on Apr. 27, 2023, 6 pages.
Notice of Allowance received for U.S. Appl. No. 17/079,216, mailed on May 5, 2023, 3 pages.
Office Action received for Australian Patent Application No. 2022235630, mailed on Jul. 21, 2023, 6 pages.
Office Action received for Australian Patent Application No. 2022235630, mailed on May 17, 2023, 3 pages.
Applicant-Initiated Interview Summary received for U.S. Appl. No. 17/349,191, mailed on Aug. 1, 2023, 5 pages.
Applicant-Initiated Interview Summary received for U.S. Appl. No. 17/899,530, mailed on Jul. 3, 2023, 6 pages.
Corrected Notice of Allowance received for U.S. Appl. No. 17/079,216, mailed on Aug. 3, 2023, 4 pages.
Corrected Notice of Allowance received for U.S. Appl. No. 17/079,216, mailed on May 19, 2023, 3 pages.
Final Office Action received for U.S. Appl. No. 17/349,191, mailed on Jun. 28, 2023, 15 pages.
Non-Final Office Action received for U.S. Appl. No. 17/899,530, mailed on May 25, 2023, 68 pages.
Notice of Acceptance received for Australian Patent Application No. 2023204622, mailed on Aug. 10, 2023, 3 pages.
Office Action received for European Patent Application No. 17810730.6, mailed on Jul. 6, 2023, 13 pages.
Office Action received for European Patent Application No. 21179101.7, mailed on Jul. 7, 2023, 8 pages.
Notice of Acceptance received for Australian Patent Application No. 2022235630, mailed on Sep. 28, 2023, 3 pages.
Notice of Allowance received for U.S. Appl. No. 17/899,530, mailed on Oct. 19, 2023, 13 pages.
Corrected Notice of Allowance received for U.S. Appl. No. 17/899,530, mailed on Nov. 8, 2023, 3 pages.
Notice of Allowance received for U.S. Appl. No. 17/349,191, mailed on Nov. 29, 2023, 8 pages.
International Search Report and Written Opinion received for PCT Patent Application No. PCT/US2023/032051, mailed on Mar. 4, 2024, 19 pages.
Invitation to Pay Additional Fees and Partial International Search Report received for PCT Patent Application No. PCT/US2023/032051, mailed on Jan. 8, 2024, 10 pages.
Intention to Grant received for European Patent Application No. 17810730.6, mailed on Jun. 11, 2024, 9 pages.
Result of Consultation received for European Patent Application No. 17810730.6, mailed on May 2, 2024, 4 pages.
International Preliminary Report on Patentability received for PCT Patent Application No. PCT/US2022/042069, mailed on Mar. 14, 2024, 15 pages.
International Search Report and Written Opinion received for PCT Patent Application No. PCT/US2023/033376, mailed on Mar. 18, 2024, 21 pages.
Invitation to Pay Additional Fees and Partial International Search Report received for PCT Patent Application No. PCT/US2023/033376, mailed on Jan. 24, 2024, 13 pages.
Notice of Allowance received for Chinese Patent Application No. 202110666978.1, mailed on Jun. 28, 2024, 5 pages (1 page of English Translation and 4 pages of Official Copy).
Intention to Grant received for European Patent Application No. 22197456.1, mailed on Apr. 16, 2024, 9 pages.
Notice of Allowance received for Japanese Patent Application No. 2022-557929, mailed on Aug. 5, 2024, 5 pages (1 page of English Translation and 4 pages of Official Copy).
International Preliminary Report on Patentability received for PCT Patent Application No. PCT/US2022/043183, mailed on Mar. 28, 2024, 12 pages.
Office Action received for Japanese Patent Application No. 2022-557929, mailed on Mar. 29, 2024, 8 pages (4 pages of English Translation and 4 pages of Official Copy).
Office Action received for Japanese Patent Application No. 2023-001269, mailed on Mar. 22, 2024, 14 pages (7 pages of English Translation and 7 pages of Official Copy).
Office Action received for Japanese Patent Application No. 2023-001270, mailed on Mar. 22, 2024, 10 pages (5 pages of English Translation and 5 pages of Official Copy).
Decision to Grant received for European Patent Application No. 22197456.1, mailed on Aug. 29, 2024, 3 pages.
Notice of Allowance received for Japanese Patent Application No. 2023-001270, mailed on Sep. 30, 2024, 4 pages (1 page of English Translation and 3 pages of Official Copy).
Office Action received for Australian Patent Application No. 2023270278, mailed on Sep. 17, 2024, 3 pages.

(56) References Cited

OTHER PUBLICATIONS

Office Action received for Japanese Patent Application No. 2023-001269, mailed on Sep. 20, 2024, 9 pages (4 pages of English Translation and 5 pages of Official Copy).
Notice of Acceptance received for Australian Patent Application No. 2023270278, mailed on Oct. 30, 2024, 3 pages.

* cited by examiner

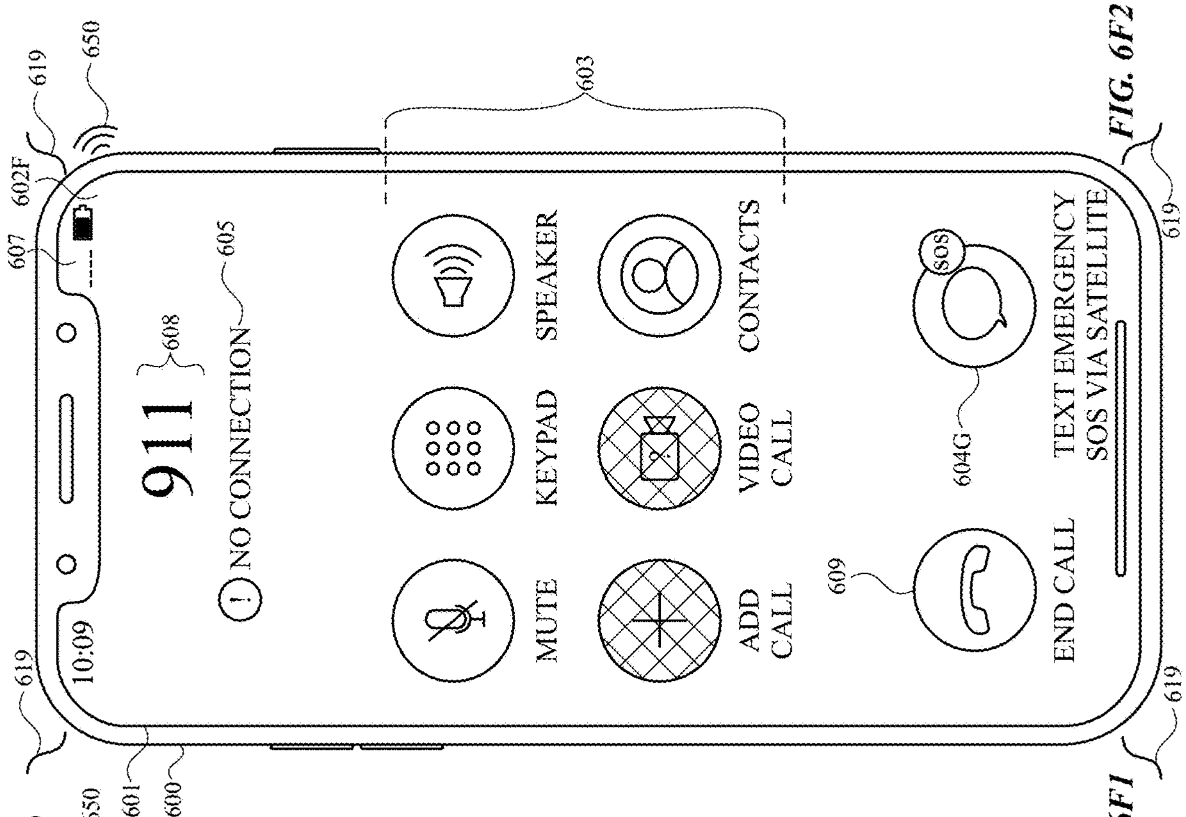
FIG. 6F2
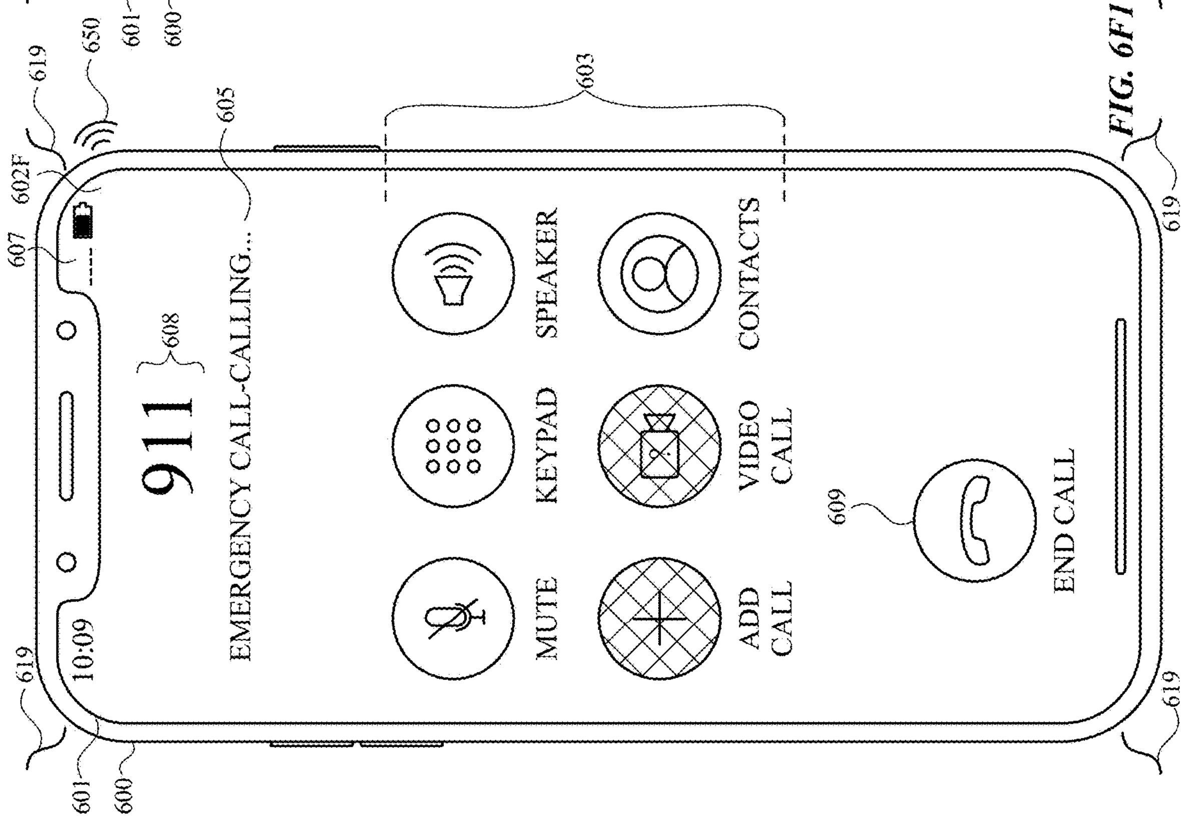
FIG. 6F1

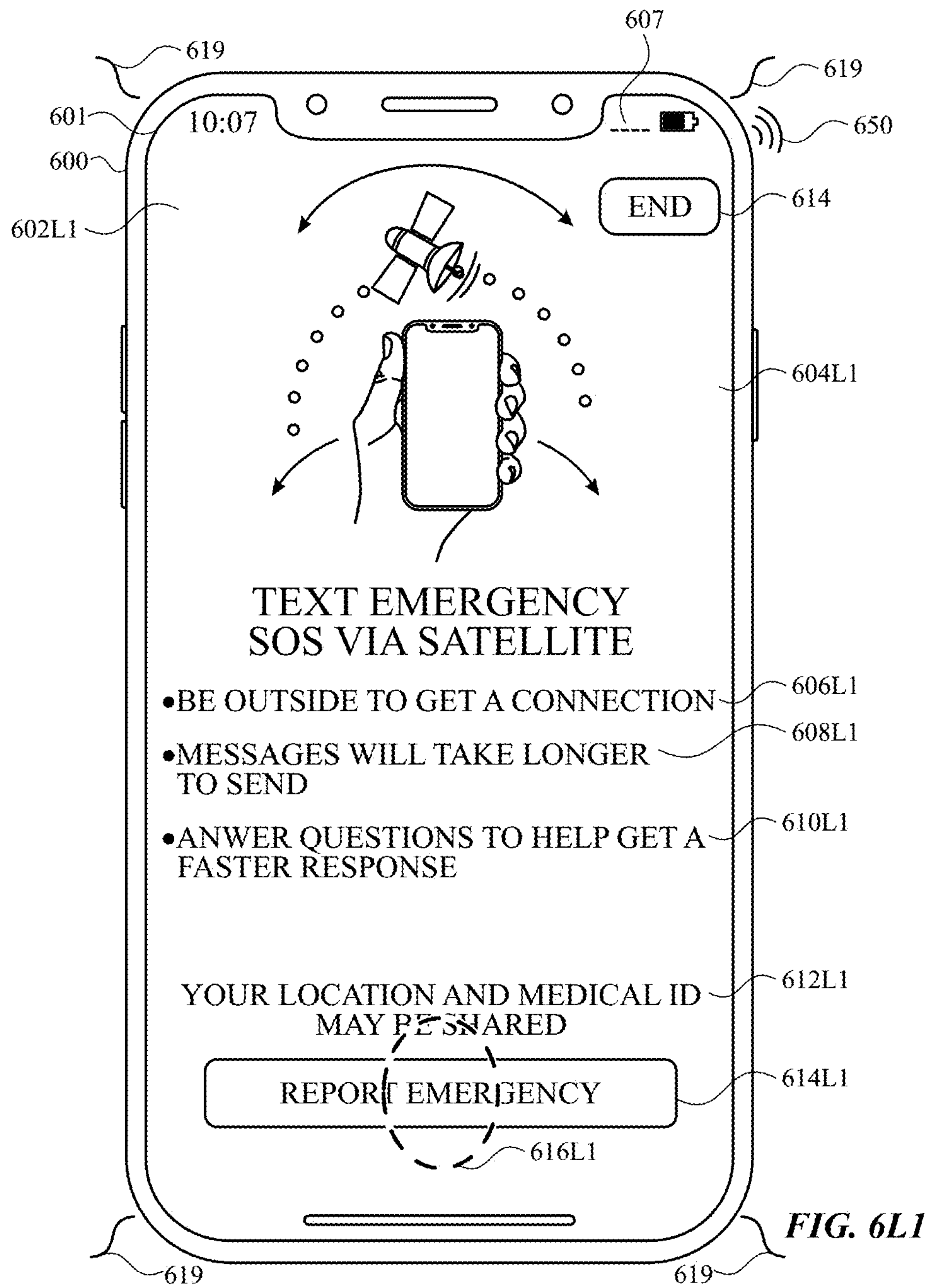
FIG. 6L1

FIG. 6M1

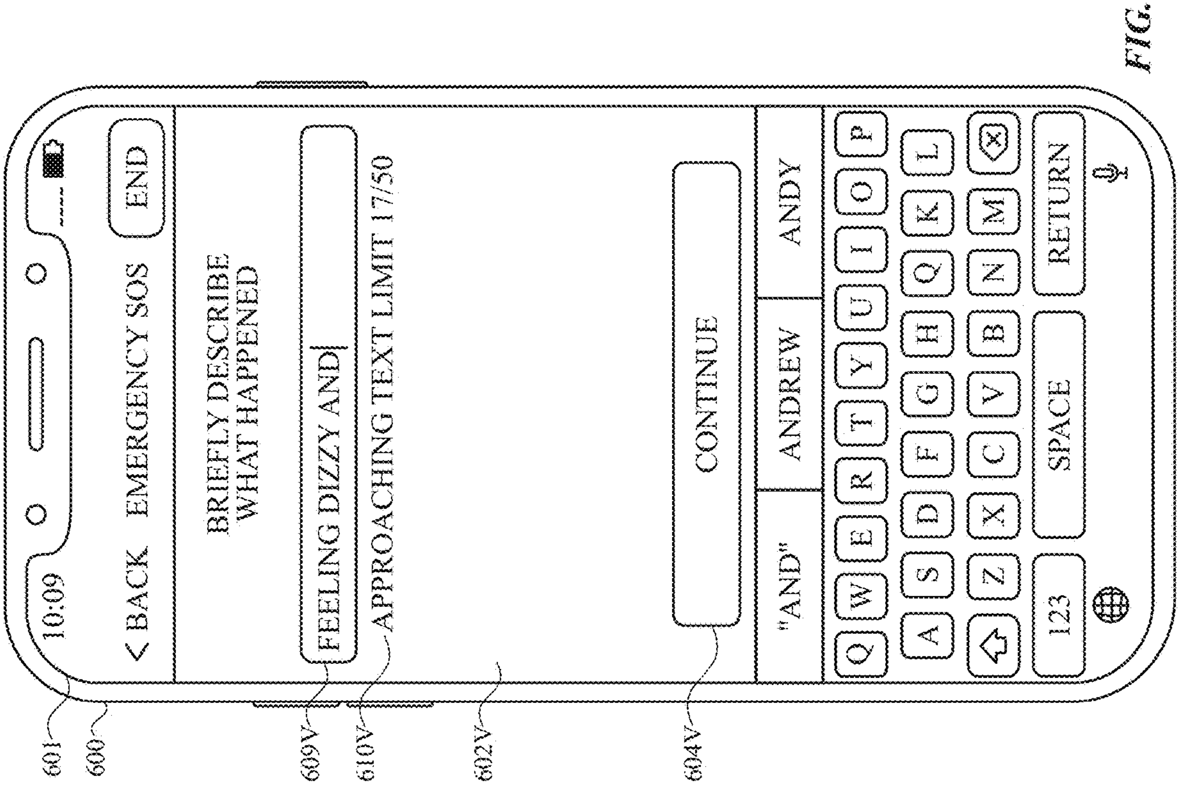
FIG. 6V1
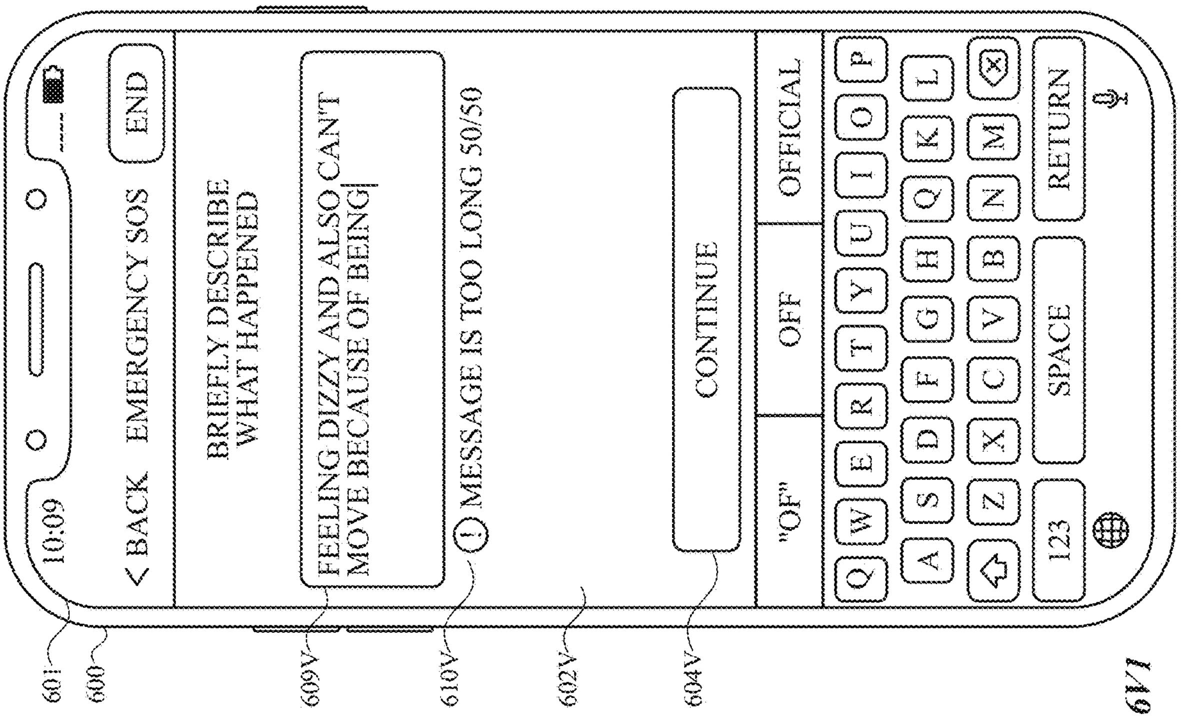
FIG. 6V2

*FIG. 9L1A*
*FIG. 9L1B*
*FIG. 9L1C*
*FIG. 9L1D*
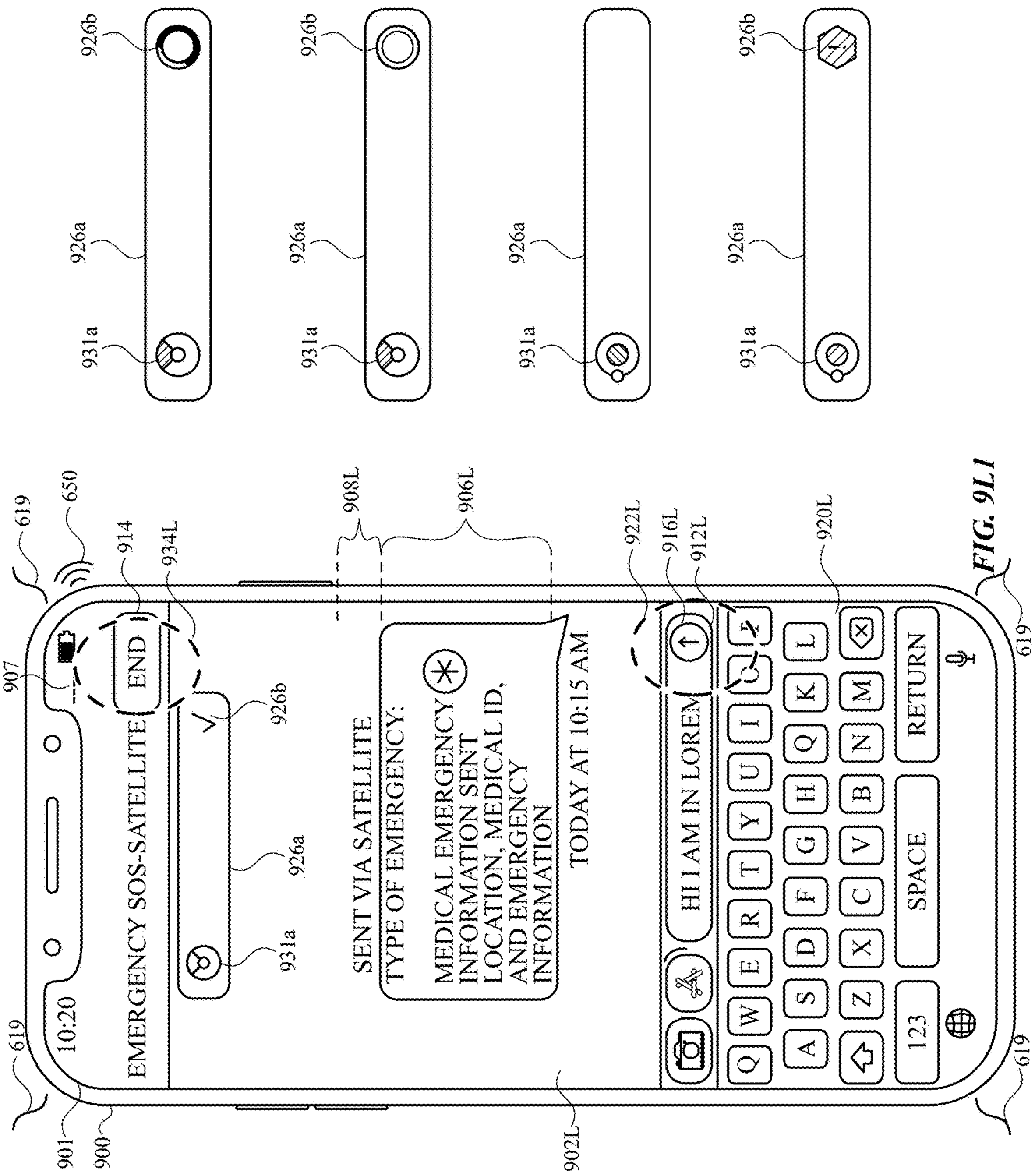
*FIG. 9L1*

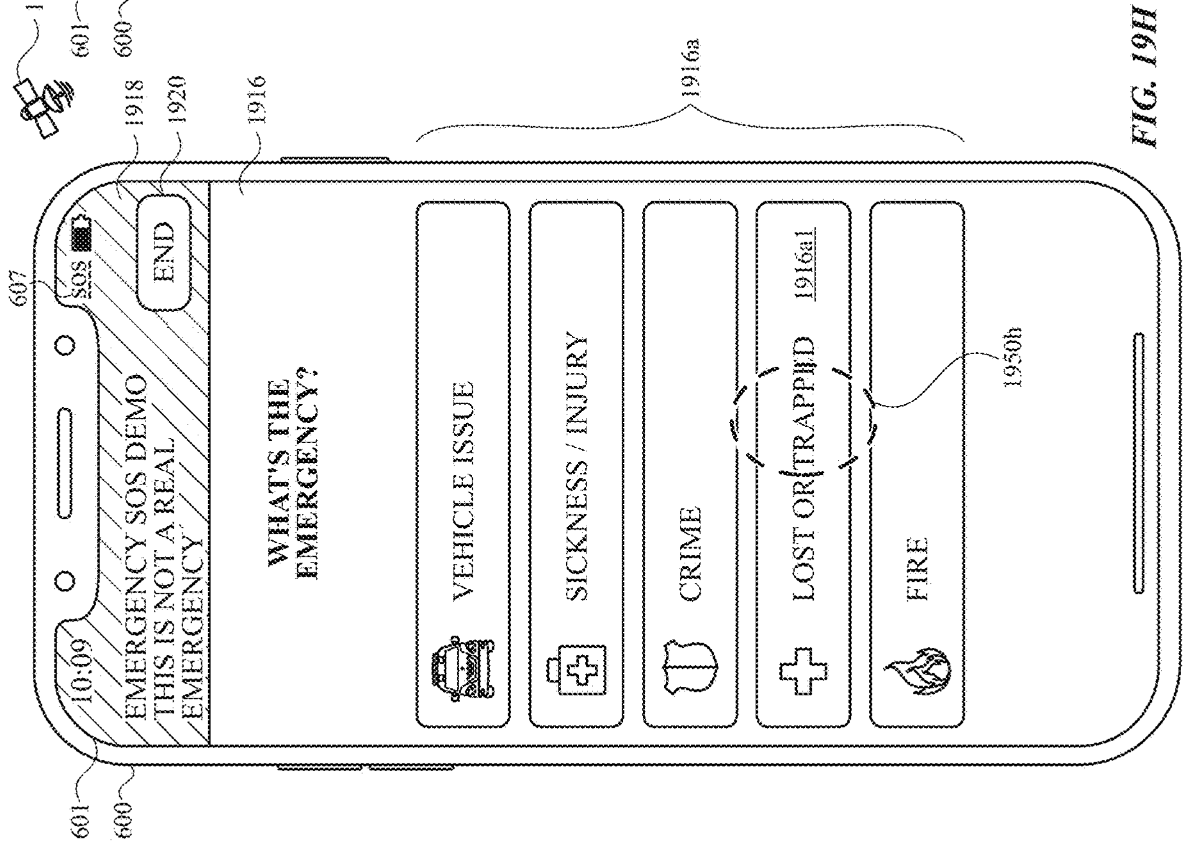
FIG. 19H
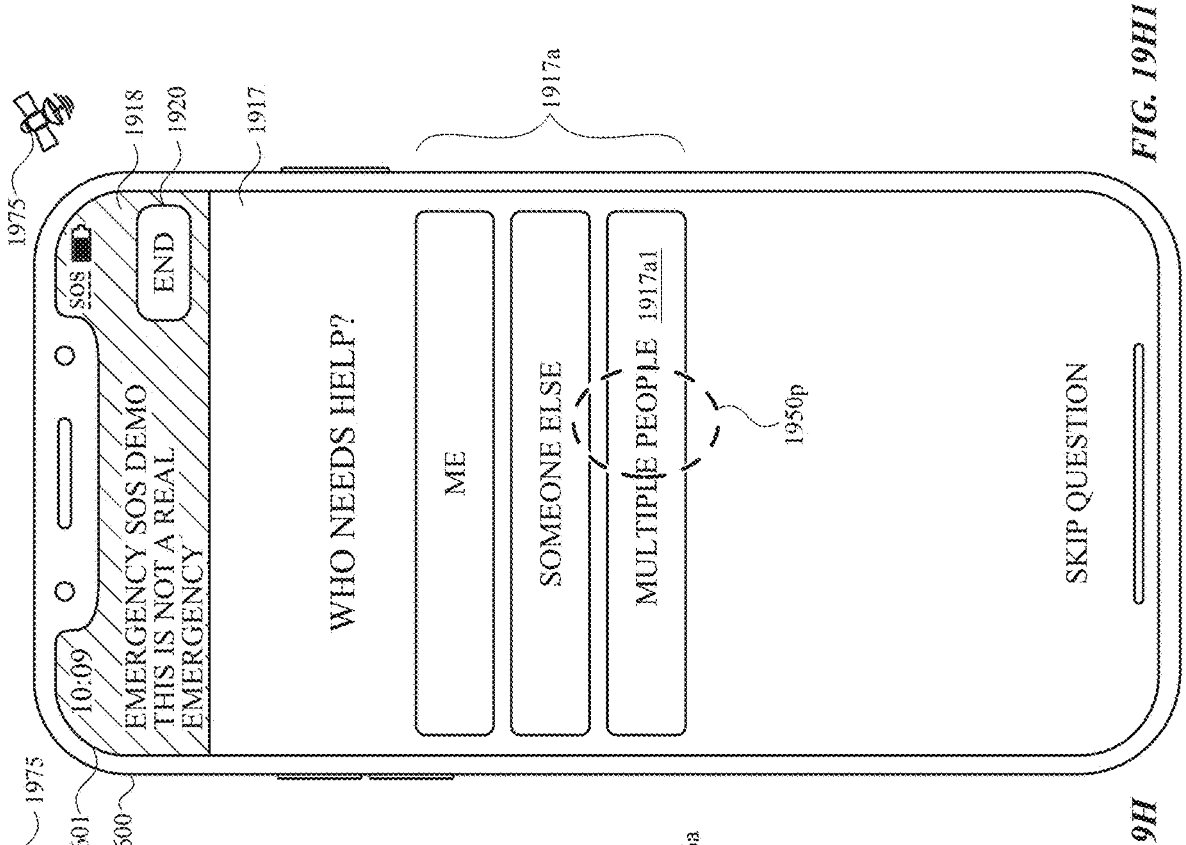
FIG. 19H1

METHODS AND INTERFACES FOR INITIATING COMMUNICATIONS

CROSS-REFERENCE TO RELATED APPLICATIONS

This application claims priority to U.S. Provisional Application No. 63/239,403, entitled "METHODS AND INTERFACES FOR INITIATING COMMUNICATIONS," filed Aug. 31, 2021, U.S. Provisional Application No. 63/243,681 entitled "METHODS AND INTERFACES FOR INITIATING COMMUNICATIONS," filed Sep. 13, 2021, U.S. Provisional Application No. 63/334,604, entitled "METHODS AND INTERFACES FOR INITIATING COMMUNICATIONS," filed Apr. 25, 2022, and U.S. Provisional Application No. 63/400,732, entitled "METHODS AND INTERFACES FOR INITIATING COMMUNICATIONS," filed Aug. 24, 2022, the entire contents of each of which are hereby incorporated by reference.

FIELD

The present disclosure relates generally to computer user interfaces, and more specifically to techniques for managing communication user interfaces.

BACKGROUND

Electronic computer systems provide means for communicating such as via text messages and email.

BRIEF SUMMARY

Some techniques for managing communication user interfaces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing communication user interfaces. Such methods and interfaces optionally complement or replace other methods for managing communication user interfaces. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices, is described. The method comprises: detecting, via the one or more input devices, a user input corresponding to a request to initiate a communication via the computer system; and in response to detecting the user input, displaying, via the display generation component, a first user interface, including: in accordance with a determination that a terrestrial wireless communication network is not reachable by the computer system, displaying a respective selectable communication option that, when selected via the one or more input devices, initiates a process for communicating via a non-terrestrial wireless communication network; and in accordance with a determination that a respective terrestrial wireless communication network is reachable by the computer system, initiating a process for communicating, via the respective terrestrial wireless communication network, without displaying the respective selectable communication option.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a user input corresponding to a request to initiate a communication via the computer system; and in response to detecting the user input, displaying, via the display generation component, a first user interface, including: in accordance with a determination that a terrestrial wireless communication network is not reachable by the computer system, displaying a respective selectable communication option that, when selected via the one or more input devices, initiates a process for communicating via a non-terrestrial wireless communication network; and in accordance with a determination that a respective terrestrial wireless communication network is reachable by the computer system, initiating a process for communicating, via the respective terrestrial wireless communication network, without displaying the respective selectable communication option.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a user input corresponding to a request to initiate a communication via the computer system; and in response to detecting the user input, displaying, via the display generation component, a first user interface, including: in accordance with a determination that a terrestrial wireless communication network is not reachable by the computer system, displaying a respective selectable communication option that, when selected via the one or more input devices, initiates a process for communicating via a non-terrestrial wireless communication network; and in accordance with a determination that a respective terrestrial wireless communication network is reachable by the computer system, initiating a process for communicating, via the respective terrestrial wireless communication network, without displaying the respective selectable communication option.

In accordance with some embodiments, a computer system is described. The computer system comprises: one or more processors; and memory storing one or more programs configured to be executed by the one or more processors, the one or more programs including instructions for: detecting, via the one or more input devices, a user input corresponding to a request to initiate a communication via the computer system; and in response to detecting the user input, displaying, via the display generation component, a first user interface, including: in accordance with a determination that a terrestrial wireless communication network is not reachable by the computer system, displaying a respective selectable communication option that, when selected via the one or more input devices, initiates a process for communicating via a non-terrestrial wireless communication network; and in accordance with a determination that a respective terrestrial wireless communication network is reachable by the computer system, initiating a process for communicating, via the respective terrestrial wireless communication network, without displaying the respective selectable communication option.

In accordance with some embodiments, a computer system is described. The computer system configured to communicate with a display generation component and one or more input devices, comprising: means for detecting, via the one or more input devices, a user input corresponding to a request to initiate a communication via the computer system; and means for, in response to detecting the user input, displaying, via the display generation component, a first user interface, including: in accordance with a determination that a terrestrial wireless communication network is not reachable by the computer system, displaying a respective selectable communication option that, when selected via the one or more input devices, initiates a process for communicating via a non-terrestrial wireless communication network; and in accordance with a determination that a respective terrestrial wireless communication network is reachable by the computer system, initiating a process for communicating, via the respective terrestrial wireless communication network, without displaying the respective selectable communication option.

In accordance with some embodiments, a computer program product is described. The computer program product comprising one or more programs configured to be executed by one or more processors of a computer system that is in communication with a display generation component and one or more input devices, the one or more programs including instructions for: detecting, via the one or more input devices, a user input corresponding to a request to initiate a communication via the computer system; and in response to detecting the user input, displaying, via the display generation component, a first user interface, including: in accordance with a determination that a terrestrial wireless communication network is not reachable by the computer system, displaying a respective selectable communication option that, when selected via the one or more input devices, initiates a process for communicating via a non-terrestrial wireless communication network; and in accordance with a determination that a respective terrestrial wireless communication network is reachable by the computer system, initiating a process for communicating, via the respective terrestrial wireless communication network, without displaying the respective selectable communication option.

In accordance with some embodiments, a method, performed at a computer system that is in communication with a display generation component and one or more input devices, is described. The method comprises: while the computer system is in a low-bandwidth communication mode: displaying, via the display generation component, a first set of selectable communication-content options corresponding to respective content for a communication, wherein the first set of selectable communication-content options are specific to the low-bandwidth communication mode; detecting, via the one or more input devices, a first set of one or more inputs corresponding to selection of a first communication-content option of the first set of selectable communication-content options; after detecting the first set of one or more inputs, displaying, via the display generation component, a second set of selectable communication-content options corresponding to respective content for the communication, wherein the second set of selectable communication-content options are specific to the low-bandwidth communication mode; detecting, via the one or more input devices, a second set of one or more inputs corresponding to selection of a second communication-content option of the second set of selectable communication-content options; detecting an input corresponding to a request to send a communication including the content corresponding to the selection of the first communication-content option and the second communication-content option; and in response to receiving the input corresponding to the request to send the communication, sending the communication including the content corresponding to the selection of the first communication-content option and the second communication-content option selected by the first set of one or more inputs and the second set of one or more inputs.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while the computer system is in a low-bandwidth communication mode: displaying, via the display generation component, a first set of selectable communication-content options corresponding to respective content for a communication, wherein the first set of selectable communication-content options are specific to the low-bandwidth communication mode; detecting, via the one or more input devices, a first set of one or more inputs corresponding to selection of a first communication-content option of the first set of selectable communication-content options; after detecting the first set of one or more inputs, displaying, via the display generation component, a second set of selectable communication-content options corresponding to respective content for the communication, wherein the second set of selectable communication-content options are specific to the low-bandwidth communication mode; detecting, via the one or more input devices, a second set of one or more inputs corresponding to selection of a second communication-content option of the second set of selectable communication-content options; detecting an input corresponding to a request to send a communication including the content corresponding to the selection of the first communication-content option and the second communication-content option; and in response to receiving the input corresponding to the request to send the communication, sending the communication including the content corresponding to the selection of the first communication-content option and the second communication-content option selected by the first set of one or more inputs and the second set of one or more inputs.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while the computer system is in a low-bandwidth communication mode: displaying, via the display generation component, a first set of selectable communication-content options corresponding to respective content for a communication, wherein the first set of selectable communication-content options are specific to the low-bandwidth communication mode; detecting, via the one or more input devices, a first set of one or more inputs corresponding to selection of a first communication-content option of the first set of selectable communication-content options; after detecting the first set of one or more inputs, displaying, via the display generation component, a second set of selectable communication-content options corresponding to respective content for the communication, wherein the second set of selectable communication-content options are specific to the low-bandwidth communication mode; detecting, via the one or more input devices, a second set of one or more inputs corresponding to selection of a second communication-content option of the second set of selectable communication-content options; detecting an input corresponding to a request to send a communication including the content corresponding to the selection of the first communication-content option and the second communication-content option; and in response to receiving the input corresponding to the request to send the communication, sending the communication including the content corresponding to the selection of the first communication-content option and the second communication-content option selected by the first set of one or more inputs and the second set of one or more inputs.

In accordance with some embodiments, a computer system is described. The computer system configured to communicate with a display generation component and one or more input devices, comprising: one or more processors; and memory storing one or more programs configured to be executed by the one or more processors, the one or more programs including instructions for: while the computer system is in a low-bandwidth communication mode: displaying, via the display generation component, a first set of selectable communication-content options corresponding to respective content for a communication, wherein the first set of selectable communication-content options are specific to the low-bandwidth communication mode; detecting, via the one or more input devices, a first set of one or more inputs corresponding to selection of a first communication-content option of the first set of selectable communication-content options; after detecting the first set of one or more inputs, displaying, via the display generation component, a second set of selectable communication-content options corresponding to respective content for the communication, wherein the second set of selectable communication-content options are specific to the low-bandwidth communication mode; detecting, via the one or more input devices, a second set of one or more inputs corresponding to selection of a second communication-content option of the second set of selectable communication-content options; detecting an input corresponding to a request to send a communication including the content corresponding to the selection of the first communication-content option and the second communication-content option; and in response to receiving the input corresponding to the request to send the communication, sending the communication including the content corresponding to the selection of the first communication-content option and the second communication-content option selected by the first set of one or more inputs and the second set of one or more inputs.

In accordance with some embodiments a computer system is described. The computer system configured to communicate with a display generation component and one or more input devices, comprising: means for, while the computer system is in a low-bandwidth communication mode: displaying, via the display generation component, a first set of selectable communication-content options corresponding to respective content for a communication, wherein the first set of selectable communication-content options are specific to the low-bandwidth communication mode; detecting, via the one or more input devices, a first set of one or more inputs corresponding to selection of a first communication-content option of the first set of selectable communication-content options; after detecting the first set of one or more inputs, displaying, via the display generation component, a second set of selectable communication-content options corresponding to respective content for the communication, wherein the second set of selectable communication-content options are specific to the low-bandwidth communication mode; detecting, via the one or more input devices, a second set of one or more inputs corresponding to selection of a second communication-content option of the second set of selectable communication-content options; detecting an input corresponding to a request to send a communication including the content corresponding to the selection of the first communication-content option and the second communication-content option; and means for, in response to receiving the input corresponding to the request to send the communication, sending the communication including the content corresponding to the selection of the first communication-content option and the second communication-content option selected by the first set of one or more inputs and the second set of one or more inputs.

In accordance with some embodiments, a computer program product is described. The computer program product comprising one or more programs configured to be executed by one or more processors of a computer system that is in communication with a display generation component and one or more input devices, the one or more programs including instructions for: while the computer system is in a low-bandwidth communication mode: displaying, via the display generation component, a first set of selectable communication-content options corresponding to respective content for a communication, wherein the first set of selectable communication-content options are specific to the low-bandwidth communication mode; detecting, via the one or more input devices, a first set of one or more inputs corresponding to selection of a first communication-content option of the first set of selectable communication-content options; after detecting the first set of one or more inputs, displaying, via the display generation component, a second set of selectable communication-content options corresponding to respective content for the communication, wherein the second set of selectable communication-content options are specific to the low-bandwidth communication mode; detecting, via the one or more input devices, a second set of one or more inputs corresponding to selection of a second communication-content option of the second set of selectable communication-content options; detecting an input corresponding to a request to send a communication including the content corresponding to the selection of the first communication-content option and the second communication-content option; and in response to receiving the input corresponding to the request to send the communication, sending the communication including the content corresponding to the selection of the first communication-content option and the second communication-content option selected by the first set of one or more inputs and the second set of one or more inputs.

In accordance with some embodiments, a method, performed at a computer system that is in communication with a display generation component and one or more input devices, is described. The method comprises: detecting, via the one or more input devices, a user input corresponding to a request to communicate via satellite communication; and in response to detecting the user input: displaying, via the display generation component, an alignment element, including: in accordance with a determination that the computer system is not aligned properly for communication with one or more satellites, displaying the alignment element with a first alignment appearance that indicates the computer system is not aligned properly for communication with the one or more satellites and includes a graphical indication; and while displaying the alignment element with the first alignment appearance, detecting a change in orientation of a predetermined portion of the computer system; and in response to detecting the change in orientation of the predetermined portion of the computer system, changing an appearance of the alignment element.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a user input corresponding to a request to communicate via satellite communication; and in response to detecting the user input: displaying, via the display generation component, an alignment element, including: in accordance with a determination that the computer system is not aligned properly for communication with one or more satellites, displaying the alignment element with a first alignment appearance that indicates the computer system is not aligned properly for communication with the one or more satellites and includes a graphical indication; and while displaying the alignment element with the first alignment appearance, detecting a change in orientation of a predetermined portion of the computer system; and in response to detecting the change in orientation of the predetermined portion of the computer system, changing an appearance of the alignment element.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a user input corresponding to a request to communicate via satellite communication; and in response to detecting the user input: displaying, via the display generation component, an alignment element, including: in accordance with a determination that the computer system is not aligned properly for communication with one or more satellites, displaying the alignment element with a first alignment appearance that indicates the computer system is not aligned properly for communication with the one or more satellites and includes a graphical indication; and while displaying the alignment element with the first alignment appearance, detecting a change in orientation of a predetermined portion of the computer system; and in response to detecting the change in orientation of the predetermined portion of the computer system, changing an appearance of the alignment element.

In accordance with some embodiments, a computer system is described. The computer system configured to communicate with a display generation component and one or more input devices, comprising: one or more processors; and memory storing one or more programs configured to be executed by the one or more processors, the one or more programs including instructions for: detecting, via the one or more input devices, a user input corresponding to a request to communicate via satellite communication; and in response to detecting the user input: displaying, via the display generation component, an alignment element, including: in accordance with a determination that the computer system is not aligned properly for communication with one or more satellites, displaying the alignment element with a first alignment appearance that indicates the computer system is not aligned properly for communication with the one or more satellites and includes a graphical indication; and while displaying the alignment element with the first alignment appearance, detecting a change in orientation of a predetermined portion of the computer system; and in response to detecting the change in orientation of the predetermined portion of the computer system, changing an appearance of the alignment element.

In accordance with some embodiments, a computer system is described. The computer system configured to communicate with a display generation component and one or more input devices, comprising: means for detecting, via the one or more input devices, a user input corresponding to a request to communicate via satellite communication; and means for, in response to detecting the user input: displaying, via the display generation component, an alignment element, including: in accordance with a determination that the computer system is not aligned properly for communication with one or more satellites, displaying the alignment element with a first alignment appearance that indicates the computer system is not aligned properly for communication with the one or more satellites and includes a graphical indication; and while displaying the alignment element with the first alignment appearance, detecting a change in orientation of a predetermined portion of the computer system; and in response to detecting the change in orientation of the predetermined portion of the computer system, changing an appearance of the alignment element.

In accordance with some embodiments, a computer program product is described. the computer program product comprising one or more programs configured to be executed by one or more processors of a computer system that is in communication with a display generation component and one or more input devices, the one or more programs including instructions for: detecting, via the one or more input devices, a user input corresponding to a request to communicate via satellite communication; and in response to detecting the user input: displaying, via the display generation component, an alignment element, including: in accordance with a determination that the computer system is not aligned properly for communication with one or more satellites, displaying the alignment element with a first alignment appearance that indicates the computer system is not aligned properly for communication with the one or more satellites and includes a graphical indication; and while displaying the alignment element with the first alignment appearance, detecting a change in orientation of a predetermined portion of the computer system; and in response to detecting the change in orientation of the predetermined portion of the computer system, changing an appearance of the alignment element.

In accordance with some embodiments, a method performed at a computer system in communication with one or more input devices, is described. The method comprises: while preparing to initiate a communication with a first recipient, outputting a query as to whether to allow a second recipient, different from the first recipient, to receive information corresponding to the communication without adding the second recipient as a participant in a conversation of the communication; after outputting the query as to whether to allow the second recipient to receive information corresponding to the communication, detecting a sequence of one or more inputs corresponding to a request to send a message to the first recipient; and in response to detecting the sequence of one or more inputs: in accordance with a determination that the computer system detected one or more inputs corresponding to a request to allow the second recipient to receive information corresponding to the communication between the user and the first recipient, sending a message to the first recipient that includes respective information and enabling delivery of the message to the second recipient including at least a portion of the respective information; and in accordance with a determination that the computer system did not detect one or more inputs corresponding to a request to allow the second recipient to receive information corresponding to the communication between the user and the first recipient, sending a message to the first recipient that includes respective information without enabling delivery of the message to the second recipient including at least a portion of the respective information.

In accordance with some embodiments, a non-transitory computer-readable storage medium is described. The non-transitory computer-readable storage medium stores one or more programs configured to be executed by one or more processors of a computer system that is in communication with one or more input devices, the one or more programs including instructions for: while preparing to initiate a communication with a first recipient, outputting a query as to whether to allow a second recipient, different from the first recipient, to receive information corresponding to the communication without adding the second recipient as a participant in a conversation of the communication; after outputting the query as to whether to allow the second recipient to receive information corresponding to the communication, detecting a sequence of one or more inputs corresponding to a request to send a message to the first recipient; and in response to detecting the sequence of one or more inputs: in accordance with a determination that the computer system detected one or more inputs corresponding to a request to allow the second recipient to receive information corresponding to the communication between the user and the first recipient, sending a message to the first recipient that includes respective information and enabling delivery of the message to the second recipient including at least a portion of the respective information; and in accordance with a determination that the computer system did not detect one or more inputs corresponding to a request to allow the second recipient to receive information corresponding to the communication between the user and the first recipient, sending a message to the first recipient that includes respective information without enabling delivery of the message to the second recipient including at least a portion of the respective information.

In accordance with some embodiments, a transitory computer-readable storage medium is described. The transitory computer-readable storage medium stores one or more programs configured to be executed by one or more processors of a computer system that is in communication with one or more input devices, the one or more programs including instructions for: while preparing to initiate a communication with a first recipient, outputting a query as to whether to allow a second recipient, different from the first recipient, to receive information corresponding to the communication without adding the second recipient as a participant in a conversation of the communication; after outputting the query as to whether to allow the second recipient to receive information corresponding to the communication, detecting a sequence of one or more inputs corresponding to a request to send a message to the first recipient; and in response to detecting the sequence of one or more inputs: in accordance with a determination that the computer system detected one or more inputs corresponding to a request to allow the second recipient to receive information corresponding to the communication between the user and the first recipient, sending a message to the first recipient that includes respective information and enabling delivery of the message to the second recipient including at least a portion of the respective information; and in accordance with a determination that the computer system did not detect one or more inputs corresponding to a request to allow the second recipient to receive information corresponding to the communication between the user and the first recipient, sending a message to the first recipient that includes respective information without enabling delivery of the message to the second recipient including at least a portion of the respective information.

In accordance with some embodiments, a computer system is described. The computer system configured to communicate with and one or more input devices, comprising: one or more processors; and memory storing one or more programs configured to be executed by the one or more processors, the one or more programs including instructions for: while preparing to initiate a communication with a first recipient, outputting a query as to whether to allow a second recipient, different from the first recipient, to receive information corresponding to the communication without adding the second recipient as a participant in a conversation of the communication; after outputting the query as to whether to allow the second recipient to receive information corresponding to the communication, detecting a sequence of one or more inputs corresponding to a request to send a message to the first recipient; and in response to detecting the sequence of one or more inputs: in accordance with a determination that the computer system detected one or more inputs corresponding to a request to allow the second recipient to receive information corresponding to the communication between the user and the first recipient, sending a message to the first recipient that includes respective information and enabling delivery of the message to the second recipient including at least a portion of the respective information; and in accordance with a determination that the computer system did not detect one or more inputs corresponding to a request to allow the second recipient to receive information corresponding to the communication between the user and the first recipient, sending a message to the first recipient that includes respective information without enabling delivery of the message to the second recipient including at least a portion of the respective information.

In accordance with some embodiments, a computer system is described. The computer system configured to communicate with one or more input devices, comprising: means for, while preparing to initiate a communication with a first recipient, outputting a query as to whether to allow a second recipient, different from the first recipient, to receive information corresponding to the communication without adding the second recipient as a participant in a conversation of the communication; means for, after outputting the query as to whether to allow the second recipient to receive information corresponding to the communication, detecting a sequence of one or more inputs corresponding to a request to send a message to the first recipient; and means for, in response to detecting the sequence of one or more inputs: in accordance with a determination that the computer system detected one or more inputs corresponding to a request to allow the second recipient to receive information corresponding to the communication between the user and the first recipient, sending a message to the first recipient that includes respective information and enabling delivery of the message to the second recipient including at least a portion of the respective information; and in accordance with a determination that the computer system did not detect one or more inputs corresponding to a request to allow the second recipient to receive information corresponding to the communication between the user and the first recipient, sending a message to the first recipient that includes respective information without enabling delivery of the message to the second recipient including at least a portion of the respective information.

In accordance with some embodiments, a computer program product is described. The computer program product, comprising one or more programs configured to be executed by one or more processors of a computer system that is in communication with one or more input devices, the one or more programs including instructions for: while preparing to initiate a communication with a first recipient, outputting a query as to whether to allow a second recipient, different from the first recipient, to receive information corresponding to the communication without adding the second recipient as a participant in a conversation of the communication; after outputting the query as to whether to allow the second recipient to receive information corresponding to the communication, detecting a sequence of one or more inputs corresponding to a request to send a message to the first recipient; and in response to detecting the sequence of one or more inputs: in accordance with a determination that the computer system detected one or more inputs corresponding to a request to allow the second recipient to receive information corresponding to the communication between the user and the first recipient, sending a message to the first recipient that includes respective information and enabling delivery of the message to the second recipient including at least a portion of the respective information; and in accordance with a determination that the computer system did not detect one or more inputs corresponding to a request to allow the second recipient to receive information corresponding to the communication between the user and the first recipient, sending a message to the first recipient that includes respective information without enabling delivery of the message to the second recipient including at least a portion of the respective information.

In accordance with some embodiments, a method is described. The method comprises: at a computer system: while the computer system is in communication with a first communication network: determining that respective criteria have been met; and in response to determining that the respective criteria have been met, automatically, without user input, transmitting updated location information that indicates an updated location of the computer system, wherein the updated location information is accessible to devices other than the computer system; after automatically transmitting updated location information one or more times when the respective criteria was met, detecting that the first communication network is unavailable; and while the first communication network is unavailable, the computer system is capable of updating location information via a second communication network, and the respective criteria have been met, forgoing automatically transmitting updated location information.

In accordance with some embodiments, a non-transitory computer-readable storage medium storing one or more programs configured to be executed by one or more processors of a computer system is described. The one or more programs include instructions for: while the computer system is in communication with a first communication network: determining that respective criteria have been met; and in response to determining that the respective criteria have been met, automatically, without user input, transmitting updated location information that indicates an updated location of the computer system, wherein the updated location information is accessible to devices other than the computer system; after automatically transmitting updated location information one or more times when the respective criteria was met, detecting that the first communication network is unavailable; and while the first communication network is unavailable, the computer system is capable of updating location information via a second communication network, and the respective criteria have been met, forgoing automatically transmitting updated location information.

In accordance with some embodiments, a transitory computer-readable storage medium storing one or more programs configured to be executed by one or more processors of a computer system is described. The one or more programs include instructions for: while the computer system is in communication with a first communication network: determining that respective criteria have been met; and in response to determining that the respective criteria have been met, automatically, without user input, transmitting updated location information that indicates an updated location of the computer system, wherein the updated location information is accessible to devices other than the computer system; after automatically transmitting updated location information one or more times when the respective criteria was met, detecting that the first communication network is unavailable; and while the first communication network is unavailable, the computer system is capable of updating location information via a second communication network, and the respective criteria have been met, forgoing automatically transmitting updated location information.

In accordance with some embodiments, a computer system is described. The computer system comprises: one or more processors; and memory storing one or more programs configured to be executed by the one or more processors, the one or more programs including instructions for: while the computer system is in communication with a first communication network: determining that respective criteria have been met; and in response to determining that the respective criteria have been met, automatically, without user input, transmitting updated location information that indicates an updated location of the computer system, wherein the updated location information is accessible to devices other than the computer system; after automatically transmitting updated location information one or more times when the respective criteria was met, detecting that the first communication network is unavailable; and while the first communication network is unavailable, the computer system is capable of updating location information via a second communication network, and the respective criteria have been met, forgoing automatically transmitting updated location information.

In accordance with some embodiments, a computer system is described. The computer system comprises: means for, while the computer system is in communication with a first communication network: determining that respective criteria have been met; and in response to determining that the respective criteria have been met, automatically, without user input, transmitting updated location information that indicates an updated location of the computer system, wherein the updated location information is accessible to devices other than the computer system; means for, after automatically transmitting updated location information one or more times when the respective criteria was met, detecting that the first communication network is unavailable; and means for, while the first communication network is unavailable, the computer system is capable of updating location information via a second communication network, and the respective criteria have been met, forgoing automatically transmitting updated location information.

In accordance with some embodiments, a computer program product, comprising one or more programs configured to be executed by one or more processors of a computer system is described. The one or more programs include instructions for: while the computer system is in communication with a first communication network: determining that respective criteria have been met; and in response to determining that the respective criteria have been met, automatically, without user input, transmitting updated location information that indicates an updated location of the computer system, wherein the updated location information is accessible to devices other than the computer system; after automatically transmitting updated location information one or more times when the respective criteria was met, detecting that the first communication network is unavailable; and while the first communication network is unavailable, the computer system is capable of updating location information via a second communication network, and the respective criteria have been met, forgoing automatically transmitting updated location information.

In accordance with some embodiments, a method is described. The method comprises: at a computer system in communication with an output generation component, one or more input devices, and an external computer system: receiving a request, via the one or more input devices, to initiate a communication; and in response to receiving the request to initiate the communication: in accordance with a determination that the external computer system is connected to a terrestrial wireless communication network, initiating a process for communicating via a terrestrial wireless communication network; and in accordance with a determination that the external computer system is not connected to a terrestrial wireless communication network, providing, via the output generation component, a prompt to use the external computer system to connect to a non-terrestrial network.

In accordance with some embodiments, a non-transitory computer-readable storage medium storing one or more programs configured to be executed by one or more processors of a computer system that is in communication with an output generation component, one or more input devices, and an external computer system is described. The one or more programs include instructions for: receiving a request, via the one or more input devices, to initiate a communication; and in response to receiving the request to initiate the communication: in accordance with a determination that the external computer system is connected to a terrestrial wireless communication network, initiating a process for communicating via a terrestrial wireless communication network; and in accordance with a determination that the external computer system is not connected to a terrestrial wireless communication network, providing, via the output generation component, a prompt to use the external computer system to connect to a non-terrestrial network.

In accordance with some embodiments, a transitory computer-readable storage medium storing one or more programs configured to be executed by one or more processors of a computer system that is in communication with an output generation component, one or more input devices, and an external computer system is described. The one or more programs include instructions for: receiving a request, via the one or more input devices, to initiate a communication; and in response to receiving the request to initiate the communication: in accordance with a determination that the external computer system is connected to a terrestrial wireless communication network, initiating a process for communicating via a terrestrial wireless communication network; and in accordance with a determination that the external computer system is not connected to a terrestrial wireless communication network, providing, via the output generation component, a prompt to use the external computer system to connect to a non-terrestrial network.

In accordance with some embodiments, a computer system configured to communicate with an output generation component, one or more input devices, and an external computer system is described. The computer system comprises: one or more processors; and memory storing one or more programs configured to be executed by the one or more processors, the one or more programs including instructions for: receiving a request, via the one or more input devices, to initiate a communication; and in response to receiving the request to initiate the communication: in accordance with a determination that the external computer system is connected to a terrestrial wireless communication network, initiating a process for communicating via a terrestrial wireless communication network; and in accordance with a determination that the external computer system is not connected to a terrestrial wireless communication network, providing, via the output generation component, a prompt to use the external computer system to connect to a non-terrestrial network.

In accordance with some embodiments, a computer system configured to communicate with an output generation component, one or more input devices, and an external computer system is described. The computer system comprises: means for receiving a request, via the one or more input devices, to initiate a communication; and means for, in response to receiving the request to initiate the communication: in accordance with a determination that the external computer system is connected to a terrestrial wireless communication network, initiating a process for communicating via a terrestrial wireless communication network; and in accordance with a determination that the external computer system is not connected to a terrestrial wireless communication network, providing, via the output generation component, a prompt to use the external computer system to connect to a non-terrestrial network.

In accordance with some embodiments, a computer program product, comprising one or more programs configured to be executed by one or more processors of a computer system that is in communication with an output generation component, one or more input devices, and an external computer system is described. The one or more programs include instructions for: receiving a request, via the one or more input devices, to initiate a communication; and in response to receiving the request to initiate the communication: in accordance with a determination that the external computer system is connected to a terrestrial wireless communication network, initiating a process for communicating via a terrestrial wireless communication network; and in accordance with a determination that the external computer system is not connected to a terrestrial wireless communication network, providing, via the output generation component, a prompt to use the external computer system to connect to a non-terrestrial network.

In accordance with some embodiments, a method is described. The method comprises: at a computer system that is in communication with an output generation component and one or more input devices: detecting, via the one or more input devices, a set of one or more inputs that includes selection of a respective number for text-based communication; and in response to detecting the set of one or more inputs that includes selection of the respective number for text-based communication: in accordance with a determination that a set of alternative communication criteria is met, wherein the set of alternative communication criteria includes a first criterion that is met when the respective number is a respective type of number and a second criterion that is met when a respective communication network is not available: outputting, via the output generation component, a prompt that includes an indication that communication with the respective number can be performed via an alternative communication network that is different from the respective communication network.

In accordance with some embodiments, a non-transitory computer-readable storage medium is described. The non-transitory computer-readable storage medium stores one or more programs configured to be executed by one or more processors of a computer system that is in communication with an output generation component and one or more input devices, the one or more programs including instructions for: detecting, via the one or more input devices, a set of one or more inputs that includes selection of a respective number for text-based communication; and in response to detecting the set of one or more inputs that includes selection of the respective number for text-based communication: in accordance with a determination that a set of alternative communication criteria is met, wherein the set of alternative communication criteria includes a first criterion that is met when the respective number is a respective type of number and a second criterion that is met when a respective communication network is not available: outputting, via the output generation component, a prompt that includes an indication that communication with the respective number can be performed via an alternative communication network that is different from the respective communication network.

In accordance with some embodiments, a transitory computer-readable storage medium is described. The transitory computer-readable storage medium stores one or more programs configured to be executed by one or more processors of a computer system that is in communication with an output generation component and one or more input devices, the one or more programs including instructions for: detecting, via the one or more input devices, a set of one or more inputs that includes selection of a respective number for text-based communication; and in response to detecting the set of one or more inputs that includes selection of the respective number for text-based communication: in accordance with a determination that a set of alternative communication criteria is met, wherein the set of alternative communication criteria includes a first criterion that is met when the respective number is a respective type of number and a second criterion that is met when a respective communication network is not available: outputting, via the output generation component, a prompt that includes an indication that communication with the respective number can be performed via an alternative communication network that is different from the respective communication network.

In accordance with some embodiments, a computer system configured to communicate with an output generation component and one or more input devices is described. The computer system comprises: one or more processors; and memory storing one or more programs configured to be executed by the one or more processors, the one or more programs including instructions for: detecting, via the one or more input devices, a set of one or more inputs that includes selection of a respective number for text-based communication; and in response to detecting the set of one or more inputs that includes selection of the respective number for text-based communication: in accordance with a determination that a set of alternative communication criteria is met, wherein the set of alternative communication criteria includes a first criterion that is met when the respective number is a respective type of number and a second criterion that is met when a respective communication network is not available: outputting, via the output generation component, a prompt that includes an indication that communication with the respective number can be performed via an alternative communication network that is different from the respective communication network.

In accordance with some embodiments, a computer system configured to communicate with an output generation component and one or more input devices is described. The computer system comprises: means for detecting, via the one or more input devices, a set of one or more inputs that includes selection of a respective number for text-based communication; and means for, in response to detecting the set of one or more inputs that includes selection of the respective number for text-based communication: in accordance with a determination that a set of alternative communication criteria is met, wherein the set of alternative communication criteria includes a first criterion that is met when the respective number is a respective type of number and a second criterion that is met when a respective communication network is not available: outputting, via the output generation component, a prompt that includes an indication that communication with the respective number can be performed via an alternative communication network that is different from the respective communication network.

In accordance with some embodiments, a computer program product is described. The computer program product comprises one or more programs configured to be executed by one or more processors of a computer system that is in communication with an output generation component and one or more input devices, the one or more programs including instructions for: detecting, via the one or more input devices, a set of one or more inputs that includes selection of a respective number for text-based communication; and in response to detecting the set of one or more inputs that includes selection of the respective number for text-based communication: in accordance with a determination that a set of alternative communication criteria is met, wherein the set of alternative communication criteria includes a first criterion that is met when the respective number is a respective type of number and a second criterion that is met when a respective communication network is not available: outputting, via the output generation component, a prompt that includes an indication that communication with the respective number can be performed via an alternative communication network that is different from the respective communication network.

In accordance with some embodiments, a method is described. The method comprises: at a computer system that is in communication with a display generation component and one or more input devices, wherein the computer system is configured to communicate via an alternative communication network while a respective communication network is not available: while a capability of the computer system to communicate via the respective communication network is enabled, detecting, via the one or more input devices, a set of one or more inputs corresponding to a request to activate an alternative communication network test mode; in response to detecting the set of one or more inputs corresponding to a request to activate the alternative communication network test mode, activating the alternative communication network test mode; and while the alternative communication network test mode is activated, displaying, via the display generation component, a set of user interfaces.

In accordance with some embodiments, a non-transitory computer-readable storage medium is described. The non-transitory computer-readable storage medium stores one or more programs configured to be executed by one or more processors of a computer system that is in communication with a display generation component and one or more input devices, wherein the computer system is configured to communicate via an alternative communication network while a respective communication network is not available, the one or more programs including instructions for: while a capability of the computer system to communicate via the respective communication network is enabled, detecting, via the one or more input devices, a set of one or more inputs corresponding to a request to activate an alternative communication network test mode; in response to detecting the set of one or more inputs corresponding to a request to activate the alternative communication network test mode, activating the alternative communication network test mode; and while the alternative communication network test mode is activated, displaying, via the display generation component, a set of user interfaces.

In accordance with some embodiments, a transitory computer-readable storage medium is described. The transitory computer-readable storage medium stores one or more programs configured to be executed by one or more processors of a computer system that is in communication with a display generation component and one or more input devices, wherein the computer system is configured to communicate via an alternative communication network while a respective communication network is not available, the one or more programs including instructions for: while a capability of the computer system to communicate via the respective communication network is enabled, detecting, via the one or more input devices, a set of one or more inputs corresponding to a request to activate an alternative communication network test mode; in response to detecting the set of one or more inputs corresponding to a request to activate the alternative communication network test mode, activating the alternative communication network test mode; and while the alternative communication network test mode is activated, displaying, via the display generation component, a set of user interfaces.

In accordance with some embodiments, a computer system configured to communicate with a display generation component and one or more input devices is described, where the computer system is configured to communicate via an alternative communication network while a respective communication network is not available. The computer system comprises: one or more processors; and memory storing one or more programs configured to be executed by the one or more processors, the one or more programs including instructions for: while a capability of the computer system to communicate via the respective communication network is enabled, detecting, via the one or more input devices, a set of one or more inputs corresponding to a request to activate an alternative communication network test mode; in response to detecting the set of one or more inputs corresponding to a request to activate the alternative communication network test mode, activating the alternative communication network test mode; and while the alternative communication network test mode is activated, displaying, via the display generation component, a set of user interfaces.

In accordance with some embodiments, a computer system configured to communicate with a display generation component and one or more input devices is described, where the computer system is configured to communicate via an alternative communication network while a respective communication network is not available. The computer system comprises: means for, while a capability of the computer system to communicate via the respective communication network is enabled, detecting, via the one or more input devices, a set of one or more inputs corresponding to a request to activate an alternative communication network test mode; means for, in response to detecting the set of one or more inputs corresponding to a request to activate the alternative communication network test mode, activating the alternative communication network test mode; and means for, while the alternative communication network test mode is activated, displaying, via the display generation component, a set of user interfaces.

In accordance with some embodiments, a computer program product is described. The computer program product comprises one or more programs configured to be executed by one or more processors of a computer system that is in communication with a display generation component and one or more input devices, where the computer system is configured to communicate via an alternative communication network while a respective communication network is not available, the one or more programs including instructions for: while a capability of the computer system to communicate via the respective communication network is enabled, detecting, via the one or more input devices, a set of one or more inputs corresponding to a request to activate an alternative communication network test mode; in response to detecting the set of one or more inputs corresponding to a request to activate the alternative communication network test mode, activating the alternative communication network test mode; and while the alternative communication network test mode is activated, displaying, via the display generation component, a set of user interfaces.

In accordance with some embodiments, a method is described. The method comprises: at a computer system that is in communication with a display generation component and one or more input devices: detecting, via the one or more input devices, a set of one or more inputs corresponding to a request to initiate a process for sending a communication to a respective recipient; in response to detecting the set of one or more inputs corresponding to the request to initiate a process for sending a communication to the respective recipient, initiating a process for sending a communication to the respective recipient; during the process for sending the communication to the respective recipient, detecting, via the one or more input devices, a set of one or more inputs corresponding to a request to display a system user interface; and in response to detecting the set of one or more inputs corresponding to a request to display a system user interface, displaying, via the display generation component, the system user interface and a user interface object corresponding to the communication, including: in accordance with a determination that the process for sending the communication to the respective recipient is in a first state, displaying the user interface object corresponding to the communication with a first appearance; and in accordance with a determination that the process for sending the communication to the respective recipient is in a second state different from the first state, displaying the user interface object corresponding to the communication with a second appearance that is different from the first appearance.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a set of one or more inputs corresponding to a request to initiate a process for sending a communication to a respective recipient; in response to detecting the set of one or more inputs corresponding to the request to initiate a process for sending a communication to the respective recipient, initiating a process for sending a communication to the respective recipient; during the process for sending the communication to the respective recipient, detecting, via the one or more input devices, a set of one or more inputs corresponding to a request to display a system user interface; and in response to detecting the set of one or more inputs corresponding to a request to display a system user interface, displaying, via the display generation component, the system user interface and a user interface object corresponding to the communication, including: in accordance with a determination that the process for sending the communication to the respective recipient is in a first state, displaying the user interface object corresponding to the communication with a first appearance; and in accordance with a determination that the process for sending the communication to the respective recipient is in a second state different from the first state, displaying the user interface object corresponding to the communication with a second appearance that is different from the first appearance.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a set of one or more inputs corresponding to a request to initiate a process for sending a communication to a respective recipient; in response to detecting the set of one or more inputs corresponding to the request to initiate a process for sending a communication to the respective recipient, initiating a process for sending a communication to the respective recipient; during the process for sending the communication to the respective recipient, detecting, via the one or more input devices, a set of one or more inputs corresponding to a request to display a system user interface; and in response to detecting the set of one or more inputs corresponding to a request to display a system user interface, displaying, via the display generation component, the system user interface and a user interface object corresponding to the communication, including: in accordance with a determination that the process for sending the communication to the respective recipient is in a first state, displaying the user interface object corresponding to the communication with a first appearance; and in accordance with a determination that the process for sending the communication to the respective recipient is in a second state different from the first state, displaying the user interface object corresponding to the communication with a second appearance that is different from the first appearance.

In accordance with some embodiments, a computer system configured to communicate with a display generation component and one or more input devices is described. The computer system comprises: one or more processors; and memory storing one or more programs configured to be executed by the one or more processors, the one or more programs including instructions for: detecting, via the one or more input devices, a set of one or more inputs corresponding to a request to initiate a process for sending a communication to a respective recipient; in response to detecting the set of one or more inputs corresponding to the request to initiate a process for sending a communication to the respective recipient, initiating a process for sending a communication to the respective recipient; during the process for sending the communication to the respective recipient, detecting, via the one or more input devices, a set of one or more inputs corresponding to a request to display a system user interface; and in response to detecting the set of one or more inputs corresponding to a request to display a system user interface, displaying, via the display generation component, the system user interface and a user interface object corresponding to the communication, including: in accordance with a determination that the process for sending the communication to the respective recipient is in a first state, displaying the user interface object corresponding to the communication with a first appearance; and in accordance with a determination that the process for sending the communication to the respective recipient is in a second state different from the first state, displaying the user interface object corresponding to the communication with a second appearance that is different from the first appearance.

In accordance with some embodiments, a computer system configured to communicate with a display generation component and one or more input devices is described. The computer system comprises: means for detecting, via the one or more input devices, a set of one or more inputs corresponding to a request to initiate a process for sending a communication to a respective recipient; means for, in response to detecting the set of one or more inputs corresponding to the request to initiate a process for sending a communication to the respective recipient, initiating a process for sending a communication to the respective recipient; means for, during the process for sending the communication to the respective recipient, detecting, via the one or more input devices, a set of one or more inputs corresponding to a request to display a system user interface; and means for, in response to detecting the set of one or more inputs corresponding to a request to display a system user interface, displaying, via the display generation component, the system user interface and a user interface object corresponding to the communication, including: in accordance with a determination that the process for sending the communication to the respective recipient is in a first state, displaying the user interface object corresponding to the communication with a first appearance; and in accordance with a determination that the process for sending the communication to the respective recipient is in a second state different from the first state, displaying the user interface object corresponding to the communication with a second appearance that is different from the first appearance.

In accordance with some embodiments, a computer program product is described. The computer program product comprises one or more programs configured to be executed by one or more processors of a computer system that is in communication with a display generation component and one or more input devices, the one or more programs including instructions for: detecting, via the one or more input devices, a set of one or more inputs corresponding to a request to initiate a process for sending a communication to a respective recipient; in response to detecting the set of one or more inputs corresponding to the request to initiate a process for sending a communication to the respective recipient, initiating a process for sending a communication to the respective recipient; during the process for sending the communication to the respective recipient, detecting, via the one or more input devices, a set of one or more inputs corresponding to a request to display a system user interface; and in response to detecting the set of one or more inputs corresponding to a request to display a system user interface, displaying, via the display generation component, the system user interface and a user interface object corresponding to the communication, including: in accordance with a determination that the process for sending the communication to the respective recipient is in a first state, displaying the user interface object corresponding to the communication with a first appearance; and in accordance with a determination that the process for sending the communication to the respective recipient is in a second state different from the first state, displaying the user interface object corresponding to the communication with a second appearance that is different from the first appearance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing emergency user interfaces, thereby increasing the effectiveness, efficiency, and user satisfaction with such devices. Such methods and interfaces may complement or replace other methods for managing communication user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing communications. For example, there is a need for methods and user interfaces for initiating a communication, determining whether to use a terrestrial or non-terrestrial (e.g., satellite) communication network, and providing users with feedback for aligning to a satellite for communication. For example, there is a need for methods and user interfaces for transmitting updated location information (e.g., when a terrestrial communication network is not available). Such techniques can reduce the cognitive burden on a user who needs to communicate or share updated location information under certain conditions (e.g., emergency conditions), thereby enhancing effectiveness by ensuring proper use of devices. Further, such techniques can reduce processor and battery power otherwise wasted on redundant user inputs.

Figure 7:
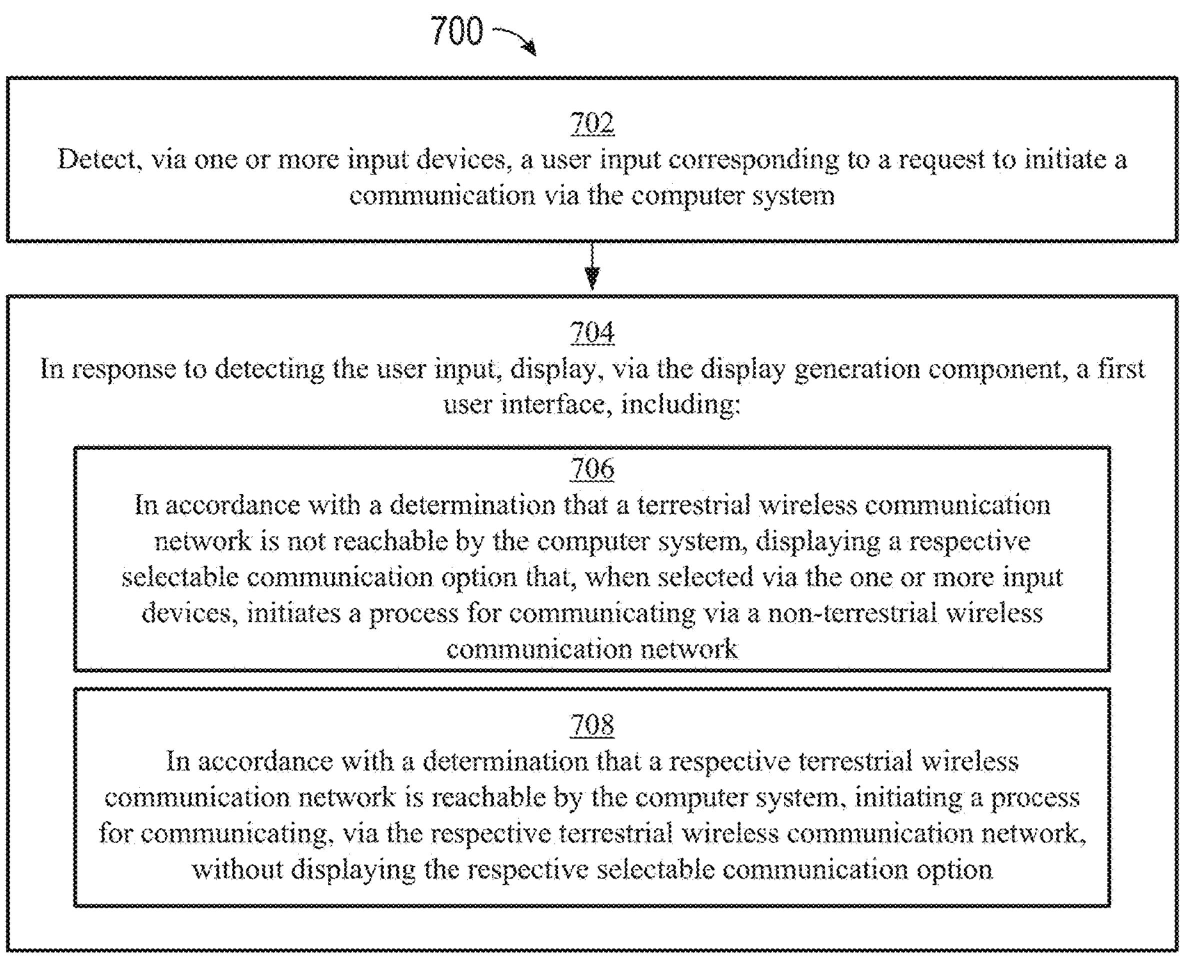
FIG. 7 is a flow diagram illustrating methods for initiating a communication when a terrestrial wireless communication network is not reachable, in accordance with some embodiments.
Figure 8:
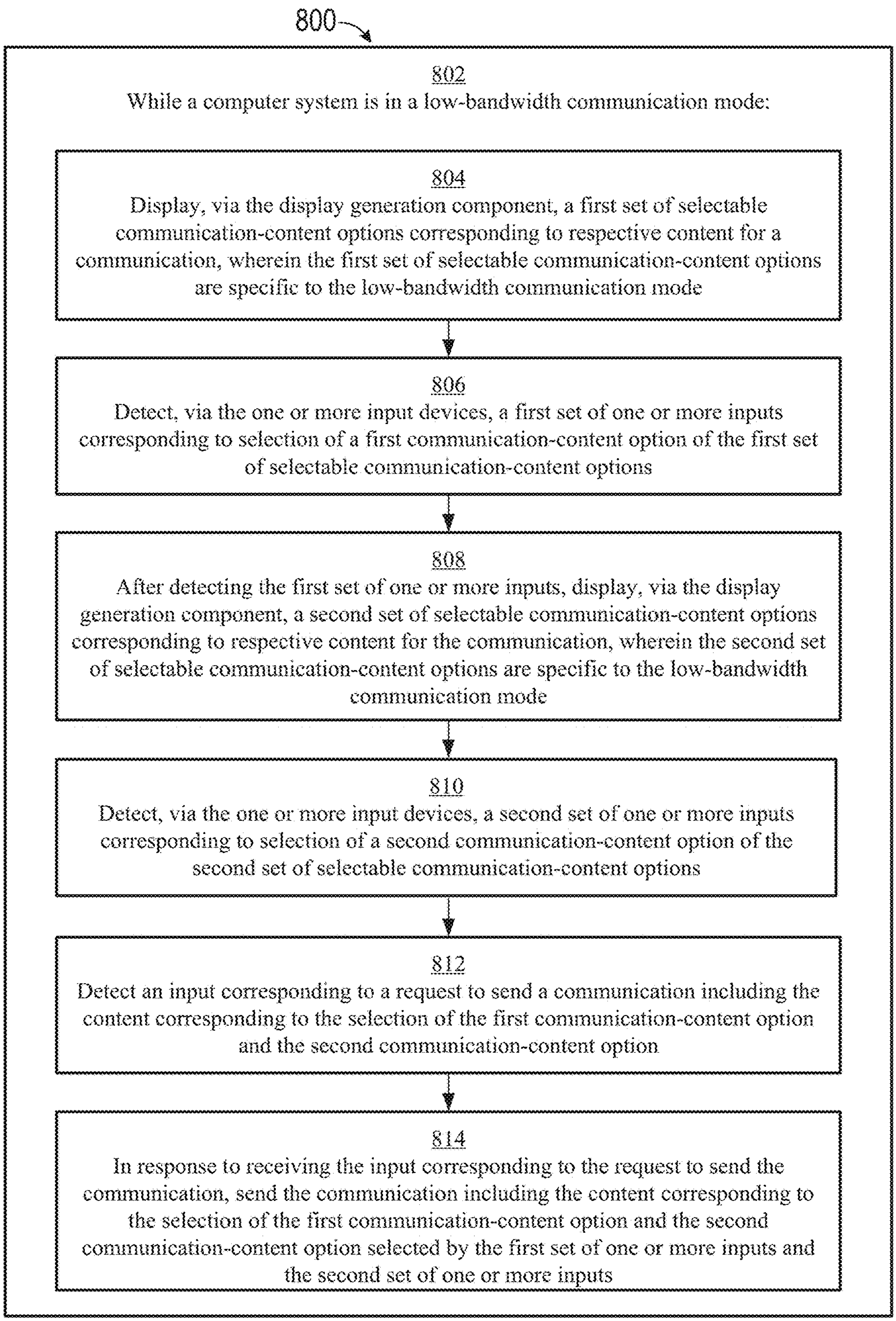
FIG. 8 is a flow diagram illustrating methods for initiating a communication when a terrestrial wireless communication network is not reachable, in accordance with some embodiments.

Below, FIGS. 1A-1B, 2, 3, 4A-4B, and 5A-5B provide a description of exemplary devices for performing the techniques for managing communications. FIGS. 6A-6Y illustrate exemplary user interfaces for initiating a communication when a terrestrial wireless communication network is not reachable and communicating in a low-bandwidth communication mode, in accordance with some embodiments. FIG. 7 is a flow diagram illustrating methods for initiating a communication when a terrestrial wireless communication network is not reachable. FIG. 8 is a flow diagram illustrating methods for communicating in a low-bandwidth mode. The user interfaces in FIGS. 6A-6Y are used to illustrate the processes described below, including the processes in FIGS. 7 and 8.

Figure 9B:
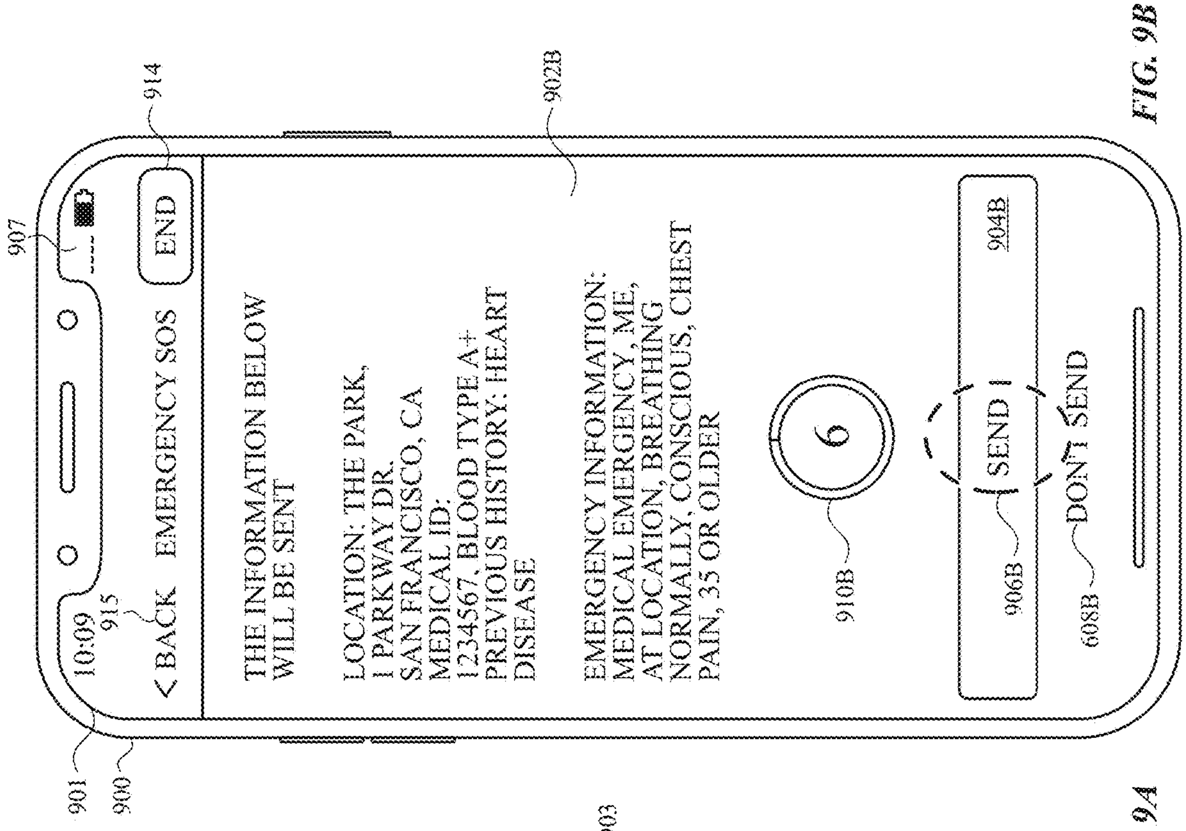
FIGS. 9A-9U illustrate exemplary user interfaces for aligning the computer system with one or more satellites, in accordance with some embodiments.
Figure 9A:
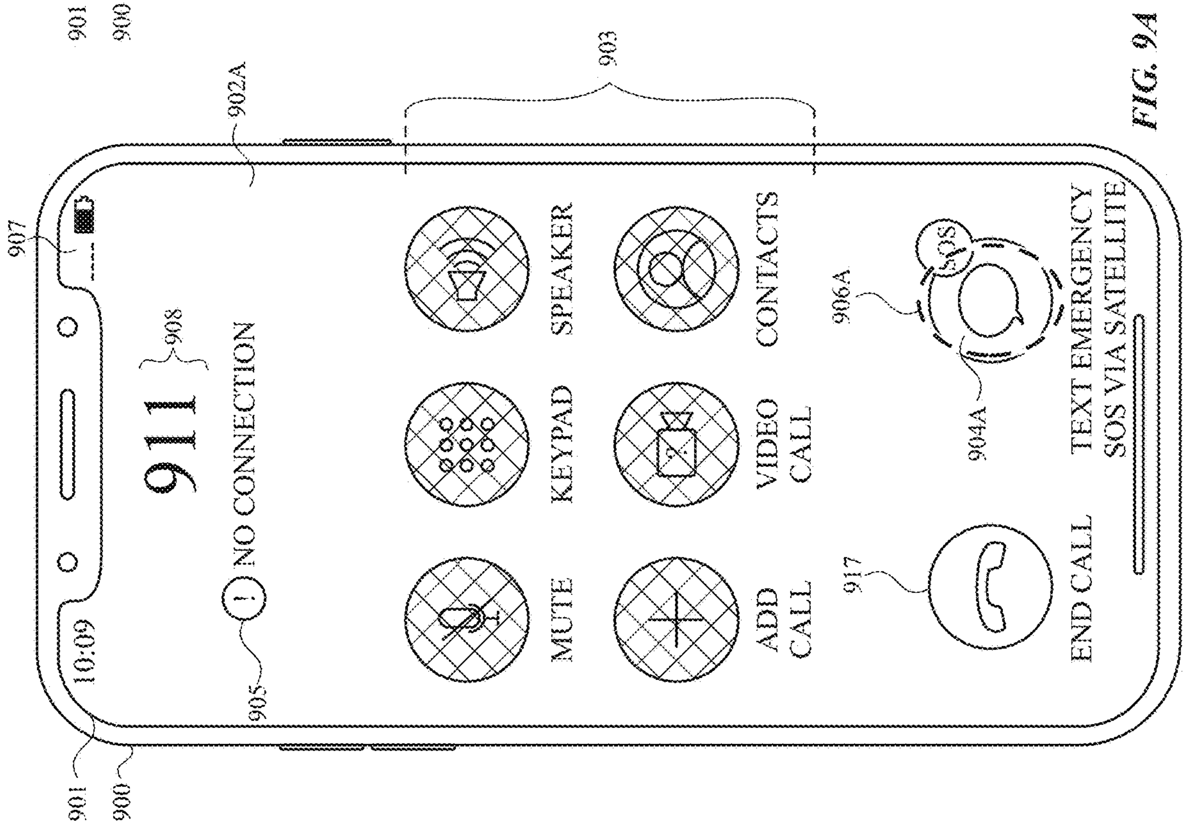
Figure 9C:
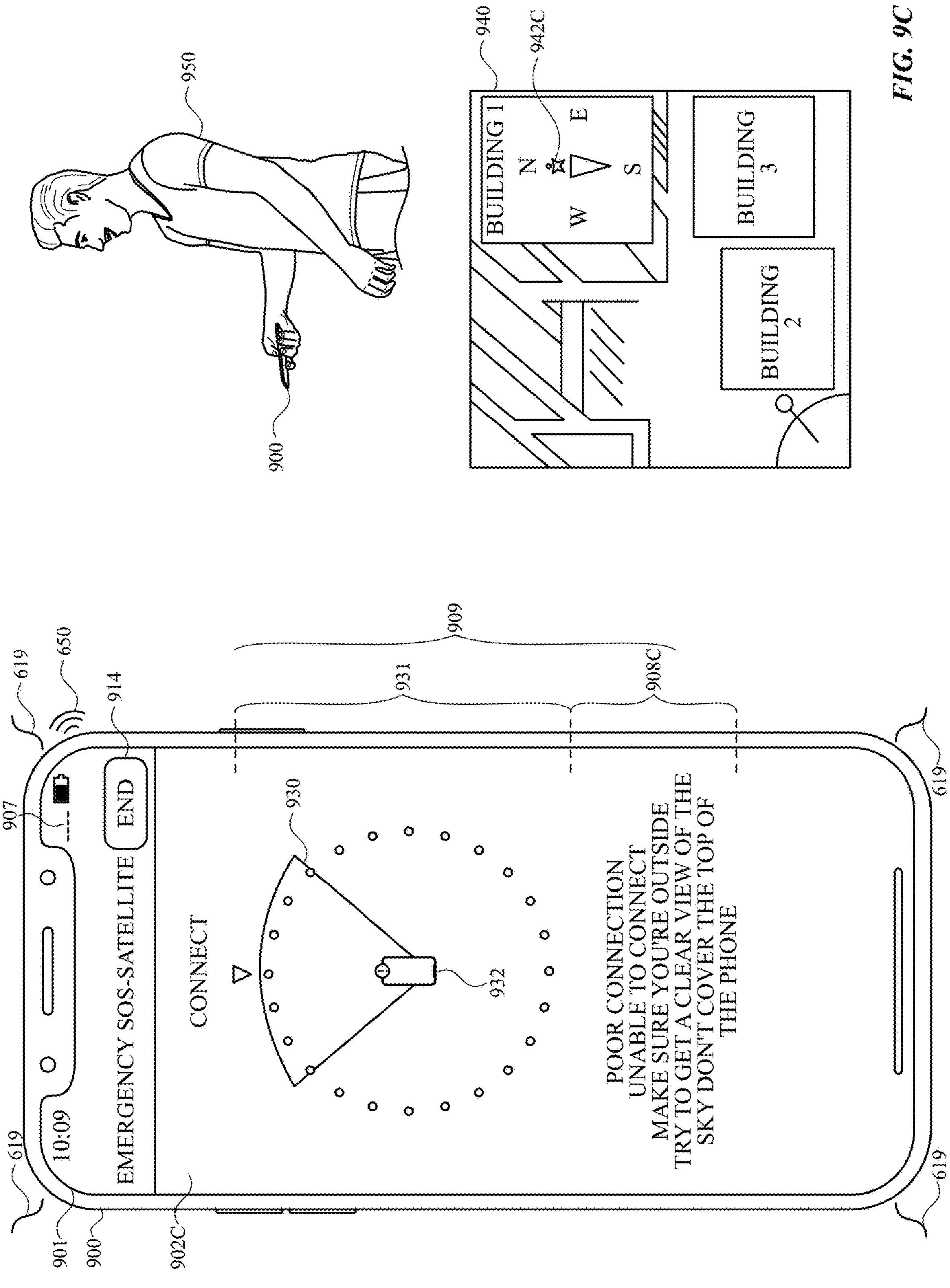
Figure 9D:
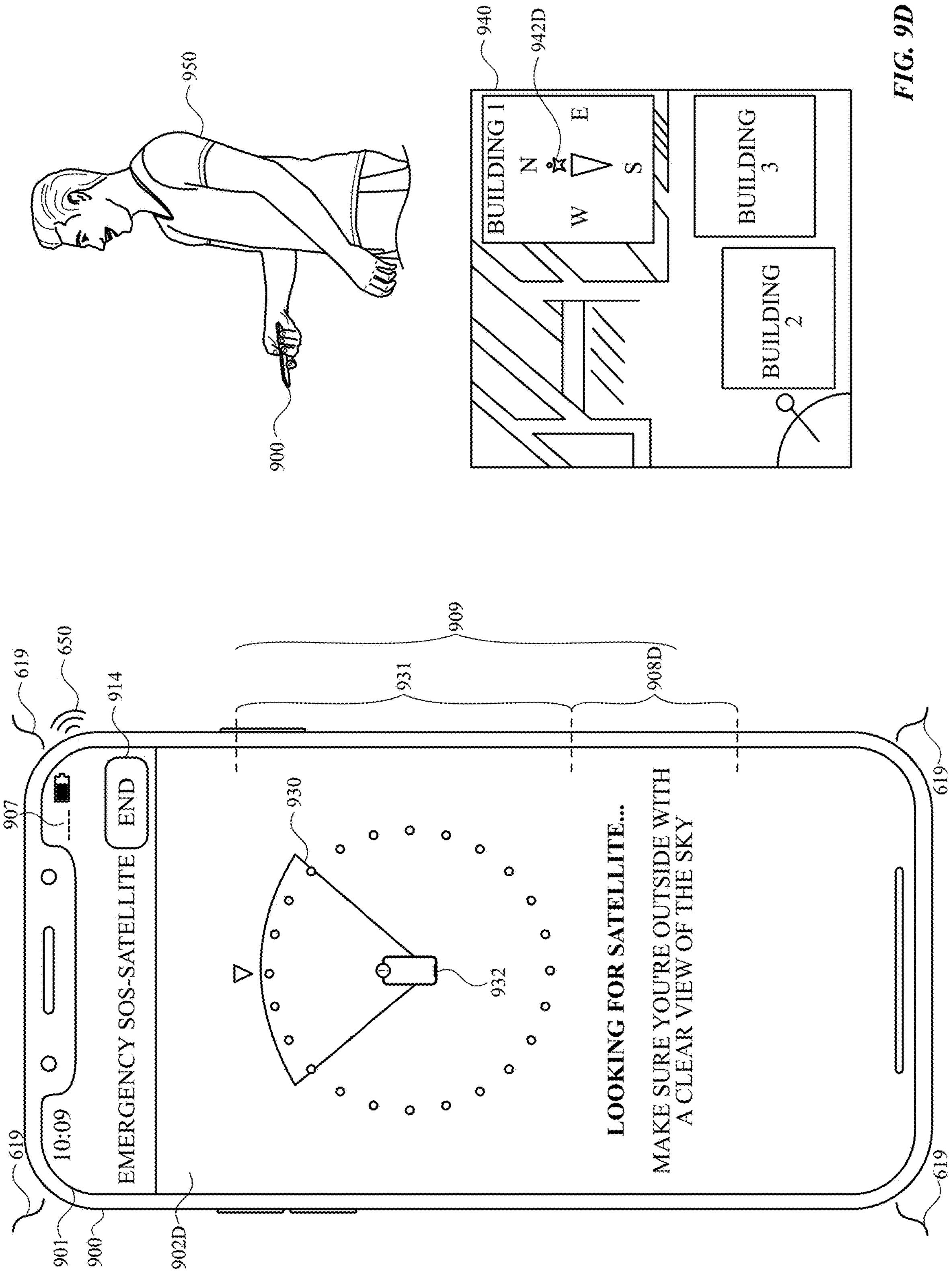
Figure 9E:
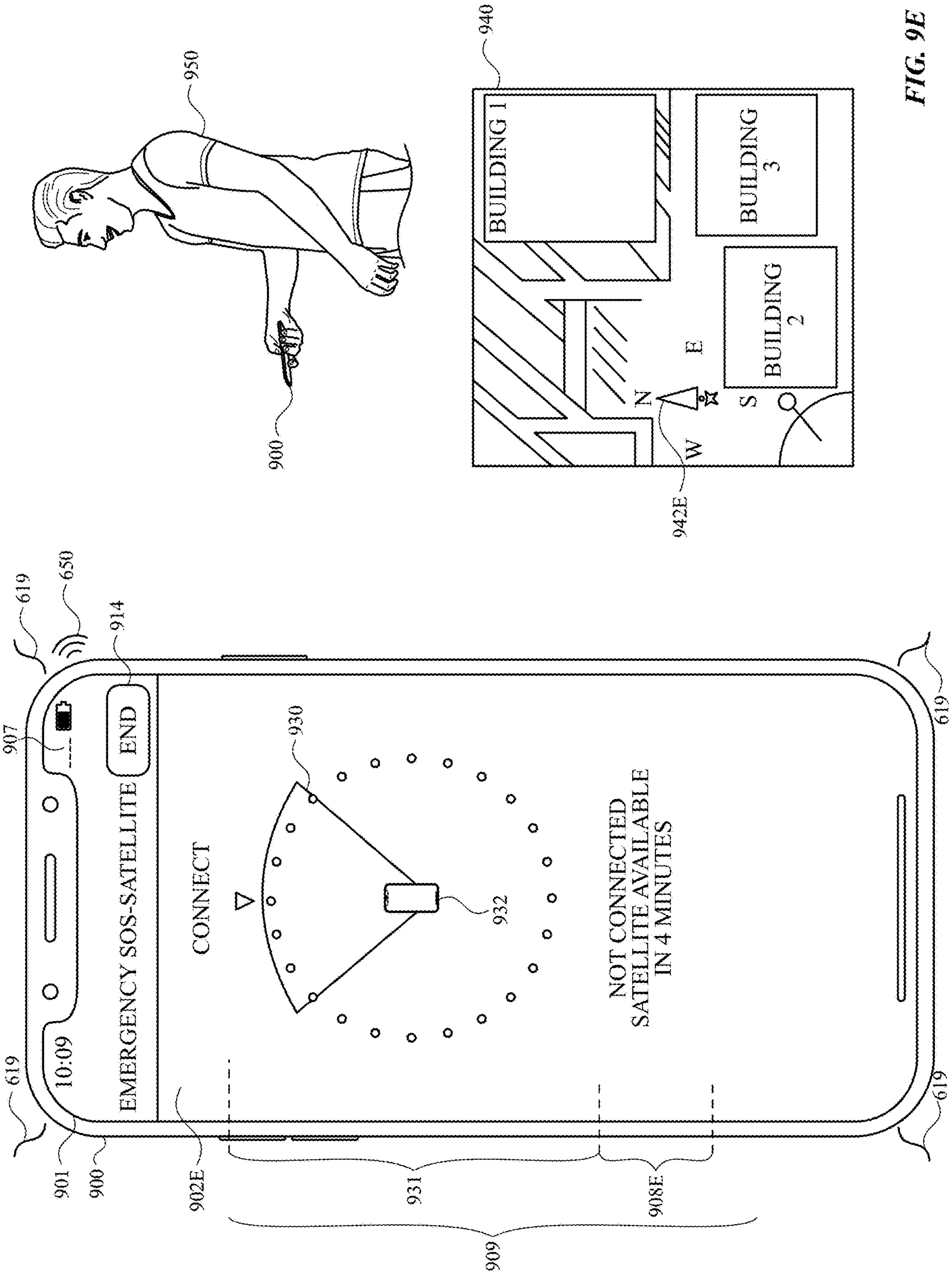
Figure 9F:
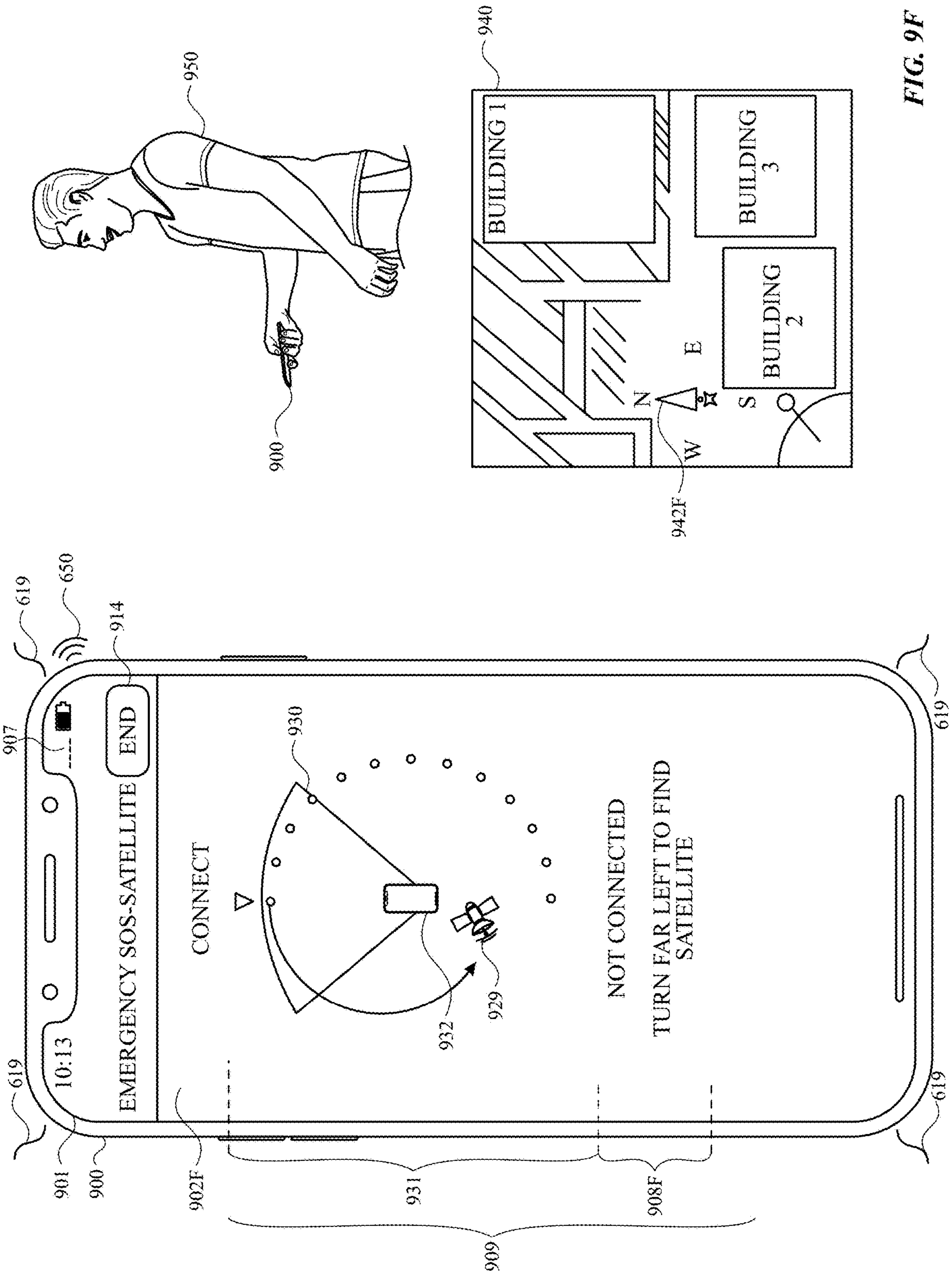
Figure 9G:
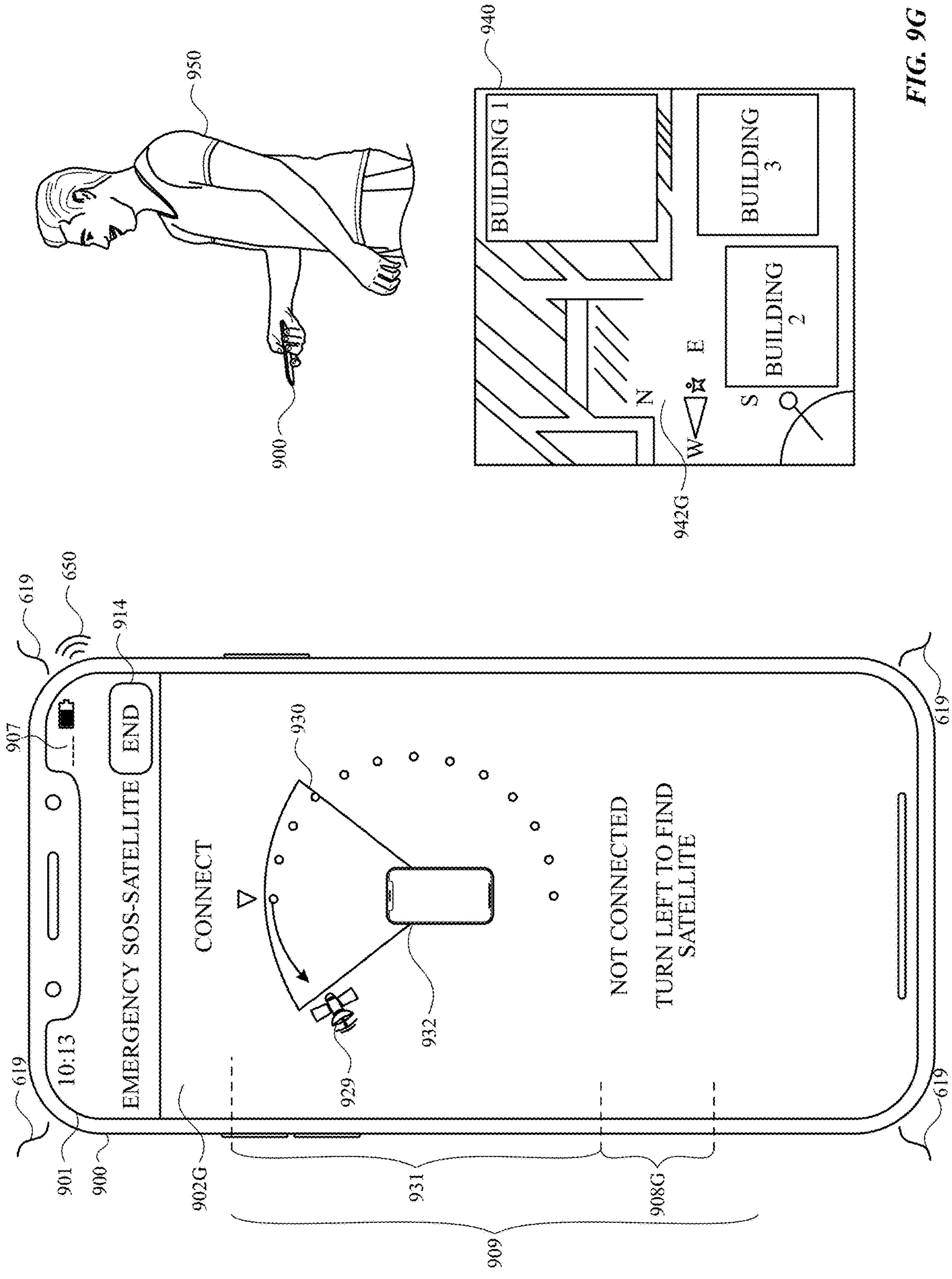
Figure 9H:
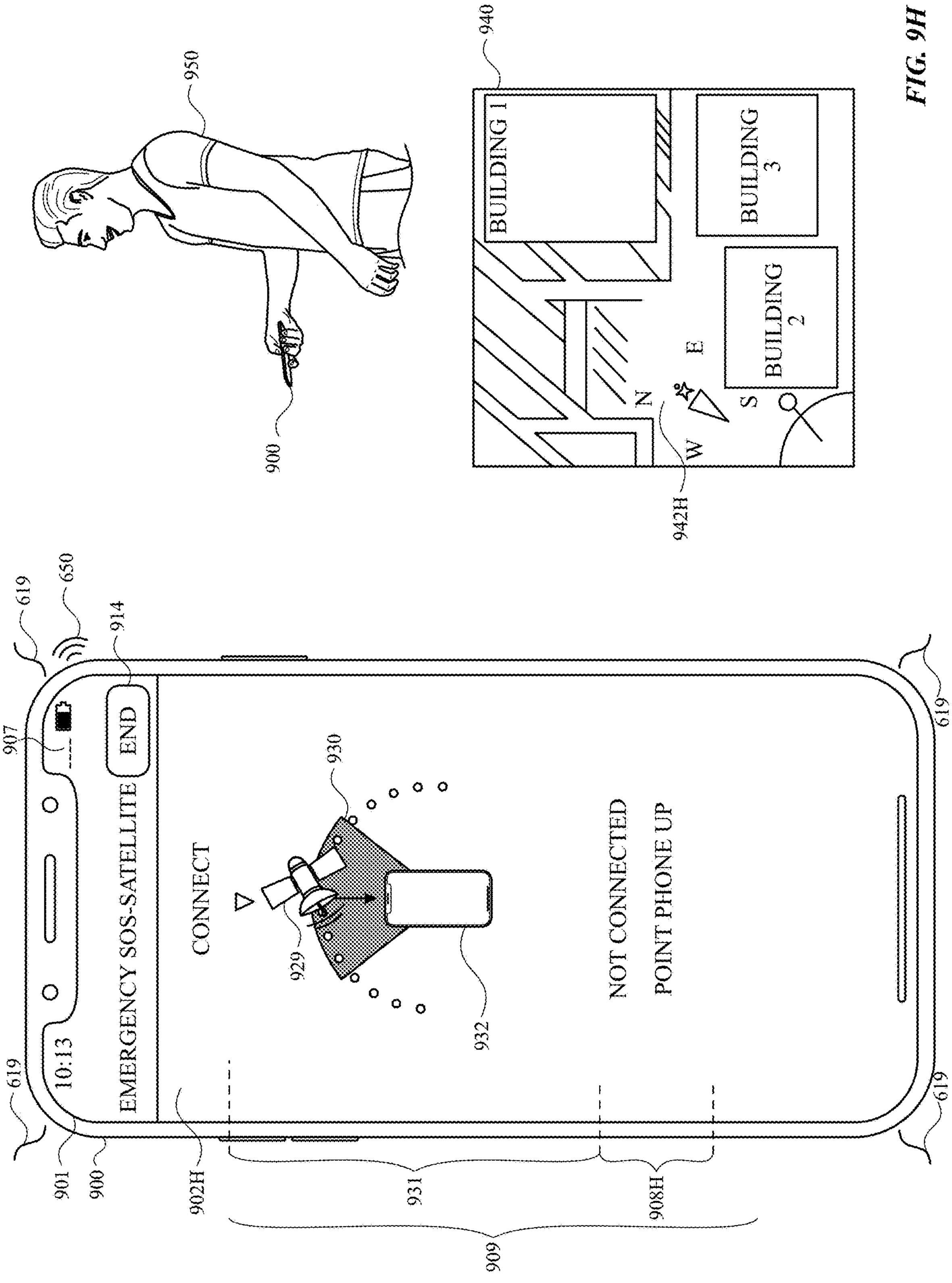
Figure 9I:
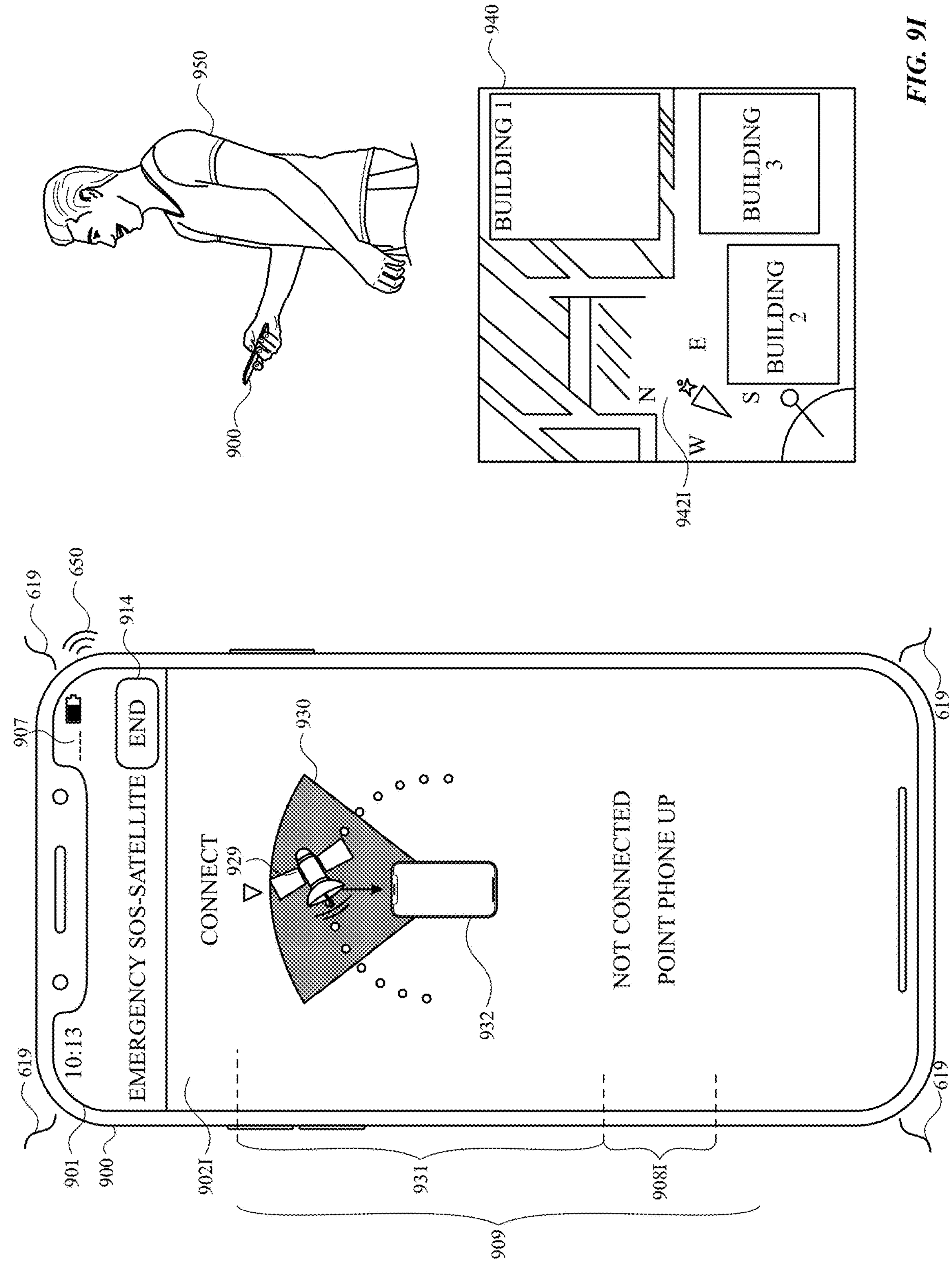
Figure 9J:
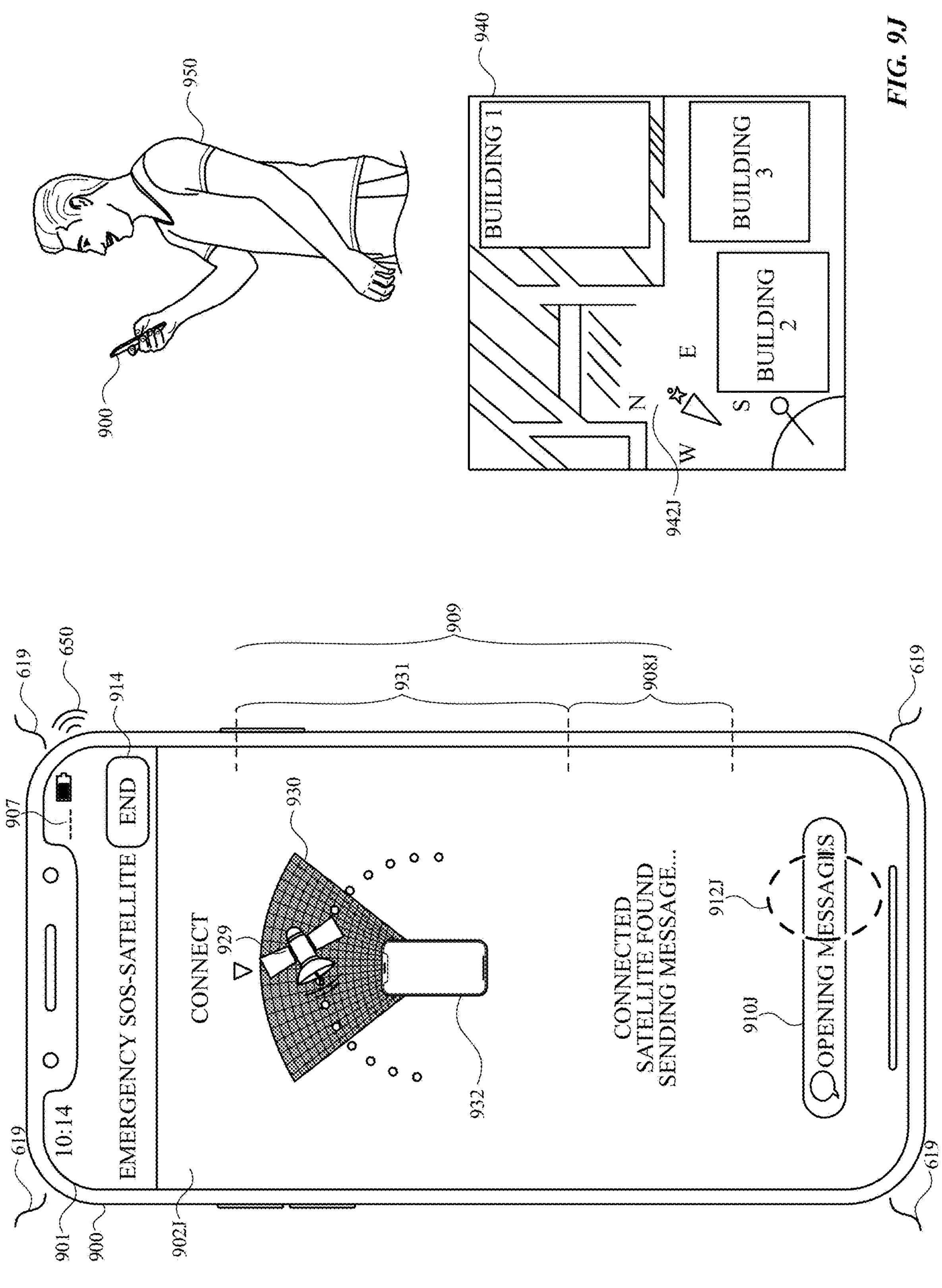
Figures 9K, 9L:
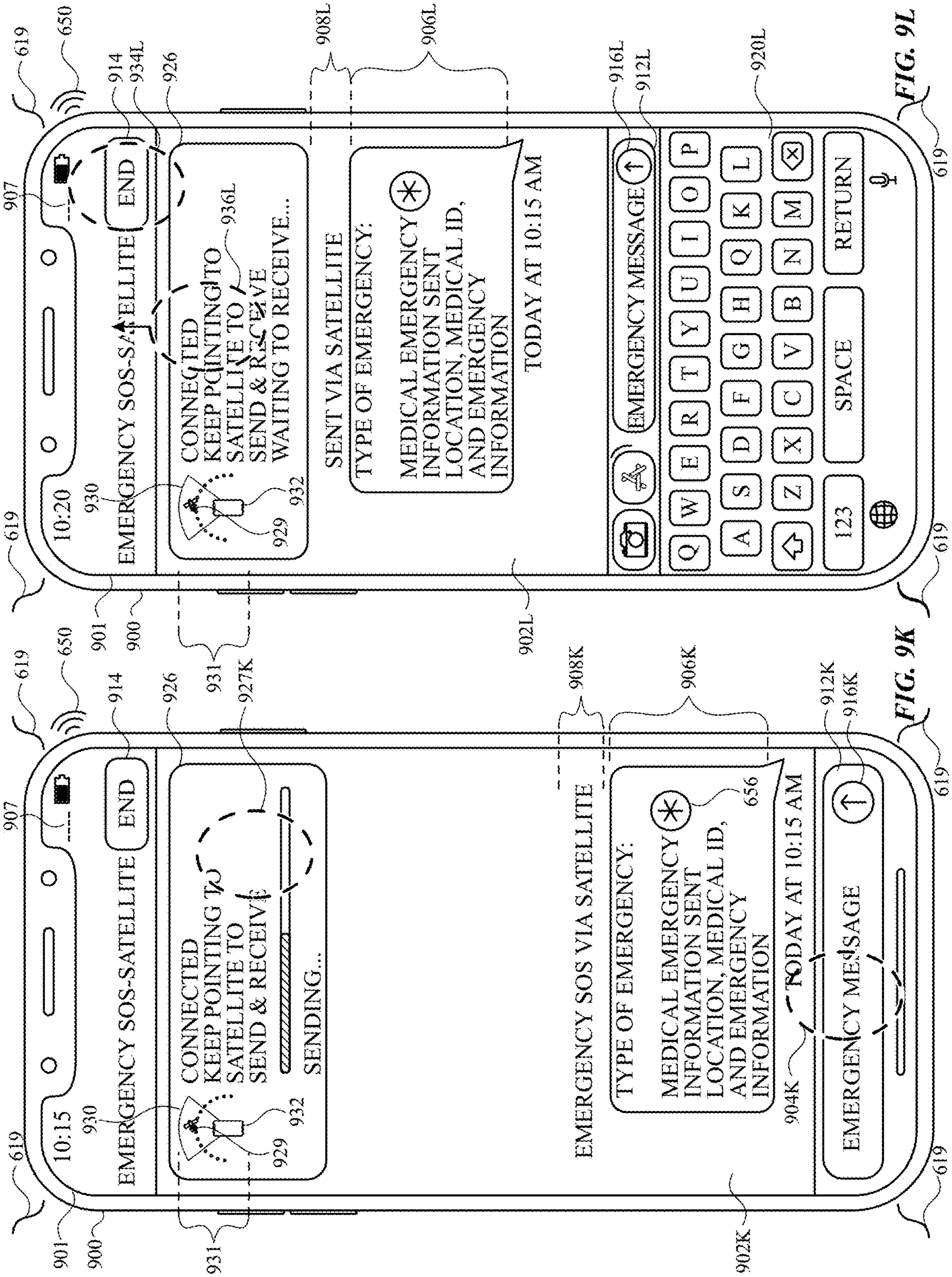
Figure 9M:
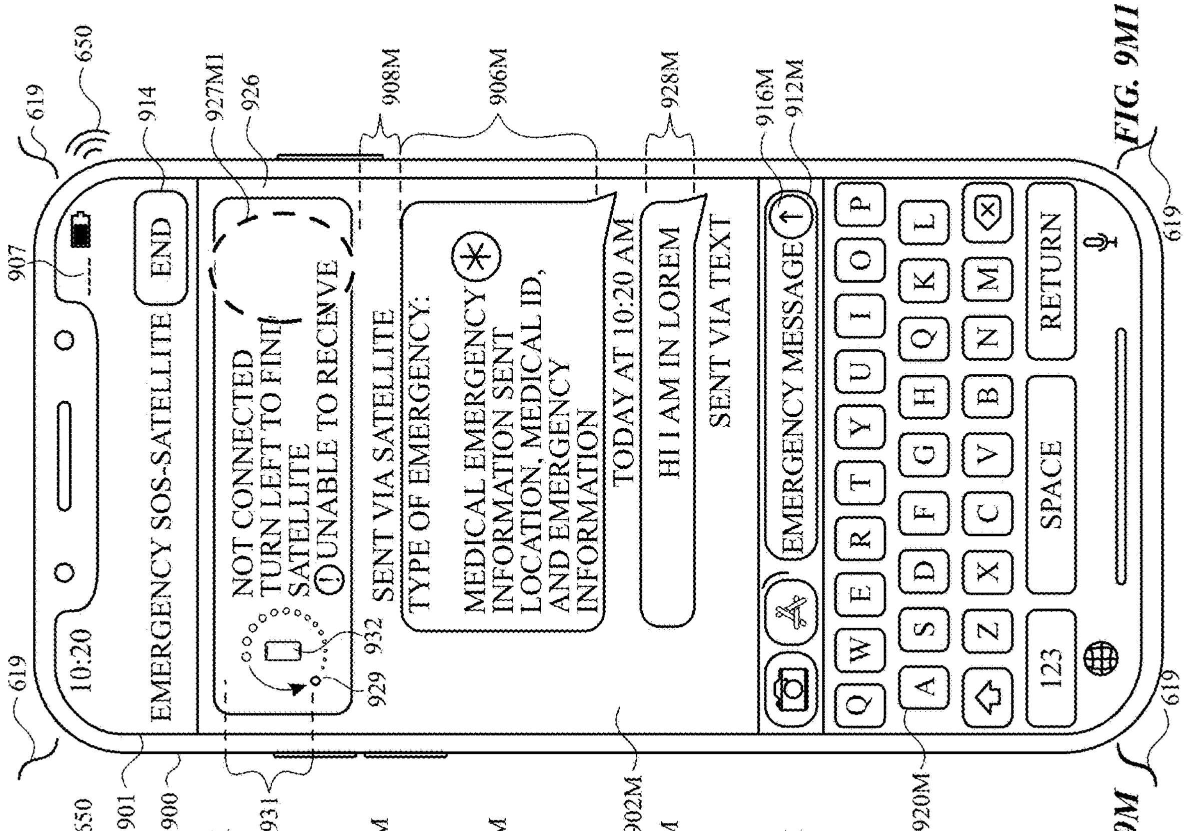
Figure 9M:
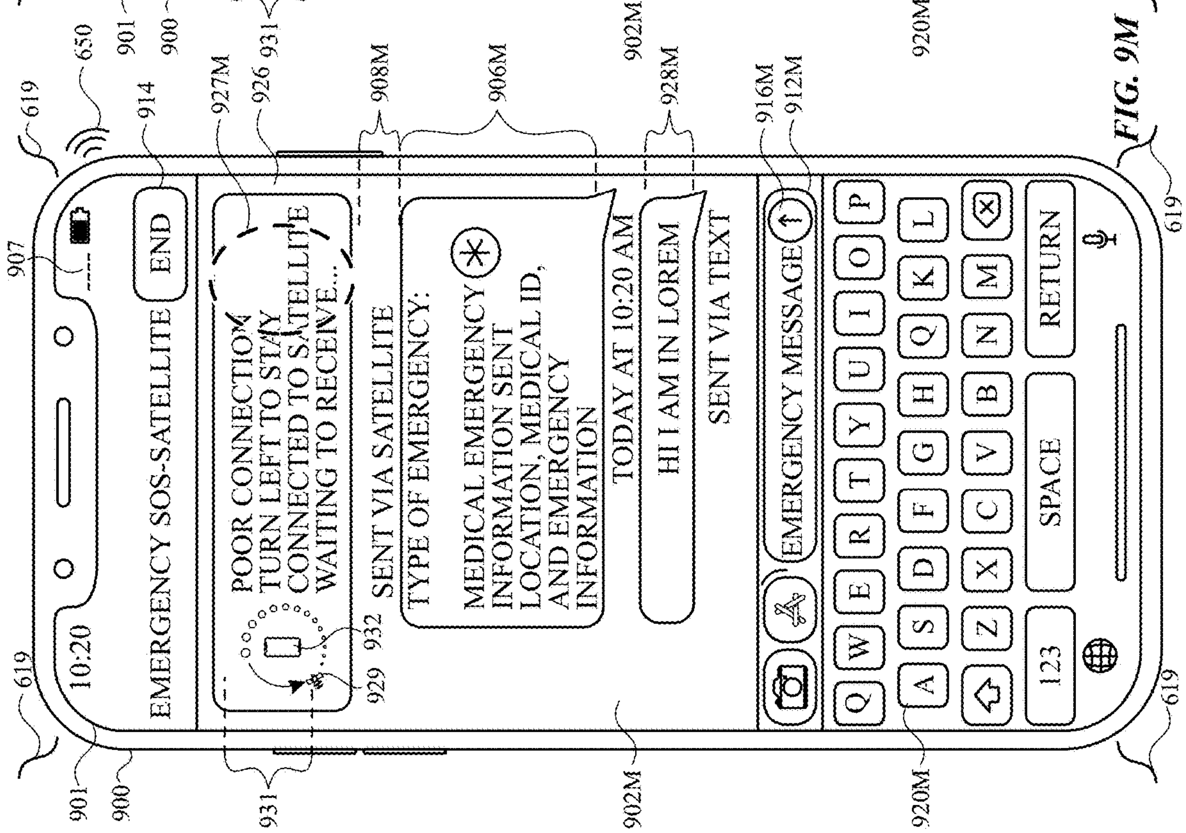
Figure 9N:
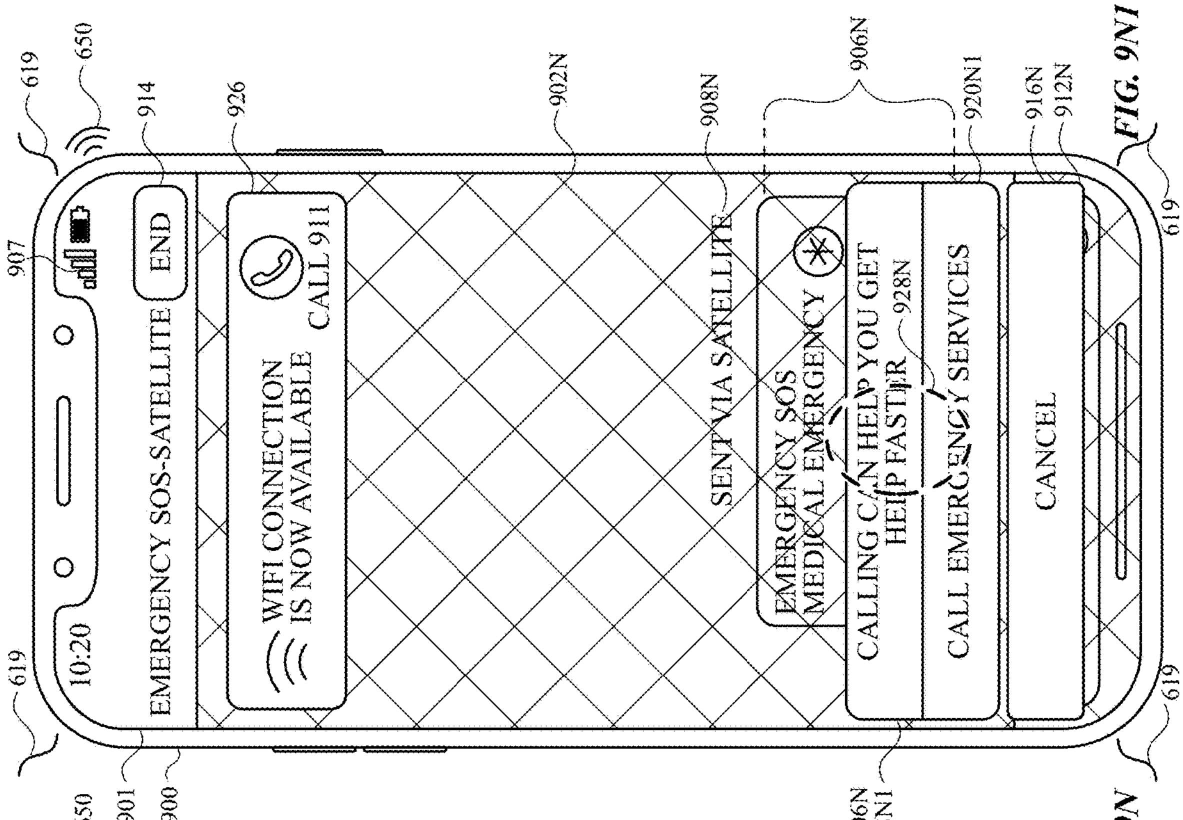
Figure 9N:
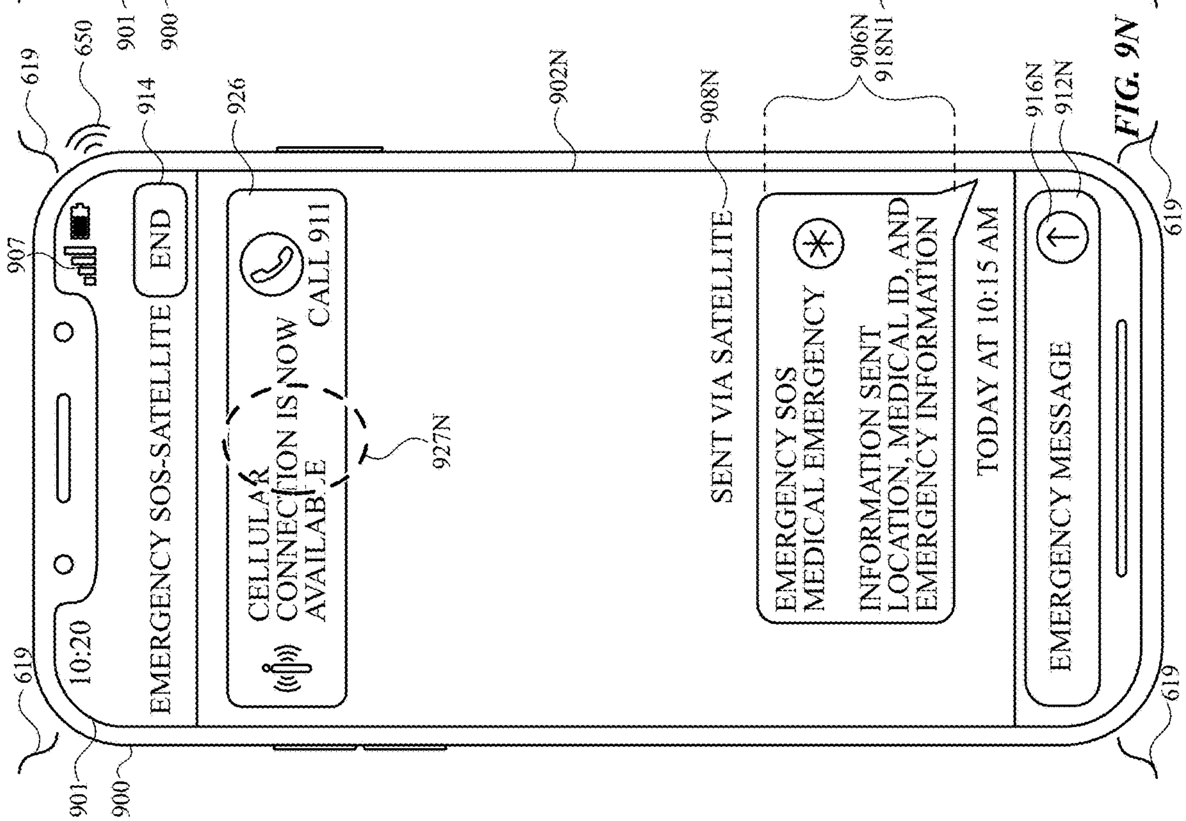
Figure 9O:
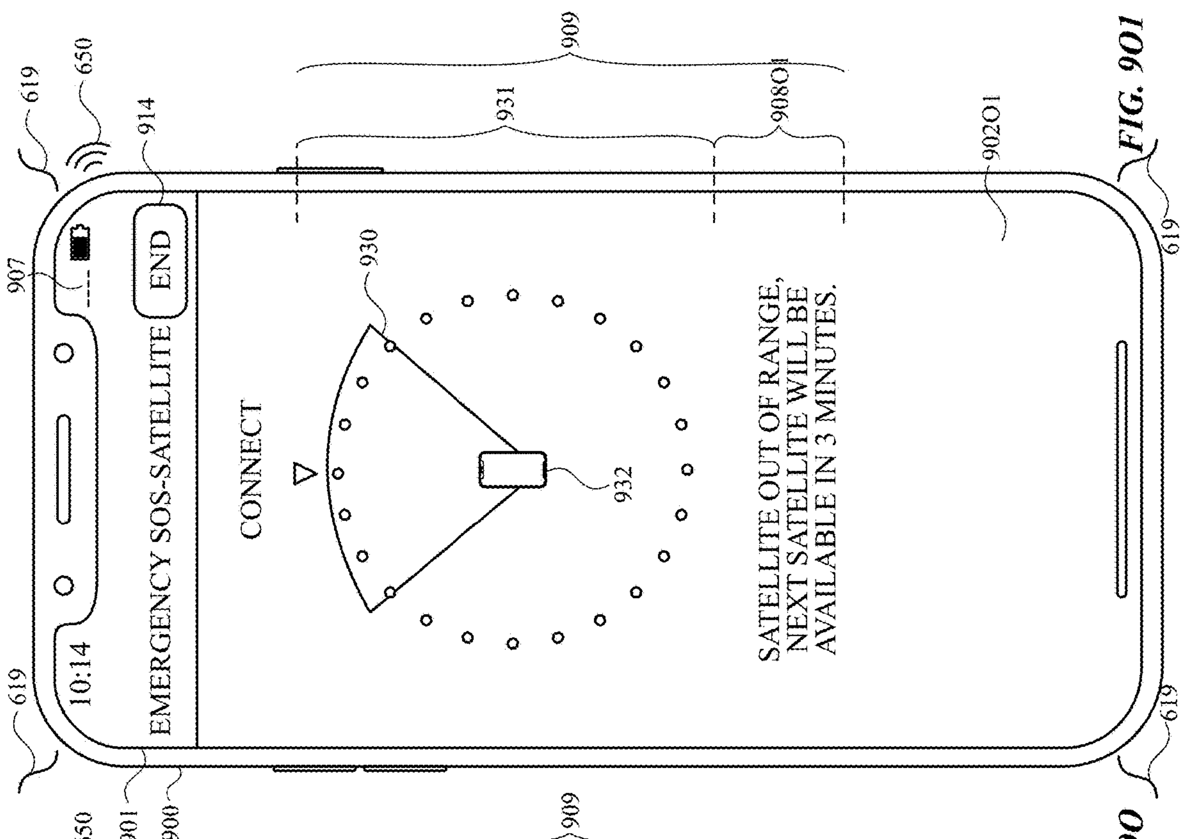
Figure 9O:
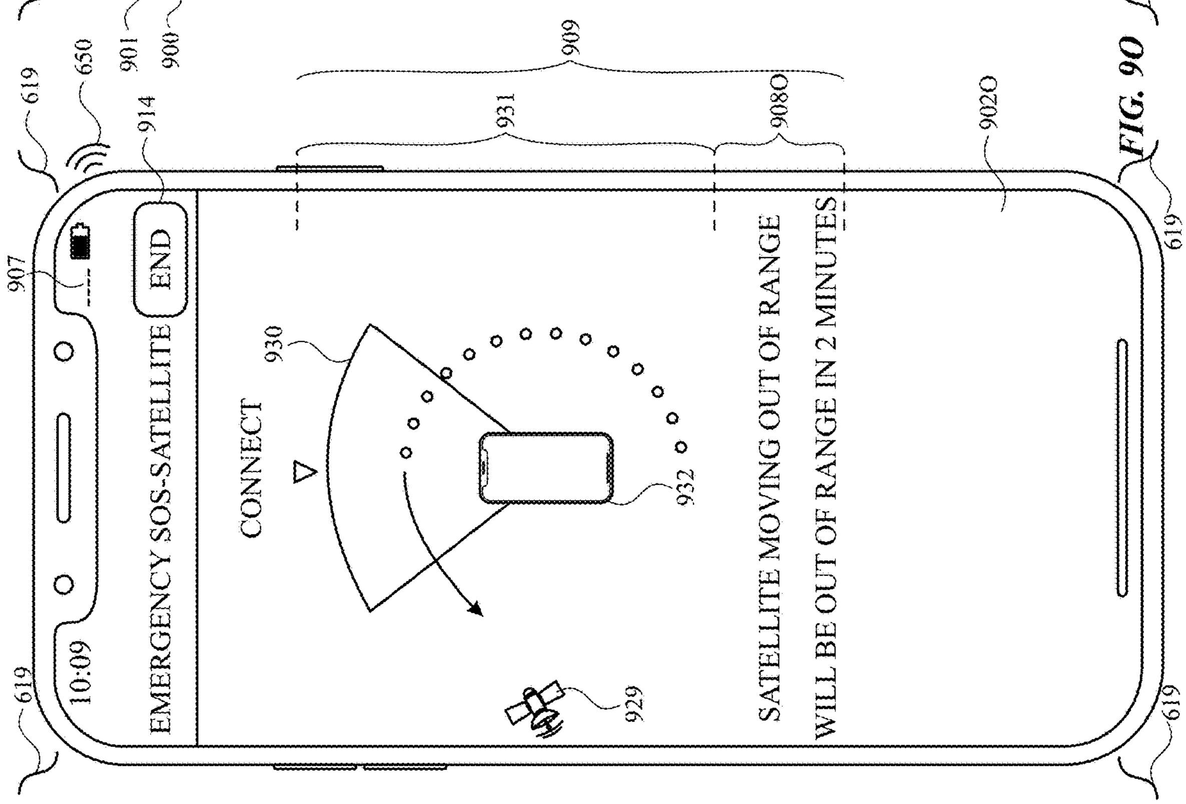
Figure 9P:
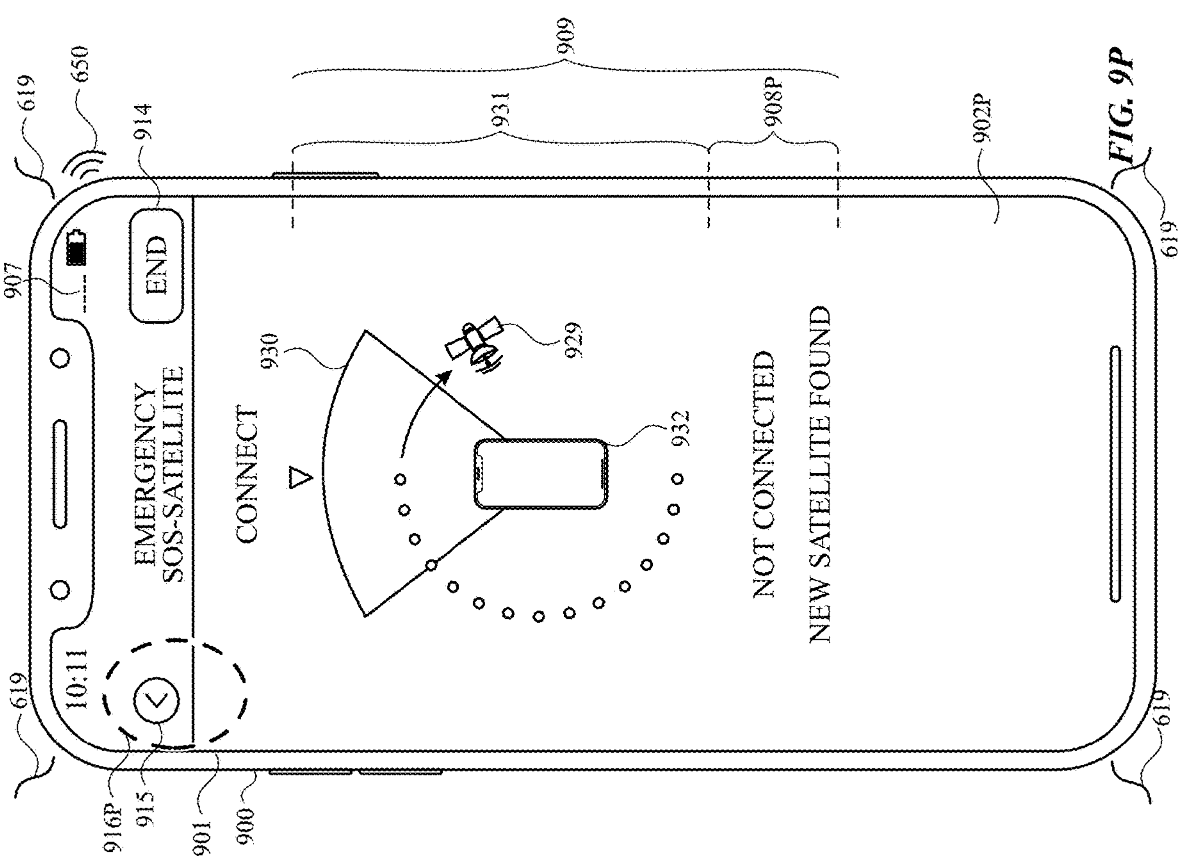
Figure 9Q:
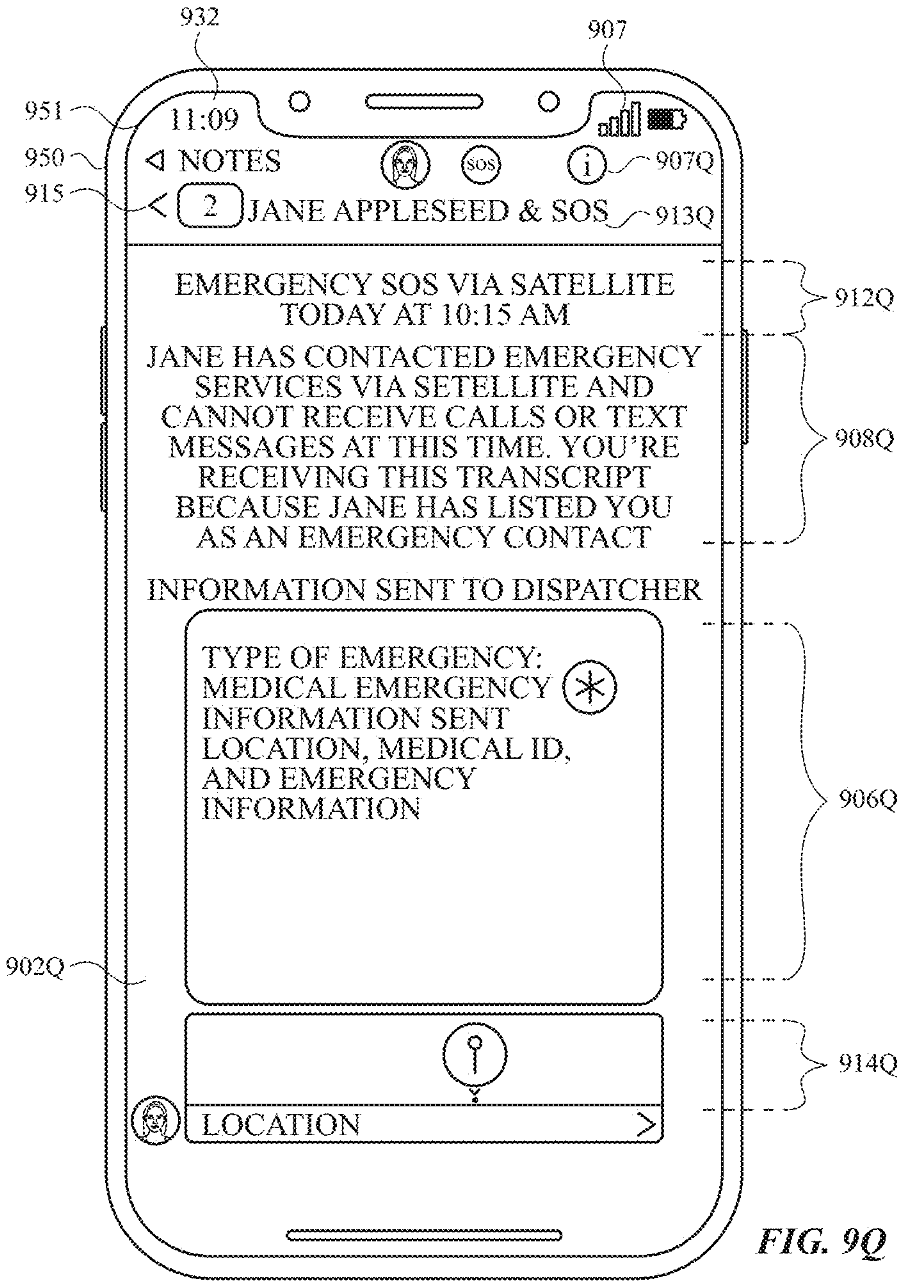
Figure 9R:
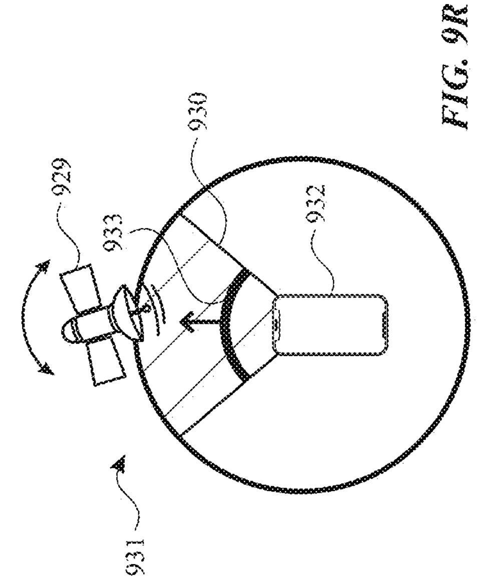
Figure 9S:
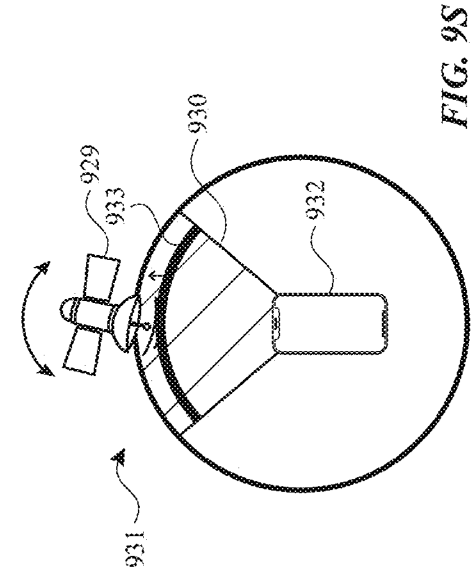
Figure 9T:
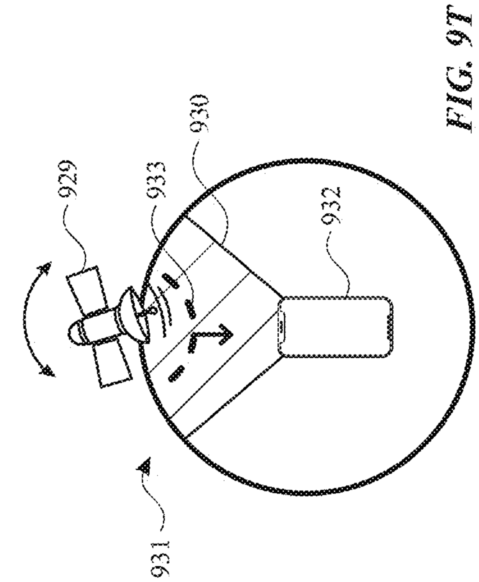
Figure 9U:
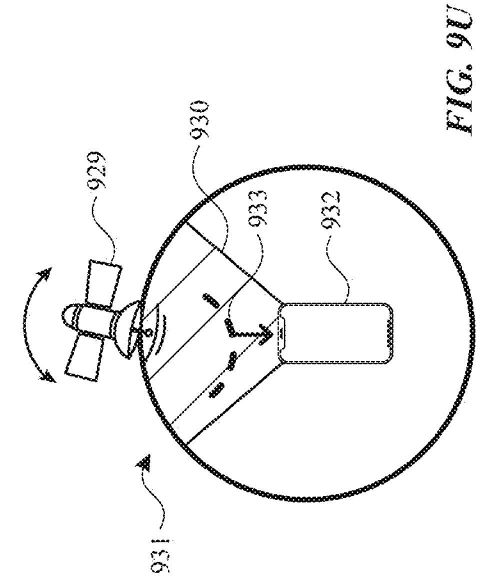
Figure 10:
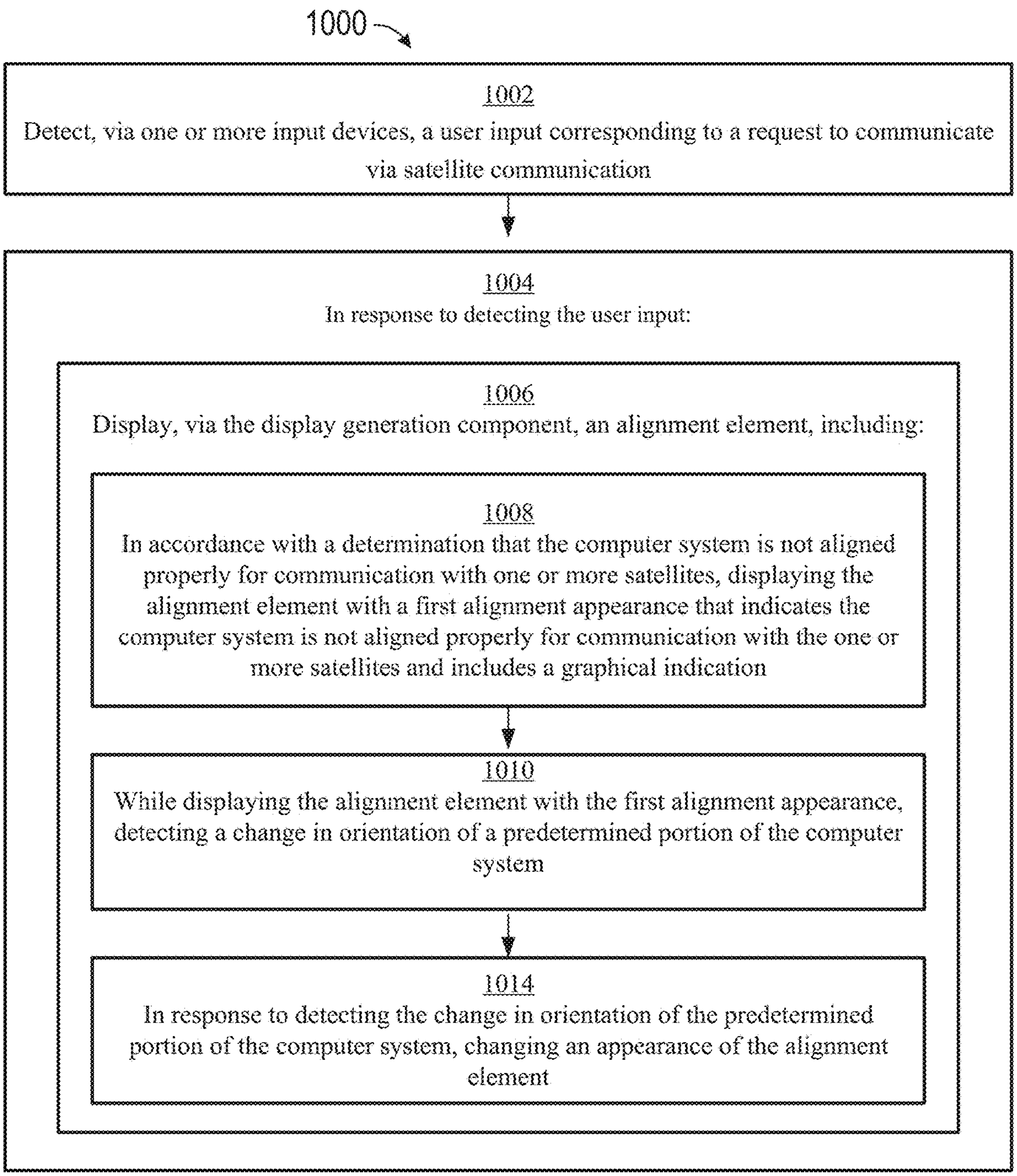
FIG. 10 is a flow diagram illustrating methods for aligning a computer system with one or more satellites, in accordance with some embodiments.

FIGS. 9A-9U illustrate exemplary user interfaces for aligning the computer system with one or more satellites, in accordance with some embodiments. FIG. 10 is a flow diagram illustrating methods for aligning a computer system with one or more satellites. The user interfaces in FIGS. 9A-9U are used to illustrate the processes described below, including the processes in FIG. 10.

Figure 11B:
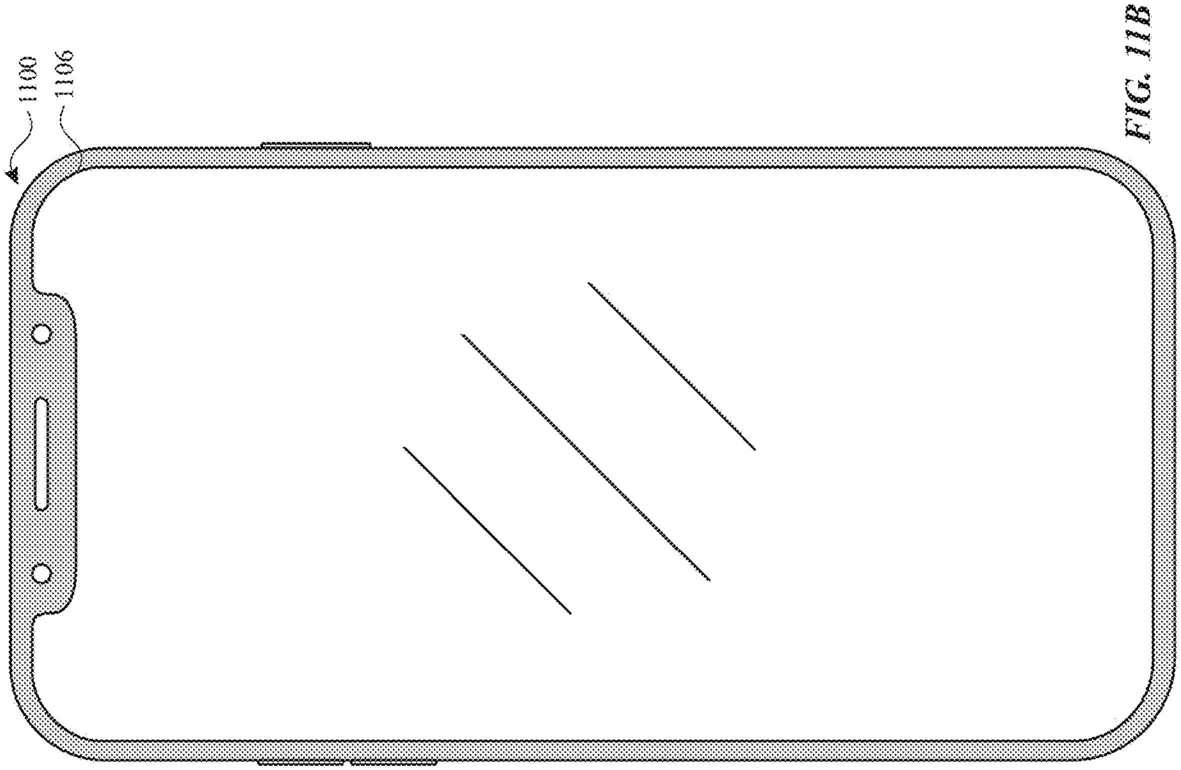
FIGS. 11A-11P illustrate exemplary user interfaces for managing recipients of messages, in accordance with some embodiments.
Figure 11A:
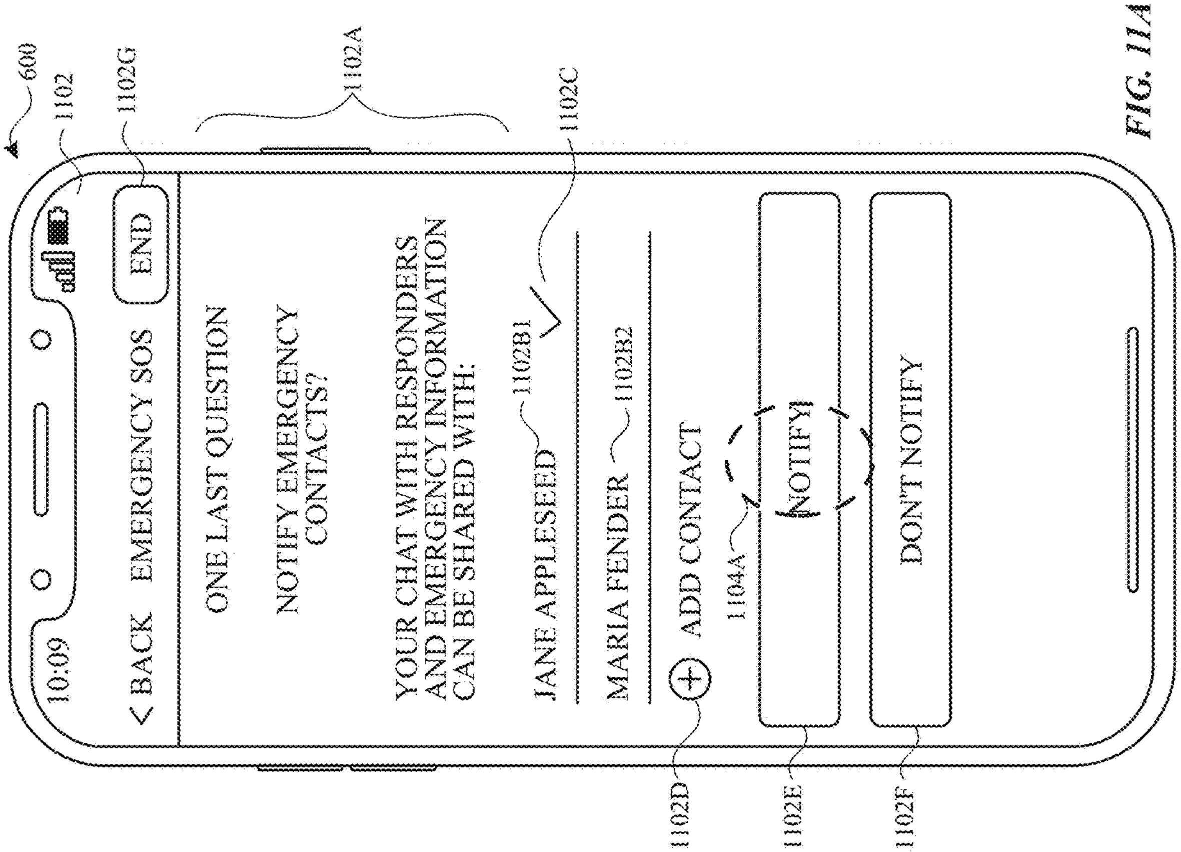
Figures 11C, 11D:
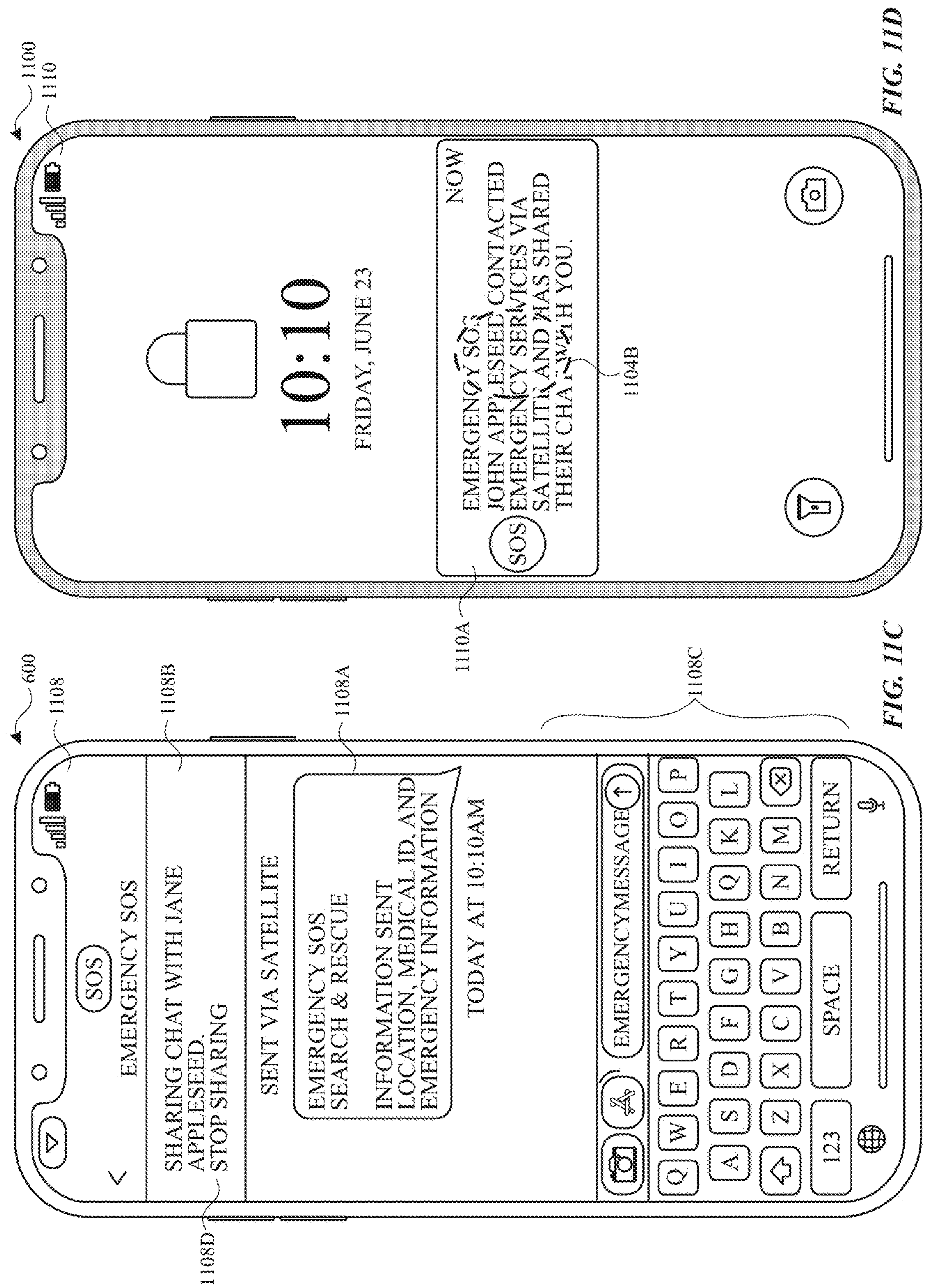
Figures 11E, 11F:
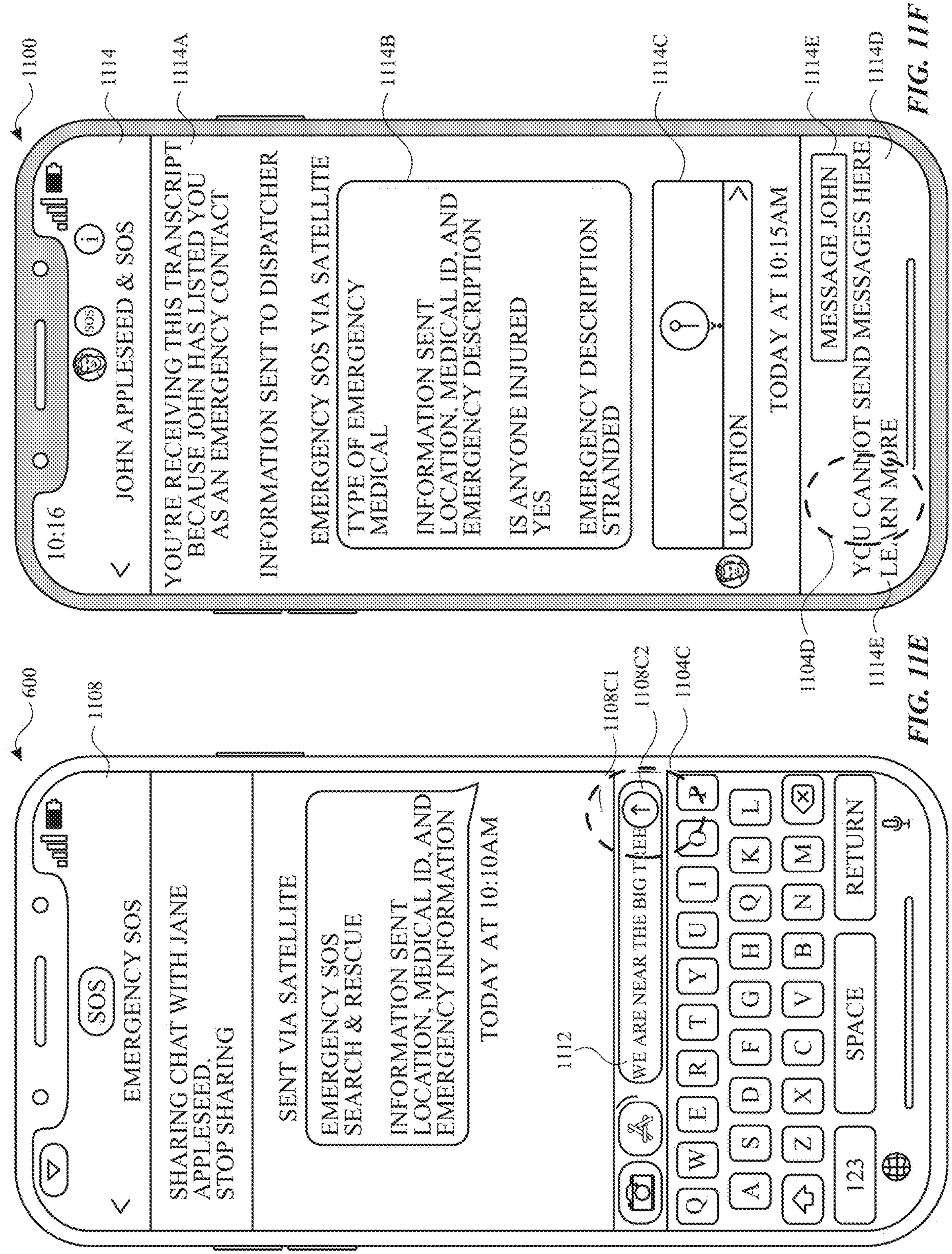
Figure 11H:
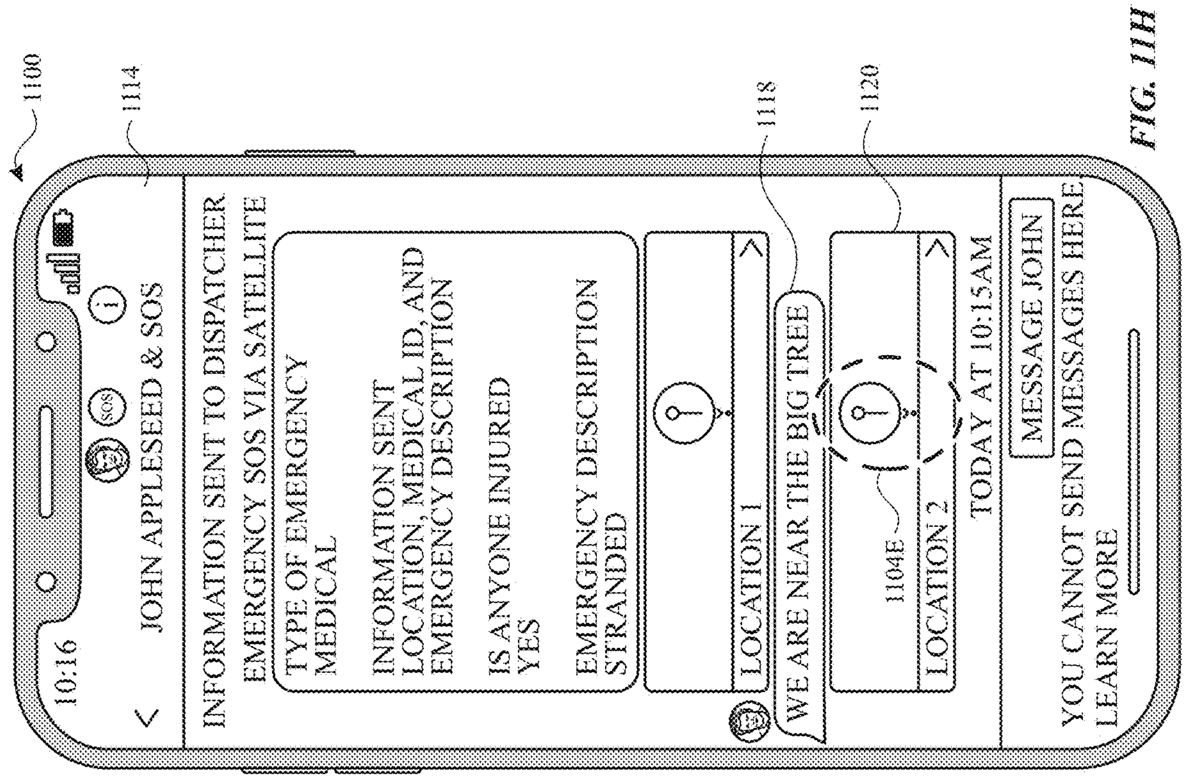
Figure 11G:
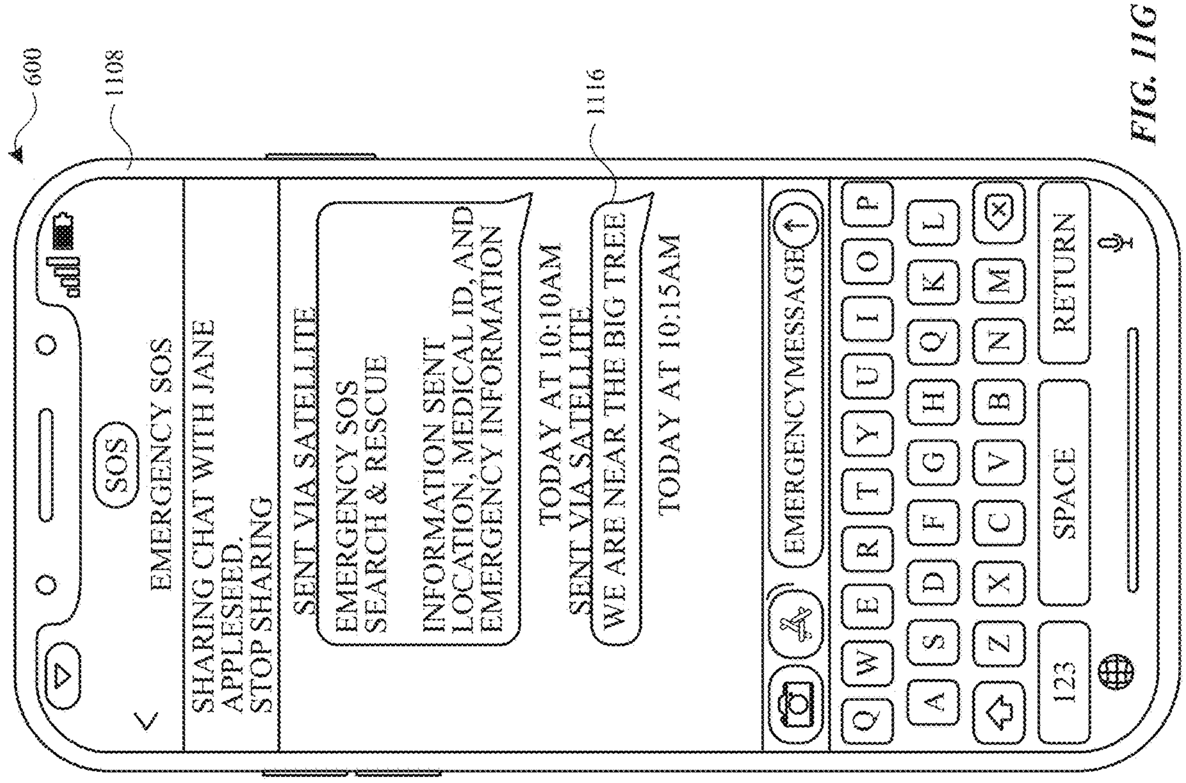
Figures 11I, 11J:
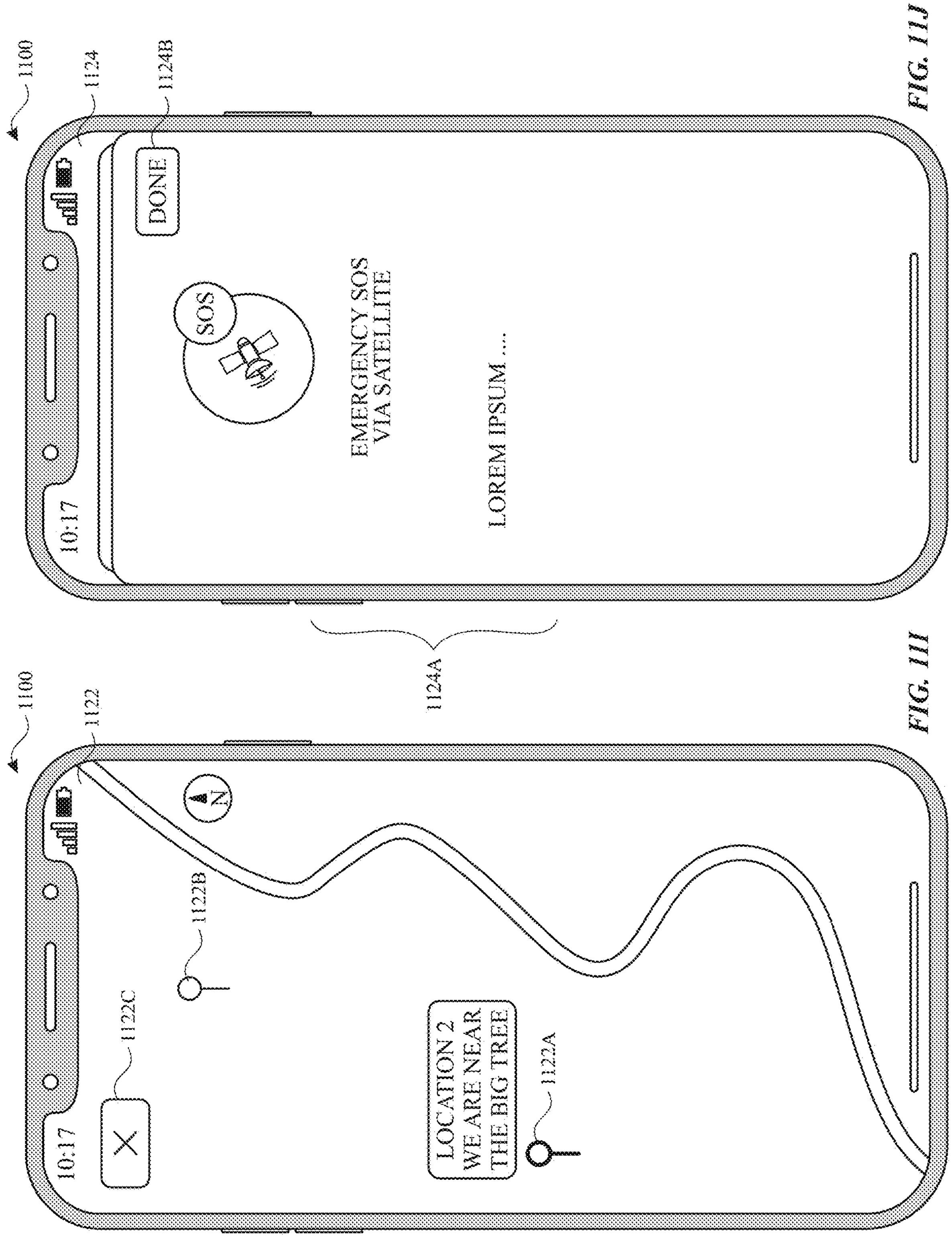
Figure 11K:
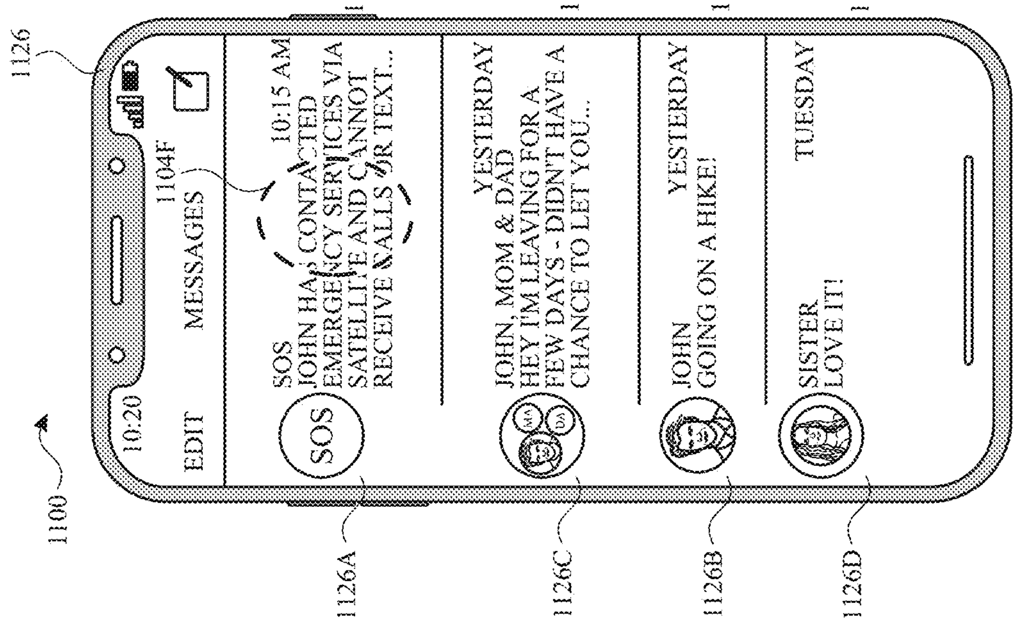
Figure 11L:
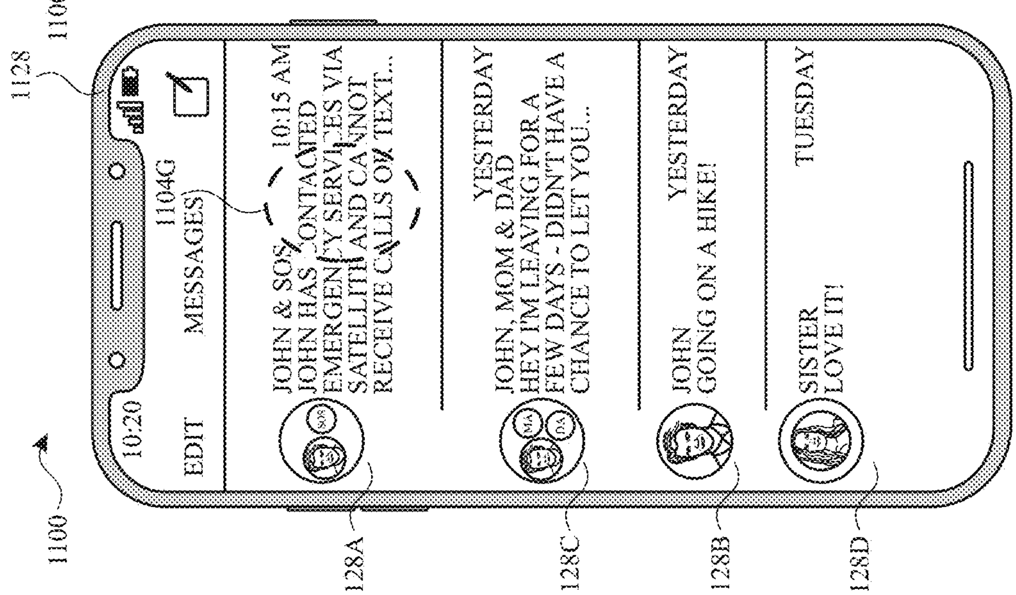
Figure 11M:
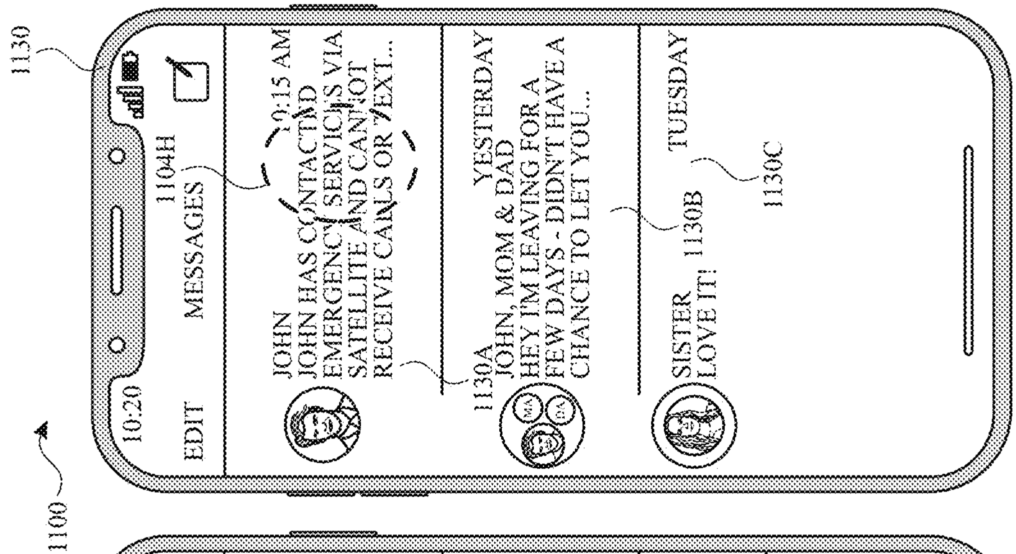
Figure 11N:
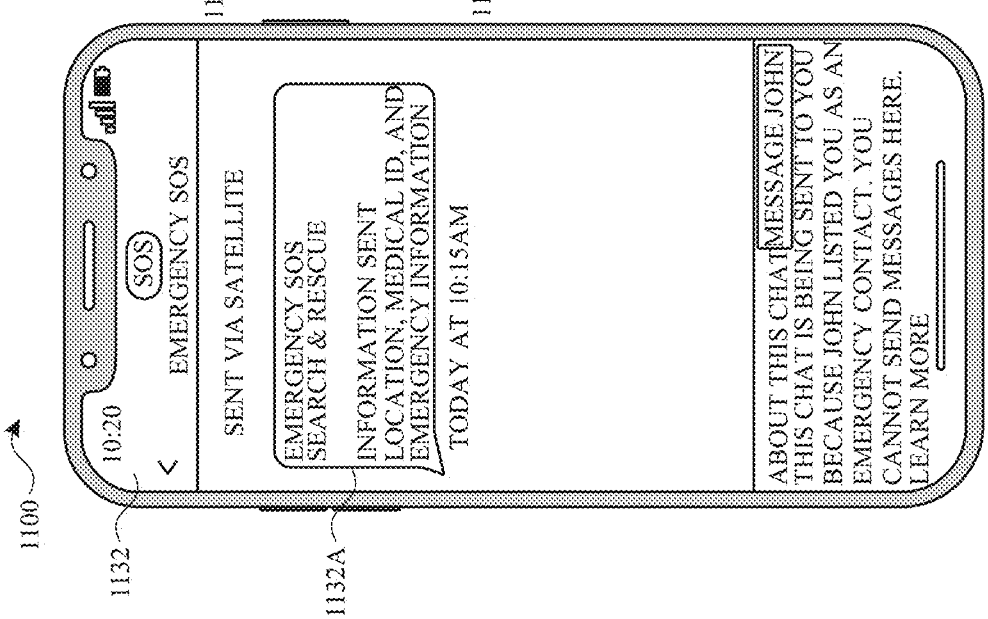
Figure 11O:
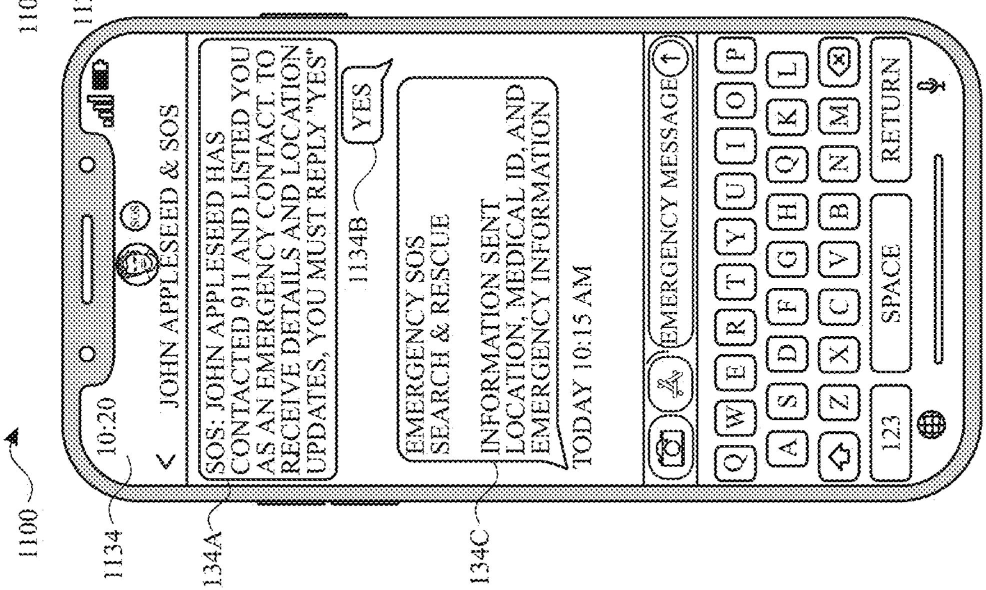
Figure 11P:
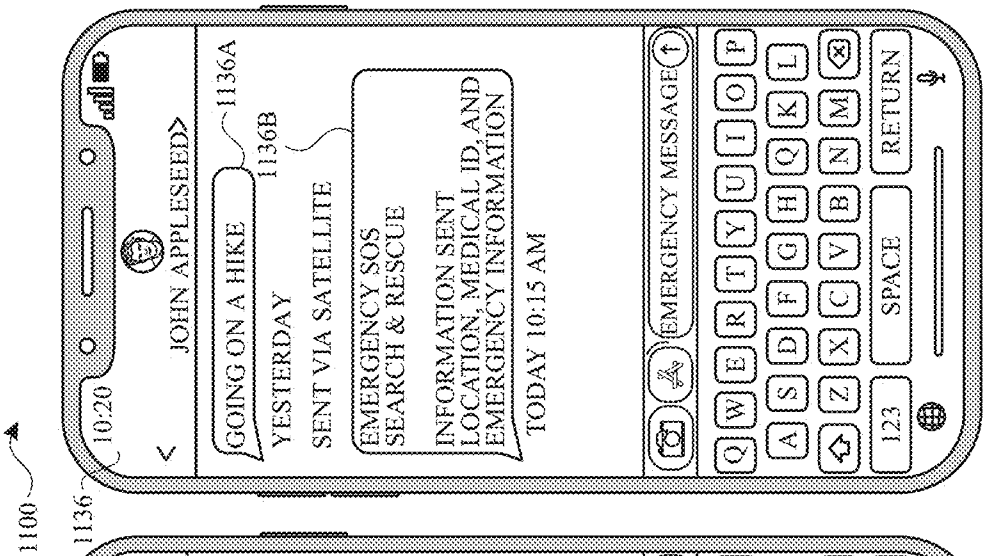
Figure 12:
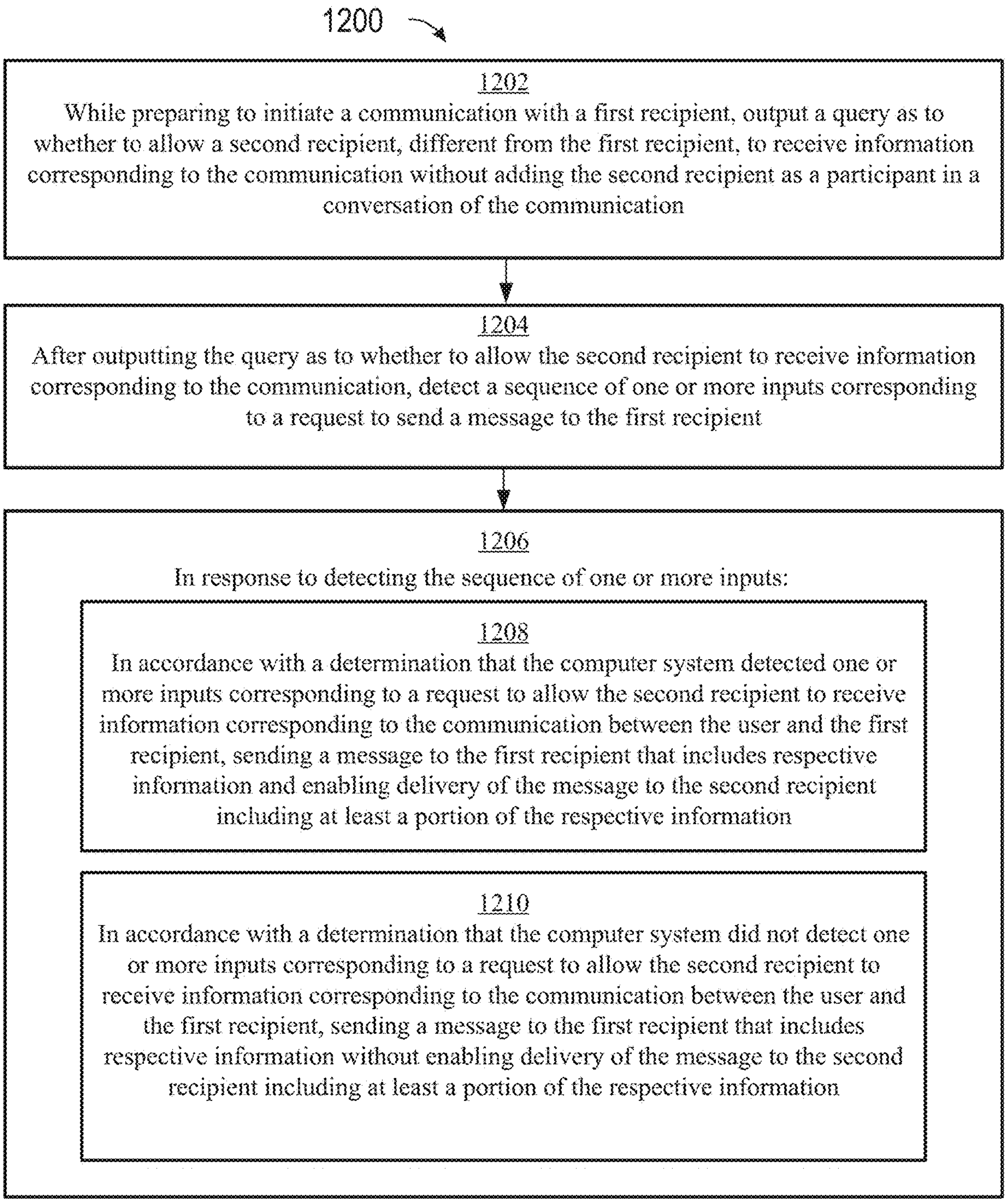
FIG. 12 is a flow diagram illustrating methods for managing recipients of messages, in accordance with some embodiments.

FIGS. 11A-11P illustrate exemplary user interfaces for managing recipients of messages, in accordance with some embodiments. FIG. 12 is a flow diagram illustrating methods for managing recipients of messages. The user interfaces in FIGS. 11A-11P are used to illustrate the processes described below, including the processes in FIG. 12.

Figure 13A:
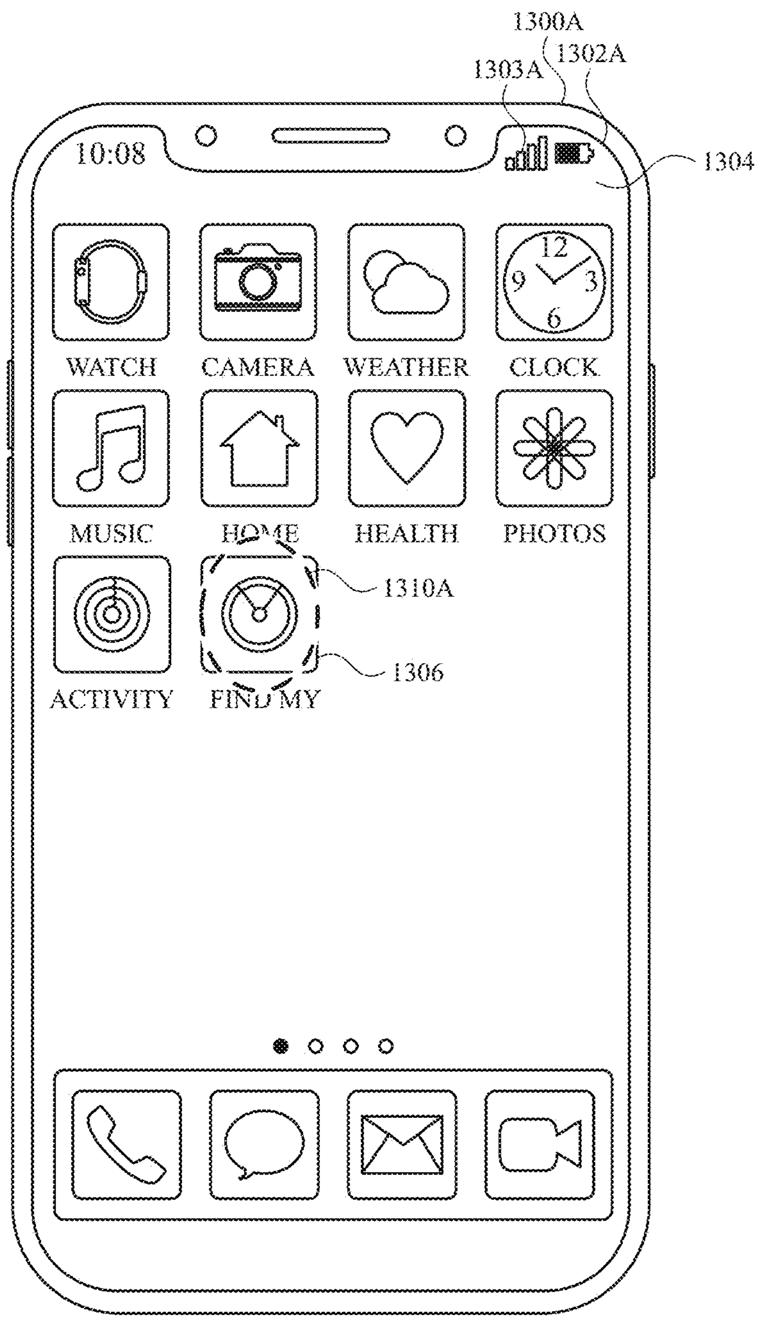
FIGS. 13A-13AA illustrate exemplary user interfaces for transmitting updated location information, in accordance with some embodiments.
Figure 14:
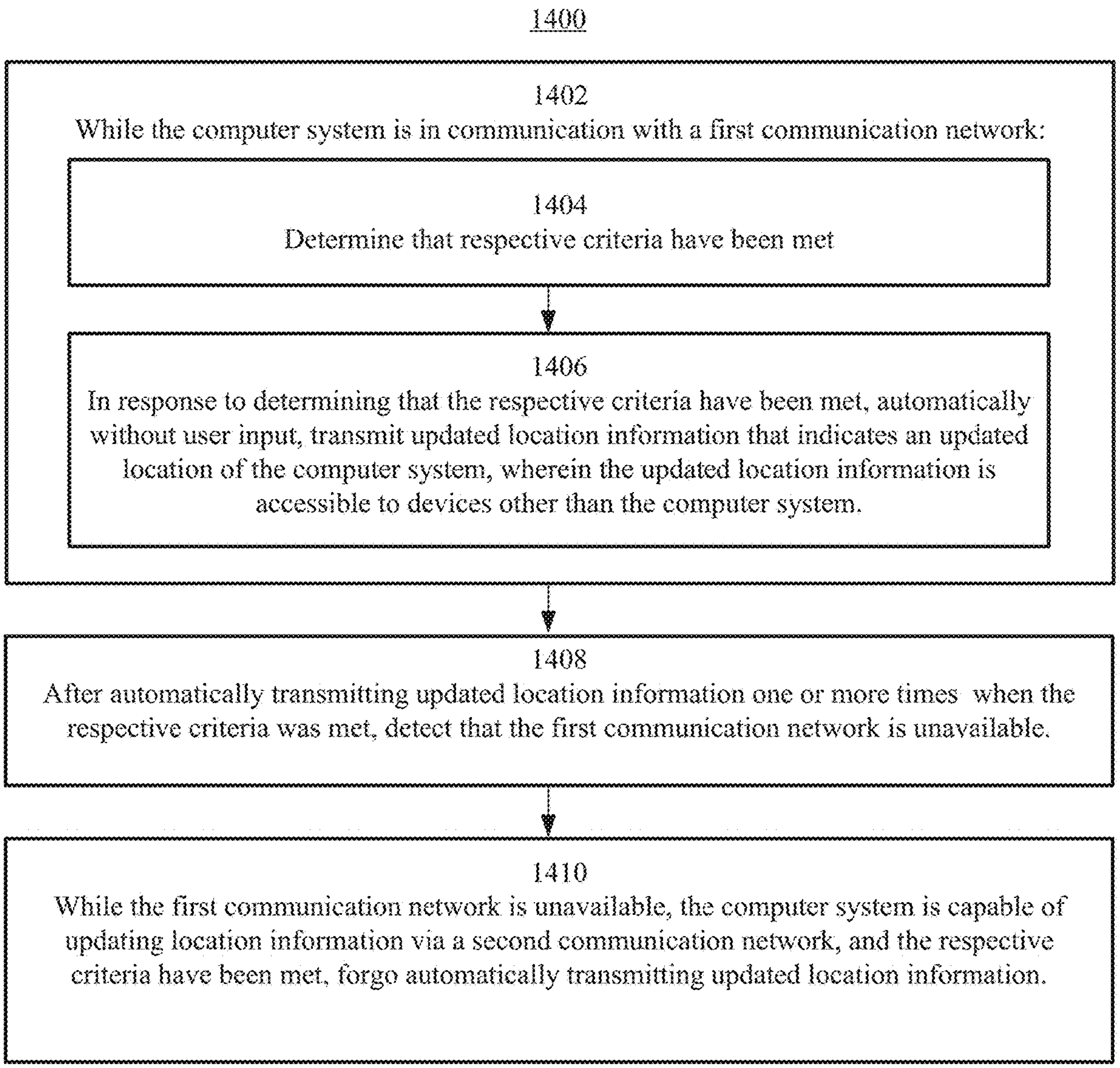
FIG. 14 is a flow diagram illustrating methods for transmitting updated location information, in accordance with some embodiments.

FIGS. 13A-13AA illustrate exemplary user interfaces for transmitting updated location information, in accordance with some embodiments. FIG. 14 is a flow diagram illustrating methods for transmitting updated location information. The user interfaces in FIGS. 13A-13AA are used to illustrate the processes described below, including the processes in FIG. 14.

Figure 15A:
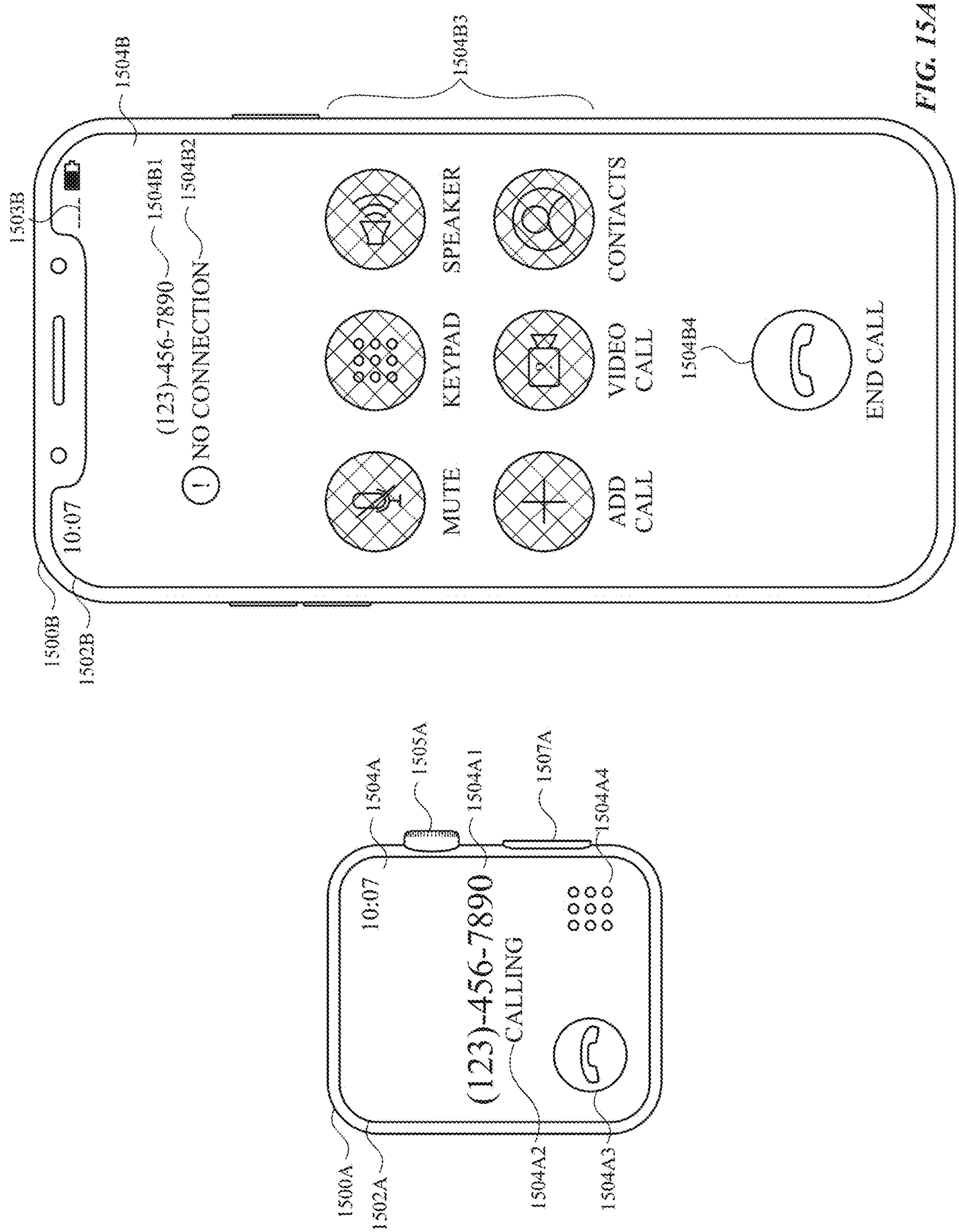
FIGS. 15A-15AF illustrate exemplary user interfaces for initiating a communication, in accordance with some embodiments.
Figure 16:
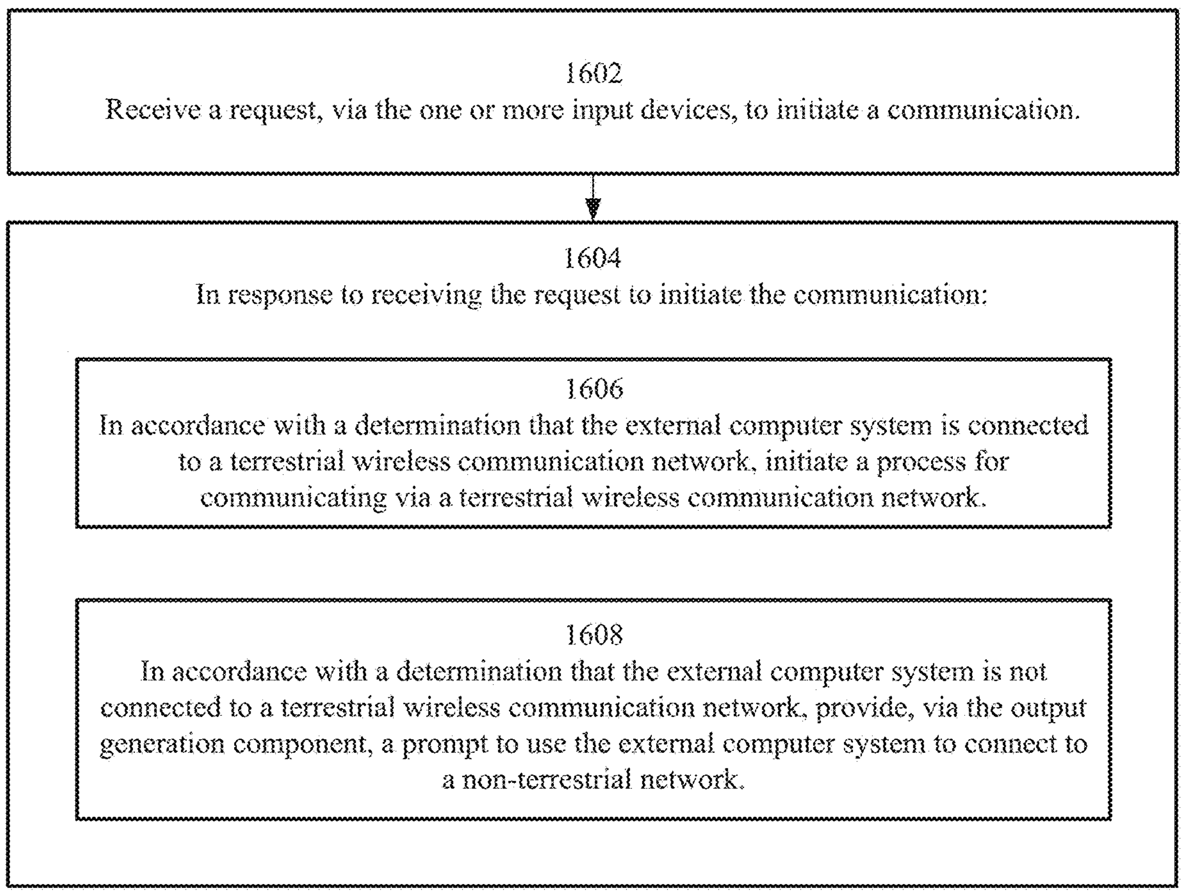
FIG. 16 is a flow diagram illustrating methods for initiating a communication, in accordance with some embodiments.

FIGS. 15A-15AF illustrate exemplary user interfaces for initiating a communication, in accordance with some embodiments. FIG. 16 is a flow diagram illustrating methods for initiating a communication. The user interfaces in FIGS. 15A-15AF are used to illustrate the processes described below, including the processes in FIG. 16.

Figure 17B:
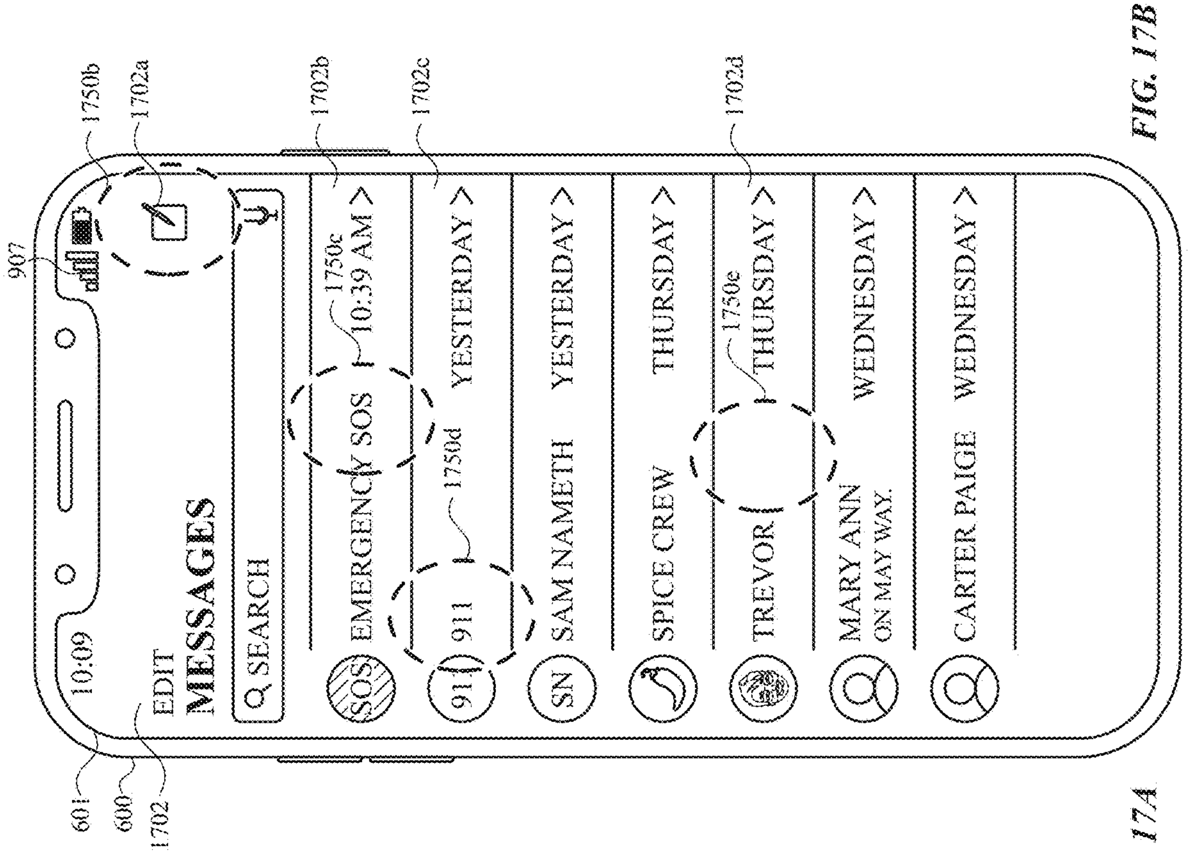
FIGS. 17A-17R illustrate exemplary user interfaces for initiating communication via an alternative communication network, in accordance with some embodiments.
Figure 17A:
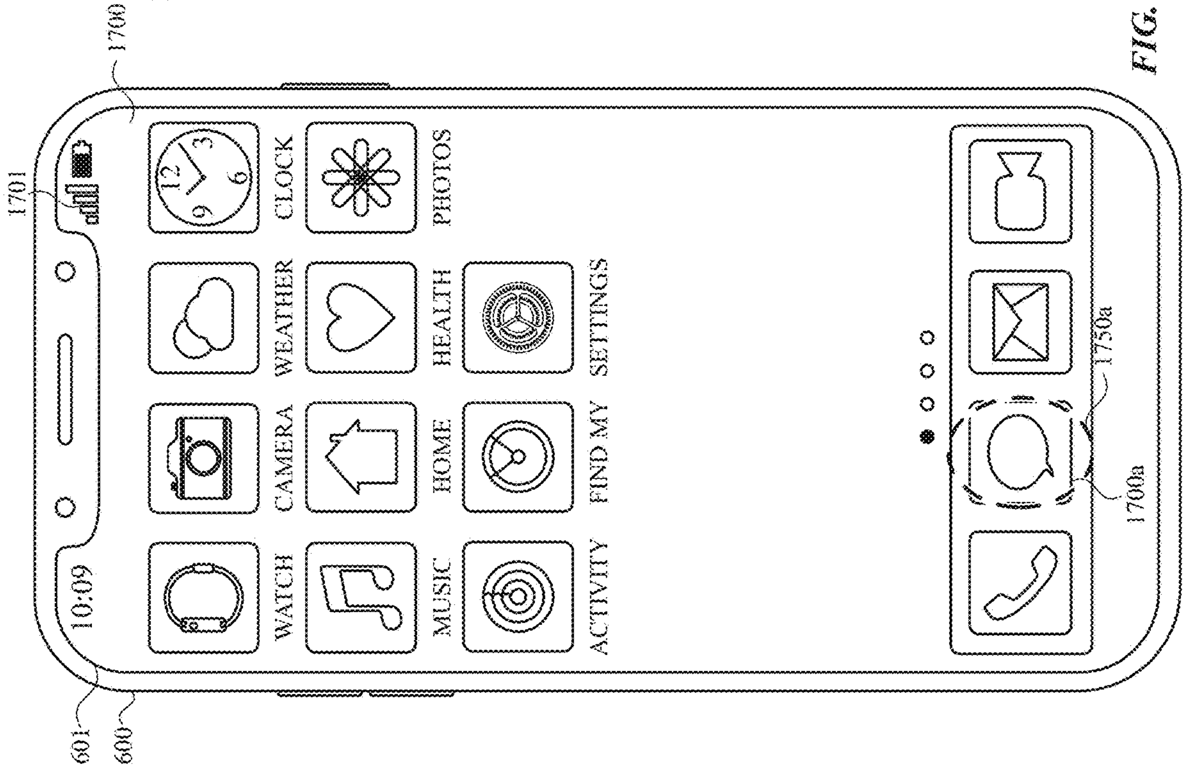
Figure 17D:
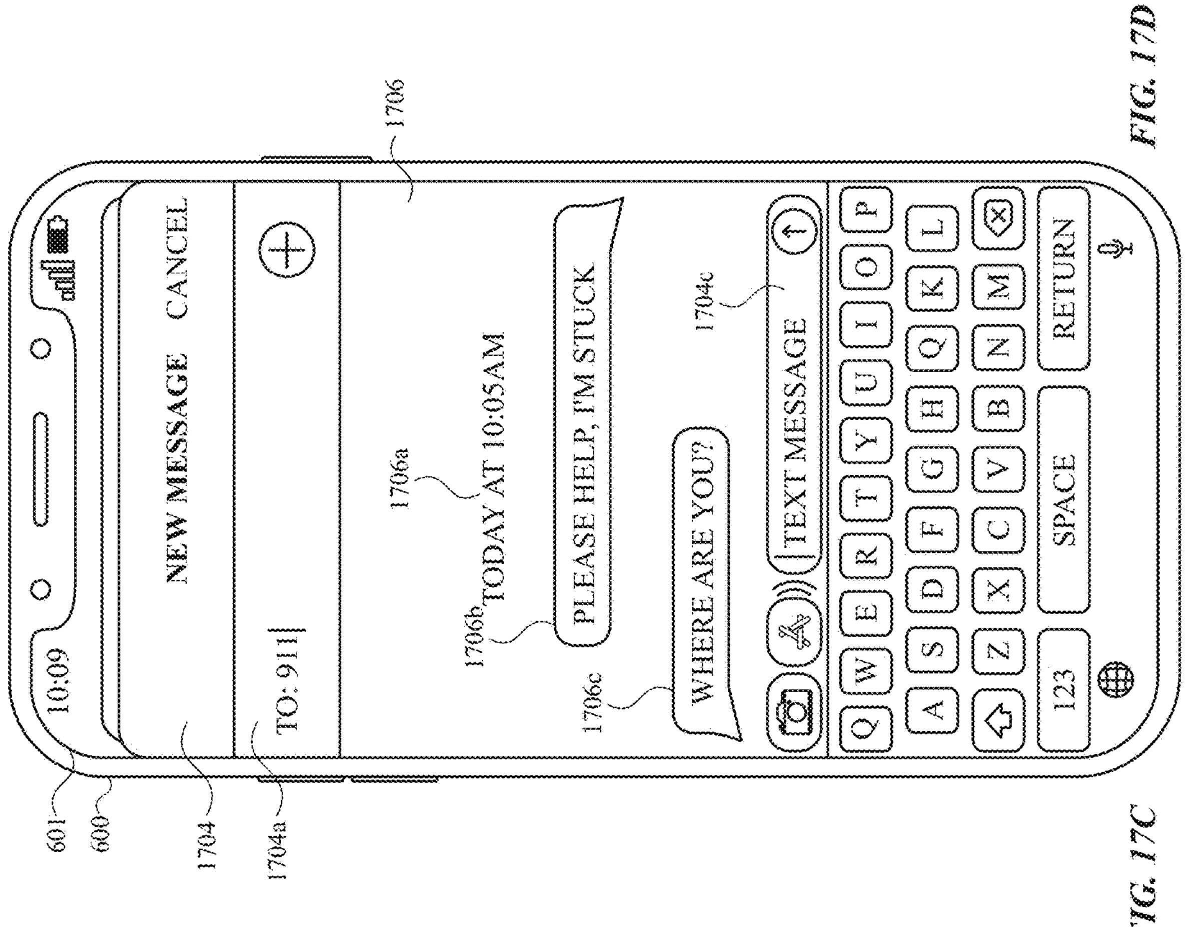
Figure 17C:
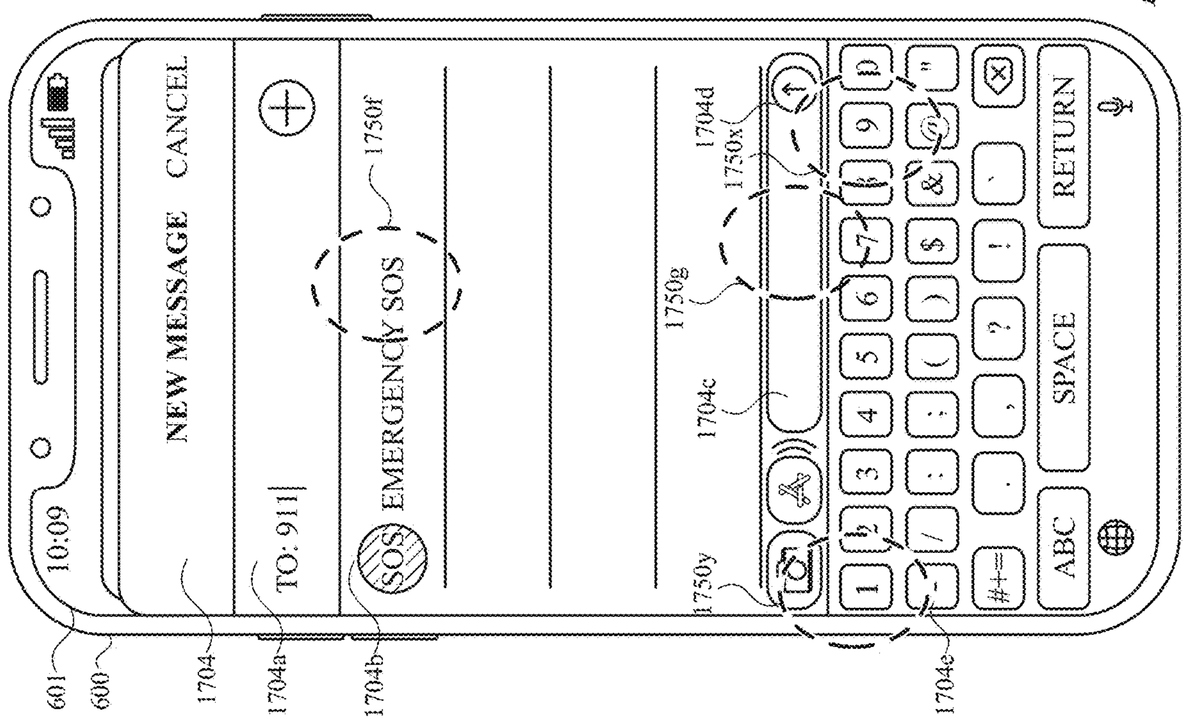
Figure 17F:
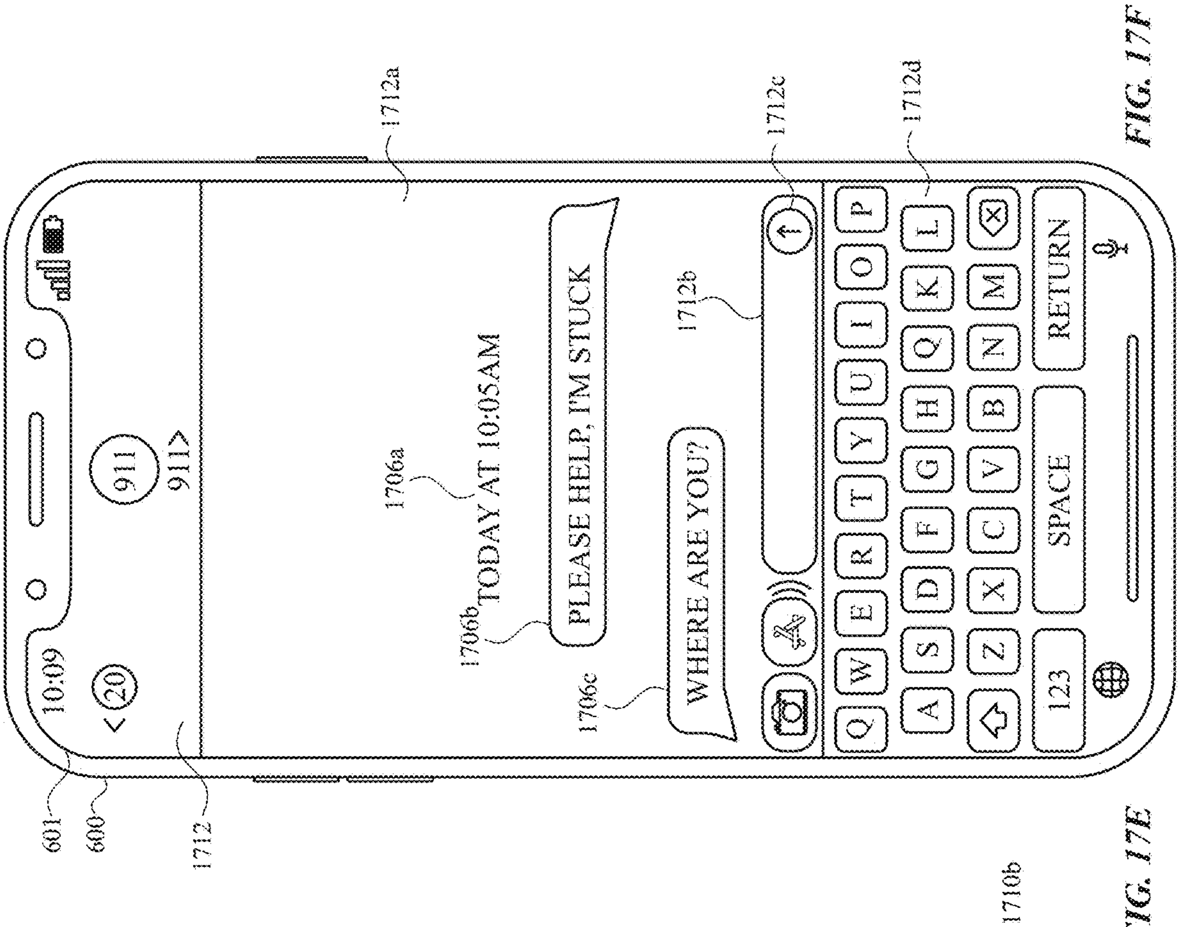
Figure 17E:
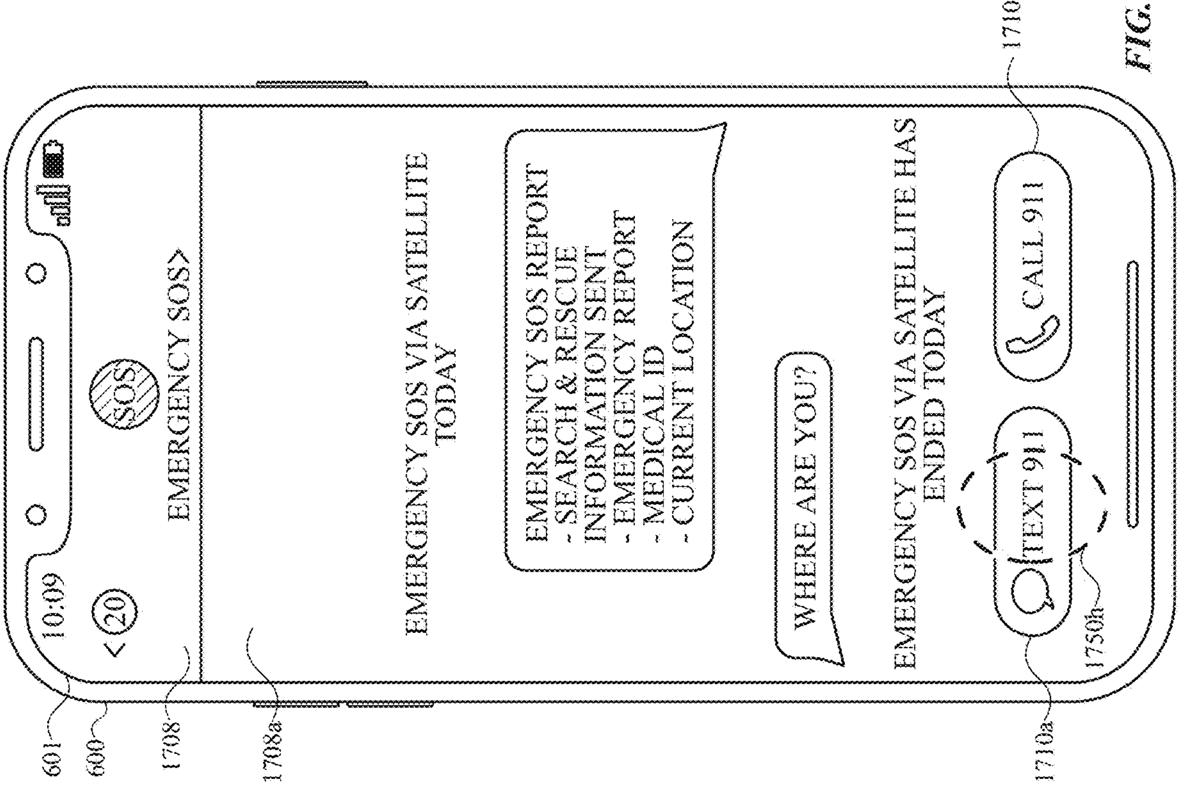
Figure 17G:
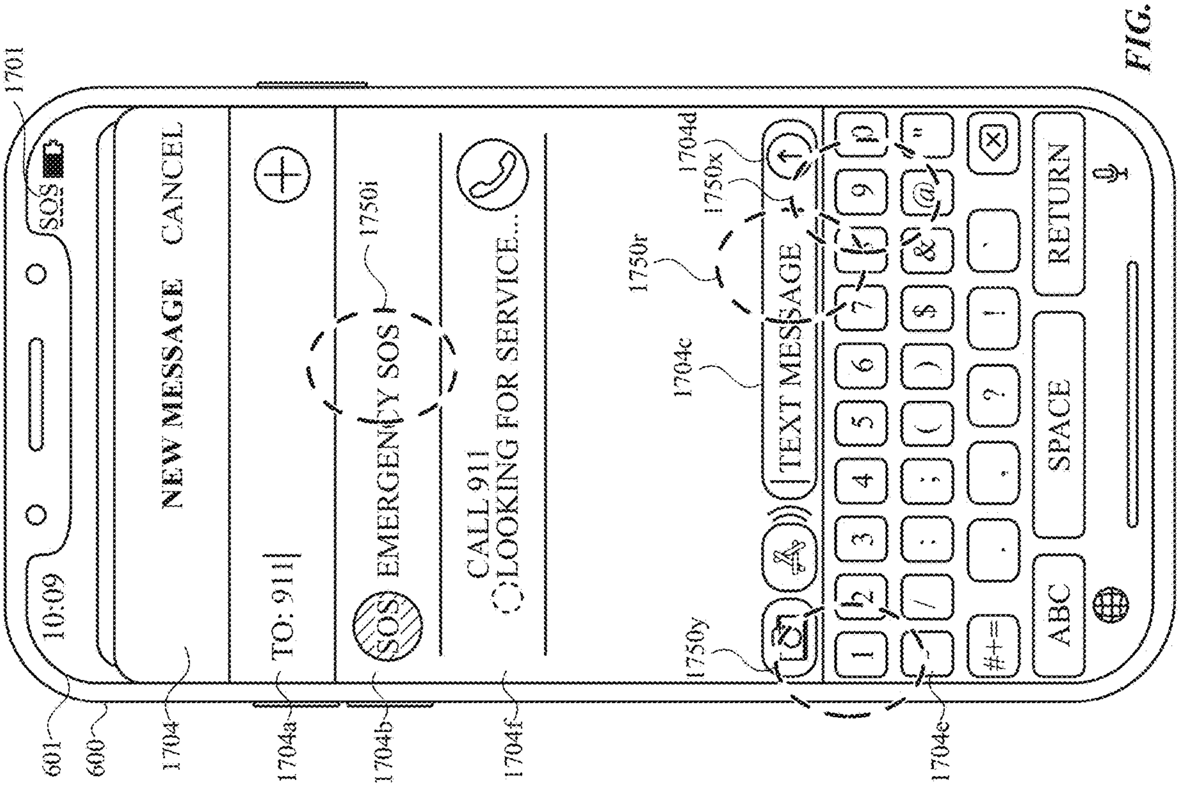
Figure 17H:
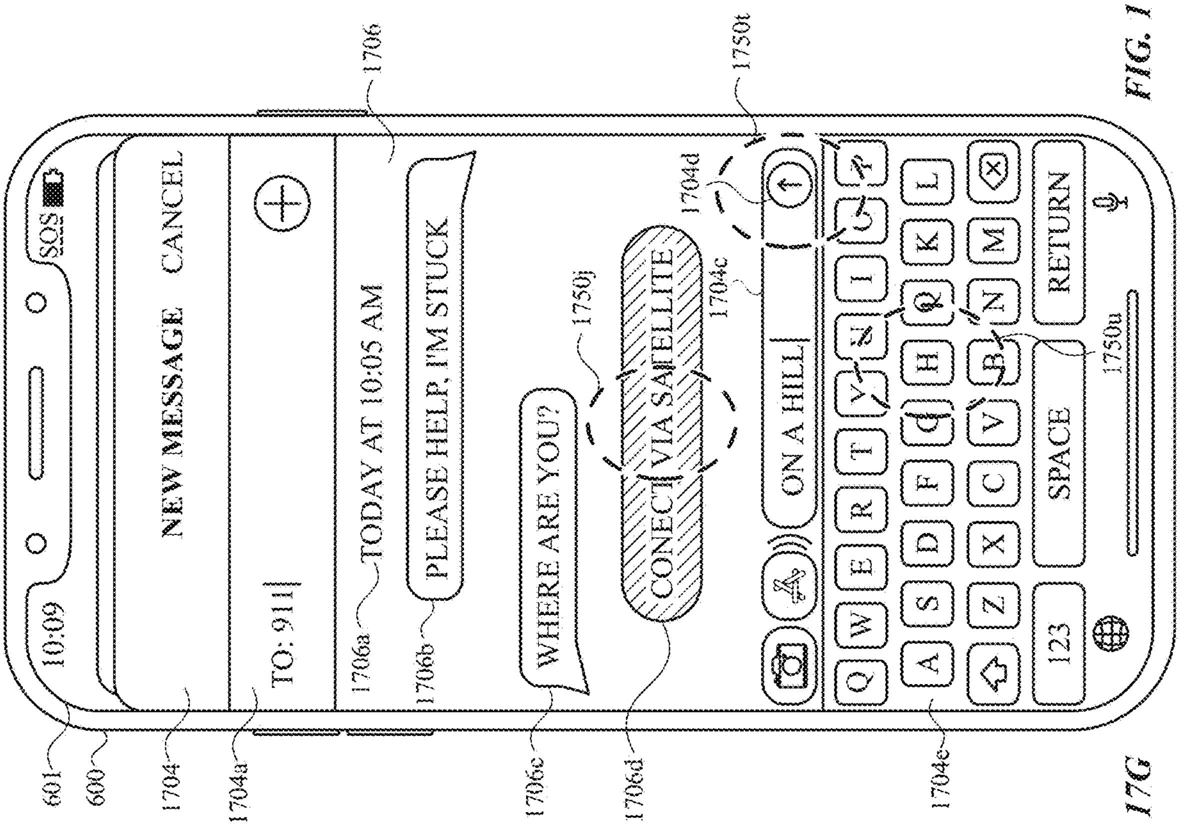
Figure 17J:
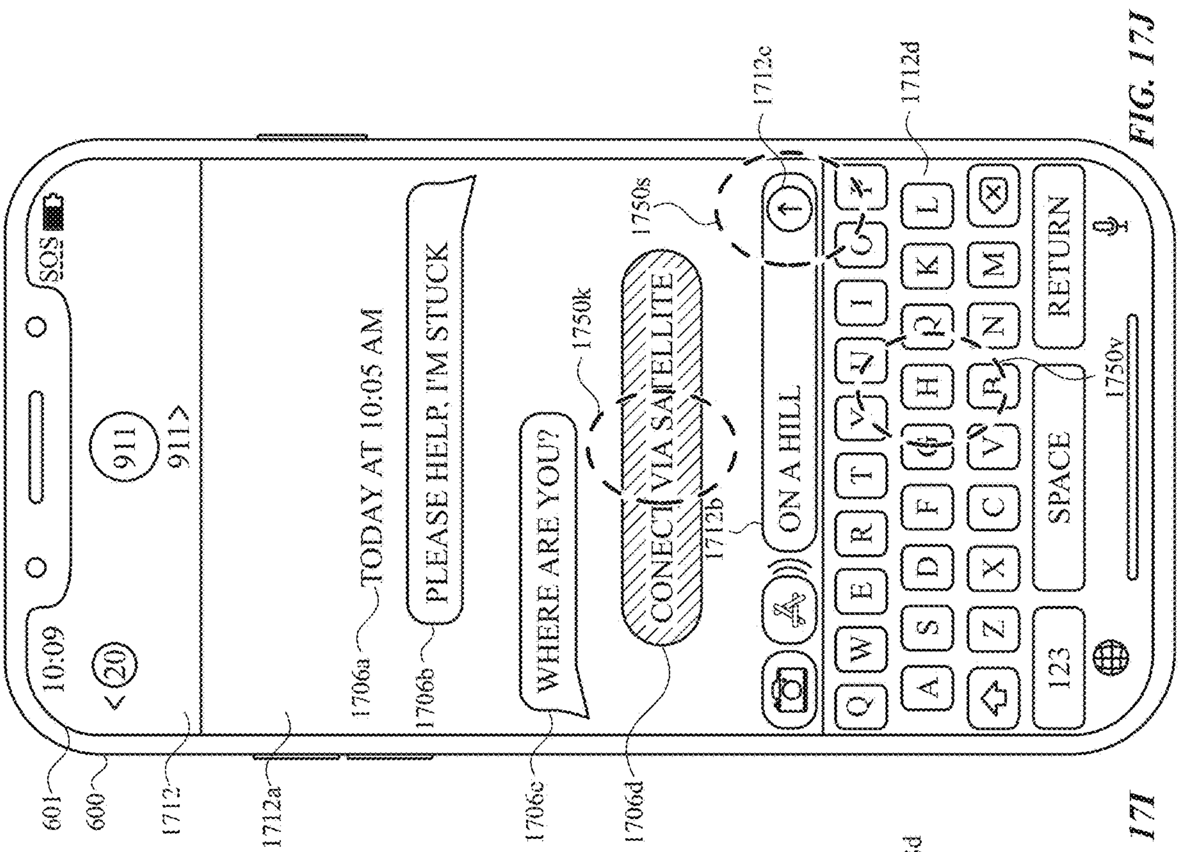
Figure 17I:
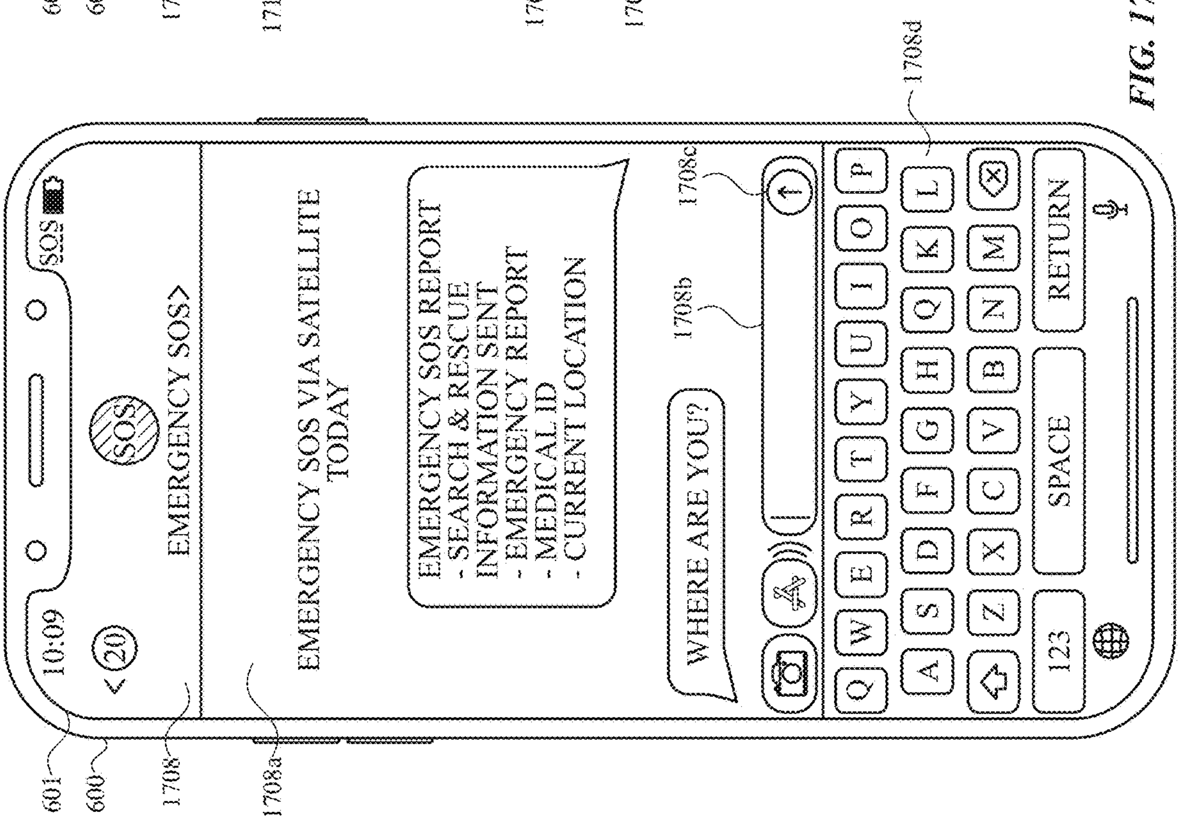
Figure 17L:
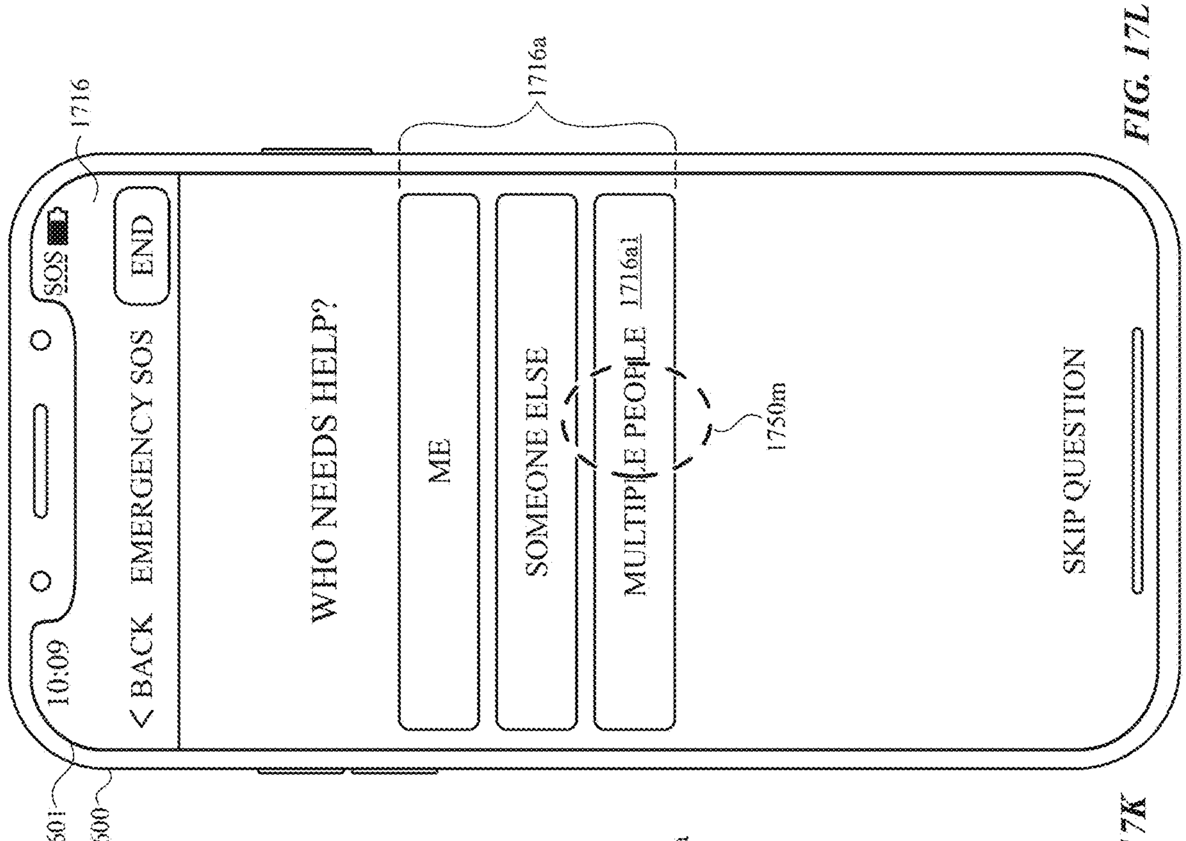
Figure 17K:
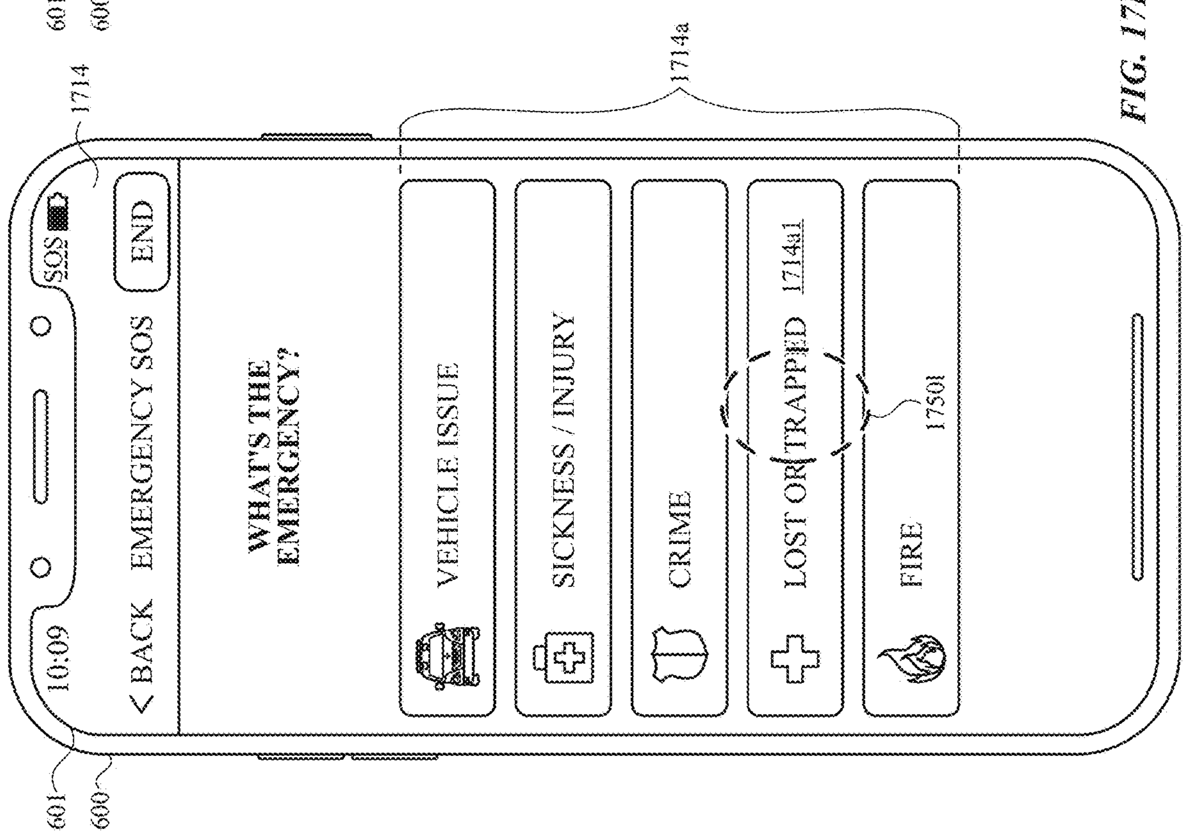
Figure 17M:
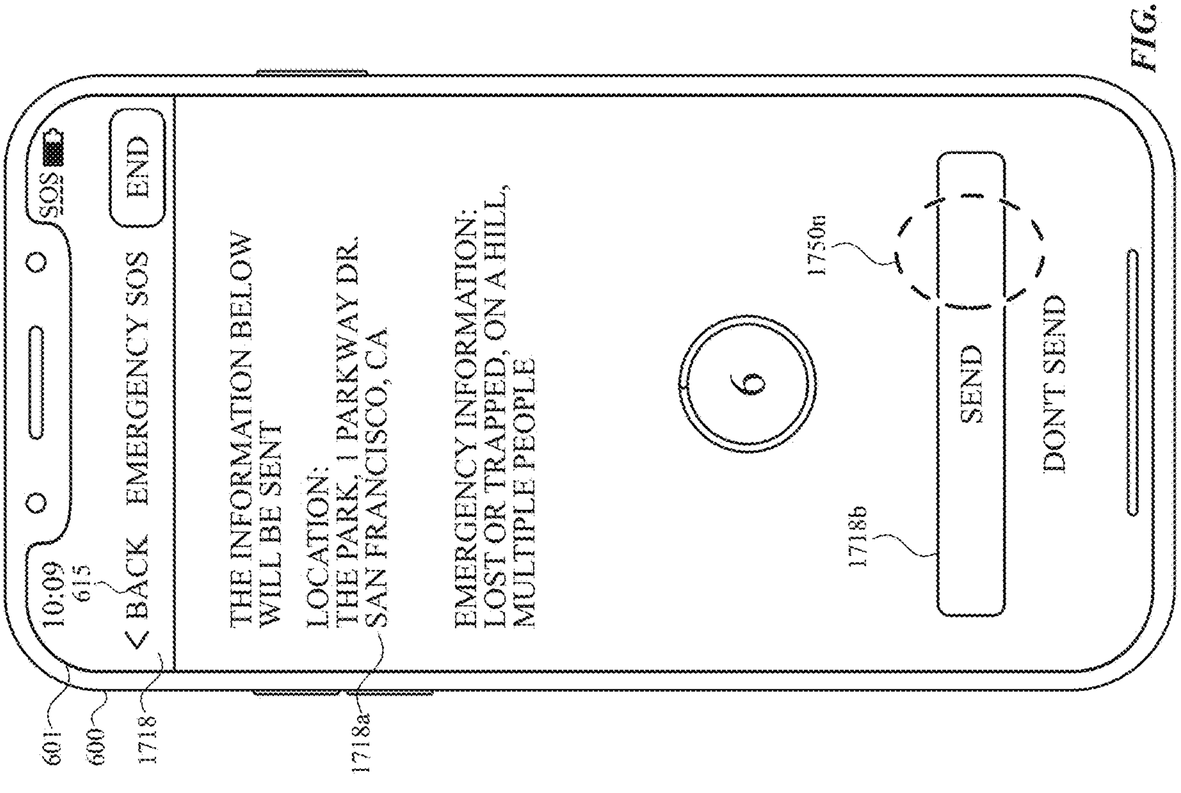
Figure 17N:
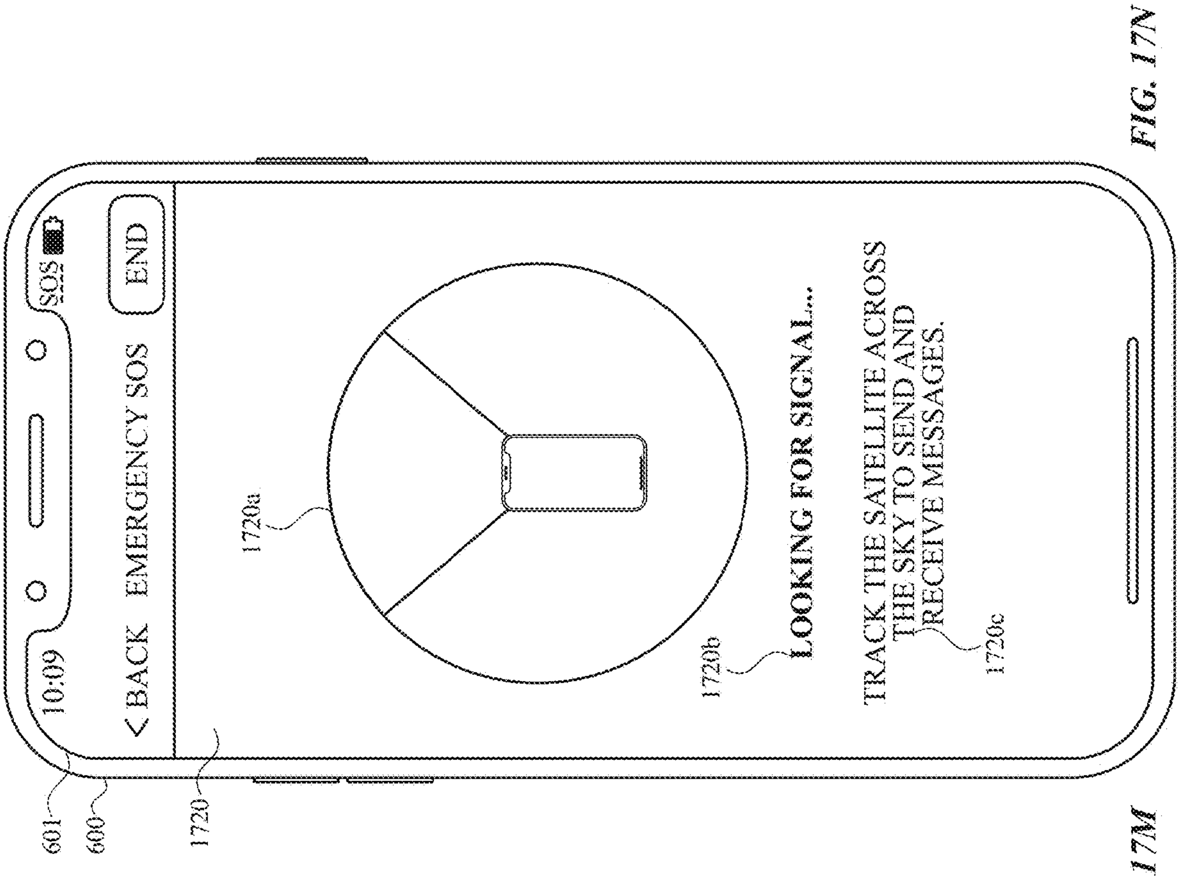
Figure 17O:
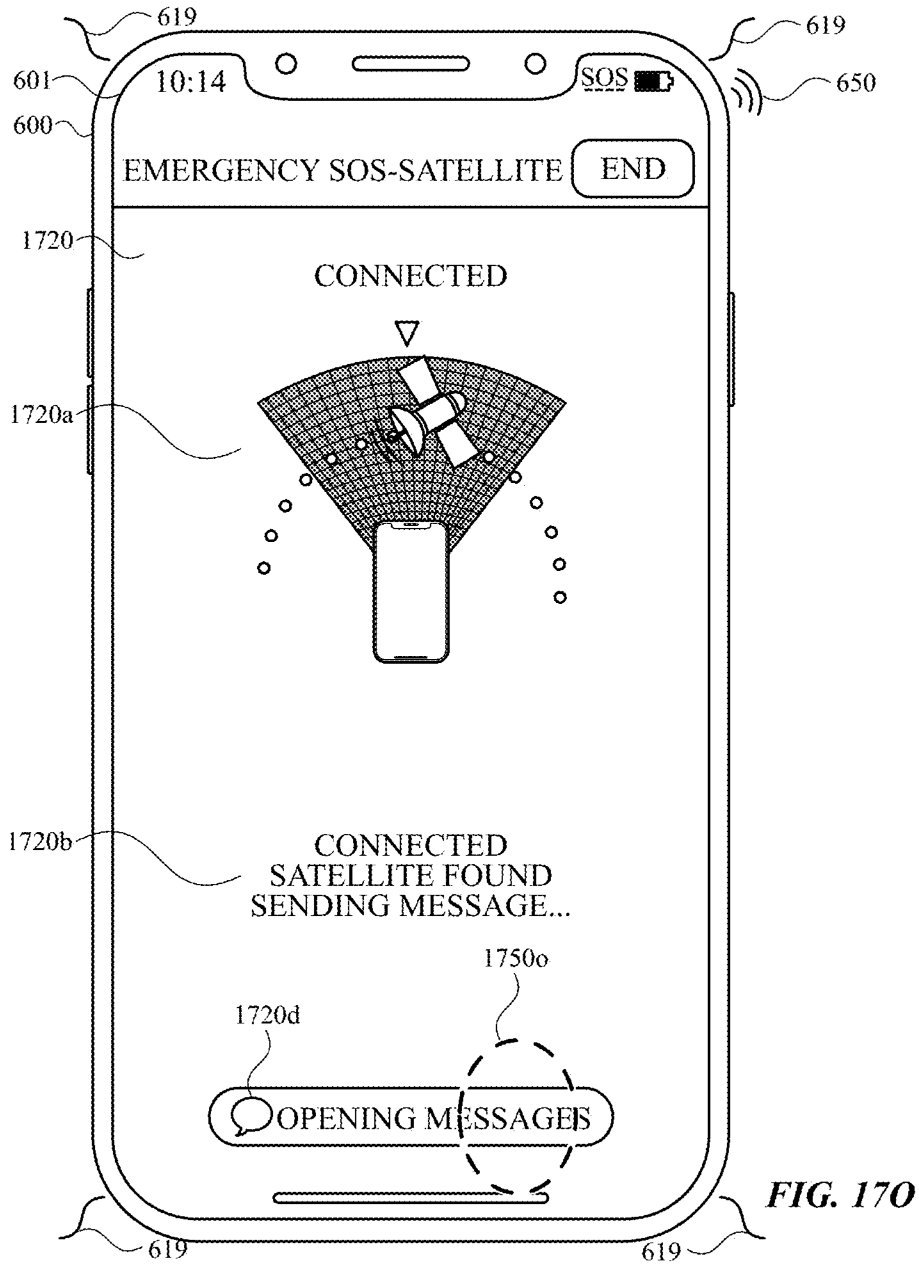
Figure 17Q:
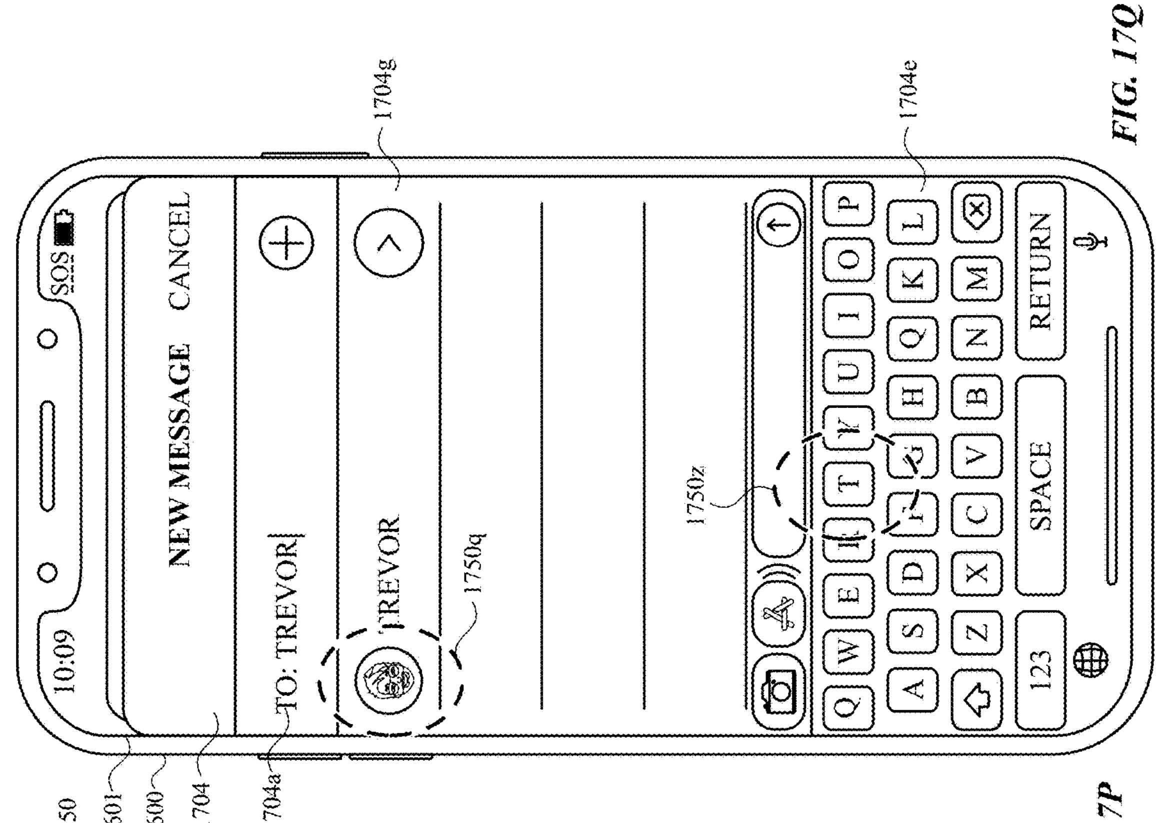
Figure 17P:
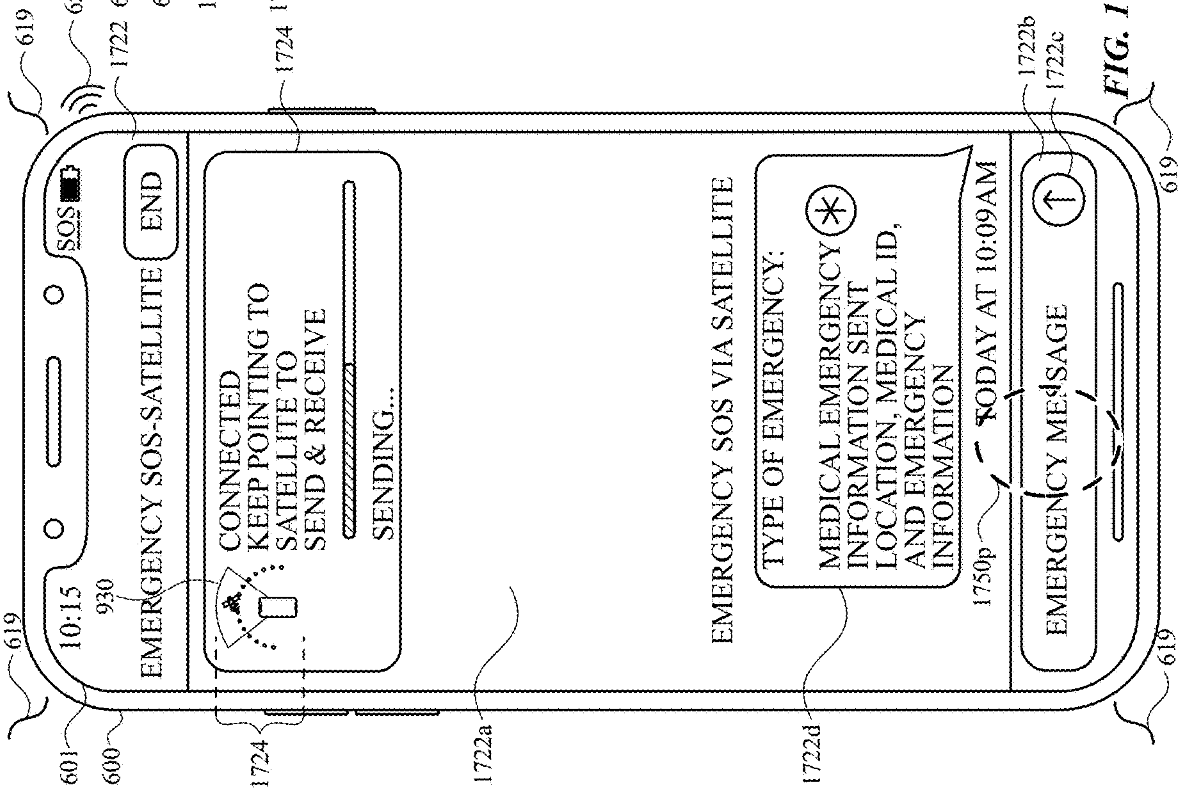
Figure 17R:
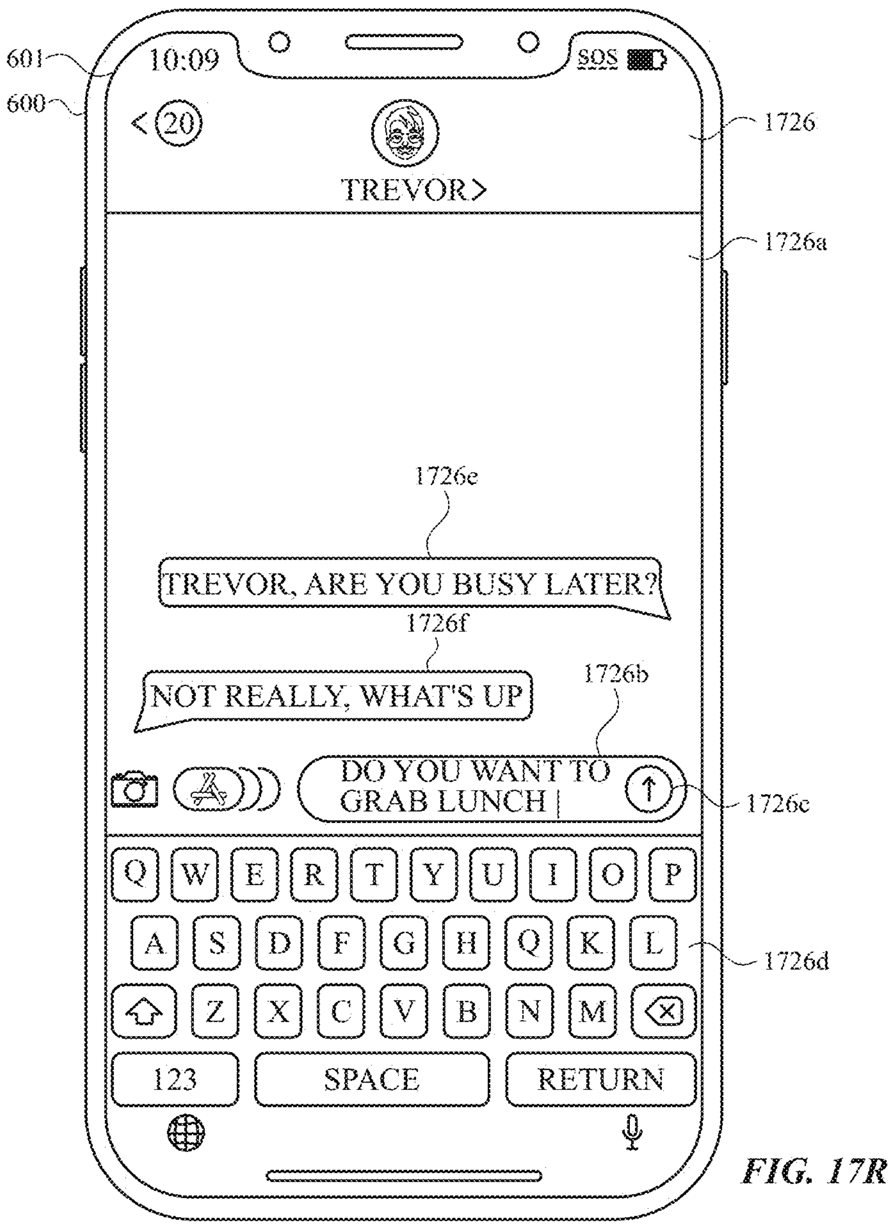
Figure 18:
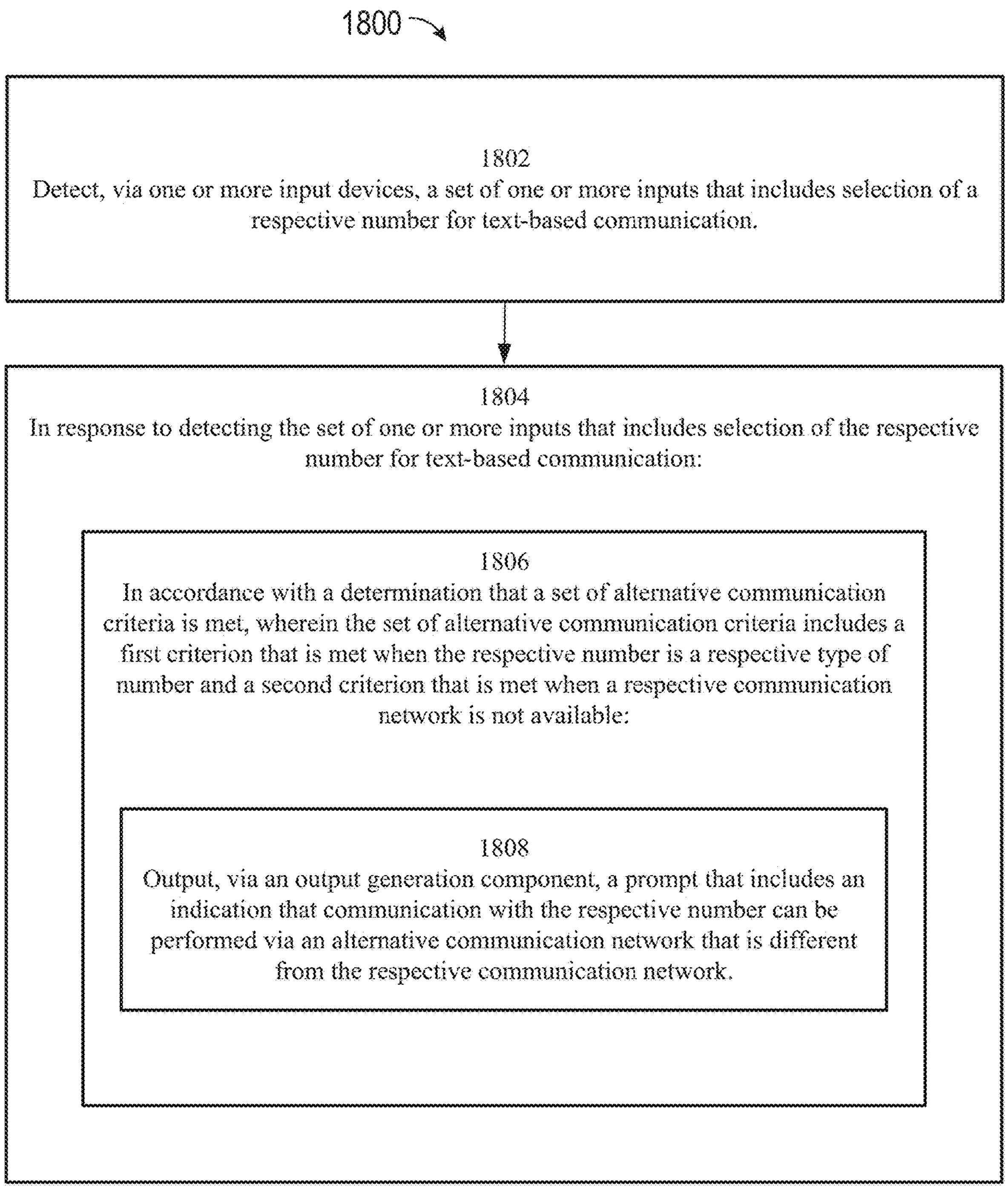
FIG. 18 is a flow diagram illustrating methods for initiating communication via an alternative communication network, in accordance with some embodiments.

FIGS. 17A-17R illustrate exemplary user interfaces for initiating communication via an alternative communication network, in accordance with some embodiments. FIG. 18 is a flow diagram illustrating methods for initiating communication via an alternative communication network. The user interfaces in FIGS. 17A-17R are used to illustrate the processes described below, including the processes in FIG. 18.

Figure 19B:
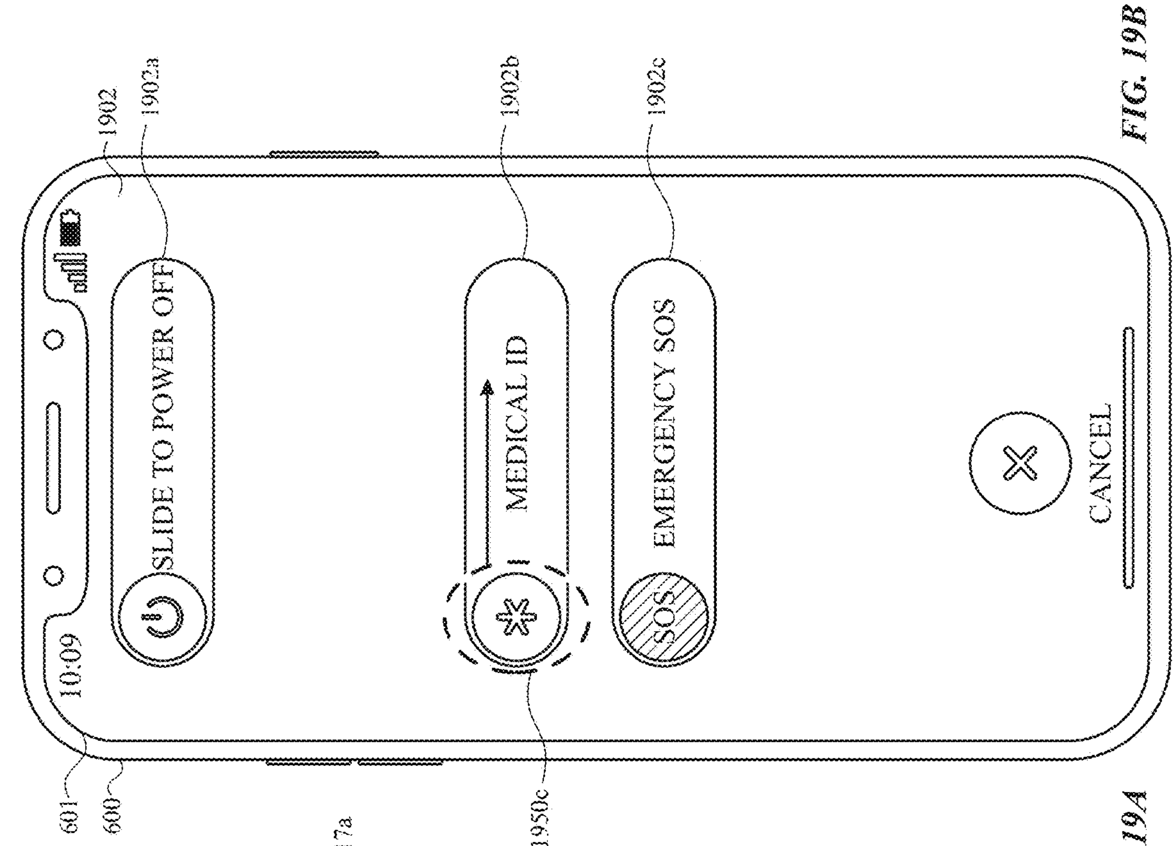
FIGS. 19A-19O illustrate exemplary user interfaces for testing an alternative communication network, in accordance with some embodiments.
Figure 19A:
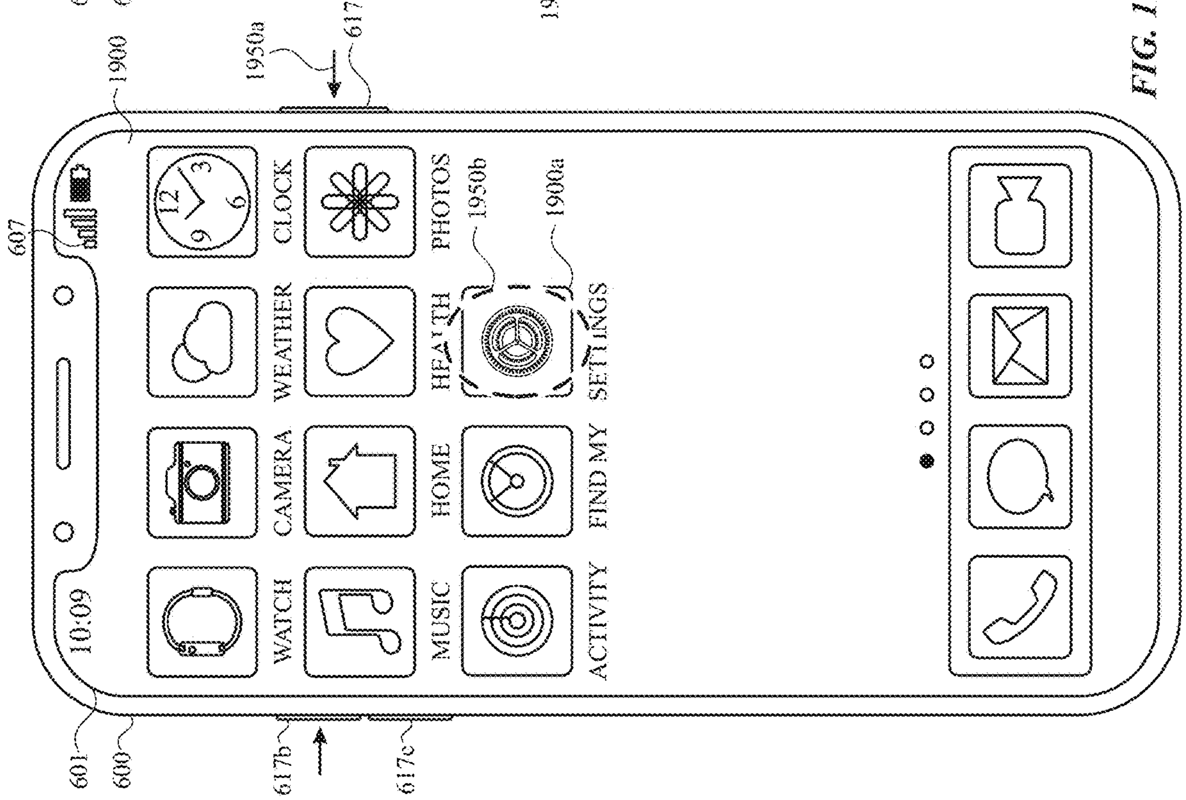
Figure 19C:
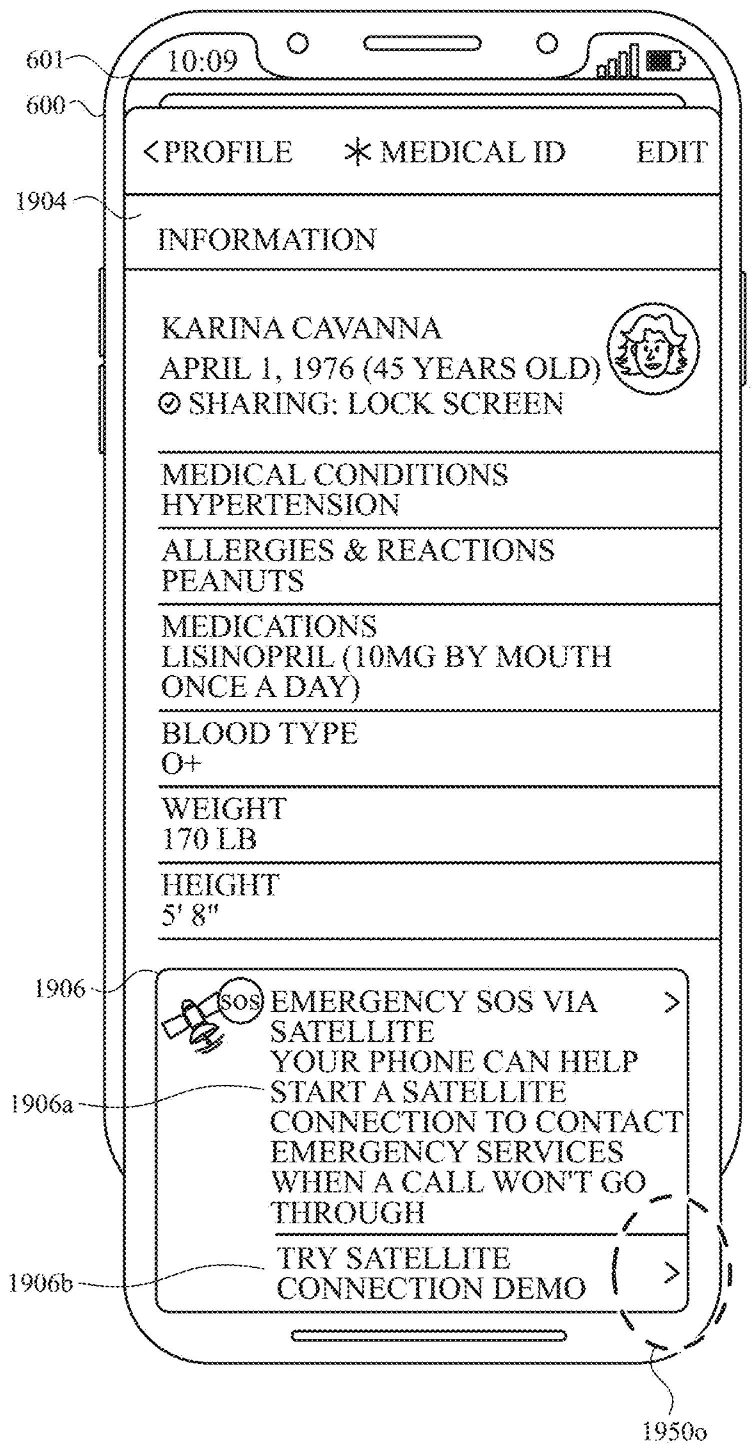
Figure 19D:
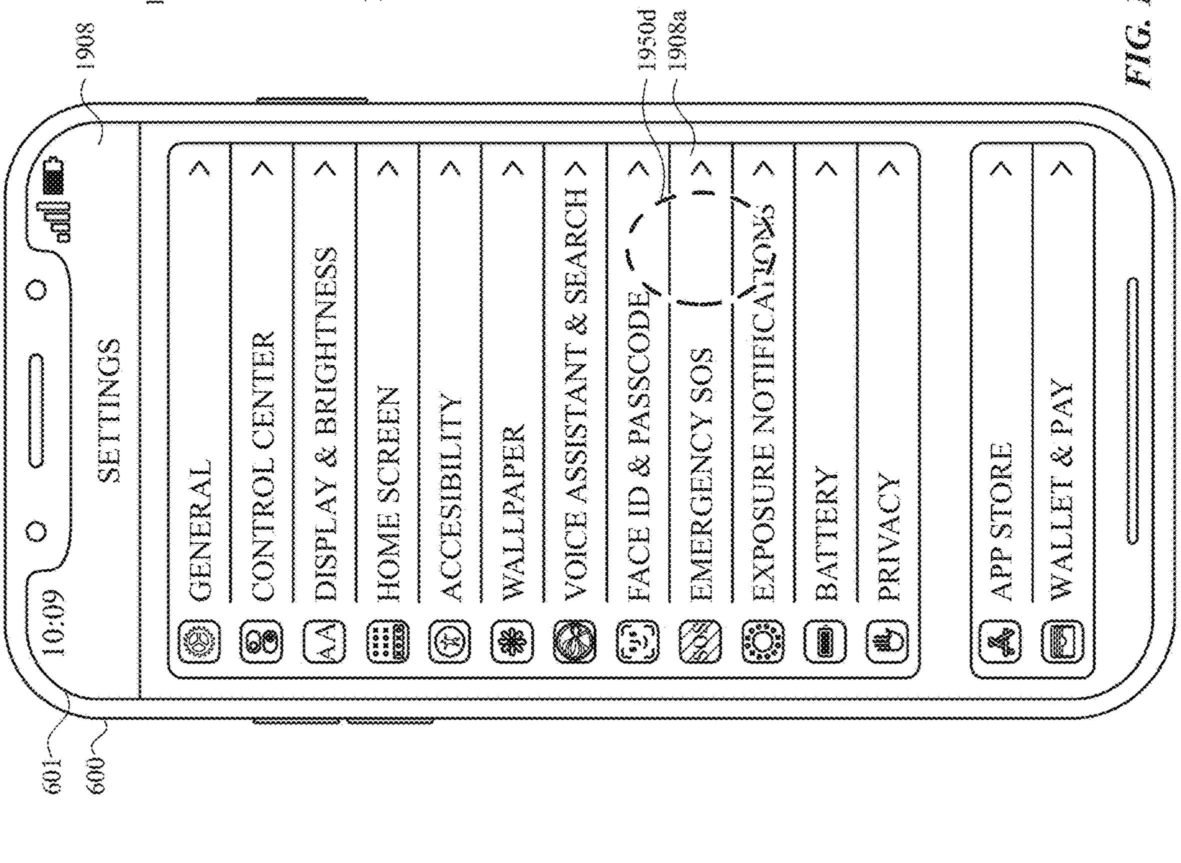
Figure 19E:
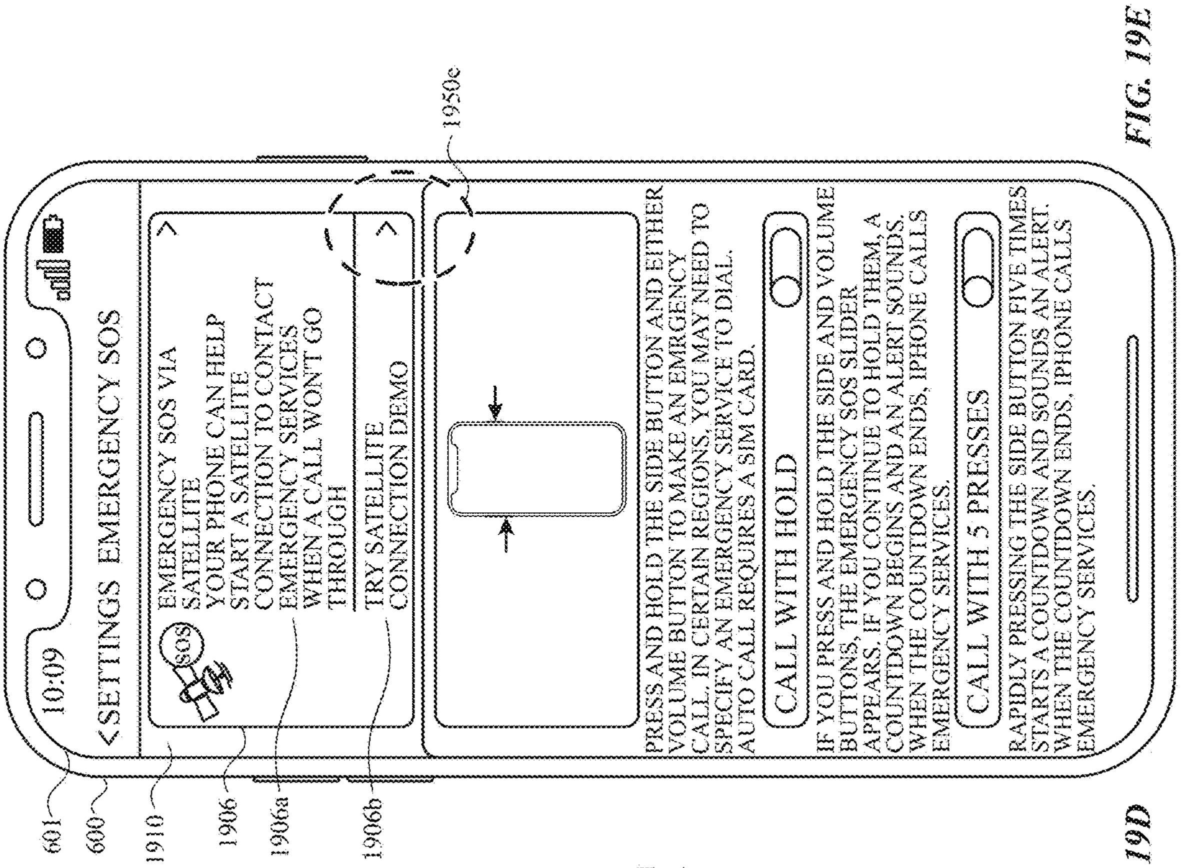
Figure 19G:
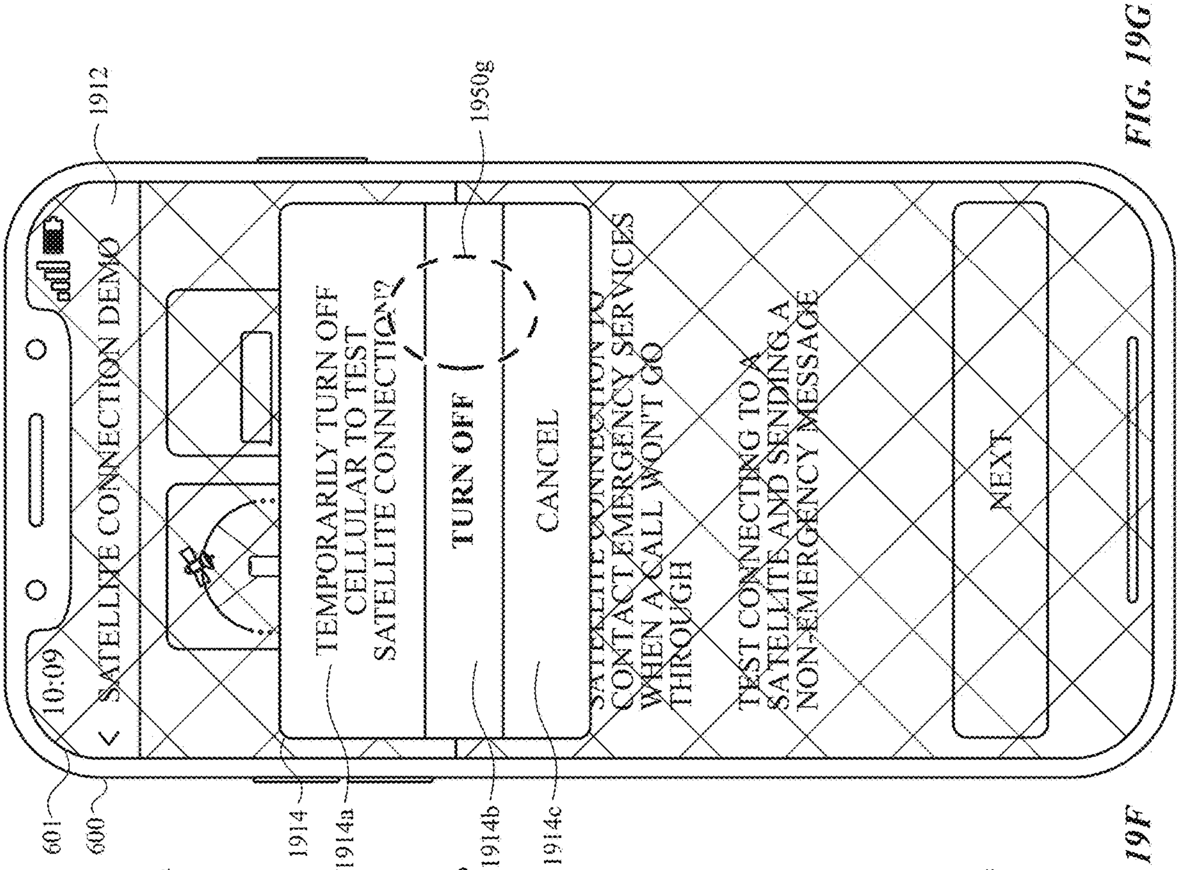
Figure 19F:
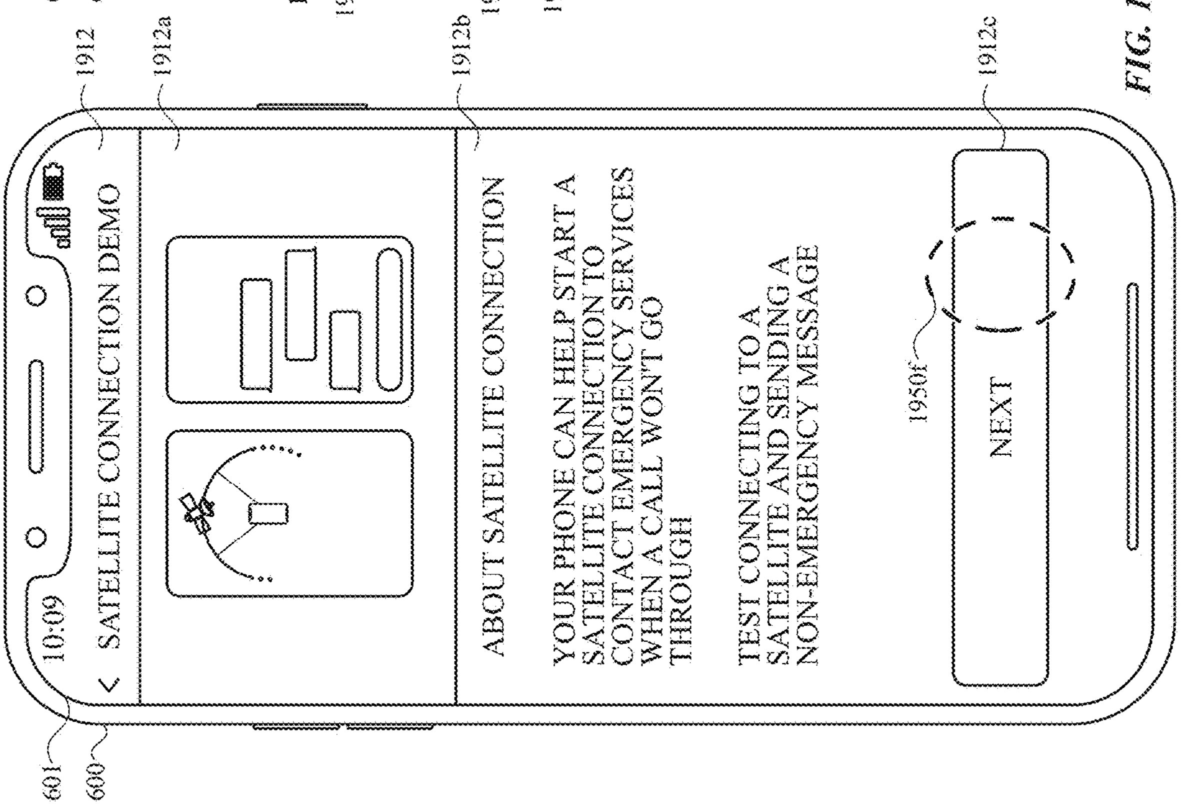
Figure 19I:
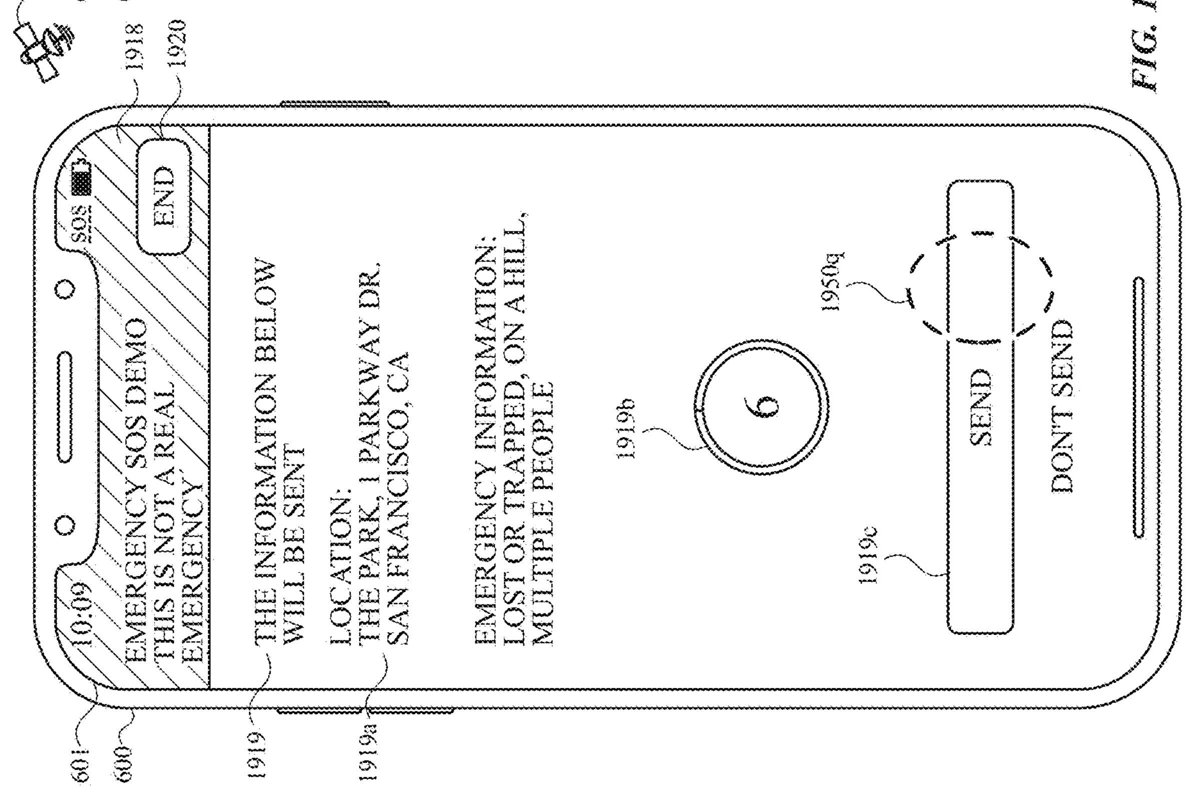
Figure 19I:
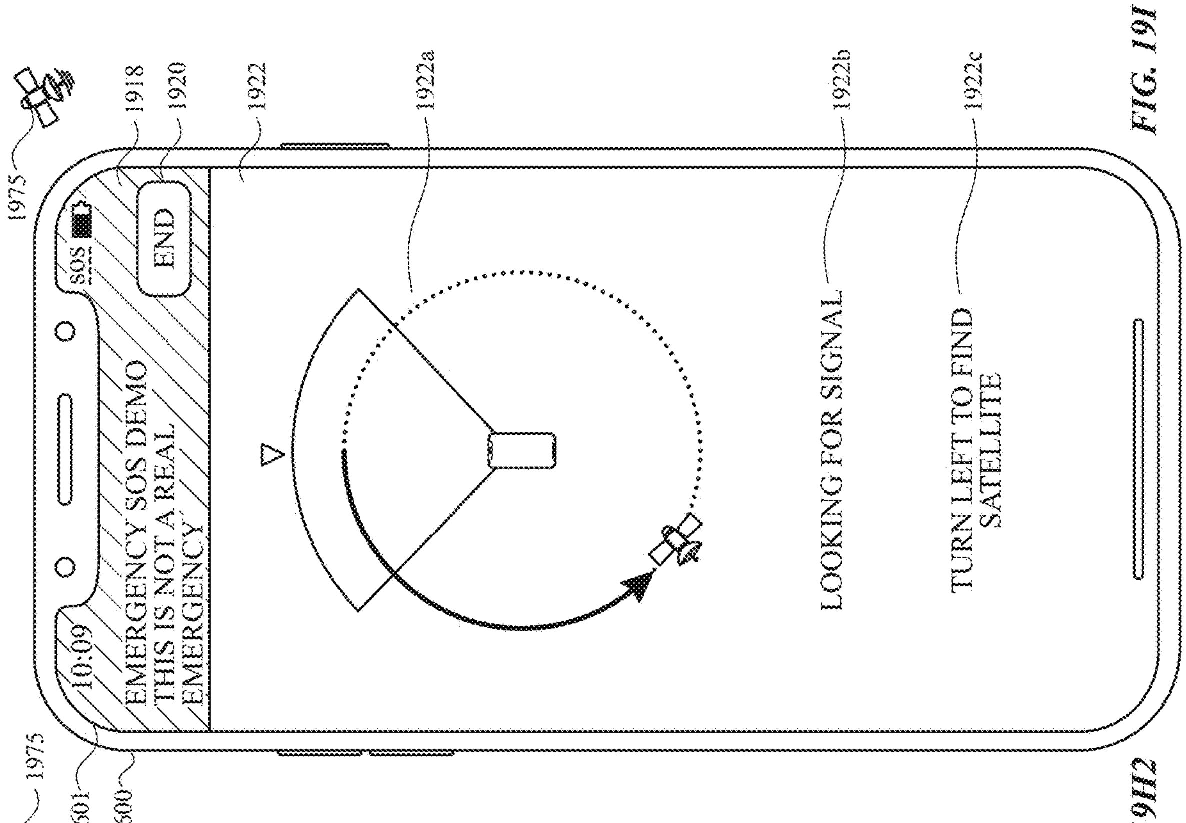
Figures 19J, 19K:
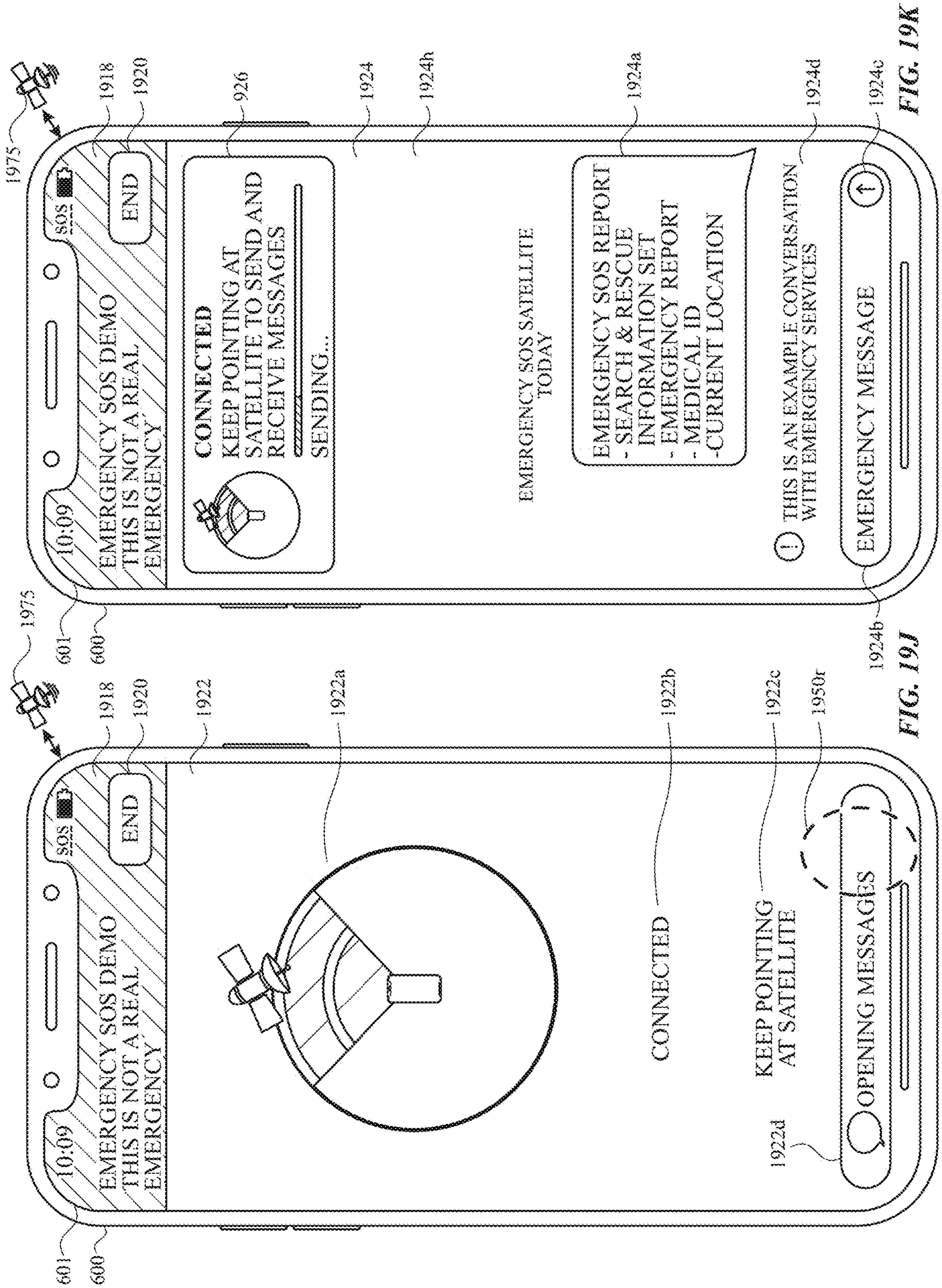
Figure 19M:
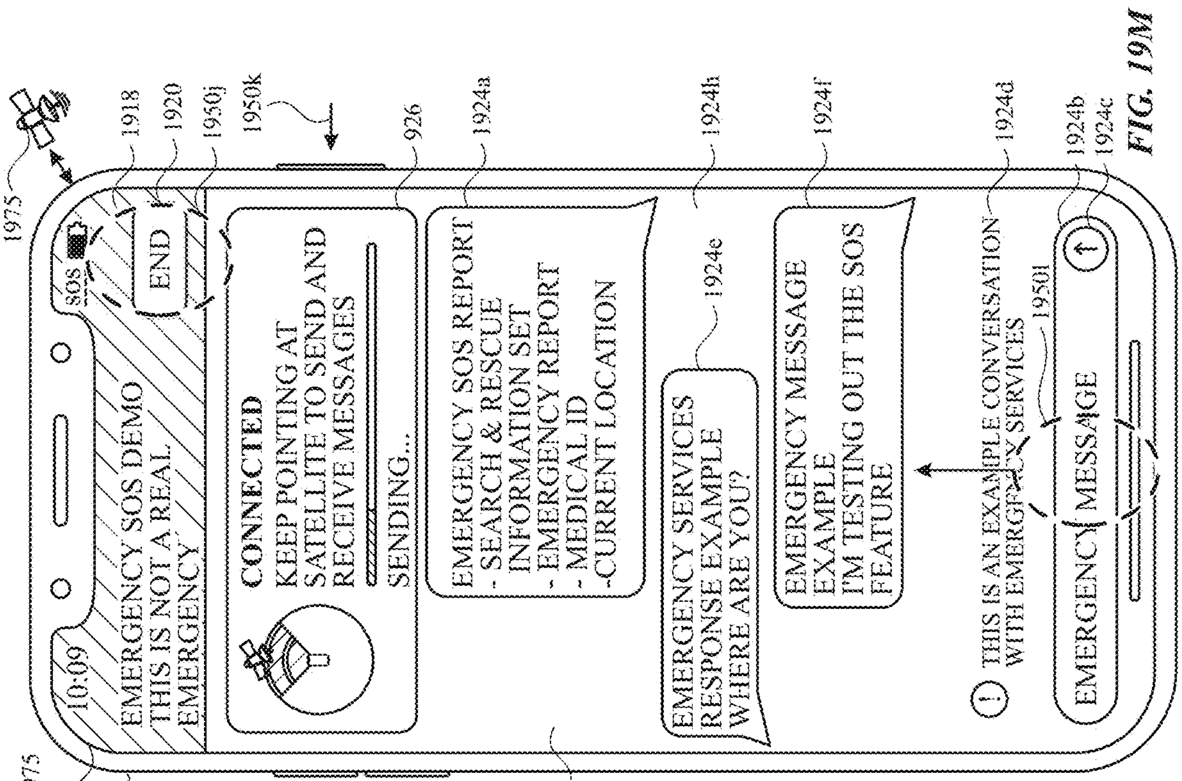
Figure 19L:
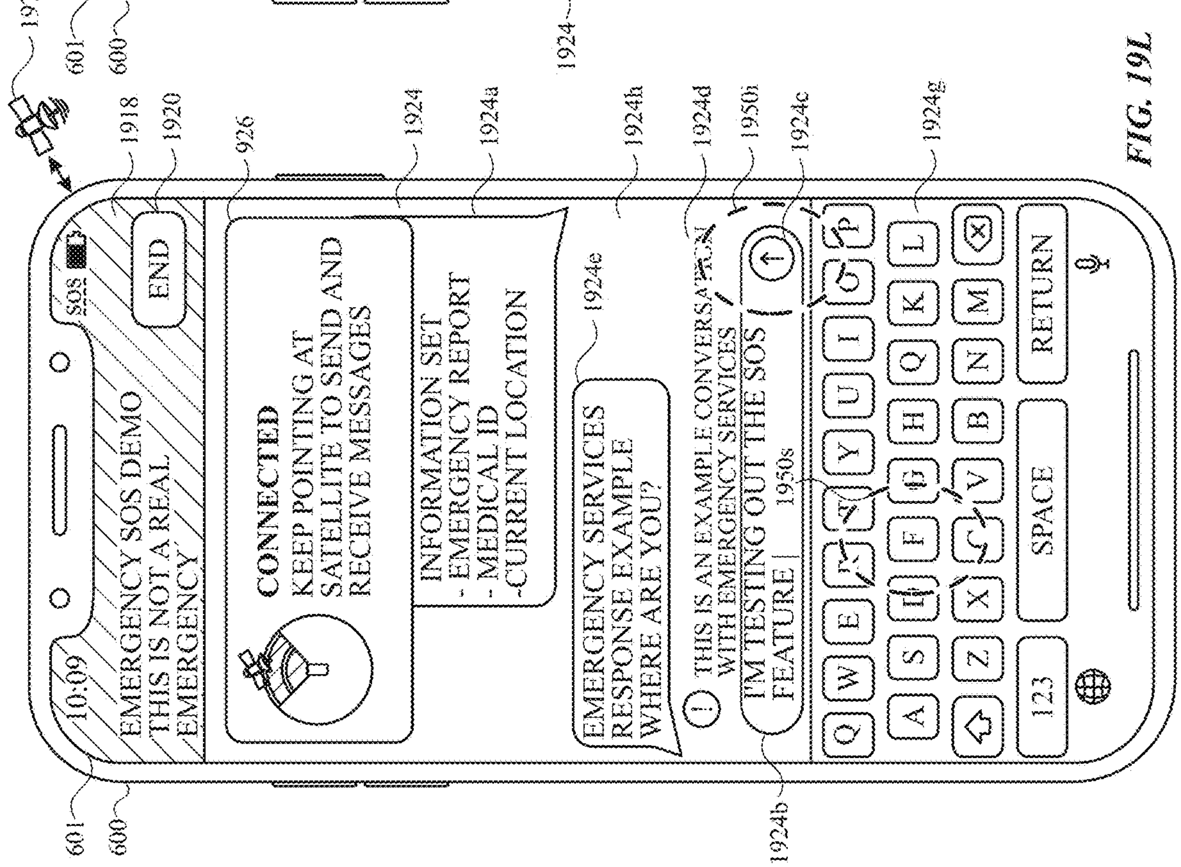
Figure 19N:
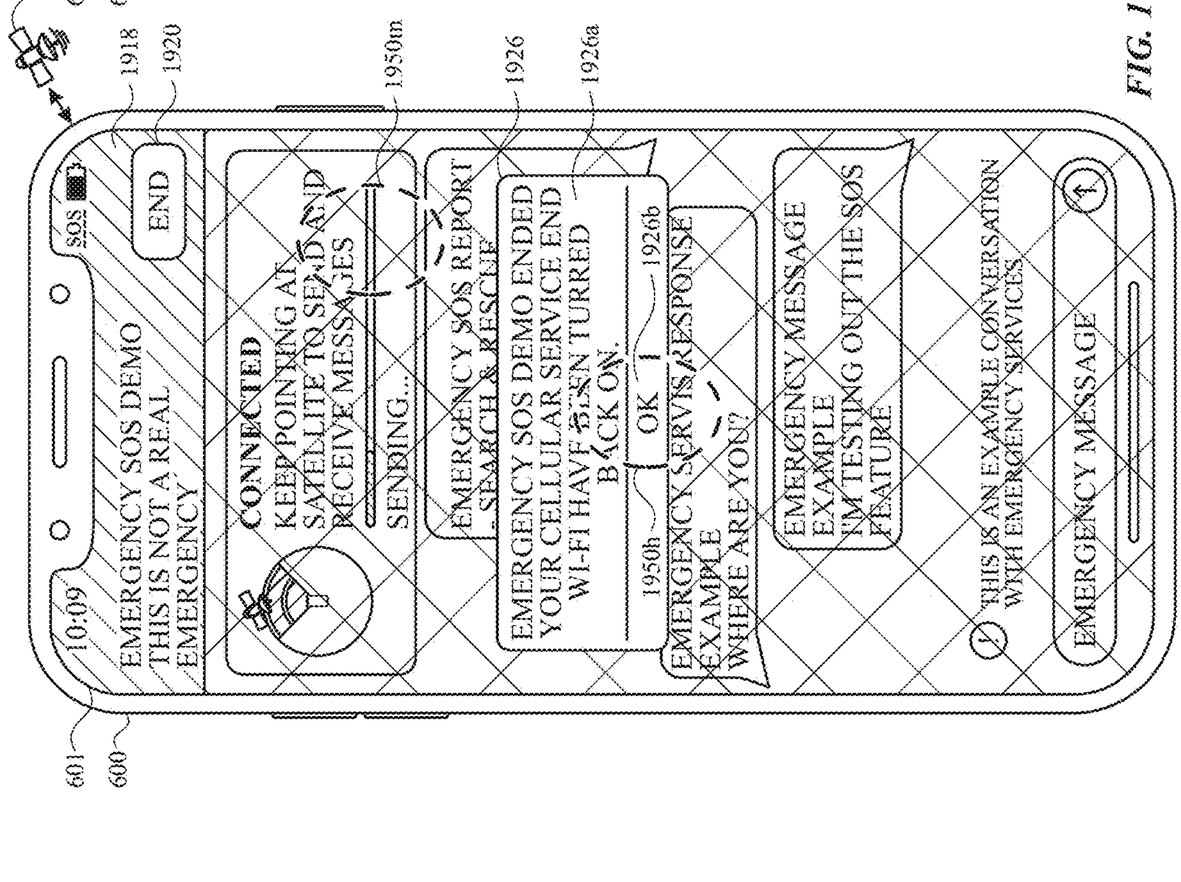
Figure 19O:
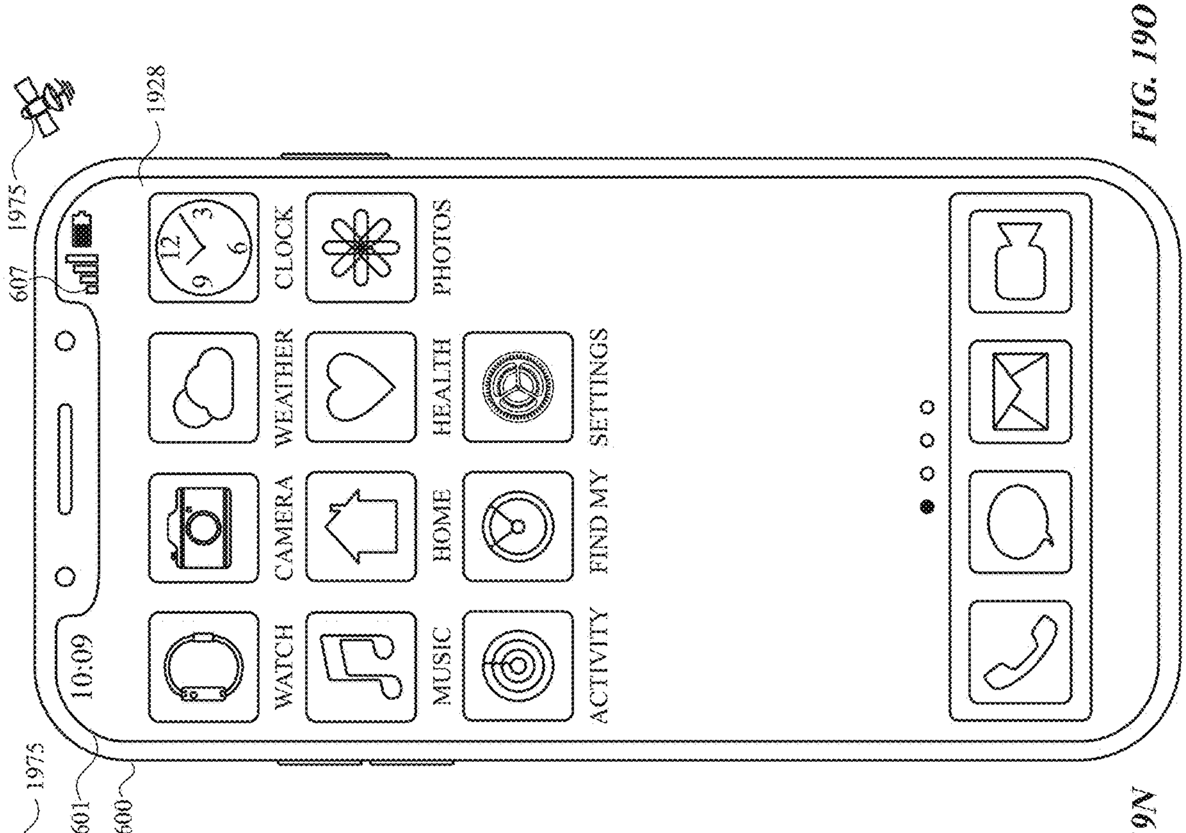
Figure 20:
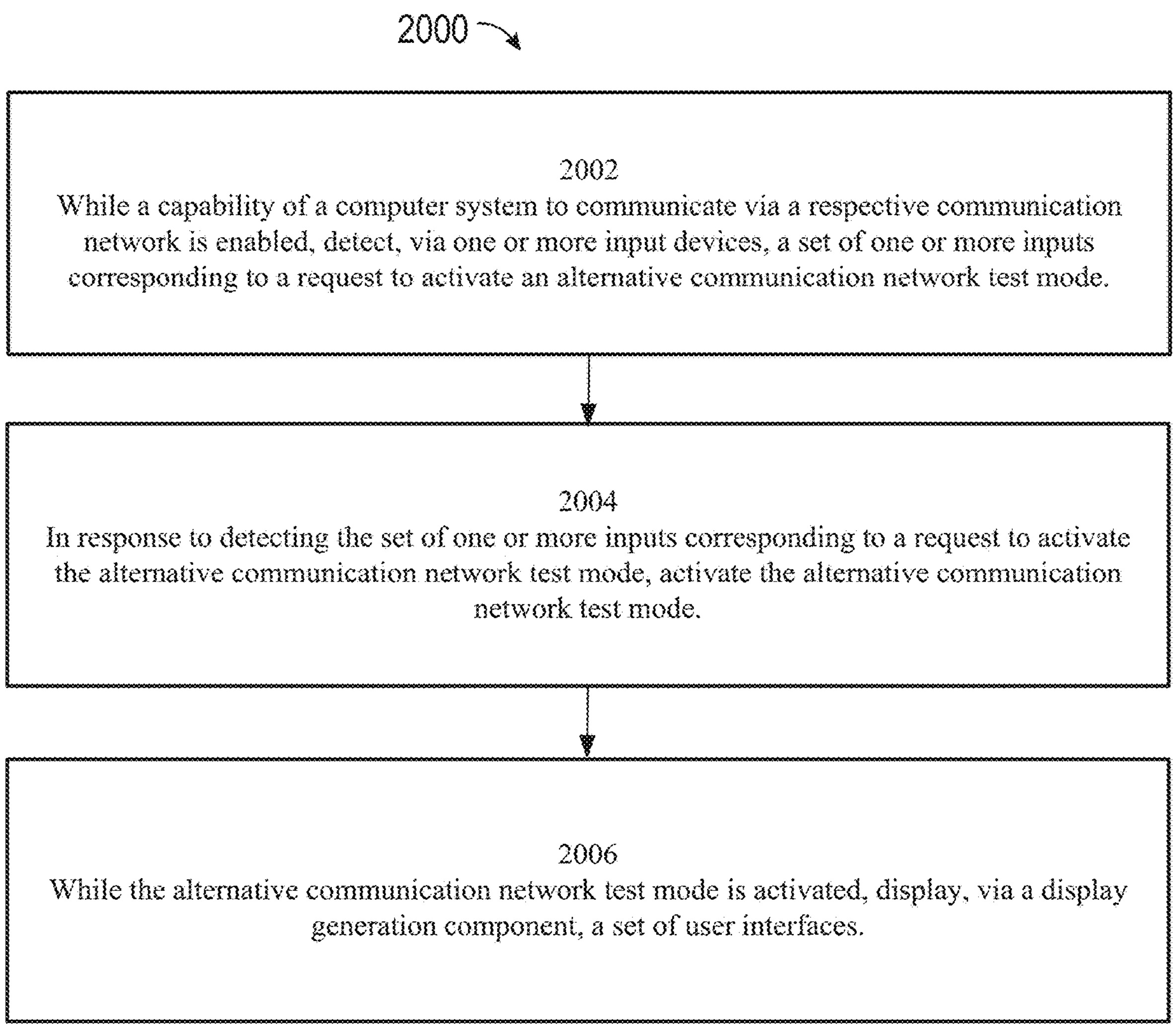
FIG. 20 is a flow diagram illustrating methods for testing an alternative communication network, in accordance with some embodiments.

FIGS. 19A-19O illustrate exemplary user interfaces for testing an alternative communication network, in accordance with some embodiments. FIG. 20 is a flow diagram illustrating methods for testing an alternative communication network. The user interfaces in FIGS. 19A-19O are used to illustrate the processes described below, including the processes in FIG. 20.

Figure 21B:
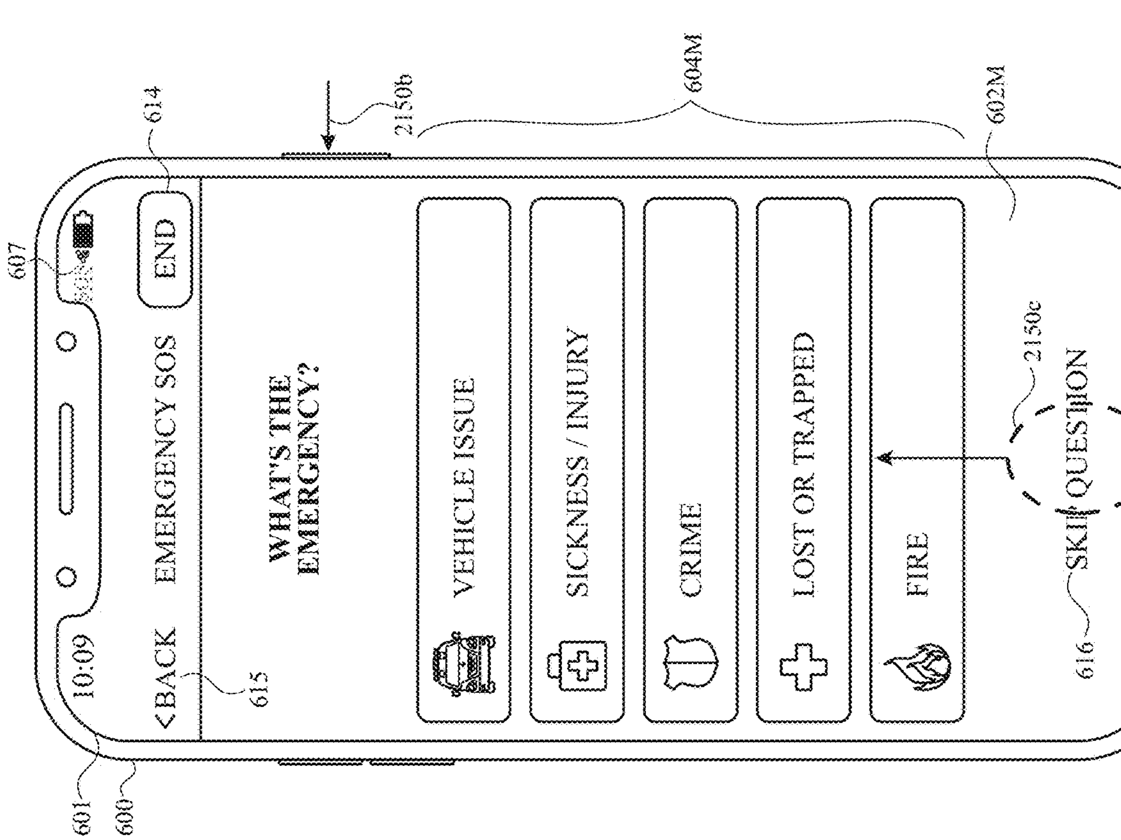
FIGS. 21A-21L illustrate exemplary user interfaces for providing a user interface object corresponding to a process, in accordance with some embodiments.
Figure 21A:
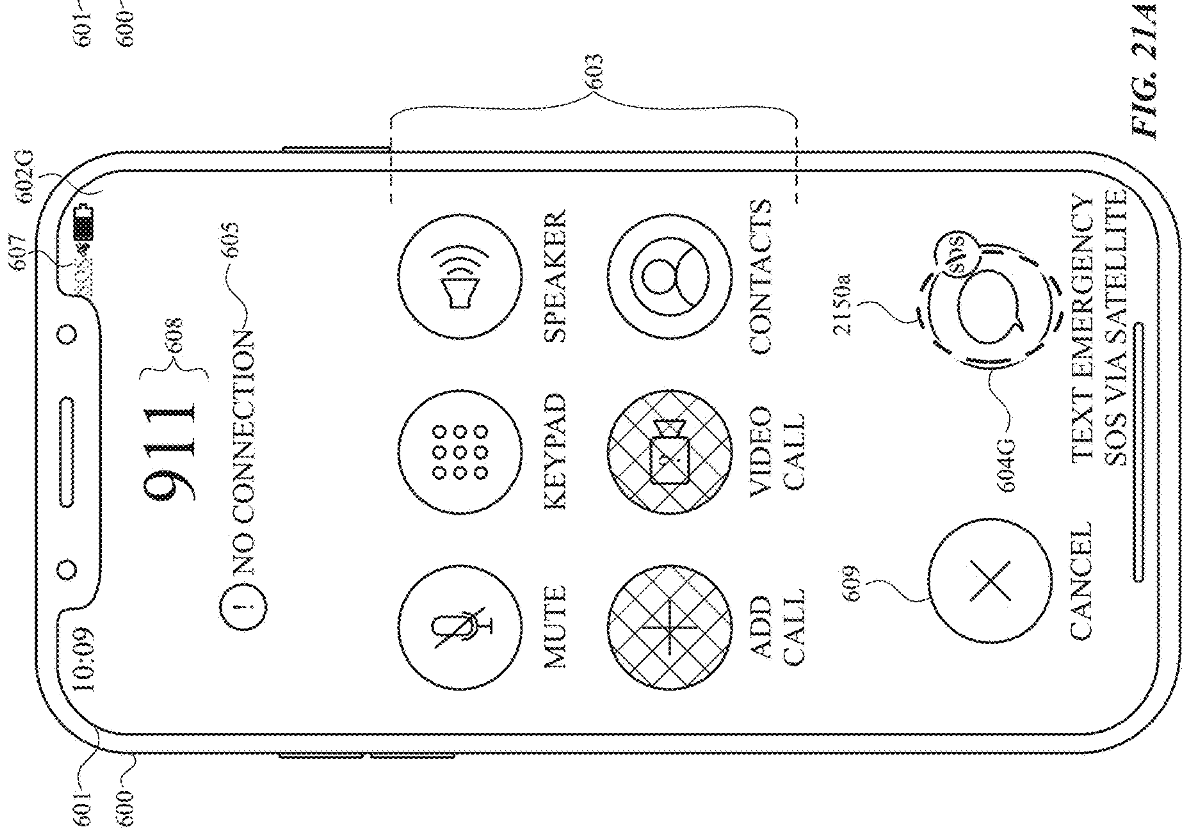
Figure 21D:
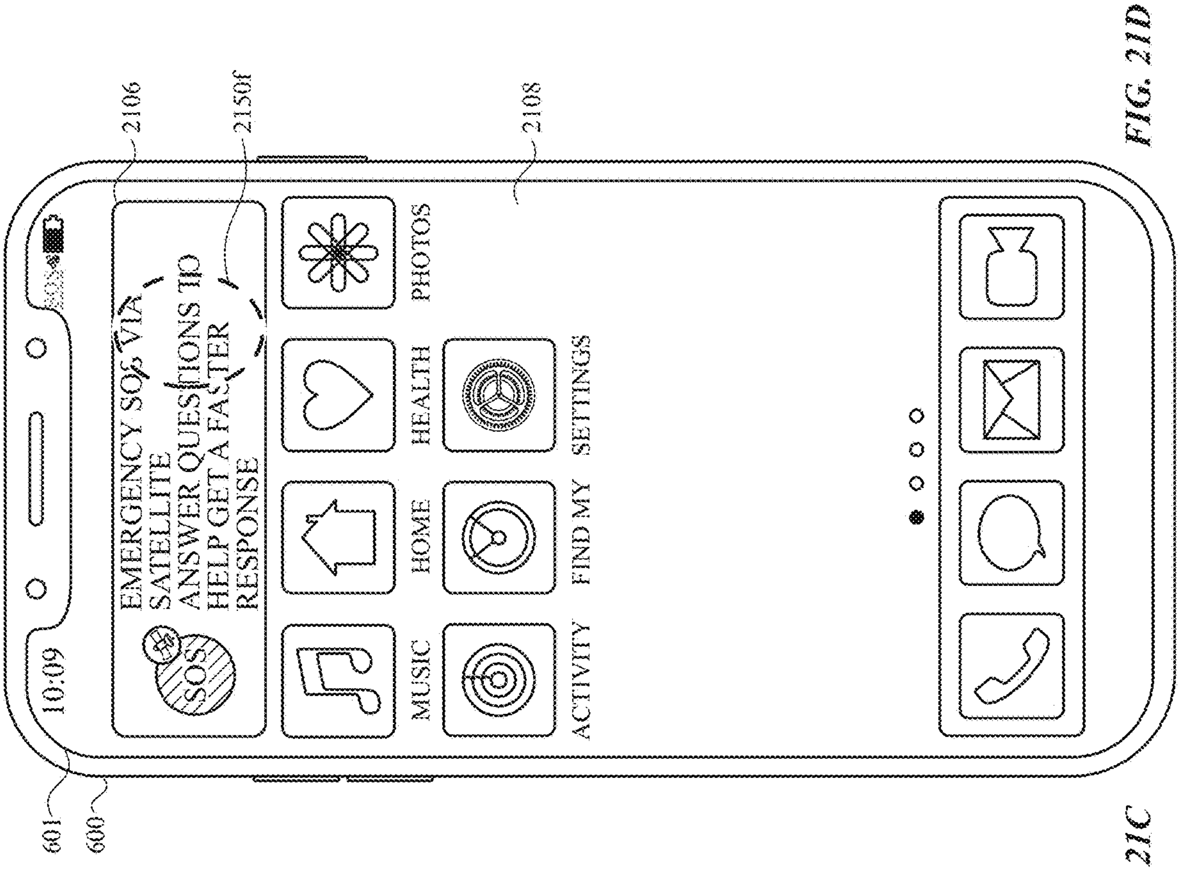
Figure 21C:
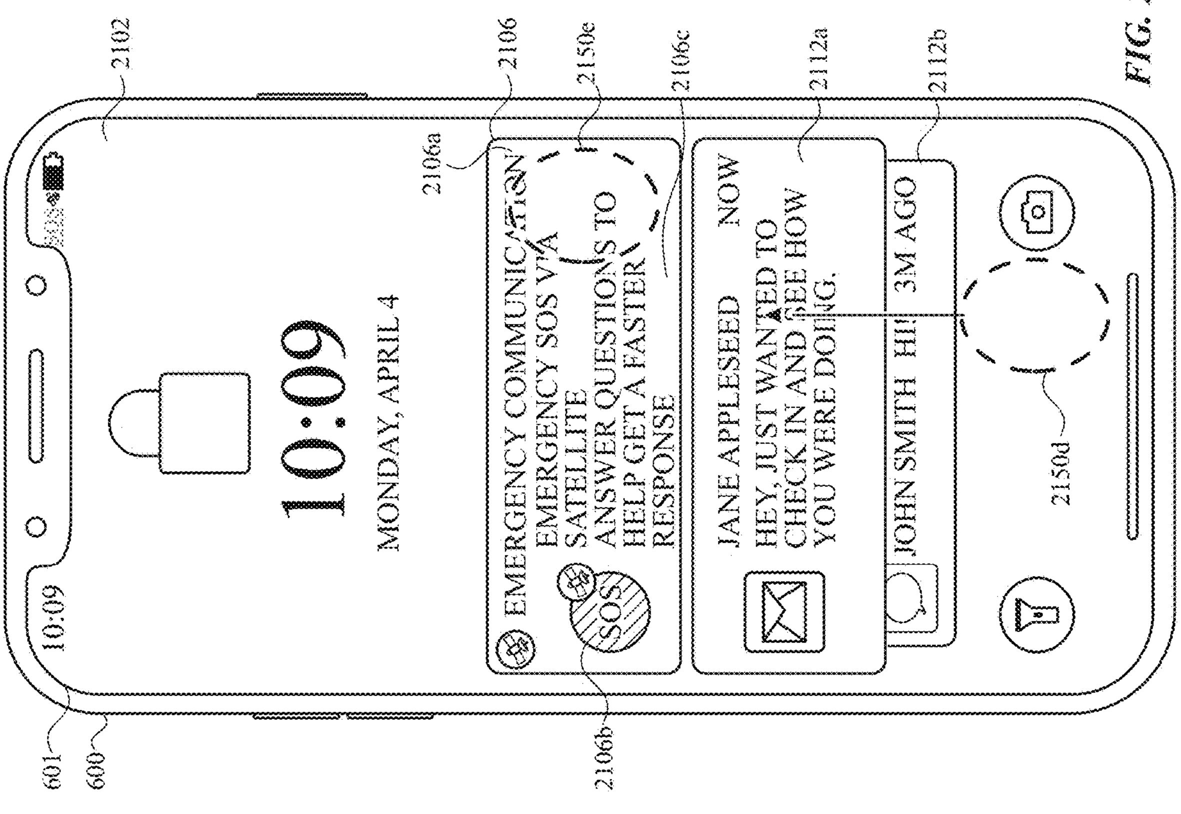
Figure 21E:
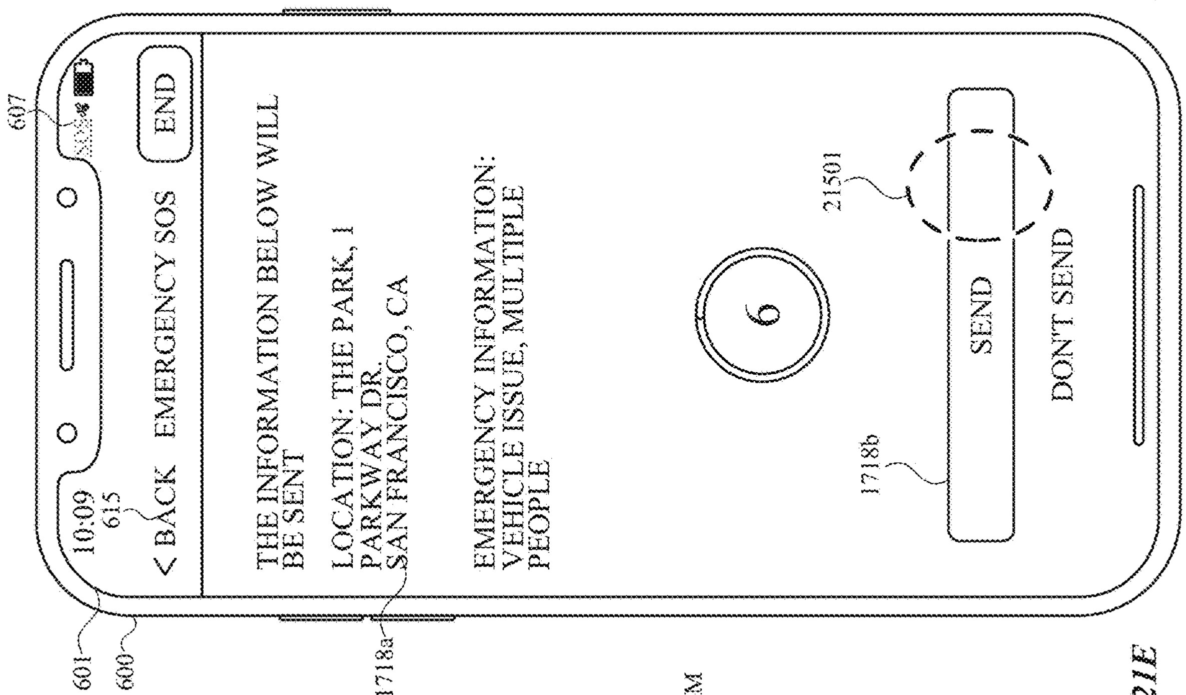
Figure 21E:
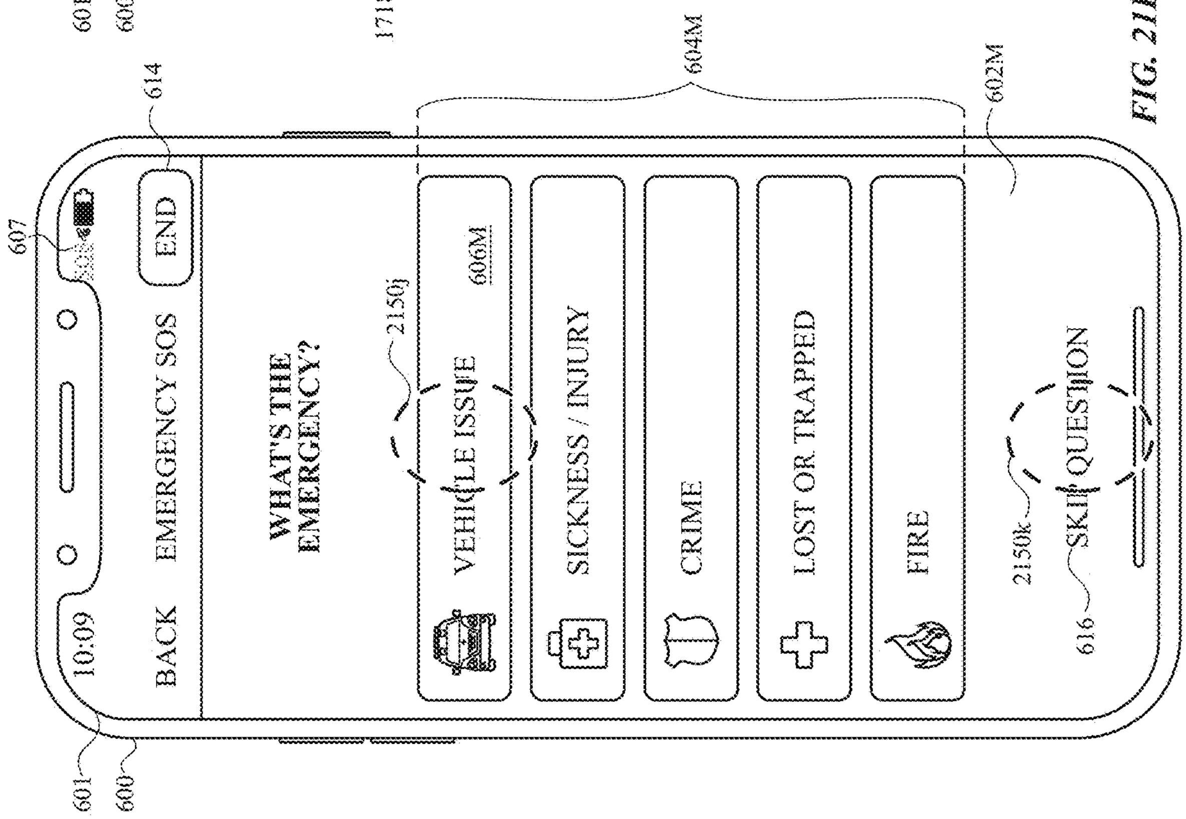
Figure 21G:
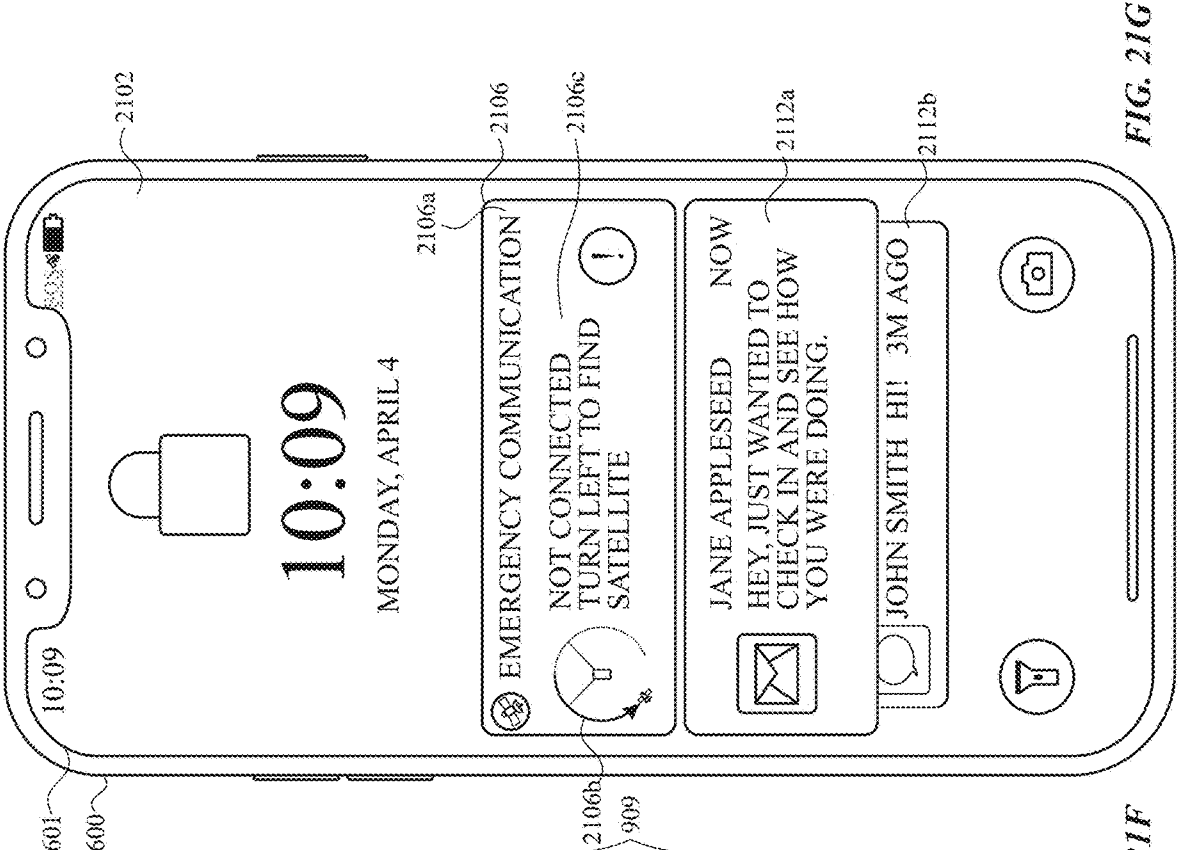
Figure 21F:
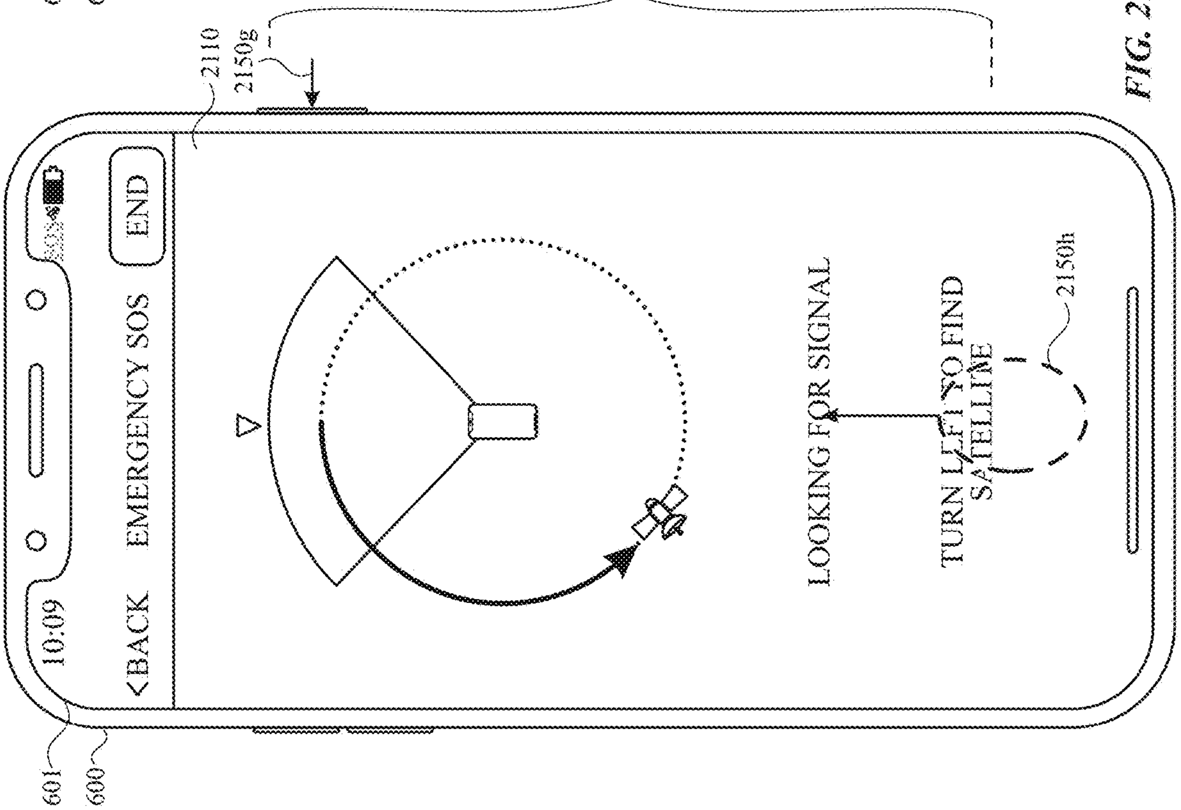
Figure 21H:
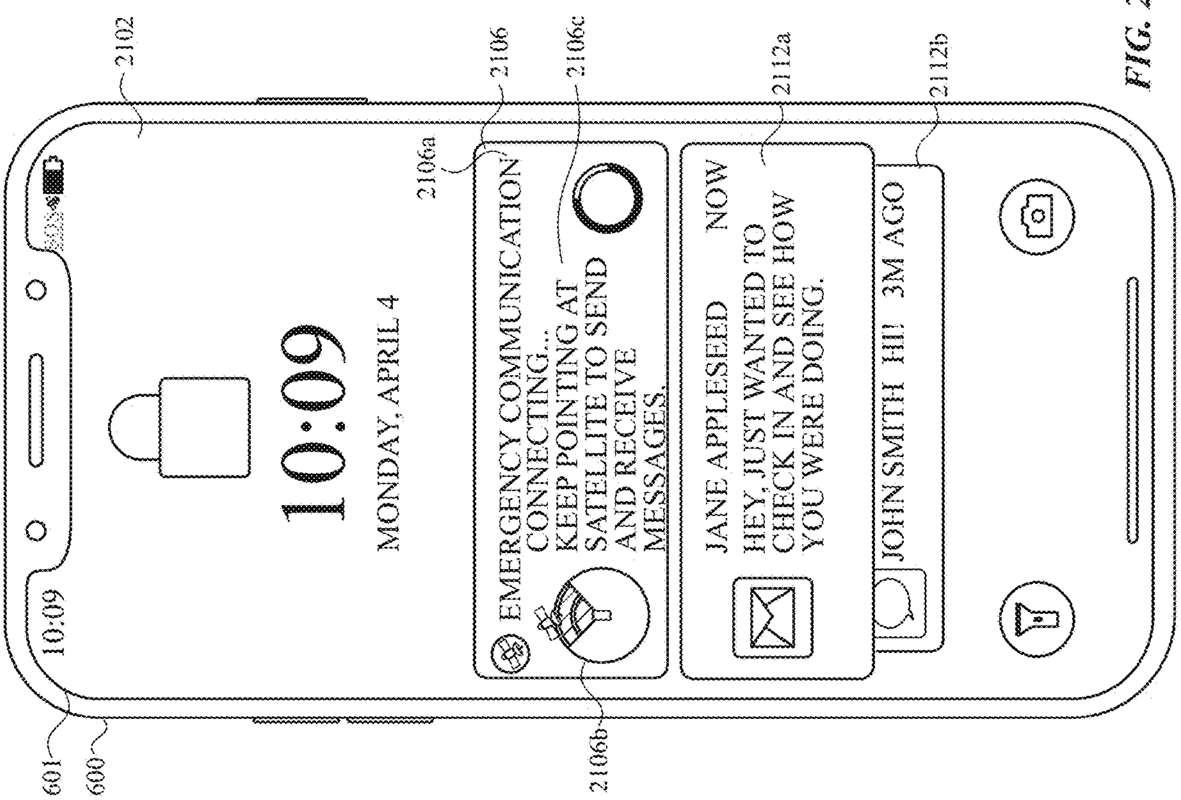
Figure 21I:
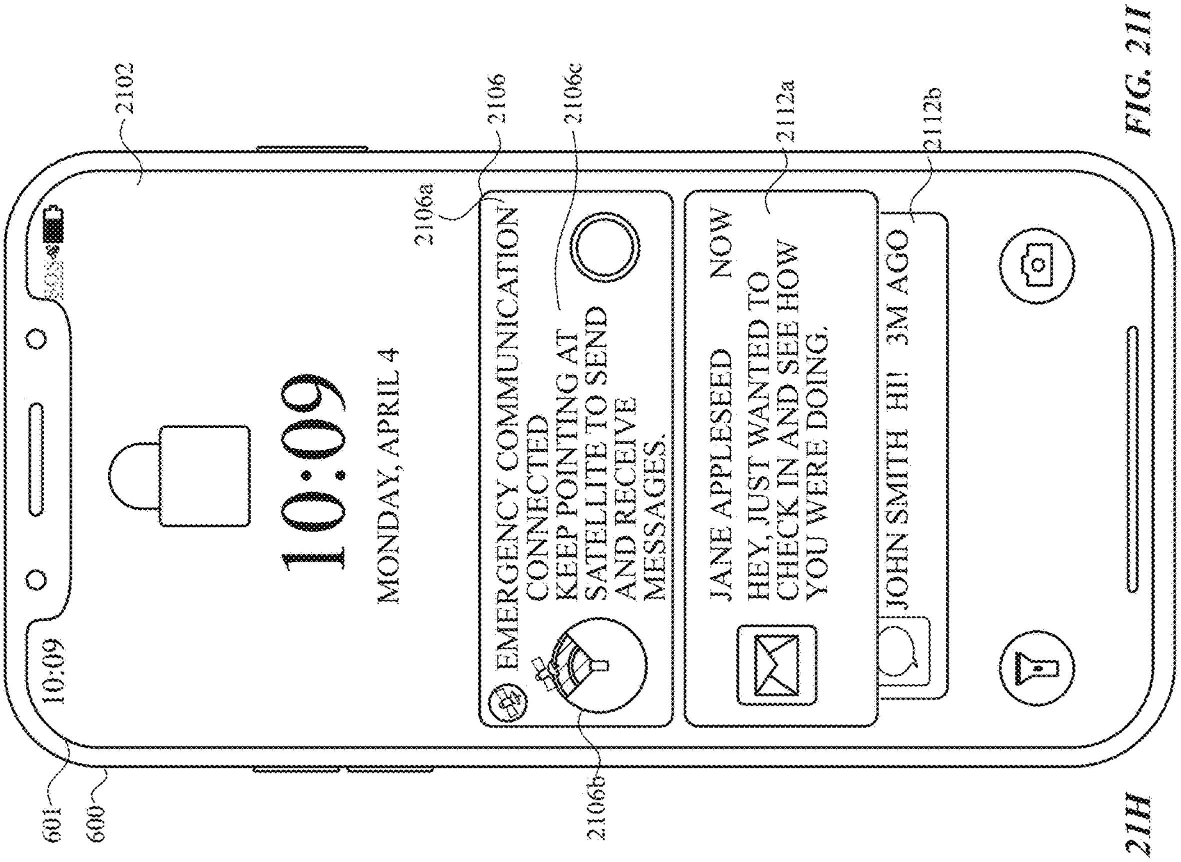
Figure 21K:
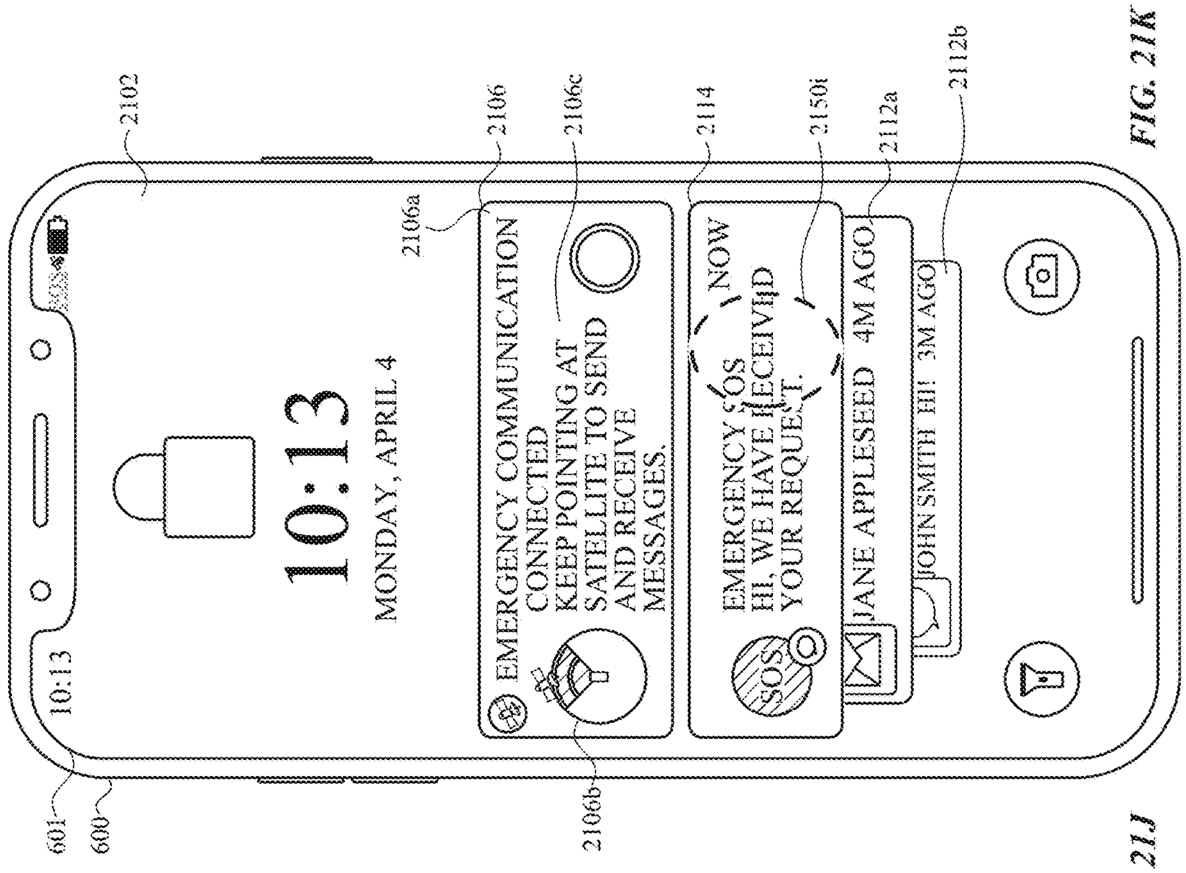

FIGS. 21A-21L illustrate exemplary user interfaces for providing a user interface object corresponding to a process, in accordance with some embodiments. FIG. 22 is a flow diagram illustrating methods for providing a user interface object corresponding to a process. The user interfaces in FIGS. 21A-21L are used to illustrate the processes described below, including the processes in FIG. 22.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently. Reducing the number of inputs needed to perform an operation and providing clear feedback to the user enable the user to use the device more quickly and efficiently, which is particularly important in emergency situations for several reasons. Using a device efficiently conserves battery life, which is important in emergency situations because some emergency communication features use satellite communications that can use significant energy (e.g., more energy than cellular communications) and because opportunities to recharge the device in an emergency may be limited (e.g., because a user is in a remote location where a power source is not available). User interfaces that clearly indicate how to use a device quickly and efficiently are particularly important in emergency situations because a user may be stressed and more prone to making mistakes. In an emergency situation, reducing errors by providing clear instructions and feedback saves time communicating with emergency services, which can improve the likelihood that emergency assistance will be provided more quickly.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
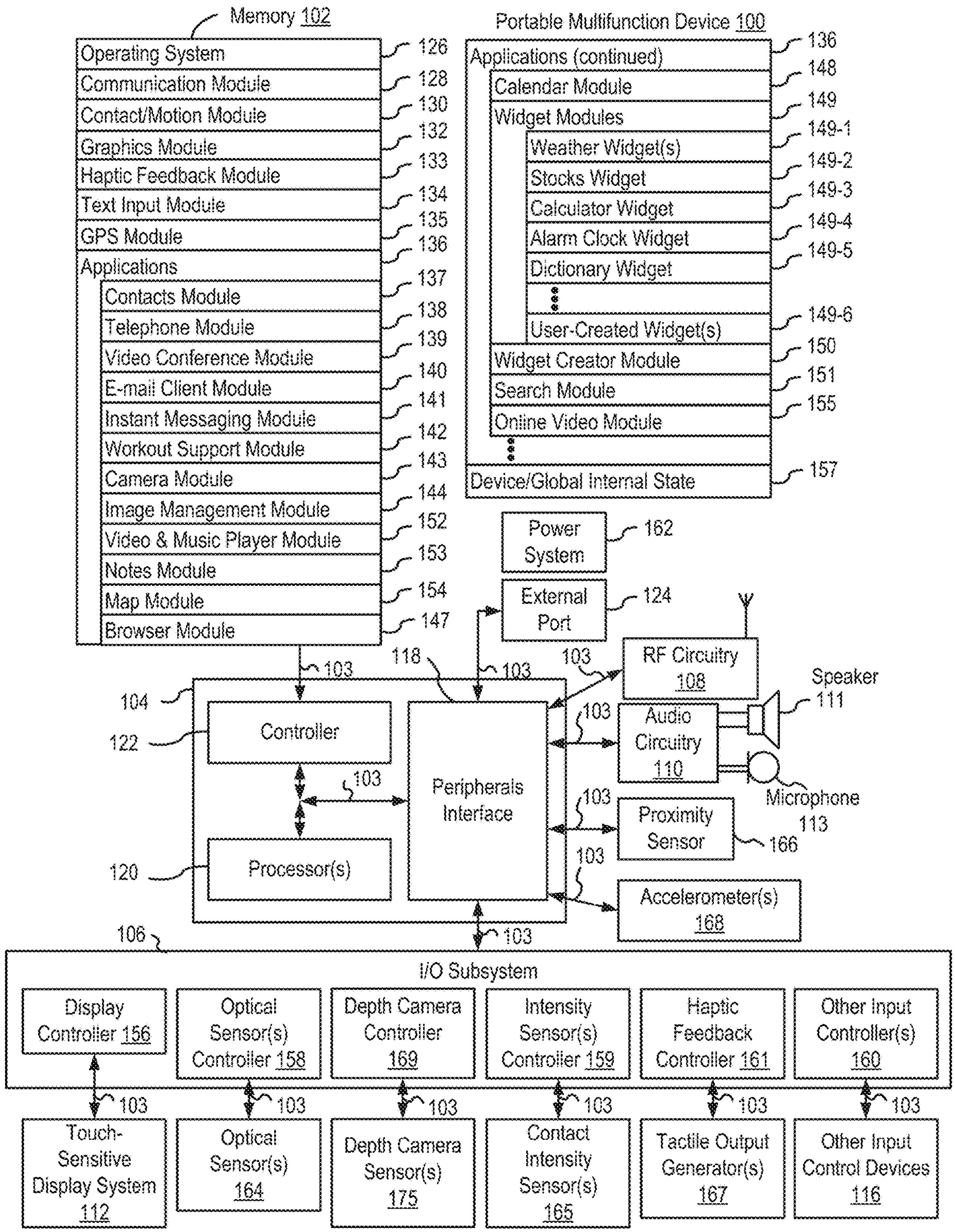
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1)

U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
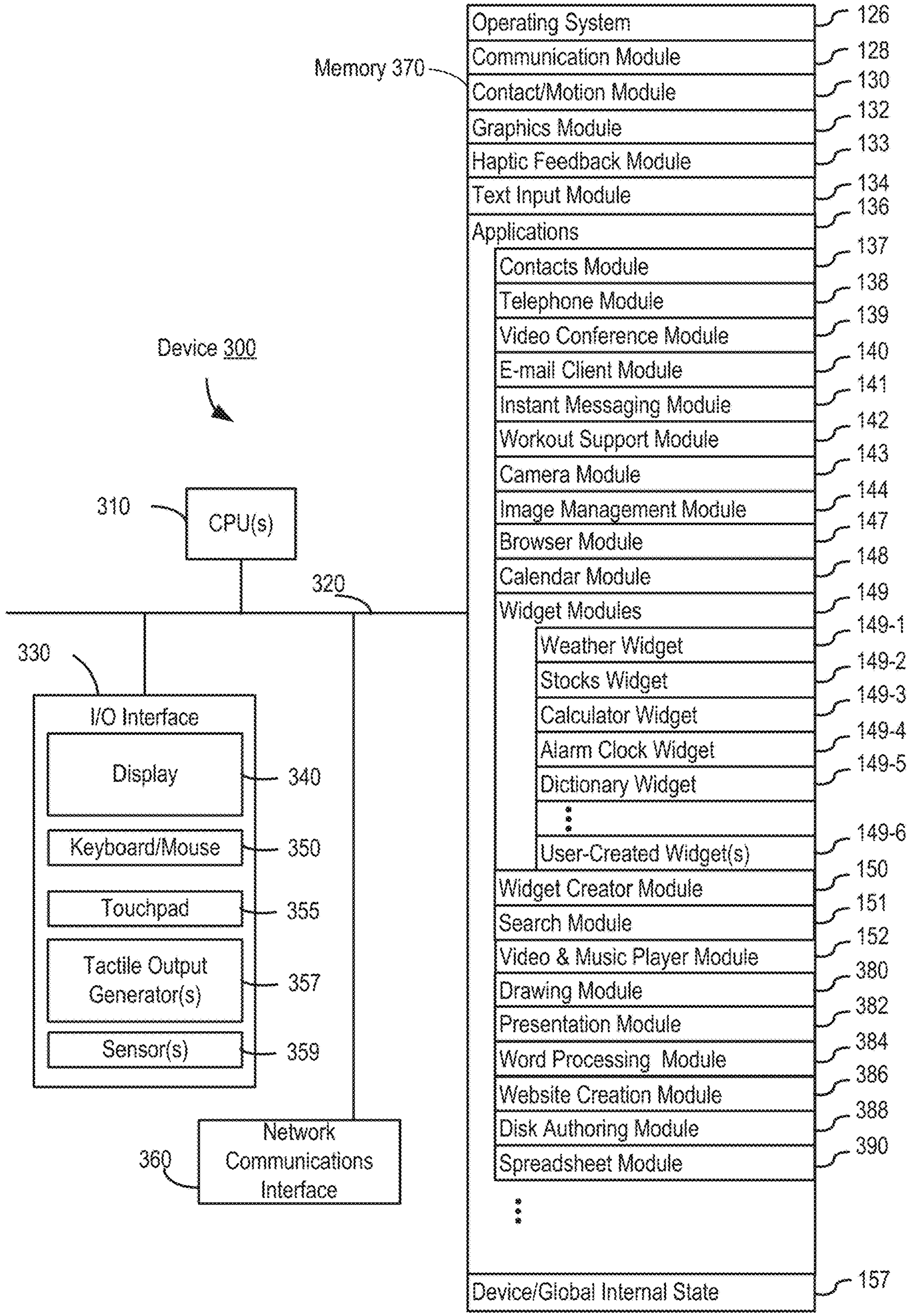
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
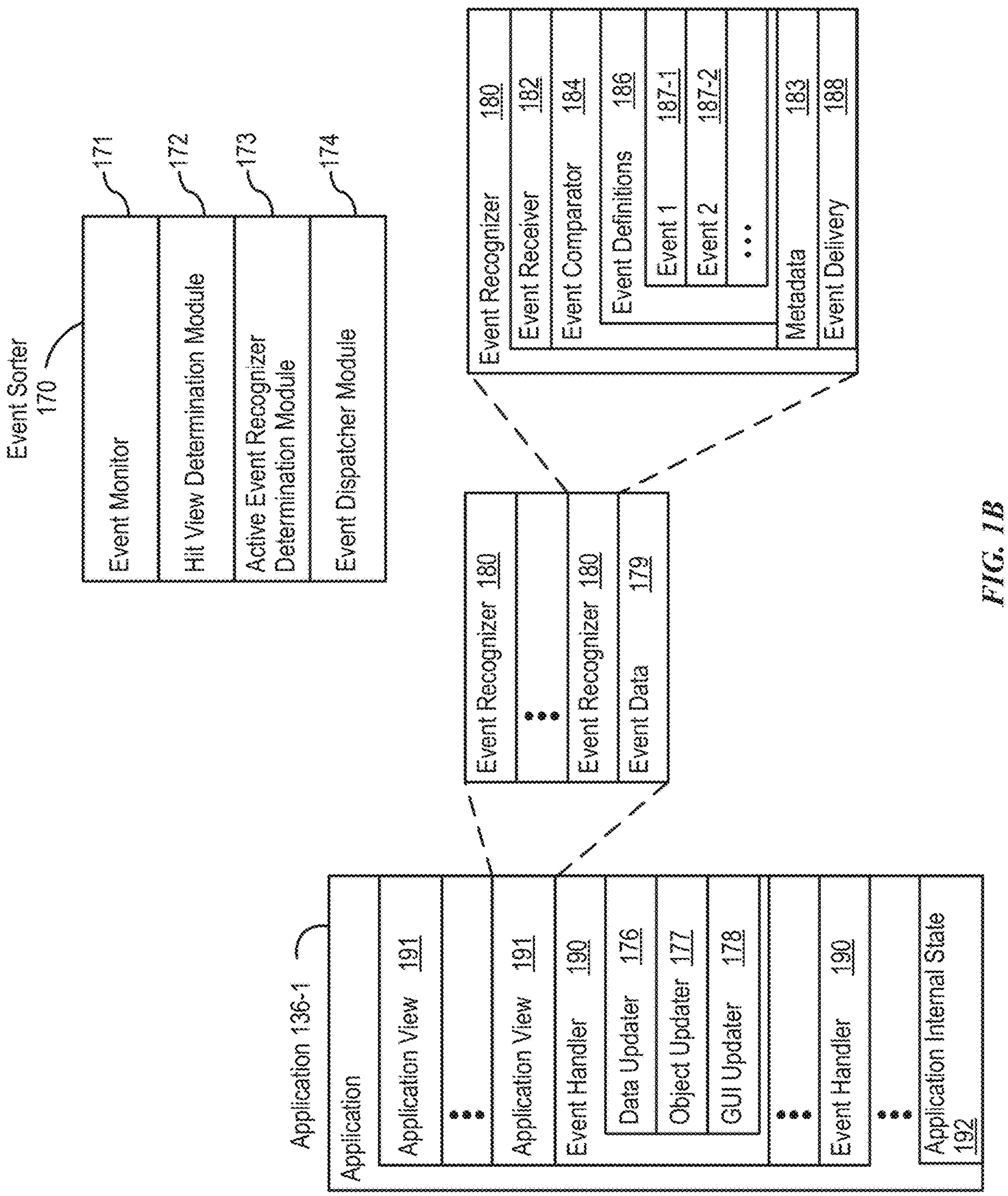
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
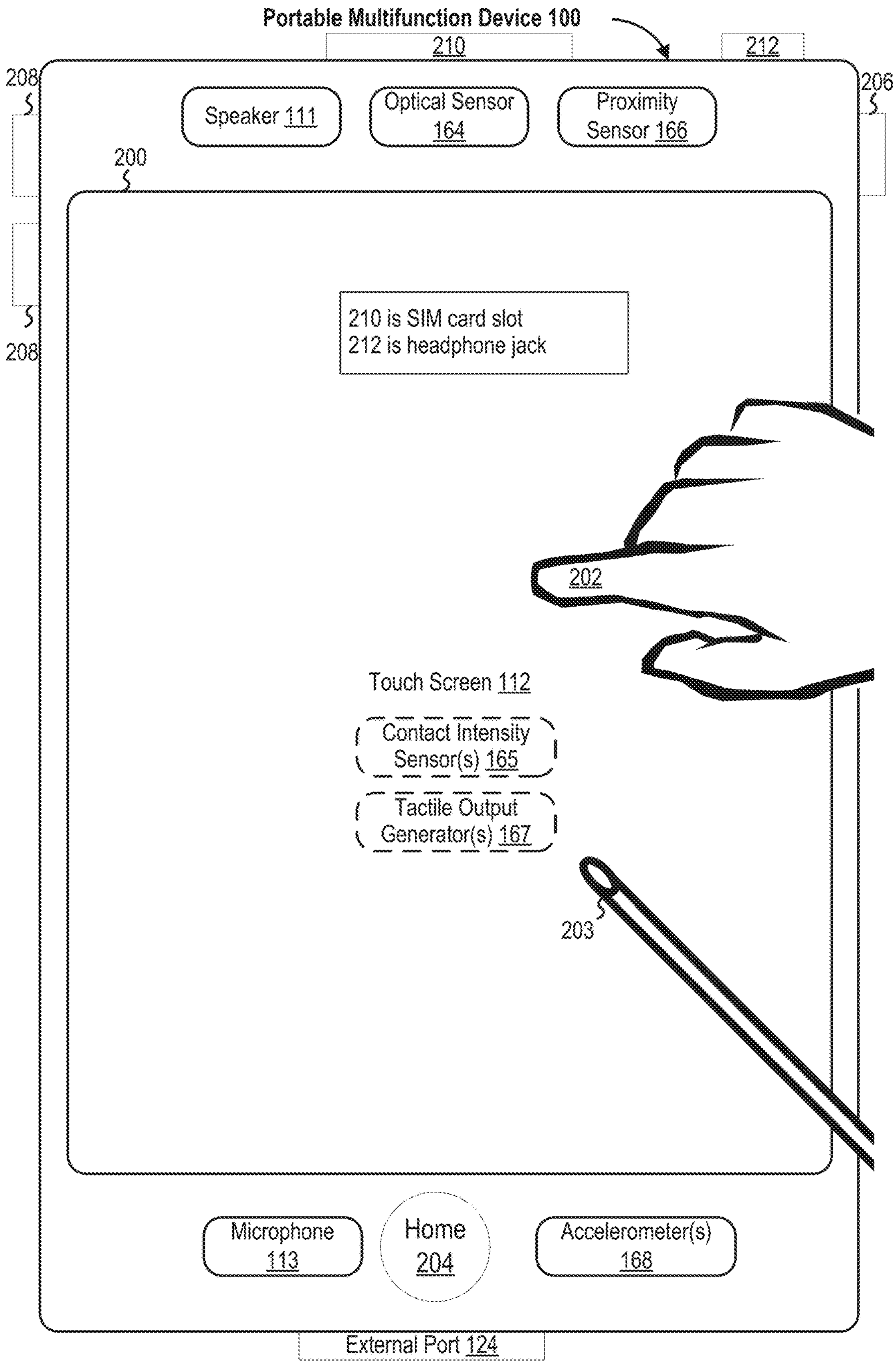
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
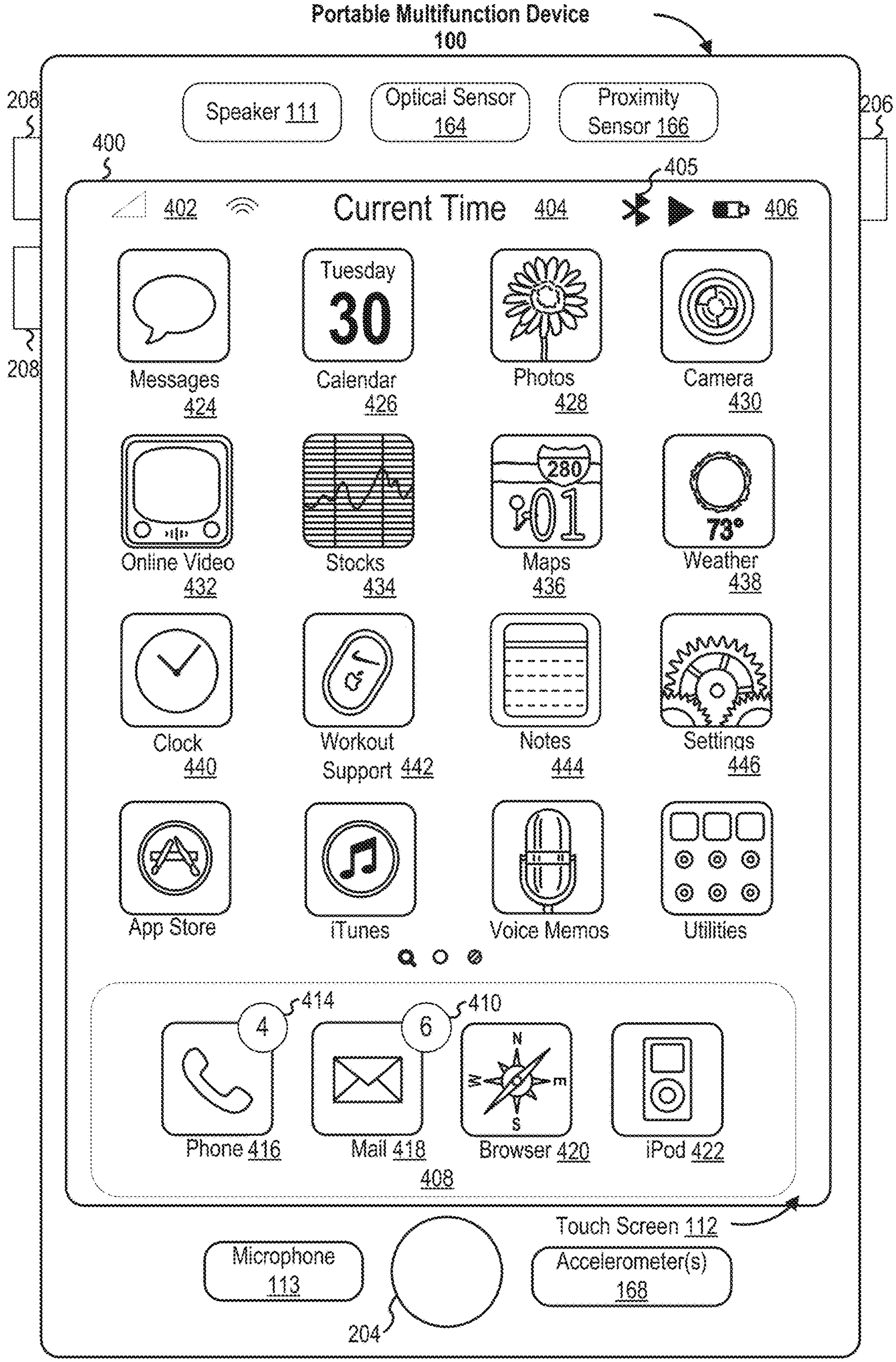
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
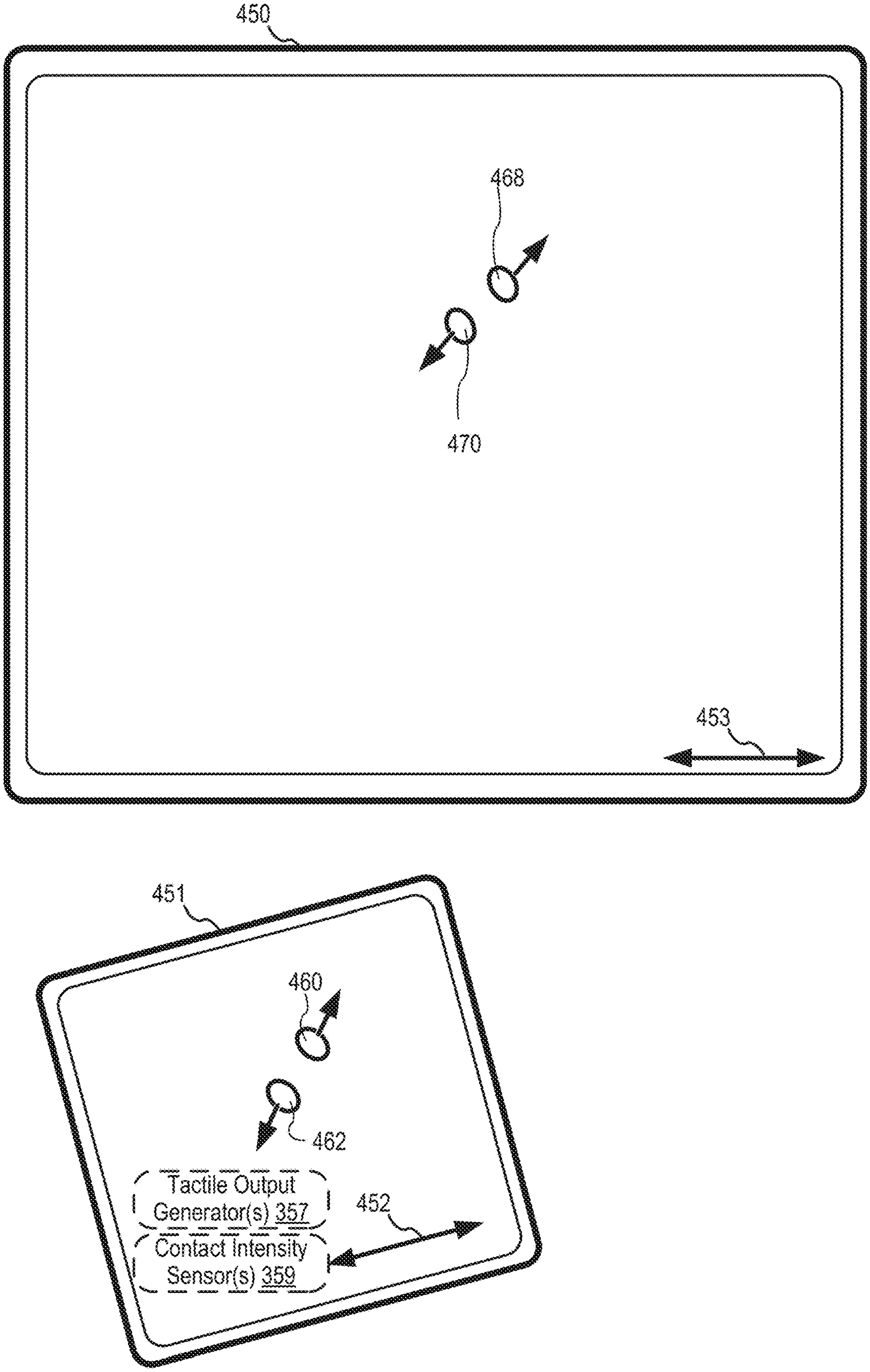
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
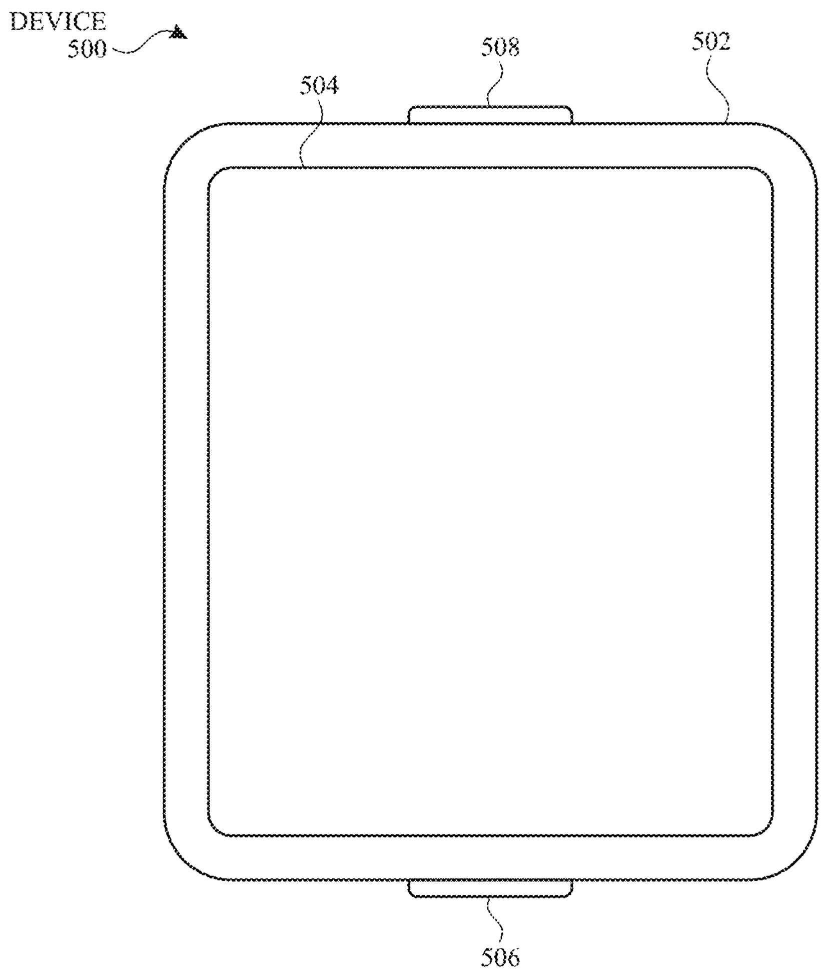
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
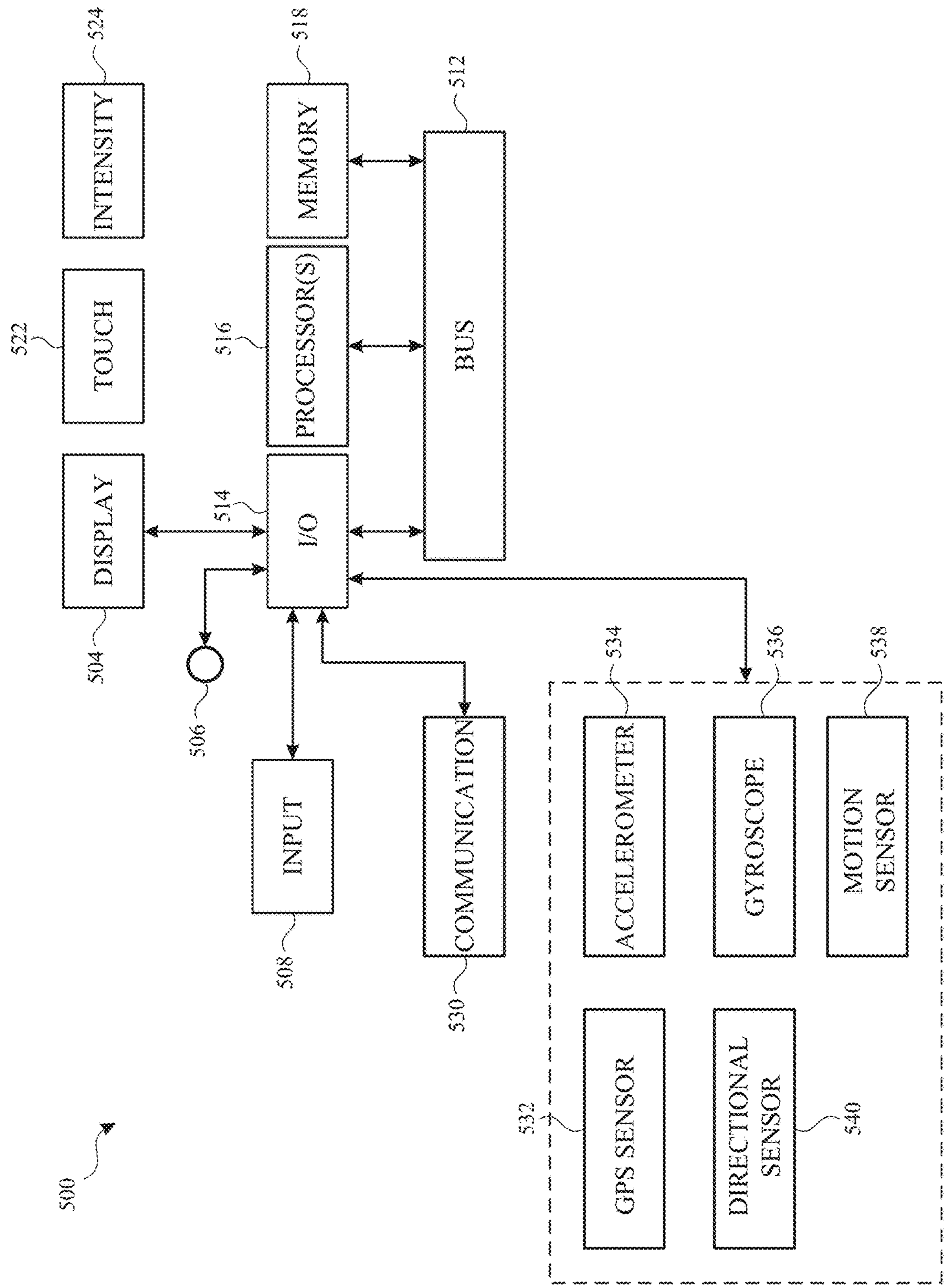
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1200, 1400, 1600, 1800, 2000, and 2200 (FIGS. 7, 8, 10, 12, 14, 16, 18, 20, and 22, respectively). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.5, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6L illustrate exemplary user interfaces for initiating a communication when a terrestrial wireless communication network is not reachable by a computer system in accordance with some embodiments. The user interfaces in these figures are used to illustrate the processes described below, including the processes in FIGS. 7 and 8.

In some embodiments, any of the inputs described herein (e.g., input 610A, 610B, 610C, 610D, 606G, 610I, 612M, 610M, 613M, 616M, 618M, 622M, 624M, 608N, 616M, 608O, 610O 608P, 608Q, 604R, 604S, and/or 610S) is or includes a touch input (e.g., a tap gesture and/or a swipe gesture). In some embodiments, any of the inputs described herein (e.g., input 610A, 610B, 610C, 610D, 606G, 610I, 612M, 610M, 613M, 616M, 618M, 622M, 624M, 608N, 616M, 608O, 610O, 608P, 608Q, 604R, 604S, and/or 610S) is or includes a voice input (e.g., a voice command to select a user interface element or to activate a feature or perform a function, such as a feature or function associated with a user interface element). In some embodiments, any of the inputs described herein (e.g., input 610A, 610B, 610C, 610D, 606G, 610I, 612M, 610M, 613M, 616M, 618M, 622M, 624M, 608N, 616M, 608O, 610O, 608P, 608Q, 604R, 604S, and/or 610S) is or includes an air gesture (e.g., an air gesture to select a user interface element or to activate a feature or perform a function, such as a feature or function associated with a user interface element). In some embodiments, any of the inputs described herein (e.g., input 610A, 610B, 610C, 610D, 606G, 610I, 612M, 610M, 613M, 616M, 618M, 622M, 624M, 608N, 616M, 608O, 610O, 608P, 608Q, 604R, 604S, and/or 610S) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

Figure 6B:
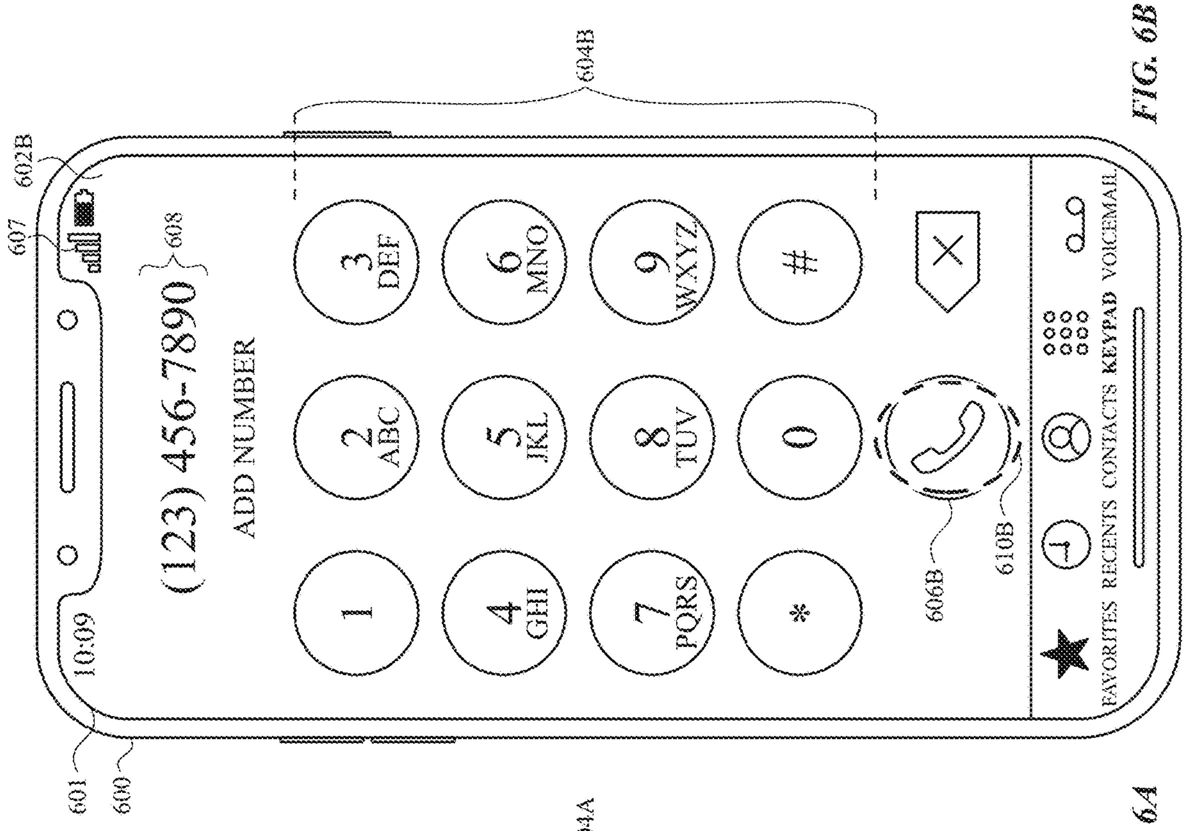
FIGS. 6A-6Y illustrate exemplary user interfaces for initiating a communication when a terrestrial wireless communication network is not reachable and for communicating in a low-bandwidth mode, in accordance with some embodiments.
Figure 6A:
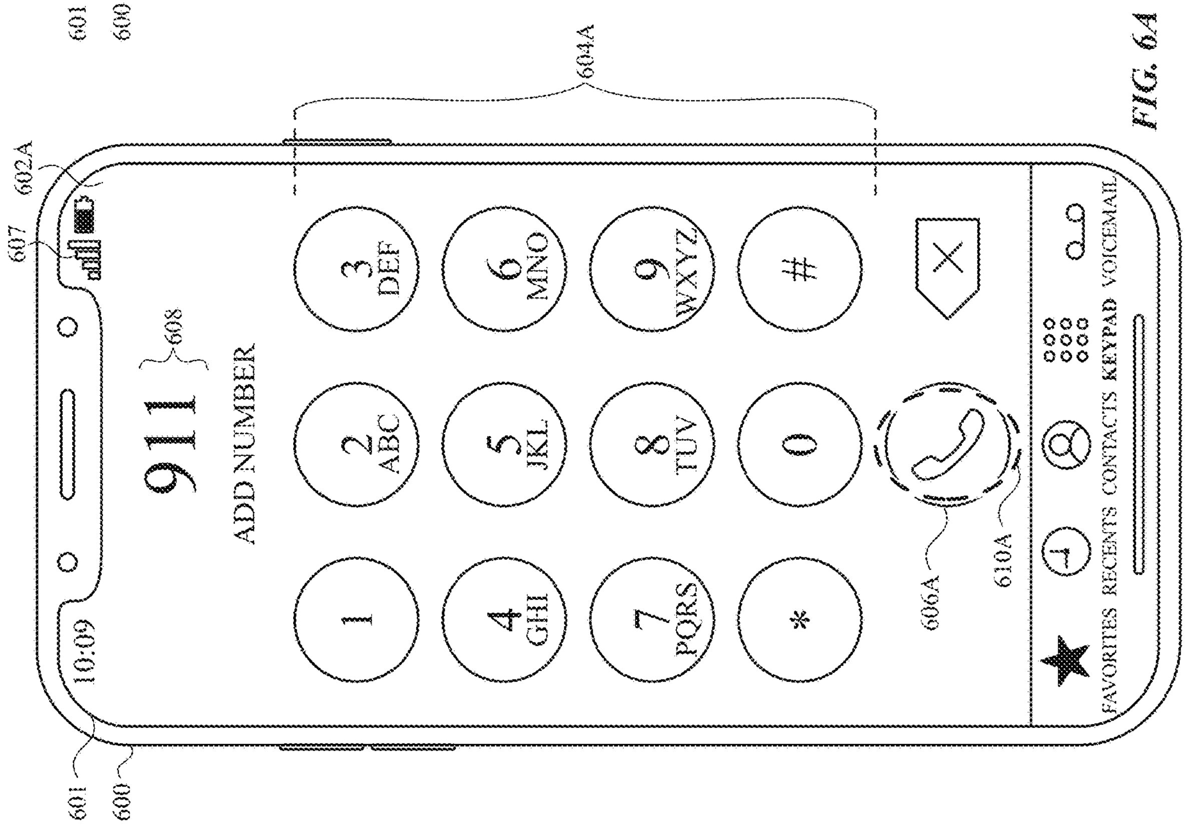
Figure 6C:
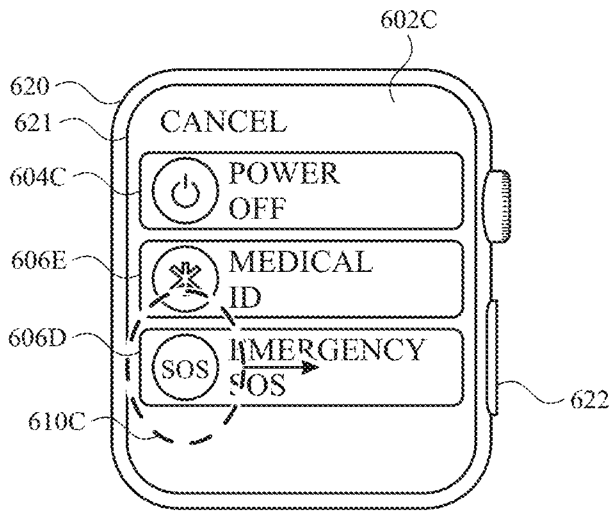
Figure 6D:
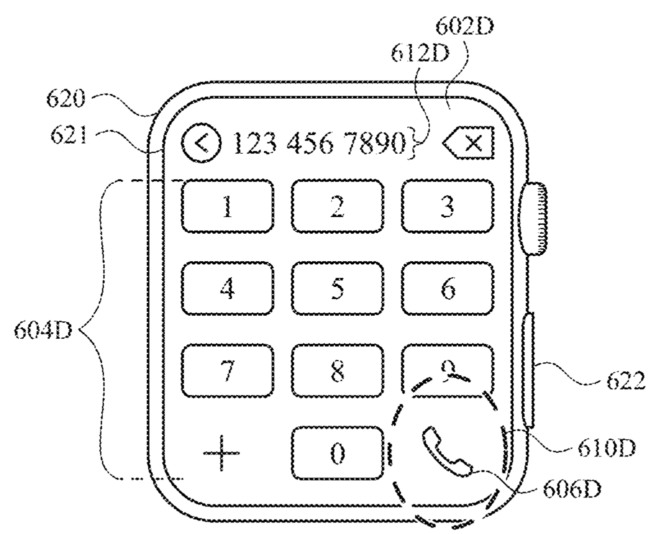

FIGS. 6A-6D illustrate exemplary interfaces for initiating a communication such as, e.g., an audio call and/or a text message. FIGS. 6A and 6C include interfaces for initiating a call with an emergency service (e.g., 911). FIGS. 6B and 6D include interfaces for initiating a call with a non-emergency service.

FIGS. 6A and 6B illustrate the process for attempting to initiate a call to an emergency service and a non-emergency entity. FIGS. 6A and 6B display computer system 600 with touch-sensitive display 601. In FIGS. 6A and 6B, computer system 600 displays calling interfaces 602A and 602B, respectively, for initiating a call. Calling interfaces 602A and 602B include keypad 604A and 604B (respectively), text field 608, call button 606A and 606B (respectively), and network indicator 607. In some embodiments, in response to receiving a selection of a phone application affordance (e.g., on a home screen), computer system 600 displays calling interface 602A and calling interface 602B.

Network indicator 607 displays the availability of computer system 600 to communicate with a terrestrial wireless communication to transmit a communication (e.g., initiate a call). In some embodiments, the terrestrial wireless communication network is a cellular network and/or and internet network (e.g., Wi-Fi). Computer system 600 determines the availability of the cellular network based on the strength and consistency of the cellular network to communicate with computer system 600. In FIGS. 6A-6B, network indicator 607 displays a cellular network is available to initiate a call. However, in some embodiments, computer system 600 receives a request to initiate a call when the cellular network is unavailable.

In FIG. 6A, computer system 600 detects one or more inputs on keypad 604 and input 610A (e.g., a tap gesture or other selection input) on call button 606A to dial a number for an emergency service. Computer system 600 displays the emergency service as 911 in text field 608. Other emergency services can be contacted as described below; for example: 999 in the United Kingdom, 110 and/or 119 in Japan, and 000 in Australia.

In response to detecting input 610A on call button 606A, computer system 600 attempts to initiate a call to the emergency service and displays calling interface 602E shown in FIG. 6E discussed below.

In FIG. 6B, computer system 600 detects one or more inputs on keypad 604B and input 610B (e.g., a tap gesture or other selection input) on call button 606B to dial a non-emergency entity. Computer system 600 displays the non-emergency entity as 123-456-7890. In some embodiments, a non-emergency entity is a contactable entity or phone number not associated with an emergency service, for example: a friend or a store.

In response to detecting input 610B on call button 606B, computer system 600 attempts to initiate a call and connect to the non-emergency entity and displays calling interface 602F shown in FIG. 6F described below.

FIGS. 6C and 6D illustrate an alternative process from FIGS. 6A and 6B for attempting to initiate a call to an emergency service and a non-emergency entity. FIGS. 6C and 6D display exemplary user interfaces for initiating a call using external computer system 620 with touch-sensitive display 621. In FIGS. 6C and 6D external computer system 620 displays watch interfaces 602C and 602D for initiating a call.

In FIG. 6C, watch interface 602C includes power off slider 604C, medical ID slider 606C, and emergency SOS slider 608C. In response to detecting an input on power off slider 604C, external computer system 620 turns off. In response to detecting an input on medical ID slider 606C, external computer system 620 displays medical identification information about a user of external computer system 620. In some embodiments, the external computer system 620 displays watch interface 602C in response to external computer system 620 detecting an input, for example an input (e.g., a press and hold) on button 622 or a voice command (e.g., to "display power options").

In response to detecting input 610C on emergency SOS slider 608C, external computer system 620 attempts to initiate a call and connect to the emergency service. In some embodiments, external computer system 620 can initiate the call by sending a request to a paired computer system 600 to dial the emergency service and display calling interface 602F on computer device 600 of FIG. 6F described below.

In FIG. 6D watch interface 602D includes a keypad 604D, end call button 606D, and a text field 612D. External computer system 620 detects one or more inputs (e.g., a tap gesture or other selection input) on keypad 604D to dial a non-emergency number "123-456-7890". The external computer system 620 displays watch interface 602D in response to one or more inputs to select a phone affordance for initiating communications.

In response to receiving input 610D on call button 606D, external computer system 620 attempts to initiate the call and connect to the non-emergency number and displays calling interface 602F of FIG. 6F described below. In some embodiments, the one or more inputs on the keypad 604D dial an emergency number (e.g., "911") and in response to receiving input 610D on call button 606D, external computer system 620 attempts to initiate the call and connect to the emergency service, displaying calling interface 602E of FIG. 6E described below.

Figure 6F:
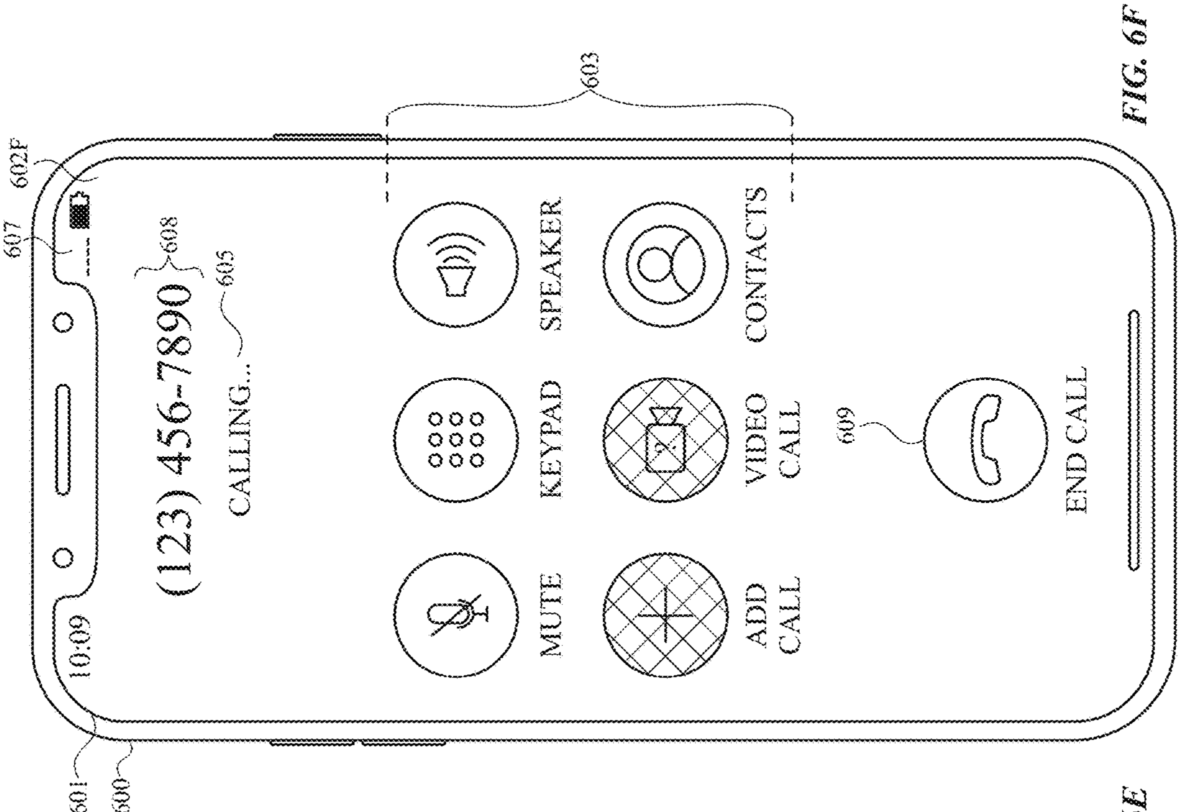
Figure 6E:
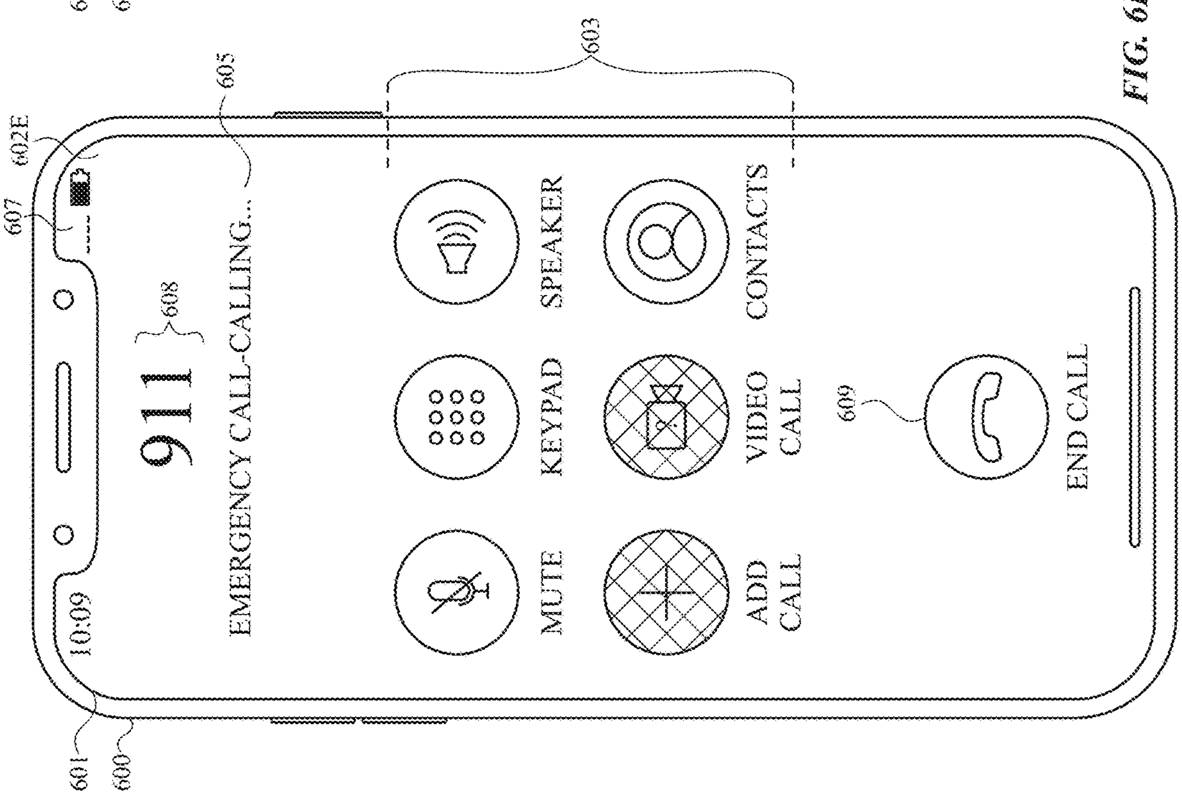
Figure 6H:
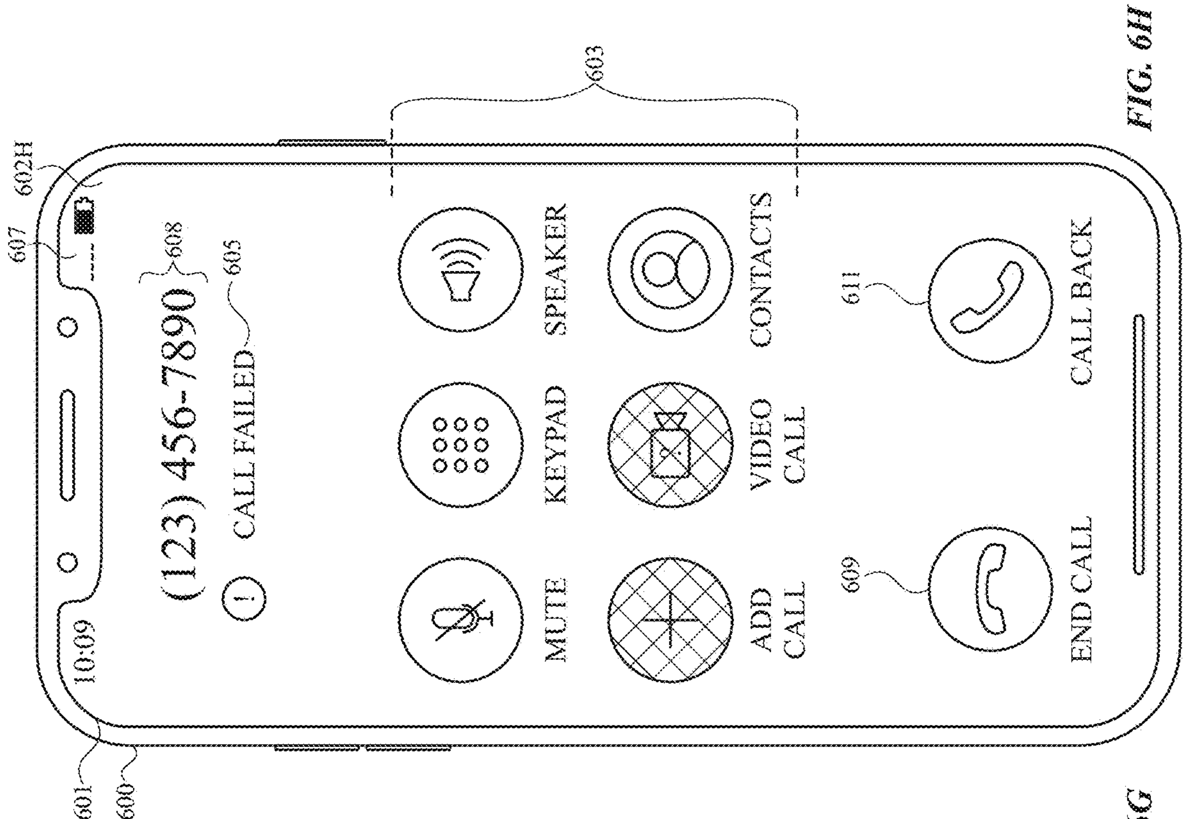
Figure 6G:
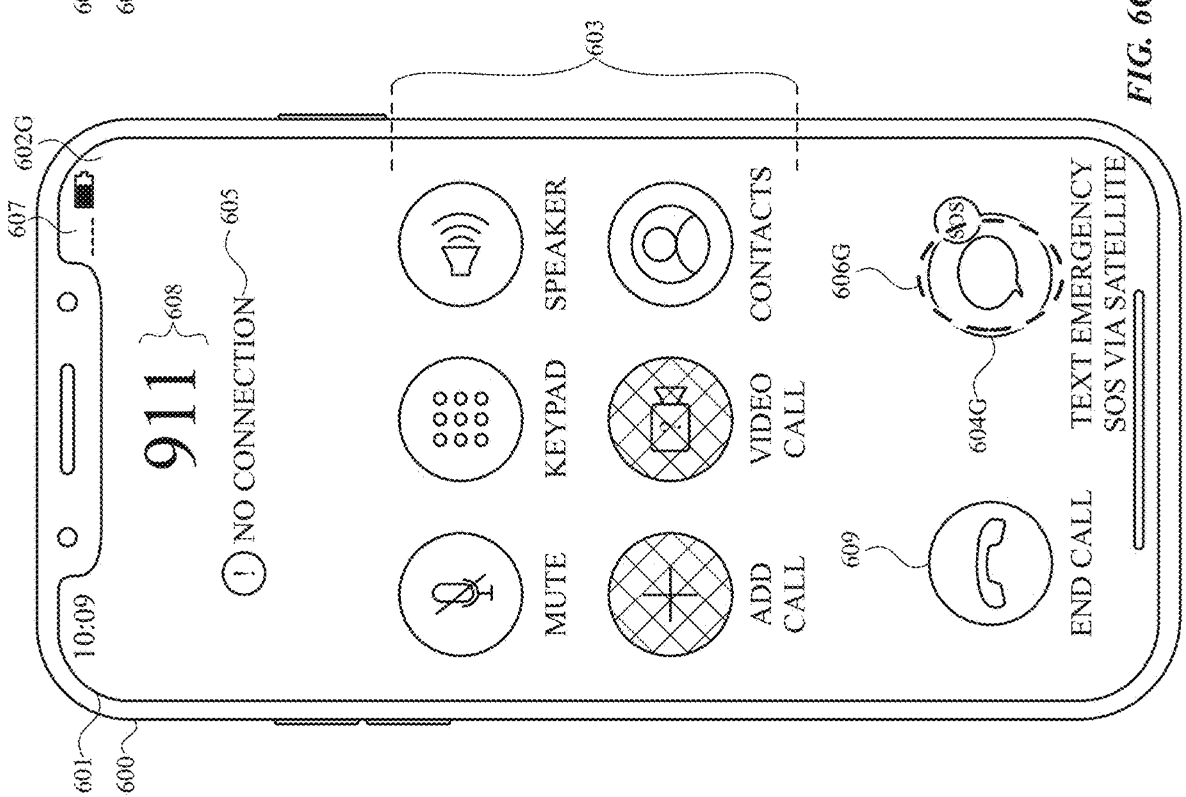
Figure 6J:
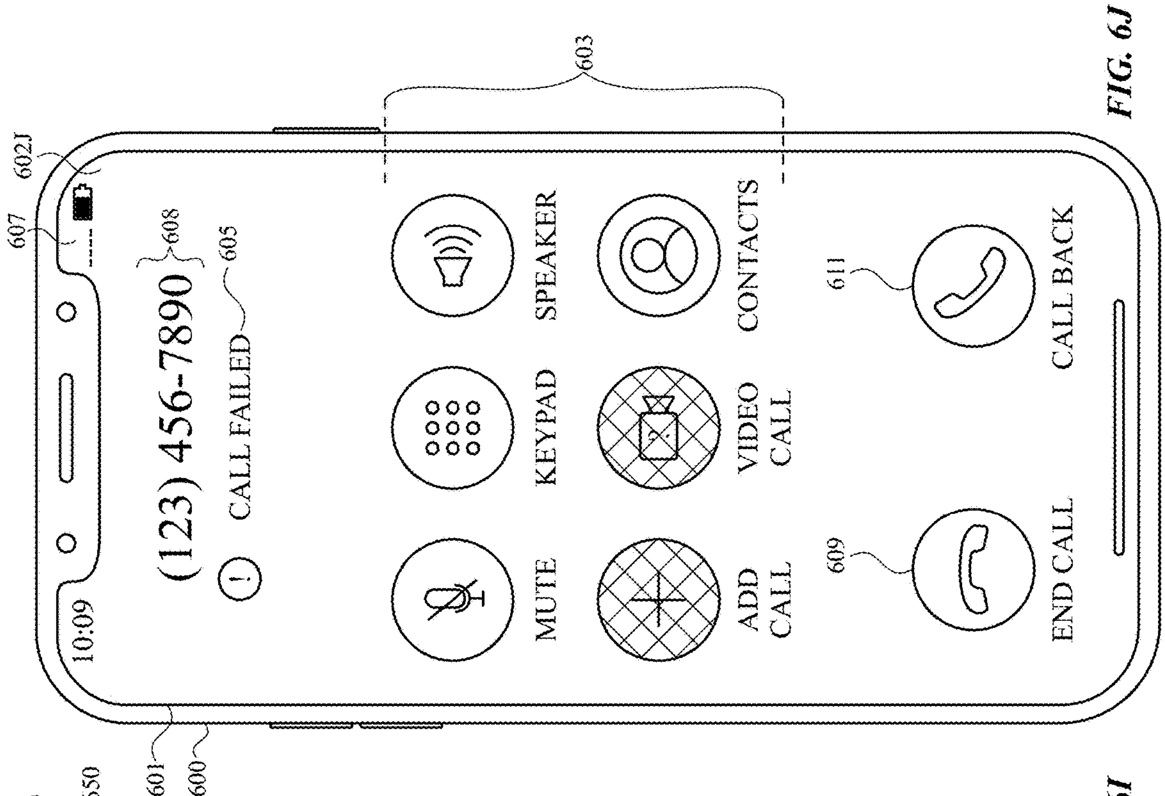
Figure 6I:
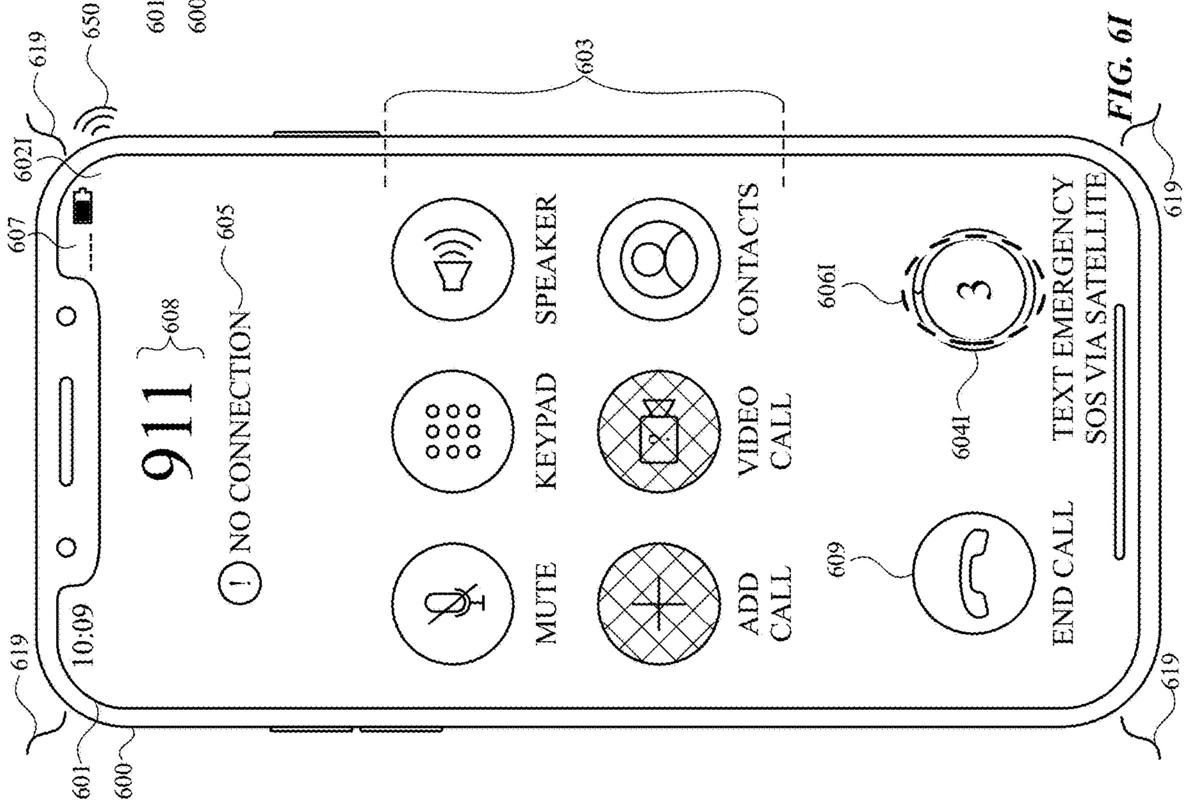

In FIGS. 6E-6J, computer system 600 displays interfaces for managing a communication when no cellular service is available. FIGS. 6E, 6G, and 6I include interfaces for managing a call with an emergency service, and FIGS. 6F, 6H, and 6J include interfaces for managing a call with a non-emergency service. In FIGS. 6E-6J, computer system 600 updates (e.g., replaces) network indicator 607 to indicate that no terrestrial wireless communication network is available to initiate the call. In some embodiments, determining that no terrestrial wireless communication network is available includes trying other carrier cellular networks other than networks associated with computer system 600 (e.g., the phone SIM or eSIM). Connection indicator 605 can initially display, e.g., "calling" when attempting to initiate a call, and then displays, e.g., "no connection" to indicate that no terrestrial wireless communication network is available to connect a call.

End call button 609 is a selectable button for ending a call or ceasing to attempt to initiate a call. In response to receiving a selection of end call button 609, computer system 600 displays calling interface 602A described in FIG. 6A.

Figure 6L:
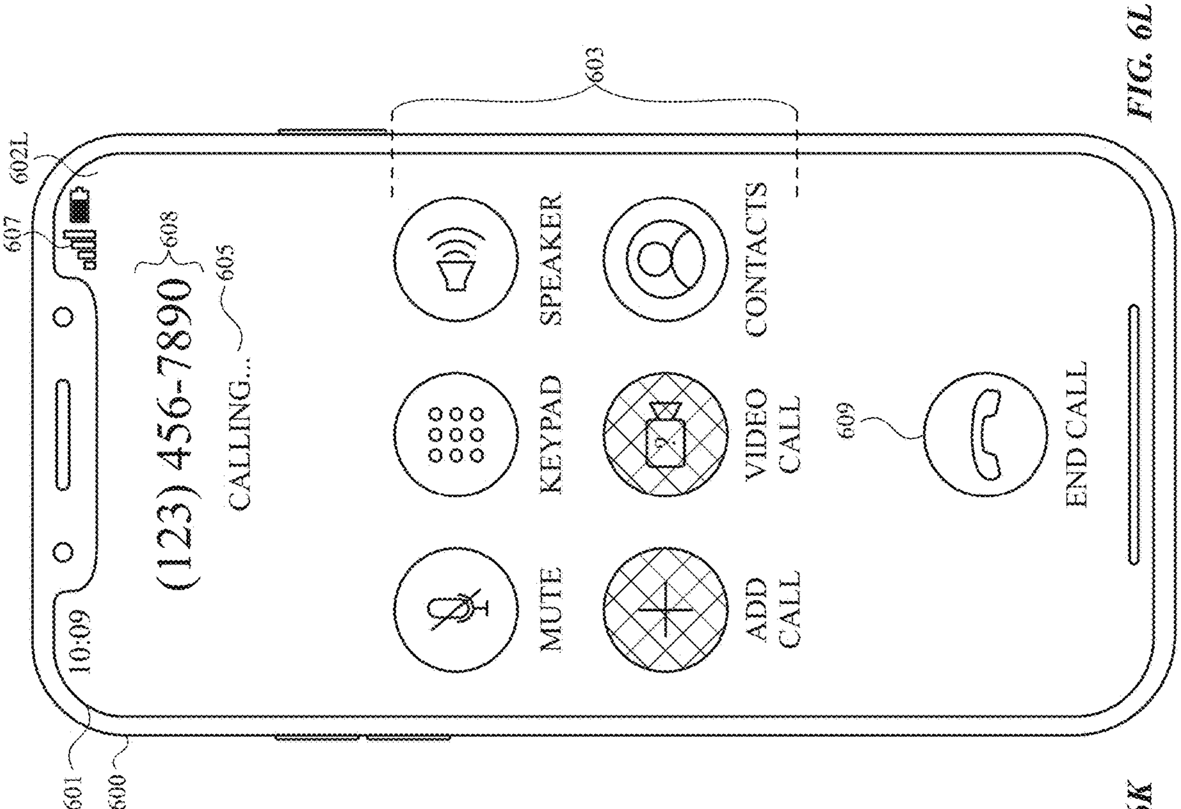
Figure 6K:
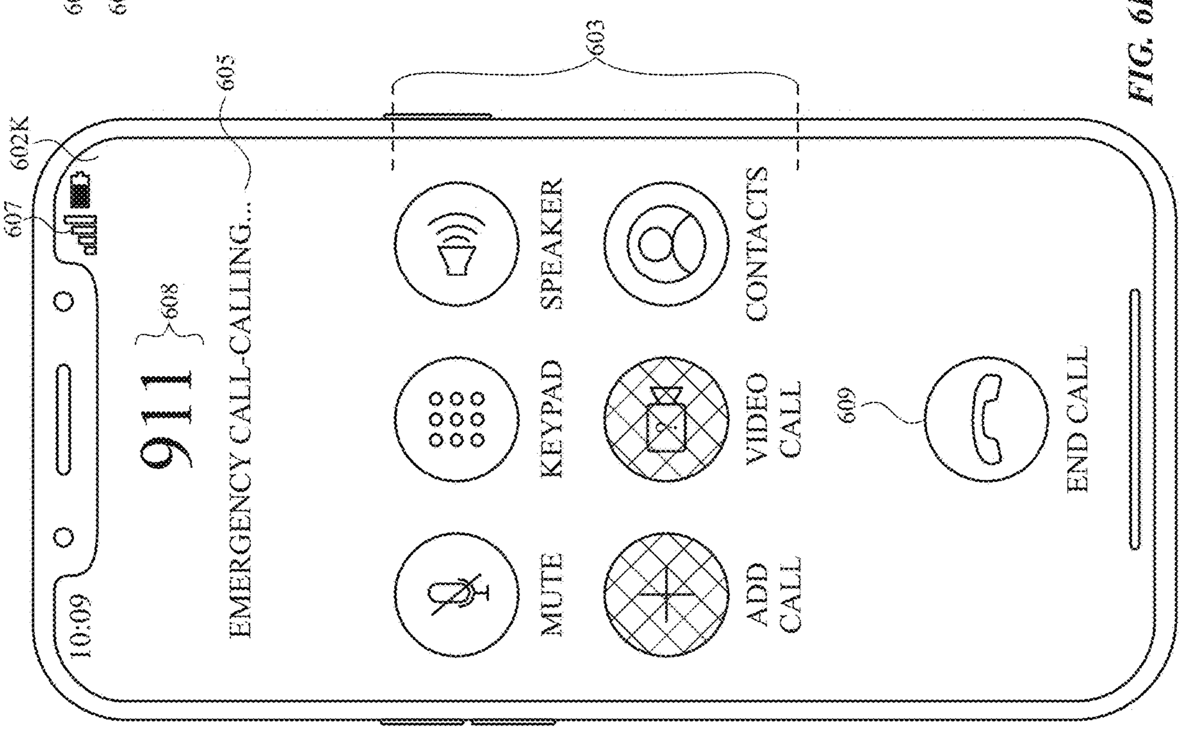

In FIGS. 6E-6J, computer system 600 displays call management buttons 603 (e.g., as displayed and described further in FIGS. 6K-6L). Call management buttons 603 are various selectable buttons that provide functions for managing a call. In some embodiments, in response to a determination that no cellular service is available, computer system 600 displays call management buttons 603 as non-selectable (e.g., greyed out). In some embodiments, computer system 600 forgoes display of call management buttons 603 in FIGS. 6E-6J in response to a determination that no cellular service is available.

FIGS. 6E and 6F illustrate the continuation of the process for attempting to initiate a call to an emergency service and a non-emergency entity from FIGS. 6A and 6C, and FIGS. 6B and 6D, respectively. In FIGS. 6E and 6F, computer system 600 displays call management interfaces 602E and 602F, respectively, for managing a call.

In FIG. 6E, call management interface 602E displays a call to 911 in text field 608 to indicate that a call to the emergency service has been initiated. In some embodiments, computer system 600 displays call management interface 602E in response to detecting input 610A on call button 606 of FIG. 6A to attempt to initiate a call to emergency services. In some embodiments, computer system 600 displays managing interface 602E in response to detecting input 610C on emergency SOS slider 608C of FIG. 6C. After a threshold amount of time displaying call management interface 602E without successfully initiating the call, computer system 600 displays call management interface 602G described in FIG. 6G below.

In some embodiments, computer system 600 displays an animated transition from call management interface 602E to call management interface 602G that includes an animation over time of end call button 609 moving (e.g., sliding) to the left over time (e.g., as shown in FIG. 6F1) and then display of text via satellite communication button 604G (e.g., as shown in FIG. 6F2). In some embodiments, as shown in FIGS. 6F1, 6F2, and 6G, computer system 600 outputs haptic output 619 and/or audio output 650 when initiating display of text via satellite communication button 604G (e.g., in FIG. 6F1) and/or when displaying text via satellite communication button 604G (e.g., in FIG. 6F2 and/or FIG. 6G). Outputting a non-visual output (e.g., haptic output 619 and/or audio output 650) notifies the user that the option to text via satellite is available if the user is not looking at display 601 (e.g., if computer system 600 is against the user's ear).

In FIG. 6F, computer system 600 displays call management interface 602F while attempting to initiate the call to non-emergency number 123-456-7890. Computer system 600 displays call management interface 602F in response to detecting input 610B on call button 606 of FIG. 6B or in response to receiving input 610D on call button 606D of FIG. 6D above.

FIGS. 6G and 6H illustrate the continuation of the process for attempting to initiate a call to an emergency service and a non-emergency entity from FIG. 6E (or FIG. 6F2) and FIG. 6F, respectively.

In FIG. 6G, because computer system 600 is attempting to initiate a call to an emergency service when no terrestrial wireless communication network is reachable, computer system 600 displays that there is no connection in connection indictor 605 and displays text via satellite communication button 604G in call management interface 602G.

In some embodiments, in response to a determination that no terrestrial wireless communication network is reachable, computer system 600 displays call back option 611 (e.g., as shown and described with respect to FIG. 6H). In response to receiving an input on call back option 611, computer system 600 attempts to initiate the call again via a terrestrial wireless communication network. In some embodiments, when no terrestrial wireless communication network is reachable, computer system 600 replaces call back option with text via satellite communication button 604G (e.g., after a predetermined amount of time). In some embodiments, when a call to an emergency service or number is attempted but fails (e.g., because no terrestrial wireless communication network is reachable), computer system 600 continues to attempt to initiate a call to the emergency service or number via a terrestrial wireless communication network (e.g., as a background process).

In response to detecting input 606G on text via satellite communication button 604G, computer system 600 initiates a process for sending a text message via one or more satellites and displays reporting interface 602M shown in FIG. 6M discussed below. In some embodiments, computer system 600 continues attempting to initiate the call via a terrestrial wireless communication network while displaying text via satellite communication button 604G. After a threshold amount of time (e.g., 3 seconds, 5 seconds, or 10 seconds) of displaying call management interface 602G without receiving user input, computer system 600 initiates a countdown in text via satellite communication button 604G in call management interface 602I described in FIG. 6I below.

In FIG. 6H, call management interface 602H for the call to the non-emergency entity is displayed at a point in the call initiation process analogous to call management interface 602F of FIG. 6G for the call to the emergency service. For example, computer system 600 displays call management interface 602H in response to displaying call management interface 602F (e.g., as described in FIG. 6F) for a threshold amount of time without receiving an input. In FIG. 6H, connection indicator displays (e.g., is updated to display) that the call has failed. In contrast to call management interface 602G for the call to the emergency service, because the call in FIG. 6H is to a non-emergency entity, computer system 600 displays call back button 611 rather than displaying an option to send a text message (e.g., text via satellite communication button 604G). For example, for communications to non-emergency contacts, the computer system 600 forgoes display of the text via satellite communication button. In some embodiments, computer system 600 can display the text via satellite option for non-emergency communications, and in response to receiving an input on the text via satellite option, display the reporting interface 602M shown in FIG. 6M discussed below.

FIGS. 6I and 6J illustrate the continuation of the process for attempting to initiate a call to an emergency service and a non-emergency entity from FIGS. 6G and 6H, respectively. In FIG. 6I, call management interface 602I replaces call management interface 602G, with text via satellite communication button 604I indicating a countdown of remaining time. In some embodiments, the countdown indicates a remaining time until a message (e.g., an emergency SOS message) is sent automatically via satellite communication. In some embodiments, the countdown indicates a remaining time until computer system 600 enters a mode for generating and sending an emergency communication via satellite communication (e.g., FIG. 6L1 or FIG. 6M). In some embodiments, as shown in FIG. 6I, computer system 600 outputs haptic output 619 and/or audio output 650 when initiating the countdown. Outputting a non-visual output (e.g., haptic output 619 and/or audio output 650) notifies the user that the countdown has started if the user is not looking at display 601 (e.g., if computer system 600 or a display generation component of computer system 600 is against the user's ear).

In FIG. 6I, before the countdown expires, computer system 600 detects input 606I on text via satellite communication button 604I. In response to detecting input 606I on the text via satellite communication button 604I, computer system 600 initiates a process for sending a text via one or more satellites and displays information interface 602L1 (e.g., as shown in FIG. 6L1) or managing interface 602M (e.g., as shown in FIG. 6M).

In FIG. 6J, managing interface 602J is similar to managing interface 602F and 602H of FIGS. 6F and 6H, respectively. Managing interface 602J does not include a text via satellite communication button 604I, nor a countdown of remaining time until a message is sent automatically. In some embodiments, non-emergency communications can display the text via satellite option and/or an amount of time remaining, and in response to receiving an input on the text via satellite option the computer system 600 displays the managing interface 602M shown in FIG. 6M discussed below.

FIGS. 6K and 6L illustrate the continuation of the process for attempting to initiate a call to an emergency service and a non-emergency entity from FIGS. 6I and 6J. FIGS. 6K and 6L display computer system 600 with interfaces for managing a communication when cellular service is available. Calling interfaces 602K (in FIG. 6K) and 602L (in FIG. 6L) are analogous to calling interfaces 602E (in FIG. 6E) and 602F (in FIG. 6F), respectively, except that cellular service is available. In FIGS. 6K-6L, network indicator 607 indicates that a cellular service is available to initiate the call.

FIGS. 6K and 6L display computer system 600 with call management buttons 603. Call management buttons 603 are selectable buttons that provide functions for managing a call. Call management buttons include a mute button, keypad button, speaker button, add call button, video call button, and contacts button. In FIGS. 6K and 6L, computer system 600 displays add call button and video call button as unselectable (e.g., grayed out) out while computer system 600 initiates a call. In some embodiments, in response to computer system 600 connecting the call with the recipients, call button and videocall button are indicated as selectable (e.g., not grayed out).

In FIG. 6K, the computer system 600 displays call management interface 602K in response to detecting input 610A on call button 606 of FIG. 6A to attempt to initiate a call to emergency services. In some embodiments, computer system 600 displays call management interface 602E in response to detecting input 610C on emergency SOS slider 608C of FIG. 6C. In contrast to call management interface 602E, connection indicator 605 in call management interface 602K displays that the call to emergency services is calling (e.g., as opposed to no connection in call management interface 602E).

In FIG. 6L, computer system 600 displays managing interface 602L in response to detecting input 610B on call button 606 of FIG. 6B to attempt to initiate a call to a non-emergency entity. In some embodiments, the computer system 600 displays call management interface 602L in response to detecting input 610D on call button 606D of FIG. 6D. In contrast to call management interface 602F, connection indicator 605 in call management interface 602L displays that the call to non-emergency services is calling (e.g., as opposed to "CALL FAILED" in call management interface 602J).

FIGS. 6L1-6X4 illustrate exemplary user interfaces for communicating in a low-bandwidth communication mode, in accordance with some embodiments. In FIGS. 6L1-6W, the computer system 600 determines that no terrestrial wireless communication network is available to transmit the communication. For some communications, such as emergency messages, it may be desirable to send a message despite no terrestrial wireless communication network being available. In such cases, a message can be sent via an alternative communication network where bandwidth is limited, such as via a satellite or peer-to-peer networks. In some embodiments, a limited bandwidth message (e.g., "low-bandwidth message") is a compressed message with limited data for transmission.

In FIG. 6L1, computer system 600 displays information interface 602L1, which provides the user with information about the process of sending a message via the alternative communication network. In some embodiments, as shown in FIG. 6L1, computer system 600 outputs haptic output 619 and/or audio output 650 when displaying information interface 602L1. Outputting a non-visual output (e.g., haptic output 619 and/or audio output 650) notifies the user that computer system 600 has proceeded in the process of sending a message via an alternative communication network if the user is not looking at display 601 (e.g., if computer system 600 or a display generation component of computer system 600 is against the user's ear).

Information interface 602L1 includes graphical instruction 604L1, textual instructions 606L1, notification 608L1, textual instructions 610L1, information sharing notification 612L1, and selectable continue option 614L1. Graphical instruction 604L1 includes a graphical representation of a satellite and a graphical representation of a user's hand holding a computer system (e.g., a smartphone and/or computer system 600) to graphically show that computer system

600 can be used to communicate via a satellite communication. In some embodiments, as shown in FIG. 6L1, graphical instruction 604L1 includes an animation that shows the satellite moving along a path (e.g., a curve path represented by small dots) and/or the user's hand and/or computer system moving (e.g., side to side) to follow the satellite in order to demonstrate that the user can (or has to) move computer system 600 to align with a satellite. Textual instructions 606L1 instructs the user to be outside to get a connection between computer system 600 and a satellite. Notification 608L1 informs the user that messages sent via the alternative communication network (e.g., via satellite communication) will take longer to send than messages sent via a terrestrial network (e.g., a cellular network). Textual instructions 610L1 instruct the user to answer questions to get a faster response. Information sharing notification 612L1 informs the user that the user's location and medical information may be shared in the process of sending the communication via satellite. Selectable continue option 614L1 can be selected (e.g., via an input such as a tap or other selection input) to continue the process of sending a communication to an emergency service via satellite. In response to detecting selection 616L1 in FIG. 6L1, computer system 600 displays reporting interface 602M discussed with reference to FIG. 6M.

In FIGS. 6M-6Q, computer system 600 displays reporting interfaces 602M, 602N, 602O, 602P, and 602Q, which include first set of options 604M, second set of options 604N, third set of options 604O, fourth set of options 604P, and fifth set of options 604Q ("emergency options"), respectively. The selection(s) made to the emergency options are included in a low-bandwidth message that includes an emergency report. In some embodiments, the series of options are only available to communicate an emergency report when no terrestrial wireless communication network is available.

In some embodiments, computer system 600 connects to one or more satellites when no terrestrial wireless communication network is available to make a call. In the event the connection with the satellite is disrupted and the computer system 600 is not able to communicate with the satellite, computer system 600 can maintain display of the reporting interfaces 602M, 602N, 602O, 602P, and/or 602Q, and can continue to receive selections of the emergency options.

The emergency options display options corresponding to information for an emergency report. In response to inputs on the emergency options, the computer system 600 generates an emergency report without requiring display of a software keyboard. In some embodiments, the options provided by computer system 600 enable generation of a message capable of being transmitted by the low-bandwidth communication. In some embodiments, computer system 600 displays the emergency options without displaying a messaging user interface that includes a messaging conversation and/or history of messages.

Figure 6M:
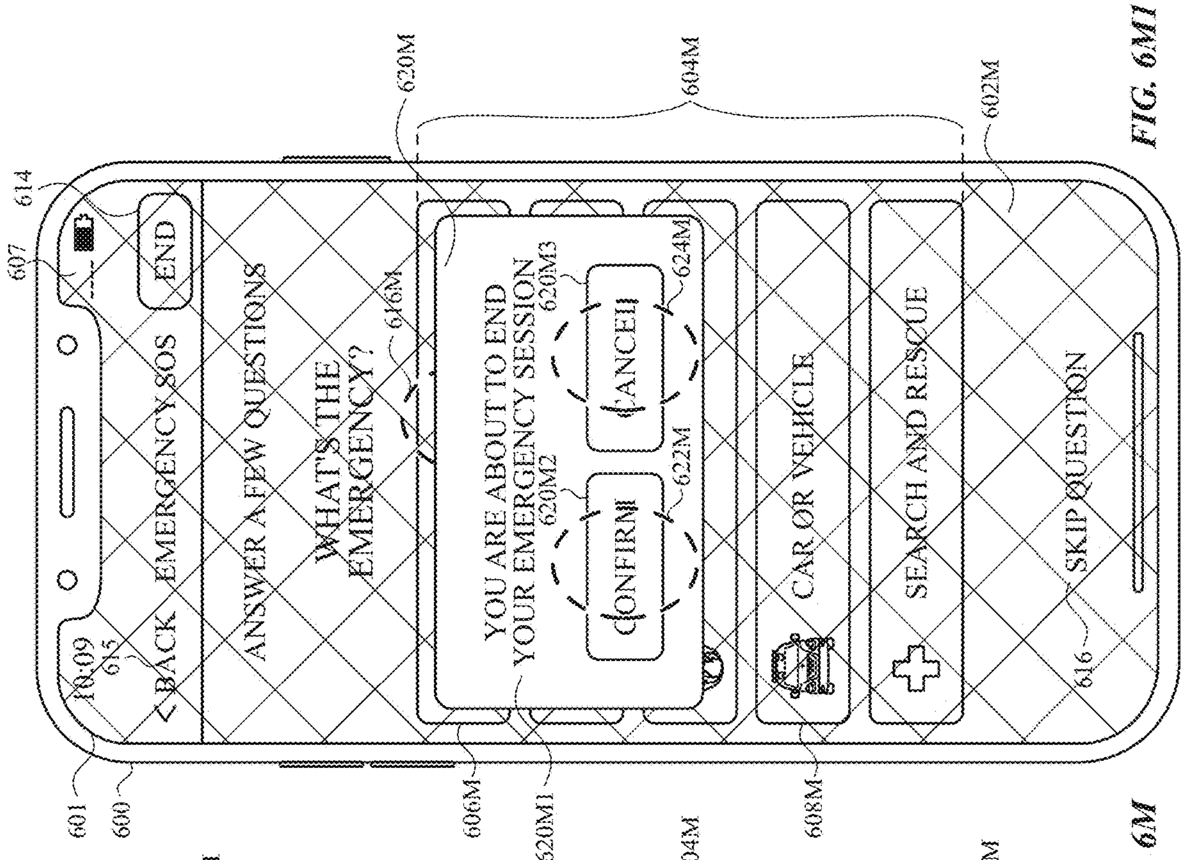
Figure 6M:
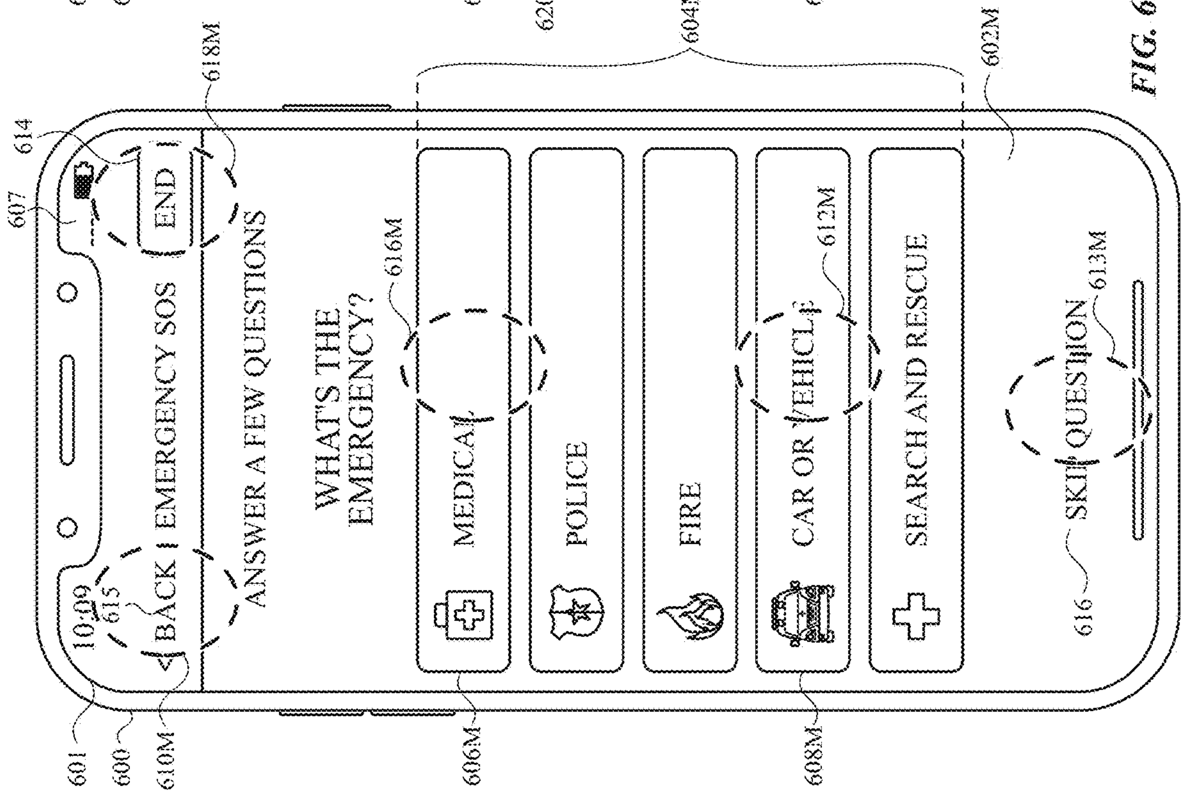

In FIG. 6M, computer system 600 displays reporting interface 602M. Reporting interface 602M includes an interface for receiving a selection of a type of emergency option via selection of an option from first set of options 604M. First set of options 604M includes selectable options for various types of emergencies (e.g., medical, police, fire, car or vehicle, and search and rescue). In response to receiving a selection of a type of emergency (e.g., an option of first set of options 604M), the type of emergency is included in the emergency report to be submitted to emergency services. For example, first set of options 604M includes medical option 606M and car or vehicle option 608M. In response to receiving input 616M on medical option 606M, computer system 600 displays reporting interface 602O of FIG. 6O, described below. In response to receiving input 612M on car or vehicle option 608M, computer system 600 displays reporting interface 602N of FIG. 6N.

In FIG. 6M, skip button 616 indicates a selection of one of the options of first set of options 604M can be skipped. In response to receiving input 613M on skip option 616, computer system 600 displays user interface 602P described in FIG. 6P. Although the computer system 600 displays skip button 616 as being selectable in reporting interface 602M, in some embodiments the first set of options 604M are not skippable. Skippable emergency options display the skip button 616 to proceed to a subsequent set (e.g., a next set) of emergency options. If a set of options is not skippable, computer system 600 forgoes display of the skip button 616 (e.g., displays a user interface without displaying skip button 616). In some embodiments, skip button 616 is greyed out, to indicate skip button 616 is not selectable.

Figure 6O:
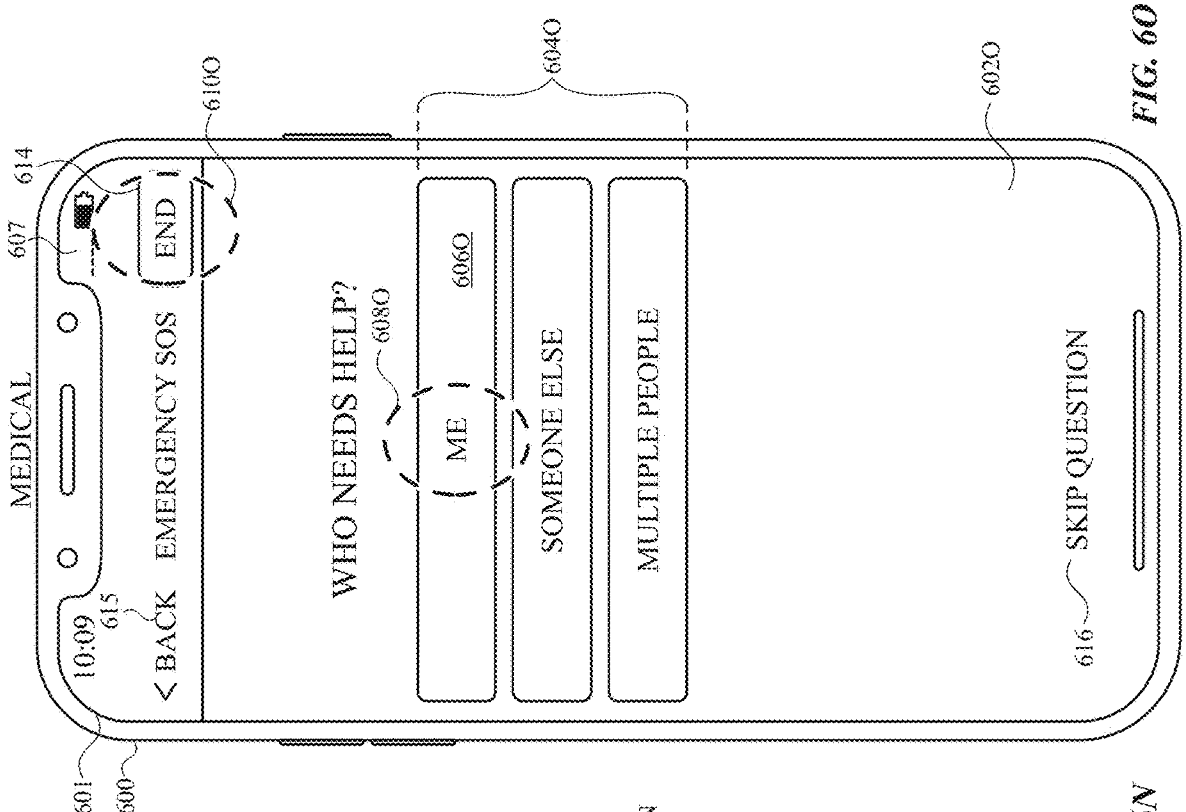
Figure 6N:
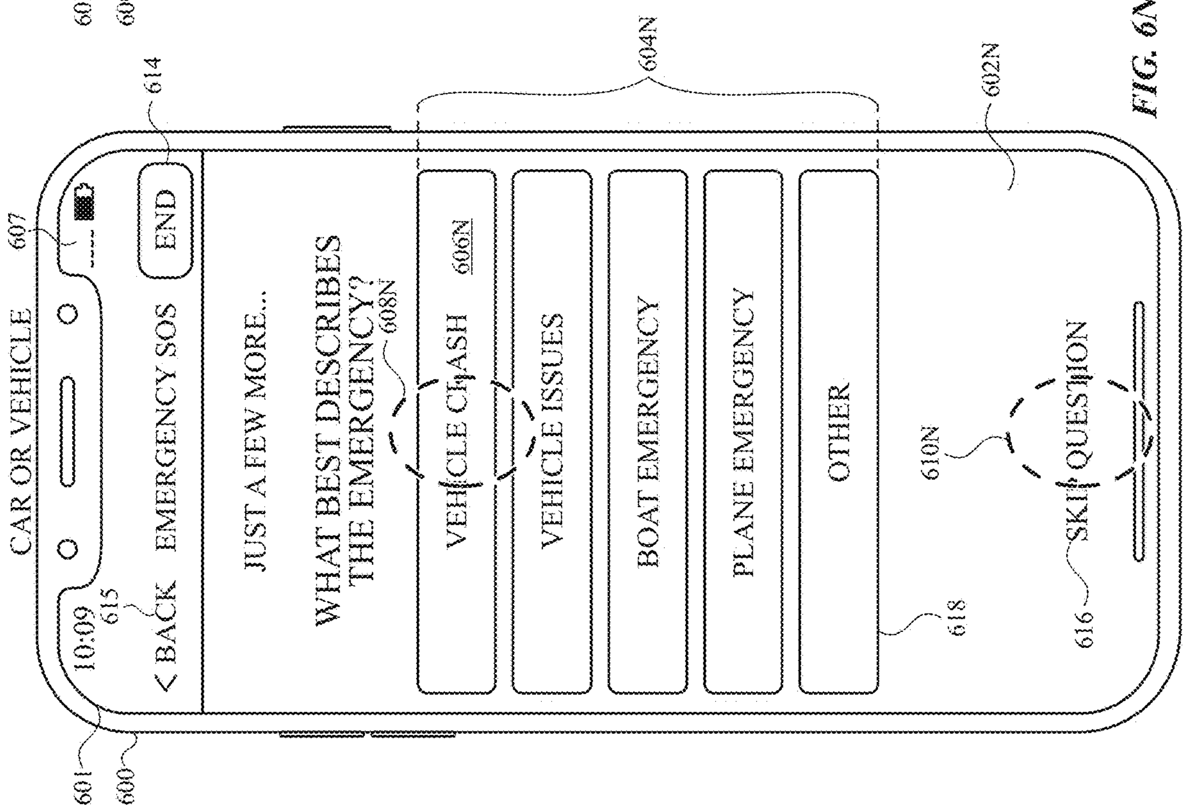

In FIGS. 6N-6O, computer system 600 displays reporting interfaces 602N and 602O, which include follow-up questions in response to selection of car or vehicle emergency option 608M and medical option 606M, respectively.

In FIG. 6N, reporting interface 602N includes second set of options 604N, and skip option 616. Second set of options 604N includes selectable follow-up options related to the car or vehicle emergency option 608M of FIG. 6M. In response to receiving a selection of a type of car or vehicle emergency (e.g., an option of second set of options 604N), the type of car or vehicle emergency is included in the emergency report to be submitted to emergency services. In some embodiments, computer system 600 displays second set of options 602N based on the emergency type selected from first set of options 604M. In some embodiments, second set of options 602N are follow-up questions based on the emergency type selected from first set of options 604M.

Second set of options 604N includes vehicle crash option 606N and other option 618N. In response to receiving input 608N on vehicle crash option 606N, computer system 600 displays reporting interface 602P of FIG. 6P, described below. In some embodiments, in response to receiving input 608N on vehicle crash option 606N, computer system 600 displays summary interface 602R. In response to receiving an input on other option 618N, computer system 600 displays reporting interface 602V of FIG. 6V.

In FIG. 6O, reporting interface 602O includes third set of options 604O, which includes a plurality of selectable follow-up options related to who needs help for the medical emergency selected by input 616M in FIG. 6M. In response to receiving a selection of who needs help (e.g., an option of third set of options 604O), the selection is included in the emergency report to be submitted to emergency services. In response to receiving input 608O on who needs help option 606O (e.g., "ME"), computer system 600 displays reporting interface 602Q of FIG. 6Q, described below. In some embodiments, in response to receiving input 608O on who needs help option 606O, computer system 600 displays summary interface 602S.

Figure 6Q:
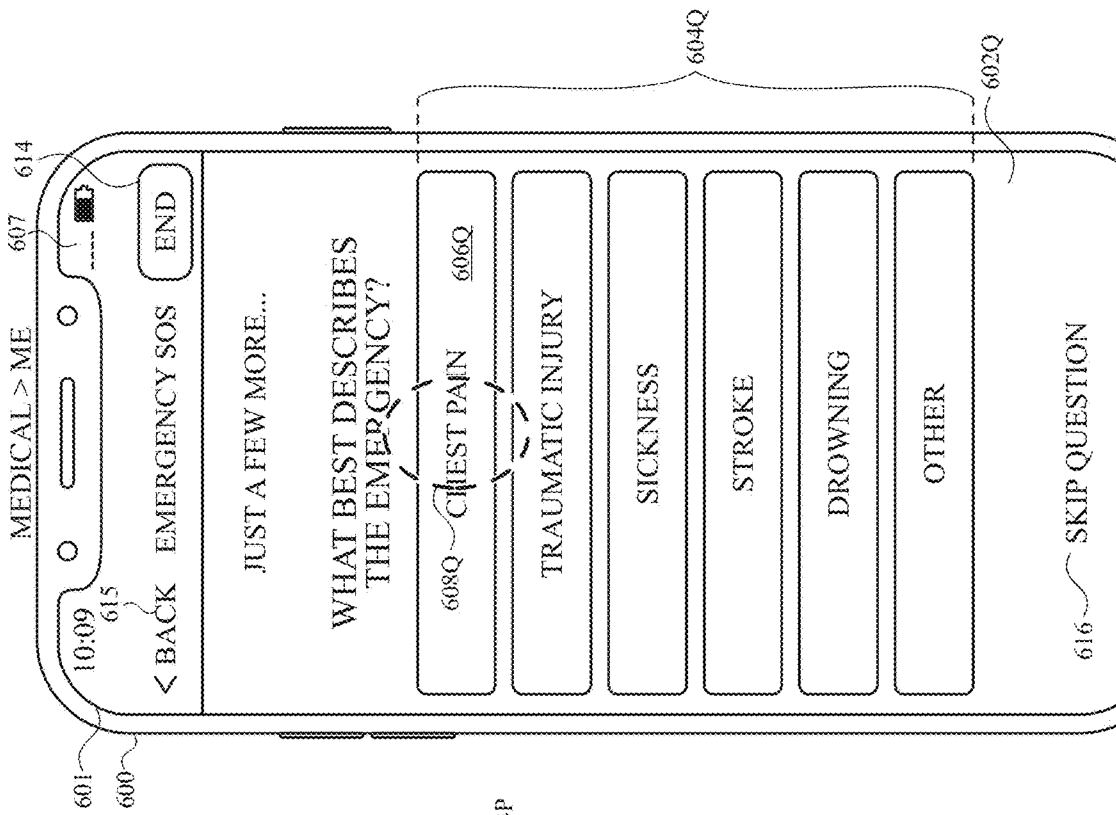
Figure 6P:
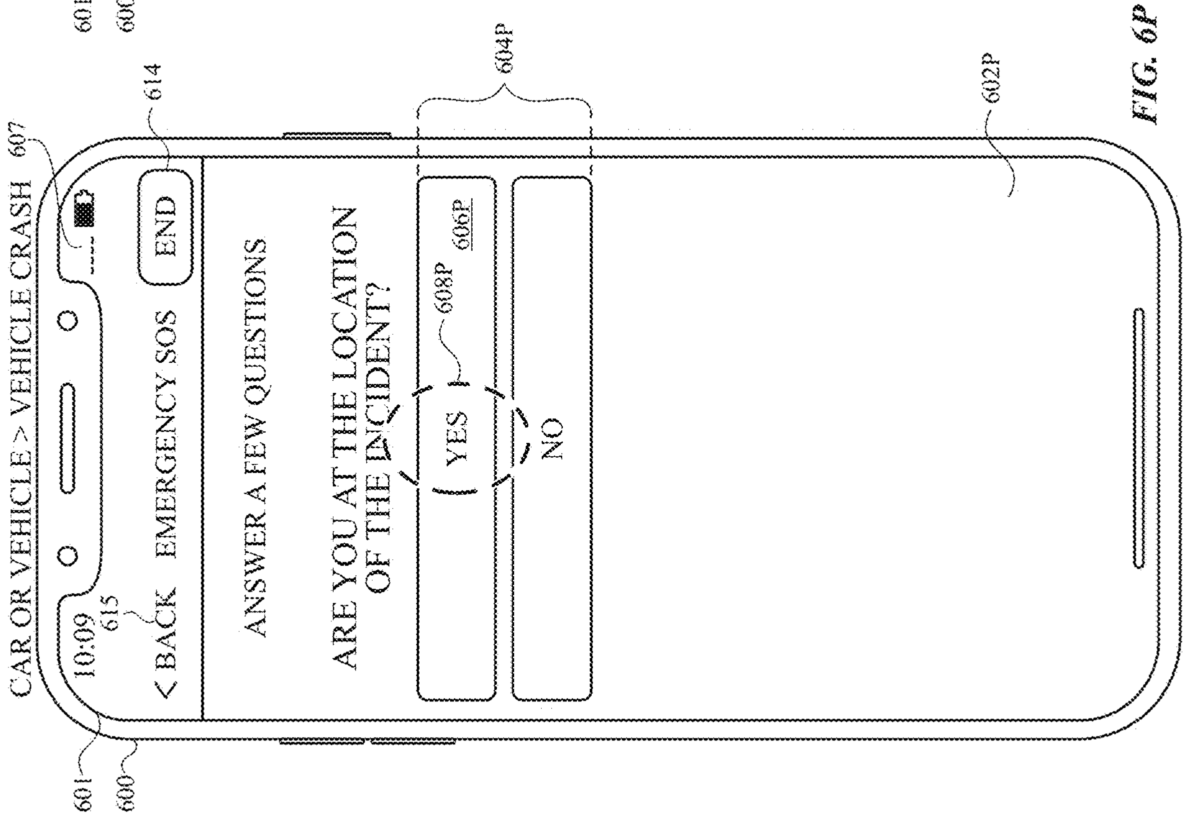

In FIGS. 6P-6Q, computer system 600 displays reporting interfaces 602P and 602Q, which include follow-up questions for the selections of vehicle crash option 606N and who needs help option 606O, respectively. In FIG. 6P, reporting interface 602P displays an interface for receiving a selection that indicates whether or not a user is at the incident of the vehicle crash via fourth set of options 604P. Fourth set of options 604P includes a plurality of selectable follow-up options related to whether or not a user is at the incident. In response to receiving a selection indicating whether or not a user is at the incident (e.g., an option of fourth set of options 604P), the selection is included in the emergency report to be submitted to emergency services. In FIG. 6P, computer system 600 detects input 608P on "yes" option 606P (e.g., indicating the user is at the location of incident). In response to receiving input 608P on "yes" option 606P, computer system 600 displays summary interface 602R of FIG. 6R.

In some embodiments, computer system 600 displays additional reporting interfaces and selectable follow-up options that are specific to the selected car or vehicle option 604M, vehicle crash option 606N, and/or are generally included for emergencies. For example, additional reporting interfaces include a plurality of selectable follow-up questions related to the status of the individual(s), and who needs help.

In some embodiments, in response to receiving an input on the emergency options, the computer system 600 displays a send option. In response to receiving input 608P on "yes" option 606P, computer system 600 displays the alignment interface 902C described in FIG. 9C, or messaging interface 602T described in FIG. 6T, below.

In FIG. 6Q, reporting interface 602Q displays an interface for selection an option for what best describes the emergency. Reporting interface 602Q includes fifth set of options 604Q. Fifth set of options 604Q does not include skip option 616, because reporting interface 602Q is not skippable based on medical option 606M and/or who needs help option 606O. In response to receiving a selection of an option of fifth set of options 604Q, the selection is included in the emergency report to be submitted to emergency services. Fifth set of options 604Q are specific to the who needs help option 606O of FIG. 6O. Fifth set of options 604Q include chest pain option 606Q. In response to receiving input 608Q on chest pain option 606Q, computer system 600 displays summary interface 602S of FIG. 6S.

In some embodiments, the computer system 600 displays additional reporting interfaces and selectable follow-up options that are specific to the medical option 606M, who needs help option 606O, and/or are generally included for most emergencies. For example, additional reporting interfaces include a plurality of selectable follow-up questions related to the status of the individual(s), and are they conscious.

In some embodiments, in response to receiving input 608Q on chest pain option 606Q, computer system 600 displays the alignment interface 902C described in FIG. 9C, or reporting interface 602U described in FIG. 6U, below.

Figure 6R:
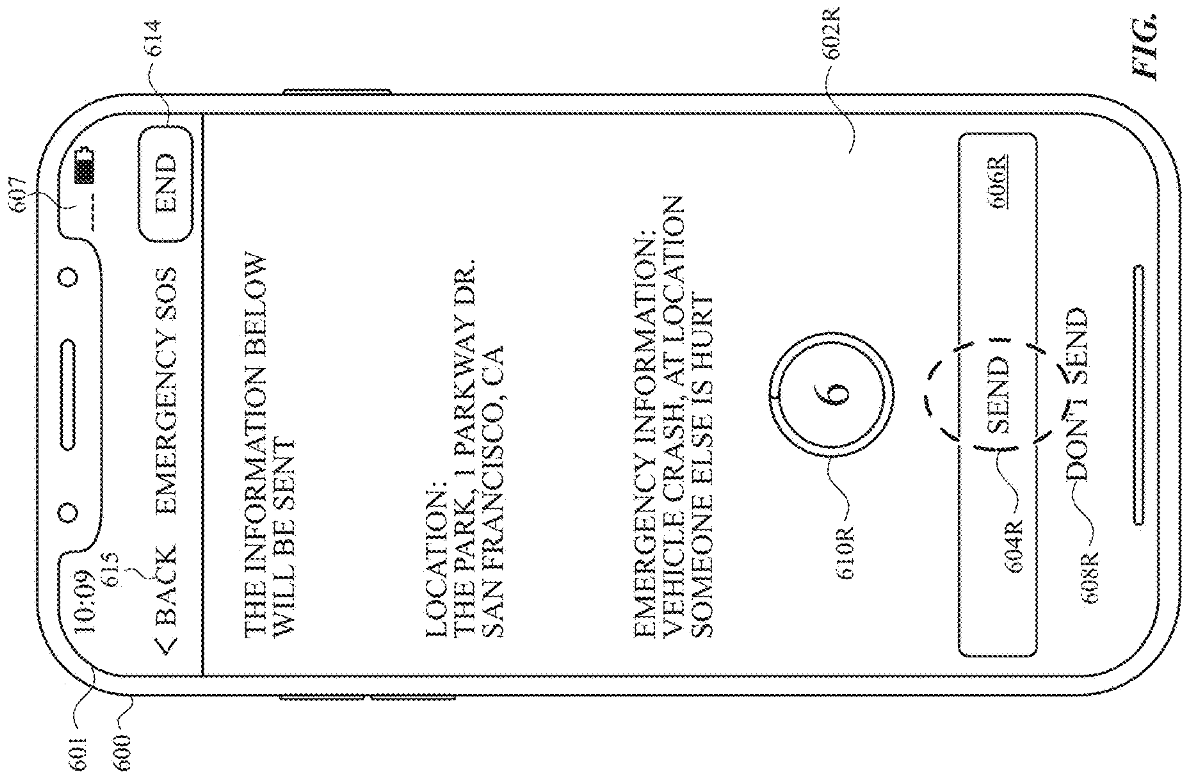
Figure 6S:
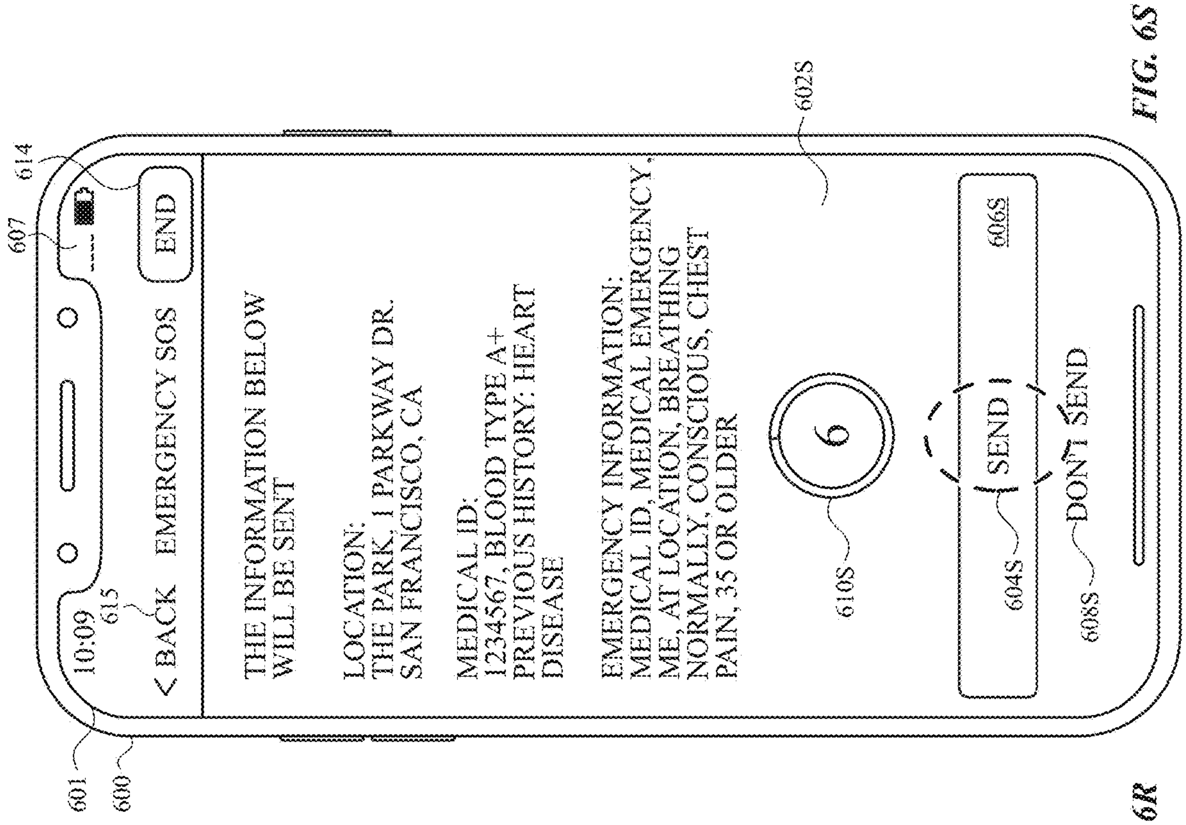

In FIGS. 6R and 6S, computer system 600 displays summary interfaces 602R and 602S, respectively. Computer system 600 displays summary interfaces 602R and 602S in response to receiving a selection of the emergency options described above. In some embodiments, the computer system displays summary interfaces 602R and 602S in response to receiving an input on additional reporting interfaces, as described above. In some embodiments, in response to receiving an input at the reporting interfaces related to the type of emergency and/or follow-up questions, computer system 600 displays summary interfaces 602R and 602S.

Summary interfaces 602R and 602S include send options 606R and 606S, don't send options 608R and 608S, and timer 610R and 610S, respectively. In response to receiving input 604R on send option 606R and input 610S on send option 606S, computer system 600 sends the emergency report to the emergency service. In response to receiving an input on don't send option 608R and 608S, computer system 600 displays the respective previous reporting interface 602N and 602O. In some embodiments, in response to receiving an input on don't send option 608R and 608S, computer system 600 displays the previously displayed reporting interface 602P and 602Q respectively and/or a home screen of computer system 600. Timer 610R indicates an amount of time remaining (e.g., in seconds) before the computer system automatically sends the emergency report, including the displayed information. In some embodiments, in response to not receiving input 604R and 604S on send options 606R and 606S or an input on don't send options 608R and 608S, respectively, within a predetermined time period (e.g., 5 second, 10 seconds, 30 second, or 1 minute), computer system 600 automatically sends the emergency report. In response to receiving input 604R and 604S on send options 606R and 606S before the timer expires, the computer system 600 sends the emergency report.

In FIG. 6R, summary interface 602R displays a description of the information in the emergency report to be submitted. The information in the emergency report includes the selections received in each of reporting interfaces 602M (e.g., car or vehicle option 608M), reporting interface 602N (e.g., vehicle crash option 606N), and reporting interface 606P (e.g., location of the incident option 606P). The information in the emergency report also includes information that was not present in the previously displayed reporting interfaces, such as the location of computer system 600.

In response to receiving input 604R on send option 606R, computer system 600 displays messaging interface 602T. In response to receiving no input on send option 606R within the predetermined time period, computer system 600 displays messaging interface 602T.

In FIG. 6S, summary interface 602S displays a description of the information in the emergency report to be submitted. The information in the emergency report includes the selections received in each of reporting interfaces 602M (e.g., medical option 606M), reporting interface 606P (e.g., who needs help option 606O), and reporting interface 602Q (e.g., chest pain option 606Q). The information in the emergency report also includes information that was not previously displayed in the reporting interfaces, such as the location of computer system 600 and medical ID information about the user stored on computer system 600 (shown as blood type and previous medical history). The medical ID is included in the summary interface 602S because the computer system 600 determined the information relevant for the emergency type.

In response to receiving the input 604R on send option 606R and input 604S on send option 606S, computer system 600 displays an alignment interface. The alignment interface is used to align computer system 600 with the satellite, similar to the alignment interface 902C described in FIG. 9C. In some embodiments, computer system 600 needs to be properly oriented with the satellite to communicate via satellite communication.

In some embodiments, subsequent to displaying a reporting interface 602M, 602N, 602O, 602P, or 602Q described above, the touch-sensitive display 601 is turned off. In some embodiments, in response to receiving an indication that the touch-sensitive display 601 is turned off for a threshold period of time (e.g., 10 second, 30 seconds, or one minute), computer system 600 turns on the touch-sensitive display, without receiving an input on the computer system 600.

Reporting and/or summary interfaces 602M, 602N, 602O, 602P, 602Q, 602R, and 602S described above include end button 614, which is a selectable button for ending the display of the respective interface. In FIG. 6M, in response to detecting input 618M on end button 614, computer system 600 displays confirmation prompt 620M (e.g., computer system 600 does not immediately dismiss reporting interface 602M (e.g., end the emergency communication session) in response to detecting selection of end button 614). In FIG. 6M1, confirmation prompt 620M is a displayed on top of user interface 602M (e.g., as a pop up menu) and user interface 602M is obscured (e.g., greyed out or blurred). Confirmation prompt 620M includes text 620M1 describing that the user is about to end the emergency communication session, confirm option 620M2, and cancel option 620M3. In response to detecting input 622M on confirm option 620M2, computer system 600 ends the emergency communication session. In response to detecting input 624M on cancel option 620M3, computer system 600 returns to user interface 602M as shown in FIG. 6M (e.g., ceases display of confirmation prompt 620M and displays user interface 602M without being obscured). Similarly, in response to detecting input 610O on end button 614 in FIG. 6O, computer system 600 displays a confirmation prompt (e.g., confirmation prompt 620M of FIG. 6M1 (e.g., computer system 600 does not immediately dismiss reporting interface 602O (e.g., end the emergency communication session) in response to detecting selection of end button 614).

In some embodiments, in response to receiving a selection of end button 614, computer system 600 displays calling interface 602G of FIG. 6G or calling interface 602A of FIG. 6A. In some embodiments, in response to receiving a selection of end button 614, computer system 600 displays a home screen. Reporting and/or summary interfaces 602M, 602N, 602O, 602P, 602Q, 602R, and 602S described above include back button 615, which is a selectable button for the computer system 600 to return to displaying the previously displayed interface. For example, in response to receiving input 610M on back button 615, computer system 600 displays calling interface 602G of FIG. 6G or calling interface 602A of FIG. 6A.

Figure 6T:
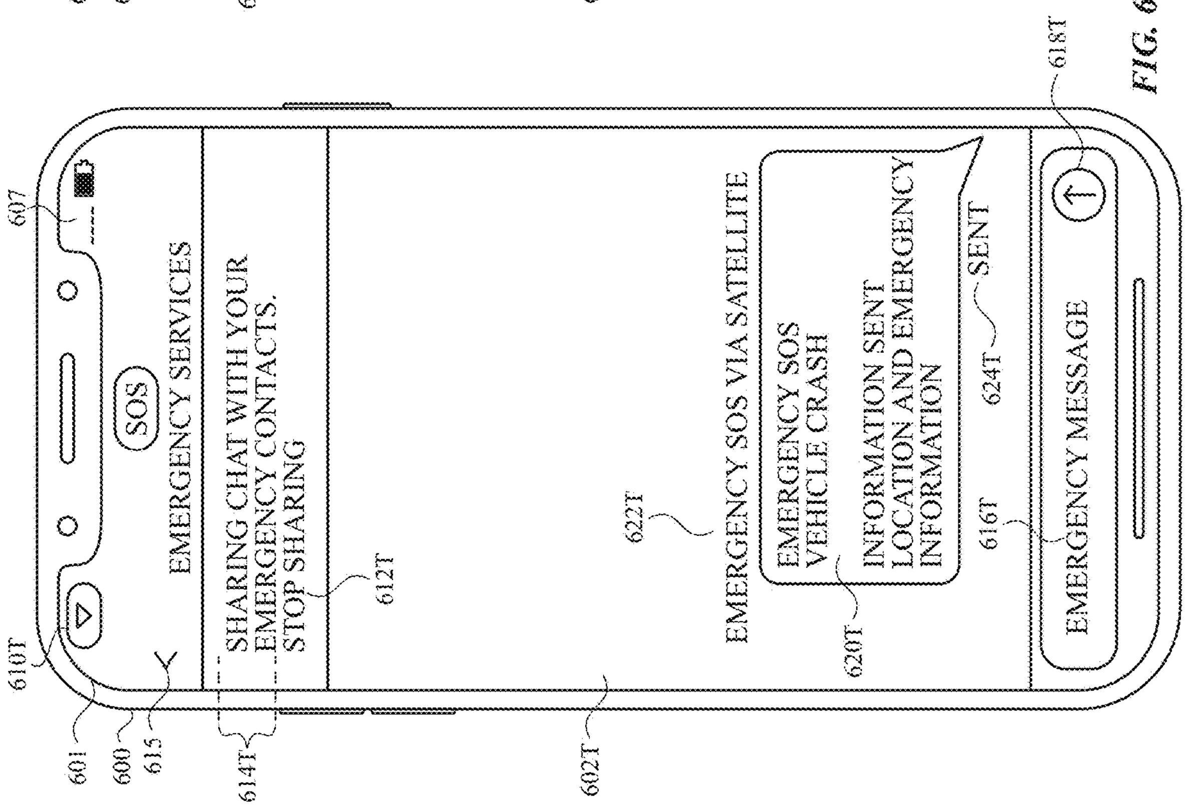
Figure 6U:
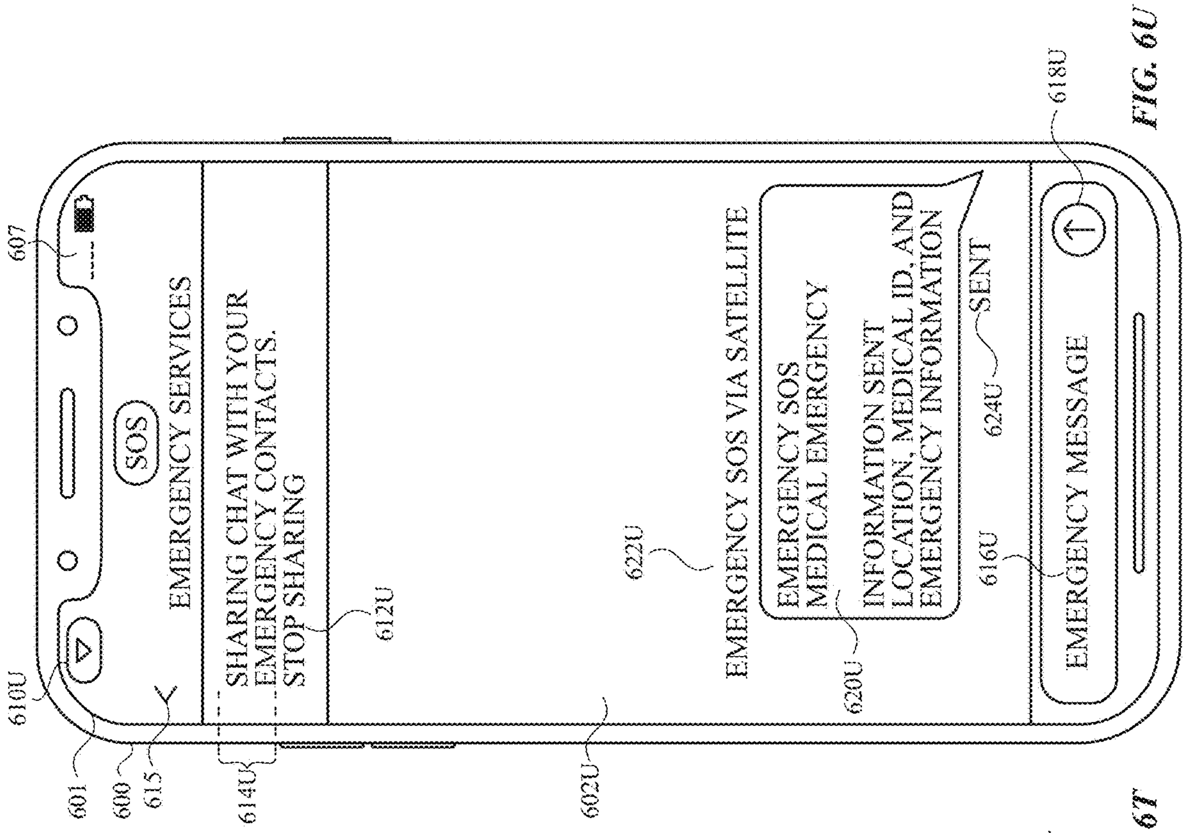

Turning to FIGS. 6T and 6U, computer system 600 displays messaging interfaces 602T and 602U. Messaging interfaces 602T and 602U display a low-bandwidth message sent via satellite communication that includes the emergency report from summary interfaces 602R and 602S. Messaging interfaces 602T and 602U include back button 615, connection assistant 610T and 610U, sharing summary 614T and 614U, stop sharing button 612T and 612U, message method indicator 622T and 622U, message 620T and 620U, status indicator 624T and 624U, text box 616T and 616U, and send button 618T and 618U, respectively. Messaging interfaces 602T and 602U are a message thread with emergency services.

Connection assistant 610T and 610U is a selectable indicator for satellite communication. Computer system 600 displays connection assistant 610T and 610U in response to sending the message 620T and 620U via satellite communication. The connection assistant 610T and 610U provide a visual indication of the current connection state with the satellite to computer system 600 for communication. In response to receiving a selection of the connection assistant 610T and 610U, computer system 600 displays alignment interface 902F of FIG. 9F, described below. In some embodiments, the connection assistant 610T and 610U are maintained between other user interfaces, such as a notes interface and/or browser interface, as a visual indication that the computer system 600 is connected via satellite communication.

In some embodiments, the computer system 600 displays a banner concurrently with the messaging interfaces 602T and 602U. The banner includes a live indication of the connection status of computer system 600. The live indication on the banner includes a connection assist, similar to banner 926 of messaging interface 902M of FIG. 9M, described below. The banner can include an indication of the messages 620T and 620U are transmitting via satellite, similar to messaging interface 902K of FIG. 9K below. In response to receiving a selection of the banner, computer system 600 displays a connection assistant user interface that is larger than the banner, similar to alignment interface 902G of FIG. 9G. In response to receiving an input to display a different user interface, such as a notes interface and/or browser interface, the banner may be replaced with connection assistant 610T and 610U, described above, or similar to banner 926 of messaging interface 902M of FIG. 9M, described below.

Message 620T and 620U display the message that was communicated to emergency services. Status indicator 624T and 624U indicate the status of messages 620T and 620U, respectively as sent. Message method indicator 622T and 622U describe the method of the message that was sent as "via satellite."

Sharing summary 614T and 614U indicate additional recipients to the message 620T and 620U, respectively. Sharing summary 614T and 614U display the additional recipients as "emergency contacts", however, as described below, in some embodiments the additional recipients may be selected as described in query user interface 1102 of FIG. 11A. The additional recipients receive the messages 620T and 620U in real-time, but the additional recipients cannot interact with emergency services or the sender in the same thread that reported the emergency messages as described in messaging user interface 1114 of FIG. 11H.

In FIG. 6T, message 620T includes a summary of the emergency report sent to emergency services based on the information included in summary interface 602R described in FIG. 6R. In some embodiments, as the message 620T is sent via satellite, a graphical element illustrates the message is being sent and the message's progress in a banner, similar to banner 926 described in messaging interface 902K of FIG. 9K.

In FIG. 6U, message 620U includes a summary of the emergency report sent to emergency services based on the information in summary interface 602S described in FIG. 6S. In some embodiments, as the message 620U is sent via satellite, a graphical element illustrates the message is being sent and the message's progress, similar to banner 926 described in messaging interface 902K of FIG. 9K.

Figure 6V:
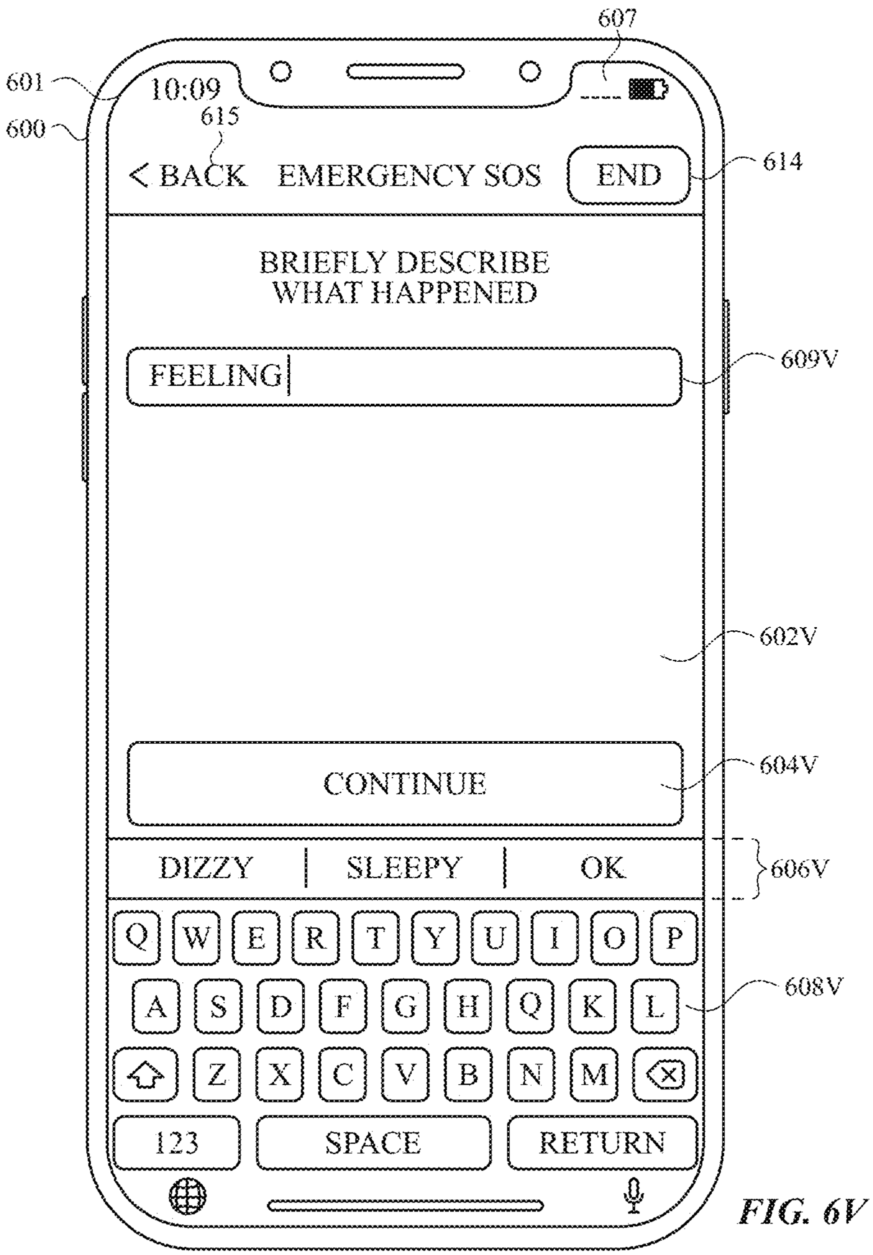

In FIG. 6V, the computer system 600 displays reporting interface 602V. Reporting interface 602V includes text box 609V for describing the emergency situation, a continue option 604V, suggested text 606V, and keyboard 608V. In response to inputs on keyboard 608V and/or suggested text 606V, computer system 600 displays a message to be included in the emergency report. In some embodiments, a maximum amount of text and/or characters (e.g., 50, 100, or 200 characters) can be added in text box 609V of reporting interface 602V. In FIG. 6V1, as more text is entered into text box 609V, computer system 600 displays text limit indicator 610V, which includes a numerical indication of the number of characters that have been entered into text box 609V (e.g., 17) and/or the maximum amount of characters that can be added in text box 609V (e.g., 50). In some embodiments, computer system displays text limit indicator 610V in reporting interface 602V in FIG. 6V (e.g., TEXT LIMIT 7/50). In FIG. 6V1, text limit indicator 610V indicates that the amount of text in text box 609V is approaching the maximum amount. In some embodiments, computer system 600 displays text limit indicator 610V when the amount of text in text box 609V reaches a threshold amount (e.g., 10 or 15 characters). In some embodiments, computer system 600 updates the numerical portion of text limit indicator 610V as text is added to text box 609V (e.g., as one or more characters are added, such as from 17/50 to 18/50 to 19/50, and so on). When the amount of text in text box 609V reaches the maximum amount, computer system 600 updates text limit indicator 610V to indicate that the maximum amount has been reached (e.g., displays an exclamation mark with the text "MESSAGE IS TOO LONG"), as shown in FIG. 6V2.

In response to receiving an input on 604V, computer system 600 displays reporting interface 602P of FIG. 6P, summary interface 602R of FIG. 6R, or additional follow-up questions and selectable follow-up options that are specific to car or vehicle option 604M and/or vehicle crash option 606N.

Figure 6W:
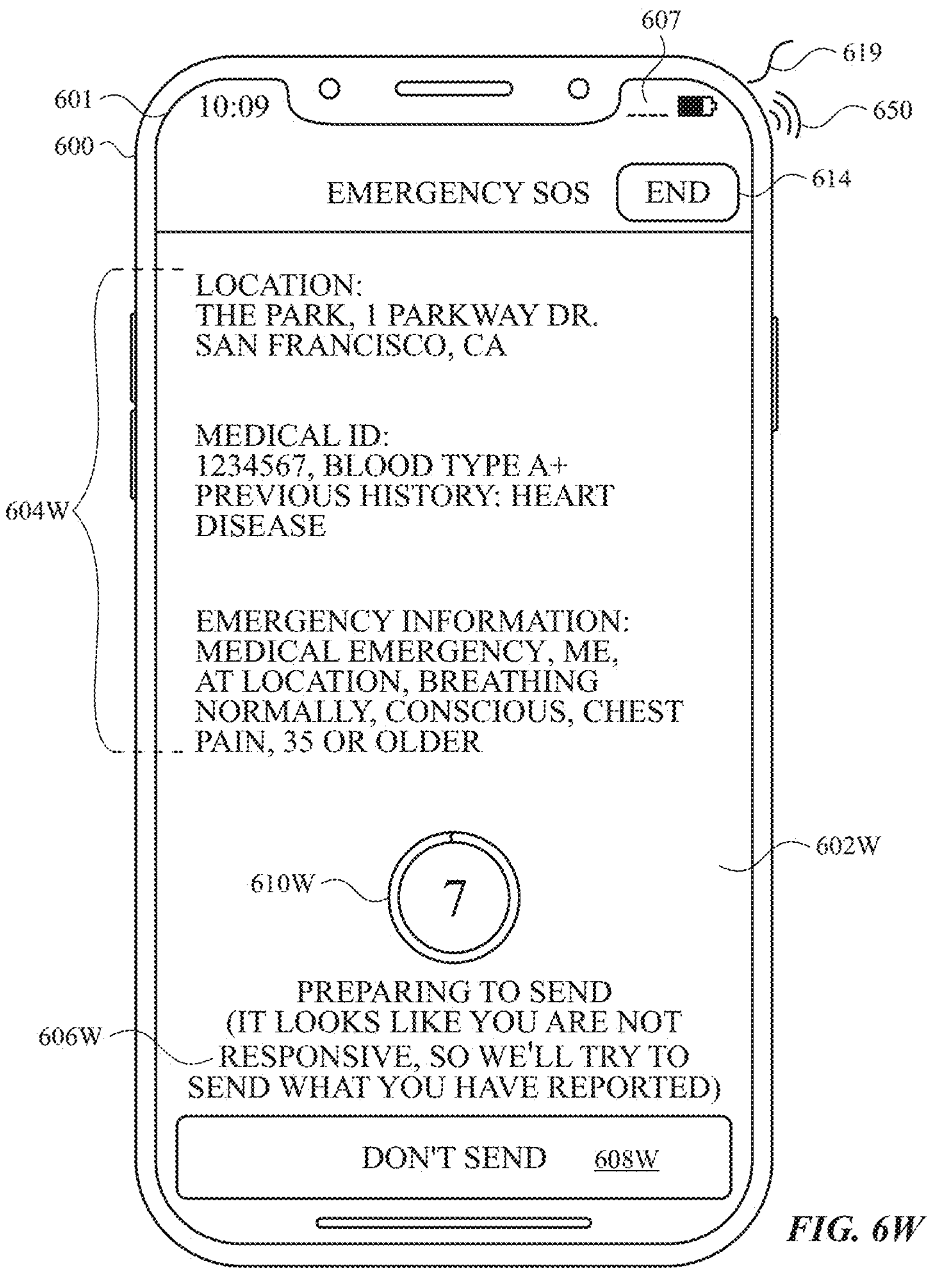

In FIG. 6W the computer system displays summary interface 602W. Summary interface 602W displays a summary of the selections of emergency options received until the user was determined by the computer system 600 to be unresponsive. Summary interface 602W includes emergency report summary 604W, timer 610W, notification 606W, and don't send button 608W. In response to not receiving an input at reporting interface 602Q within a standby time period (e.g., 10 seconds, 30 seconds, or 1 minute), computer system 600 determines that a user is unresponsive, and prepares what information has already been answered for submission to emergency services. Notification 606W explains that the computer system has determined that the user is unresponsive.

In response to receiving an input on don't send button 608W, computer system 600 displays summary interface 602W. However, in response to not receiving the input on don't send button 608W or end button 614 within the time limit of timer 610W (e.g., in seconds) computer system 600 sends the emergency report, even if incomplete, to emergency services. In some embodiments, as shown in FIG. 6W, computer system 600 outputs haptic output 619 and/or audio output 650 when initiating timer 610W, when timer 610W expires, and/or when sending the emergency report. Outputting a non-visual output (e.g., haptic output 619 and/or audio output 650) notifies the user that timer 610W and/or that the report has been sent if the user is not looking at display 601 (e.g., if computer system 600 or a display generation component of computer system 600 is against the user's ear).

In some embodiments, in response to not receiving an input on reporting and/or summary interfaces 602M, 602O, 602Q, 602N, 602P, 602Q, 602R, and/or 602S within a predetermined standby time limit (e.g., 10 seconds, 30 seconds, or 1 minute), computer system 600 displays summary interface 602W with the emergency report summary 604W illustrating the corresponding information previously received.

Figure 6X:
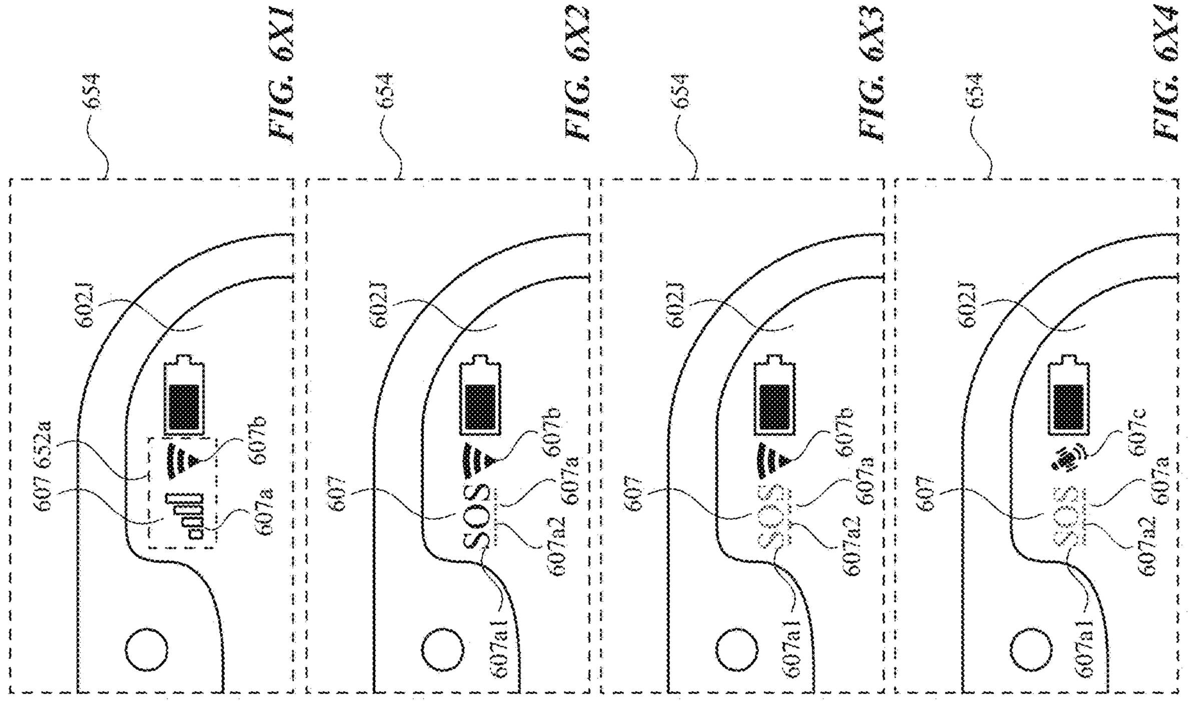
Figure 6X:
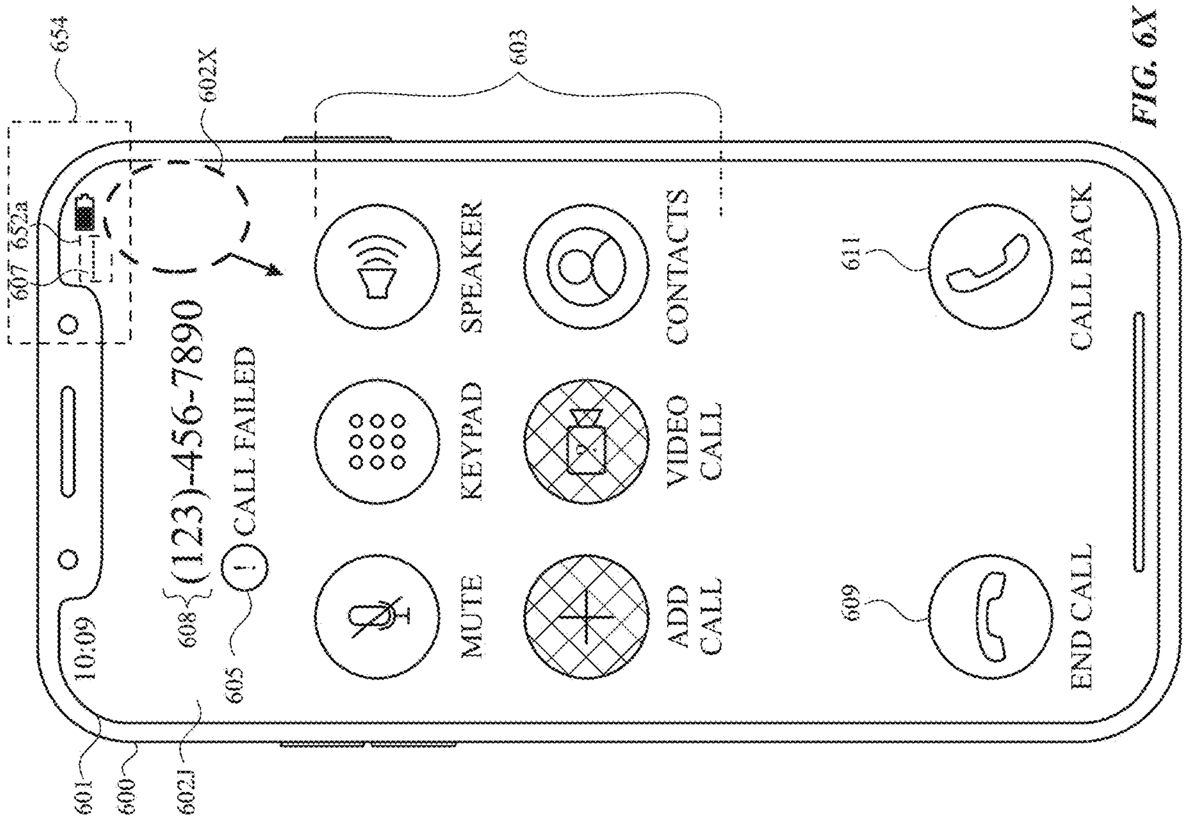
Figure 6Y:
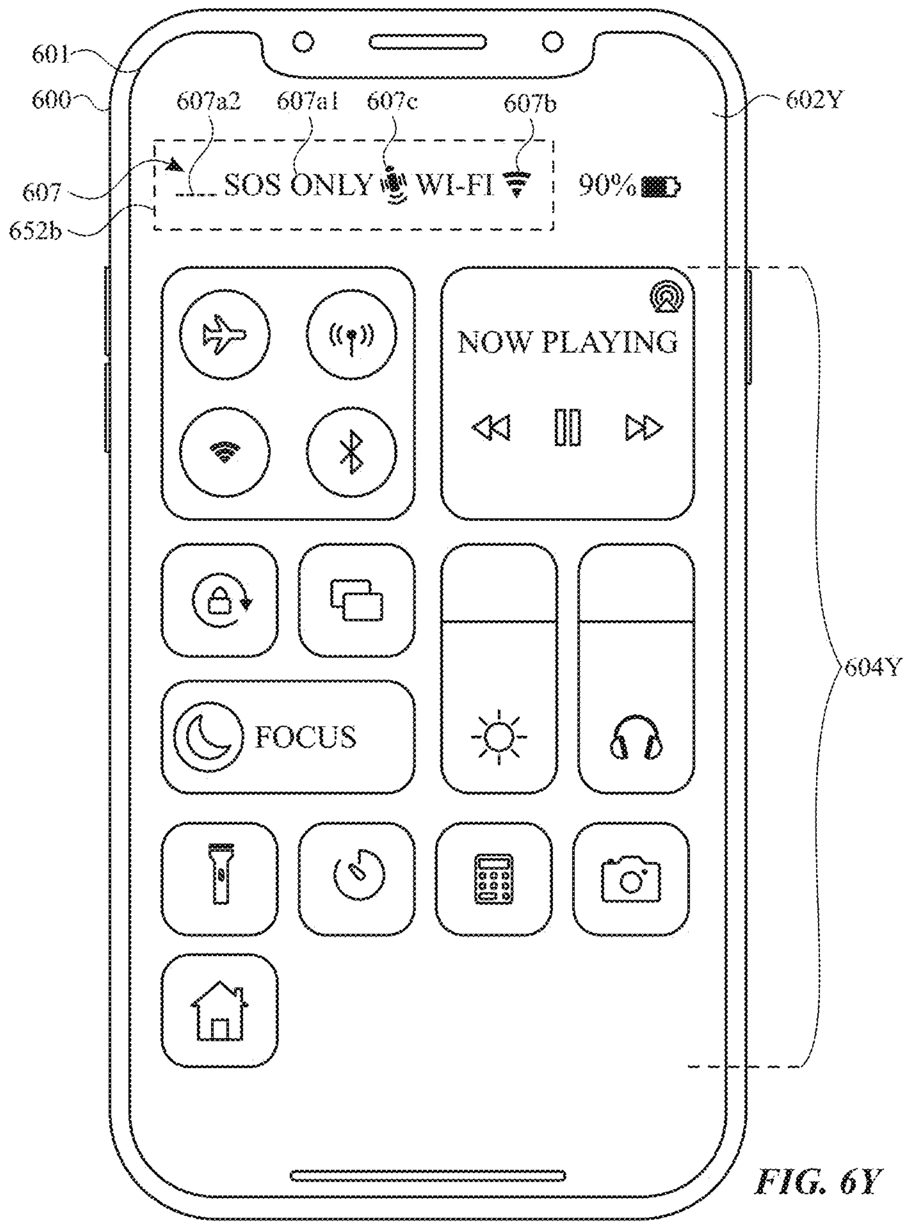

FIGS. 6X-6X4 illustrate embodiments of network indicator 607 and/or status portion 562*a* of a user interface (e.g., a status bar and/or a compacted status region) within area 654 of FIG. 6X. In FIGS. 6X1-6X4, network indicator 607 includes cellular status indicator 607*a* and Wi-Fi status indicator 607*b*. When computer system 600 has cellular service, cellular status indicator 607*a* includes a series of bars that indicate the strength of the cellular signal, as shown in FIG. 6X1. When computer system has Wi-Fi capability turned on, Wi-Fi status indicator 607*b* includes a series of fan-shaped bars that indicate the strength of the Wi-Fi signal, as shown in FIG. 6X1.

In FIG. 6X2, computer system 600 has Wi-Fi capability turned on and does not have cellular service from a respective (e.g., primary) cellular network, but is capable of communicating with emergency services (e.g., 911) via an alternative cellular network. When computer system 600 does not have cellular service from a respective cellular network, cellular status indicator 607*a* includes emergency indicator 607*a*1 and respective cellular network indicator 607*a*2. In FIG. 6X2, because computer system 600 is capable of communicating with emergency services via an alternative cellular network, emergency indicator 607*a*1 is visually distinguished (e.g., emphasized) relative to respective cellular network indicator 607*a*2 (e.g., emergency indicator 607*a*1 is bold and/or respective cellular network indicator 607*a*2 is greyed out or dimmer relative to emergency indicator 607*a*1).

In FIG. 6X3, computer system 600 has Wi-Fi capability turned on, does not have cellular service from a respective (e.g., primary) cellular network, and is not capable of communicating with emergency services via an alternative cellular network. Because computer system 600 is not capable of communicating with emergency services via an alternative cellular network, emergency indicator 607*a*1 is not visually distinguished relative to respective cellular network indicator 607*a*2 (e.g., emergency indicator 607*a*1 and respective cellular network indicator 607*a*2 are both greyed out, dimmed, or otherwise displayed with the same appearance).

In FIG. 6X4, computer system 600 has Wi-Fi capability turned off, does not have cellular service from a respective (e.g., primary) cellular network, and is not capable of communicating with emergency services via an alternative cellular network. Because computer system 600 is not capable of communicating with emergency services via an alternative cellular network, emergency indicator 607*a*1 is not visually distinguished relative to respective cellular network indicator 607*a*2 (e.g., the same as cellular status indicator 607*a* in FIG. 6X3). Because Wi-Fi capability is turned off and computer system 600 is capable of communicating via a satellite communication network, computer system 600 displays satellite status indicator 607*c* (e.g., a glyph, icon, thumbnail, and/or image of a satellite). In some embodiments, satellite status indicator 607*c* is displayed instead of Wi-Fi status indicator 607*b* and/or at the same location at which Wi-Fi status indicator 607*b* was displayed. In some embodiments, when computer system has Wi-Fi capability turned off, is not capable of communicating via a satellite communication network, and does not have cellular service for any purpose, computer system 600 displays network indicator 607 without Wi-Fi status indicator 607*b* and without satellite status indicator 607*c*. In some embodiments, if computer system 600 has Wi-Fi capability turned on, network indicator 607 includes Wi-Fi status indicator 607*b* (e.g., without or instead of satellite status indicator 607*c*) regardless of whether or not computer system 600 is capable of communicating via a satellite communication network.

In FIG. 6Y, computer system 600 displays user interface 602Y, which includes status portion 652*b* (e.g., an expanded status region). Status portion 652*b* is larger than status portion 652*a*. Because status portion 652*b* is larger than status portion 652*a*, network indicator 607 is displayed differently than in, e.g., FIGS. 6X-6X4. In FIG. 6Y, computer system 600 has Wi-Fi capability turned on, does not have cellular service from a respective cellular network, is capable of communicating with emergency services via an alternative cellular network, and is capable of communicating via a satellite communication network. As a results, emergency indicator 607*a*1 and respective cellular network indicator 607*a*2 are displayed side-by-side (e.g., emergency indicator 607*a*1 to the right of respective cellular network indicator 607*a*2) and emergency indicator 607*a*1 includes additional information (e.g., is expanded and/or includes additional text, such as "SOS Only" instead of just "SOS"). Also, computer system 600 concurrently displays both satellite status indicator 607*c* and Wi-Fi status indicator 607*b* (e.g., an expanded version of Wi-Fi status indicator 607*b* that includes the text "WiFi").

In some embodiments, computer system 600 displays user interface 602Y (and/or an expanded status region 652*b*) in response to detecting input 602X in FIG. 6X (e.g., regardless of the cellular, Wi-Fi, and/or satellite capability state of computer system 600 and/or status portion 652*a*). In some embodiments, computer system 600 can display status indicators in status portion 652*b* for any of the cellular, Wi-Fi, and/or satellite capability states represented in FIGS. 6X-6X4 (e.g., an expanded status portion 652*b* equivalent to compacted status portion 652*a* in FIG. 6X, 6X1, 6X2, 6X3, or 6X4).

In some embodiments, user interface 602Y is a control user interface (e.g., a control center) that includes selectable controls and/or options (e.g., 604Y) for controlling various functions of computer system 600 and/or setting parameters of features of computer system 600. For example, in FIG. 6Y, controls 604Y include options for an airplane mode, turning Wi-Fi on and off, turning Bluetooth on and off, turning cellular on and off, controlling media playback (e.g., play, pause, and/or skip), locking and unlocking display orientation, turning a flashlight function on and off, opening an alarm and/or timer application, opening a calculator application, opening a camera application, setting display brightness, setting audio volume level, and/or opening an application for controlling remote accessories.

FIG. 7 is a flow diagram illustrating methods for initiating a communication when a terrestrial wireless communication network is not reachable are described in accordance with some embodiments. In some embodiments, the method includes, when attempting to make a call, showing an emergency message button if cell service is not reachable. In some embodiments, the method can be implemented using the devices and user interfaces illustrated in FIGS. 6A-6Y. The method is performed at a computer system (e.g., 100, 300, 500, or 600; e.g., a smartphone, a tablet computer, a desktop computer, a laptop computer, a smartwatch, or a head mounted device (e.g., a head mounted augmented reality and/or extended reality device)) that is in communication with a display generation component (e.g., 601; e.g., a display controller, a touch-sensitive display system, and/or a head mounted display system) and one or more input devices (e.g., 601; a touch-sensitive surface, a touchscreen, a button, and/or a microphone). Some operations are, optionally, combined, the orders of some operations are, optionally, changed, and some operations are, optionally, omitted.

As described below, method 700 provides an intuitive way for initiating a communication when a terrestrial wireless communication network is not reachable using a computer system. The method reduces the cognitive burden on a user for initiating a communication when a terrestrial wireless communication network is not reachable using a computer system, thereby creating a more efficient human-machine interface. For battery-operated computing devices, enabling a user to initiate a communication when a terrestrial wireless communication network is not reachable using faster and more efficiently conserves power and increases the time between battery charges.

The computer system detects (702), via the one or more input devices, a user input (e.g., as seen in FIG. 6A at input 610A) corresponding to a request to initiate a communication (e.g., a phone call, video conference, and/or a text message) (in some embodiments, detecting a voice command to initiate a call (e.g., an audio call) and/or an input corresponding to selection of an affordance that, when selected, causes the computer system to initiate a call) via the computer system.

In response to detecting the user input, the computer system displays (704), via the display generation component, a first user interface (e.g., as seen in FIG. 6G at call management interface 602G; e.g., a phone call user interface; a text messaging interface; and/or a video conference interface). Displaying the first user interface includes, in accordance with a determination that a terrestrial wireless communication network is not reachable (e.g., the computer system is unable to connect to a cellular network; and/or the computer system is not receiving a cellular signal with sufficient strength and/or consistency to perform a call (e.g., to emergency services) (in some embodiments, the terrestrial wireless communication network is a cellular network associated with the computer system (e.g., provided by the user's cellular service provider) or another cellular network (e.g., provided by another cellular service provider) (in some embodiments, for an emergency call, the computer system can use a network provided by a network provider other than a provider associated with the computer system) by the computer system (in some embodiments, the computer system displays the selectable communication option in accordance with a determination that the computer system is unable to place the call using a predetermined type of communication protocol (e.g., cellular communication) and/or a determination that the computer system is unable to communicate via a predetermined type of signal (e.g., is not receiving the predetermined type of signal at a threshold (e.g., sufficient) level), displaying (706) a respective selectable communication option (e.g., 604G; e.g., an affordance, button, graphical element, graphical object, and/or icon) that, when selected via the one or more input devices, initiates a process for communicating (e.g., via phone call, text message, and/or video conference) (in some embodiments, the communication is a real-time (e.g., full duplex real time) communication) via a non-terrestrial wireless communication network (e.g., via a communication protocol that does not require cellular service and/or a low-bandwidth communication mode). Displaying the first user interface includes, in accordance with a determination that a respective terrestrial wireless communication network is reachable by the computer system (e.g., the computer system is able to connect to a cellular network; and/or the computer system receives a cellular signal with sufficient strength and/or consistency to perform a call (e.g., to emergency services)), initiating (708) a process for communicating (e.g., initiating a call, a text message, and/or video conference), via the respective terrestrial wireless communication network, without displaying the respective selectable communication option. Displaying the respective selectable communication option that, when selected, initiates a process for communicating via a non-terrestrial wireless communication network or initiating the process for communicating via the respective terrestrial wireless communication network, without displaying the respective selectable communication option, depending on whether or not a respective terrestrial wireless communication network is reachable by the computer system provides the user with visual feedback about whether a respective terrestrial wireless communication network is reachable by the computer system and provides an alternative communication method when a respective terrestrial wireless communication network is not reachable by the computer system, which provides improved visual feedback and performs an operation when a set of conditions has been met without requiring further user input.

In some embodiments, the computer system, while displaying the respective selectable communication option (e.g., 604G), attempts (e.g., as described with reference to FIGS. 6C and 6D) (e.g., continuing to attempt) to initiate a process for communicating via a respective terrestrial wireless communication network; and detects, via the one or more input devices, a selection (e.g., 606G) of the respective selectable communication option. In response to detecting the selection of the respective selectable communication option, the computer system ceases to attempt to initiate the process for communicating via the terrestrial wireless communication network. Ceasing to attempt to initiate the process for communicating via the terrestrial wireless communication network in response to detecting a selection of the respective selectable communication option automatically ceases attempting to communicate via one method when a user selects an option for communicating via a different method without requiring additional user input, which reduces the number of inputs needed to perform an operation.

In some embodiments, the first user interface (e.g., 602G) includes displaying (e.g., initially displaying), in the first user interface, a cancel communication option (e.g., 609; an "end call" affordance, button, or icon) that, when selected via the one or more input devices, initiates a process to stop attempting to initiate the communication. In some embodiments, the first user interface includes the cancel communication option regardless of whether or not a terrestrial wireless communication network is determined to be reachable or not reachable. In some embodiments, the computer system displays the cancel communication option in the user interface prior to displaying the respective selectable communication option (e.g., the cancel communication option is initially displayed in response to detecting the user input and then the respective selectable communication option is displayed later after a determination is made that a terrestrial wireless communication network is not reachable). In some embodiments, displaying the respective selectable communication option includes moving the cancel communication option. Displaying a cancel communication option that, when selected, initiates a process to stop attempting to initiate the communication provides an efficient way to stop attempting to initiate the communication whether or not a respective terrestrial wireless communication network is reachable by the computer system, which reduces the number of inputs needed to perform an operation.

In some embodiments, while displaying the respective selectable communication option (e.g., 604G), the computer system attempts (e.g., as described with reference to FIGS. 6C and 6D) (e.g., continuing to attempt) to initiate a process for communicating via a respective terrestrial wireless communication network. Attempting to initiate a process for communicating via a respective terrestrial wireless communication network while displaying the respective selectable communication option allows the computer system to continue to attempt one communication method (e.g., a potentially superior communication method) without additional user input while concurrently providing the user with an option to communicate via another method, which reduces the number of inputs needed to perform an operation.

In some embodiments, displaying the respective selectable communication option (e.g., 604G) occurs in accordance with a determination that a terrestrial wireless communication network is not reachable and that the communication is an emergency communication (e.g., as described with reference to FIG. 6G; e.g., a communication to emergency services). Displaying the respective selectable communication option in accordance with a determination that a terrestrial wireless communication network is not reachable and that the communication is an emergency communication provides the user with an alternative communication method and indicates to the user that a terrestrial wireless communication network is not reachable, which performs an operation when a set of conditions has been me without requiring further user input and provides improved visual feedback.

In some embodiments, the determination that a terrestrial wireless communication network is not reachable by the computer system includes a determination that a first terrestrial wireless communication network (e.g., a network band not associated with the carrier of the computer system) not associated (e.g., not previously associated) with the computer system is not reachable by the computer system (e.g., as described with reference to FIGS. 6E-6J, the computer system tries other carrier cellular networks). In some embodiments, the determination that a respective terrestrial wireless communication network is reachable by the computer system includes a determination that the first terrestrial wireless communication network that is not associated with the computer system is reachable by the computer system. In some embodiments, the computer system attempts to initiate the communication via two or more terrestrial wireless communication networks (e.g., a plurality of or all networks that the computer system is capable of communicating with when reachable), and determines that none of the two or more terrestrial wireless communication networks are reachable by the computer system. In some embodiments, a computer system is associated with a terrestrial wireless communication network if the network is the home network of the computer system or the computer system is registered or associated with a subscriber account of the network. Including a determination that a first terrestrial wireless communication network not associated with the computer system is not reachable by the computer system in the determination that a terrestrial wireless communication network is not reachable by the computer system allows the reachability of terrestrial wireless communication networks not associated with the computer system to be considered in determining if the respective selectable communication option is to be displayed, which performs an operation when a set of conditions has been met without requiring further user input.

In some embodiments, the first user interface (e.g., 602G) includes a plurality of selectable phone call options (e.g., 603; e.g., options to control a phone call (e.g., speaker, mute, keypad, contacts). In some embodiments, displaying the first user interface includes concurrently displaying the plurality of selectable phone call options and the respective selectable communication option (e.g., 604G). In some embodiments, the first user interface is a user interface of a phone call application. Including a plurality of selectable phone call options in the first user interface along with the respective selectable communication option allows a user to initiate a process for communication via a non-terrestrial wireless communication network from a call user interface without requiring additional inputs to navigate away from the call user interface, which reduces the number of inputs needed to perform an operation.

In some embodiments, the user input corresponding to the request to initiate the communication includes one or more inputs directed to a second user interface (e.g., 902A; e.g., entry of a phone number (e.g., 911) and, optionally, selection of a "call" button in a keypad on a phone number entry user interface and/or selection of a contactable entity (e.g., person or service) in a contacts user interface). The request to initiate the communication is a request to initiate a communication with an emergency service (e.g., an attempted call to 911). Displaying the first user interface, including the respective selectable communication option in accordance with a determination that a terrestrial wireless communication network is not reachable, in response to detecting a request to initiate a communication with an emergency service indicates to the user that an alternative communication method is available in emergency situations and provides an efficient way to initiate communication via the alternative communication method without additional user inputs, which provides improved visual feedback and reduces the number of inputs need to perform an operation.

In some embodiments, the computer system detects, via the one or more input devices, an input (e.g., 606G) corresponding to selection of the respective selectable communication option (e.g., 604G; e.g., a tap gesture or other selection input on the respective selectable communication option). In response to detecting the input corresponding to selection of the respective selectable communication option, the computer system initiates the process for communicating (e.g., via text message) via the non-terrestrial wireless communication network (e.g., initiating a process to communicate using a low-bandwidth communication mode (e.g., a mode in which a compressed message format is used to communicate). Initiating the process for communicating via the non-terrestrial wireless communication network in response to detecting input corresponding to selection of the respective selectable communication option provides an efficient and intuitive technique for initiating communicating via the non-terrestrial wireless communication network without additional user inputs, which reduces the number of inputs needed to perform an operation.

In some embodiments, the computer system, in accordance with a determination that the terrestrial wireless communication network is not reachable and that a predetermined period of time (e.g., as described with reference to FIG. 6I; e.g., a non-zero amount of time, 3 seconds, 5 seconds, and/or 10 seconds) has passed since detecting the input corresponding to the request to initiate a communication (or, optionally, since the respective selectable communication option has been displayed), initiates the process for communicating via the non-terrestrial wireless communication network (e.g., the respective selectable communication option is automatically selected (without user input) after a predetermined amount of time). In some embodiments, the computer system initiates the process for communicating via the non-terrestrial wireless communication network after (e.g., a predetermined amount of time after) detecting the input corresponding to the request to initiate a communication without detecting further input via the one or more input devices. Initiating the process for communicating via the non-terrestrial wireless communication network in accordance with a determination that the terrestrial wireless communication network is not reachable and that a predetermined period of time has passed since detecting the input corresponding to the request to initiate a communication automatically initiates the process for communicating via the non-terrestrial wireless communication network without additional user input, which performs an operation when a set of conditions has been met without requiring further user input and reduces the number of inputs needed to perform an operation.

In some embodiments, the computer system displays a visual indication (e.g., text, a graphic, a color, and/or an animation) of a countdown (e.g., as described with reference to FIG. 6I, satellite communication button 604I indicates a countdown of remaining time); of a remaining time until the predetermined period of time expires. In some embodiments, the computer system replaces the respective selectable communication option (e.g., 604G) with the visual indication of the countdown or modifies the respective selectable communication option to include the visual indication of the countdown. In some embodiments, the computer system switches from the first user interface (e.g., 602G) (e.g., a call user interface) to a countdown user interface (e.g., 602I) (e.g., replaces the first user interface with the countdown user interface) that includes the visual indication of the countdown. Displaying a visual indication of a countdown of a remaining time until the predetermined period of time expires provides the user with notice of when the process for communicating via the non-terrestrial wireless communication network will be initiated, which provides improved visual feedback.

In some embodiments, the process for communicating via the non-terrestrial wireless communication network includes displaying (e.g., in response to detecting selection of the respective selectable communication option (e.g., 604G) and/or a determination that predetermined time criteria has been met) a second user interface (e.g., 604M) (e.g., a low-bandwidth communication mode user interface and/or an emergency reporting user interface) that is different from the first user interface (e.g., 602G) (e.g., ceasing to display the first user interface and, optionally, replacing the first user interface with the second user interface). In some embodiments, the second user interface includes a series of questions and/or selectable options and/or text entry field(s) (e.g., 604M) for generating a message, rather than, e.g., an open audio channel. Displaying a second user interface that is different from the first user interface as part of the process for communicating via the non-terrestrial wireless communication network allows the computer system to provide additional options and guide a user through the process for communicating via the non-terrestrial wireless communication network, which provides additional control options without cluttering the user interface and improved visual feedback.

In some embodiments, communicating via the non-terrestrial wireless communication network includes communication via a text message or an audio call (e.g., as described with reference to FIG. 6A). Including communication via a text message or an audio call provides the user with low-bandwidth options for communicating via the non-terrestrial wireless communication network, which provides additional control options without cluttering the user interface.

In some embodiments, communicating via the non-terrestrial wireless communication network includes initiating a communication session via (or performed at least partially via) the non-terrestrial wireless communication network (e.g., by selecting satellite communication button 604G, 604I, 904A, 1520B5, or 1534C6). In some embodiments, after initiating the communication session via the non-terrestrial wireless communication network is active (or, optionally, while the communication session via the non-terrestrial wireless communication network is active), the computer system: detects a user input (e.g., 618M) (e.g., detecting a voice command and/or a touch gesture corresponding to selection of a selectable user interface element) corresponding to a request to end the communication session (e.g., selection of end button 614); and in response to detecting the user input corresponding to a request to end the communication session, provides (e.g., displays) a prompt (e.g., 620M2 in FIG. 6M1) (e.g., a button, a notification, an affordance, a selectable confirmation option, and/or a selectable graphical element) to confirm the request to end the communication session. In some embodiments, in response to detecting a user input selecting the prompt to confirm the request to end the communication session, the computer system causes the communication session to end. In some embodiments, in response to detecting the user input corresponding to a request to end the communication session, the computer system does not cause (e.g., forgoes causing) the communication session to end, e.g., until receiving the user input selecting the prompt to confirm the request to end the communication session. Providing a prompt to confirm the request to end the communication session provides feedback that the user has requested to end the communication session and can prevent a user from unintentionally ending the communication session through an unintended input, which provides improved visual feedback. Preventing the user from unintentionally ending the communication session avoids additional time and user inputs to reestablish the communication session, which enables the user to operate the computer system with fewer errors and reduces the number of inputs needed to perform an operation.

In some embodiments, in accordance with (or, in some embodiments, in response to) a determination that a first respective terrestrial wireless communication network (e.g., a primary cellular network, a cellular network associated with the computer system, and/or a cellular network of a service provider associated with the computer system) is not reachable by the computer system, the computer system displays, via the display generation component, an indication (e.g., 607, 607*a*1, 607*c*, a graphical indication, icon, color, font, text, animation, symbol, thumbnail, image, and/or glyph) of a communication capability of the computer system (e.g., an indication of the capability of the computer system to communicate with a respective number or entity, such as an emergency number or emergency service); and in accordance with a determination that the first respective terrestrial wireless communication network is reachable by the computer system, the computer system forgoes display of the indication of the communication capability status of the computer system. In some embodiments, the indication of the communication capability of the computer system is displayed in a portion of a user interface that includes one or more indicators of a status of the computer system (e.g., cellular status, Wi-Fi status, time, short range communication status, and/or battery level). In some embodiments, the indication of the communication capability of the computer system is displayed at a location of a display and/or user interface at which a cellular status indicator is displayed when cellular service is available. Displaying an indication of communication capability of the computer system based on whether or not a respective terrestrial wireless communication network is reachable by the computer system automatically provides clear feedback to a user about the communication capability of the computer system when the communication capability of the computer system is limited without requiring the user to navigate a user interface to determine the communication capability, which provides improved visual feedback to the user, reduces the number of inputs needed to perform an operation, and performs an operation when a set of conditions has been met without requiring further user input.

In some embodiments, displaying the indication of the communication capability of the computer system includes displaying a first communication status indicator (e.g., 607*a*1, a graphical indication, icon, color, font, text, animation, symbol, thumbnail, image, and/or glyph) that indicates the capability of the computer system to communicate (e.g., with a respective number or entity, such as an emergency number or emergency service) via a terrestrial wireless communication network other than the first respective terrestrial wireless communication network (e.g., a cellular network different from a cellular network associated with the computer system). Displaying a first communication status indicator that indicates the capability of the computer system to communicate via a terrestrial wireless communication network other than the first respective terrestrial wireless communication network automatically informs a user about the ability to communicate via a terrestrial wireless communication network (which can be faster and consume less energy than a non-terrestrial communication network) when the first respective terrestrial wireless communication network is not reachable without requiring the user to navigate a user interface to determine the communication capability of the computer system, which provides improved visual feedback to the user and reduces the number of inputs needed to perform an operation.

In some embodiments, displaying the first communication status indicator includes: in accordance with a determination that a second respective terrestrial wireless communication network that is different from the first respective terrestrial wireless communication network is reachable by the computer system, displaying the first communication status indicator having a first appearance (e.g., in solid line, in black line, a first color, a first brightness, highlighted, emphasized, and/or not greyed out; e.g., 607*a*1 in FIG. 6X2). Displaying the first communication status indicator having a first appearance in accordance with a determination that a second respective terrestrial wireless communication network is reachable by the computer system automatically informs a user that another terrestrial wireless communication network (which can be faster and consume less energy than a non-terrestrial communication network) is reachable, even though the first respective terrestrial wireless communication network is not reachable, without requiring the user to navigate a user interface to determine the communication capability of the computer system, which provides improved visual feedback to the user, reduces the number of inputs needed to perform an operation, and performs an operation when a set of conditions has been met without requiring further user input.

In some embodiments, displaying the first communication status indicator includes: in accordance with a determination that no terrestrial wireless communication network is reachable by the computer system, displaying the first communication status indicator having a second appearance (e.g., in broken line, in grey line, a second color different from the first color, a second brightness dimmer than the first brightness, not highlighted relative to the first appearance, deemphasized relative to the first appearance, and/or greyed out; e.g., 607*a*1 in FIG. 6X3, 6X4, or 6X5) that is different from the first appearance of the first communication status indicator. Displaying the first communication status indicator having a second appearance in accordance with a determination that no terrestrial wireless communication network is reachable by the computer system automatically informs a user that no other terrestrial wireless communication network is reachable when the first respective terrestrial wireless communication network is not reachable without requiring the user to navigate a user interface to determine the communication capability of the computer system and indicates to the user that an alternative means of communication (e.g., via a user interface for satellite communication) may be required, which provides improved visual feedback to the user, reduces the number of inputs needed to perform an operation, and performs an operation when a set of conditions has been met without requiring further user input.

In some embodiments, displaying the indication of the communication capability of the computer system includes: in accordance with (or, in some embodiments, in response to) a determination that a non-terrestrial wireless communication network is reachable by the computer system (and, optionally, that communication via a Wi-Fi network is not available to the computer system and/or that a Wi-Fi capability of the computer system is turned off), displaying a second communication status indicator (e.g., 607c, a graphical indication, icon, color, font, text, animation, symbol, thumbnail, image, and/or glyph; an image and/or icon of a satellite) that is different from the first communication status indicator. In some embodiments, the second communication status indicator is displayed in accordance with a determination that a non-terrestrial wireless communication network is reachable by the computer system and that a Wi-Fi capability of the computer system is disabled (e.g., turned off). In some embodiments, in accordance with a determination that a non-terrestrial wireless communication network is reachable by the computer system and that a Wi-Fi capability of the computer system is enabled (e.g., turned on), the computer system forgoes display of the second communication status indicator (e.g., the second communication status indicator is not displayed if Wi-Fi is turned on). In some embodiments, the computer system displays the second communication status indicator in an expanded status bar (e.g., in a control user interface, such as a control center, that includes selectable options for controlling features of the computer system), but not in a non-expanded status bar (e.g., in a user interface other than the control user interface, such as a home screen, wake screen, lock screen, or application user interface). Displaying a second communication status indicator in accordance with a determination that a non-terrestrial wireless communication network is reachable by the computer system automatically informs a user that an alternative wireless communication network is reachable when the first respective terrestrial wireless communication network is not reachable without requiring the user to navigate a user interface to determine the communication capability of the computer system, which provides improved visual feedback to the user, reduces the number of inputs needed to perform an operation, and performs an operation when a set of conditions has been met without requiring further user input.

In some embodiments, the computer system displays, concurrently with the indication of the communication capability of the computer system, an indication (e.g., 607b, a graphical indication, icon, color, font, text, animation, symbol, thumbnail, image, and/or glyph) of Wi-Fi connectivity (e.g., an indication of whether or not the computer system is connected to a Wi-Fi network). In some embodiments, displaying the indication of Wi-Fi connectivity is performed in accordance with (or, in some embodiments, in response to) a determination that communication via a Wi-Fi network is available to the computer system. In some embodiments, the computer system displays the indication of Wi-Fi connectivity in response to detecting a request to enable Wi-Fi connectivity (e.g., a user input selecting a button for enabling Wi-Fi connectivity). Displaying an indication of Wi-Fi connectivity concurrently with the indication of the communication capability of the computer system informs a user about the ability of the computer system to communicate via Wi-Fi connectivity when the first respective terrestrial wireless communication network is not reachable without requiring the user to navigate a user interface to determine the Wi-Fi connectivity of the computer system, which provides improved visual feedback to the user and reduces the number of inputs needed to perform an operation.

In some embodiments, displaying the indication (e.g., 607b) of Wi-Fi connectivity includes displaying the indication of Wi-Fi connectivity without displaying an indication (e.g., 607c, the second communication status indicator, a graphical indication, icon, color, font, text, animation, symbol, thumbnail, image, and/or glyph) that a non-terrestrial wireless communication network is reachable by the computer system (or, in some embodiments, that the computer system is capable of communicating via a non-terrestrial wireless communication network). In some embodiments, in accordance with a determination that communication via a Wi-Fi network is available to the computer system and that a non-terrestrial wireless communication network is reachable by the computer system, the computer system displays the indication of Wi-Fi connectivity instead of (e.g., without displaying) the second communication status indicator and/or replaces the second communication status indicator with the indication of Wi-Fi connectivity. Displaying the indication of Wi-Fi connectivity without displaying an indication that a non-terrestrial wireless communication network is reachable by the computer system informs a user about the ability of the computer system to communicate via Wi-Fi connectivity, which can be faster, easier to connect to, and/or more reliable than non-terrestrial wireless communication network without requiring the user to navigate a user interface to determine the Wi-Fi connectivity of the computer system, which provides improved visual feedback to the user and reduces the number of inputs needed to perform an operation.

In some embodiments, displaying the first user interface includes: before displaying the respective selectable communication option, displaying the first user interface (e.g., 602E) without the respective selectable communication option (e.g., displaying 602E without 604G), and wherein displaying the respective communication option in accordance with a determination that a terrestrial wireless communication network is not reachable by the computer system is performed after (and, in some embodiments, in accordance with or in response to a determination that) an attempt (e.g., by the computer system) to initiate a communication (e.g., a phone call) via the respective terrestrial wireless communication network has failed (e.g., after the call in FIG. 6E has failed). Foregoing display of the respective selectable communication option until after an attempt to initiate a communication via the respective terrestrial wireless communication network has failed enables the computer system to attempt communication via a faster and/or more reliable network before providing the option to communicate via a non-terrestrial wireless communication network and indicates to the user that the attempt to initiate a communication via the respective terrestrial wireless communication network has failed, which provides improved visual feedback to the user, reduces the number of inputs needed to perform an operation, provides additional control options without cluttering the user interface with additional displayed controls, and performs an operation when a set of conditions has been met without requiring further user input.

In some embodiments, displaying the first user interface includes displaying an end call button (e.g., 609) in a first position in the first user interface (e.g., 609 in FIG. 6F), wherein the end call button, when selected, causes the computer system to stop attempting to initiate the communication via the respective terrestrial wireless communication network. In some embodiments, in accordance with the determination that a terrestrial wireless communication network is not reachable by the computer system (and, in some embodiments, after (or in accordance with or in response to a determination that) an attempt to initiate a communication via the respective terrestrial wireless communication network has failed), the computer system displays the end call button in a second position (e.g., 609 in FIG. 6F1 or 6F2) in the first user interface that is different from the first position in the first user interface. In some embodiments, the computer system moves or slides the end call button to the second position (e.g., via an animation over time) and displays the respective selectable communication option at or adjacent to the first position in the first user interface. Changing the position of the end call button in accordance with the determination that a terrestrial wireless communication network is not reachable by the computer system makes room on the user interface for the respective selectable communication option and informs a user that the terrestrial wireless communication network is not reachable and/or that an attempt to initiate a communication via the respective terrestrial wireless communication network has failed, which provides improved visual feedback to the user, provides additional control options without cluttering the user interface with additional displayed controls, and performs an operation when a set of conditions has been met without requiring further user input.

In some embodiments, in accordance with (or, in some embodiments, in response to) the determination that a terrestrial wireless communication network is not reachable by the computer system, the computer system provides (e.g., outputting and/or producing) a non-visual output (e.g., 619, 650, a haptic and/or audio output) (e.g., concurrently with displaying the respective selectable communication option) (e.g., 619 and/or 650 in FIG. 6F2). Providing a non-visual output in accordance with the determination that a terrestrial wireless communication network is not reachable by the computer system informs the user that a terrestrial wireless communication network is not reachable even if the user is not looking at a display of the computer system (e.g., if the computer system is up against the user's ear when attempting to make a call to an emergency service) or the display of the computer system is dimmed or inactive, which provides improved feedback and performs an operation when a set of conditions has been met without requiring further user input. Feedback about the communication status of the computer system that enables the computer system to be more quickly and efficiently controlled is particularly important in situations where the user is responding to an emergency or stressful situation.

Note that details of the processes described above with respect to method 700 are also applicable in an analogous manner to the methods described below. For example, method 800, 1000, 1200, 1400, 1600, 1800, 2000, and/or 2200 optionally includes one or more of the characteristics of the various methods described above with reference to method 700. For example, method 700 can be performed as part of a process for initiating a communication in accordance with method 800. For example, method 700 optionally includes providing an alignment element in accordance with method 1000. For example, method 700 can include selecting a second recipient for the communication, in accordance with method 1200. For brevity, these details are not repeated below.

FIG. 8 is a flow diagram illustrating methods for initiating a communication when a terrestrial wireless communication network is not reachable is described in accordance with some embodiments. In some embodiments, the method includes, while in emergency reporting mode, displaying options for an emergency report, receiving options and sending an emergency report with the received options. In some embodiments, the method can be implemented using the devices and user interfaces illustrated in FIGS. 6A-6Y. The method is performed at a computer system (e.g., 100, 300, 500, or 600; e.g., a smartphone, a tablet computer, a laptop computer, a desktop computer, a smartwatch, or a head mounted device (e.g., a head mounted augmented reality and/or extended reality device)) that is in communication with a display generation component (e.g., 601; e.g., a display controller, a touch-sensitive display system, and/or a head mounted display system) and one or more input devices (e.g., 601; a touch-sensitive surface, a touchscreen, a button, and/or a microphone). Some operations are, optionally, combined, the orders of some operations are, optionally, changed, and some operations are, optionally, omitted.

As described below, method 800 provides an intuitive way for communicating in a low-bandwidth mode. The method reduces the cognitive burden on a user communicating in a low-bandwidth mode, thereby creating a more efficient human-machine interface. For battery-operated computing devices, enabling a user to communicate in a low-bandwidth mode faster and more efficiently conserves power and increases the time between battery charges.

While the computer system is in a low-bandwidth communication mode (802) (in some embodiments, a mode in which a compressed message format (e.g., a format with limited data for transmission via non-terrestrial wireless communication) is used to communicate. In some embodiments, the computer system enters the low-bandwidth communication mode in response to receiving a request to enter the low-bandwidth communication mode (e.g., in response to receiving a request to communicate via a non-terrestrial wireless communication)), the computer system displays (804), via the display generation component, a first set of selectable communication-content options (e.g., 604M; e.g., affordances, buttons, graphical elements, graphical objects, and/or icons) corresponding to respective content for a communication (e.g., information that can be selected by a user to be included in the report), wherein the first set of selectable communication-content options are specific to the low-bandwidth communication mode (e.g., the options are only available and/or presented for the low-bandwidth communication mode) (in some embodiments, the options are not presented in a messaging user interface of a messaging application that displays a message conversation and/or a field for composing a message for the message conversation.)

While the computer system is in a low-bandwidth communication mode, the computer system detects (806), via the one or more input devices, a first set of one or more inputs (e.g., 610M or 612M; e.g., touch inputs) corresponding to selection of a first communication-content option (e.g., 606M or 608M) of the first set of selectable communication-content options.

While the computer system is in a low-bandwidth communication mode and after (e.g., in response to) detecting the first set of one or more inputs, the computer system displays (808), via the display generation component, a second set of selectable communication-content options (e.g., 604N or 604O; e.g., affordances, buttons, graphical elements, graphical objects, and/or icons (in some embodiments, the second set of selectable communication-content options are different from the first set of selectable communication-content options)) corresponding to respective content for the communication (e.g., information that can be selected by a user to be included in the report) (e.g., and ceasing to display the first set of two or more selectable communication-content options, optionally including ceasing to display a representation of the selected communication-content option of the first set of two or more selectable communication-content options), wherein the second set of selectable communication-content options are specific to the low-bandwidth communication mode. Displaying sets of selectable communication-content options (e.g., the first set and the second set) that are specific to the low-bandwidth communication mode and which correspond to respective content for the communication allows the computer system to provide feedback that assists a user in providing concise and pertinent information in the communication when bandwidth is constrained, which provides improved visual feedback and additional control options without cluttering the user interface.

While the computer system is in a low-bandwidth communication mode, the computer system detects (810), via the one or more input devices, a second set of one or more inputs (e.g., 608N or 608O; e.g., touch inputs) corresponding to selection of a second communication-content option (e.g., 608N or 608O) of the second set of selectable communication-content options.

While the computer system is in a low-bandwidth communication mode, the computer system detects (812) an input (e.g., 604R or 604S) corresponding to a request to send a communication including the content corresponding to the selection of the first communication-content option and the second communication-content option (e.g., a touch input (e.g., a tap gesture or other selection input) on a send affordance (e.g., 606R or 606S) and/or a send voice command and/or selection of a final communication-content option in a sequence of communication-content options).

In response to receiving the input corresponding to the request to send the communication, the computer system sends (814) the communication (e.g., via non-terrestrial wireless communication) including the content corresponding to the selection of the first communication-content option and the second communication-content option selected by the first set of one or more inputs and the second set of one or more inputs.

In some embodiments, the first set of selectable communication-content options includes three or more selectable communication-content options specific to the low-bandwidth communication mode (e.g., as described with reference to FIG. 6M; e.g., the first communication-content option selected by the first set of one or more inputs is one of the three or more selectable communication content options of the first set of selectable communication-content options). In some embodiments, the second set of selectable communication-content options includes three or more selectable communication-content options specific to the low-bandwidth communication mode (e.g., as described with reference to FIG. 6M; e.g., the second communication-content option selected by the second set of one or more inputs is one of the three or more selectable communication content options of the second set of selectable communication-content options). Including three or more selectable communication-content option specific to the low-bandwidth communication mode in the first set of selectable communication-content options and the second set of selectable communication-content options provides the user with various options to select in an organized manner, which provides improved visual feedback and additional control options without cluttering the user interface.

In some embodiments, the second set of communication-content options are based on (e.g., displayed based on, related to, selected in accordance with, and/or specific to) the selection of the first communication-content option (e.g., as described with reference to FIGS. 6M-6O, second set of options 604N and/or third set of options 604O are as specific to the selected car or vehicle option 604M, vehicle crash option 606N). In some embodiments, the second set of communication-content options are selected (e.g., by the computer system) from a set of available communication-content options based on the first communication-content option selected by the user. In some embodiments, the first set of selectable communication-content options provides options corresponding to different types of emergencies (e.g., fire, medical, or police), and the second set of selectable communication-content options provides options related to the type of emergency corresponding to the first communication-content option selected by the user. For example, if the first communication-content option selected by the user corresponds to a first type of emergency (e.g., a medical emergency), then the second set of selectable communication-content options includes a first set of options related to the first type of emergency (e.g., the medial emergency); and if the first communication-content option selected by the user corresponds to a second type of emergency (e.g., a fire emergency) different from the first type of emergency, then the second set of selectable communication-content options includes a second (e.g., different) set of options related to the second type of emergency (e.g., the fire emergency). Basing the second set of communication-content options on the selection of the first communication-content option allows the computer system to select and display options for the second set of communication-content options that are relevant to the user, which provides improved visual feedback.

In some embodiments, the first set of communication-content options and the second set of communication-content options are displayed without displaying (e.g., as described with reference to FIGS. 6M-6O, and 6V, first set of options 604M, second set of options 604N, and/or third set of options 604O are displayed without keyboard 608V; without concurrently displaying) a software keyboard (e.g., an EMOJI keyboard and/or QWERTY keyboard). Displaying the first set of communication-content options and the second set of communication-content options are displayed without displaying a software keyboard allows the computer system to provide the user with relevant options that can be selected quickly and easily without cluttering the user interface with more time-consuming and bandwidth-consuming input methods, which improves visual feedback, reduces the number of inputs needed to perform an operation, and provides additional control options without cluttering the user interface.

In some embodiments, the first set of communication-content options occupy more than half of a display region (e.g., as described with reference to FIG. 6M, first set of options 604M occupy more than half of reporting interface 602M; a display, user interface, or application window); and the second set of communication-content options occupy more than half of the display region (e.g., as described with reference to FIGS. 6N-6O, second set of options 604N, and/or third set of options 604O occupy more than half of reporting interface 602N and reporting interface 602O, respectively). In some embodiments, one or more objects other than the first or second set of communication-content options occupy less than half of the display region (e.g., a messaging UI). Having the first set of communication-content options occupy more than half of a display region and the second set of communication-content options occupy more than half of the display region directs the user's attention to the communication-content options and makes the options easier to view and select, which provides improved visual feedback.

In some embodiments, displaying the first set of selectable communication-content options includes displaying the first set of selectable communication-content options without displaying (e.g., without concurrently displaying) a messaging user interface (e.g., as described with reference to FIGS. 6M-6O, and 6T-6U, first set of options 604M, second set of options 604N, and/or third set of options 604O are displayed without displaying reporting interface 602; e.g., a user interface that includes a messaging conversation and/or history) (in some embodiments, displaying the first set of selectable communication-content options includes ceasing to display a messaging user interface). In some embodiments, displaying the second set of selectable communication-content options includes displaying the first set of selectable communication-content options without displaying the messaging user interface (in some embodiments, displaying the second set of selectable communication-content options includes ceasing to display the messaging user interface). Displaying the first set of selectable communication-content options and the second set of selectable communication-content options without displaying a messaging user interface provides the user with the ability to generate content for a communication without requiring additional inputs to navigate to an operate a messaging user interface, which reduces the number of inputs needed to perform an operation.

In some embodiments, in response to a determination that a terrestrial wireless communication network is not reachable by the computer system, the computer system enters the low-bandwidth communication mode. In some embodiments, the low-bandwidth communication mode is only available (e.g., entered) when a terrestrial wireless communication network is not reachable by the computer system (e.g., as described with reference to FIGS. 6M-6S). In some embodiments, the first set of selectable communication-content options and/or the second set of selectable communication-content options are not provided if a terrestrial wireless communication network is reachable by the computer system (e.g., if the computer system is not in the low-bandwidth communication mode). In some embodiments, the first set of selectable communication-content options and/or the second set of selectable communication-content options are provided only when a terrestrial wireless communication network is not reachable by the computer system (e.g., only when the computer system is in the low-bandwidth communication mode). Entering the low-bandwidth communication mode in response to a determination that a terrestrial wireless communication network is not reachable by the computer system provides the user with the low-bandwidth communication mode without requiring additional inputs, which performs an operation when a set of conditions has been met without requiring further user input.

In some embodiments, the first set of communication-content options and/or the second set of communication-content options include one or more options that identify a type of emergency (e.g., as described with reference to FIG. 6M; e.g., fire, medical, and/or police). In some embodiments, the first and/or second set of communication-content options allow a user to select a type of emergency from an enumerated set of emergencies (e.g., the computer system displays different options corresponding to different types of emergencies). Including one or more options that identify a type of emergency in the first set of communication-content options and/or the second set of communication-content options provides the user with a quick and efficient technique of specifying a type of emergency in the communication without additional inputs, which provides improved visual feedback and reduces the number of inputs needed to perform an operation.

In some embodiments, the first set of communication-content options and/or the second set of communication-content options include one or more options that identify a person (e.g., as described with reference to FIG. 6O; e.g., for emergencies, who needs help and/or the name of the person in need). Including one or more options that identify a person in the first set of communication-content options and/or the second set of communication-content options provides the user with a quick and efficient technique of specifying a person in the communication without additional inputs, which provides improved visual feedback and reduces the number of inputs needed to perform an operation.

In some embodiments, the first set of communication-content options and/or the second set of communication-content options include one or more options that indicate a status (e.g., as described with reference to FIG. 6Q; e.g., injured, lost, in danger, physical status, and/or medical status) of a person. Including one or more options that indicate a status of a person in the first set of communication-content options and/or the second set of communication-content options provides the user with a quick and efficient technique of specifying a status of a person in the communication without additional inputs, which provides improved visual feedback and reduces the number of inputs needed to perform an operation.

In some embodiments, the first set of communication-content options and/or the second set of communication-content options include an option to alert emergency contacts (e.g., notify affordance 1102E; e.g., an option to communicate with a predefined set of contactable entities). In some embodiments, the computer system provides a capability (e.g., user interface(s), menu(s), and/or selectable options) for a user to select a list of people to which the communication is to be sent. Including an option to alert emergency contacts in the first set of communication-content options and/or the second set of communication-content options provides the user with a quick and efficient technique of choosing recipients of the communication without additional inputs (e.g., to navigate to a contacts application), which provides improved visual feedback and reduces the number of inputs needed to perform an operation.

In some embodiments, displaying the first set of selectable communication-content options and/or the second set of selectable communication-content options includes displaying a selectable option (e.g., 618N; e.g., an "other" option to insert a narrative response) to include text in the communication that, when selected, displays (e.g., initiates display of) a keyboard (e.g., 608V; e.g., a soft keyboard and/or a keyboard that was not displayed prior to selection of the option to include text in the communication). In some embodiments, the option to include text in the communication limits the amount of text and/or characters that can be selected for inclusion in the communication (e.g., to 50, 100, or 200 characters). Displaying a selectable option to include text in the communication that, when selected, displays a keyboard provides the user with a quick and efficient technique of typing text to include in the communication without additional inputs (e.g., to display the keyboard), which provides improved visual feedback and reduces the number of inputs needed to perform an operation.

In some embodiments, while the computer system is in the low-bandwidth communication mode and before sending the communication including the content corresponding to the selection of the first communication-content option and the second communication-content option selected by the first set of one or more inputs and the second set of one or more inputs: the computer system displays, via the display generation component, a third set of selectable communication-content options (e.g., 604P or 604Q), wherein one or more of the selectable communication-content options in the third set of selectable communication-content options is required to be selected in order to send the communication; and the computer system displays, via the display generation component, a fourth set of selectable communication-content options, wherein sending the communication occurs without selection of any of the selectable communication-content options in the fourth set of selectable communication-content options. Displaying a third set of selectable communication-content options, where one or more of the selectable communication-content options in the third set of selectable communication-content options is required to be selected in order to send the communication, and displaying a fourth set of selectable communication-content options, where sending the communication occurs without selection of any of the selectable communication-content options in the fourth set of selectable communication-content options, allows the computer system to indicate to a user that selection of certain options is considered critical to the communication and provides the user with the ability to choose not to select potentially less critical options, which provides improved visual feedback.

In some embodiments, in accordance with a determination that the first set of selectable communication-content options can be skipped (e.g., is not required (e.g., the content of a selection from the set of selectable communication-content options is not necessary) to proceed to the next communication-content option), the first set of selectable communication-content options includes a skip option (e.g., as seen in FIG. 6M at 616; a selectable affordance that does not provide content for sending via the communication (in some embodiments, selection of the skip option displays the next communication-content option)). In some embodiments, in accordance with the determination that the first set of selectable communication-content option cannot be skipped (e.g., is required to proceed to the next communication-content option), the first set of selectable communication-content options is displayed without displaying a skip option. In some embodiments, in accordance with a determination that the second set of selectable communication-content options can be skipped, the second set of selectable communication-content options includes a skip option (e.g., as seen in FIGS. 6N-6O at 616). In some embodiments, in accordance with the determination that the second set of selectable communication-content option cannot be skipped, the second set of selectable communication-content options is displayed without displaying a skip option. Displaying a set of selectable communication-content options with or without displaying a skip option based on whether the set of selectable communication-content options can or cannot be skipped allows the computer system to indicate to a user that selection of certain options is considered critical to the communication and provides the user with the ability to choose not to select potentially less critical options, which provides improved visual feedback and performs an operation when a set of conditions has been met without requiring further user input.

In some embodiments, in response to detecting the first set of one or more inputs corresponding to selection of the first communication-content option and in accordance with a determination that the first communication-content option is a first type of communication-content option (e.g., a medical affordance for medical type emergencies and/or a type requiring follow-up questions related to the selection), the computer system displays a fifth set of selectable communication-content options corresponding to respective content for the communication (e.g., as described with reference to FIGS. 6M-6S; e.g., affordances, buttons, graphical elements, graphical objects, and/or icons). In some embodiments, the fifth set of selectable communication-content options are different from the first and second sets of selectable communication-content options (e.g., the fifth set of selectable communication-content options are specific to the first type (e.g., options related to the medical type emergency, such as, e.g., who is injured and/or what is their status)). In some embodiments, in response to detecting the first set of one or more inputs corresponding to selection of the first communication-content option and in accordance with a determination the first communication-content option is a second type of communication content option (e.g., a type requiring no follow-up questions related to the selection) different from the first type, the computer system forgoes display of the fifth set of selectable communication-content options. Displaying or forgoing display of the fifth set of selectable communication-content options corresponding to respective content for the communication based on the type of communication-content option of the selected first communication-content option automatically provides the user with relevant follow-on options (or not) based on previous input, which provides improved visual feedback and performs an operation when a set of conditions has been met without requiring further user input.

In some embodiments, after detecting the second set of one or more inputs and before sending the communication including the content corresponding to the selection of the first communication-content option and the second communication-content option selected by the first set of one or more inputs and the second set of one or more inputs, the computer system displays, via the display generation component, a representation of at least a portion of (e.g., a summary of or a preview of) the content corresponding to the selection of the first communication-content option and the second communication-content option selected by the first set of one or more inputs and the second set of one or more inputs (e.g., as described with reference to FIGS. 6R-6S). Displaying a representation of at least a portion of the content corresponding to the selection of the first communication-content option and the second communication-content option selected by the first set of one or more inputs and the second set of one or more inputs after detecting the second set of one or more inputs and before sending the communication provides the user with a summary of the content that will be included in the communication, which provides improved visual feedback.

In some embodiments, after (e.g., in response to) detecting the second set of one or more inputs (e.g., includes detecting the selectable communication-content options that have been selected (e.g., a plurality of or all selectable communication-content options have been selected)): the computer system displays, via the display generation component, a send option (e.g., 606R or 606S); and the computer system detects selection of the send option (e.g., an input (a touch input (e.g., a tap gesture or other selection input) on a send affordance or selection of a final communication-content option in a sequence of communication-content options)). In response to detecting the selection of the send option, the computer system initiates a process that includes sending the communication including the content corresponding to the selection of the first communication-content option and the second communication-content option. In some embodiments, the computer system sends the communication including the content corresponding to the selection of the first communication-content option and the second communication-content option in response to detecting the selection of the send option (e.g., automatically or without detecting further input). Displaying a send option after detecting the second set of one or more inputs indicates to the user that the communication can be sent and/or that no further options need to be selected to send the communication and provides an efficient technique for sending the communication, which provides improved visual feedback and reduces the number of inputs needed to perform an operation.

In some embodiments, the computer system displays (e.g., in response to selection of a final communication-content option, in response to detecting the selection of the send option, and/or concurrently with the send option), via the display generation component (e.g., 601), a visual indication (e.g., text, a graphic, a color, and/or an animation) of a countdown (e.g., 610R or 610S; e.g., a timer including numbers or pictorial time remaining) of a predetermined time period (e.g., five seconds, ten seconds, or thirty seconds); and in response to a determination that the predetermined time period has elapsed without detecting a selection of the send option, the computer system sends the communication including the content corresponding to the selection of the first communication-content option and the second communication-content option selected by the first set of one or more inputs and the second set of one or more inputs (e.g., automatically sending the communication once the countdown has expired). Displaying a visual indication of a countdown of a predetermined time period and sending the communication in response to a determination that the predetermined time period has elapsed without detecting a selection of the send option provides the user with a visual indication that the communication will be sent and allows the computer system to send the communication without further user input, which provides improved visual feedback and performs an operation when a set of conditions has been met without requiring further user input.

In some embodiments, in response to a determination a threshold time period has passed after displaying a respective selectable communication-content option (e.g., the first set of communication-content options, the second set of communication-content options, or a different set of communication-content options) without detecting, via the one or more input devices, a selection of the respective selectable communication-content option (e.g., if received a selection of the second communication-content option but no selection of a third communication-content option), the computer system (e.g., 100, 300, 500, or 600) sends a communication including content corresponding to detected selections of communication-content options (e.g., as described with reference to FIG. 6W; the first communication-content option and the second communication-content option). Sending a communication including content corresponding to detected selections of communication-content options in response to a determination a threshold time period has passed after displaying a respective selectable communication-content option without detecting a selection of the respective selectable communication-content option allows the computer system to automatically send a communication based on previously-selected options if a user stops making selections for a threshold amount of time, which reduces the number of inputs needed to perform an operation and performs an operation when a set of conditions has been met without requiring further user input.

In some embodiments, before sending the communication including content corresponding to detected selections of communication-content options, the computer system (e.g., 100, 300, 500, or 600) displays a visual indication of a countdown (e.g., 610W) indicating a remaining time until the communication including content corresponding to detected selections of communication-content options will be sent (e.g., without further user input). Displaying a visual indication of a countdown indicating a remaining time until the communication will be sent provides the user with notice that the communication will be automatically sent without further input, which provides improved visual feedback.

In some embodiments, before sending the communication including content corresponding to detected selections of communication-content options (e.g., while displaying the visual indication (e.g., text, a graphic, a color, and/or an animation) of the countdown indicating the remaining time until the communication including content corresponding to detected selections of communication-content options will be sent), the computer system displays a selectable cancel sending option (e.g., 608W) that, when selected, causes the computer system to forego sending the communication including content corresponding to detected selections of communication-content options. In some embodiments, the cancel sending option, when selected, causes the computer system to cease the countdown (e.g., cease display of the visual indication of the countdown). Displaying a selectable cancel sending option before sending the communication provides the user with an indication that sending the communication can be canceled and provides an efficient technique for canceling sending of the communication, with provides improved visual feedback and reduces the number of inputs needed to perform an operation.

In some embodiments, subsequent to displaying the selectable communication-content option, the display generation component is deactivated (e.g., as described with reference to FIG. 6M, 6N, 6O, 6P, or 6Q, and as shown and described in FIG. 11B; e.g., turned off, dimmed, in a sleep state, and/or in a low-power state). In some embodiments, in response to a determination that the threshold time period has passed without detecting the selection of the respective selectable communication-content option, the computer system activates the display generation component. Activating the display generation component in response to a determination that the threshold time period has passed without detecting the selection of the respective selectable communication-content option brings the user's attention to the display generation component and prompts the user to provide an input, with provides improved visual feedback and performs an operation when a set of conditions has been met without requiring further user input.

In some embodiments, the communication includes emergency information (e.g., medical ID) and a location of the computer system (e.g., as described with reference to FIGS. 6T-6U; in addition to the content corresponding to the selection of the first communication-content option and the second communication-content option selected by the first set of one or more inputs and the second set of one or more inputs, as well as content corresponding to any other communication-content options that were selected or questions that were answered). Including emergency information and a location of the computer system in the communication provides relevant information in the communication automatically without requiring additional user input, which reduces the number of inputs needed to perform an operation.

In some embodiments, in response to receiving the input corresponding to the request to send the communication, the computer system displays a user interface of a messaging application (e.g., 602T or 602U). In some embodiments, the user interface of the messaging application includes a message conversation, where the message conversation includes a message (e.g., 620T or 620U) in the conversation (e.g., a conversation transcript) that includes emergency information, a location of the computer system, and the content corresponding to the selection of the first communication-content option and the second communication-content option selected by the first set of one or more inputs and the second set of one or more inputs, as well as content corresponding to any other communication-content options that were selected or questions that were answered). Displaying a user interface of a messaging application in response to receiving the input corresponding to the request to send the communication provides the messaging application to the user automatically when the communication is sent, which provides improved visual feedback and reduces the number of inputs needed to perform an operation.

In some embodiments, the user interface of the messaging application includes a message compose field (e.g., 616T or 616U; e.g., for drafting additional messages for the message conversation). Including a message compose field in the user interface of the messaging application provides the user with an efficient technique for sending a follow-up communication after the communication is sent, which provides improved visual feedback and reduces the number of inputs needed to perform an operation.

In some embodiments, after (e.g., in response to) sending the communication, the computer system displays an alignment element (e.g., 930; e.g., a "fan" graphic and/or an indicator of a direction to orient the computer system) (in some embodiments, the alignment element includes an arrow pointing in a direction to rotate the computer system, and/or or a picture of a satellite shown in space relative to the computer system) at a first size; and after displaying the alignment element at the first size, the computer system ceases to display the alignment element at the first size and displaying the alignment element at a second size that is smaller than the first size (e.g., within a top third or less of the display and/or as a banner). Displaying an alignment element at a first size after sending the communication and displaying the alignment element at a second size that is smaller than the first size after displaying the alignment element at the first size provides the user with alignment information after the communication and reduces the prominence of the information as time passes, which provides improved visual feedback.

In some embodiments, the computer system concurrently displays, with the alignment element (e.g., in the banner), a visual indication (e.g., text, a graphic, a color, and/or an animation) of a sending status of the communication (e.g., sending status bar of FIG. 9K; e.g., a graphic and/or text, the content and/or appearance of which depends on the status of sending the communication (e.g., "sending" or "sent"). In some embodiments, the alignment element and/or the visual indication of the sending status of the communication include, or are included in, a selectable user interface element (e.g., 926) that, when selected, displays an alignment interface (e.g., 902C). Concurrently displaying a visual indication of a sending status of the communication with the alignment element provides the user with relevant information about the sending status of the communication, which provides improved visual feedback.

In some embodiments, the computer system concurrently displays, with the alignment element (e.g., in the banner), a visual indication (e.g., text, a graphic, a color, and/or an animation) of a connection status of the computer system with a communication system (e.g., 929; e.g., a non-terrestrial wireless communication system and/or a satellite communication system) for sending the communication via the low-bandwidth communication mode (e.g., as described with reference to FIGS. 9K-9M; e.g., a graphic and/or text, the content and/or appearance of which depends on the connection status of the computer (e.g., "connected" or "not connected"). In some embodiments, the alignment element and/or the visual indication of the connection status of the communication include, or are included in, a selectable user interface element that, when selected, displays an alignment interface (e.g., 902C). Concurrently displaying a visual indication of a connection status of the computer system with a communication system for sending the communication via the low-bandwidth communication mode with the alignment element provides the user with relevant information about the connection status of the computer system, which provides improved visual feedback.

In some embodiments, before sending the communication and in accordance with a determination that the computer system is not aligned properly for sending the communication via the low-bandwidth communication mode (e.g., via non-terrestrial and/or satellite communication) (e.g., the computer system is not aligned with one or more satellites, the computer system displays an alignment element (e.g., a "fan" graphic and/or an indicator of a direction to orient the computer system) (in some embodiments, the alignment element includes an arrow pointing in a direction to rotate the computer system, and/or or a picture of a satellite shown in space relative to the computer system). Displaying an alignment element (e.g., 930) in accordance with a determination that the computer system is not aligned properly for sending the communication via the low-bandwidth communication mode automatically provides the user with a visual indication that the computer system is not aligned properly for sending the communication and can help the user align the computer system, which provides improved visual feedback and performs an operation when a set of conditions has been met without requiring further user input.

In some embodiments, the computer system displays (e.g., in a banner) a visual indication (e.g., text, a graphic, a color, and/or an animation) of a connection status of the computer system with a communication system (e.g., 929; e.g., with a non-terrestrial and/or satellite communication system) for sending the communication via the low-bandwidth communication mode; and in accordance with a determination that the computer system is not connected to the communication system for sending the communication via the low-bandwidth communication mode, the computer system displays (e.g., in the banner and/or concurrently with the visual indication of the connection status of the computer system) a visual indication (e.g., text, a graphic, a color, and/or an animation) of an error condition (e.g., e.g., as described with reference to FIGS. 9C-9J; e.g., an indication of the reason why the computer system cannot currently communicate with the one or more satellites). Displaying a visual indication of a connection status of the computer system with a communication system for sending the communication via the low-bandwidth communication mode provides the user with information about the connection status, which provides improved visual feedback. Displaying a visual indication of an error condition in accordance with a determination that the computer system is not connected to the communication system for sending the communication via the low-bandwidth communication mode automatically provides the user with an indication that the computer system is not connected to the communication system for sending the communication via the low-bandwidth communication mode, which provides improved visual feedback and performs an operation when a set of conditions has been met without requiring further user input.

In some embodiments, the visual indication of the connection status of the computer system with the communication system for sending the communication via the low-bandwidth communication mode includes (or is included in) a selectable connection assistant option (e.g., 926; e.g., a banner, icon, button, affordance, or and/or graphical element). In some embodiments, the computer system detects selection of (e.g., a tap gesture or other selection input on) the connection assistant option; and in response to detecting the selection of the connection assistant element, the computer system displays instructions (e.g., 908F; e.g., text and/or a graphical indicator, such as an arrow) for connecting the computer system with the communication system for sending the communication via the low-bandwidth communication mode (e.g., an alignment element (e.g., a "fan" graphic and/or an indicator of a direction to orient the computer system) (in some embodiments, the alignment element includes an arrow pointing in a direction to rotate the computer system, and/or or a picture of a satellite shown in space relative to the computer system). Displaying instructions for connecting the computer system with the communication system for sending the communication via the low-bandwidth communication mode in response to detecting selection of the connection assistant element provides the user with an efficient technique for obtaining instructions for connecting the computer system with the communication system for sending the communication via the low-bandwidth communication mode without additional input, which provides improved visual feedback and reduces the number of inputs needed to perform an operation.

In some embodiments, displaying the visual indication of an error condition includes displaying (e.g., in the banner and/or concurrently with the visual indication of the connection status of the computer system) instructions (e.g., text and/or a graphical indicator, such as an arrow) for connecting the computer system with the communication system for sending the communication via the low-bandwidth communication mode (e.g., as described with reference to FIG. 9M). Displaying instructions for connecting the computer system with the communication system for sending the communication via the low-bandwidth communication mode as part of displaying the visual indication of an error condition provides the user with convenient access to the instructions without requiring additional inputs, which provides improved visual feedback and reduces the number of inputs needed to perform an operation.

In some embodiments, in response to detecting a change in position (e.g., location and/or orientation) of the computer system (or a predetermined portion (e.g., antenna) of the computer system) relative to the communication system for sending the communication via the low-bandwidth communication mode, the computer system changes an appearance of (e.g., animating) an element that indicates the position of the computer system (e.g., 931) (or the predetermined portion of the computer system) relative to the communication system for sending the communication via the low-bandwidth communication mode (e.g., a graphic of a satellite is moved rotationally around a graphical representation of the computer system). Changing an appearance of an element that indicates the position of the computer system relative to the communication system for sending the communication via the low-bandwidth communication mode in response to detecting a change in position of the computer system relative to the communication system for sending the communication via the low-bandwidth communication mode provides the user with feedback about the position of the computer system relative to the communication system as the relative position of the computer system changes, which provides improved visual feedback.

In some embodiments, while displaying the visual indication of the connection status of the computer system with the communication system for sending the communication via the low-bandwidth communication mode, the computer system detects a request to open an application (e.g., an application that is not used for sending the communication via the low-bandwidth communication mode). In response to detecting the request to open the application: the computer system ceases display of at least a portion of the visual indication of the connection status of the computer system with the communication system for sending the communication via the low-bandwidth communication mode (e.g., minimize, hide, and/or cease displaying a banner that includes the visual indication); and displays a selectable graphical element (e.g., 610T, 610U; e.g., a pill) that, when selected, causes the computer system to display (e.g., redisplay, unhide, and/or maximize display of) the visual indication of the connection status of the computer system with the communication system for sending the communication via the low-bandwidth communication mode. In some embodiments, the selectable graphical element replaces a cellular status indicator (e.g., 607). Ceasing display of at least a portion of the visual indication of the connection status of the computer system with the communication system for sending the communication via the low-bandwidth communication mode and displaying a selectable graphical element that, when selected, causes the computer system to display the visual indication of the connection status of the computer system with the communication system for sending the communication via the low-bandwidth communication mode in response to detecting a request to open an application allows the computer system to display the application while providing the user with an efficient way to obtain information about the connection status, which provides improved visual feedback, reduces the number of inputs needed to perform an operation, and provides additional control options without cluttering the user interface.

In some embodiments, in response to receiving the input corresponding to the request to send the communication, the computer system displays a sending status element (e.g., sending status bar in FIG. 9K; e.g., a graphical element illustrating via graphic or text the status of sending the communication (e.g., "sending" or "sent") and/or a status bar where the amount of fill of the bar is proportional to the completion status of sending the communication), wherein an appearance of the sending status element is based on a progress of the sending of the communication. In some embodiments, the computer system updates the appearance of the sending status element as sending of the message progresses. Displaying a sending status element in response to receiving an input corresponding to a request to send the communication, where an appearance of the sending status element is based on a progress of the sending of the communication provides the user with information about the progress of sending the communication without further input, which provides improved visual feedback and reduces the number of inputs needed to perform an operation.

In some embodiments, after sending the communication including the content corresponding to the selection of the first communication-content option and the second communication-content option selected by the first set of one or more inputs and the second set of one or more inputs, the computer system displays a user interface (e.g., 902K; e.g., a user interface of a messaging application, a message compose field, and/or a third set of selectable communication-content options) for sending a second communication (e.g., 928M; e.g., a follow-up message) to one or more recipients of the communication including the content corresponding to the selection of the first communication-content option and the second communication-content option selected by the first set of one or more inputs and the second set of one or more inputs. While displaying the user interface for sending the second communication, the computer system detects a third set of one or more inputs corresponding to selection of content for the second communication and a request to send the second communication. In response to detecting the third set of one or more inputs, the computer system sends the second communication including the content selected by the third set of one or more inputs. In some embodiments, the second communication is included (e.g., displayed in a messaging application) in a message conversation with the content corresponding to the selection of the first communication-content option and the second communication-content option selected by the first set of one or more inputs and the second set of one or more inputs. Displaying a user interface for sending a second communication to one or more recipients of the communication and ending the second communication including the content selected by the third set of one or more inputs in response to detecting the third set of one or more inputs allows the user to send a follow-up message after sending the communication, which provides improved visual feedback.

In some embodiments, the user interface of the messaging application includes a message compose field (e.g., 912K; e.g., for drafting additional messages for the message conversation) and, optionally, a send affordance (e.g., 916K). Including a message compose field in the user interface of the messaging application provides the user with an efficient technique for composing and/or sending the second communication, which provides improved visual feedback and reduces the number of inputs needed to perform an operation.

In some embodiments, the computer system displays, concurrently with the first set of communication-content options and/or the second set of communication-content options, an end option (e.g., 914) that, when selected (e.g., via user input 934L), causes the computer system to exit the low-bandwidth communication mode (e.g., and/or cease display of the first set of selectable communication-content options and/or the second set of selectable communication-content options) or, optionally, display a confirmation prompt (e.g., 620M). Displaying an end option that, when selected, causes the computer system to exit the low-bandwidth communication mode concurrently with the first set of communication-content options and/or the second set of communication-content options provides the user with an indication that it is possible to exit the low-bandwidth communication mode and a convenient and easy technique for exiting the low-bandwidth communication mode, which provides improved visual feedback and reduces the number of inputs needed to perform an operation.

In some embodiments, the first set of communication-content options and/or the second set of communication-content options are displayed while the computer system is not connected to a system for sending the communication via the low-bandwidth communication mode. In some embodiments, in response to a determination the computer system is not connected to (e.g., has lost connection with) the system for sending the communication via the low-bandwidth communication mode, the computer system maintains display of the first set of communication-content options and/or the second set of communication-content options (e.g., as described with reference to FIGS. 6M, 6N, 6O, 6P, and 6Q). Displaying the first set of communication-content options and/or the second set of communication-content options while the computer system is not connected to a system for sending the communication via the low-bandwidth communication mode provides the user with the ability to continue to generate content for the communication even if a connection is interrupted (e.g., temporarily), which provides improved visual feedback.

In some embodiments, sending the communication, including the content corresponding to the selection of the first communication-content option and the second communication-content option selected by the first set of one or more inputs and the second set of one or more inputs further includes: sending one or more additional communications (e.g., as described with reference to FIGS. 6T-6U, and 9M-9O; e.g., communicating additional, subsequently received (e.g., from emergency services) and/or sent messages and/or the content of the messages; in some embodiments communicating the additional messages are sent periodically (e.g., live; in real-time)); and wherein sending the communication is to a first recipient and a second recipient; forgoing communicating received communications from the second recipient of the communication with the sender and the first recipient (e.g., not communicating the message if both the sender and first recipient are in the same thread). Forgoing communicating received communications from the second recipient of the communication with the sender and the first recipient allows the senders from whom the computer system receives (or displays) messages to be limited, which provides improved visual feedback.

In some embodiments, while the computer system is in the low-bandwidth communication mode: the computer system displays an indication (e.g., 608L1, a graphical indication, icon, color, font, text, animation, symbol, thumbnail, image, and/or glyph) that communication performed via the low-bandwidth communication mode (e.g., communication performed via satellite communication and/or while the computer system is in the low-bandwidth communication mode) is (or, in some embodiments, may be) slower (e.g., uses a lower bandwidth) than communication that is not performed via the low-bandwidth communication mode (e.g., while the computer system is not in the low-bandwidth communication mode; communication performed via a terrestrial wireless communication network, a Wi-Fi network, and/or a cellular network). In some embodiments, the computer system displays the indication that communication performed via the low-bandwidth communication mode is slower than communication that is not performed via the low-bandwidth communication mode before displaying the first set of selectable communication-content options. Displaying an indication that communication performed via the low-bandwidth communication mode is slower than communication that is not performed via the low-bandwidth communication mode prepares the user for potentially slower communication so that the user does not think that there is an error when communication is slower than what the user is used to, which provides improved visual feedback to the user.

In some embodiments, the first set of selectable communication-content options and/or the second set of selectable communication-content options includes an option (e.g., 1716*a*1 and/or "Multiple People" option in set of options 604O) that indicates two or more people need assistance (e.g., that two or more people need assistance and/or are involved in an event). Including an option that indicates two or more people enables the user to quickly and efficiently indicate that multiple people are involved in an event with a single selection instead of having to indicate each person individually (e.g., repeat an indication process for each person), which reduces the number of inputs needed to perform an operation, reduces power usage, improves battery life, and/or provides additional control options without cluttering the user interface with additional displayed controls.

In some embodiments, while the computer system is in the low-bandwidth communication mode: before sending the communication, the computer system displays a field (e.g., 609V, a message compose field, and/or a text entry field) for entering text (or, in some embodiments, other content) to be included in the communication, including limiting the amount of text (e.g., number of characters or, in some embodiments, amount of content) that can be included in the field (e.g., the computer system prevents the amount of characters in the field from exceeding a threshold number of characters; e.g., 610V indicates that computer system 600 limits the amount of text). In some embodiments, in response to detecting input corresponding to text (e.g., selection of keys on a keyboard and/or a voice command), the computer system displays the text in the field. In some embodiments, the communication includes the text displayed in the field. Displaying a field for entering text to be included in the communication and limiting the amount of text that can be included in the field enables the user to customize the content of the message while keeping the communication to a size that can be sent quickly while the computer system is in the low-bandwidth communication mode, which provides improved visual feedback to the user and provides additional control options without cluttering the user interface with additional displayed controls.

In some embodiments, while the computer system is in the low-bandwidth communication mode: while displaying the first set of selectable communication-content options (e.g., 604M), the computer system displays an end option (e.g., 614, a selectable option, an icon, a button, an affordance, and/or a user-interactive graphical user interface object) that, when selected, initiates a process to exit the low-bandwidth communication mode: and while displaying the second set of selectable communication-content options (e.g., 604N), the computer system displays the end option (e.g., the computer system consistently displays and/or maintains display of the end option while the computer system is in the low-bandwidth communication mode). Displaying the end option while displaying the first set of selectable communication-content options, displaying an end option and while displaying the second set of selectable communication-content options enables the user to quickly exit the low-bandwidth communication mode at multiple stages, which provides improved visual feedback to the user and reduces the number of inputs needed to perform an operation.

In some embodiments, while the computer system is in the low-bandwidth communication mode: in response to detecting the second set of one or more inputs corresponding to selection of the second communication-content option of the second set of selectable communication-content options: in accordance with a determination that the selected second communication-content option is a first option (e.g., "Stroke" or "Drowning" in 604Q) of the second set of selectable communication-content options, the computer system displays, via the display generation component, an option (e.g., 606S, a selectable option, an icon, a button, an affordance, and/or a user-interactive graphical user interface object) to send the communication; and in accordance with a determination that the selected second communication-content option is a second option (e.g., "Sickness" in 604Q) of the second set of selectable communication-content options that is different from the first option of the second set of selectable communication-content options, the computer system displays, via the display generation component, a third set of selectable communication-content options (e.g., 604O) corresponding to respective content for the communication without displaying the option to send the communication (e.g., a send option, such as 606R or 606S, is not displayed in 602O), wherein the third set of selectable communication-content options are specific to the low-bandwidth communication mode. Displaying an option to send the communication or a set of selectable communication-content options corresponding to respective content for the communication without displaying the option to send the communication depending on what communication-content option is selected enables the user to send a communication more quickly (e.g., with fewer user inputs) under circumstances that are deemed particularly urgent while allowing a user to provide additional information when circumstances are not deemed particularly urgent, which provides improved visual feedback to the user, reduces the number of inputs needed to perform an operation, and performs an operation when a set of conditions has been met without requiring further user input.

Note that details of the processes described above with respect to method 800 are also applicable in an analogous manner to the methods described above and below. For example, method 700, 1000, 1200, 1400, 1600, 1800, 2000, and/or 2200 optionally includes one or more of the characteristics of the various methods described above with reference to method 800. For example, method 800 optionally can be performed as part of a process for initiating a communication in accordance with method 700. For example, method 800 optionally includes providing an alignment element in accordance with method 1000. For example, method 800 can include selecting a second recipient for the communication, in accordance with method 1200. For example, method 1800 can initiate method 800 from a messaging application. For example, sets of options as described in method 800 can be displayed in the alternative communication network test mode in method 2000. For example, method 800 can be the process corresponding to the user interface object in method 2200. For brevity, these details are not repeated below.

FIGS. 9A-9U illustrate exemplary user interfaces for aligning the computer system with one or more satellites, in accordance with some embodiments. The user interfaces in these figures are used to illustrate the processes described below, including the processes in FIG. 10.

FIGS. 9A-9P include computer system 900 with touch-sensitive display 901. In FIGS. 9A and 9B, computer system 900 displays interfaces for receiving a request to communicate. In FIG. 9A, computer system 900 displays calling interface 902A including a call to 911 in text field 908. Calling interface 902A includes end call button 917, connection indicator 905, plurality of call management buttons 903, and satellite communication button 904A. Network indicator 907 indicates that the terrestrial wireless communication network is unavailable to complete the call to 911. Computer system 900 also displays "no connection" at connection indicator 905 to indicate that the terrestrial wireless communication network is unavailable to complete the call to 911. In some embodiments, computer system 900 includes one or more elements of devices 100, 300, and/or 500. In some embodiments, computer system 900 is substantially similar to computer system 600 and includes some or all of the elements of, and can perform some or all of the functions as, computer system 900.

In some embodiments, any of the inputs described herein (e.g., input 906A, 906B, 904K, 927K, 922L, 927M, 927M1, and/or 927N) is or includes a touch input (e.g., a tap gesture and/or a swipe gesture). In some embodiments, any of the inputs described herein (e.g., input 906A, 906B, 904K, 927K, 922L, 927M, 927M1, and/or 927N) is or includes a voice input (e.g., a voice command to select a user interface element or to activate a feature or perform a function, such as a feature or function associated with a user interface element). In some embodiments, any of the inputs described herein (e.g., input 906A, 906B, 904K, 927K, 922L, 927M, 927M1, and/or 927N) is or includes an air gesture (e.g., an air gesture to select a user interface element or to activate a feature or perform a function, such as a feature or function associated with a user interface element). In some embodiments, any of the inputs described herein (e.g., input 906A, 906B, 904K, 927K, 922L, 927M, 927M1, and/or 927N) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

In response to determining that no terrestrial wireless communication network is available to complete the call to 911, call management buttons 903 are gray, indicating that call management buttons 903 are not interactable (e.g., not selectable or disabled) because the call cannot connect. In response to receiving input 906A on satellite communication button 904A, computer system 900 displays a plurality of options to select content to be submitted in an emergency report. In some embodiments, the emergency report is a low-bandwidth communication, where the maximum amount of data for communication is limited. Exemplary interfaces for the options to be submitted in the emergency report are illustrated and discussed in FIGS. 6M-6Q. In some embodiments, calling interface 602A of FIG. 9A is similar to the features described in calling interface 602G of FIG. 6G, described above.

In FIG. 9B, computer system 900 displays summary interface 902B that includes an emergency report of a summary of the selections made on the plurality of options. Summary interface 902B includes back button 915, timer 910B, send option 904B, and don't send option 908B. In response to receiving input 906B, computer system 900 displays alignment interface 902C of FIG. 9C. In some embodiments, timer 910B indicates an amount of time remaining (e.g., in seconds) before computer system 900 automatically sends the emergency report, including the displayed summary, and computer system 900 displays alignment interface 902C of FIG. 9C. In some embodiments, summary interface 902B is similar to the features described in summary interface 602S in FIG. 6S, described above.

In some embodiments, a non-terrestrial wireless communication network (e.g., a satellite network) is not available to send the emergency report. In response to receiving a request to communicate, such as input 906B of FIG. 9B, computer system 900 displays an alignment interface (e.g., alignment interface 902C of FIG. 9C) for communicating the emergency report via a satellite. As described herein, computer system 900 has communication window 930 for communicating with the satellite. In response to receiving an indication that computer system 900 is oriented to align communication window 930 with a satellite, computer system 900 sends the emergency report. The orientation of computer system 900 that aligns with the satellite is referred to as the alignment position. In some embodiments, the alignment position is the center of communication window 930, as described in alignment interface 902J in FIG. 9J.

In some embodiments, computer system 900 includes a database (e.g., memory) of orbits of satellites for communication. In some embodiments, the orbits include the known positions in time of satellites. Computer system 900 determines a satellite is in range of communication of a satellite based on the position of the satellites at the time of initiating the message, and the location of computer system 900 (e.g., GPS position). The present embodiments describe one satellite for communication, however additional satellites may be aligned with computer system 900 to send an emergency report (e.g., two satellites may be in the communication window).

In FIGS. 9C-9J, computer system 900 displays an alignment interface (e.g., 902C, 902D, 902E, 902F, 902G, 902H, 902I, 902J, 902O, and 902P) with end button 914 and alignment element 909. User 950 indicates an elevation of computer system 900. Minimap 940 indicates a spatial position of computer system 900 in a 2D space. Minimap 940 includes an exemplary user 942C with an arrow indicating an azimuth (e.g., rotational direction) computer system 900 is facing the communication window 930, described below.

End button 914 is a selectable button for ending the display of the respective alignment interface (902C, 902D, 902E, 902F, 902G, 902H, 902I, 902J, 902O, or 902P). In response to receiving a selection of end button 914, computer system 900 displays the previously displayed interface, calling interface 902A of FIG. 9A or summary interface 902B of FIG. 9B. In some embodiments, in response to receiving a selection of end button 914, computer system 900 displays a home screen.

In FIG. 9C, computer system 900 displays alignment interface 902C, which concurrently displays end button 914 and alignment element 909. In some embodiments, in response to a determination that the location of computer system 900 (e.g., relative to the satellite) cannot be determined, computer system 900 displays alignment element 902C. In some embodiments, if the location of computer system 900 can be determined, computer system 900 forgoes displaying alignment interface 902C and displays alignment interface 902D.

Alignment element 909 displays instructions to align computer system 900 with a satellite. Alignment element 909 includes graphical element 931 and textual element 908C. Graphical element 931 includes communication window 930. Communication window 930 is an exemplary range of orientations in which computer system 900 is capable of communication with the satellite. In some embodiments, computer system 900 displays a graphical indication of a satellite (e.g., satellite representation 929 described below) as inside the communication window 930 to indicate that computer system 900 is aligned for communication with the satellite. Graphical element 931 is updated as computer system 900 is oriented to align with a satellite.

Graphical element 931 includes computer system 932 representing computer system 900 as the origin of the communication window 930. As described herein, the orientation of computer system 900 includes an azimuth and elevation to align computer system 900 with the satellite. The azimuth is a direction or rotation of computer system 900. The elevation is a pitch or an angle at which computer system 900 is facing (e.g., pointing up or pointing down).

Minimap 940 describes the azimuth of computer system 900, indicated by the arrow from user 942C. The arrow indicates the direction computer system 900 is facing (e.g., the azimuth orientation of computer system 900). In some embodiments, direction computer system 900 is facing (e.g., the azimuth of computer system 900) is the direction communication window 930 is oriented. In FIG. 9C, computer system 900 is facing south.

In FIG. 9C, user 950 is orienting the elevation of computer system 900 slightly downward. Alignment element 909 indicates computer system 900 is unable to connect to a satellite. In response to determining computer system 900 is unable to connect with a satellite, graphical element 931 forgoes displaying satellite representation 929, and displays communication window 930. In some embodiments, computer system 900 displays satellite representation 929 with a dim (e.g., translucent) appearance, indicating that computer system 900 is unable to connect to a satellite.

Textual element 908C indicates that computer system 900 is not able to connect to a satellite. Textual element 908C includes textual prompts that can appear at once, in sets, or individually. Textual prompts 908C can be replaced after a threshold period of time of displaying the textual prompt (e.g., after 3 seconds, 5 second, or 10 seconds of displaying "poor connection," the text is replaced with "unable to connect"). Communication window 930 includes an empty appearance, indicating computer system 900 is not connected or oriented to a satellite. In some embodiments, as shown in FIG. 9C, computer system 900 outputs haptic output 619 and/or audio output 650 to indicate that computer system 900 has a poor connection.

In response to computer system 900 determining the position of computer system 900 and computer system 900 is obstructed from communication with a satellite, computer system 900 displays alignment interface 902D shown in FIG. 9D. In FIG. 9D, computer system 900 displays alignment interface 902D, which concurrently displays end button 914 and alignment element 909. Alignment element 909 includes graphical element 931 and textual element 908D. In some embodiments, as shown in FIG. 9D, computer system 900 outputs haptic output 619 and/or audio output 650 to indicate that the connection status of computer system 900 has changed (e.g., from poor connection/unable to connect to looking for a satellite).

In FIG. 9D, computer system 900 displays the same elevation as described in FIG. 9C. Minimap 940 also illustrates that user 942D is facing the same direction as described in FIG. 9C. In response to computer system 900 determining the position of computer system 900 and that computer system 900 is obstructed from communication with a satellite, computer system 900 updates display of alignment element 909 to indicate that an obstruction is present.

In FIG. 9D, textual element 908D replaces textual element 908C. Textual element 908D includes a notification to make sure computer system 900 is outside. Obstructions, such as being inside, can block communication with a satellite. Textual element 908D indicates that computer system 900 is not connected and a satellite has not been found. In some embodiments, computer system 900 displays (e.g., continues to display) satellite representation 929 with a dim (e.g., translucent) appearance in alignment interface 902D, indicating that computer system is unable to connect to a satellite. Communication window 930 illustrates (e.g., continues to have) an empty appearance to indicate that computer system 900 is not connected or oriented to a satellite.

In response to a determination that computer system 900 is not obstructed (e.g., no longer obstructed), computer system 900 displays alignment interface 902E of FIG. 9E. In some embodiments, as shown in FIG. 9E, computer system 900 outputs haptic output 619 and/or audio output 650 to indicate that the connection state of computer system 900 has changed (e.g., from looking for a satellite to not connected/satellite available in 4 minutes). If computer system 900 determines that a satellite is available for communication, computer system 900 displays alignment interface 902F, described further below with reference to FIG. 9F.

In FIG. 9E, computer system 900 displays computer system 900 at the same elevation as described in FIG. 9D. Minimap 940 illustrates that user 942D has changed position, and is outside of building 1. Minimap 940 illustrates that the azimuth of computer system 900 has changed and that computer system 900 is facing north. In some embodiments, computer system 900 displays (e.g., continues to display) satellite representation 929 with a dim (e.g., translucent) appearance in alignment interface 902E, indicating a satellite is not yet available.

In FIG. 9E, alignment element 909 indicates that an outage is in progress. Computer system 900 determines, based on the location of computer system 900 and database of satellite orbits, that an outage exists when the satellite is not available for communication. Computer system 900 can determine a period of time until a satellite is available based on the location of computer system 900 and database of satellite orbits. In some embodiments, the availability of a satellite is when the satellite is within range of communication window 930. Textual element 908E includes a notification of the period of time (four minutes) until the satellite is available. In some embodiments, textual element 908E is updated dynamically by computer system 900 as the period of time elapses.

In response to computer system 900 determining that the period of time has elapsed and/or that the satellite is available for communication, computer system 900 displays alignment element 902F of FIG. 9F. In some embodiments, as shown in FIG. 9F, computer system 900 outputs haptic output 619 and/or audio output 650 to indicate that the connection state of computer system 900 has changed (e.g., from a satellite not being available to a satellite being available). In FIG. 9F, computer system 900 displays computer system 900 at the same elevation as described in FIG. 9E. Minimap 940 illustrates that user 942D has not changed position, compared to FIG. 9E. Minimap 940 also illustrates that the azimuth of computer system 900 has not changed.

In response to computer system 900 determining that a satellite is available, computer system 900 updates display of alignment element 909 in FIG. 9F. Alignment element 909 indicates that a satellite is available, but computer system 900 is not connected. Computer system 900 determines, based on the orientation of computer system 900 and database of satellite orbits, that computer system 900 must change its orientation to achieve the alignment position.

In response to a determination that computer system 900 must change its orientation to achieve the alignment position, computer system 900 updates alignment element 909 to indicate instructions to align computer system 900. Computer system 900 displays satellite representation 929 in a position relative to computer system 932, and graphical element 931 includes an indicator of the direction computer system 932 should be rotated to align the azimuth with the satellite. Computer system 900 displays the indication as an arrow originating from the alignment position above computer system 932. Computer system 900 displays the magnitude of the arrow based on the amount of correction needed to place satellite representation 929 in the alignment position.

Textual element 908F includes a notification of the connection status of computer system 900 (e.g., not connected) and a notification of how to set computer system 900 in the alignment position. Computer system 900 updates textual element 908F based on the magnitude of the change needed to place computer system 900 in the alignment position. In FIG. 9F, computer system 900 displays textual element 908F as "Turn far left to find satellite," for a large magnitude of change to place satellite representation 929 into the alignment position.

In response to a change in azimuth of computer system 900, computer system 900 displays alignment interface 902G of FIG. 9G. In FIG. 9G, computer system 900 is at the same elevation as described in FIG. 9F. Minimap 940 illustrates user 942D has changed the azimuth of computer system 900 such that computer system 900 is facing west, but the location is the same as described in FIG. 9F.

In response to the change in azimuth of computer system 900, computer system 900 displays alignment interface 902G. In alignment interface 902G, alignment element 909 has been updated to reflect the updated azimuth of computer system 900. In some embodiments, as shown in FIG. 9G, computer system 900 outputs haptic output 619 and/or audio output 650 to indicate the updated azimuth (e.g., that the alignment of computer system 900 has improved). Alignment element 909 continues to indicate that a satellite is available, but that computer system 900 is not connected. Based on the change in azimuth of computer system 900, computer system 900 updates alignment element 909 with updated instructions for aligning computer system 900 and displays satellite representation 929 is in an updated position relative to computer system 932, closer to the communication window 930. The magnitude of the arrow in graphical element 931 in FIG. 9G is smaller than the magnitude of the arrow in FIG. 9F, described above, based on the amount of correction needed to place satellite representation 929 in the alignment position. In some embodiments, graphical element 931 is updated dynamically (or gradually) based on the direction of the change in orientation of the computer system 900. In some embodiments, as the azimuth of computer system 900 is changed to be closer to the satellite, communication window dynamically updates the communication window with an indication of alignment (e.g., shading or color).

Computer system 900 updates textual element 908G based on the smaller magnitude of the change needed to place computer system 900 in the alignment position compared to the magnitude needed in alignment interface 902F of FIG. 9F. In FIG. 9G, computer system 900 updates textual element 908F to "Turn left to find satellite," for a smaller magnitude of change to place satellite representation 929 into the alignment position. In some embodiments, updating the textual element 908F occurs automatically as computer system 900 reaches a threshold magnitude to align computer system 900 with the satellite.

In some embodiments, the satellite moves in relation to computer system 900 (e.g., the satellite is not in geosynchronous orbit). In response to a determination that the satellite has moved in relation to computer system 900, computer system 900 automatically updates the display of satellite representation 929 in alignment interface 902G. In response to a determination that the satellite is moving out of range of computer system 900, computer system 900 displays alignment interface 902O of FIG. 9O, described below. As described herein, a satellite moving out of range is an indication that computer system 900 and the satellite cannot communicate. For example, a satellite moving out of range is an indication that the satellite is moving over the horizon from computer system 900 and being blocked from communicating with computer system 900 by terrestrial objects (e.g., land, trees, buildings, mountains, and/or the atmosphere).

In response to a further change in azimuth of computer system 900, computer system 900 displays alignment interface 902H of FIG. 9H. In FIG. 9H, computer system 900 displays computer system 900 at the same elevation as described in FIG. 9F. Minimap 940 illustrates that user 942D has changed the azimuth of computer system 900 (computer system 900 is facing south-west), but that computer system 900 is in the same position as described in FIG. 9F.

In response to the further change in azimuth of computer system 900, computer system 900 updates alignment interface 902H to reflect the updated azimuth of computer system 900. Computer system 900 determines, based on the updated orientation of computer system 900 and the database of satellite orbits, that computer system 900 has aligned the azimuth but must continue to change its orientation to achieve the alignment position (e.g., change the elevation). In some embodiments, as shown in FIG. 9H, computer system 900 outputs haptic output 619 and/or audio output 650 to indicate that computer system 900 is aligned in the azimuth direction. Computer system 900 updates alignment element 909 to indicate instructions to align the elevation of computer system 900 and displays satellite representation 929 is in an updated position relative to computer system 932, with satellite representation 929 in communication window 930. Computer system 900 also updates a size of alignment element 909 to indicate satellite representation 929 as enlarged (e.g., as compared to satellite representation 929 in FIGS. 9E-9G) and computer system 932 as enlarged (e.g., as compared to computer system 932 in FIGS. 9C-9G).

In some embodiments, subsequent to displaying alignment interface 902H, computer system 900 determines, based on an updated orientation of computer system 900 and the database of satellite orbits, that computer system 900 is unaligned with satellite 932. In response, computer system 900 updates alignment element 909 to display computer system 932, with satellite representation 929 outside communication window 930. Computer system 900 also updates a size of alignment element 909 to indicate satellite representation 929 as reduced (e.g., as compared to FIG. 9H) and computer system 932 as reduced (e.g., as compared to FIG. 9H).

Graphical element 931 includes an indicator of the direction computer system 932 should be elevated to align the azimuth with the satellite. Computer system 900 displays an indicator of a magnitude of the elevation to place satellite representation 929 in the alignment position. In some embodiments, graphical element 931 is updated dynamically (or gradually) based on the direction of the change in elevation of the device. Computer system 900 displays communication window 930 with an updated appearance (e.g., a dark shading or color), indicating that computer system 900 is aligned in the azimuth direction but not the elevation direction.

In some embodiments, as the azimuth of computer system 900 is changed to be aligned with the satellite, computer system dynamically updates the appearance of the communication window. In some embodiments, as the azimuth of computer system 900 is changed to be aligned with the satellite, computer system 900 provides haptic 619 to indicate the azimuth is aligned. In FIG. 9H, computer system 900 updates graphical element 931 to display computer system 932 at a larger size from computer system 932 of FIG. 9F (e.g., zooms in graphical element 931). The increase in size of computer system 932 provides a visual notification of a computer system aligned the azimuth with the satellite.

In FIG. 9H, computer system 900 updates textual element 908H based on the azimuth aligning with the satellite. Computer system 900 updates textual element 908H to display instructions to correct the elevation of computer system 932 (e.g., "point phone up"). In some embodiments, updating the textual element 908H occurs automatically.

In response to detecting a change in elevation of computer system 900, computer system 900 displays alignment interface 902I of FIG. 9I. In FIG. 9I, computer system 900 displays computer system 900 at an updated elevation, now slightly upward and being held by user 950. Minimap 940 illustrates user 9421 has the same azimuth and position as described in 9H.

As illustrated in FIG. 9I, in response to detecting the change in elevation of computer system 900, computer system 900 updates alignment element 909 to reflect the updated elevation of computer system 900. In some embodiments, as shown in FIG. 9I, computer system 900 outputs haptic output 619 and/or audio output 650 to indicate that the elevation alignment of computer system 900 has changed (e.g., improved). Computer system 900 determines, based on the updated orientation of computer system 900 and database of satellite orbits, the elevation of computer system 900 must be further adjusted to achieve the alignment position and updates alignment element 909 to indicate instructions to further align computer system 900. Computer system 900 displays satellite representation 929 in an updated position relative to computer system 932, closer to computer system 900 (e.g., moved vertically on touch-sensitive display 901 towards the center of the communication window 930).

Graphical element 931 includes an indicator of the direction computer system 900 should be elevated to align the elevation with the satellite. In some embodiments, graphical element 931 is updated dynamically (or gradually) based on the direction of the change in elevation of the device.

Computer system 900 displays communication window 930 with the same appearance as described in 9H, indicating that the azimuth is aligned with the satellite. In some embodiments, as the elevation of computer system 900 is changed to be closer to the satellite, communication window dynamically updates the communication window with an indication of alignment (e.g., shading or color becomes darker than illustrated in 9H).

In some embodiments, computer system 900 updates textual element 908I based on the smaller magnitude of the change needed to place computer system 900 in the alignment position compared to the magnitude needed in alignment interface 902I of FIG. 9I. For example, textual element 908I can be updated from "point phone way up" to "point phone up" in response to a threshold magnitude of change to place satellite representation 929 in the alignment position.

In response to detecting an updated change in elevation of computer system 900, computer system 900 displays alignment interface 902J of FIG. 9J. In FIG. 9J, computer system 900 displays computer system 900 at an updated elevation, now slightly upward than described in FIG. 9I and being held by user 950. Minimap 940 illustrates user 942D has the same azimuth and position as described in FIG. 9I. In response to detecting a change in elevation of computer system 900, computer system 900 displays alignment interface 902J. Alignment interface 902J displays alignment element 909 has been updated to reflect the updated elevation of computer system 900.

In FIG. 9J, computer system 900 has achieved the alignment position. In some embodiments, as the elevation of computer system 900 is changed to be aligned with the satellite, computer system 900 provides haptic 619 and/or audio output 650 to indicate the elevation is aligned and/or the change in connection status (e.g., from not connected to connected). Display of satellite representation 929 is in an updated position relative to computer system 932, closer to computer system 900 and in an alignment position (e.g., moved vertically towards the center of the communication window 930). Computer system 900 displays communication window 930 with an updated appearance, indicating that the azimuth and elevation are aligned with the satellite (e.g., a very dark shade or color). Textual element 908J includes a notification of the connection status of computer system 900 (e.g., connected) and indicates that the satellite has been found.

In response to a determination that computer system 900 is properly aligned, computer system 900 automatically begins to send the emergency report. Textual element 908J indicates that the message is sending. Messaging option 910J indicates that a messaging user interface is being opened to illustrate that the message is being sent.

In some embodiments, in response to aligning satellite representation 929 in the alignment position, computer system 900 displays messaging interface 902K of FIG. 9K. In some embodiments, in response to a threshold period of time lapsing after displaying alignment interface 902J, computer system 900 displays messaging interface 902K. In some embodiments, in response to detecting selection 912J of messaging option 910J, computer system 900 displays messaging interface 902K.

Although the above embodiments describe computer system 900 providing notifications to correct any obstructions, and align an azimuth and then elevation of computer system 900, the order of each of these features may be reversed, rearranged, or otherwise modified. In some embodiments, computer system 900 provides interfaces to fix both the elevation and alignment concurrently.

In FIG. 9K, computer system 900 displays messaging interface 902K, displaying a message being sent via satellite communication. As described above, in response to aligning computer system 900 with a satellite, computer system 900 automatically sends an emergency communication, and displays messaging interface 902K. Messaging interface 902K illustrates the perspective of a sender of the emergency report. In some embodiments, as shown in FIG. 9K, computer system 900 outputs haptic output 619 and/or audio output 650 to indicate that computer system 900 is sending the message.

Banner 926 includes graphical element 931, which displays the connection status of computer system 900 to the satellite. In some embodiments, graphical element 931 is a smaller view of the alignment element 909 of FIGS. 9C-9J. In response to computer system 900 receiving an input to change the orientation of computer system 900, computer system 900 automatically (e.g., dynamically) updates the graphical element 931 on the banner to indicate the connection status, and, in some embodiments, an indication of how to align computer system 900 with the satellite. Banner 926 includes instructions to keep pointing to the satellite to send and receive messages. Banner 926 includes a sending status bar, indicating the message status as sending. The sending status bar dynamically updates to display the progress of the message being sent.

In response to computer system 900 receiving input 927K on banner 926, computer system 900 displays a queue of messages to be sent via satellite communication. In some embodiments, several messages are in queue to be sent, and in response to receiving input 927K on banner 926, computer system 900 updates messaging interface 902K to display the several messages in queue and the additional message 906K, described below.

In FIG. 9K, messaging interface 902K includes messaging header 908K, message 906K, text box 912K, and send affordance 916K. Messaging header 908K indicates the method that computer system 900 is using to send message 906K. Message 906K includes the summary of emergency information included in the content of summary interface 902B. In some embodiments, as shown in FIG. 9K, message 906K includes a graphical representation (e.g., 656) of the emergency specified by message 906K or other content of message 906K.

In response to receiving input 904K in text box 912K in messaging interface 902K, computer system 900 displays messaging interface 902L shown in FIG. 9L. In FIG. 9L, messaging interface 902L includes banner 926 and graphical element 931 indicating that computer system 900 is still connected to the satellite. Messaging interface 902L displays message 906L as sent via satellite, as indicated by messaging header 908L. In some embodiments, as shown in FIG. 9L, computer system 900 outputs haptic output 619 and/or audio output 650 to indicate that the message has been successfully sent. Since the message has been sent but a return message has not been received, banner 926 displays a messaging status of "waiting to receive" (e.g., instead of the sending status bar and status of "sending" shown in FIG. 9K). Banner 926 also maintains the instructions to keep pointing to the satellite to send and receive messages.

In FIG. 9L, computer system 900 detects request 936L to dismiss banner 926. In some embodiments, computer system 900 ceases display of banner 926 in response to detecting request 936L. In some embodiments, computer system 900 displays minimized banner 926*a* in response to detecting request 936L, as shown in FIG. 9L1. Minimized banner 926*a* includes minimized graphical element 931*a* and status indicator 926*b*. Compared to banner 926, minimized banner 926*a* does not include detailed textual user interface elements (e.g., "Connected", "Keep pointing to satellite to send & receive", and/or "Waiting to receive").

FIGS. 9L1A-9L1D illustrate embodiments of minimized banner 926*a* in various states.

FIG. 9L1A illustrates the state of minimized banner 926*a* when computer system 900 is connected to the satellite and is sending a message (e.g., the same state represented by banner 926 in FIG. 9K). The window portion of minimized graphical element 931*a* is shaded in to indicate that computer system 900 is connected to the satellite and status indicator 926*a* shows a partially filled ring to indicate that the message is being sent.

FIG. 9L1B illustrates the state of minimized banner 926*a* when computer system 900 is connected to the satellite, the message has been sent, and computer system 900 is waiting to receive a response (e.g., the same state represented by banner 926 in FIG. 9L). The window portion of minimized graphical element 931*a* is shaded in to indicate that computer system 900 is connected to the satellite and status indicator 926*a* shows a completely filled ring to indicate that the message has been sent.

FIG. 9L1C illustrates the state of minimized banner 926*a* when computer system 900 has a poor connection to the satellite (e.g., the same state represented by banner 926 in FIG. 9M described below). Minimized graphical element 931*a* shows a dot on the left side of a circle to indicate that computer system 900 has become misaligned with the satellite, and there is no status indicator 926*a*.

Figure 21J:
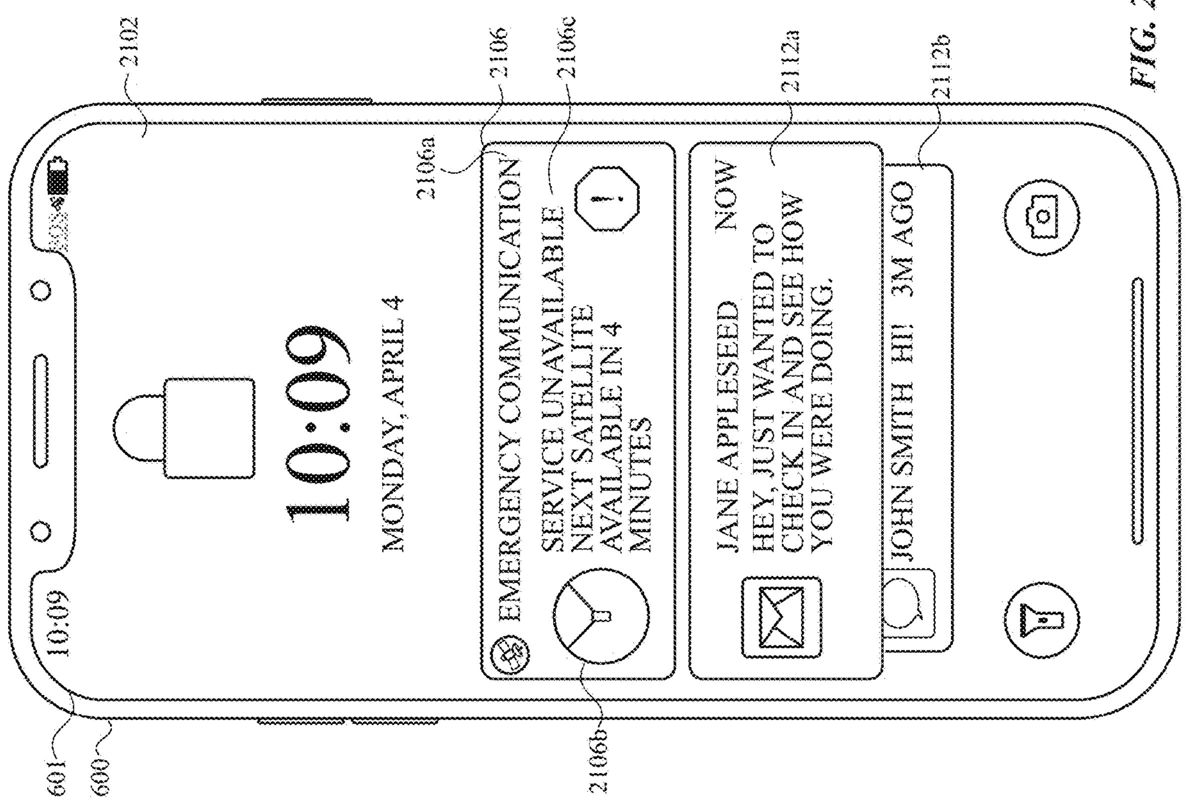
Figure 22:
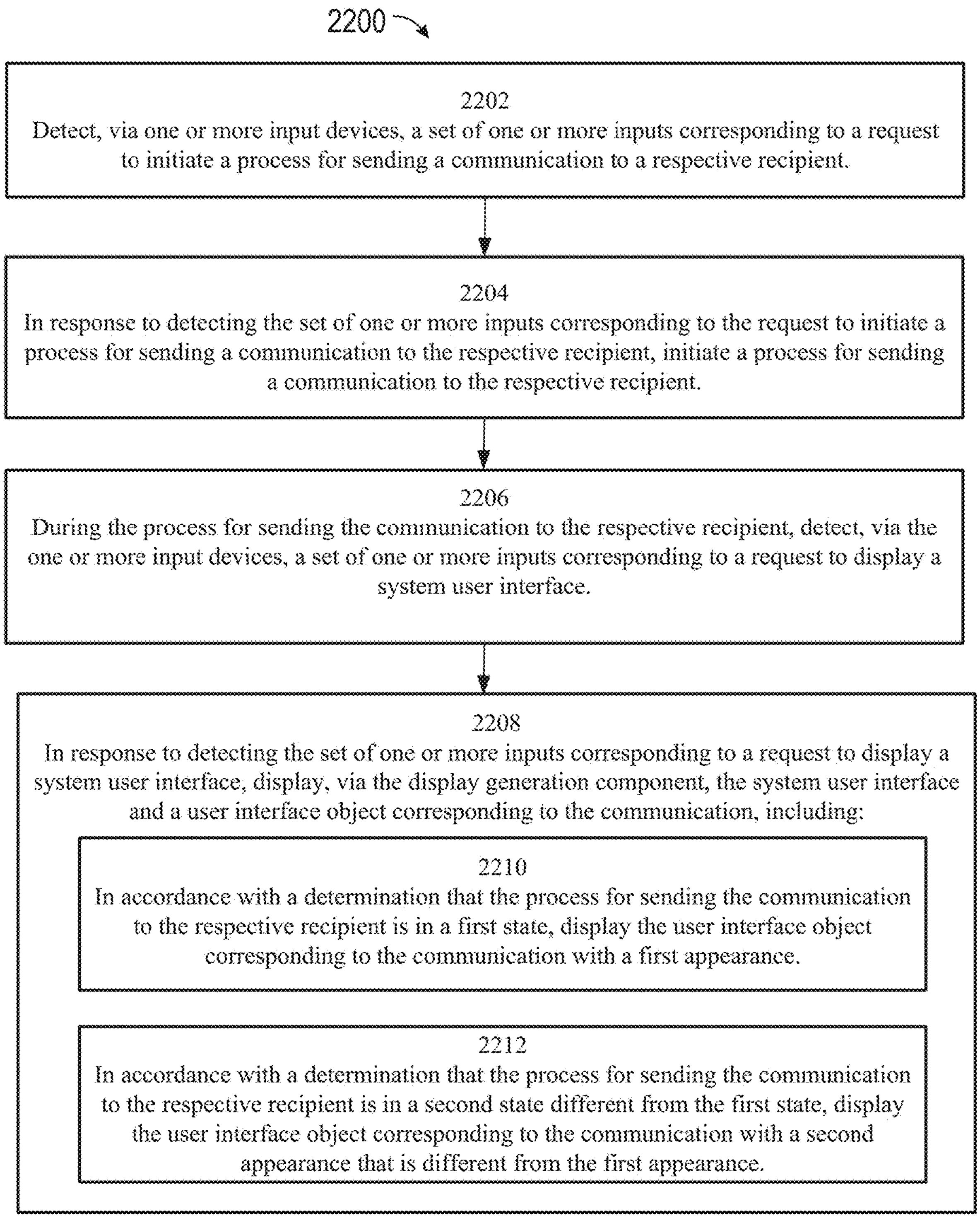
FIG. 22 is a flow diagram illustrating methods for providing a user interface object corresponding to a process, in accordance with some embodiments.

FIG. 9L1D illustrates the state of minimized banner 926*a* when computer system 900 is not connected to the satellite (e.g., the same state represented by banner 926 in FIG. 9M1) and/or no satellite is available (e.g., the state represented by 2106 in FIG. 21J). Similar to minimized graphical element 931*a* in FIG. 9L1C, minimized graphical element 931*a* in FIG. 9L1D shows a dot on the left side of a circle to indicate that computer system 900 is not connected to the satellite (but has a different fill color or effect to distinguish from the poor connection state), and status indicator 926*a* includes a symbol (e.g., an exclamation mark in an octagon) to indicate that computer system 900 is not connected to the satellite (e.g., as opposed to having a poor connection).

In response to receiving one or more inputs (e.g., taps) on keyboard 920L in FIG. 9L1, computer system 900 displays a written message in text box 912L. In response to receiving a selection (e.g., input 922L) on send affordance 916L, computer system 900 sends the written message in text box 912L (e.g., via satellite communication) and displays messaging interface 902M. In some embodiments, computer system 900 attempts to send the written message via a terrestrial wireless communication network and, if a terrestrial wireless communication network is available, sends the written message via the terrestrial wireless communication network (e.g., instead of via satellite communication).

In FIG. 9M, computer system 900 displays messaging interface 902M, which includes banner 926 and graphical element 931 indicating that computer system 900 has a poor connection to the satellite. Banner 926 includes instructions ("turn left") for aligning computer system 900 to stay connected to the satellite, and displays (e.g., maintains) the messaging status of "waiting to receive" since a response has not yet been received. Messaging interface 902M displays message 928M as sent via text, text box 912M, send affordance 916M, and keyboard 920M. In some embodiments, as shown in FIG. 9M, computer system 900 outputs haptic output 619 and/or audio output 650 to indicate that the connection status of computer system 900 with the satellite has changed (e.g., from connected to poor connection).

In FIG. 9M1, computer system 900 displays messaging interface 902M, which includes banner 926 and graphical element 931 indicating computer system 900 is not connected to the satellite. In some embodiments, as shown in FIG. 9M1, computer system 900 outputs haptic output 619 and/or audio output 650 to indicate that the connection status of computer system 900 with the satellite has changed (e.g., from poor connection to not connected). Messaging interface 902M displays message 906M as sent via satellite as indicated by messaging header 908M. Messaging interface 902M also displays message 928M as sent via text. As described above, in response to determining the terrestrial wireless communication network is available, computer system 900 can send a message via a terrestrial wireless communication network.

Between FIGS. 9L1 and 9M, computer system 900 changes orientation relative to the satellite. In response to a determination that the alignment between computer system 900 and the satellite has gotten worse, computer system 900 updates (e.g., expands) banner 926 to display that computer system 900 has a poor connection to the satellite and to display instructions ("turn left") for aligning computer system 900 to stay connected to the satellite. In some embodiments, in response to a determination that computer system 900 is moving out of alignment in azimuth and/or elevation, computer system 900 outputs haptic 619 and/or audio output 650. In FIG. 9M, in response to receiving input 927M on banner 926, computer system 900 displays, e.g., alignment interface 902G of FIG. 9G, displaying a larger view of graphical element 931.

Between FIGS. 9M and 9M1, computer system 900 changes orientation relative to the satellite or the poor connection persists for a predetermined amount of time. In response to a determination that computer system 900 is not aligned with the satellite or that the poor connection has persisted for a predetermined amount of time, computer system 900 updates banner 926 to display that computer system 900 is not connected to the satellite and updates the instructions to find the satellite. In some embodiments, in response to a determination that computer system 900 moves out of alignment in azimuth and/or elevation, computer system 900 outputs haptic 619 and/or audio output 650. In FIG. 9M1, in response to receiving input 927M1 on banner 926, computer system 900 displays, e.g., alignment interface 902G of FIG. 9G, displaying a larger view of graphical element 931.

In response to a determination a terrestrial wireless communication network is available, computer system 900 displays messaging user interface 906N shown in FIG. 9N and, optionally, outputs haptic output 619 and/or audio output 650 to indicate that the terrestrial wireless communication network is available. Messaging interface 902N displays that message 906N is sent, and messaging header 908N indicates that message 906N was sent via satellite communication. In some embodiments, messaging interface 902N displays text entry field 912N and send affordance 916N.

Messaging interface 902N includes banner 926 and network indicator 907. In response to a determination that a terrestrial wireless communication network is available, computer system 900 displays network indicator 907 with an appearance indicating the terrestrial wireless communication network is available. Banner 926 includes an indication that a terrestrial wireless communication network is available. In some embodiments, computer system 900 determines that a call is available to communicate with the emergency service being contacted. In response to a determination that a call is available, banner 926 displays that the call is available to the emergency service.

In response to computer system 900 receiving a selection (e.g., via input 927N) of banner 926 in FIG. 9N, computer system 900 calls the emergency service to which message 906N was sent to (e.g., 911). In some embodiments, in response to a determination that a terrestrial wireless communication network is available, computer system 900 updates banner 926 to forgo displaying graphical element 931, and displays the indication that the terrestrial wireless communication network is available.

Although FIG. 9N is described with reference to message 906N being sent, in some embodiments, message 906N is sent via terrestrial wireless communication in response to computer system 900 determining that the terrestrial wireless communication is available. In some embodiments, banner 926 of FIG. 9N replaces banner 926 of FIG. 9K, as the message is being sent.

In response to a determination that a Wi-Fi network is available, computer system 900 displays messaging interface 902N1 shown in FIG. 9N1 and, optionally, outputs haptic output 619 and/or audio output 650 to indicate that the Wi-Fi network is available. Messaging interface 902N1 includes banner 926. Banner 926 includes an indication that a Wi-Fi network is available. In some embodiments, computer system 900 determines that a call is available via the Wi-Fi network to communicate with the emergency service being contacted. In response to a determination that a call is available, banner 926 displays that the call is available to the emergency service. In some embodiments, in response to a determination that a Wi-Fi network is available, computer system 900 updates banner 926 to forgo displaying graphical element 931, and displays the indication that the Wi-Fi network is available.

In response to a determination that a Wi-Fi network is available, computer system 900 displays notification 918N1, which notifies the user that calling can help the user get help faster, and call option 920N1. In response to computer system 900 receiving a selection 928N of call option 920N1 in FIG. 9N1, computer system 900 calls the emergency service to which message 906N was sent to (e.g., 911).

Turning to FIG. 9O, the satellite is moving out of range of communication with computer system 900. In some embodiments, computer system 900 determines that the satellite is moving (or has moved) out of range based on the satellite orbit and position of computer system 900. In FIG. 9O, computer system 900 displays alignment interface 902O.

In response to a determination that the satellite is moving out of range, computer system 900 updates alignment element 909, including graphical element 931 and textual element 908O, and, optionally, outputs haptic output 619 and/or audio output 650 to indicate that the satellite is moving out of range. Graphical element 931 illustrates that the satellite is moving away from computer system 900 and indicates the direction in which the satellite is moving relative to computer system 900. Computer system 900 displays graphical element 931 with an indication, illustrated as an arrow, of the change in orientation needed to improve the alignment of computer system 900 with the satellite. Textual element 908O includes an indication that the satellite is moving out of range. In some embodiments, computer system 900 determines the amount of time until the satellite will be out of range based on location of computer system 900 and database of satellite orbits. In some embodiments, computer system 900 updates textual element 908O to display the amount of time until the satellite will be out of range.

Turning to FIG. 9O1, the satellite has moved out of range of communication with computer system 900. In some embodiments, computer system 900 determines that the satellite has moved out of range based on the satellite orbit and position of computer system 900. In FIG. 901, computer system 900 displays alignment interface 902O1.

In response to a determination that the satellite is out of range, computer system 900 updates alignment element 909, including graphical element 931 and textual element 908O1, and, optionally, outputs haptic output 619 and/or audio output 650 to indicate that the satellite is out of range. Graphical element 931 illustrates that the satellite is out of range of computer system 900. Textual element 908O1 includes an indication that the satellite is out of range. In some embodiments, computer system 900 determines the amount of time until a satellite will be available based on location of computer system 900 and database of satellite orbits. In some embodiments, computer system 900 updates textual element 908P to display the amount of time until a next satellite will be available.

In some embodiments, computer system 900 ceases display of satellite representation 929 in response to a determination that the satellite has reached a threshold distance from computer system 900 (e.g., computer system 900 cannot be oriented to communicate with the satellite due to the distance between them), and displays alignment interface 902E of FIG. 9E, described above. In response to a new satellite being available for communication and/or the time elapses until a new satellite is available to computer system 900, computer system 900 displays alignment element 902P of FIG. 9P.

In some embodiments, as computer system 900 determines that the satellite is moving out of range based on the satellite orbit and position, computer system 900 displays an amount of time until the satellite will be out of range (e.g., a non-zero indication of time; 10 seconds; one minute).

In FIG. 9P, computer system 900 displays alignment interface 902P, which indicates computer system 900 is not connected to a satellite. Alignment interface 902P displays an indication that a new satellite has been found by computer system 900. Satellite representation 929 represents the new satellite. In response to computer system 900 determining that a satellite is available for communication, computer system 900 updates alignment element 909, including graphical element 931 and textual element 908P, and, optionally, outputs haptic output 619 and/or audio output 650 to indicate that a satellite is available for communication. Graphical element 931 illustrates that a satellite has been found, and is shown in position relative to the computer system 900. Computer system 900 displays graphical element 931 with an indication, illustrated as an arrow, of the change in orientation needed to align computer system 900 with the satellite. Textual element 908P includes an indication that the new satellite is available. In response to a determination that the new satellite is available, computer system 900 updates textual element 908P to display that the new satellite has been found.

In response to receiving a change in orientation of computer system 900 while displaying interface 902P, alignment interface 902P is updated relative to the change in orientation of computer system 900. In some embodiments, in response to computer system 900 receiving a change in orientation to align computer system 900 with the satellite, computer system 900 displays alignment interface 902J of FIG. 9J.

Turning to FIG. 9Q, an exemplary external computer system 950 is illustrated. The external computer system 950 is an exemplary device that receives message 906L described in FIG. 9L. External computer system 950 displays messaging interface 902Q, which includes message 906Q, location 914Q, message header 912Q, message information 908Q, sender information 913Q, back button 915, information icon 907Q, and connection indicator 907. Connection indicator 907 indicates that external computer system 950 is connected to a terrestrial wireless communication network. In response to external computer system 950 receiving message 906Q via terrestrial wireless communication network, computer system 950 displays messaging interface 902Q.

Message 906Q includes the information from message 906L described in FIG. 9L. Location 914Q indicates a location of computer system 900 (e.g., as described in FIG. 9L) associated with the message 906Q (e.g., location where message 906Q was sent). In some embodiments, location 914Q is displayed in the same message as message 906L. In some embodiments, location 914Q is sent as a separate message, as coordinates, or an address. Message header 912Q includes an indication of the device (e.g., computer system 900 described in 9L) that sent message 906Q and location 914Q of the sending device. Message information 908Q provides a notice that Jane, the sender, has shared the message 906Q with the external computer system 950, and indicates that Jane sent the message via satellite, and therefore cannot receive calls. In response to receiving an input on back button 915, external computer system 950 displays a series of threads of messages and/or a home screen.

In some embodiments, FIG. 9Q is similar to messaging user interface 1114 of FIG. 11F.

FIGS. 9R-9U illustrate an animation of graphical element 931. In some embodiments, graphical element 931 includes the animation shown and described with reference to FIGS. 9R-9U. In some embodiments, graphical element 931 includes the animation in FIGS. 9R-9U when computer system 900 is connected to the a satellite as indicated by communication window 930 being filled in. As described in more detail below, satellite representation 929 rotates back and forth between two orientations (e.g., such that satellite representation 929 is always pointed downward towards computer system 932) and signal 933 moves back and forth between computer system 932 and satellite representation 929.

FIG. 9R illustrates a first state of the animation. In FIG. 9R, satellite representation 929 has a first orientation and signal 933 has a first appearance (e.g., solid line, first brightness, first curvature, and/or first color) and a first location (e.g., in communication window 930). The first appearance of signal 933 represents that signal 933 is moving from computer system 932 to satellite representation 929. For example, signal 933 is curved upward to indicate that signal 933 is moving upward from computer system 932 to satellite representation 929. The arrows next to satellite representation 929 indicate that satellite representation 929 rotates (e.g., changes orientation and/or rotates clockwise) over time while maintaining the same location (e.g., at the top of communication window 930).

FIG. 9S illustrates a second state of the animation. In FIG. 9S, satellite representation 929 has a second orientation (e.g., rotated clockwise relative to the first orientation) and signal 933 has the first appearance and a second location (e.g., in communication window 930). The second location of signal 933 is closer to satellite representation 929, which provides the effect that signal 933 is moving from computer system 932 to satellite representation 929 (e.g., consistent with the first appearance). The arrows next to satellite representation 929 in FIG. 9S indicate that satellite representation 929 rotates (e.g., changes orientation and/or rotates counterclockwise) over time while maintaining the same location (e.g., at the top of communication window 930). In some embodiments, graphical element 931 gradually transitions through intermediate states from the first state of the animation in FIG. 9R to the second state of the animation in FIG. 9S.

FIG. 9T illustrates a third state of the animation. In FIG. 9T, satellite representation 929 has the first orientation (e.g., the same orientation as in FIG. 9R and/or rotated counterclockwise relative to the second orientation) and signal 933 has a second appearance (e.g., broken line, second brightness, second curvature, and/or second color) and a third location (e.g., in communication window 930). The second appearance of signal 933 represents that signal 933 is moving from satellite representation 929 to computer system 932. For example, signal 933 is curved downward to indicate that signal 933 is moving downward from satellite representation 929 to computer system 932. The arrows next to satellite representation 929 indicate that satellite representation 929 rotates (e.g., changes orientation and/or rotates clockwise) over time while maintaining the same location (e.g., at the top of communication window 930). In some embodiments, graphical element 931 gradually transitions through intermediate states from the second state of the animation in FIG. 9S to the third state of the animation in FIG. 9T.

FIG. 9U illustrates a fourth state of the animation. In FIG. 9U, satellite representation 929 has the second orientation (e.g., the same orientation as in FIG. 9S and/or rotated clockwise relative to the first orientation) and signal 933 has the second appearance and a fourth location (e.g., in communication window 930). The fourth location of signal 933 is closer to computer system 932, which provides the effect that signal 933 is moving from satellite representation 929 to computer system 932 (e.g., consistent with the second appearance). In some embodiments, graphical element 931 gradually transitions through intermediate states from the third state of the animation in FIG. 9T to the fourth state of the animation in FIG. 9U.

In some embodiments, graphical element 931 transitions from the fourth state to the first state and repeats the animation described in FIGS. 9R-9U one or more times (e.g., continuously repeats and/or loops the animation). In some embodiments, the features of the animation described with reference to FIGS. 9R-9U (e.g., rotation of satellite representation 929 and/or the movement of signal 933) are not synchronized with and/or based on the status of an actual signal (e.g., an electromagnetic signal) between computer system 900 and a satellite and/or an actional position (e.g., orientation) of a satellite. In some embodiments, the features of the animation described with reference to FIGS. 9R-9U (e.g., rotation of satellite representation 929 and/or the movement of signal 933) are synchronized with and/or based on the status of an actual signal between computer system 900 and a satellite and/or an actional position of a satellite.

FIG. 10 is a flow diagram illustrating methods for aligning a computer system with one or more satellites, in accordance with some embodiments. The method is performed at a computer system (e.g., 100, 300, 500, 600, or 900; e.g., a smartphone, a smartwatch, a tablet computer, a laptop computer, a desktop computer, or a head mounted device (e.g., a head mounted augmented reality and/or extended reality device)) that is in communication with a display generation component (e.g., 901; e.g., a display controller, a touch-sensitive display system, and/or a head mounted display system) and one or more input devices (e.g., e.g., 901; a touch-sensitive surface, a touchscreen, a button, a microphone, a gyroscope, and/or an accelerometer). Some operations in the method are, optionally, combined, the orders of some operations are, optionally, changed, and some operations are, optionally, omitted.

As described below, method 1000 provides an intuitive way for aligning a computer system with one or more satellites. The method reduces the cognitive burden on a user for aligning a computer system with one or more satellites, thereby creating a more efficient human-machine interface. For battery-operated computing devices, enabling a user to align a computer system with one or more satellites faster and more efficiently conserves power and increases the time between battery charges.

The computer system detects (1002), via the one or more input devices, a user input (e.g., 906A or 906B) corresponding to a request (e.g., receiving a selection of a send affordance) to communicate (e.g., via a text message, phone call, and/or sending an emergency report while in an emergency reporting mode) via satellite communication.

In response to detecting the user input (1004), the computer system displays (1006), via the display generation component, an alignment element (e.g., as described with reference to FIGS. 9C-9J at 909; e.g., graphical element, text, and/or image), including: in accordance with a determination that the computer system (in some embodiments, in accordance with a determination that a predetermined portion of the computer system (e.g., a display of the computer system and/or one or more satellite communication antennas of the computer system relative to a satellite system)) is not aligned properly for communication with one or more satellites (e.g., in a system of satellites) (e.g., for initiating a communication such as a phone call or sending the message), the computer system displays (1008) the alignment element (e.g., a "fan" graphic and/or an indicator of a direction to orient the computer system (in some embodiments, the alignment element includes an arrow pointing in a direction to rotate the computer system, and/or or a picture of a satellite shown in space relative to the computer system) with a first alignment appearance (e.g., the "fan" is gray indicating no alignment) that indicates the computer system is not aligned properly for communication with the one or more satellites and includes a graphical indication (e.g., 931; e.g., text, a graphic, a color, and/or an animation) (e.g., a graphical indication of an orientation of a predetermined portion of the computer system); and while displaying the alignment element with the first alignment appearance, the computer system detects (1010) a change in orientation (e.g., azimuth, elevation, and/or rotation) of a predetermined portion of the computer system (e.g., a display of the computer system, and/or one or more satellite communication antennas of the computer system relative to the one or more satellites); in response to detecting the change in orientation of the predetermined portion of the computer system, the computer system changes (1014) an appearance of the alignment element (e.g., changing an appearance of the graphical indication, the color of the "fan" is changed to green to indicate proper alignment, change text to "aligned", and/or a graphic of a satellite is moved to be directly above a graphical representation of the computer system). Displaying the alignment element with a first alignment appearance that indicates the computer system is not aligned properly for communication with the one or more satellites and includes a graphical indication in accordance with a determination that the computer system is not aligned properly for communication with one or more satellites provides the user with information about the alignment of the computer system, which provides improved visual feedback. Changing an appearance of the alignment element in response to detecting a change in orientation of the predetermined portion of the computer system provides the user with updated information about the alignment of the computer system as the orientation of the predetermined portion of the computer system changes, which provides improved visual feedback.

In some embodiments, in response to detecting the user input, the computer system displays a satellite availability element (e.g., 908E, 908O; e.g., a graphical element, text, and/or image), including: in accordance with a determination that the computer system is in a first availability state relative to the one or more satellites (e.g., based on a location of the one or more satellites and the location and/or orientation of the computer system, satellites are available for communicating), the computer system displays the satellite availability element with a first appearance (e.g., as described with reference to FIG. 9F) that indicates the first availability state (e.g., text and/or a graphic indicating satellite availability, such as, e.g., "Available", "Connected", or the like); and in accordance with a determination that the computer system is in a second availability state relative to the one or more satellites (e.g., based on the location of the one or more satellites and the location and/or orientation of the computer system, satellites are not available for sending the message), the computer system displays the satellite availability element with a second appearance that indicates the second availability state (e.g., text and/or a graphic indicating satellite availability, such as, e.g., "Not Available", "Not Connected", "Searching", "Attempting to Connect", or the like), wherein the second availability appearance is different from the first availability appearance. Displaying the satellite availability element with an appearance that is based on the state of the computer system relative to the one or more satellites provides the user with information about the availability of the one or more satellites for communication with the computer system, which provides improved visual feedback.

In accordance with some embodiments, the alignment element and the satellite availability element are displayed concurrently (e.g., as described with reference to FIGS. 9F-9J). Concurrently displaying the alignment element and the satellite availability element provides the user with concurrent information about the availability of the one or more satellites for communication with the computer system and the alignment of the computer system with the one or more satellites, which provides improved visual feedback.

In accordance with some embodiments, changing the appearance of the alignment element includes: the computer system displaying the alignment element with a second appearance (e.g., as described with reference to FIG. 9H; e.g., changing an appearance of the graphical indication, the color of the "fan" is changed to light green to indicate the orientation change has improved alignment, and/or indicator of direction to orient has changed; a graphic of a satellite is moved in response to orientation change) that is based on the change in orientation of the predetermined portion of the computer system, wherein the second alignment appearance is different from the first alignment appearance. Displaying the alignment element with a second appearance that is based on the change in orientation of the predetermined portion of the computer system provides the user with information about how the change in orientation affected the alignment with the one or more satellites and enables the user to align the computer system with fewer errors, which provides improved visual feedback and reduces the number of inputs needed to perform an operation.

In accordance with some embodiments, changing the appearance of the alignment element includes changing (e.g., gradually and/or through a plurality of intermediate states over time) the appearance of the alignment element based on a magnitude of the detected change in orientation of the predetermined portion of the computer system (e.g., as described with reference to FIG. 9F; e.g., the arrow from the satellite is bigger for large magnitudes of change needed to align the device, the fan color is darker gray when the magnitude of change is large magnitudes of change needed to align the device, text changes from "turn left" to "turn far left" when magnitude of change is large to align the device). In some embodiments, the appearance of the alignment element changes (e.g., gradually and/or through a plurality of intermediate states over time) as the corresponding values of the magnitude and/or direction of the detected change in orientation of the predetermined portion of the computer system changes. Changing the appearance of the alignment element based on a magnitude of the detected change in orientation of the predetermined portion of the computer system provides the user with information about how the magnitude of the change in orientation affected the alignment with the one or more satellites, which provides improved visual feedback.

In accordance with some embodiments, changing the appearance of the alignment element includes changing (e.g., gradually and/or through a plurality of intermediate states over time) the appearance of the alignment element based on a direction of the change in orientation of the predetermined portion of the computer system (e.g., as described with reference to FIG. 9F; e.g., the arrow from the satellite affordance is automatically shifted to an opposite side to indicate the direction of orientation to align the device, text automatically changes from "turn left" to "turn right" when direction of change of orientation is changed). Changing the appearance of the alignment element based on a direction of the change in orientation of the predetermined portion of the computer system provides the user with information about how the direction of the change in orientation affected the alignment with the one or more satellites and enables the user to align the computer system with fewer errors, which provides improved visual feedback and reduces the number of inputs needed to perform an operation.

In accordance with some embodiments, changing the appearance of the alignment element includes changing (e.g., gradually and/or through a plurality of intermediate states over time) the appearance of the alignment element based on movement of the one or more satellites (e.g., as described with reference to FIG. 9O). In some embodiments, the computer system detects (e.g., directly or via data received from an external source) an indication of movement of the one or more satellites and changes the appearance of the alignment element in response to detecting the indication of movement and in accordance with the movement. In some embodiments, the appearance of the alignment element changes (e.g., gradually and/or through a plurality of intermediate states over time) as the one or more satellites move. Changing the appearance of the alignment element based on movement of the one or more satellites provides the user with information about how the movement affected the alignment with the one or more satellites and enables the user to align the computer system with fewer errors, which provides improved visual feedback and reduces the number of inputs needed to perform an operation.

In accordance with some embodiments, the determination that the computer system is not aligned properly for communication with one or more satellites is based on a database (e.g., as described with reference to FIGS. 9C-9J, the computer system includes a database; e.g., a locally stored database that is stored on the computer system) of positions (e.g., orbits or positions in time) of the one or more satellites and a position of the computer system (e.g., the GPS position). Basing the determination that the computer system is not aligned properly for communication with one or more satellites on a database of positions of the one or more satellites and a position of the computer system provides the user with more accurate information about the alignment with the one or more satellites and enables the user to align the computer system with fewer errors, which provides improved visual feedback and reduces the number of inputs needed to perform an operation.

In accordance with some embodiments, the determination that the computer system is not aligned properly for communication with the one or satellites includes a determination that the computer system is not aligned properly in an azimuth direction (e.g., FIG. 9F) for communication with the one or more satellites; and the first alignment appearance of the alignment element includes instructions to adjust (e.g., align) the orientation of the computer system in the azimuth direction (e.g., a prompt to fix the azimuth orientation via text or graphical element). Including instructions to adjust the orientation of the computer system in the azimuth direction in the first alignment appearance of the alignment element provides the user with more information about how to move the computer system into alignment with the one or more satellites and enables the user to align the computer system with fewer errors, which provides improved visual feedback and reduces the number of inputs needed to perform an operation.

In accordance with some embodiments, displaying the alignment element includes concurrently displaying: a graphical representation of a location of the one or more satellites (e.g., 929; e.g., relative to the computer system; a satellite icon relative to a phone icon); and a graphical representation of a communication window (e.g., 930; e.g., a range of azimuth and/or elevation orientations of the computer system in which the computer system is capable of communication with the one or more satellites (e.g., the fan)) (in some embodiments, in accordance with a determination that the computer system is aligned with the one or more satellites, the graphical location of the one or more satellites is within the graphical communication window). Concurrently displaying a graphical representation of a location of the one or more satellites and a graphical representation of a communication window provides the user with more information about how to move the computer system into alignment with the one or more satellites and enables the user to align the computer system with fewer errors, which provides improved visual feedback and reduces the number of inputs needed to perform an operation.

In accordance with some embodiments, changing the appearance of the alignment element includes: in accordance with a determination that the computer system is in the communication window (e.g., as described with reference to FIGS. 9G-9H; e.g., centered in the communication window): the computer system enlarging the graphical representation of the location of the one or more satellites (e.g., the satellite icon is moved to within the communication window); and the computer system enlarging the graphical representation of the communication window (in some embodiments, in accordance with a determination the computer system is aligned with the one or more satellites). In some embodiments, the computer system becomes positioned within the communication window due to movement of the computer system, movement of the one or more satellites, and/or movement of an obstruction with the communication window. Enlarging the graphical representation of the location of the one or more satellites and enlarging the graphical representation of the communication window in accordance with a determination that the computer system is in the communication window provides the user with a visual indication that the computer system is aligned with the one or more satellites and helps prevent the user from moving the computer system unnecessarily, which provides improved visual feedback and reduces the number of inputs needed to perform an operation.

In accordance with some embodiments, changing the appearance of the alignment element includes: in accordance with a determination that the computer system is aligned properly for communication with the one or more satellites (e.g., is connected and/or in communication with the one or more satellites), changing a color of the graphical representation of the communication window (e.g., as described with reference to FIG. 9J; to green). Changing a color of the graphical representation of the communication window in accordance with a determination that the computer system is aligned properly for communication with the one or more satellites provides the user with a visual indication that the computer system is aligned with the one or more satellites and helps prevent the user from moving the computer system unnecessarily, which provides improved visual feedback and reduces the number of inputs needed to perform an operation.

In accordance with some embodiments, the instructions to adjust the orientation of the computer system in the azimuth direction includes a text prompt (e.g., 908F, 908G, 908P). Including a text prompt in the instructions to adjust the orientation of the computer system in the azimuth direction provides the user with clearer instructions on how to align the computer system with the one or more satellites and enables the user to align the computer system with fewer errors, which provides improved visual feedback and reduces the number of inputs needed to perform an operation.

In accordance with some embodiments, the alignment element includes: a graphical representation (e.g., an icon, thumbnail image, or glyph) of the one or more satellites (e.g., 929; displayed relative to a graphical representation of the computer system (e.g., a satellite icon relative to a phone icon)); and changing the appearance of the alignment element includes moving the graphical representation of the one or more satellites. Including a graphical representation of the one or more satellites in the alignment element and moving the graphical representation of the one or more satellites as part of changing the appearance of the alignment element provides the user with a visual indication of how the change in orientation affected the alignment of the computer system with the one or more satellites and enables the user to align the computer system with fewer errors, which provides improved visual feedback and reduces the number of inputs needed to perform an operation.

In accordance with some embodiments, the alignment element comprises: a graphical indication (e.g., text, a graphic, a color, and/or an animation) of a direction of motion of the one or more satellites (e.g., as described with reference to FIG. 9G, the arrow; e.g., displayed relative to the computer system (e.g., a satellite icon relative to a phone icon)). Including a graphical indication of a direction of the motion of the one or more satellites provides the user with a visual indication of the direction of motion of the one or more satellites and enables the user to align the computer system with fewer errors, which provides improved visual feedback and reduces the number of inputs needed to perform an operation.

In accordance with some embodiments, the determination that the computer system is not aligned properly for communication with the one or more satellites includes a determination that the computer system is not aligned properly in an elevation direction for communication with the one or more satellites (e.g., as described with reference to FIGS. 9H-9I; and the first alignment appearance of the alignment element includes instructions to adjust (e.g., align) the orientation of the computer system in the elevation direction (e.g., a prompt to fix the elevation orientation via text or graphical element). Including instructions to adjust the orientation of the computer system in the elevation direction in the first alignment appearance of the alignment element provides the user with more information about how to move the computer system into alignment with the one or more satellites and enables the user to align the computer system with fewer errors, which provides improved visual feedback and reduces the number of inputs needed to perform an operation.

In accordance with some embodiments, the instructions to adjust the orientation of the computer system in the elevation direction include a prompt (e.g., 908H, 908I; e.g., text and/or a graphical indication (e.g., an arrow)) to move (e.g., point) the computer system in the elevation direction (e.g., to point the phone up). Including a prompt to move the computer system in the elevation direction in the instructions to adjust the orientation of the computer system in the elevation direction provides the user with more information about how to move the computer system into alignment with the one or more satellites and enables the user to align the computer system with fewer errors, which provides improved visual feedback and reduces the number of inputs needed to perform an operation.

In accordance with some embodiments, the change in orientation of the predetermined portion of the computer system includes a change in elevation of the predetermined portion of the computer system (e.g., closer to alignment with the one or more satellites); and changing (e.g., automatically or dynamically) the appearance of the alignment element includes moving (e.g., on a display) a graphical representation of the one or more satellites (e.g., 929) toward a graphical representation of the computer system (e.g., e.g., as described with reference to FIGS. 9H-9I at 932) (in some embodiments, the change in the appearance of the alignment element is in accordance with (e.g., proportional to and/or in the same direction as a direction and/or magnitude of) the change in elevation of the computer system. In some embodiments, as the user adjusts the elevation of the phone closer to alignment, a satellite is shown closer to the phone). Moving a graphical representation of the one or more satellites toward a graphical representation of the computer system in response to detecting a change in elevation of the predetermined portion of the computer system provides the user with more information about the change in element of the predetermined portion of the computer system and enables the user to align the computer system with fewer errors, which provides improved visual feedback and reduces the number of inputs needed to perform an operation.

In accordance with some embodiments, the instructions to adjust the orientation of the computer system in the elevation direction are displayed in accordance with a determination that the computer system is aligned properly in an azimuth direction for communication with the one or more satellites (e.g., as described with reference to FIGS. 9G-9H; e.g., after providing prompts to correct the azimuth and detecting a change in orientation of the predetermined portion of the computer system that aligns the computer system with the one or more satellites in the azimuth direction. Displaying the instructions to adjust the orientation of the computer system in the elevation direction in accordance with a determination that the computer system is aligned properly in an azimuth direction for communication with the one or more satellites simplifies alignment of the computer system by instructing the user to align the computer system in one direction at a time and enables the user to align the computer system with fewer errors, which provides improved visual feedback and reduces the number of inputs needed to perform an operation.

In accordance with some embodiments, in response to detecting the user input and in accordance with a determination that there is an obstruction (e.g., a wall or building or the computer system is indoors, and/or the computer system is having trouble finding the one or more satellites) that is preventing the computer system from communicating with the one or more satellites, the computer system displays a prompt (e.g., 908C, 908D; e.g., instructions, text, and/or graphical indicator(s)) to avoid and/or remove the obstruction. Displaying a prompt to avoid and/or remove an obstruction that is preventing the computer system from communicating with the one or more satellites provides the user with more information about how to move the computer system into alignment with the one or more satellites and enables the user to align the computer system with fewer errors, which provides improved visual feedback and reduces the number of inputs needed to perform an operation.

In accordance with some embodiments, the prompt to avoid and/or remove the obstruction includes textual instructions to move the computer system outside. Including textual instructions to move the computer system outside provides the user with clearer instructions on how to align the computer system with the one or more satellites and enables the user to align the computer system with fewer errors, which provides improved visual feedback and reduces the number of inputs needed to perform an operation.

In accordance with some embodiments, the prompt to avoid and/or remove the obstruction includes a graphical representation of the one or more satellites (e.g., 929) that is displayed with a brightness that is less than a brightness of other graphical elements displayed concurrently with the graphical representation of the one or more satellites. In some embodiments, the computer system dims (e.g., reduces the brightness over time of) the graphical representation of the one or more satellites when there is determined to be an obstruction. In some embodiments, the graphical representation of the one or more satellites is displayed with a lower brightness when there is determined to be an obstruction than when there is no determination that there is an obstruction (e.g., in accordance with a determination that there is not an obstruction, the graphical representation of the one or more satellites is displayed with a greater brightness than when there is a determination that there is an obstruction). Including a graphical representation of the one or more satellites that is displayed with a brightness that is less than a brightness of other graphical elements displayed concurrently with the graphical representation of the one or more satellites provides the user with a visual indication that an obstruction is preventing the computer system from communicating with the one or more satellites and enables the user to align the computer system with fewer errors, which provides improved visual feedback and reduces the number of inputs needed to perform an operation.

In accordance with some embodiments, in response to detecting the user input: in accordance with a determination that the computer system cannot currently be aligned properly for communication with the one or more satellites (e.g., no satellite is within range of the computer system for communication), the computer system displays a graphical indication (e.g., as seen in FIGS. 9C-9D at 931) that the computer system cannot currently be aligned properly for communication with the one or more satellites (in some embodiments, in accordance with a determination that the computer system can be aligned properly for communication with the one or more satellites (e.g., the one or more satellites move within range), the computer system foregoes displays of the graphical indication that the computer system cannot be aligned properly for communication with the one or more satellites). Displaying a graphical indication that the computer system cannot currently be aligned properly for communication with the one or more satellites provides the user with more information about the ability of the computer system to communicate with the one or more satellites and helps prevent the user from unnecessarily attempting to align the computer system with the one or more satellites, which provides improved visual feedback and reduces the number of inputs needed to perform an operation.

In accordance with some embodiments, in response to detecting the user input and in accordance with the determination that the computer system cannot currently be aligned properly for communication with the one or more satellites, the computer system foregoes display of a graphical representation of the one or more satellites (e.g., as described with reference to FIGS. 9C-9D; e.g., displaying the graphical indication (e.g., text, a graphic, a color, and/or an animation) that the computer system cannot currently be aligned properly for communication with the one or more satellites without displaying a graphical representation of the one or more satellites). In some embodiments, the computer system cannot be aligned properly for communication with the one or more satellites because the one or more satellites are out of communication range of the computer system and/or the computer system is indoors or is otherwise obstructed from the sky. Foregoing display of a graphical representation of the one or more satellites in accordance with the determination that the computer system cannot currently be aligned properly for communication with the one or more satellites provides the user with a visual indication that the computer system cannot currently be aligned properly for communicate with the one or more satellites and helps prevent the user from unnecessarily attempting to align the computer system with the one or more satellites, which provides improved visual feedback and reduces the number of inputs needed to perform an operation.

In accordance with some embodiments, in response to detecting the user input and in accordance with a determination that the computer system cannot currently be aligned properly for communication with the one or more satellites, the computer system displays (e.g., concurrently with the graphical indication that the computer system cannot currently be aligned properly for communication with the one or more satellites) an indication (e.g., text, a graphic, a color, and/or an animation) of when the computer system will be able to be aligned properly for communication with the one or more satellites (e.g., as described with reference to FIG. 9E; e.g., when or how long until the one or more satellites will be in communication range of the computer system). Displaying an indication of when the computer system will be able to be aligned properly for communication with the one or more satellites provides the user with more information about when the computer system will be able to be aligned properly for communication with the one or more satellites and helps prevent the user from unnecessarily attempting to align the computer system with the one or more satellites, which provides improved visual feedback and reduces the number of inputs needed to perform an operation.

In accordance with some embodiments, in accordance with a determination that the computer system will not be able to be aligned properly for communication with the one or more satellites within a threshold time period (e.g., the one or more satellites will be out of range of the computer system), the computer system displays a graphical indication (e.g., text) that the computer system will not be able to be aligned properly for communication with the one or more satellites (e.g., as described with reference to FIG. 9O; e.g., changing the appearance of the alignment element to indicate the threshold time period until the one or more satellites will be out of communication range of the computer system). Displaying a graphical indication that the computer system will not be able to be aligned properly for communication with the one or more satellites within a threshold time period provides the user with more information about when the computer system will be able to be aligned properly for communication with the one or more satellites and helps prevent the user from unnecessarily attempting to align the computer system with the one or more satellites, which provides improved visual feedback and reduces the number of inputs needed to perform an operation.

In accordance with some embodiments, displaying the graphical indication that the computer system will not be able to be aligned properly for communication with the one or more satellites includes displaying a graphical representation of the one or more satellites moving away from a graphical representation of the computer system (e.g., as described with reference to FIG. 9O). Displaying a graphical representation of the one or more satellites moving away from a graphical representation of the computer system provides the user with a visual indication of the movement of the one or more satellites relative to the computer system and enables the user to align the computer system with fewer errors, which provides improved visual feedback and reduces the number of inputs needed to perform an operation.

In accordance with some embodiments, wherein displaying the graphical indication that the computer system will not be able to be aligned properly for communication with the one or more satellites includes displaying an indication (e.g., text, a graphic, a color, and/or an animation) of an amount of time until the computer system will be able to be aligned properly for communication with the one or more satellites (e.g., as described with reference to FIG. 9O at 908P; e.g., when the one or more satellites will be back in range or when the next communication window will occur). Displaying an indication of an amount of time until the computer system will be able to be aligned properly for communication with the one or more satellites provides the user with more information about when the computer system will be able to be aligned properly for communication with the one or more satellites and helps prevent the user from unnecessarily attempting to align the computer system with the one or more satellites, which provides improved visual feedback and reduces the number of inputs needed to perform an operation.

In accordance with some embodiments, after displaying the graphical indication that the computer system will not be able to be aligned properly for communication with the one or more satellites (e.g., after the one or more satellites go out of communication range of the computer system): the computer system detects an indication (e.g., data) that the computer system is able to be aligned properly for communication with the one or more satellites (e.g., a new satellite is found or the one or more satellites come back into communication range), and displays a graphical indication (e.g., text, a graphic, a color, and/or an animation) that the computer system is able to be aligned properly for communication with the one or more satellites (e.g., as described with reference to FIG. 9P). Displaying a graphical indication that the computer system is able to be aligned properly for communication with the one or more satellites provides the user with a visual indication that the computer system can be aligned properly and enables the user to align the computer system with fewer errors, which provides improved visual feedback and reduces the number of inputs needed to perform an operation.

In accordance with some embodiments, while the computer system is in a low-bandwidth communication mode (in some embodiments, a mode in which a compressed message format (e.g., a format with limited data for transmission via non-terrestrial wireless communication) is used to communicate (e.g., as described with reference to FIG. 6M). In some embodiments, the computer system enters the low-bandwidth communication mode in response to receiving a request to enter the low-bandwidth communication mode (e.g., in response to receiving a request to communicate via a non-terrestrial wireless communication)), the computer system displays (e.g., in a banner), via the display generation component, a visual indication (e.g., text, a graphic, a color, and/or an animation) of a connection status of the computer system with the one or more satellites. In some embodiments, the visual indication of the connection status of the computer system with the one or more satellites is selectable. In some embodiments, in response to detecting selection of the visual indication of the connection status of the computer system with the one or more satellites, the computer system displays (e.g., re-displays) the alignment element (e.g., with instructions for reconnecting with the one or more satellites (e.g., larger instructions than in the visual indication of the connection status of the computer system with the one or more satellites)). Displaying a visual indication of a connection status of the computer system with the one or more satellites while the computer system is in a low-bandwidth communication mode provides a user with an indication of whether the computer system can communicate in the lo-bandwidth communication mode, which provides improved visual feedback.

In accordance with some embodiments, displaying the visual indication of the connection status of the computer system with the one or more satellites includes: in accordance with a determination that the computer system is not aligned properly for communication with the one or more satellites (and/or is not currently able to be aligned properly for communication with the one or more satellites (e.g., the one or more satellites are obstructed and/or out of communication range of the computer system)), displaying (e.g., in the banner and/or concurrently with the visual indication of the connection status of the computer system with the one or more satellites) a visual indication (e.g., text, a graphic, a color, and/or an animation) of an error condition (e.g., as described with reference to FIG. 9F; e.g., an indication of the reason why the computer system cannot currently communicate with the one or more satellites). In some embodiments, displaying the visual indication of an error condition includes ceasing to display a visual indication that the computer system is aligned properly for communication with the one or more satellites or is connected with the one or more satellites (e.g., the visual indication of the connection status changes from a connected state to an error condition state). In some embodiments, in accordance with a determination that the computer system is aligned properly for communication with the one or more satellites, the computer system ceases display of the visual indication of an error condition and displays (e.g., re-displays) a visual indication that the computer system is aligned properly for communication with the one or more satellites or is connected with the one or more satellites (e.g., the visual indication of the connection status changes from an error condition state to a connected state). In some embodiments, in accordance with a determination that the computer system changes from being not aligned properly to being aligned properly, or from being aligned properly to being not aligned properly, the computer system outputs a sounds and/or tactile output (e.g., before, after, and/or concurrently with changing the display of the visual indication of the connection status). Displaying a visual indication of an error condition in accordance with a determination that the computer system is not aligned properly for communication with the one or more satellites provides the user with more information about the alignment of the computer system with the one or more satellites and enables the user to align the computer system with fewer errors, which provides improved visual feedback and reduces the number of inputs needed to perform an operation.

In accordance with some embodiments, after detecting the user input and in accordance with a determination that the computer system is aligned properly for communication with the one or more satellites, the computer system sends (e.g., as described with reference to FIG. 9J; e.g., automatically and/or without further user input) a message via the one or more satellites that includes content corresponding to the request to communicate via satellite communication. In some embodiments, the message includes content (e.g., text and/or location information) provided (e.g., input) by a user. Sending a message via the one or more satellites that includes content corresponding to the request to communicate via satellite communication after detecting the user input and in accordance with a determination that the computer system is aligned properly for communication with the one or more satellites allows the computer system to automatically send the communication when the computer system becomes aligned properly with the one or more satellites without additional inputs, which reduces the number of inputs needed to perform an operation and performs an operation when a set of conditions has been met without requiring further user input.

In accordance with some embodiments, after detecting the user input and in accordance with a determination that the computer system is aligned properly for communication with the one or more satellites, the computer system displays (e.g., automatically and/or without further user input) a user interface of a messaging application (e.g., 902K or 902L). In some embodiments, the user interface of the messaging application includes (e.g., displays) a message conversation that includes a message sent via the one or more satellites that includes content corresponding to the request to communicate via satellite communication. In some embodiments, displaying the user interface of the messaging application includes ceasing display of the alignment element (e.g., the user interface of the messaging application replaces the alignment element) or displaying a smaller version (e.g., reducing the displayed size) of the alignment element. Displaying a user interface of a messaging application after detecting the user input and in accordance with a determination that the computer system is aligned properly for communication with the one or more satellites displays a user interface of a messaging application without additional input and provides an efficient technique for sending additional communications (e.g., follow up communications), which provides improved visual feedback, reduces the number of inputs needed to perform an operation, and performs an operation when a set of conditions has been met without requiring further user input.

In accordance with some embodiments, the computer system displays (e.g., before detecting the user input corresponding to the request to communicate via satellite communication, after detecting the user input corresponding to the request to communicate via satellite communication, while in a low-bandwidth communication mode, and/or while concurrently displaying the alignment element) a selectable end-satellite-communication option (e.g., as seen in FIGS. 9C-9J at 914; e.g., a button, icon, affordance, and/or selectable graphical element) that, when selected, causes the computer system to cease operating in a satellite (or low-bandwidth) communication mode (e.g., cease display of the alignment element). Displaying a selectable end-satellite-communication option that causes the computer system to cease operating in a satellite communication mode provides the user with an efficient technique for exiting the satellite communication mode without additional inputs, which reduces the number of inputs needed to perform an operation.

In accordance with some embodiments, in response to detecting the change in orientation of the predetermined portion of the computer system and in accordance with a determination that the change in orientation of the predetermined portion of the computer system properly aligns the computer system for communication with the one or more satellites, the computer system provides a first tactile output (e.g., as seen in FIGS. 9J and 9M at 619; e.g., via a haptic feedback component) at the computer system; and while the computer system is aligned properly for communication with the one or more satellites, the computer system detects a second change in orientation of the predetermined portion of the computer system; and in response to detecting the second change in orientation of the predetermined portion of the computer system in accordance with a determination that the detected second change in orientation (azimuth and/or attitude) of the predetermined portion of the computer system causes the computer system to be moved out of alignment for communication with the one or more satellites, the computer system provides a second tactile output (e.g., via a haptic feedback component) at the computer system. Providing a tactile output when the computer system becomes properly aligned with the one or more satellites and when the computer system moves out of alignment with the one or more satellites provides the user with an indication when these conditions occur without requiring additional input, which provides improved feedback and performs an operation when a set of conditions has been met without requiring further user input.

In accordance with some embodiments, after detecting the user input corresponding to a request to communicate via satellite communication (e.g., while displaying the alignment element and/or while the computer system is in a low-bandwidth communication mode), in response to detecting that terrestrial communication (e.g., cellular service) is available, the computer system displays (e.g., as a banner) a selectable terrestrial communication option (e.g., as seen at FIG. 9N at 926); the computer system detects selection of the terrestrial communication option; and in response to detecting the selection of the terrestrial communication option, the computer system initiates communication (e.g., a call and/or text) via the terrestrial communication (e.g., to communicate with emergency services). Displaying a terrestrial communication option in response to detecting that terrestrial communication is available provides the user with a visual indication that terrestrial communication is available and an efficient technique for initiating communication via the terrestrial communication, which provides improved visual feedback, reduces the number of inputs needed to perform an operation, and performs an operation when a set of conditions has been met without requiring further user input.

In accordance with some embodiments, displaying the terrestrial communication option includes ceasing display of the alignment element (e.g., as described with reference to FIG. 9N; e.g., replacing the alignment element with the terrestrial communication option). Ceasing display of the alignment element provides a visual indication that a satellite connection is no longer required for communication, which provides improved visual feedback.

In accordance with some embodiments, while terrestrial communication is available, the computer system displays (e.g., maintaining display of and/or continuing to display) a set of selectable communication-content options (e.g., 604M; e.g., affordances, buttons, graphical elements, graphical objects, and/or icons) corresponding to respective content for a communication (e.g., information that can be selected by a user to be included in the report), wherein the set of selectable communication-content options are specific to a low-bandwidth communication mode (e.g., the options are only available and/or presented for the low-bandwidth communication mode, even if terrestrial communication is available). In some embodiments, the options are not presented in a messaging user interface of a messaging application that displays a message conversation and/or a field for composing a message for the message conversation. Displaying, while terrestrial communication is available, a set of selectable communication-content options corresponding to respective content for a communication, where the set of selectable communication-content options are specific to a low-bandwidth communication mode, provides a visual indication that the techniques for selecting content for a low-bandwidth communication are available while terrestrial communication is available, which provides improved visual feedback.

In accordance with some embodiments: in accordance with (or, optionally, in response to) a determination that an error condition is met (e.g., the computer system is within a threshold position of not being aligned properly for communication with the one or more satellites, a strength of a signal between the computer system and the one or more satellites is below a threshold level, a consistency of a signal between the computer system and the one or more satellites is below a threshold level, and/or the computer system has a poor connection with the one or more satellites) (e.g., there is a poor connection between the computer system and the satellite, as shown in FIG. 9M): the computer system provides a prompt (e.g., 926 in FIG. 9M) (e.g., displaying a graphical element, outputting audio, and/or producing a tactile output) that includes instructions (e.g., text, a graphic (such as an arrow), a color, and/or an animation) for correcting the error condition (and, optionally, displaying (e.g., concurrently with providing the prompt) an indication of the error condition, such as "poor connection" or "low signal"). In some embodiments, the instructions include directions to properly align the computer system with the one or more satellites. In accordance with some embodiments, after providing the prompt that includes instructions for correcting the error condition: in accordance with a determination that the error condition has been met (e.g., the error condition has not been corrected, the error condition has been maintained, and/or the error condition still exists) for at least a threshold amount of time (e.g., a non-zero threshold amount of time such as 5, 30, 90 seconds, or 1, 5, 10, or 15 minutes), the computer system provides a status indication (e.g., 926 in FIG. 9M1) (e.g., a visual indication such as text, a graphic, a color, and/or an animation or a non-visual indication such as a sound and/or tactile output) that indicates that the computer system is not connected with (e.g., is disconnected from and/or is unable to communicate with) the one or more satellites. In some embodiments, the threshold amount of time is a predetermined amount of time since determining that the error condition has been met or since displaying the prompt that includes instructions for correcting the error condition. Providing a prompt that includes instructions for correcting an error condition in accordance with a determination that the error condition is met and before indicating that the computer system is not connected with the one or more satellites notifies the user of the error condition and helps the user correct the error condition before the computer system becomes disconnected from the one or more satellites, which performs an operation when a set of conditions has been met without requiring further user input, provides improved visual feedback, and reduces the number of inputs needed to perform an operation (e.g., to maintain and/or re-establish a connection with the one or more satellites).

In accordance with some embodiments, the computer system sends (e.g., after the computer system has been aligned properly for communication with the one or more satellites and/or while the computer system is aligned properly for communication with the one or more satellites) a message via satellite communication (e.g., via the one or more satellites); and after sending the message via satellite communication and before receiving a reply to the message, the computer system displays a reply status element (e.g., "WAITING TO RECEIVE" in banner 926 in FIGS. 9L and 9M) (e.g., a prompt, a notification, a graphical indicator, and/or a textual indication, such as "waiting to receive") that indicates that the computer system has sent the message and has not received a reply to the message. In some embodiments, the reply status element is displayed concurrently with (or included in) the alignment element. In some embodiments, after displaying the reply status element, in accordance with a determination that a reply to the message has been received (or, optionally, in response to receiving a reply to the message), the computer system ceases displaying (e.g., removes) the reply status element (e.g., the computer system displays the alignment element without the reply status element). In some embodiments, after displaying the reply status element, in accordance with a determination that a reply to the message has been received (or, optionally, in response to receiving a reply to the message), the computer system updates the reply status element to indicate that a reply to the message has been received. Displaying an element that indicates that the computer system has sent the message and has not received a reply to the message after sending the message via satellite communication and before receiving a reply to the message provides the user with information about whether or not a reply to the message has been received and helps the user avoid attempting to send additional messages, which provides improve visual feedback and reduces the number of inputs needed to perform an operation In accordance with some embodiments, after (or, optionally, while) displaying the alignment element (e.g., 931): in accordance with a determination that terrestrial communication (e.g., terrestrial wireless communication, Wi-Fi, and/or cellular communication) is (or, optionally, has become) available (e.g., as in FIG. 9N or FIG. 9N1): the computer system ceases display of the alignment element and displays a terrestrial communication element (e.g., the cellular graphic in 926 in FIG. 9N or the Wi-Fi graphic in 926 in FIG. 9N1) (e.g., a notification and/or a prompt) that indicates that terrestrial communication is available. In some embodiments, the terrestrial communication element includes a selectable terrestrial communication option that, when selected, causes the computer system to initiate a process to communicate via terrestrial communication (e.g., via a text message, phone call, and/or sending the emergency report while in the emergency reporting mode). In some embodiments, the alignment element is displayed at a first position and the terrestrial communication element replaces the alignment element at the first position. Ceasing display of the alignment element and displaying an indication that terrestrial communication is available in accordance with the determination that terrestrial communication is available provides a visual indication that a potentially preferable method of communication is available, which provides improved visual feedback and reduces the number of inputs needed to perform an operation.

In accordance with some embodiments, while the computer system is aligned properly for communication with one or more satellites: in accordance with a determination that the computer system will not be able to be aligned properly for communication with the one or more satellites within a threshold time period (e.g., the one or more satellites will be out of range and/or out of view of the computer system) (e.g., as shown in FIG. 9O), the computer system displays a graphical indication (e.g., 908O) (e.g., text, a graphic, a color, and/or an animation) of an amount of time (e.g., an estimated amount of time) until the computer system will not be able to be aligned properly for communication with the one or more satellites. In some embodiments, the computer system displays a graphical indication of an amount of time until there will not be any satellites available for the computer system to connect to for communication in accordance with a determination that there will not be any satellites available for the computer system to connect to for communication (e.g., there will be no satellites available to the computer system for communication; the computer system will not be able to connect to any satellites for communication; there will not be any satellites in range or in view of the computer system) within a threshold time period. In some embodiments, the graphical indication of the amount of time until the computer system will not be able to be aligned properly for communication with the one or more satellites is displayed concurrently with the alignment element (e.g., after detecting the user input corresponding to a request to communicate via satellite communication). Displaying a graphical indication of the amount of time until the computer system will not be able to be aligned properly for communication with the one or more satellites notifies the user that the computer system will lose connection with the one or more satellites, encourages the user to align with the one or more satellites, and/or allows the user to send a message while the computer system is able to be aligned properly for communication, which provides improved visual feedback and reduces the number of inputs needed to perform an operation.

In accordance with some embodiments, in accordance with a determination that the computer system is not able to be aligned properly for communication with the one or more satellites (e.g., the one or more satellites are out of range of the computer system) (e.g., as shown in FIG. 9O1), the computer system displays a graphical indication (e.g., 908O1) (e.g., text, a textual indication of time, a graphic, a color, and/or an animation) of an amount of time (e.g., an estimated amount of time) until the computer system will be able to be aligned properly for communication with one or more satellites (e.g., until one of (e.g., the next) satellite of the one or more satellites will be in range). In some embodiments, the computer system displays a graphical indication of an amount of time until the computer system will be able to be aligned properly for communication with at least one of the one or more satellites (e.g., an amount of time until the computer system will be able to connect with at least one of the one or more satellites; an amount of time until at least one of the one or more satellites will be available to, in range of, and/or in view of the computer system) in accordance with a determination that there are no (e.g., there are not any) satellites available to the computer system for communication (e.g., there are no satellites that the computer system is able to connect to; the computer system is not able to connect to any of the one or more satellites; there are no satellites in range or in view of the computer system; all of the one or more satellites are out of range of the computer system). In some embodiments, the graphical indication of the amount of time until the computer system will be able to be aligned properly for communication with one or more satellites is displayed concurrently with the alignment element (e.g., after detecting the user input corresponding to a request to communicate via satellite communication). Displaying a graphical indication of the amount of time until the computer system will be able to be aligned for communication with one or more satellites notifies the user of the amount of time until the computer system will have an opportunity to connect, helps the user avoid attempting to send a message when communication is not possible, and enables the user to align the computer system with fewer errors (e.g., by not attempting to align the computer system when proper alignment is not possible), which provides improved visual feedback and reduces the number of inputs needed to perform an operation.

In some embodiments, after detecting the user input corresponding to the request to communicate via satellite communication (e.g., while displaying the alignment element): in response to a determination that a predefined action has been successfully performed (e.g., the computer system has successfully connected to one or more satellites or a message has been successfully sent via satellite communication), the computer system displays a message (e.g., 614T, 614U, 624T, 624U, 908J, "Waiting to receive" in 926 in FIG. 9L indicates that a message has been sent, 908L, and/or 908M) that indicates that the predefined action has been successfully performed. In some embodiments, the computer system concurrently displays the alignment element and the message that indicates that the predefined action has been successfully performed (e.g., the computer system displays the message that indicates that the predefined action has been successfully performed while displaying the alignment element). Displaying a message that indicates that the predefined action has been successfully performed in response to a determination that a predefined action has been successfully performed enables the computer system to inform the user that a particularly relevant action has occurred while not distracting the user with notifications about non-predefined actions, which provides improved visual feedback to the user and performs an operation when a set of conditions has been met without requiring further user input. Feedback about the success of an important action that enables the computer system to be more quickly and efficiently controlled is particularly important in situations where the user is responding to an emergency or stressful situation.

In some embodiments, while displaying the alignment element, the computer system outputs a non-visual (e.g., audio and/or haptic) output (e.g., 619 and/or 650), including: in accordance with a determination that the computer system is in a first satellite connection state (e.g., connecting, connected, not connected, poor connection, aligned, not aligned, satellite out of range, and/or satellite obstructed), outputting the non-visual output having a first characteristic (e.g., frequency, magnitude, and/or pattern); and in accordance with a determination that the computer system is in a second satellite connection state that is different from the first satellite connection state, outputting the non-visual output having a second characteristic that is different from the first characteristic (e.g., the non-visual output has a frequency, magnitude, and/or pattern that is based on the satellite connection state of the computer system). For example, 619 and/or 650 in FIG. 9G has a different characteristic from 619 and/or 650 in FIG. 9J). In some embodiments, the computer system changes the non-visual output in response to detecting a change in the satellite connection state of the computer system. Outputting a non-visual output with different characteristics based on the satellite connection state informs the user of a state (or change in state) of the computer system even if the user is not looking at a display of the computer system, enables the user to quickly and easily determine the satellite connection state without having to navigate a user interface, and enables the user to respond to the state of the computer system to align the computer system with fewer errors, which provides improved feedback to the user, reduces the number of inputs needed to perform an operation, and performs an operation when a set of conditions has been met without requiring further user input. Feedback about an important change in the connection status of the computer system that enables the computer system to be more quickly and efficiently controlled is particularly important in situations where the user is responding to an emergency or stressful situation.

In some embodiments, outputting the non-visual output occurs while the computer system is aligned properly for communication with the one or more satellites (e.g., while the computer system is tracking one or more satellites; e.g., computer system 600 outputs 619 and/or 650 in FIGS. 9J, 9K, and/or 9L). In some embodiments, the computer system repeats (e.g., at regular or predetermined intervals) output of the non-visual output while the computer system is aligned properly for communication with the one or more satellites (e.g., the non-visual output is ongoing when tracking a satellite). Outputting the non-visual output while the computer system is aligned properly for communication with the one or more satellites informs the user of the state of the computer system, even if the user is not looking at a display of the computer system, and gives the user confidence that the computer system is maintaining alignment with the one or more satellites without having to navigate a user interface, which provides improved feedback to the user and reduces the number of inputs needed to perform an operation.

In some embodiments, outputting the non-visual output occurs while the computer system is not aligned properly for communication with the one or more satellites (e.g., while the computer system is not tracking one or more satellites and/or when the computer system ceases to be aligned properly for communication with the one or more satellites; e.g., 619 and/or 650 in FIG. 9M and/or 9M1). In some embodiments, the computer system repeats (e.g., a regular or predetermined intervals) output of the non-visual output while the computer system is not aligned properly for communication with the one or more satellites. Outputting the non-visual output while the computer system is not aligned properly for communication with the one or more satellites informs the user that the alignment has changed and/or is no longer aligned without having to navigate the user interface, even if the user is not looking at a display of the computer system, enables the user to respond to the change in alignment status, and enables the user to align the computer system with fewer errors, which provides improved visual feedback to the user and reduces the number of inputs needed to perform an operation. Feedback about an important change in the alignment status of the computer system that enables the computer system to be more quickly and efficiently controlled is particularly important in situations where the user is responding to an emergency or stressful situation.

In some embodiments, after detecting the user input corresponding to the request to communicate via satellite communication (e.g., while displaying the alignment element): in accordance with (or, in some embodiments, in response to) a determination that the computer system is aligned properly for communication with one or more satellites, the computer system displays an indication (e.g., a graphical indication, icon, color, font, text, animation, symbol, thumbnail, image, and/or glyph; e.g., "Keep Pointing to Satellite to Send & Receive" in 926 and/or "Connecting" in 2106 in FIG. 21H) that the computer system is connecting to (e.g., is attempting to connect to and/or is in the process of establishing a connection with) the one or more satellites (e.g., "connecting", "keep pointing to satellite", and/or "this may take a few minutes"); and after displaying the indication that the computer system is connecting to the one or more satellites: in accordance with (or, in some embodiments, in response to) a determination that the computer system is connected to the one or more satellites, the computer system displays an indication (e.g., a graphical indication, icon, color, font, text, animation, symbol, thumbnail, image, and/or glyph) that the computer system is connected to the one or more satellites (e.g., "connected" and/or "keep pointing to satellite"; e.g., "Connected" in 2106 in FIG. 21I), wherein the indication that the computer system is connected to the one or more satellites is different from the indication that the computer system is connecting to the one or more satellites. Displaying indications when the computer system is connecting to and then actually connected to the one or more satellites provides the user with progressive feedback throughout the process of establishing a connection with the one or more satellites to reinforce that the connection process is progressing and enables the user to align the computer system with fewer errors, which provides improved visual feedback to the user and performs an operation when a set of conditions has been met without requiring further user input.

In some embodiments, after detecting the user input corresponding to a request to communicate via satellite communication and while the computer system is connected for communication with one or more satellites, the computer system sends a message (e.g., 906K) via the one or more satellites, wherein the message includes a graphical (e.g., non-textual) representation (e.g., 656) of at least a portion of the message (e.g., the message includes an image, symbol, thumbnail, and/or icon associated with content of the message, such as a medical ID icon, an emergency alert icon, an image of a car to indicate a vehicle issue, a doctor's bag icon to indicate sickness or injury, a shield icon to indicate a crime, a cross symbol to indicate that someone is lost or trapped, and/or an image of a fire to indicate a fire). Including a graphical representation of the message sent via the one or more satellites provides a visual indication of the content of the message that can allow the user to more quickly and easily determine the content of the message and/or that the proper information was sent, which provides improved visual feedback to the user.

In some embodiments, after detecting the user input corresponding to a request to communicate via satellite communication, the computer system initiates transmission of, via the one or more satellites, a message (e.g., in response to a request to send the message; e.g., as shown in FIG. 9J); after (or, in some embodiments, while) initiating transmission of the message: in accordance with (or, in some embodiments, in response to) a determination that the computer system is connected for communication with one or more satellites (e.g., alignment and/or connection with the one or more satellites is complete), the computer system displays an indication (e.g., 910J, a graphical indication, icon, color, font, text, animation, symbol, thumbnail, image, and/or glyph) that a messages application is being opened; and after displaying the indication that the messages application is being opened (e.g., in response to detecting selection of the indication that the messages application is being opened or in accordance with a determination that a predetermined amount of time has elapsed), the computer system displays a user interface (e.g., 902K) of the messages application. In some embodiments, the indication that the messages application is being opened is selectable. In some embodiments, the indication that the messages application is being opened is displayed concurrently with an indication of the status of the transmission of the message and/or the alignment element. In some embodiments, the user interface of the messages application includes a representation of the message, e.g., in a message conversation region that includes one or more messages between a user associated with the computer system and a recipient of the message. Displaying an indication that the messages application is being opened, and then opening the messages application, after initiating transmission of the message enables the computer system to automatically display the message to the user and provide an interface for the user to send additional messages and/or view responses without requiring additional user input, which provides improved visual feedback to the user, reduces the number of inputs needed to perform an operation, and performs an operation when a set of conditions has been met without requiring further user input.

In some embodiments, displaying the alignment element includes displaying an animation (e.g., the animation shown and described with reference to FIGS. 9R-9U) that includes: a graphical representation (e.g., 929, an icon, color, font, text, animation, symbol, thumbnail, image, and/or glyph) of a satellite; a graphical representation (e.g., 932, an icon, color, font, text, animation, symbol, thumbnail, image, and/or glyph) of the computer system; and a graphical representation (e.g., 933, an icon, color, font, text, animation, symbol, thumbnail, image, and/or glyph) of a signal (e.g., a wave and/or one or more curved lines) going between (e.g., back and forth between) the graphical representation of the satellite and the graphical representation of the computer system over time (e.g., from the graphical representation of the satellite to the graphical representation of the computer system and/or from the graphical representation of the computer system to the graphical representation of the satellite). In some embodiments, the animation includes the graphical representation of the satellite alternating (e.g., rotating back and forth) between a first state (e.g., a first orientation) and a second state (e.g., a second orientation) over time. Displaying an animation of a signal going between the satellite and the computer system informs the user that there is communication back and forth between the computer system and the one or more satellites, reminds the user that alignment with the one or more satellites is required to both send and receive communication, and reminds the user that satellite communications may take a longer time to send and receive than terrestrial communications, which provides improved visual feedback to the user.

In some embodiments, displaying the alignment element includes: in accordance with a determination that the alignment element is in a first display state (e.g., an expanded user interface, such as a full-size and/or full-screen user interface as in, e.g., FIG. 9J, or a full-size banner, such as 926 in, e.g., FIG. 9L), displaying the animation while concurrently displaying a textual indication (e.g., 908J or "Connected" in 926 in FIG. 9L) of a satellite connection state (e.g., connecting, connected, not connected, poor connection, aligned, not aligned, satellite out of range, and/or satellite obstructed) of the computer system; and in accordance with a determination that the alignment element is in a second display state (e.g., a reduced-size, smaller, and/or non-expanded user interface, such as a banner or a minimized banner, such as **926*a* in FIG. 9L1) that is different from the first display state, displaying the animation without concurrently displaying the textual indication of the satellite connection state of the computer system (e.g., minimized banner 926*a* in FIGS. 9L1-9L1**D does not include a textual indication of the satellite connection state of the computer system). Displaying the animation with or without the textual indication of the satellite connection state based on the display state of the alignment element enables the computer system to adjust the amount of information provided to the user based on the context without user input and to conserve space on the user interface when possible, which provides improved visual feedback to the user, reduces the number of inputs needed to perform an operation, and performs an operation when a set of conditions has been met without requiring further user input.

In some embodiments, while displaying the alignment element (e.g., in a reduced-size user interface, such as a banner, or in an expanded user interface, such as a full-screen user interface): in accordance with (or, in some embodiments, in response to) a determination that the computer system is not aligned properly for communication with one or more satellites (e.g., that the computer system has transitioned from being aligned properly for communication with one or more satellites to being not aligned properly for communication with one or more satellites), the computer system outputs a non-visual output (e.g., 619, 650, a haptic output, and/or an audio output) indicating that the computer system is not aligned properly for communication with one or more satellites (e.g., the computer system outputs 619 and/or 650 in FIGS. 9F-9I, 9M, 9M1, 19I, 21F, 21G). Outputting a non-visual output indicating that the computer system is not aligned properly for communication with one or more satellites in accordance with a determination that the computer system is not aligned properly for communication with one or more satellites informs the user of a state (or change in state) of the computer system even if the user is not looking at a display of the computer system, enables the user to quickly and easily determine the alignment status of the computer system without navigating the user interface, and enables the user to respond to the change in alignment status, which provides improved feedback to the user, reduces the number of inputs needed to perform an operation, and performs an operation when a set of conditions has been met without requiring further user input. Feedback about an important change in the alignment status of the computer system that enables the computer system to be more quickly and efficiently controlled is particularly important in situations where the user is responding to an emergency or stressful situation.

In some embodiments, while displaying the alignment element (e.g., in a reduced-size user interface, such as a banner, or in an expanded user interface, such as a full-screen user interface): in accordance with (or, in some embodiments, in response to) a determination that the computer system is not connected for communication with one or more satellites (e.g., that the computer system has transitioned from being connected for communication with one or more satellites to being not connected for communication with one or more satellites; that the computer system has lost connection for communication with one or more satellites), the computer system outputs a non-visual output (e.g., 619, 650, a haptic output, and/or an audio output) indicating that the computer system is not connected for communication with one or more satellites (e.g., the computer system outputs 619 and/or 650 in FIGS. 9D-9I, 9M1, 9O1, 9P, 21F, 21G, and/or 21J). Outputting a non-visual output indicating that the computer system is not connected for communication with one or more satellites in accordance with a determination that the computer system is not connected for communication with one or more satellites provides feedback to the user of an important change in the connection status of the computer system if the user is not looking at a display of the computer system, and enables the user to respond to the change in connection status, which provides improved feedback to the user, reduces the number of inputs needed to perform an operation, and performs an operation when a set of conditions has been met without requiring further user input. Feedback about an important change in the connection status of the computer system that enables the computer system to be more quickly and efficiently controlled is particularly important in situations where the user is responding to an emergency or stressful situation.

In some embodiments, after detecting the user input (and, in some embodiments, while displaying the alignment element): in accordance with a determination that a satellite cannot be detected (e.g., that there is an obstruction, such as a wall, tree, or building, or that the computer system is indoors), the computer system provides (e.g., outputs and/or displays) an alert (e.g., 619, 650, 908C, 908D, a graphical alert, a haptic output, and/or an audio output) that an obstruction has been detected (e.g., "obstruction detected," "looking for satellite," "unable to connect," "poor connection," and/or "make sure you are outside with a clear view of the sky"). Providing an alert that an obstruction has been detected in accordance with a determination that a satellite cannot be detected provides the user with more information about what is preventing connection with a satellite and enables the user to connect the computer system with a satellite with fewer errors, which provides improved feedback, reduces the number of inputs needed to perform an operation, and performs an operation when a set of conditions has been met without requiring further user input.

In some embodiments, providing the alert that an obstruction has been detected includes outputting a non-visual output (e.g., 619, 650, a haptic output, and/or an audio output) indicating that an obstruction has been detected (e.g., the computer system outputs 619 and/or 650 in FIG. 9D). Outputting a non-visual output indicating that an obstruction has been detected informs the user of the obstruction, even if the user is not looking at a display of the computer system, provides the user with additional information about what is preventing connection with a satellite, and enables the user to respond to the obstruction and to connect the computer system with a satellite with fewer errors, which provides improved feedback to the user and reduces the number of inputs needed to perform an operation. Feedback about an important change in the ability of the computer system to connect to a satellite that enables the computer system to be more quickly and efficiently controlled is particularly important in situations where the user is responding to an emergency or stressful situation.

In some embodiments, after detecting the user input and after a determination that a satellite is not available to the computer system for communication: in accordance with (or, in some embodiments, in response to) a determination that a satellite is available (e.g., has become available after not being available) to the computer system for communication, the computer system outputs a non-visual output (e.g., 619, 650, a haptic output, and/or an audio output) indicating that a satellite is available (e.g., the computer system outputs 619 and/or 650 in FIGS. 9F, 9P, and/or 21K). Outputting a non-visual output indicating that a satellite is available in accordance with a determination that a satellite is available to the computer system for communication informs the user that connection with a satellite is possible, even if the user is not looking at a display of the computer system, and enables the user to respond to the availability of a satellite and connect and/or align the computer system with a satellite with fewer errors, which provides improved visual feedback to the user, reduces the number of inputs needed to perform an operation, and performs an operation when a set of conditions has been met without requiring further user input. Feedback about an important change in the availability of a satellite that enables the computer system to be more quickly and efficiently controlled is particularly important in situations where the user is responding to an emergency or stressful situation.

In some embodiments, after detecting the user input, the computer system displays a user interface element (e.g., 926, 926*a*, a banner, and/or pop-up window), wherein displaying the alignment element (e.g., 926 or 926*a*) includes displaying the alignment element in the user interface element (e.g., displaying 931 in 926 or displaying 931*a* in 926*a*); while displaying the alignment element in the user interface element, the computer system detects a request (e.g., 936L) to dismiss (e.g., cease display of) the user interface element; and in response to detecting the request to dismiss the user interface element: in accordance with a determination that the computer system is connected for communication with one or more satellites (e.g., as in FIGS. 9K and/or 9L), the computer system dismisses (e.g., ceases display of or reducing the size of) the user interface element including the alignment element; and in accordance with a determination that the computer system is not connected for communication with a satellite (e.g., as in FIG. 9M1), the computer system maintains display of the user interface element (e.g., at the same size or, in some embodiments, reducing the displayed size of the user interface element, such as from 926 to 926*a*). In some embodiments, the request to dismiss the user interface element includes a swipe (e.g., an upward swipe) directed to the user interface element. Dismissing or maintaining display of the user interface element in response to detecting a request to dismiss the element based on whether the computer system is connected for communication with one or more satellites enables the computer system to adjust the amount of information provided to the user based on the context and conserve space on the user interface when possible, which provides improved visual feedback to the user and performs an operation when a set of conditions has been met without requiring further user input.

In some embodiments, after displaying the alignment element, the computer system ceases display of (or, in some embodiments, reducing the size of) the alignment element (e.g., in response to detecting a request to dismiss the alignment element) (e.g., ceasing display of 931 and, in some embodiments, displaying 931*a*); and after ceasing display of the alignment element, in response to a determination that the computer system is not aligned properly for communication with one or more satellites (e.g., that the computer system has changed from being aligned properly for communication with one or more satellites to being not aligned properly for communication with one or more satellites; e.g., as in FIG. 9M), the computer system displays the alignment element (e.g., displaying 931 or 931*a*, or displaying a user interface element, such as a banner (e.g., 926 or 926*a*) or pop-up window, that includes the alignment element). Displaying the alignment element after ceasing display of the alignment element and in response to a determination that the computer system is not aligned properly for communication with one or more satellites enables the computer system to conserve space on the user interface when alignment is proper and to automatically inform the user about misalignment without user input, which provides improved visual feedback to the user, reduces the number of inputs needed to perform an operation, and performs an operation when a set of conditions has been met without requiring further user input. Feedback about an important change in the alignment status of the computer system that enables the computer system to be more quickly and efficiently controlled is particularly important in situations where the user is responding to an emergency or stressful situation.

Note that details of the processes described above with respect to method 1000 are also applicable in an analogous manner to the methods described above and below. For example, method 700, 800, 1200, 1400, 1600, 1800, 2000, and/or 2200 optionally includes one or more of the characteristics of the various methods described above with reference to method 1000. For example, method 1000 can be performed as part of a process for initiating a communication in accordance with method 700 and/or 800. For example, method 1000 can include selecting a second recipient for the communication, in accordance with method 1200. For example, method 1800 can initiate method 1000 from a messaging application. For example, the alignment element described in method 1000 can be displayed in the alternative communication network test mode in method 2000. For example, method 1000 can be the process corresponding to the user interface object in method 2200. For brevity, these details are not repeated below.

FIGS. 11A-11P illustrate exemplary user interfaces for managing recipients of messages in accordance with some embodiments. The user interfaces in these figures are used to illustrate the processes described below, including the processes in FIG. 12.

FIGS. 11A-11J illustrate an exemplary scenario where a user of computer system 600, John Appleseed, is sending an emergency communication to a first recipient, a search and rescue service. In this exemplary scenario, computer system 600 also sends the message to a second recipient, Jane Appleseed, in response to a request provided by John Appleseed during the process of initiating the emergency communication. In some embodiments, initiating and/or completing the emergency communication includes performing one or more of the methods described with reference to FIGS. 7, 8, and/or 10.

In some embodiments, any of the inputs described herein (e.g., input 1104A, 1104B, 1104C, 1104D, 1104E, 1104F, 1104G, and/or 1104H) is or includes a touch input (e.g., a tap gesture and/or a swipe gesture). In some embodiments, any of the inputs described herein (e.g., input 1104A, 1104B, 1104C, 1104D, 1104E, 1104F, 1104G, and/or 1104H) is or includes a voice input (e.g., a voice command to select a user interface element or to activate a feature or perform a function, such as a feature or function associated with a user interface element). In some embodiments, any of the inputs described herein (e.g., input 1104A, 1104B, 1104C, 1104D, 1104E, 1104F, 1104G, and/or 1104H) is or includes an air gesture (e.g., an air gesture to select a user interface element or to activate a feature or perform a function, such as a feature or function associated with a user interface element). In some embodiments, any of the inputs described herein (e.g., input 1104A, 1104B, 1104C, 1104D, 1104E, 1104F, 1104G, and/or 1104H) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

In FIG. 11A, computer system 600 displays query user interface 1102. Query user interface 1102 includes text 1102A that explains that the messaging conversation (e.g., chat), as well as emergency information provided during the process of initiating the emergency communication, can be shared with one or more emergency contacts (e.g., recipients other than the emergency service). In FIG. 11A, the preselected emergency contacts include first contact 1102B1 ("Jane Appleseed"), who is currently designated to receive the chat, as indicated by checkmark indication 1102C, and second contact 1102B2 ("Maria Fender"), who is not currently designated to receive the chat (e.g., as indicated by the lack of a checkmark indication). In some embodiments, more than one contact is preselected by default to receive the chat. In some embodiments, no emergency contacts are preselected by default.

In FIG. 11A, query user interface 1102 also includes an add contact affordance 1102D that, when selected, initiates a process for adding one or more additional contacts to potentially receive the chat. In some embodiments, add contact affordance 1102D, when selected, opens a contacts application for selecting contacts from a set of contacts stored on, or accessible from, computer system 600. In some embodiments, a selected contact need not have previously been designated as an emergency contact.

In FIG. 11A, query user interface 1102 also includes a notify affordance 1102E, a don't notify affordance 1102F, and an end affordance 1102G. Notify affordance 1102E, when selected, causes one or more currently designated contacts to be selected as recipients for the chat and for emergency information (e.g., location information, information regarding the nature of the emergency) provided during the process of initiating the emergency communication or as the emergency communication is updated with additional messages and/or information. Don't notify affordance 1102F, when selected, causes the process for initiating the emergency communication to progress without designating any contacts (e.g., whether designated or not with checkmark indications) as recipients for the chat and for emergency information. End affordance 1102G, when selected, cancels the process for initiating the emergency communication without communications being sent to any recipients, including the search and rescue service. In FIG. 11A, computer system 600 detects input 1104A (e.g., a tap gesture or other selection input) corresponding to notify affordance 1102E.

FIG. 11B depicts computer system 1100, a computer system belonging to user Jane Appleseed (e.g., a user corresponding to first contact 1102B1 of FIG. 11A). In some embodiments, computer system 1100 includes one or more features of computer system 600 and/or devices 100, 300, and 500. In FIG. 11B, computer system 1100 is shown at approximately the same time (10:9) at which computer system 600 was shown in FIG. 11A. In FIG. 11B, computer system 1100 is currently in a display inactive state, with display screen 1106 off.

At FIG. 11C, in response to input 1104A of FIG. 11A, computer system 600 belonging to user John Appleseed displays emergency messaging user interface 1108. In some embodiments, one or more additional interfaces (e.g., one or more interfaces of FIGS. 6M-6S) associated with the process for initiating the emergency communication are displayed after receiving input 1104A and prior to displaying emergency messaging user interface 1108. Emergency messaging user interface 1108 includes message bubble 1108A that includes certain information that has also been sent to a first recipient, the search and rescue service. Emergency messaging user interface 1108 also includes sharing indication 1108B that indicates that user Jane Appleseed has also been enabled to receive the chat with the search and rescue service and stop sharing affordance 1108D that, when selected, prevents sharing of future messages posted to the emergency communication (e.g., from the user of computer system 600 and/or from the emergency services) with Jane Appleseed. In some embodiments, had Jane Appleseed not been designated to receive the chat via query user interface 1102 as shown in FIG. 11A (e.g., Don't notify affordance 1102F was selected instead of notify affordance 1102E and/or Jane Appleseed was unchecked), emergency messaging user interface 1108 would not include sharing indication 1108B and the chat would not be shared with Jane Appleseed. Emergency messaging user interface 1108 also includes a set of composition affordances 1108C for composing additional messages to be added to the emergency messaging session with the search and rescue service.

At FIG. 11D, computer system 1100 belonging to Jane Appleseed displays, at 10:10, a wake screen user interface 1110 in response to receiving a notification triggered by receipt of the chat message sent from computer system 600. Wake screen user interface 1110 includes notification 1110A that indicates that user John Appleseed has contacted the search and rescue service and shared that chat with user Jane Appleseed. At FIG. 11D, computer system 1100 detects input 1104B (e.g., a tap gesture or other selection input) on notification 1110A.

At FIG. 11E, computer system 600 belonging to John Appleseed displays emergency messaging user interface 1108 now with composition field 1108C1 populated with text 1112 ("WE ARE NEAR THE BIG TREE"), which is a second message being composed by John Appleseed (e.g., using composition affordances 1108). At FIG. 11E, computer system 600 detects input 1104C (e.g., a tap gesture or other selection input) on send affordance 1108C2.

At FIG. 11F, computer system 1100 belonging to Jane Appleseed displays, in response to input 1104B on notification 1110A of FIG. 11D, messaging user interface 1114. Messaging user interface 1114 includes text 1114A providing information about the communication with emergency services initiated by user John Appleseed and an explanation of why the user of computer system 1100 is receiving a transcript of the chat; text 1114D provides similar information. In some embodiments, text 1114A and/or text 1114D also indicates that the emergency communication is being sent via satellite. Messaging user interface 1114 also includes message bubble 1114B which includes the information sent to the search and rescue service as well as location bubble 1114C that, when selected, provides additional location information for computer system 600 at the time the information in message bubble 1114B was sent. In some embodiments, additional location bubbles that provide location information for computer system 600 are displayed when new texts are added to the chat. In some embodiments, additional location bubbles that provide location information for computer system 600 are provided periodically (e.g., at regular periods (e.g., every 5 minutes, 10 minutes, 15 minutes)). Messaging user interface 1114 also includes learn more affordance that, when selected, provides further information about the shared emergency communication. In some embodiments, if one or more messages are sent by the emergency service (e.g., search and rescue service) messaging user interface 1114 would present those messages in separate message bubbles. As shown in FIG. 11F, messaging user interface 1114 does not include composition affordances for composing a response that can be added to the chat (e.g., sent to John Appleseed and/or the search and rescue services). Thus, messaging user interface 1114 is used only to review (e.g., passively review) chat content posted by John Appleseed and/or the search and rescue services, both of whom are active participants in the chat. Messaging user interface 1114 does include messaging affordance 1114E that, when selected, initiates a process for sending messages to John Appleseed (e.g., via a separate message conversation (e.g., a conversation that does not also include the search and rescue services) and/or a separate messaging user interface). At FIG. 11F, computer system 1100 detects input 1104D (e.g., a tap gesture or other selection input) on learn more affordance 1114E.

At FIG. 11G, in response to input 1104D at FIG. 11E, computer system 600 belonging to John Appleseed updates the display of messaging user interface 1108 to now include message bubble 1116 (e.g., "WE ARE NEAR THE BIG TREE") and sends the message to both the search and rescue service and user Jane Appleseed.

At FIG. 11H, in response to receiving the additional chat content sent by computer system 600 in response to input 1104D, computer system 1100 belonging to Jane Appleseed updates the display of messaging user interface 1114 to include message bubble 1118 (e.g., "WE ARE NEAR THE BIG TREE") and location bubble 1120 that, when selected, provides additional location information for computer system 600 at the time the information in message bubble 1118 was sent. At FIG. 11H, computer system 1100 detects input 1104E on location bubble 1120.

At FIG. 11I, in response to input 1104E at FIG. 11H, computer system 1100 displays location user interface 1122 that includes location marker 1122A that marks the received location of computer system 600 at the time the information in message bubble 1118 was sent; location marker 1122A also includes the text of the message itself (e.g., "WE ARE NEAR THE BIG TREE"). Location user interface 1122 also includes location marker 1122B that marks the received location of computer system 600 at the time the information in message bubble 1108A was sent. Location markers 1122A and 1122B are overlaid over a map of an area that includes both locations (e.g., a scrollable map). Location user interface 1122 also includes end affordance 1122C that, when selected, causes computer system 1100 to redisplay messaging user interface 1114 as seen in FIG. 11H.

At FIG. 11J, in response to input 1104D at FIG. 11F, computer system 1100 displays additional information user interface 1124 that includes text 1124A that provides additional information about the emergency communication. In some embodiments, the additional information includes an explanation as to why the user of computer system 1100 is receiving the chat transcript and/or why a response cannot be posted to the chat.

FIGS. 11K-11P provide different embodiments of user interfaces illustrating how emergency messages can be grouped or not grouped with one or more previously sent messages from the same sender (e.g., John Appleseed) in a messaging conversation management user interface of a messaging application.

At FIG. 11K, computer system 1100 displays, in a messaging conversation management user interface 1126, the emergency communication receiving from John Appleseed in message conversation 1126A that is separate from message conversation 1126B that includes one or more previous messages sent by user John Appleseed that were not emergency communications and that were not also sent to the search and rescue service (or another emergency service). Message conversation 1126A is also separate from message conversation 1126C, which includes one or more previous messages in a conversation that included John Appleseed and other users (e.g., users Mom and Dad), and also separate from a message conversation 1126D that did not include John Appleseed. In some embodiments, message conversation 1126A also includes other emergency communications (SOS communications) received from user John Appleseed or one or more other users so that emergency communications from multiple users can be reviewed together by selecting message conversation 1126A. At FIG. 11K, computer system 1100 detects input 1104F on message conversation 1126A.

At FIG. 11J, computer system 1100 displays, in a messaging conversation management user interface 1128, the emergency communication receiving from John Appleseed in message conversation 1128A that is separate from message conversation 1128B that includes one or more previous messages sent by user John Appleseed that were not emergency communications and that were not also sent to the search and rescue service (or another emergency service). Message conversation 1128A is also separate from message conversation 1128C, which includes one or more previous messages in a conversation that included John Appleseed and other users (e.g., users Mom and Dad), and also separate from a message conversation 1128D that did not include John Appleseed. At FIG. 11J, message conversation 1128A is specific to emergency communications for John Appleseed ("John & SOS") and therefore would not include other emergency communications (SOS communications) received from one or more users other than John Appleseed. At FIG. 11L, computer system 1100 detects input 1104G on message conversation 1128A.

At FIG. 11M, computer system 1100 displays, in a messaging conversation management user interface 1130, the emergency communication receiving from John Appleseed in message conversation 1130A that also includes one or more previous messages received from user John Appleseed. At FIG. 11M, message conversation 1130B includes one or more previous messages in a conversation with John Appleseed as well as Mom and Dad and message conversation 1130C includes one or more previous messages in a conversation with Sister. Thus, in the embodiment of FIG. 11M, the emergency communications from John Appleseed are grouped together with other messages in conversations with user John Appleseed (e.g., just user John Appleseed and/or just John Appleseed and an emergency service). At FIG. 11M, computer system 1100 detects input 1104H on message conversation 1130A.

At FIG. 11N, in response to input 1104F at FIG. 11K, computer system 1100 displays messaging user interface 1132. In some embodiments, messaging user interface 1132 includes one or more features of messaging user interface 1114, described above. Messaging user interface 1132 includes message bubble 1132A that includes certain information that has also been sent to a first recipient, the search and rescue service. In some embodiments, as discussed above with reference to FIG. 11K, messaging user interface 1132 would also include one or more other emergency communications (SOS communications) received from user John Appleseed or one or more other users so that emergency communications from multiple users, received by Jane Appleseed, would be presented together.

At FIG. 11O, in response to input 1104G at FIG. 11L, computer system 1100 displays messaging user interface 1134. In some embodiments, messaging user interface 1134 includes one or more features of messaging user interface 1114, described above. Messaging user interface 1134 includes message bubble 1134A which indicates that a "YES" reply must be received at computer system 1100 to receive details of the emergency communication from John Appleseed. In FIG. 11N, computer system 1100 received a "YES" reply, as seen in message bubble 1134B and, in response, caused the display of message bubble 1134C, which includes the contents/details of the emergency communication from John Appleseed. In some embodiments, emergency communications received on a computer system using a first operating system and/or messaging application require authorization prior to providing details while a computer system using a different second operating system and/or messaging application does not require authorization prior to providing details.

At FIG. 11P, in response to input 1104H at FIG. 11M, computer system 1100 displays messaging user interface 1136. In some embodiments, messaging user interface 1136 includes one or more features of messaging user interface 1114, described above. Messaging user interface 1136 includes message bubble 1136A ("GOING ON A HIKE"), which is a message previously received from John Appleseed that was not an emergency communication (e.g., it was not also sent to an emergency service). Messaging user interface 1136 also includes message bubble 1136B that includes certain information that has also been sent to a first recipient, the search and rescue service. Messaging user interface 1136 also includes a set of composition affordances 1136C for composing messages to be sent to John Appleseed. Messaging user interface 1136 presents emergency and non-emergency messages from user John Appleseed, together in a single messaging conversation.

FIG. 12 is a flow diagram illustrating methods for managing recipients of messages, in accordance with some embodiments. The method is performed at a computer system (e.g., 100, 300, 500, 600, or 1100) (e.g., a smartphone, a smartwatch, a tablet computer, a laptop computer, a desktop computer, or a head mounted device (e.g., a head mounted augmented reality and/or extended reality device)) in communication with one or more input devices (e.g., a touch-sensitive surface, a touchscreen, a button, and/or a microphone). In some embodiments, the computer system is in communication with an output generation component (e.g., a display generation component, a display controller, a touch-sensitive display system, and/or a head mounted display system). Some operations in the method are, optionally, combined, the orders of some operations are, optionally, changed, and some operations are, optionally, omitted.

As described below, method 1200 provides an intuitive way for managing recipients of messages. The method reduces the cognitive burden on a user for managing recipients of messages, thereby creating a more efficient human-machine interface. For battery-operated computing devices, enabling a user to manage recipients of messages faster and more efficiently conserves power and increases the time between battery charges.

While preparing to initiate (e.g., prior to or during the start of the communication (e.g., prior to or during receiving a selection from a text messaging UI of text to send)) a communication (e.g., a communication session (e.g., a text message, and/or sending an emergency report while in an emergency reporting mode)) with a first recipient (e.g., search and rescue service as shown in 1108) (e.g., a previously defined contact (e.g., emergency contact and/or emergency service or emergency responder (e.g., a 911 call center; a police department; a fire department))), the computer system outputs (1202) a query (e.g., query in 1102) (e.g., a visual query (e.g., a prompting user interface with one or more selectable options (e.g., a "notify" and "don't notify" button)); an audio query) as to whether to allow a second recipient (e.g., 1102B1 or 1102B2) (e.g., a contactable user, an emergency contact of the user of the computer system), different from the first recipient, to receive information (e.g., information in 1108A) (e.g., an indication that the communication is occurring, metadata regarding the communication (e.g. the participants, the time of the communication, a location of the computer system at the time the communication is occurring), and/or some or all of the contents of the communication (e.g., text message and/or audio)) corresponding to the communication without adding the second recipient as a participant (e.g., the second recipient can receive information but not respond) in a conversation (e.g., a thread) of the communication (in some embodiments, the query includes an identity of the second recipient).

After outputting the query as to whether to allow the second recipient to receive information corresponding to the communication, the computer system detects (1204) a sequence of one or more inputs (e.g., 1104A) corresponding to a request to send a message to the first recipient. In some embodiments, detecting a selection of a "notify" or "don't notify" visual query and a selection of a "send" affordance displayed with the visual query.

In response to detecting the sequence of one or more inputs (1206): in accordance with a determination that the computer system detected one or more inputs corresponding to a request (e.g., 1104A) to allow the second recipient to receive information corresponding to the communication between the user and the first recipient (e.g., via the set of one or more input devices), the computer system sends (1208) (e.g., sending the message to an external emergency message service (server) to send to the first recipient) a message (e.g., message with content as per 1108A) (e.g., content; text) to the first recipient that includes respective information (e.g., information gathered while preparing to initiate the communication) and enables delivery of the message to the second recipient (e.g., instructing the external emergency message service (server) to send to the second recipient subsequent to sending to the first recipient or concurrently with sending to the first recipient) including at least a portion of the respective information; and in accordance with a determination that the computer system did not detect one or more inputs corresponding to a request to allow the second recipient to receive information corresponding to the communication between the user and the first recipient (e.g., via the set of one or more input devices), the computer system sends (1210) (e.g., sending the message to an external emergency message service (server) to send to the first recipient) a message (e.g., message with content as per 1108A) to the first recipient that includes respective information (e.g., information gathered while preparing to initiate the communication) without enabling delivery of the message to the second recipient including at least a portion of the respective information. Enabling, or not enabling, delivery of the message to the second recipient, while sending the message to the first recipient, based on whether a previous request to allow the second recipient to receive information performs an operation (enabling delivery to the second recipient) when a set of conditions (receipt of the request) has been met without requiring further user input.

In some embodiments, prior to preparing to initiate the communication via the set of one or more inputs at the computer system (e.g., while setting up the device), the computer system receives a selection of an emergency recipient (e.g., 1102B1) as an emergency contact (e.g., added the emergency recipient to an emergency contact list), wherein the second recipient is the emergency recipient. In some embodiments, the second recipient is a recipient that was previously specified (e.g., prior to preparing to initiate the communication; via a set of one or more inputs at the computer system) as an emergency contact by a user of the computer system (e.g., specified at the computer system or at a different computer system that is associated (e.g., that is logged into the same user account as the computer system) with the user)). Selecting a second recipient for the query based on previous selection of the recipient as an emergency contact performs an operation (selection of the second recipient) when a set of conditions has been met (the recipient was previously selected as an emergency contact) without requiring further user input to identify the second recipient.

In some embodiments, the query as to whether to allow the second recipient to receive information corresponding to the communication without adding the second recipient as a participant in the conversation includes: a query as to whether to allow a third recipient (e.g., 1102B2) (e.g., an additional previously identified emergency contact) different from the first and second recipients, to receive information corresponding to the communication without adding the third recipient as a participant in the conversation of the communication. In some embodiments, the method further includes: in response to detecting the sequence of one or more inputs: in accordance with a determination that the device detected one or more inputs corresponding to a request to allow the at least one third recipient to receive information corresponding to the communication between the user and the first recipient, sending a message to the first recipient that includes respective information and enabling delivery of a message to the third recipient including at least a portion of the respective information. Outputting a query that pertains to a third recipient, in addition to the second recipient, provides the user with feedback about what recipients can be enabled for receipt of the message, which provides improved feedback (e.g., visual feedback).

In some embodiments, outputting the query as to whether to allow the second recipient to receive information corresponding to the communication without adding the second recipient as a participant in the conversation includes: the computer system displaying a set of one or more user-interactive graphical elements that includes a first user-interactive graphical element (e.g., 1102D) (e.g., an affordance to remove a suggested recipient and/or an affordance to add a new recipient) that, when selected, initiates a process to modify (e.g., add or remove a recipient (e.g., remove the second recipient and/or add an additional recipient)) a set of recipients for the message, when sent.

In some embodiments, the set of one or more user-interactive graphical elements includes: a second user-interactive graphical element (e.g., 1102C) that, when selected, modifies a selection state (e.g., selects the second recipient when the second recipient is currently not selected or deselects the second recipient when the second recipient is not selected) of the second recipient for receiving the message, without modifying the selection state of the third recipient for receiving the message; and a third user-interactive graphical element that, when selected, modifies a selection state of the third recipient for receiving the message, without modifying the selection state of the second recipient for receiving the message. Displaying separate user-interactive graphical elements for the second and third recipients provides additional control options and provides the user with improved visual feedback as to what recipients will be enabled to receive the message when the message is sent to the first recipient.

In some embodiments, outputting the query as to whether to allow the second recipient to receive information corresponding to the communication without adding the second recipient as a participant in the conversation includes: the computer system displaying: an indication (e.g., 1102C) that the second recipient is currently selected to receive the information corresponding to the communication without adding the second recipient as a participant in the conversation (e.g., the query includes one or more recommended/default recipients that include the second recipient) (in some embodiments, the second recipient is preselected (e.g., designated by default) to receive information corresponding to the communication between the user and the first recipient and will receive the information upon sending of the message unless one or more inputs are received to deselect the second recipient)); and a third user-interactive graphical element that, when selected, deselects the second recipient from receiving information corresponding to the communication without adding the second recipient as a participant in the conversation (e.g., a graphical element that is specific to the second recipient (e.g., a recipient-specific toggle) or a graphical object that deselects some or all currently selected recipients (e.g., a "don't notify" button that deselects some or all potential recipients other than the first recipient)). In some embodiments, the query does not include an indication of the identity of the second recipient (e.g., the query does not identify and/or selects by default any specific recipients and includes one or more options for identifying a selected a recipient). Displaying an indication that the second recipient is currently (e.g., already) selected as part of outputting the query provides the user with improved visual feedback as to current selection state of the second recipient and allows the user to enable delivery of the message to the second recipient, without requiring further input, which reduces the number of inputs needed to perform an operation.

In some embodiments, in response to detecting the sequence of one or more inputs and in accordance with a determination that the computer system detected one or more inputs corresponding to a request to allow the second recipient and the third recipient to receive information corresponding to the communication between the user and the first recipient: the computer system sends a message to the first recipient that includes respective information; and the computer system enables delivery of the message to the second recipient (e.g., 1102B1) and the third recipient (e.g., 1102B2) including at least a portion of the respective information.

In some embodiments, after enabling delivery of the message to the second recipient including at least a portion of the respective information (e.g., after the message has been sent to the second recipient) and in accordance with a determination that the conversation of the communication has been updated with additional information (e.g., 1116) (e.g., the user of the computer system and/or the first recipient has sent additional message(s) and/or updates on status (e.g., location)), the computer system enables delivery of a second message (e.g., 1118) to the second recipient (in some embodiments, while the second recipient remains a non-participant in the conversation of the communication), wherein the second message includes at least a portion of the additional information. Enabling deliver of a subsequent second message after enabling deliver of the message when a determination has been made that the conversation of the communication has been updated with additional information performs an operation when a set of conditions has been met without requiring further user input.

In some embodiments, after enabling delivery of the message to the second recipient (e.g., after the message has been sent to the second recipient) including at least a portion of the respective information (in some embodiments, and in accordance with a determination that the physical location of the computer system has changed), the computer system enables delivery of a third message (e.g., 1120) (e.g., a message separate from the message) to the second recipient that includes information corresponding to the location of the computer system (e.g., the location at the time the third message was enabled for delivery). In some embodiments, multiple, periodic messages (e.g., 1114C and 1120) are sent with information corresponding to the location of the computer system. In some embodiments, the messages are sent at regular intervals (e.g., every 30 minutes or other recurring period).

In some embodiments, enabling delivery of the message to the second recipient including at least the portion of the respective information occurs without the second recipient being enabled (e.g., enabled by the computer system and/or an external computer system (e.g., a message server) to participate (e.g., contribute information to the conversation of the communication; the second recipient is able to receive at least a portion of the information in the conversation but not send any information that is posted to the conversation) in the conversation of the communication (e.g., as seen in FIG. 11F, which lacks affordances for composing a reply).

In some embodiments, enabling delivery of the message to the second recipient including at least a portion of the respective information, includes: enabling (e.g., causing) (in some embodiments, sending (e.g., directly or via a server) the message in a format that is compatible with the messaging application of the external computer system) an external computer system associated with the second recipient to display the message to the second recipient including at least the portion of the respective information in a messaging application (e.g., the messaging application that generates 1114) (e.g., a text messaging application).

In some embodiments, the messaging application (e.g., the messaging application that generates 1114) of the external computer system associated with the second recipient displays the message to the second recipient including at least a portion of the respective information in a messaging conversation that is separate from a messaging conversation that includes one or more previous messages (e.g., previous messages that did not also include the first recipient; previous messages of a first type (e.g., non-emergency messages)) received from a user of the computer system (e.g., and that were sent to the second recipient) (e.g., as per FIGS. 11K and 11N). Displaying the message to the second recipient in a messaging conversation that is separate from another conversation that includes one or more previous messages provides the improved visual feedback about the message being different (e.g., different in that it is also sent to the first recipient) from the one or more previous messages.

In some embodiments, the messaging application (e.g., the messaging application that generates 1114) of the external computer system associated with the second recipient displays the message to the second recipient including at least a portion of the respective information in a messaging conversation that includes one or more previous messages received from a user of the computer system (e.g., the message is grouped, in the messaging application, with other messages from the user of the computer system) (e.g., as seen in FIGS. 11M and 11P). Displaying the message to the second recipient in the messaging conversation that also includes one or more previous messages provides the improved visual feedback about source of the message (e.g., that it is from the same sender as the one or more previous messages).

In some embodiments, the messaging application (e.g., the messaging application that generates 1114) of the external computer system associated with the second recipient, while displaying the messaging conversation that includes one or more previous messages received from a user of the computer system, displays a fourth selectable user-interactive graphical element that, when selected, initiates a process for displaying the message to the second recipient including at least a portion of the respective information in the messaging conversation (e.g., conversation in FIG. 11N) that is separate from the messaging conversation that includes one or more previous messages. In some embodiments, the message to the second recipient including at least a portion of the respective information can be accessed from the separate messaging conversation that includes one or more previous messages received from a user of the computer system without navigating back to a user interface of the messaging application that presents a plurality of messaging conversations. In some embodiments, the message to the second recipient including at least a portion of the respective information can be accessed while displaying the separate messaging conversation that includes one or more previous messages received from a user of the computer system by accessing an information panel associated with the user of the computer system. Displaying the fourth selectable user-interactive graphical element in the messaging conversation that includes the one or more previous messages provides improved visual feedback as to how to access the message and reduces the number of inputs needed to perform the operation of accessing the message, while viewing the previous messages. Displaying the message in an conversation user interface that does not include user-interactive graphical elements for composing a response provides improved visual feedback about the unavailability of a response functionality.

In some embodiments, the messaging application of the external computer system associated with the second recipient displays the message to the second recipient including at least a portion of the respective information in a conversation user interface (e.g., 1114) that does not include user-interactive graphical elements (e.g., does not include any user-interactive graphical elements for composing a response) for composing a response to the message to the second recipient including at least a portion of the respective information (e.g., the message is displayed in an interface that does not provide options/functions for responding to the message). Displaying the message in a conversation user interface that does not include user-interactive graphical elements for composing a response provides improved visual feedback about the unavailability of a response functionality.

In some embodiments, the conversation user interface (e.g., 1114) that does not include user-interactive graphical elements for composing a response to the message to the second recipient including at least a portion of the respective information includes an indication (e.g., 1114A, 1114D) (e.g., graphical or textual) that the message to the second recipient including at least a portion of the respective information is an emergency message. In some embodiments, the indication is displayed at a location of the conversation user interface at which the message application of the external computer system would display one or more user-interactive graphical elements for composing responses in a messaging conversation that is not an emergency conversation. Displaying an indication that the message is an emergency message provides the user with improved visual feedback as to the nature of the received message.

In some embodiments, the external computer system generates one or more notifications (e.g., 1110A) for the message to the second recipient including at least a portion of the respective information based on a first set of notification criteria and generates one or notifications for a respective message (e.g., a non-emergency message from the user of the computer system), different from the message to the second recipient including at least a portion of the respective information, based on a second set of notification criteria, different from the first set of notification criteria. In some embodiments, the first set of notification criteria is more permissive than the second set of notification criteria (e.g., notification(s) are generated while do-not-disturb and/or silent mode is set for the first, but not the second set). In some embodiments, the external computer system is configured to (e.g., includes computer-readable storage medium storing one or more programs including instructions for) receive a respective message while the external computer system is in a first state (e.g., a do-not-disturb state; a silent mode). In response to receiving the respective message while the external computer system is in a first state and in accordance with a determination that the message is a message of a first type (e.g., an emergency message), delivering a notification corresponding to the respective message. In response to receiving the respective message while the external computer system is in a first state and in accordance with a determination that the message is a message of a second type, different than the first type (e.g., a non-emergency message), forgoing delivering a notification corresponding to the respective message. Generating notifications for the message using a different set of notification criteria than those used to generate notifications for a different message performs the operation of notification generation for the two different messages using different sets of conditions, without requiring further user input, which performs an operation when a set of conditions has been met without requiring further user input and also provides different feedback, in the form of notifications, for the two different types of messages. Displaying an indication that the message is an emergency message provides the user with improved visual feedback as to the nature of the received message.

In some embodiments, the messaging application of the external computer system associated with the second recipient displays the message to the second recipient including at least a portion of the respective information in a second conversation user interface that includes a fifth user-selectable graphical element (e.g., 1114E) that, when selected, initiates a separate communication session (e.g., a separate text, telephonic, or video communication session; separate from the communication session by which the message was sent) with the user of the computer system. Including the fifth user-selectable graphical element when displaying the message provides additional control options without cluttering the UI with additional displayed controls.

In some embodiments, the external computer system associated with the second recipient provides an option (e.g., a user-selectable graphical element), that when enabled (e.g., when selected), prevents one or more update messages associated with the message to the second recipient including at least the portion of the respective information from being presented at the external computer system (in some embodiments, prevents the update messages from being received and/or sent from a messaging server).

In some embodiments, the communication with the first recipient is a communication about an emergency and preparing to initiate the communication with the first recipient includes: receiving (e.g., via one or more of the interfaces shown in FIGS. 6M-6S), via the one or more input devices, a set of information (e.g., information included in 1114B) that includes one or more details about the emergency (e.g., the nature of the emergency (e.g., medical, fire, police), detail(s) regarding the user, the location of the user/the computer system).

In some embodiments, the portion of the respective information that is included in the message to the second recipient includes at least a portion of the one or more details about the emergency (e.g., as seen in 1114B) (e.g., the nature of the emergency).

In some embodiments, preparing to initiate communication with the first recipient includes connecting to a non-terrestrial wireless communication network (e.g., a satellite communication network); and the message to the first recipient that includes respective information is sent via the non-terrestrial wireless communication network (e.g., as indicated by the text above 1114B). In some embodiments, enabling delivery of the message including respective information to the second recipient includes aligning the computer system for communication with one or more satellites; and wherein enabling delivery of the message including the respective information to the second recipient is via the one or more satellites. In some embodiments, in response to determining a terrestrial wireless network is not reachable (e.g., the computer system is unable to connect to a cellular network; and/or the computer system is not receiving a cellular signal with sufficient strength and/or consistency to send the message (e.g., to emergency services).

In some embodiments, after enabling delivery of the message to the second recipient including at least a portion of the respective information (in some embodiments, and in accordance with a determination the that second recipient has received the message), the computer system displays an indication (e.g., 1108B) that the second recipient is receiving the message to the second recipient including at least a portion of the respective information. Displaying an indication that the second recipient is receiving the message to the second recipient including at least a portion of the respective information provides improved visual feedback as to the second recipient having been enabled to receive the message.

In some embodiments, after enabling delivery of the message to the second recipient including at least a portion of the respective information, the computer system displays a fifth user-interactive graphical element (e.g., "STOP SHARING" in 1108B) (e.g., an option to stop sharing updates with the second recipient) that, when selected, configures the computer system to send one or more subsequent (e.g., future) messages to the first recipient that correspond to the conversation of the communication with the first recipient without enabling delivery (e.g., forgoing and/or preventing delivery) of the one or more subsequent messages to the second recipient. Displaying the fifth user-interactive graphical element provides the user with an option to discontinue or prevent performance of an operation (sending of subsequent messages to the second recipient) when a set of conditions are later met (subsequent messages are sent to the first recipient), which enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1200 are also applicable in an analogous manner to the methods described above and below. For example, method 700, 800, 1000, 1400, 1600, 1800, 2000, and/or 2200 optionally includes one or more of the characteristics of the various methods described above with reference to method 1200. For example, method 1200 can optionally be performed as part of a communication initiated via method 700 or 800. For example, method 1200 optionally includes providing an alignment element in accordance with method 1000. For example, the ability to manage recipients of messages as described in method 1200 can be simulated in the alternative communication network test mode in method 2000. For example, method 1200 can be the process corresponding to the user interface object in method 2200. For brevity, these details are not repeated below.

FIGS. 13A-13AA illustrate exemplary user interfaces for transmitting updated location information, in accordance with some embodiments. The user interfaces in these figures are used to illustrate the processes described below, including the processes in FIG. 14.

FIG. 13A illustrates computer system 1300A, which includes display 1302A (e.g., a touch-sensitive display). In some embodiments, computer system 1300A is a smartphone, a smartwatch, a desktop computer, a laptop, computer, or a tablet computer. In some embodiments, computer system 1300A is device 100, device 300, or device 500.

In some embodiments, any of the inputs described herein (e.g., input 1310A, 1310B, 1310C, 1310D, 1310E, 1310F, 1310G, 1310H, 1310I, 1310J, 1310K, and/or 1310L) is or includes a touch input (e.g., a tap gesture and/or a swipe gesture). In some embodiments, any of the inputs described herein (e.g., input 1310A, 1310B, 1310C, 1310D, 1310E, 1310F, 1310G, 1310H, 1310I, 1310J, 1310K, and/or 1310L) is or includes a voice input (e.g., a voice command to select a user interface element or to activate a feature or perform a function, such as a feature or function associated with a user interface element). In some embodiments, any of the inputs described herein (e.g., input 1310A, 1310B, 1310C, 1310D, 1310E, 1310F, 1310G, 1310H, 1310I, 1310J, 1310K, and/or 1310L) is or includes an air gesture (e.g., an air gesture to select a user interface element or to activate a feature or perform a function, such as a feature or function associated with a user interface element). In some embodiments, any of the inputs described herein (e.g., input 1310A, 1310B, 1310C, 1310D, 1310E, 1310F, 1310G, 1310H, 1310I, 1310J, 1310K, and/or 1310L) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

In FIG. 13A, computer system 1300A displays home screen 1304, which includes various icons that can be selected to open respective applications. Home screen 1304 includes icon 1306, which corresponds to a location-sharing application that provides user interfaces and settings that allow a user to share location information with other users and/or devices and to view location information of other users and/or devices.

In FIG. 13A, computer system 1300A detects input 1310A (e.g., a tap gesture or other selection input) selecting icon 1306. In response to detecting input 1310A, computer system 1300A displays People tab user interface 1308A of the location-sharing application corresponding to icon 1306, as shown in FIG. 13B. People tab user interface 1308A corresponds to a People tab 1318A in the location-sharing application, as indicated by element 1318A being emphasized (e.g., bolded) compared to, e.g., the Me tab 1320A. People tab user interface 1308A displays a map with pins indicating the location of users and/or devices. Pin 1312A indicates the location of computer system 1300A (also referred to as "Rachel's phone"), which is associated with a user named Rachel; pin 1314A indicates the location of user Jim (or a device associated with user Jim); and pin 1316A indicates the location of user John (or a device associated with user John). A user can be associated with a computer system by a user account of the user being logged into on computer system 1300A and/or an application (such as the location-sharing application) being logged into on computer system 1300A under the user account.

People tab user interface 1308A includes user information element 1322A and user information element 1324A. User information element 1322A is associated with user John and displays the city of John's location (e.g., San Francisco), the distance between John's location and Rachel's location (e.g., 15 miles), and when John's location information was last updated (e.g., Now). Similarly, user information element 1324A is associated with user Jim and displays the city of Jim's location (e.g., Little Town), the distance between Jim's location and Rachel's location (e.g., 9 miles), and when Jim's location information was last updated (e.g., Now).

Figure 13C:
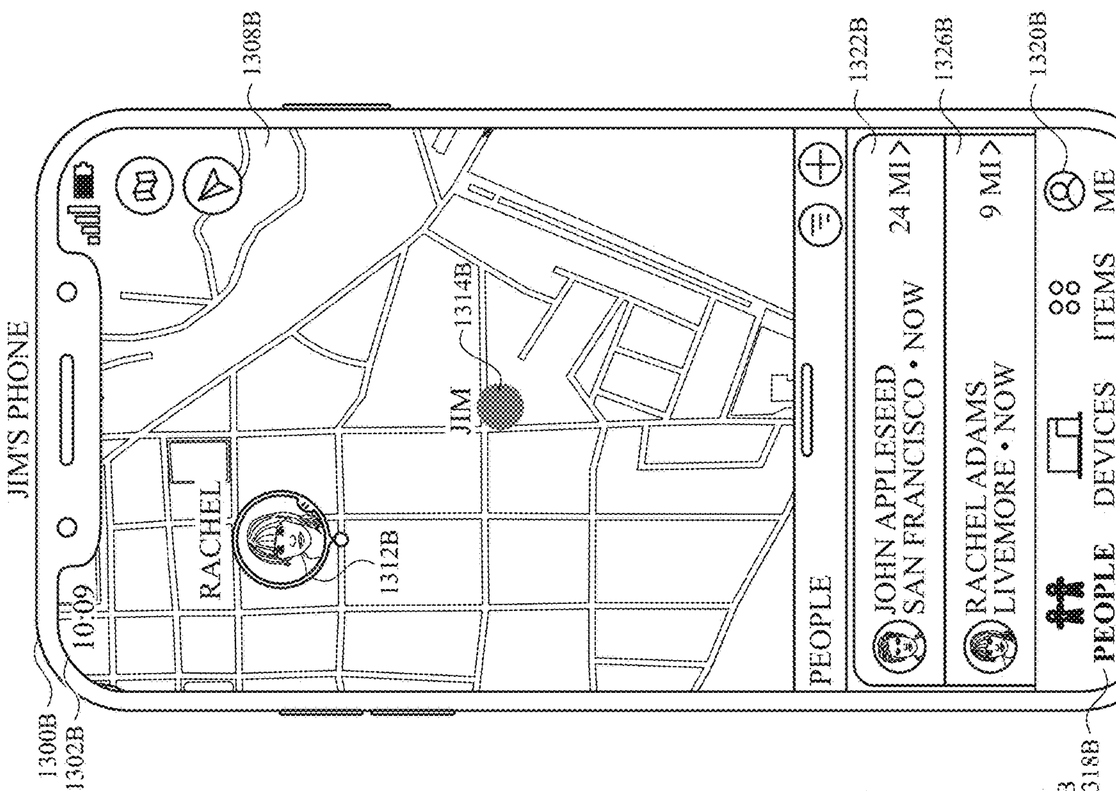
Figure 13B:
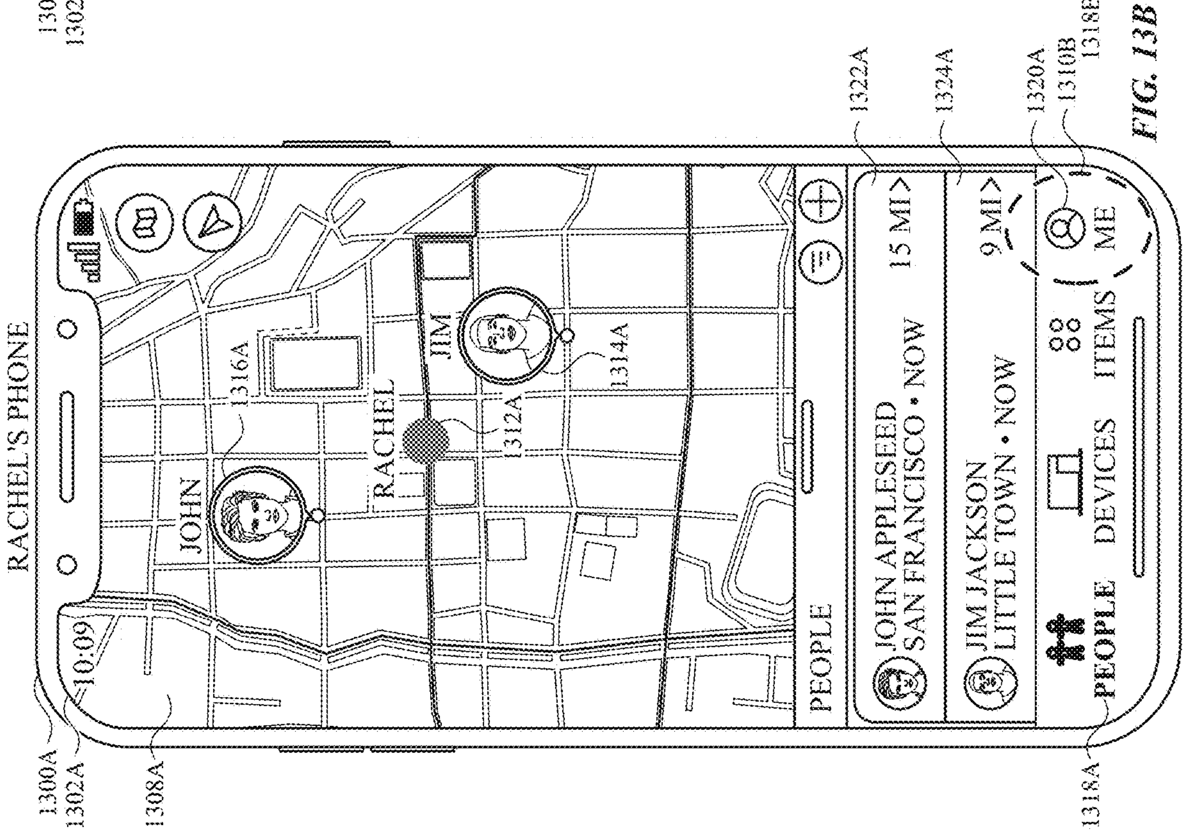

FIG. 13C illustrates computer system 1300B (also referred to as Jim's phone), which is associated with user Jim discussed above with reference to People tab user interface 1308A displayed on computer system 1300A. Computer system 1300B includes display 1302B (e.g., a touch-sensitive display). In some embodiments, computer system 1300A is a smartphone, a smartwatch, a desktop computer, a laptop, computer, or a tablet computer. In some embodiments, computer system 1300A is device 100, device 300, or device 500.

In FIG. 13C, computer system 1300B displays People tab user interface 1308B of a location-sharing application on computer system 1300B, as indicated by element 1318B being emphasized (e.g., bolded) compared to, e.g., the Me tab 1320B. In the illustrated embodiment, computer system 1300A and computer system 1300B are running the same location-sharing application. In some embodiments, computer system 1300A and computer system 1300B run different location-sharing applications. Accordingly, People tab user interface 1308B is analogous to People tab user interface 1308A, but from Jim's perspective. People tab user interface 1308B displays a map with pins indicating the location of users and/or devices. Pin 1312B indicates the location of computer system 1300A (Rachel's phone) and pin 1314B indicates the location of computer system 1300B (Jim's phone).

People tab user interface 1308B includes user information element 1322B and user information element 1326B. User information element 1322B is associated with user John and displays the city of John's location (e.g., San Francisco), the distance between John's location and Jim's location (e.g., 24 miles), and when John's location information was last updated (e.g., Now). Similarly, user information element 1326B is associated with user Rachel and displays the city of Rachel's location (e.g., Livermore), the distance between Rachel's location and Jim's location (e.g., 9 miles), and when Rachel's location information was last updated (e.g., Now).

Figure 13E:
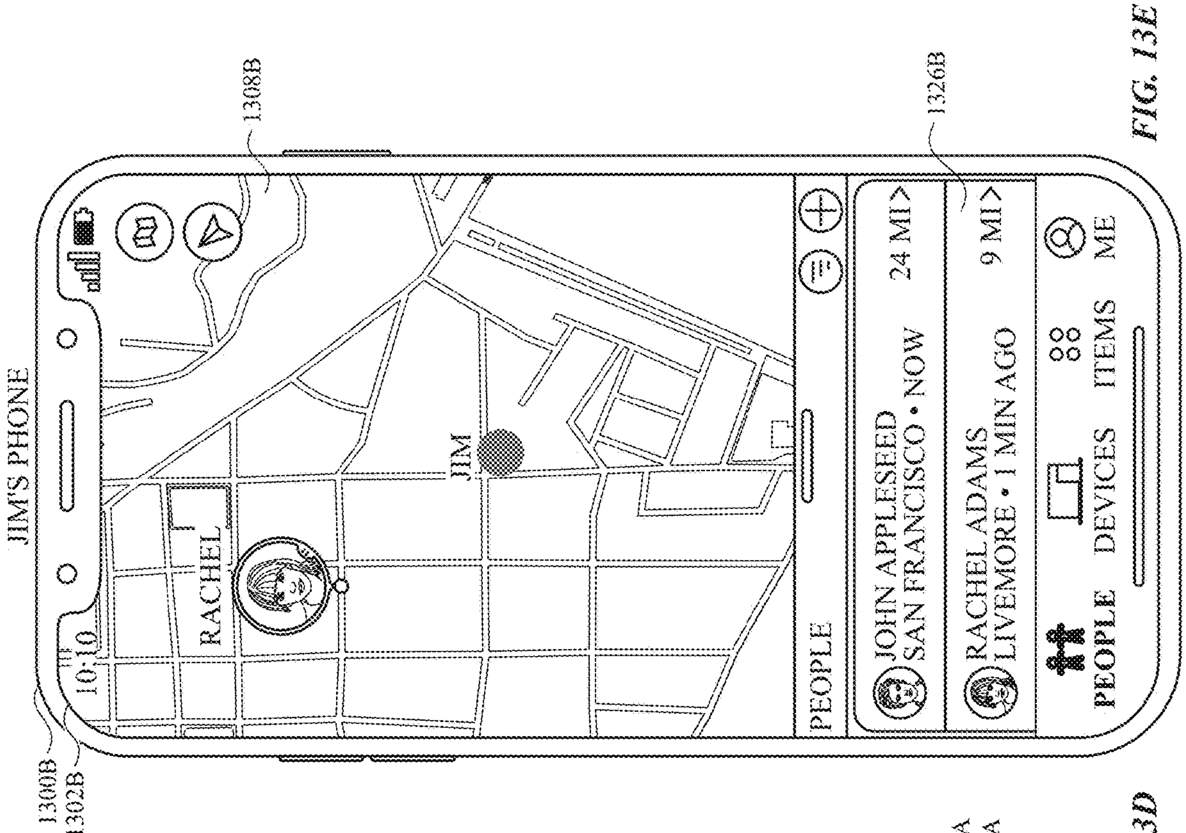
Figure 13D:
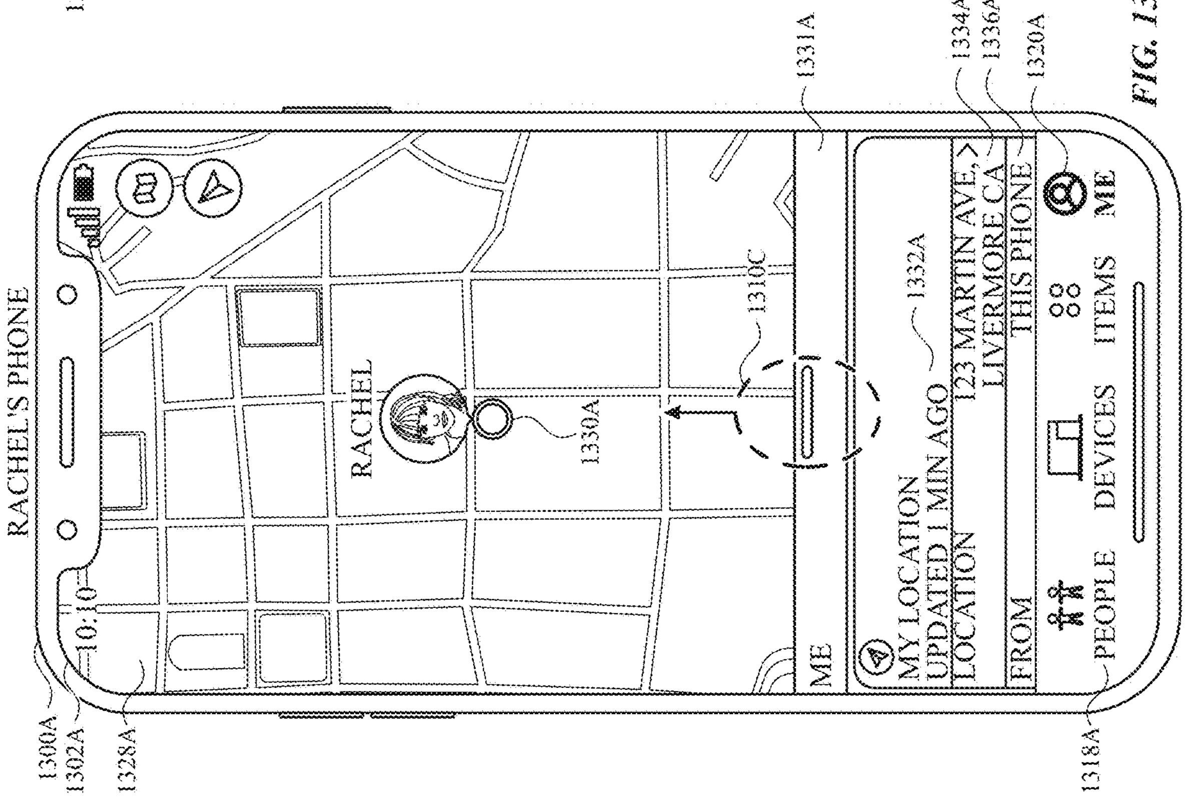

Returning to FIG. 13B, computer system 1300A detects input 1310B (e.g., a tap gesture or other selection input) on Me tab 1320A. In response to detects input 1310B (e.g., a tap gesture) on Me tab 1320A, computer system 1300A displays Me tab user interface 1328A of the location-sharing application, emphasizes Me tab 1320A, and deemphasizes People tab 1318A, as shown in FIG. 13D. Me tab user interface 1328A includes a map with pin 1330A, which represents the location of computer system 1300A, and user information element 1331A. User information element 1331A includes update indicator 1332A, location 1334A, and source indicator 1336A. Update indicator 1332A displays when (or how long ago) Rachel's location information was last updated (e.g., 1 minute ago). Location indicator 1336A displays Rachel's location (e.g., 123 Martin Ave., Livermore, CA). Source indicator displays the source of Rachel's location information, where "This Phone" indicates that computer system 1300A is the source of the location information for Rachel's location. In FIG. 13E, computer system 1300B maintains display of People tab user interface 1308B and user information element 1326B has been updated compared to FIG. 13C to reflect that Rachel's location was last updated 1 minute ago.

Figure 13G:
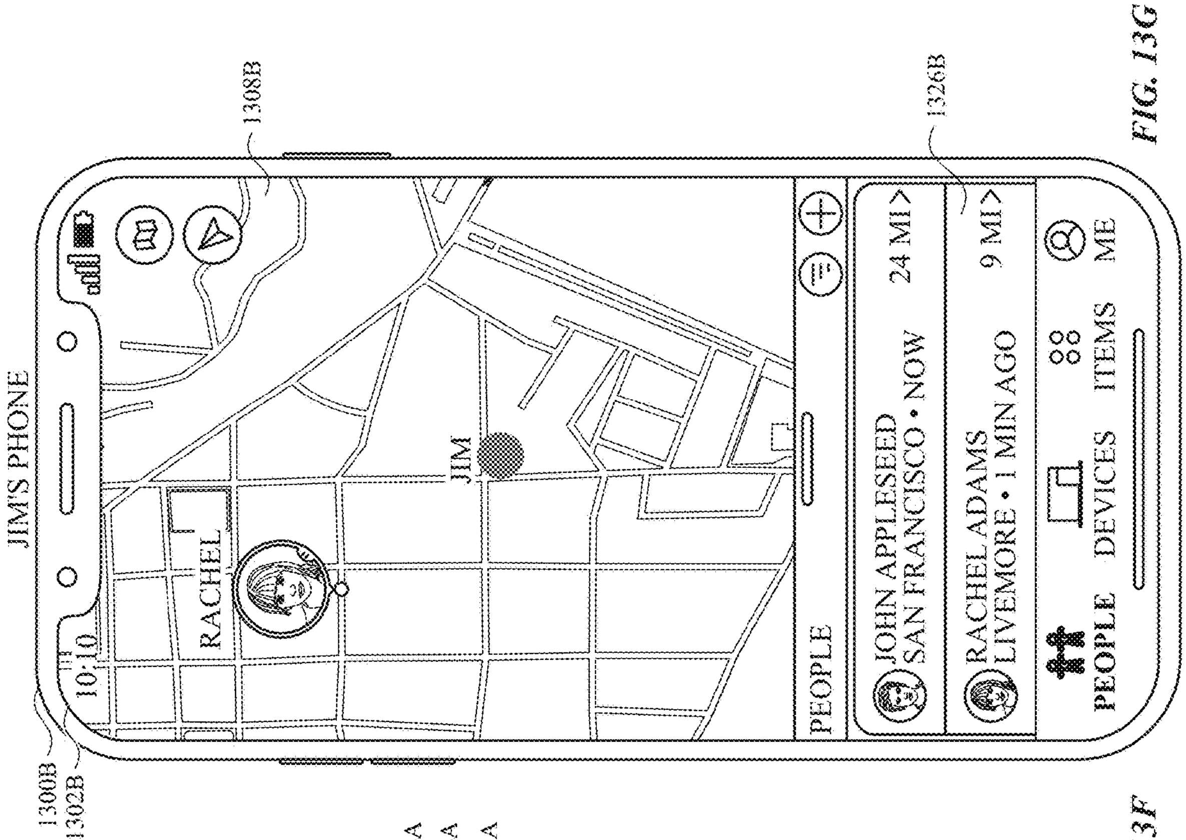
Figure 13F:
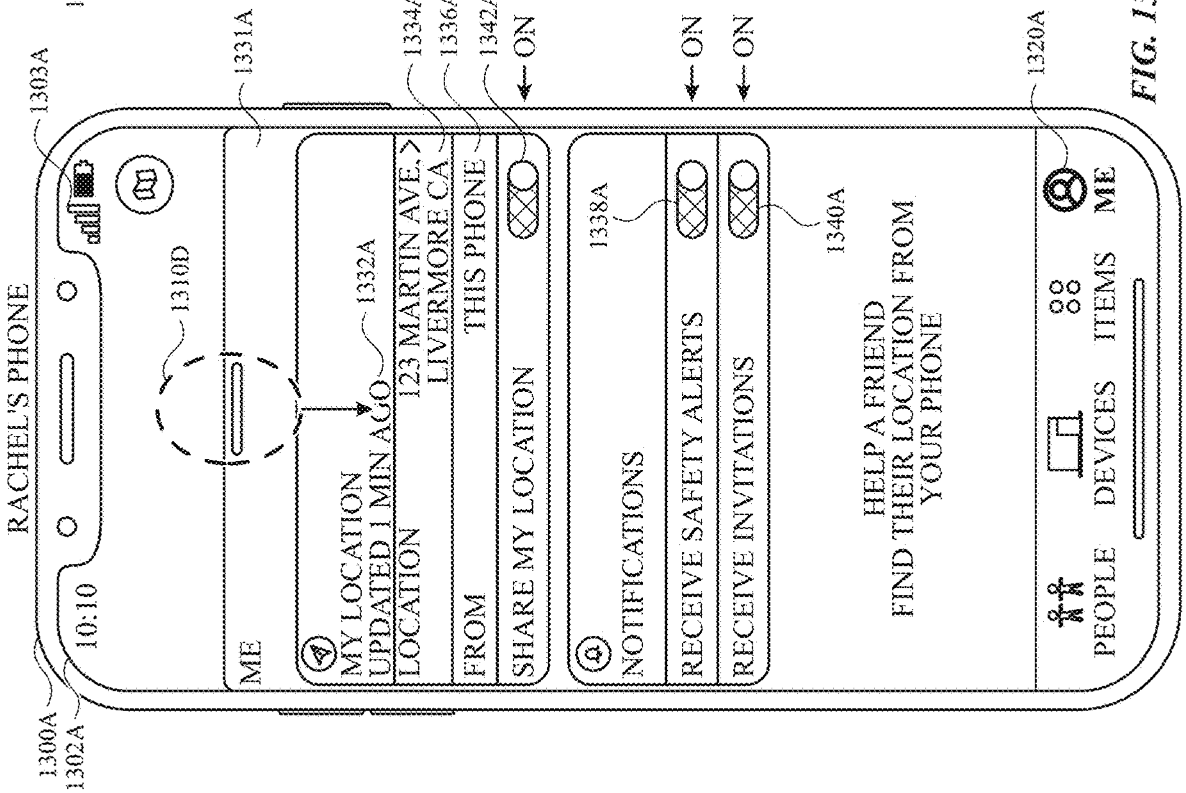

In FIG. 13D, computer system 1300A detects input 1310C (e.g., a tap gesture, an upward swipe gesture, or other selection input) on user information element 1331A (or on a designated portion, such as a pill and/or top portion, of user information element 1331A). As shown in FIG. 13F, in response to detecting input 1310C, computer system 1300A expands or scrolls display of user information element 1331A to display additional elements of user information element 1331A, including share my location option 1342A, safety alerts notifications option 1338A, and invitations notifications option 1340A. A user can select share my location option 1342A to enable and disable location sharing (e.g., by tapping or swiping share my location option 1342A). In FIG. 13F, share my location option 1342A indicates that computer system 1300A is sharing location (e.g., location sharing is enabled or ON). In response to detecting an input (e.g., a tap gesture, a swipe gesture, or other selection input) on share my location option 1342A when share my location option 1342A is ON, computer system 1300A turns off (e.g., disables) location sharing and sets share my location option 1342A to an OFF state. In response to detecting an input (e.g., a tap gesture, a swipe gesture or other selection input) on share my location option 1342A when share my location option 1342A is OFF, computer system 1300A turns on (e.g., enables) location sharing and sets share my location option 1342A to the ON state.

In some embodiments, when location sharing is enabled, computer system 1300A transmits updated location information automatically (e.g., without user input) when certain criteria is met. For example, when location sharing is enabled, computer system 1300A can transmit updated location information at predetermined intervals (e.g., 30 seconds, 1 minute, 2, minutes, 5 minutes, or 10 minutes) when computer system 1300A is connected to a terrestrial communication network (e.g., a wireless cellular communication and/or a Wi-Fi network). In FIGS. 13B-13H, network indicator 1303A indicates that computer system 1300A has cellular service (e.g., is connected to a cellular communication and/or can communicate via a cellular communication). Accordingly, computer system 1300A automatically transmits updated location information between time 10:10 in FIGS. 13D-13G (e.g., in which update indicator 1332A and user information element 1326B show that location was updated 1 minute ago) and time 10:11 in FIGS. 13H-13I (e.g., in which update indicator 1332A and user information element 1326B show that location was updated now). The updated location information transmitted by computer system 1300A is made available to other computer systems, such as computer system 1300B (Jim's phone), as indicated by user information element 1326B. In some embodiments, the updated location information transmitted by computer system 1300A is made available to other designated computer systems, such as computer systems of users identified as friends and/or family members.

Safety alerts notifications option 1338A allows a user to enable and disable notifications for safety alerts received by computer system 1300A, such that computer system 1300A outputs notifications for safety alerts when safety alerts notifications option 1338A is enabled (e.g., ON) and forgoes outputting notifications for safety alerts when safety alerts notifications option 1338A is disabled (e.g., OFF). Invitations notifications option 1340A allows a user to enable and disable notifications for invitations received by computer system 1300A, such as invitations by other users to receive updated location information from computer system 1300A and/or invitations for computer system 1300A to receive updated location information from other users. Computer system 1300A outputs notifications for invitations when invitations notifications option 1340A is enabled (e.g., ON) and forgoes outputting notifications for invitations when invitations notifications option 1340A is disabled (e.g., OFF). In FIG. 13G, user interface 1308B on computer system 1300B remains unchanged from FIG. 13E.

Figure 13I:
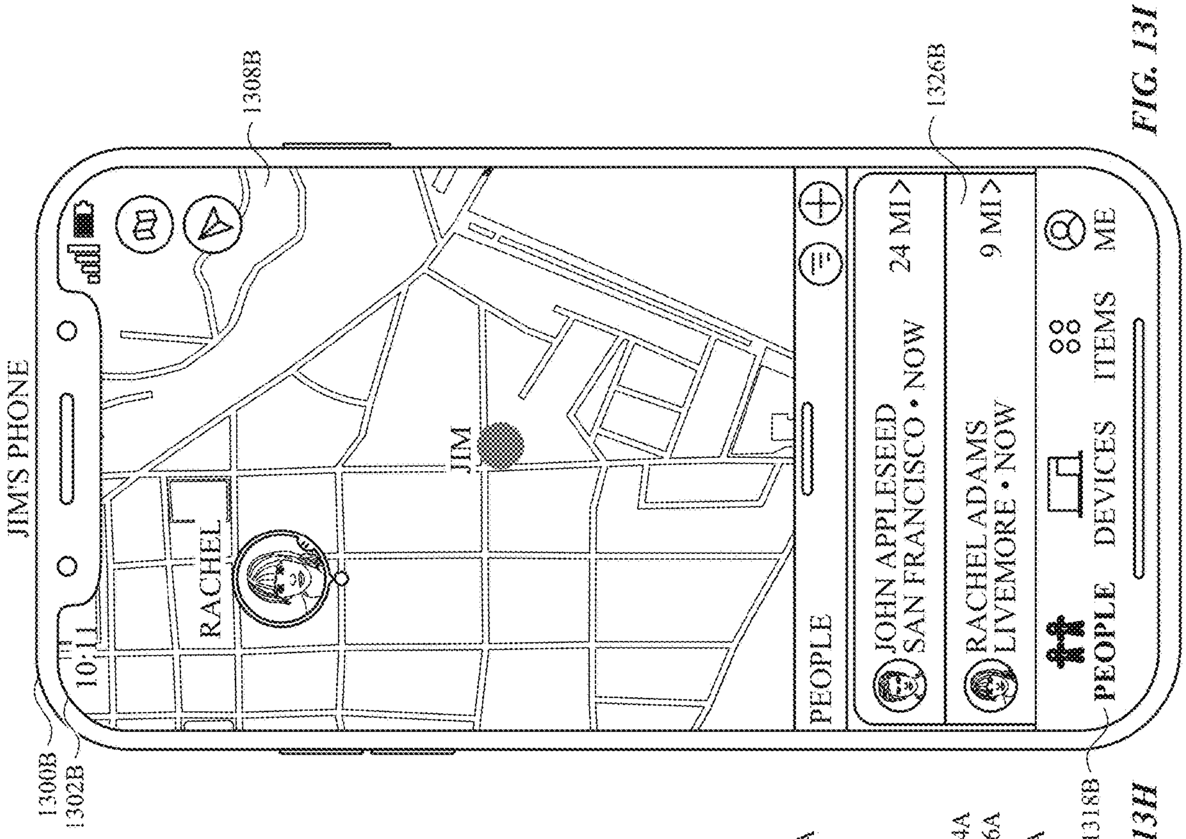
Figure 13H:
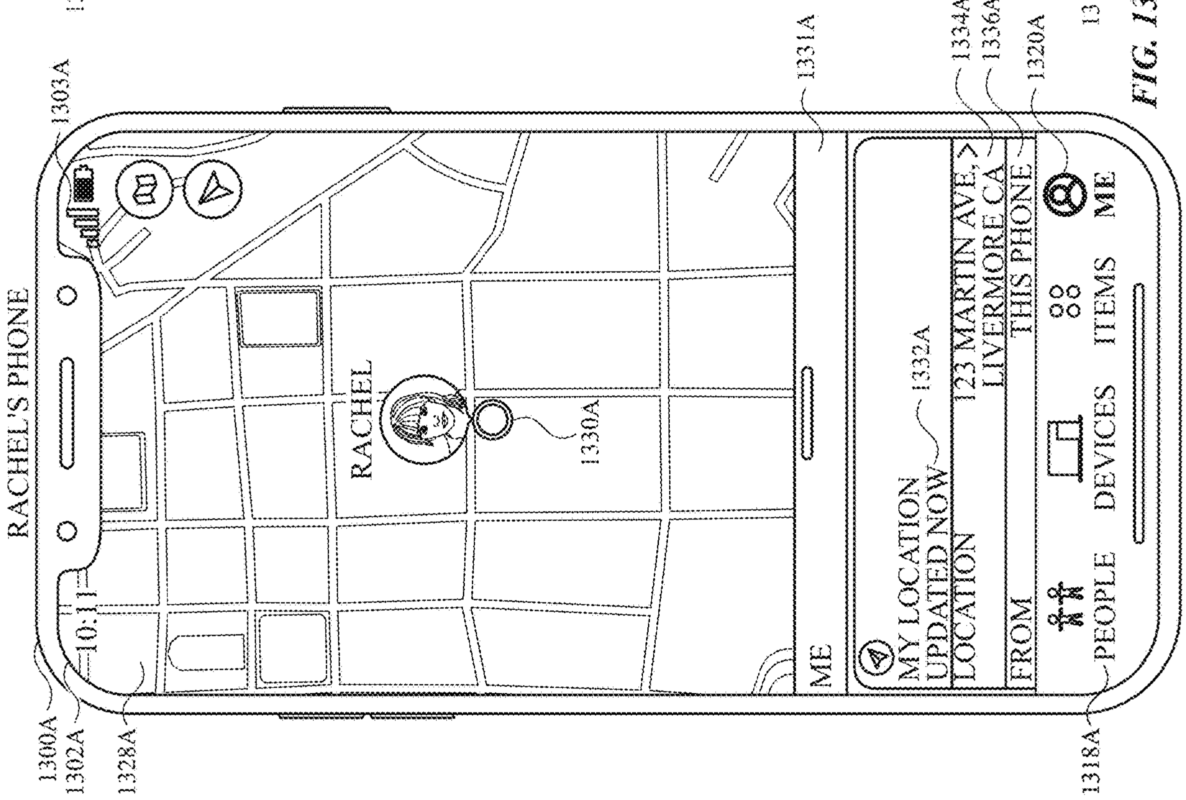

In FIG. 13F, computer system 1300A detects input 1310D (e.g., a tap gesture, a downward swipe gesture, or other selection input) on user information element 1331A (e.g., a designated portion, such as a pill and/or a top portion, of user information element 1331A). In response to detecting input 1310D, computer system 1300A reduces (e.g., minimizes) user information element 1331A, as shown in FIG. 13H (e.g., to the same state displayed in FIG. 13D). In FIG. 13I, user interface 1308B displayed on computer system 1300B remains unchanged from FIG. 13G.

Figure 13J:
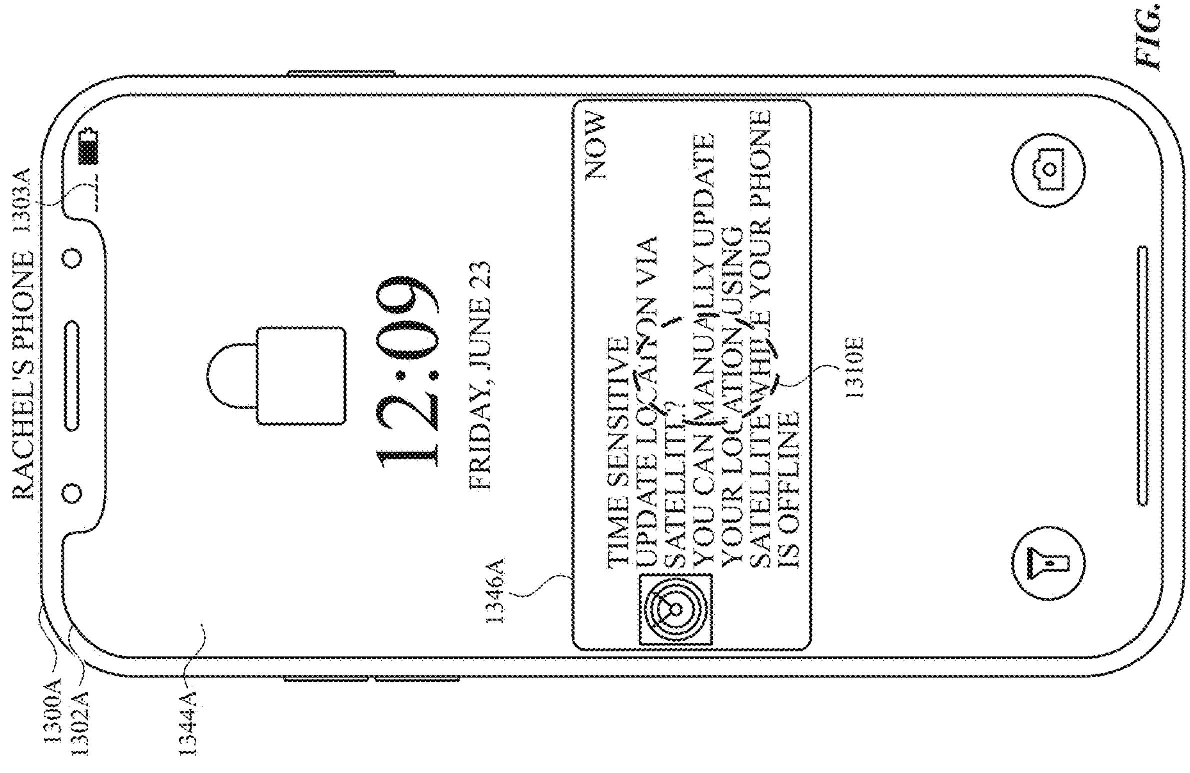

FIG. 13J illustrates computer system 1300A at a later time after about two hours has passed, compared to FIG. 13H. In FIG. 13J, computer system 1300A is in a locked state and displays lock screen 1344A. Location sharing is enabled on computer system 1300A, and network indicator 1303A indicates that a cellular communication network is unavailable to computer system 1300A (e.g., computer system 1300A does not have cellular service, a cellular communication network of a service provider associated with computer system 1300A is not available, and/or no cellular communication network from any service provider is available). Since location sharing is enabled, but a cellular communication network is not available, computer system 1300A displays manual update notification 1346A. In some embodiments, computer system 1300A displays manual update notification 1346A in accordance with a determination that a cellular communication network has not been available to computer system 1300A for a predetermined amount of time and/or that computer system 1300A has not transmitted updated location information for a predetermined amount of time (e.g., because a cellular communication network has not been available). In some embodiments, computer system 1300A activates display 1302A or transitions display 1302A from a low power state in order to display manual update notification 1346A. In some embodiments, when computer system 1300A is not in a locked state (e.g., computer system 1300A is displaying a home screen or a user interface of an application), computer system 1300A displays manual update notification as a pop-up and/or banner (e.g., at or near the top of display 1302A). Manual update notification 1346A includes text informing the user that it is possible to manually update the location of computer system 1300A in the location-sharing application via a satellite communication network while a cellular communication network is unavailable.

Figure 13K:
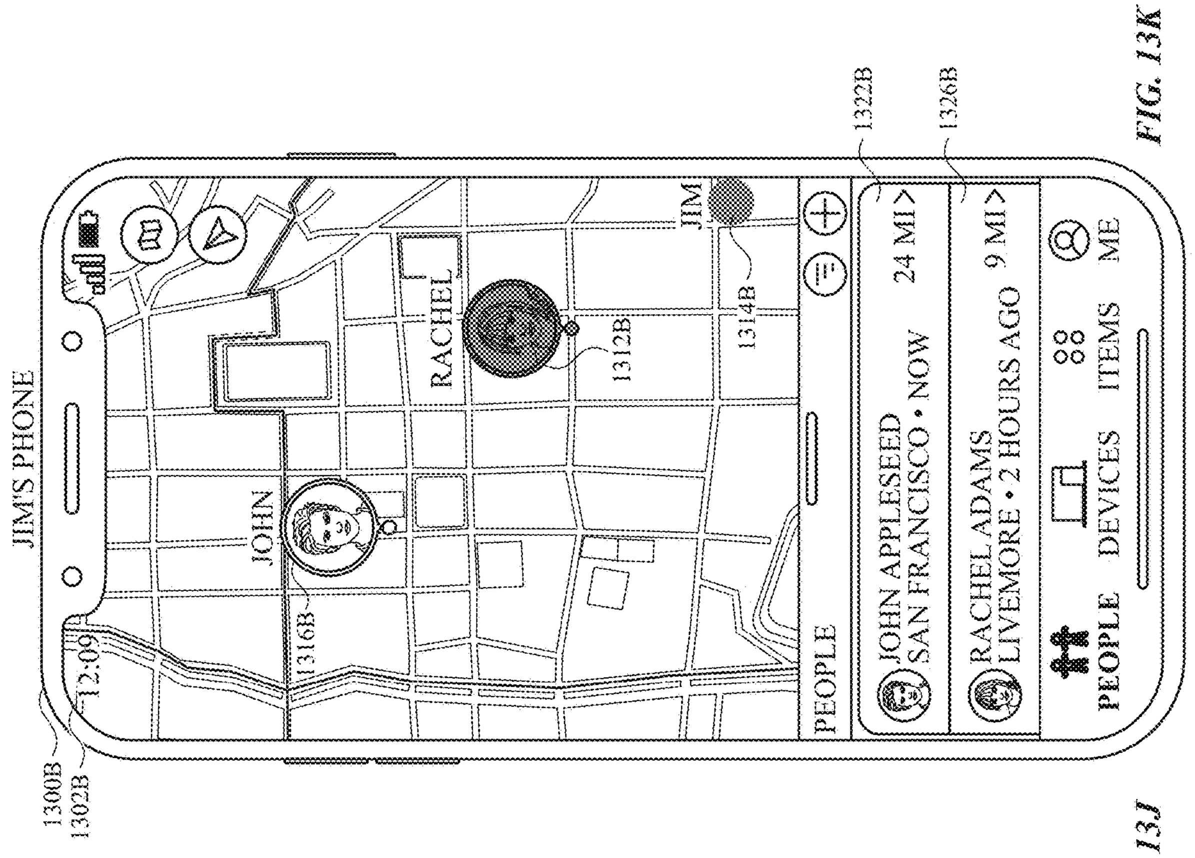

In FIG. 13K, pin 1316B in user interface 1308B displayed on computer system 1300B indicates updated location information for John, and pin 1312B in user interface 1308B displayed on computer system 1300B is visually distinguished (e.g., greyed out) to indicate that updated location information for Rachel has not been received for a predetermined amount of time (e.g., Rachel's location information is old or stale), and user information element 1326B indicates that Rachel's location information was last updated two hours ago.

Figure 13M:
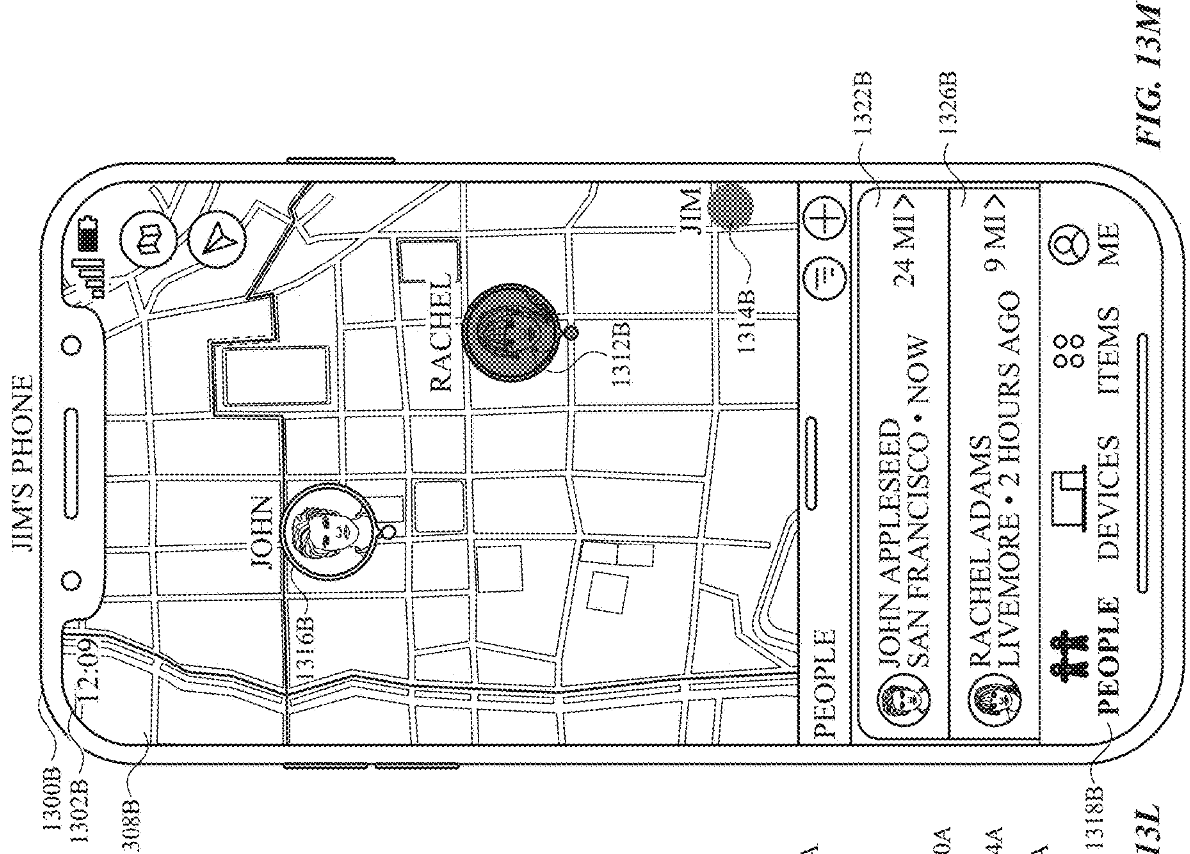
Figure 13L:
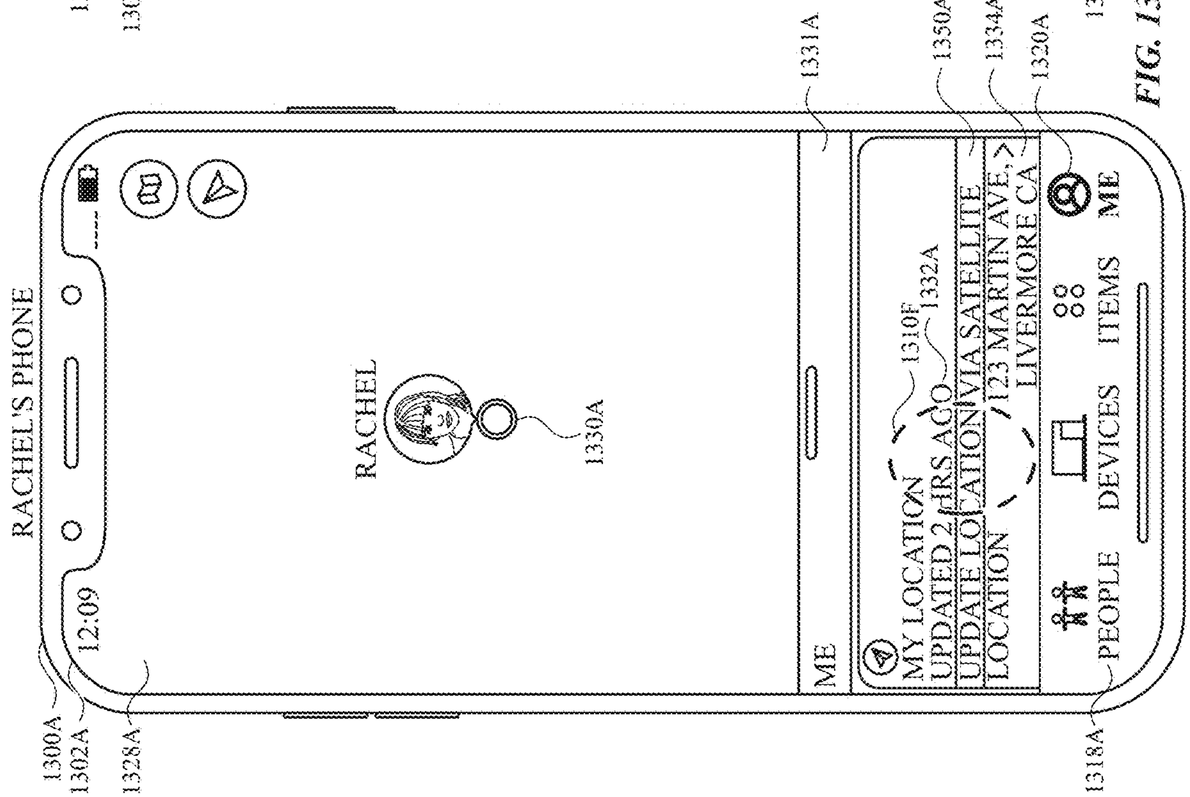

In FIG. 13K, computer system 1300A detects input 1310E (e.g., a tap gesture, a swipe gesture, or other selection input) on manual update notification 1346A. In response to detecting input 1310E, computer system 1300A displays Me tab user interface 1328A, as shown in FIG. 13L. In some embodiments (e.g., when computer system 1300A is locked), computer system 1300A requires user authentication (e.g., entry of a passcode, facial identification, and/or fingerprint identification) in addition to input 1310E in order to unlock computer system 1300A and display Me tab user interface 1328A, as shown in FIG. 13L.

In FIG. 13L, because a cellular communication network has been unavailable for a predetermined amount of time, computer system 1300A displays manual update option 1350A. In some embodiments (e.g., as shown in FIG. 13D), computer system 1300A does not display manual update option 1350A when a cellular communication network is available (e.g., because sufficient bandwidth resources are available to transmit updated location automatically). In the embodiment illustrated in FIG. 13L, manual update option 1350A is displayed in Me tab user interface 1328A of the location-sharing application in user information element 1331A. Me tab user interface 1328A of the location-sharing application does not include a map in FIG. 13L because a cellular communication network is not available or has been unavailable for a predetermined amount of time (e.g., to preserve bandwidth). In FIG. 13M, People tab user interface 1308B displayed on computer system 1300B is unchanged from FIG. 13K.

In FIG. 13L, computer system 1300A detects input 1310F (e.g., a tap gesture, a swipe gesture, or other selection input) on manual update option 1350A. In response to detecting input 1310F, computer system 1300A initiates a process for transmitting updated location information via a satellite communication network. In some embodiments, if computer system 1300A is properly aligned for communication with a satellite when manual update option 1350A is selected, computer system automatically (e.g., without further user input) transmits updated location information via a satellite communication network. In some embodiments, while computer system 1300A is transmitting updated location information, computer system 1300A displays a notification (e.g., alignment assistant element 1352A shown in FIG. 13P or banner 926 described in FIGS. 9K-9N1) that indicates that computer system 1300A is connected to a satellite communication network (e.g., 1352A1 in FIG. 13P), provides instructions to keep computer system 1300A pointed in the current direction (e.g., 1352A2 in FIG. 13P and/or a graphical alignment element 1352A3 in FIG. 13P), and/or provides an indication of the transmission status of the updated location information (e.g., 1352A4 in FIG. 13P).

In the embodiment illustrated in FIG. 13L, computer system 1300A is not properly aligned for communication with a satellite when manual update option 1350A is selected. Accordingly, in response to detecting input 1310F, computer system 1300A initiates a process for instructing the user to properly align computer system 1300A with a satellite. In some embodiments, in response to detecting input 1310F when computer system 1300A is not properly aligned for communication with a satellite, computer system 1300A initiates an alignment process and/or displays one or more alignment interfaces or elements, such as alignment interfaces 902C-902J and 902O-902P depicted and described in FIGS. 9C-9J and 9O-9P, banner 926 depicted and described in FIGS. 9K-9N1, and/or graphical element 931 depicted and described in FIGS. 9K-9N1.

Figure 13O:
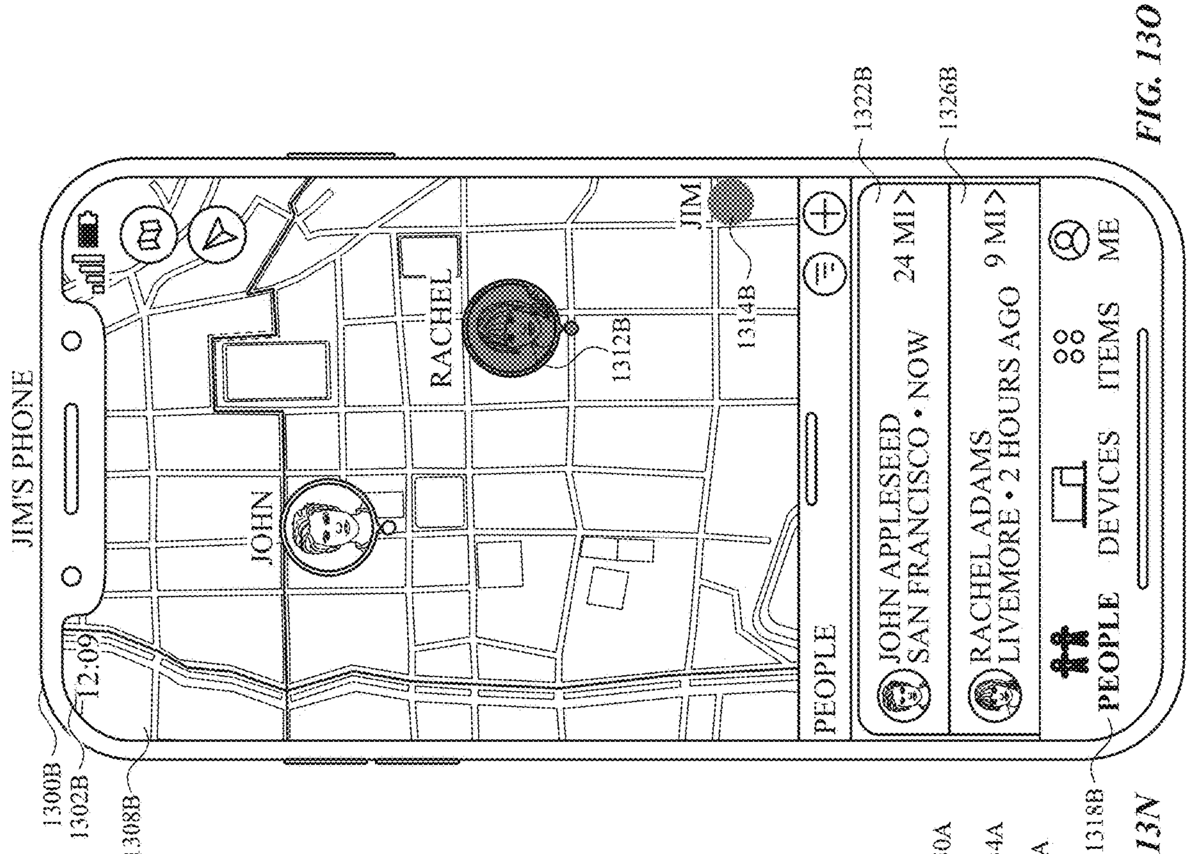
Figure 13N:
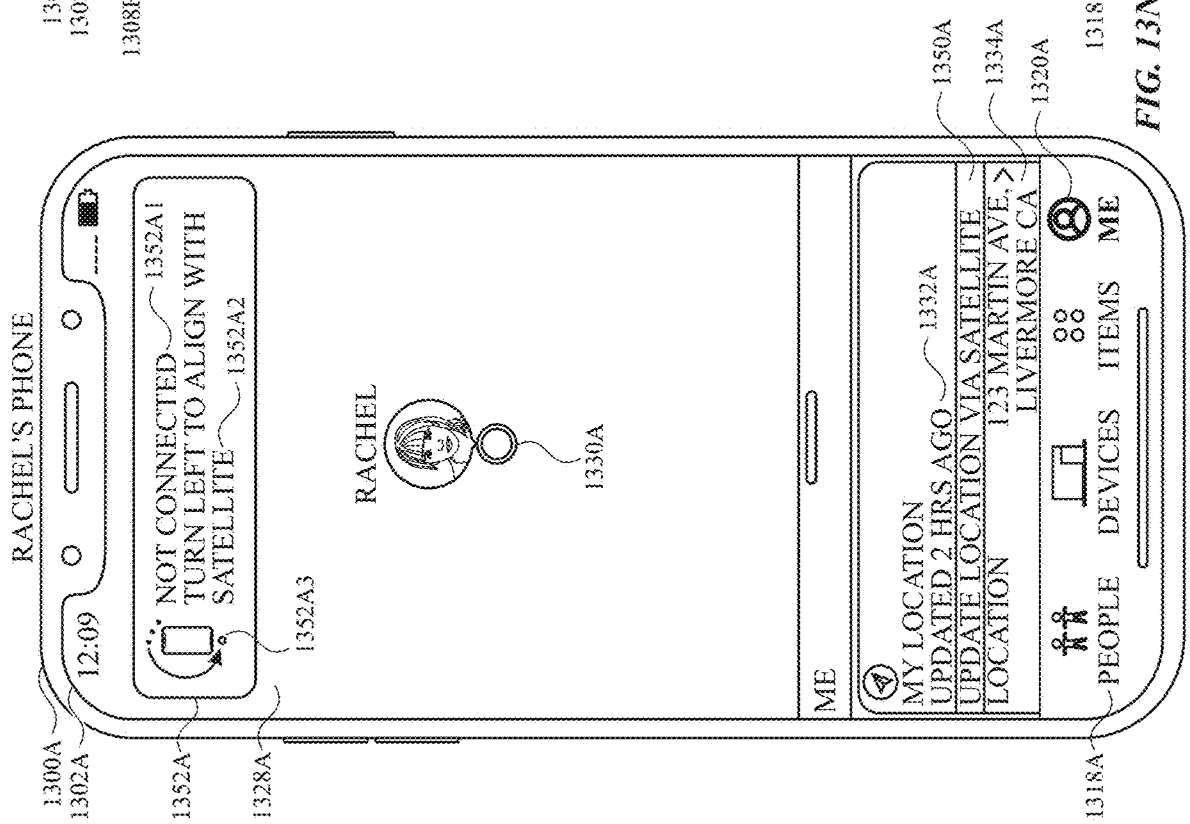

In FIG. 13N, in response to detecting input 1310F when computer system 1300A is not properly aligned for communication with a satellite, computer system 1300A displays alignment assistant element 1352A, which includes connection status indicator 1352A1 (e.g., NOT CONNECTED), textual alignment instructions 1352A2 (e.g., TURN LEFT TO ALIGN WITH SATELLITE), and graphical alignment element 1352A3 (e.g., which includes a curved arrow pointing in the counter-clockwise direction). In some embodiments, alignment assistant element 1352A is (or operates in the same manner as) banner 926 described in FIGS. 9K-9N1. In some embodiments, graphical alignment element 1352A3 is (or operates in the same manner as) graphical element 931 described in FIGS. 9K-9N1. In FIG. 13O, People tab user interface 1308B displayed on computer system 1300B is unchanged from FIG. 13M.

Figure 13Q:
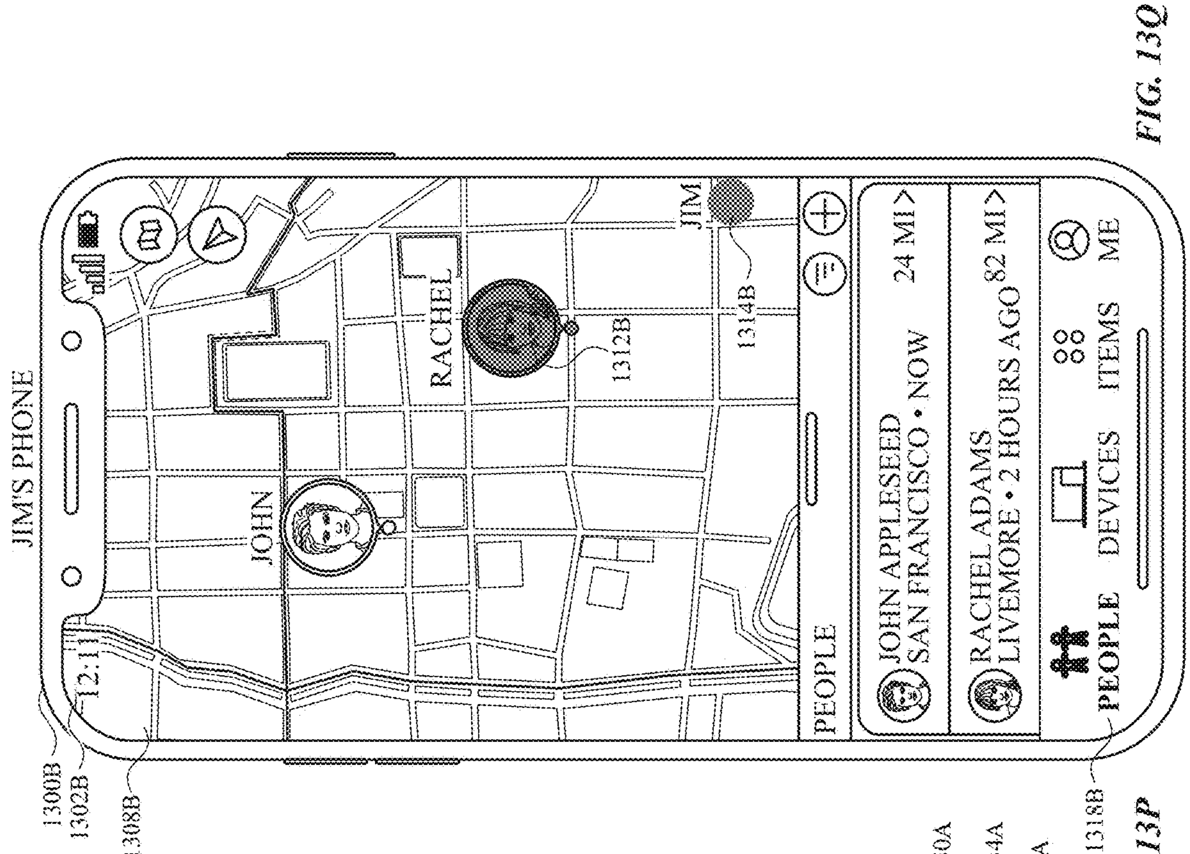
Figure 13P:
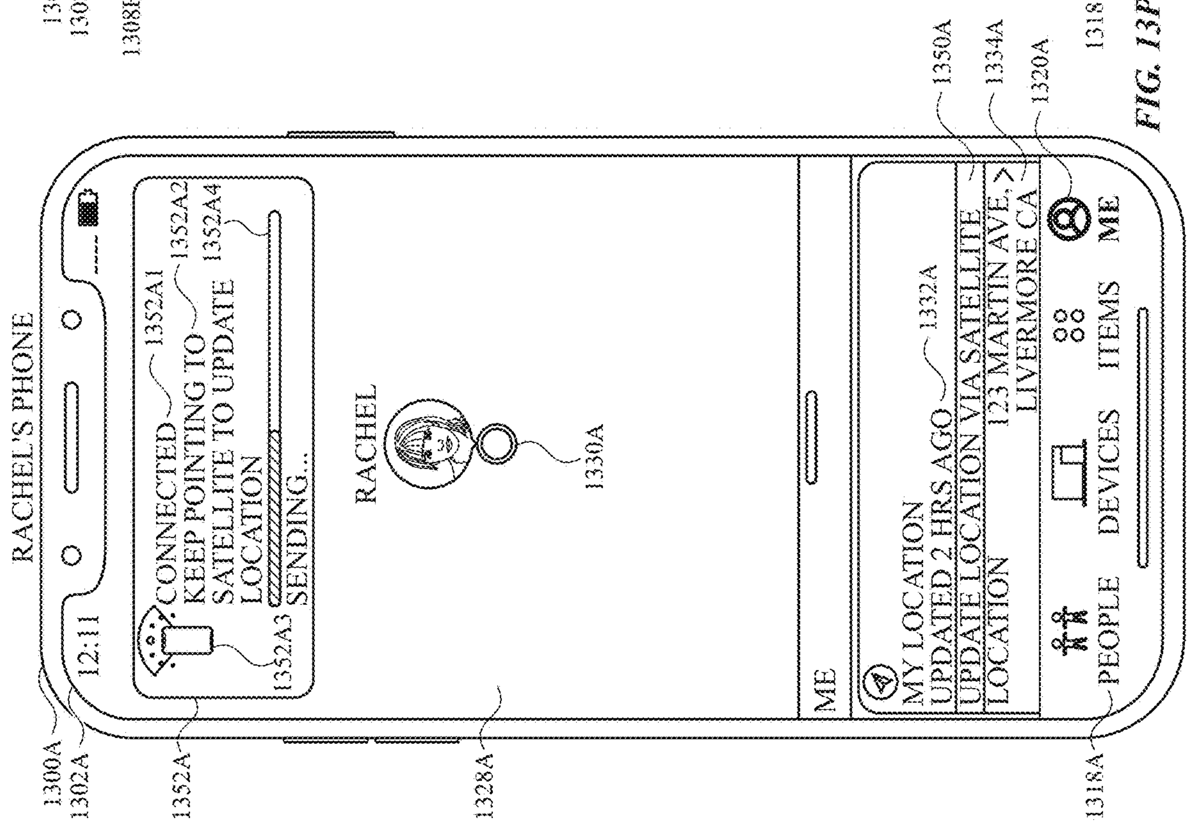

FIG. 13P illustrates that computer system 1300A has been properly aligned for communication with a satellite (e.g., after being turned left relative to the position of computer system 1300A in FIG. 13N). Because computer system 1300A is properly aligned for communication with a satellite, computer system 1300A displays (or updates display of) alignment assistant element 1352A based on the current connection and transmission status of the updated location information. In particular, connection status indicator 1352A1 indicates that the status is connected; textual alignment instructions 1352A2 instruct the user to keep pointing to the satellite to update location (e.g., keep pointing in the current direction and/or do not move computer system 1300A); graphical alignment element 1352A3 displays a graphic indicating that computer system 1300A is within a range of a satellite (e.g., represented by a fan-shaped element); and transmission status indicator 1352A4 includes a status bar (e.g., which is filled to represent the percentage of the transmission that is complete) and text indicating that computer system 1300A is in the process of sending the updated location information. In FIG. 13Q, People tab user interface 1308B displayed on computer system 1300B is unchanged from FIG. 13O.

Figure 13S:
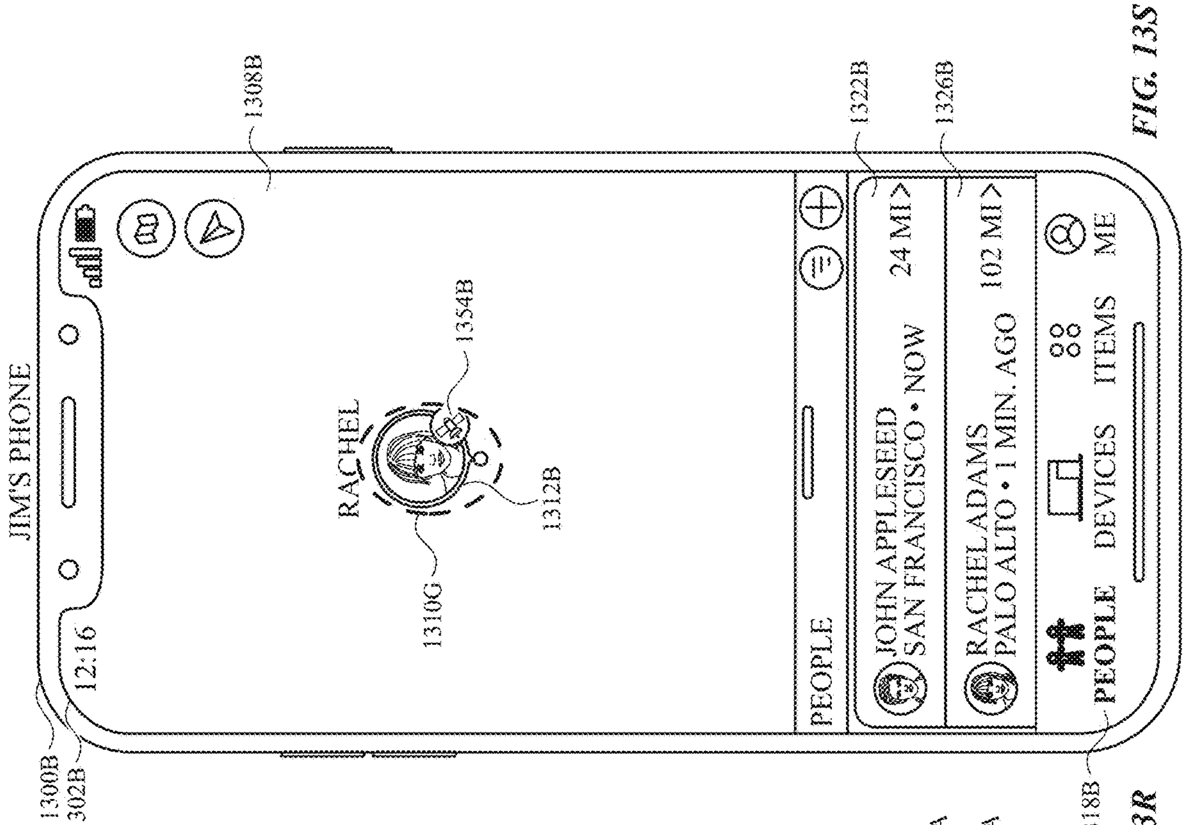
Figure 13R:
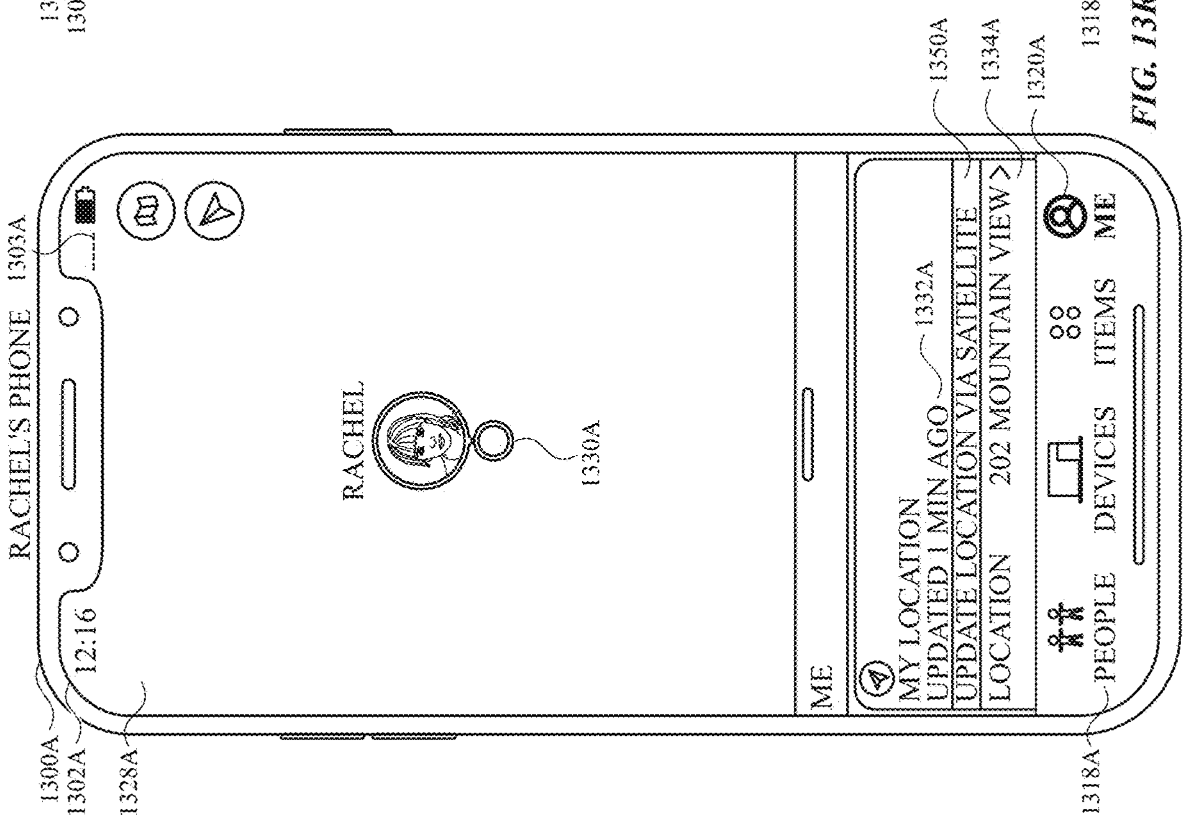

FIG. 13R illustrates computer system 1300A after transmitting the updated location information via a satellite communication network. After transmitting the updated location information via a satellite communication network (e.g., transmission of the updated location information via a satellite communication network is complete), computer system 1300A removes (e.g., ceases to display) alignment assistant element 1352A and displays (e.g., updates) update indicator 1332A and location 1334A based on the updated location information sent via a satellite communication network. Update indicator 1332A indicates that Rachel's location was updated one minute ago, and location 1334A indicates Rachel's latest location (e.g., 202 Mountain View).

FIG. 13S illustrates People tab user interface 1308B displayed on computer system 1300B after accessing (or receiving) the updated location information that computer system 1300A sent via a satellite communication network. Based on the updated location information, user information element 1326B corresponding to Rachel displays (or is updated to display) the updated location (e.g., Palo Alto), how long ago the location was updated (e.g., one minute ago), and the distance between Jim's location and Rachel's updated location (e.g., 102 miles). In FIG. 13S, computer system 1300A displays pin 1312B on the map in People tab user interface 1308B to reflect Rachel's updated location, and displays satellite indicator 1354B (e.g., on pin 1312B) to indicate that Rachel's location is based on updated location information sent via a satellite communication network.

In FIG. 13S, computer system 1300B detects input 1310G (e.g., a tap gesture or other selection input) selecting pin 1312B. In response to detecting input 1310G, computer system 1300B displays additional information associated with the user corresponding to the selected pin (e.g., Rachel), including user information element 1356B, satellite location notification 1358B, directions affordance 1360B, and contact affordance 1362B. In the embodiment illustrated in FIG. 13U, user information element 1356B, satellite location notification 1358B, directions affordance 1360B, and contact affordance 1362B replace user information element 1322B and user information element 1326B (e.g., computer system 1300B ceases display of user information element 1322B and user information element 1326B).

User information element 1356B includes satellite location element 1356B1, which describes that Rachel's location is based on a satellite location (e.g., updated location information transmitted via a satellite communication network and/or a location determined via one or more satellites), and location status element 1356B2, which indicates how long Rachel's location was updated (e.g., one minute ago). Satellite location notification 1358B includes a message indicating that Rachel's location is based a satellite location and that Rachel's location has not been updated (e.g., automatically) because Rachel does not currently have connection (e.g., cellular and/or terrestrial wireless communication). Direction affordance 1360B can be selected (e.g., via a tap gesture), and in response to detecting selection of direction affordance 1360B, computer system 1300B displays directions from Jim's location to Rachel's location. Contact affordance 1362B can be selected (e.g., via a tap gesture), and in response to detecting selection of contact affordance 1362B, computer system 1300B displays contact information associated with Rachel, such as, e.g., phone number(s), address(es), email address(es), and/or selectable options for contacting Rachel. In FIG. 13T, Me tab user interface 1328A displayed on computer system 1300A is unchanged from FIG. 13R.

Figure 13U:
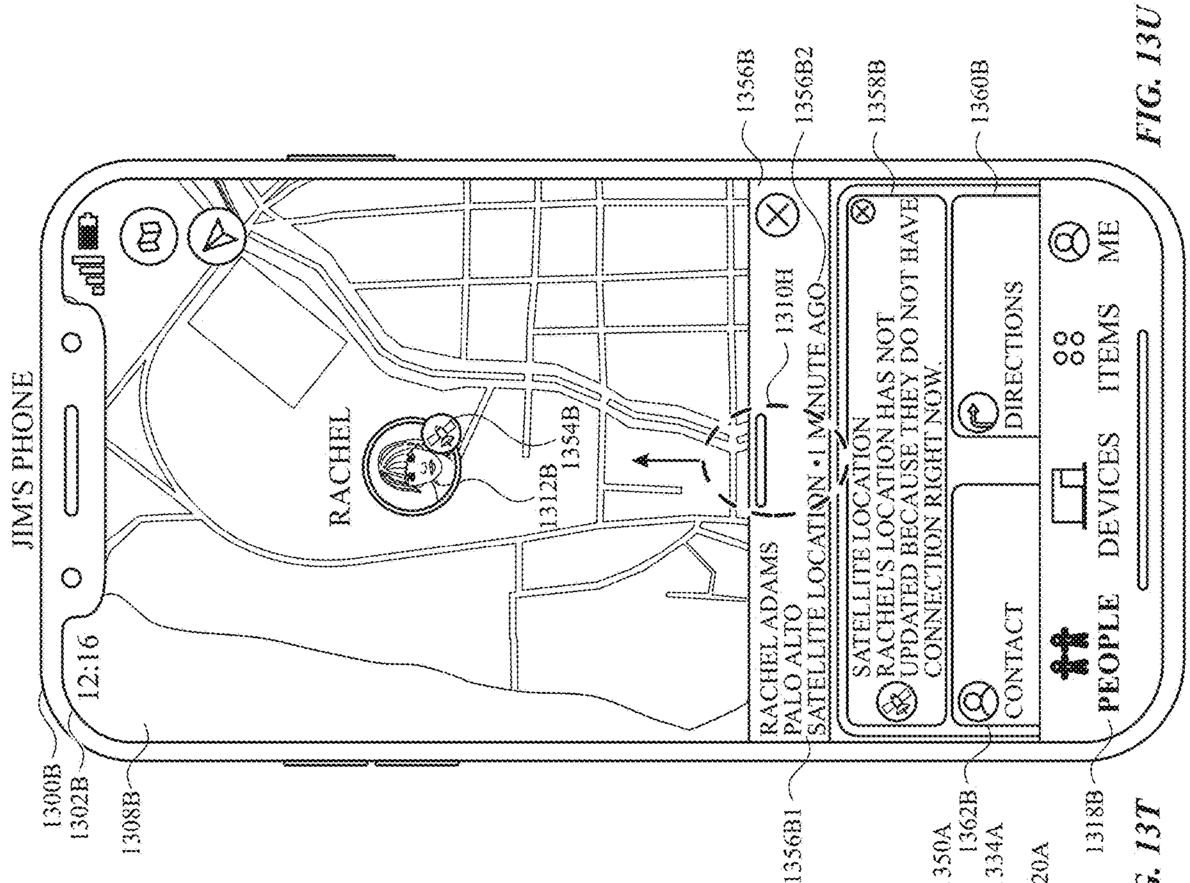
Figure 13T:
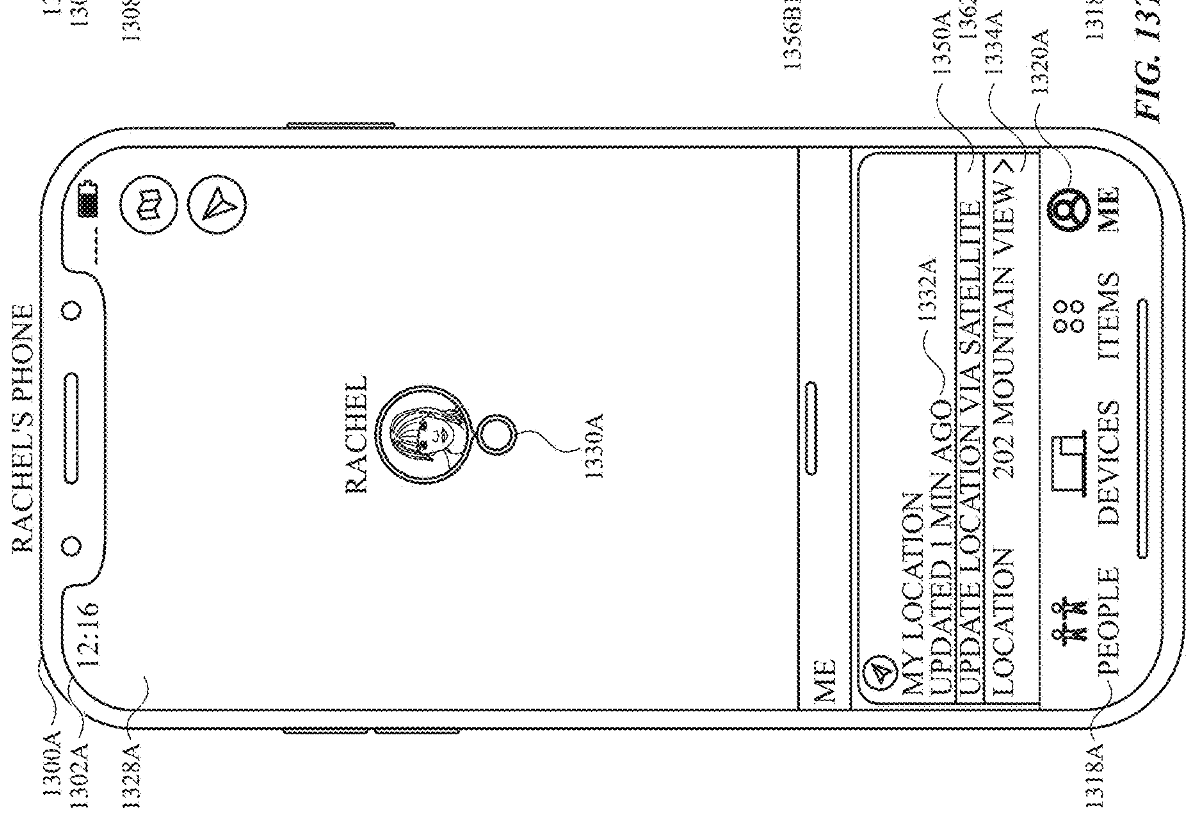
Figure 13W:
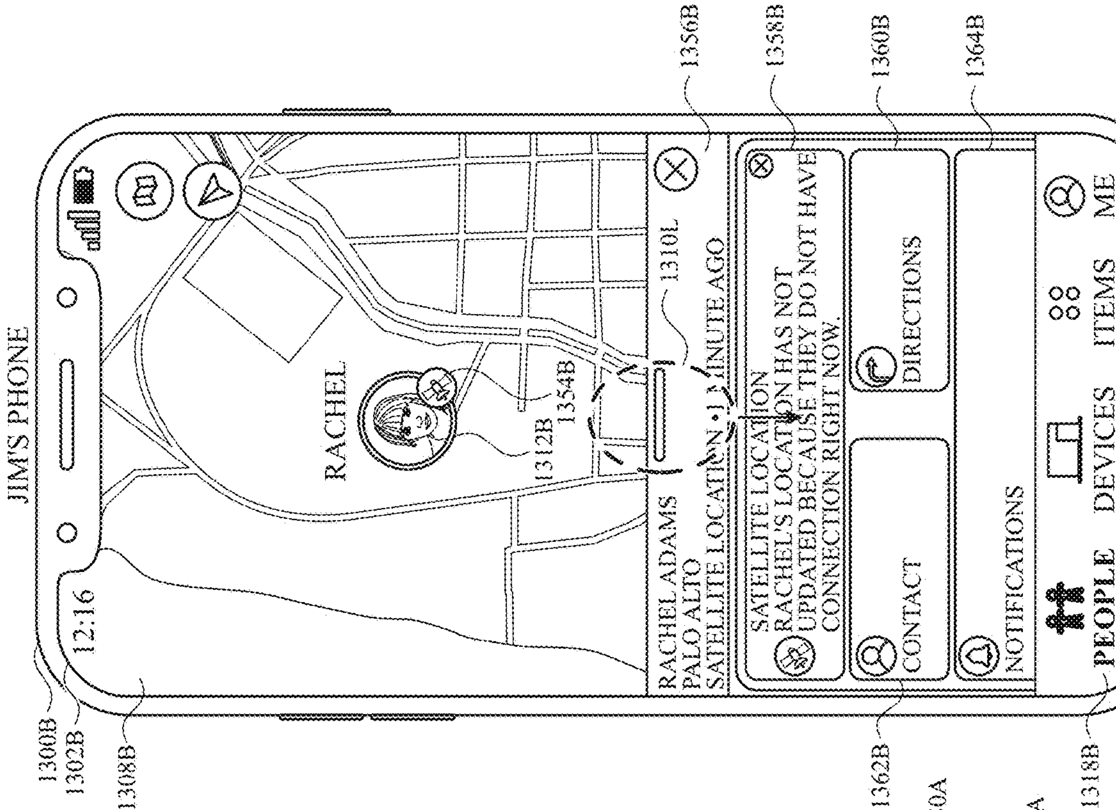

In FIG. 13U, computer system 1300B detects input 1310H (e.g., a tap gesture, an upward swipe gesture, or other selection input) on user information element 1356B (or a designated portion, such as a pill and/or top, of user information element 1356B). As shown in FIG. 13W, in response to detecting input 1310H, computer system 1300B displays additional information and/or options associated with Rachel, such as notifications affordance 1364B, which can be selected to display options for receiving notifications related to Rachel.

Figure 13V:
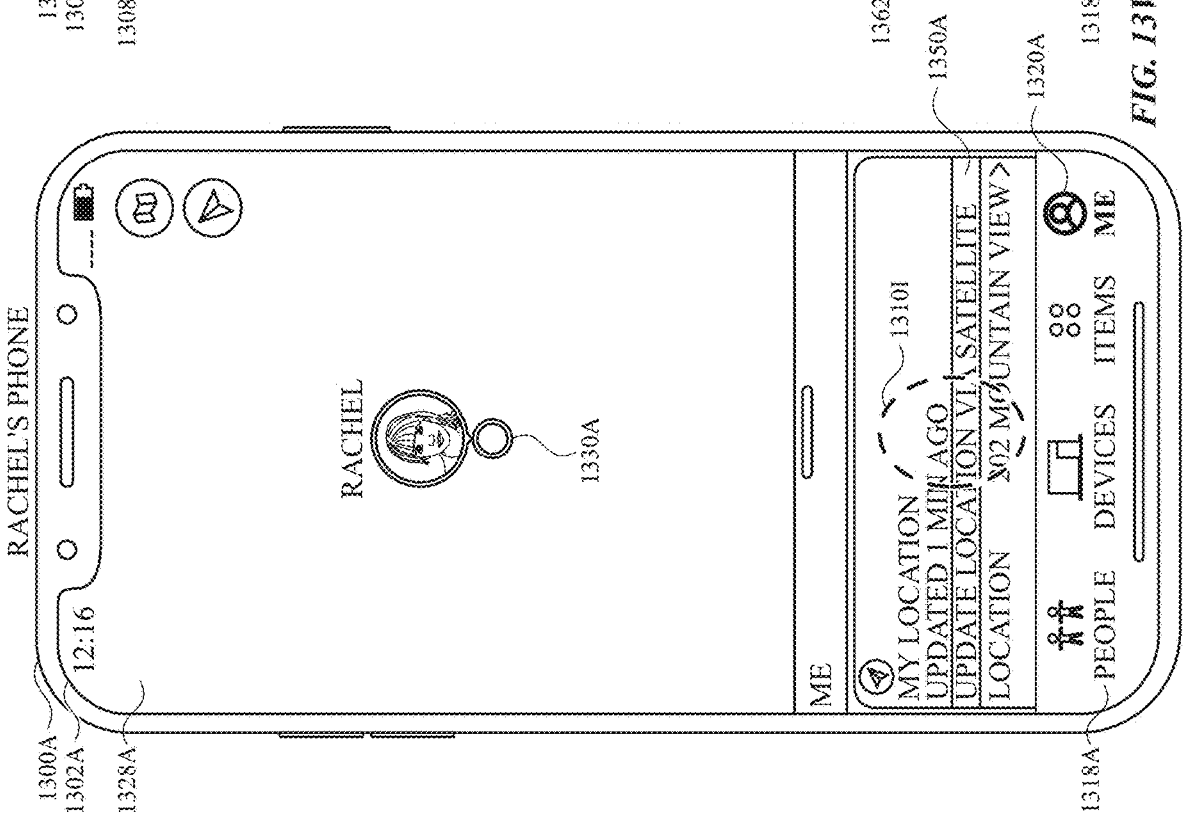

In FIG. 13V, computer system 1300A displays Me tab user interface 1328A unchanged from FIG. 13T and detects input 1310I (e.g., a tap gesture or other selection input) selecting manual update option 1350A. In some embodiments, computer system 1300A restricts whether location information can be updated manually via satellite, such as how often location information can be updated manually via satellite. In the embodiment illustrated in FIG. 13V, input 1310I is detected prior to a time threshold being satisfied (e.g., a predetermined amount of time has not passed since computer system 1300A transmitted updated location information via satellite). Because the time threshold has not been satisfied, in response to detecting input 1310I, computer system 1300A forgoes transmitting (or initiating a process to transmit) updated location information via satellite or providing assistance to connect with a satellite, and displays error notification 1366A and dismiss affordance 1368A (e.g., as part of or separately from error notification 1366A). Error notification 1366A notifies the user that computer system 1300A cannot update location because location was recently updated, and instructs the user to wait to try again. In response to detecting input 1310) (e.g., a tap gesture or other selection input) selecting dismiss affordance 1368A, computer system 1300A ceases display of error notification 1366A and dismiss affordance 1368A, as shown in FIG. 13Z Returning to FIG. 13W, computer system 1300B detects input 1310L (e.g., a tap gesture, a downward swipe gesture, or other selection input) on user information element 1356B (or a designated portion, such as a pill or top, of user information element 1356B). As shown in FIG. 13Y, in response to detecting input 1310L, computer system 1300B reduces the displayed amount of information and/or options associated with Rachel (e.g., computer system returns to the interface displayed in FIG. 13U).

Returning to FIG. 13X, computer system 1300A detects input 1310K (e.g., a tap gesture or other selection input) selecting People tab 1318A. In response to detecting input 1310K, computer system 1300A displays People tab user interface 1308A, as shown in FIG. 13Z. Because computer system 1300A does not have cellular service, as indicated by network indicator 1303A, People tab user interface 1308A does not include a map, unlike in FIG. 13B when cellular service is available. In FIG. 13AA, People tab user interface 1308B displayed on computer system 1300B is unchanged from FIG. 13Y.

FIG. 14 is a flow diagram illustrating a method for using a computer system in accordance with some embodiments. Method 1400 is performed at a computer system (e.g., 100, 300, 500, 600, 900, 1100, 1300A, 1300B, 1500A, 1500B, and/or 1500C) (e.g., a smartphone, a smartwatch, a laptop computer, a tablet computer, a desktop computer, or a head mounted device (e.g., a head mounted augmented reality and/or extended reality device)). In some embodiments, the computer system is in communication with a display generation component (e.g., a display controller, a touch-sensitive display system, and/or a head mounted display system) and/or one or more input devices (e.g., a touch-sensitive surface, a touchscreen, a button, a keyboard, a mouse, a rotatable crown, and/or a microphone). Some operations in method 1400 are, optionally, combined, the orders of some operations are, optionally, changed, and some operations are, optionally, omitted.

As described below, method 1400 provides an intuitive way for transmitting updated location information. The method reduces the cognitive burden on a user for transmitting updated location information, thereby creating a more efficient human-machine interface. For battery-operated computing devices, enabling a user to transmit updated location information faster and more efficiently conserves power and increases the time between battery charges.

While (1402) the computer system is in communication with a first communication network (e.g., a terrestrial communication network, a wireless terrestrial communication network, a cellular communication network, and/or a Wi-Fi network): the computer system determines (1404) that respective criteria (e.g., remote location update criteria) have been met. In some embodiments, the first communication network is a cellular network associated with the computer system (e.g., provided by the computer system's cellular service provider). In some embodiments, first communication network is a cellular network other than the cellular network associated with the computer system (e.g., provided by a different cellular service provider than the cellular service provider of the computer system). In some embodiments, the computer system is determined to be in communication with the first communication network when the computer system is receiving sufficient signal and/or consistency of connection to communicate via the first communication network. In some embodiments, the respective criteria are met: when a user of the computer system has previously approved receivers of location information; when a location-sharing mode is active to send location information; when a selectable location-sharing option is selected; when a predetermined amount of movement of the computer system has been detected; when a predetermined time threshold is satisfied since last updated location information was sent; and/or when another user or device has requested updated location information for the user.

While (1402) the computer system is in communication with a first communication network, in response to determining that the respective criteria have been met, the computer system automatically (e.g., at predetermined intervals or continually), without user input, transmits (1406) (e.g., via the first communication network) updated location information (e.g., longitude, latitude, elevation, and/or Global Positioning System ("GPS") coordinates) that indicates an updated location of the computer system (e.g., in FIG. 13F, 1332A indicates that Rachel's location was updated 1 min ago; in FIG. 13H, 1332A indicates that Rachel's location was updated now; between FIG. 13F (e.g., time 10:10) and FIG. 13H (e.g., time 10:11), while computer system 1300A is in communication with a cellular network (e.g., as indicated by cellular status indicator 1303A), computer system 1300A automatically transmits updated location information), wherein the updated location information is accessible to devices other than the computer system. In some embodiments, the computer system transmits updated location information to a location information server and/or to a remote device that the user has authorized to receive updated location information. In some embodiments, updated location information of the computer system is determined based on the terrestrial wireless communication network, the first communication network (e.g., using cell identification and/or satellite positioning information). In some embodiments, the computer system displays a selectable option to manually transmit updated location information of the computer system (e.g., a user can select the option to transmit updated location information before the computer system would automatically transmit updated location information) via the first communication network. In some embodiments, the location sharing mode remains active after transmitting updated location information.

After automatically transmitting updated location information one or more times when the respective criteria was met, the computer system detects (1408) that the first communication network is unavailable (e.g., cellular status indicator 1303A in FIG. 13J indicates that a cellular network is unavailable) (e.g., the computer system is not in communication with the terrestrial wireless communication network and/or the computer system is not receiving sufficient signal and/or consistency of connection to communicate via the terrestrial wireless communication network). In some embodiments, the computer system detects that the first communication network is unavailable after transmitting different updated location information at multiple different times. In some embodiments, in response to detecting that the first communication network is unavailable, the computer system provides the user with an indication that the first communication network is unavailable (e.g., changing a wireless connection status indicator to indicate that the first communication network is unavailable).

While (or, optionally, in response to or in accordance with a determination that) the first communication network is unavailable (e.g., cellular status indicator 1303A in FIG. 13J indicates that a cellular network is unavailable), the computer system is capable of updating location information via a second communication network (e.g., a non-terrestrial wireless communication network, a satellite communication network, a communication protocol that does not require cellular service, and/or a low-bandwidth communication mode) (e.g., computer system 1300A is capable of updating location information via a satellite communication network), and the respective criteria have been met, the computer system forgoes (1410) automatically transmitting updated location information (e.g., in FIG. 13J, computer system 1300A forgoes automatically transmitting updated location information). In some embodiments, forgoing automatically transmitting updated location information includes displaying (e.g., via the display generation component) a selectable non-terrestrial communication option (e.g., an affordance, button, graphical element, graphical object, and/or icon) without updating location information via the second communication network, wherein selection (e.g., via the one or more input devices) of the selectable non-terrestrial communication option (e.g., a touch input on the selectable non-terrestrial communication option and/or a voice command to select the non-terrestrial communication option via the one or more input devices) initiates (e.g., transmits, sends, and/or attempts to send) updating location information via the second communication network. In some embodiments, the selectable non-terrestrial communication option is displayed on a location sharing user interface that includes a graphical indication (e.g., on a map) of a location of the computer system. In some embodiments, the location sharing mode is ended while the first communication network is unavailable, and the respective criteria have been met. Forgoing automatically transmitting updated location information while the first communication network is unavailable, the computer system is capable of updating location information via a second communication network, and the respective criteria have been met conserves computer resources when accurate location information may not be available and/or would require additional user input to transmit (e.g., would require inputs to align the computer system with a satellite network), which performs an operation when a set of conditions has been met without requiring further user input and reduces the number of inputs needed to perform an operation.

In some embodiments, while the first communication network is unavailable (e.g., as indicated by cellular status indicator 1303A in FIG. 13J): in accordance with (or in response to) a determination that a predetermined time period (e.g., 5 minutes, 10 minutes, 30 minutes, 1 hour, or 2 hours) since the first communication network was available (e.g., since the first communication network became unavailable to the computer system) has elapsed, the computer system displays a notification (e.g., 1346A in FIG. 13J) (e.g., a graphical element, a banner, a prompt, and/or text) that the computer system is capable of updating location information via the second communication network. In some embodiments, the predetermined time period is a period of time since the computer system was connected to (e.g., was last connected to, was in communication with, and/or had a connection that met connection criteria based on a strength, stability, and or consistency of a signal between the computer system and the first communication network) the first communication network. Conditionally displaying a notification that the computer system is capable of updating location information via the second communication network in accordance with a determination that a predetermined time period since the first communication network was available has elapsed indicates to the user that the first communication network is unavailable without notifying the user of brief interruptions in availability of the first communication network, which provides improved visual feedback and performs an operation when a set of conditions has been met without requiring further user input.

In some embodiments, the predetermined time period is a period of time since the first communication network was available while the computer system is enabled to communicate (e.g., capable of communicating) via the first communication network (e.g., while computer system 1300A is enabled to communication via a cellular communication network) (e.g., the computer system is not in an airplane mode or a mode in which cellular and/or Wi-Fi communication is turned off). Displaying the notification that the computer system is capable of updating location information via the second communication network based on a period of time while the computer system is enabled to communicate via the first communication network provides the notification under conditions in which the user would have expected the computer system to automatically transmit updated location information, which provides improved visual feedback and performs an operation when a set of conditions has been met without requiring further user input.

In some embodiments, the predetermined time period is a period of time since the first communication network was available while the computer system is enabled to make updated location information accessible to devices other than the computer system (e.g., share my location option 1342A is enabled) (e.g., enabled to automatically transmit updated location information; location sharing with one or more other users (or devices associated with users) is enabled, such as via a setting, either permanently or for a predetermined time). Displaying the notification that the computer system is capable of updating location information via the second communication network based on a period of time while the computer system is enabled to make updated location information accessible to devices other than the computer system provides the notification under conditions in which the user would have expected the computer system to automatically transmit updated location information, which provides improved visual feedback and performs an operation when a set of conditions has been met without requiring further user input.

In some embodiments, while the first communication network is unavailable: after (e.g., in accordance with or in response to a determination that) a first predetermined time period (e.g., a non-zero amount of time such as 5 minutes, 10 minutes, 30 minutes, 1 hour, or 2 hours) since the first communication network was available (e.g., since the first communication network became unavailable to the computer system) has elapsed, the computer system provides an option (e.g., 1350A) (e.g., a selectable option, a user-interactive graphical element, an affordance, an icon, and/or a button) to transmit updated location information of the computer system via the second communication network (e.g., without providing a notification that the option to transmit updated location information via the second communication network is available); and after (e.g., in accordance with or in response to a determination that) a second predetermined time period (e.g., 10 minutes, 30 minutes, 1 hour, 2 hours, or 5 hours) since the first communication network was available (e.g., since the first communication network became unavailable to the computer system) has elapsed, wherein the second predetermined time period is greater than the first predetermined time period, the computer system displays (e.g., over a system user interface such as a wake screen or home screen, or a currently open application user interface) a notification (e.g., 1346A) (e.g., a graphical element, a banner, a prompt, and/or text) that the option to transmit updated location information of the computer system via the second communication network is available (e.g., manual update option 1350A is available in Me tab user interface 1328A of the location-sharing application prior to displaying manual update notification 1346A). In some embodiments, the first predetermined time period is a period of time since the computer system was connected to (e.g., was last connected to, was in communication with, and/or had a connection that met connection criteria based on a strength, stability, and or consistency of a signal between the computer system and the first communication network) the first communication network. In some embodiments, the second predetermined time period is a period of time since the computer system was connected to (e.g., was last connected to, was in communication with, and/or had a connection that met connection criteria based on a strength, stability, and or consistency of a signal between the computer system and the first communication network) the first communication network. In some embodiments, the notification that the option to transmit updated location information of the computer system is a notification that is not displayed after the first predetermined time period has elapsed. In some embodiments, the option to transmit updated location information of the computer system via the second communication network is provided (e.g., displayed) in a user interface of a location sharing application. In some embodiments, the option to transmit updated location information of the computer system via the second communication network is displayed in response to a set of one or more inputs corresponding to a request to display the user interface of the location sharing application (e.g., a user can access the option in the location sharing application). Providing an option to transmit updated location information of the computer system via the second communication network after a first predetermined time period and displaying a notification that the option is available after a second predetermined time period notifies the user that updated location information can be transmitted via the second communication network and reduces disturbances to the user, but allows the user to transmit updated location information via the second communication network prior to receiving the notification, which provides improved visual feedback, provides additional control options without cluttering the user interface, and performs an operation when a set of conditions has been met without requiring further user input.

In some embodiments, while the first communication network is unavailable (and/or while the computer system is capable of updating location information via a second communication network): the computer system detects a request (e.g., 1310F) (e.g., a set of one or more inputs) to transmit (or to share or to make accessible to other devices) updated location information of the computer system via the second communication network; and in response to detecting the request to transmit updated location information of the computer system via the second communication network, the computer system initiates a process for transmitting updated location information of the computer system via the second communication network, wherein the process for transmitting updated location information of the computer system via the second communication network includes displaying a prompt (e.g., 1352A, 931, 908C, 908D, 908E, 908F, 908G, 908F, 908I, 908O, 908O1, 926, and/or 931) (e.g., a notification, a banner, text, a graphical element, audio, and/or instructions) for a user to take an action to connect to the second communication network. In some embodiments, the prompt for a user to take an action to connect to the second communication network includes instructions to move and/or position at least a portion of the computer system in a particular direction or location (e.g., turn left, point up, and/or move outside). In some embodiments, the computer system displays the prompt for a user to take an action to connect to the second communication network in accordance with a determination that the computer system is not connected to the second communication network (e.g., is not properly aligned for communication with one or more satellites of the second communication network). Initiating a process for transmitting updated location information of the computer system via the second communication network in response to detecting the request to transmit updated location information of the computer system via the second communication network provides the user with control over when and/or how often to transmit updated location information, which reduces the number of inputs needed to perform an operation and provides additional control options without cluttering the user interface. Displaying a prompt for a user to take an action to connect to the second communication network (e.g., providing connection assistance) allows the user to resolve issues (e.g., misalignment and/or obstruction) that prevent the computer system from connecting to the second communication network quickly and efficiently with fewer inputs, which provides improved visual feedback and reduces the number of inputs needed to perform an operation.

Figure 13X:
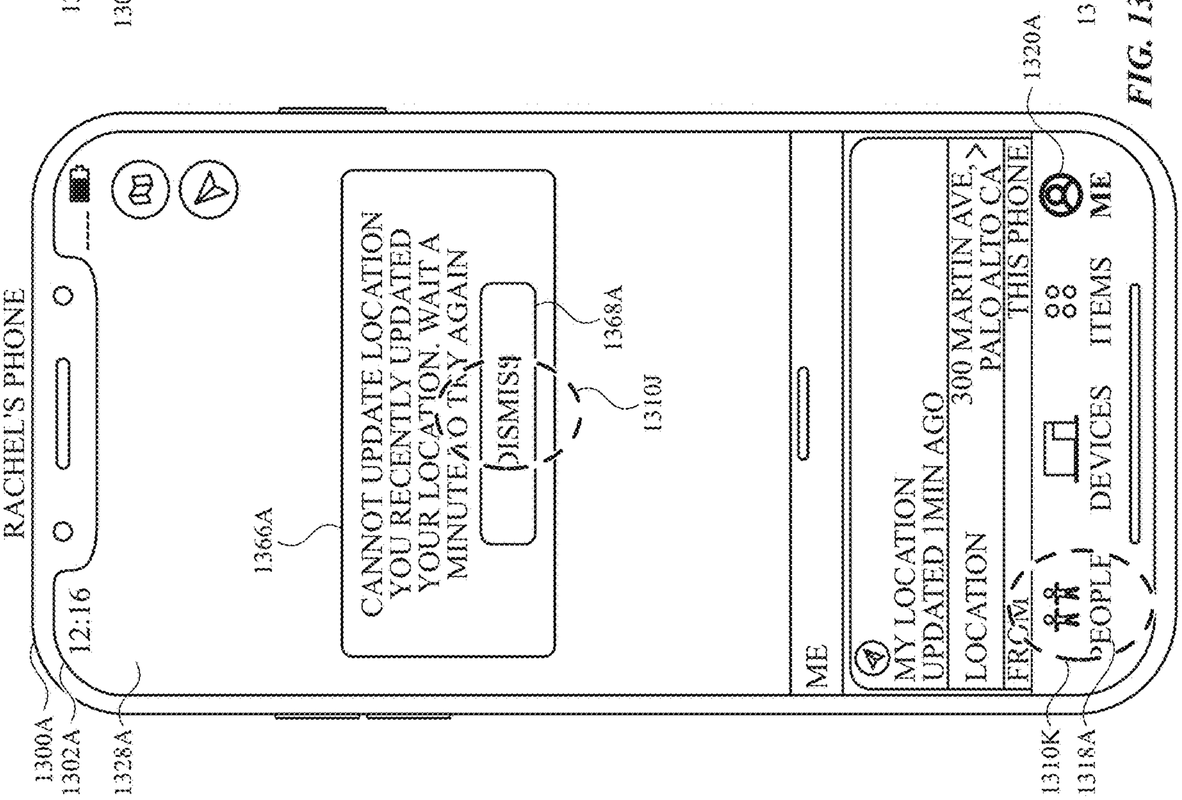
Figure 13Y:
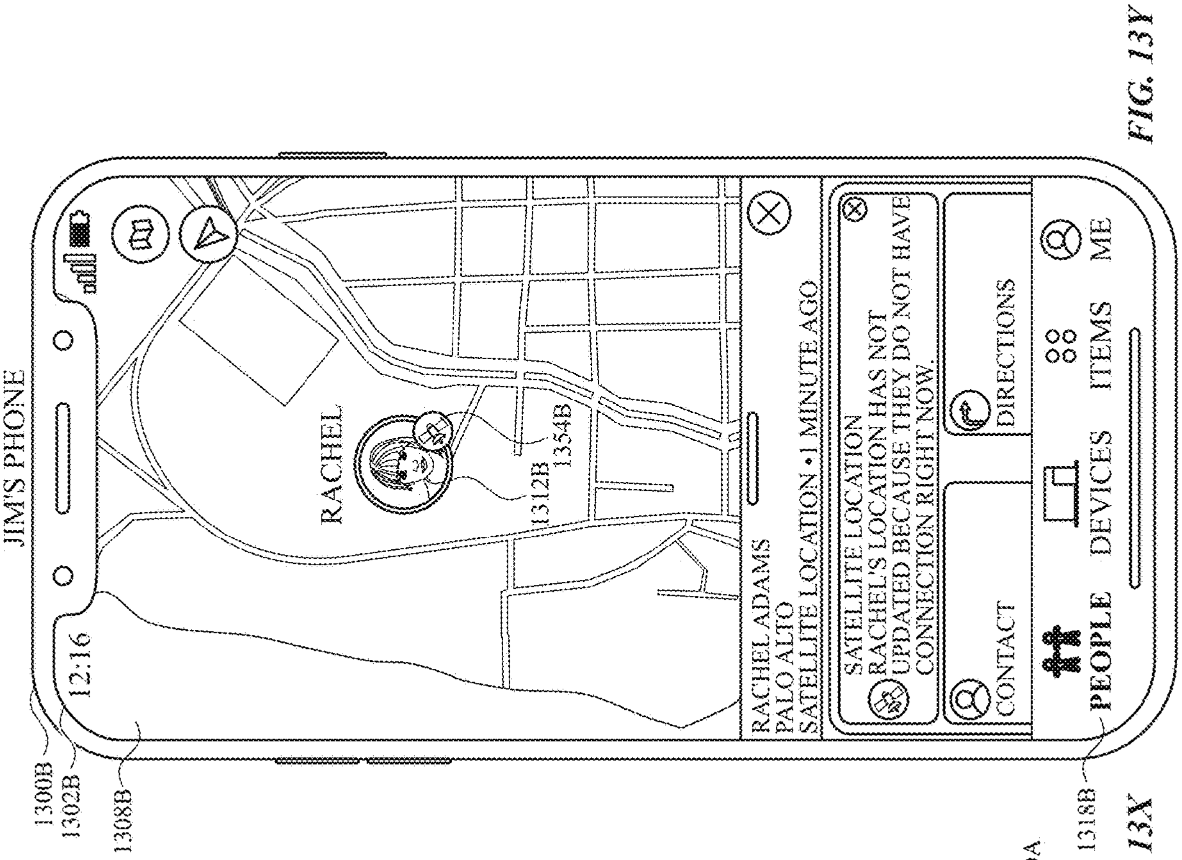
Figure 13Z:
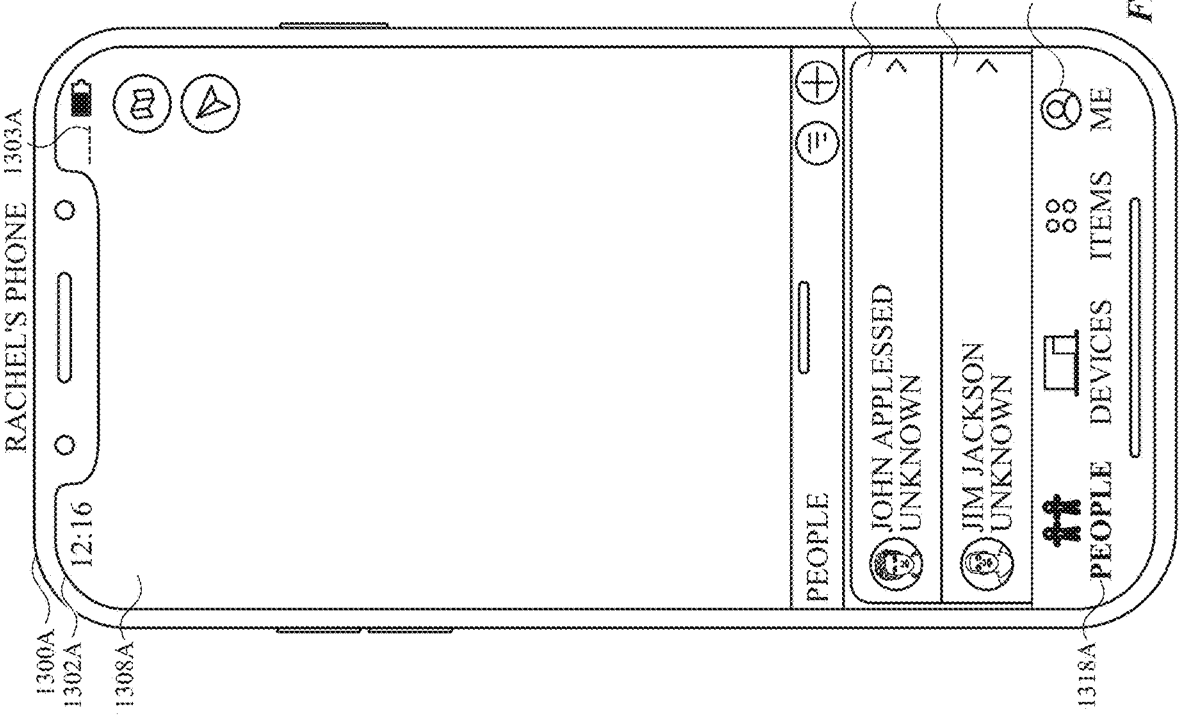
Figure 13A:
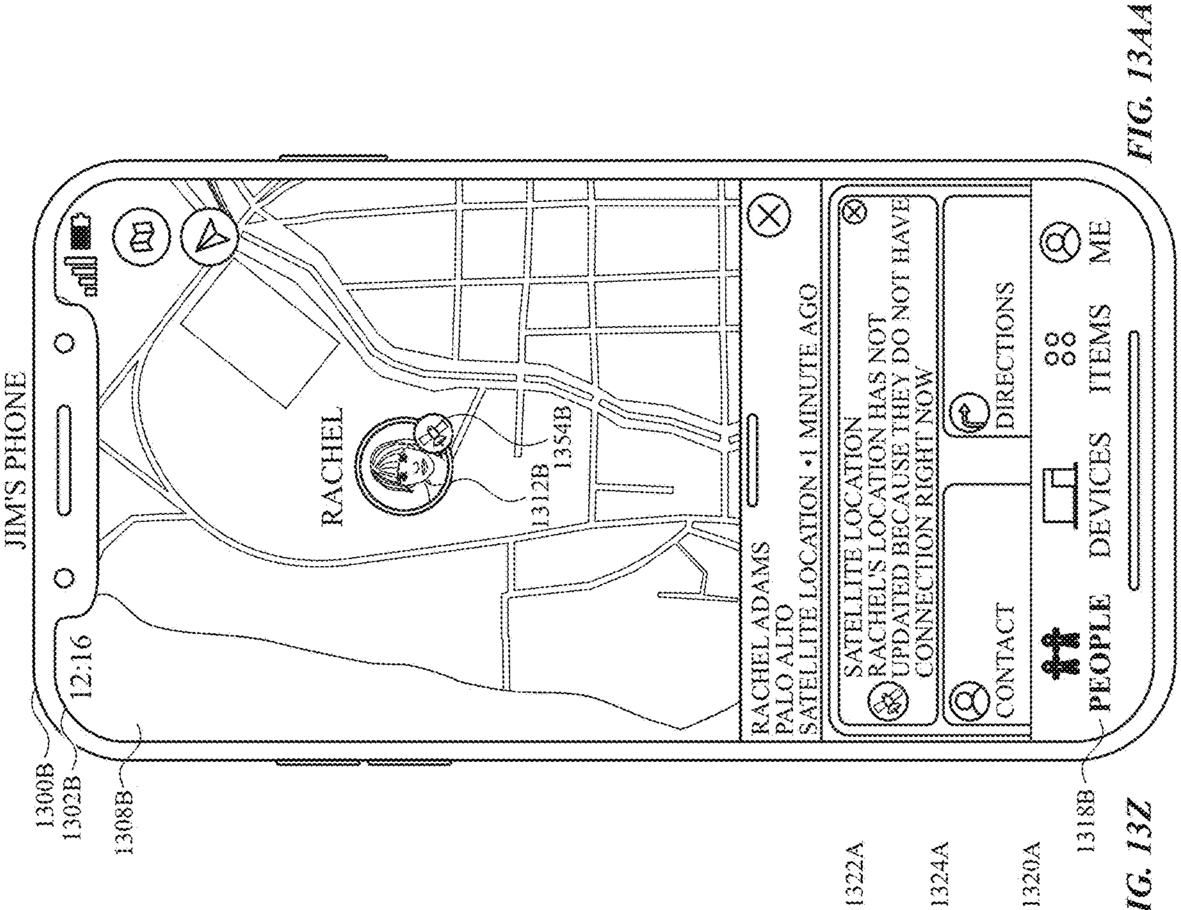

In some embodiments, while the first communication network is unavailable (and/or while the computer system is capable of updating location information via a second communication network): the computer system detects a first request (e.g., 1310F or 1310I) (e.g., a set of one or more inputs) to transmit updated location information of the computer system via the second communication network; and in response to detecting the first request to transmit updated location information of the computer system via the second communication network: in accordance with a determination that a set of manual update criteria is met (e.g., at least a threshold amount of time prior to detecting the first request has elapsed since receiving a request to transmit updated location information via the second communication network), the computer system transmits updated location information of the computer system via the second communication network (e.g., as shown in FIG. 13P); and in accordance with a determination that the set of manual update criteria is not met, the computer system forgoes (e.g., prevents) transmitting updated location information of the computer system via the second communication network (e.g., as shown in FIG. 13X). In some embodiments, the computer system restricts how frequently manual location updates can occur (e.g., the computer system requires a threshold amount of time between manual requests to transmit updated location information). In some embodiments, the manual update criteria includes a criterion that is met when at least a threshold amount of time prior to detecting the first request has elapsed since receiving a request to transmit updated location information via the second communication network. Transmitting updated location information in response to a request based on whether manual update criteria is met enables the computer system to conserve resources by limiting transmission of updated location information (e.g., preventing transmission of updated location information when the computer system is unlikely to have changed position since a previous update by a distance that is greater than a resolution or accuracy of location information provided by the second communication network), which performs an operation when a set of conditions has been met without requiring further user input.

In some embodiments, while the first communication network is unavailable (and/or while the computer system is capable of updating location information via a second communication network) and after detecting the first request (e.g., 1310F) to transmit updated location information of the computer system via the second communication network (or, optionally, after transmitting updated location information of the computer system via the second communication network in response to detecting the first request to transmit updated location information of the computer system via the second communication network): the computer system detects a second request (e.g., 1310I) (e.g., a set of one or more inputs) to transmit updated location information of the computer system via the second communication network; and in response to detecting the second request to transmit updated location information of the computer system via the second communication network: in accordance with a determination that an amount of time between the second request to transmit updated location information of the computer system via the second communication network and the first request to transmit updated location information of the computer system via the second communication network (or, optionally, an amount of time between the second request to transmit updated location information of the computer system via the second communication network and transmitting updated location information of the computer system via the second communication network in response to the first request to transmit updated location information of the computer system via the second communication network) meets (e.g., is greater than or is equal to or greater than) a time threshold (e.g., a non-zero amount of time such as 1 minute, 5 minutes, 10 minutes, 15 minutes, 30 minutes, or 1 hour), the computer system transmits updated location information of the computer system via the second communication network (e.g., as shown in FIG. 13P); and in accordance with a determination that the amount of time between the second request to transmit updated location information of the computer system via the second communication network and the first request to transmit updated location information of the computer system via the second communication network (or, optionally, the amount of time between the second request to transmit updated location information of the computer system via the second communication network and transmitting updated location information of the computer system via the second communication network in response to the first request to transmit updated location information of the computer system via the second communication network) does not meet (e.g., is less than or is equal to or less than) the time threshold, the computer system forgoes (e.g., prevents) transmitting updated location information of the computer system via the second communication network (e.g., as shown in FIG. 13X). Transmitting updated location information based on whether or not the amount of time between the second request to transmit updated location information of the computer system via the second communication network and the first request to transmit updated location information of the computer system via the second communication network meets a time threshold enables the computer system to conserve resources by limiting transmission of updated location information (e.g., preventing transmission of updated location information when the computer system is unlikely to have changed position since a previous update by a distance that is greater than a resolution or accuracy of location information provided by the second communication network), which performs an operation when a set of conditions has been met without requiring further user input.

In some embodiments, while the first communication network is unavailable (and/or while the computer system is capable of updating location information via a second communication network) and after detecting the first request (e.g., 1310F) to transmit updated location information of the computer system via the second communication network (or, optionally, after transmitting updated location information of the computer system via the second communication network in response to detecting the first request to transmit updated location information of the computer system via the second communication network): the computer system detects a second request (e.g., 1310I) (e.g., a set of one or more inputs) to transmit updated location information of the computer system via the second communication network; and in response to detecting the second request to transmit updated location information of the computer system via the second communication network: in accordance with a determination that the amount of time between the second request to transmit updated location information of the computer system via the second communication network and the first request to transmit updated location information of the computer system via the second communication network (or, optionally, the amount of time between the second request to transmit updated location information of the computer system via the second communication network and transmitting updated location information of the computer system via the second communication network in response to the first request to transmit updated location information of the computer system via the second communication network) does not meet (e.g., is less than or is equal to or less than) a time threshold (e.g., a non-zero amount of time such as 1 minute, 5 minutes, 10 minutes, 15 minutes, 30 minutes, or 1 hour), the computer system provides a notification (e.g., 1366A) (e.g., a message, an audio alert, and/or a tactile output) that updated location information of the computer system will not (or cannot) be transmitted. In some embodiments, in accordance with a determination that an amount of time between the second request to transmit updated location information of the computer system via the second communication network and the first request to transmit updated location information of the computer system via the second communication network (or, optionally, an amount of time between the second request to transmit updated location information of the computer system via the second communication network and transmitting updated location information of the computer system via the second communication network in response to the first request to transmit updated location information of the computer system via the second communication network) meets (e.g., is greater than or is equal to or greater than) a time threshold (e.g., 1 minute, 5 minutes, 10 minutes, 15 minutes, 30 minutes, or 1 hour), the computer system forgoes providing the notification that updated location information of the computer system will not be transmitted and transmits updated location information of the computer system via the second communication network. Providing a notification that updated location information of the computer system will not be transmitted in response to a request to transmit updated location information in accordance with a determination that the amount of time between the second request to transmit updated location information of the computer system via the second communication network and the first request to transmit updated location information of the computer system via the second communication network does not meet a time threshold informs the user that a requested action will not be performed, which provides improved visual feedback and performs an operation when a set of conditions has been met without requiring further user input.

In some embodiments, the computer system displays a location-status indicator (e.g., 1312B and/or 1356B1) (e.g., a graphical element, a pin on a map, and/or text) that corresponds to updated location information (e.g., the location-status indicator indicates a geographic location represented by the updated location information), including: in accordance with a determination that the location-status indicator (or, optionally, a location indicated by the location-status indicator) corresponds to (e.g., is based on) updated location information that was transmitted via the first communication network, displaying the location-status indicator with a first visual appearance (e.g., 1312B in FIG. 13I); and in accordance with a determination that the location-status indicator corresponds to updated location information that was transmitted via the second communication network, displaying the location-status indicator with a second visual appearance that is different from the first visual appearance (e.g., 1312B in FIG. 13S). Displaying a location-status indicator with an appearance that is based on the communication network via which the location information corresponding to the indicator was transmitted provides the user with information about the source of the location information (and potentially the accuracy of the location information if the first communication network has a different accuracy than the second communication network), which provides improved visual feedback.

In some embodiments, displaying the location-status indicator with the second visual appearance includes displaying an image (e.g., 1354B) (e.g., a glyph and/or a thumbnail) of a satellite (e.g., the status indicator includes the image of the satellite and/or the status indicator is displayed with the image of the satellite). Displaying an image of a satellite indicates to the user that the location of the location-status indicator is based on location information transmitted via a satellite communication network (which may be less accurate than location information transmitted via a terrestrial wireless communication network), which provides improved visual feedback.

In some embodiments, the computer system displays an update-status indicator (e.g., 1326B, 1332A, and/or 1356B2) (e.g., a graphical element and/or text) that indicates a time (e.g., a most recent time) at which updated location information was transmitted (and/or the last time that location information was shared and/or an amount of time since location information was last shared). Displaying an indication of a time at which updated location information was transmitted provides the user with information about how recently the location information of a user was updated, particularly in circumstances in which location information is being updated manually instead of automatically, which provides improved visual feedback.

In some embodiments, while (or in accordance with a determination that) the computer system is in communication with the first communication network, the computer system displays a map (e.g., 1308A in FIG. 13B, 1308B, or 1328A in FIGS. 13D and 13H) (and, optionally, concurrently displaying a location indicator (e.g., a pin) at a location on the map corresponding to a location of the computer system); and while (or in accordance with a determination that) the first communication network is unavailable to the computer system, the computer system forgoes display of the map (and displays the location indicator or without displaying the location indicator) (e.g., 1328A in FIG. 13L, 13N, 13P, 13R, 13T, 13V, and 13X, or 1308A in FIG. 13Z). In some embodiments, the map is displayed in a user interface of a location-sharing application. In some embodiments, a location-sharing application includes location information of the computer system, other computer systems associated with a user of the computer system (e.g., computer systems associated with and/or logged into the same user account as the computer system), and/or other users or computer systems that share location information with the computer system. In some embodiments, a location-sharing application includes settings associate with location sharing, such as options to enable and disable location sharing and to select users and/or devices with which location information is to be shared. In some embodiments, the computer system forgoes displaying a map when the first communication network is unavailable due to bandwidth constraints (e.g., there is not sufficient bandwidth to display accurate map information when the first communication network is unavailable). Displaying a map when the computer system is in communication with the first communication network and forgoing display of the map when the first communication network is unavailable to the computer system indicates to the user that the first communication network is unavailable, conserves computing resources required to display the map, and avoids displaying potentially inaccurate (or stale) map information when there is insufficient bandwidth to update the map at a predetermined rate, which provides improved visual feedback and performs an operation when a set of conditions has been met without requiring further user input.

In some embodiments, while (or in accordance with a determination that or in response to a determination that) the first communication network is unavailable (e.g., as indicated by cellular status indicator 1303A in FIG. 13L), the computer system provides an option (e.g., 1350A) (e.g., a selectable option, an affordance, an icon, a button, and/or a user-interactive graphical user interface element) to transmit updated location information of the computer system via the second communication network (e.g., displaying a selectable graphical user interface object in a location-sharing application); and while (or in accordance with a determination that or in response to a determination that) the computer system is in communication with the first communication network (e.g., as indicated by cellular status indicator 1303A in FIG. 13D), the computer system forgoes providing (e.g., the computer system does not provide) an option to transmit updated location information of the computer system via the second communication network (e.g., manual update option 1350A is not displayed in FIG. 13D) (e.g., the user interface of the location-sharing application is displayed without the selectable graphical user interface object). In some embodiments, in response to detecting an input selecting the option, the computer system transmits updated location information of the computer system via the second communication network. In some embodiments, the computer system does not provide an option (e.g., a manual option) to transmit updated location information of the computer system (e.g., via the first communication network and/or the second communication network) because the location information of the computer system (or a user associated with the computer system) is being updated automatically on a regular schedule (e.g., at a periodic interval without requiring user input). Providing an option to transmit updated location information of the computer system via the second communication network while the first communication network is unavailable, and forgoing providing an option to transmit updated location information of the computer system via the second communication network while the computer system is in communication with the first communication network enables the user to manually share updated location information when the computer system does not transmit updated location information automatically without cluttering the user interface with additional elements when updated location is transmitted automatically, which provides improved visual feedback and provides additional control options without cluttering the user interface.

In some embodiments, while the first communication network is unavailable, the compute system transmits, via the second communication network, updated location information that is accessible to devices other than the computer system (e.g., in FIG. 13L, 13P, 13R, 13T, or 13V, computer system 1300A transmits updated location information via a satellite communication network). In some embodiments, the computer system transmits updated location information via the second communication network while the first communication network is unavailable in accordance with (or in response to) a determination that respective criteria (e.g., remote location update criteria) have been met. In some embodiments, the respective criteria are met: when a user of the computer system has previously approved receivers of location information; when a location-sharing mode is active to send location information; when a selectable location-sharing option is selected; when a predetermined amount of movement of the computer system has been detected; when a predetermined time threshold is satisfied since last updated location information was sent; and/or when another user or device has requested updated location information for the user. In some embodiments, the respective criteria for sending updated location information via the second communication network is the same as the respective criteria for sending updated location information via the first communication network. In some embodiments, the respective criteria for sending updated location information via the second communication network is different from the respective criteria for sending updated location information via the first communication network. Transmitting updated location information that is accessible to devices other than the computer system via the second communication network enables the user to send updated location information when the first communication network is unavailable without requiring additional inputs (such as moving the computer system to a different location) to connect to the first communication network, which reduces the number of inputs needed to perform an operation.

In some embodiments, transmitting, via the second communication network, updated location information that is accessible to devices other than the computer system is performed automatically without user input (e.g., in FIG. 13L, 13P, 13R, 13T, or 13V, computer system 1300A transmits updated location information via a satellite communication network without detecting selection (or requiring selection) of manual update option 1350A) (e.g., in accordance with (or, optionally, in response to) a determination that automatic-update criteria have been met). In some embodiments, the automatic-update criteria include a criterion that is met when a user has fallen. In some embodiments, the computer system is in communication with one or more motion sensors (e.g., accelerometers and/or gyroscopes) that are configured to detect motion of the computer system. In some embodiments, a determination is made that a user has fallen when motion (e.g., a detected velocity and/or acceleration) of the computer system (or another device associated with the user) meets a set of motion criteria (e.g., meets or exceeds a threshold velocity and/or acceleration). In some embodiments, the computer system is in communication with one or more biometric sensors (e.g., a heartrate sensor and/or a blood oxygen monitor) that can be used to determine that a user has fallen. Transmitting updated location information via the second communication network automatically without user input enables a user to share updated location information without user input and to provide location information more quickly if there is an emergency and/or if the user is unable to provide an input (e.g., a manual input) to update the location information, which reduces the number of inputs needed to perform an operation.

In some embodiments, the computer system displays (e.g., in a user interface of a location-sharing application) an option (e.g., 1350A) (e.g., a selectable option, an affordance, an icon, a button, and/or a user-interactive graphical user interface object) to transmit updated location information of the computer system via the second communication network; and the computer system detects a set of one or more inputs (e.g., 1310E and/or 1310F) that includes a selection of the option to transmit updated location information of the computer system via the second communication network, wherein transmitting, via the second communication network, updated location information that is accessible to devices other than the computer system is performed in response to detecting the set of one or more inputs that includes a selection of the option to transmit updated location information of the computer system via the second communication network. Displaying an option to transmit updated location information of the computer system via the second communication network provides an efficient method for the user to manually share updated location information, which provides additional control options without cluttering the user interface.

In some embodiments, in response to a determination that a predefined action has been successfully performed (e.g., the computer system has successfully connected to one or more satellites or has successfully transmitted updated location information), the computer system displays a message (e.g., 1322A indicates (e.g., displays "NOW") when location information has been sent, 1352A1 displays "Connected" when connection is established, 908L, and/or 908M) that indicates that the predefined action has been successfully performed. Displaying a message that indicates that the predefined action has been successfully performed in response to a determination that a predefined action has been successfully performed enables the computer system to inform the user that a particularly relevant action has occurred while not distracting the user with notifications about non-predefined actions, which provides improved visual feedback to the user and performs an operation when a set of conditions has been met without requiring further user input. Feedback about the success of an important action that enables the computer system to be more quickly and efficiently controlled is particularly important in situations where the user is responding to an emergency or stressful situation.

Note that details of the processes described above with respect to method 1400 (e.g., FIG. 14) are also applicable in an analogous manner to the methods described above and below. For example, method 700, 800, 1000, 1200, 1600, 1800, 2000, and/or 2200 optionally includes one or more of the characteristics of the various methods described above with reference to method 1400. For example, methods 700, 800, 1000, 1200, and/or 1600 optionally include the techniques for transmitting updated location information described in method 1400. For example, method 1800 can initiate transmitting updated location information described in method 1400 from a messaging application. For example, transmitting updated location information described in method 1400 can be simulated in the alternative communication network test mode in method 2000. For example, transmitting updated location information described in method 1400 can be the process corresponding to the user interface object in method 2200. For brevity, these details are not repeated below.

FIGS. 15A-15AF illustrate exemplary user interfaces for initiating a communication, in accordance with some embodiments. The user interfaces in these figures are used to illustrate the processes described below, including the processes in FIG. 16.

FIG. 15A illustrates computer system 1500A and computer system 1500B. In some embodiments, computer system 1500A is a smartphone, a smartwatch, a desktop computer, a laptop, computer, or a tablet computer. In some embodiments, computer system 1500A is device 100, device 300, or device 500. In some embodiments, computer system 1500B is a smartphone, a smartwatch, a desktop computer, a laptop, computer, or a tablet computer. In some embodiments, computer system 1500B is device 100, device 300, or device 500. In the embodiment illustrated in FIG. 15A, computer system 1500A is a smartwatch that includes display 1502A (e.g., a touch-sensitive display), rotatable (and, optionally, depressible) input mechanism 1505A, and hardware button 1507A. Computer system 1500B is a smartphone that includes display 1502B (e.g., a touch-sensitive display). In some embodiments, computer system 1500A and computer system 1500B are in wireless communication with each other (e.g., via Bluetooth and/or a near field communication protocol). In some embodiments, computer system 1500A and computer system 1500B are paired.

In some embodiments, any of the inputs described herein (e.g., input 1510A, 1510B, 1510C, 1510D, 1510E1, 1510E2, 1510E3, 1510F, 1510G, 1510H, 1510I, 1510J, 1510K, 1510L, 1510M, 1510N, 1510O, 1510P, 1510Q, and/or 1510R) is or includes a touch input (e.g., a tap gesture and/or a swipe gesture). In some embodiments, any of the inputs described herein (e.g., input 1510A, 1510B, 1510C, 1510D, 1510E1, 1510E2, 1510E3, 1510F, 1510G, 1510H, 1510I, 1510J, 1510K, 1510L, 1510M, 1510N, 1510O, 1510P, 1510Q, and/or 1510R) is or includes a voice input (e.g., a voice command to select a user interface element or to activate a feature or perform a function, such as a feature or function associated with a user interface element). In some embodiments, any of the inputs described herein (e.g., input 1510A, 1510B, 1510C, 1510D, 1510E1, 1510E2, 1510E3, 1510F, 1510G, 1510H, 1510I, 1510J, 1510K, 1510L, 1510M, 1510N, 1510O, 1510P, 1510Q, and/or 1510R) is or includes an air gesture (e.g., an air gesture to select a user interface element or to activate a feature or perform a function, such as a feature or function associated with a user interface element). In some embodiments, any of the inputs described herein (e.g., input 1510A, 1510B, 1510C, 1510D, 1510E1, 1510E2, 1510E3, 1510F, 1510G, 1510H, 1510I, 1510J, 1510K, 1510L, 1510M, 1510N, 1510O, 1510P, 1510Q, and/or 1510R) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements describes as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

In FIG. 15A, computer system 1500A and computer system 1500B are coordinating in an attempt to initiate a phone call to a non-emergency number (e.g., a number that is not associated with emergency services and is not designated as an emergency contact). Computer system 1500A and computer system 1500B exchange call information such that a call can be initiated and/or ended by either computer system, and call audio can be input and/or output by either computer system. In some embodiments, computer system 1500A and computer system 1500B include selectable options for coordinating a shared call. In some embodiments, computer system 1500A does not have cellular capability and cannot make a phone call independently (e.g., without computer system 1500B or other cellular enabled device). When computer system 1500A does not cellular capability, computer system 1500A makes the phone call via computer system 1500B such that computer system 1500B establishes a cellular connection and transmits call data to computer system 1500A.

In FIG. 15A, computer system 1500A and computer system 1500B each display a calling interface of a phone application that provides information and/or options associated with the call. Computer system 1500A displays calling interface 1504A of a phone application, which includes the number being called 1504A1, the call status 1504A2 (e.g., CALLING), end call option 1504A3, and keypad option 1504A4. In response to detecting selection of end call option 1504A3 (e.g., a tap gesture or other selection input on end call option 1504A3), computer system 1500A causes the call to end or causes an attempt to initiate the call to end. In response to detecting selection of keypad option 1504A4 (e.g., a tap gesture or other selection input on keypad option 1504A4), computer system 1500A displays a keypad with selectable numeric options.

Computer system 1500B displays calling interface 1504B of a phone application, which includes the number being called 1504B1, the call status 1504B2 (e.g., NO CONNECTION), call management options 1504B3, and end call option 1504B4. In some embodiments, call management options 1504B3 include one or more (e.g., all or a subset) of call management buttons 603 displayed and described in FIGS. 6K-6L. Call status 1504B2 indicates that computer system 1500B does not have a cellular connection, which is also indicated by network indicator 1503B, and therefore cannot initiate the call. Because computer system 1500B does not have a cellular connection, some or all of call management options 1504B3 are disabled.

Figure 15B:
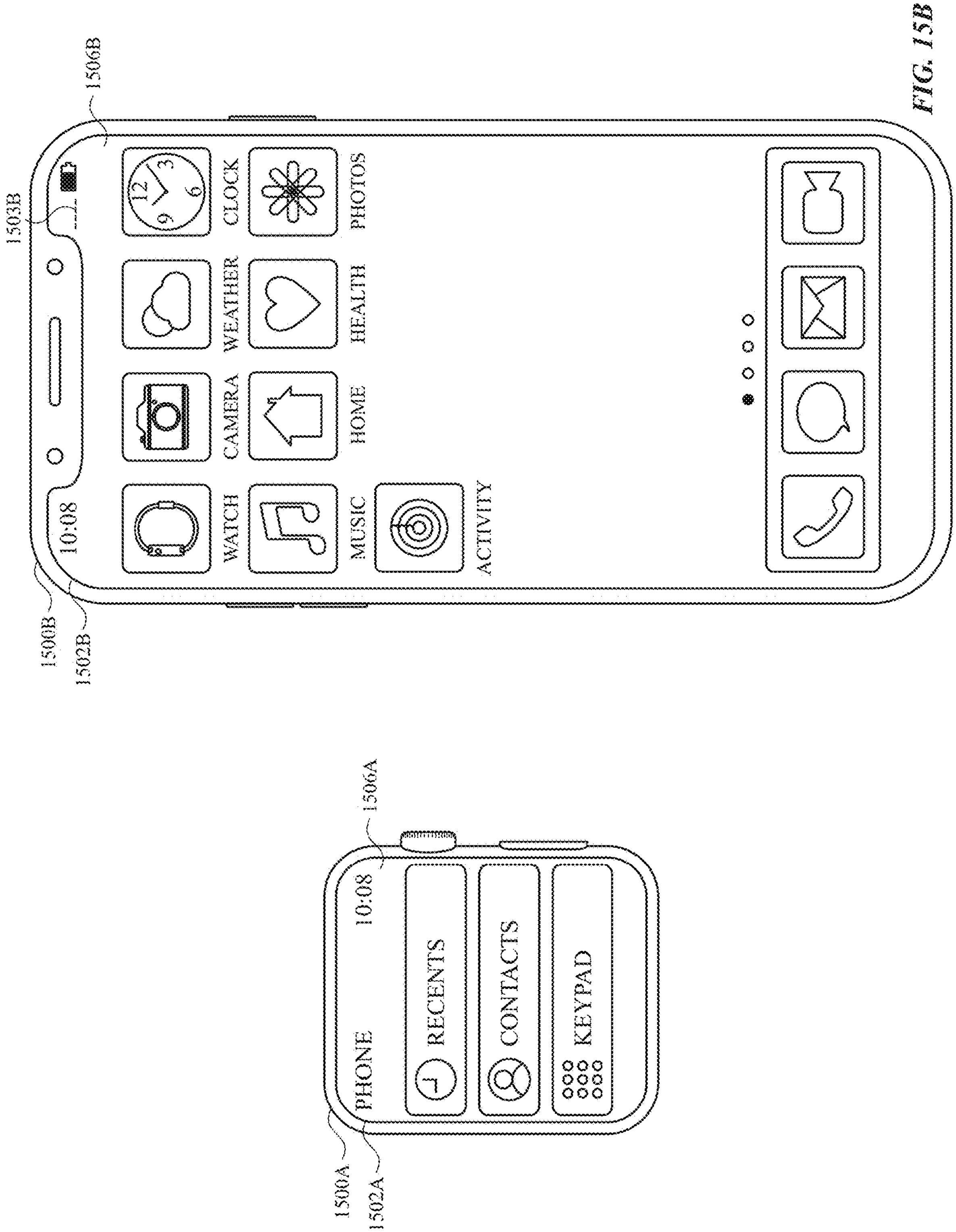

Because the call is to a non-emergency number, when the attempt to initiate the call fails, computer system 1500A and computer system 1500B display menu user interface 1506A and home screen 1506B, respectively, as shown in FIG. 15B. Menu user interface 1506A displayed on computer system 1500A is a menu interface of the phone application on computer system 1500A. Accordingly, when an attempt to initiate a call to a non-emergency number fails, computer system 1500A ceases display of calling interface 1504A and displays (e.g., returns to) menu user interface 1506A. Home screen 1506B displayed on computer system 1500B includes selectable icons corresponding to respective applications that, when selected, open and/or launch the respective application. Accordingly, when an attempt to initiate a call to a non-emergency number fails, computer system 1500B ceases display of calling interface 1504B and displays (e.g., returns to) home screen 1506B. In some embodiments, computer system 1500B displays home screen 1506B when the attempt to initiate a call to a non-emergency number fails when computer system 1500A initiates the call. In some embodiments, when computer system 1500B initiates the call, computer system 1500B displays a menu user interface of the phone application (e.g., analogous to menu user interface 1506A displayed on computer system 1500A) when the attempt to initiate a call to a non-emergency number fails. In some embodiments, when an attempt to initiate a call to a non-emergency number fails, computer system 1500B displays a user interface that was displayed at the time that the attempt to initiate the call was made.

Figure 15C:
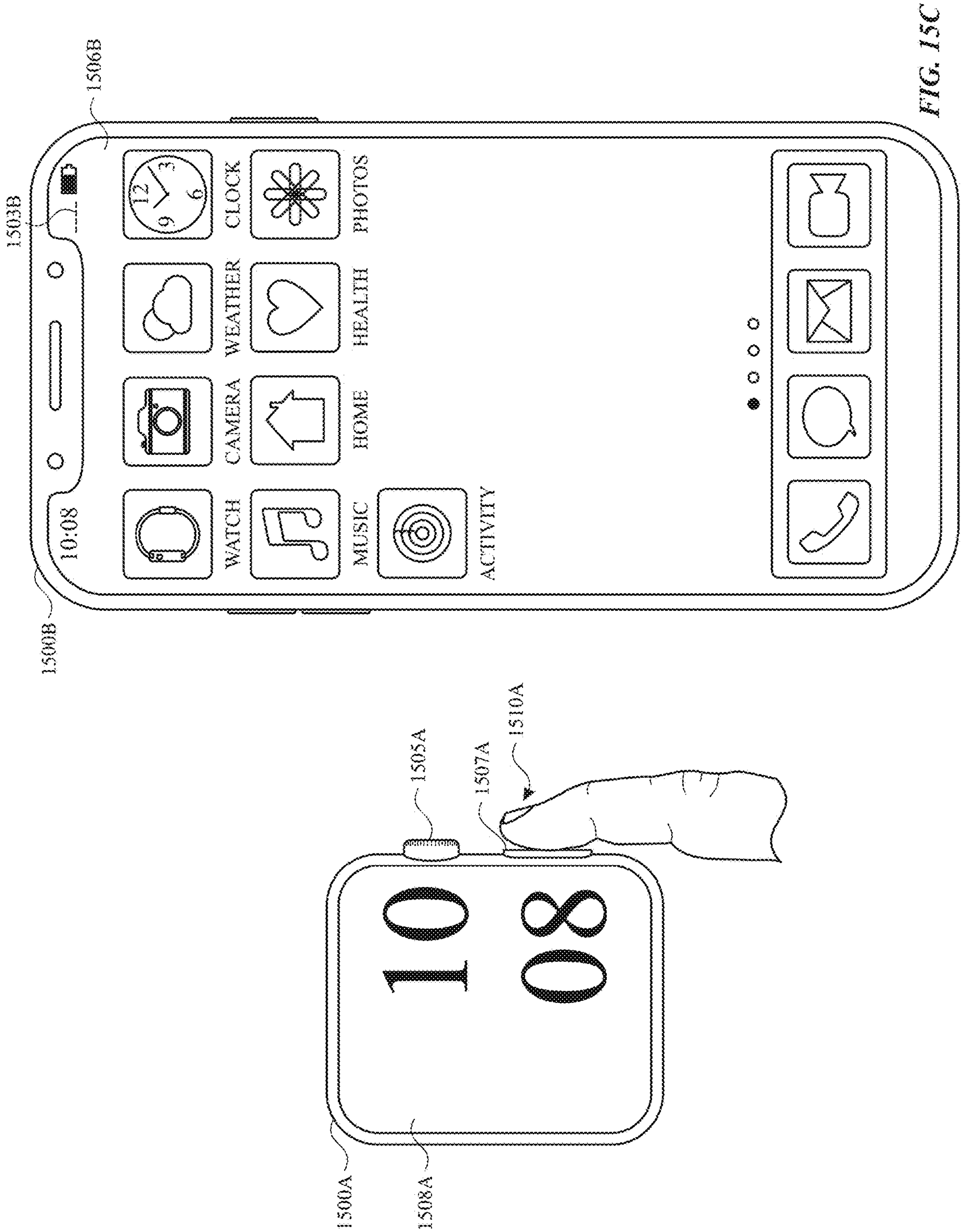

FIG. 15C illustrates an example technique for initiating a communication, such as a phone call, with a designated entity, such as an emergency contact or an emergency service (e.g., 911). Computer system detects input 1510A (e.g., a press, multiple presses, or a press and hold) on hardware button 1507A while displaying clock face user interface 1508A. In response to detecting input 1510A, computer system 1500A displays user interface 1512A, which includes power off option 1512A1, medical ID option 1512A2, and emergency SOS option 1512A3. In response to detecting input 1510B (e.g., a tap gesture, a swipe gesture, or other selection input) selecting emergency SOS option 1512A3, computer system 1500A attempts to initiate a communication with emergency services (e.g., 911) via computer system 1500B.

Figure 15D:
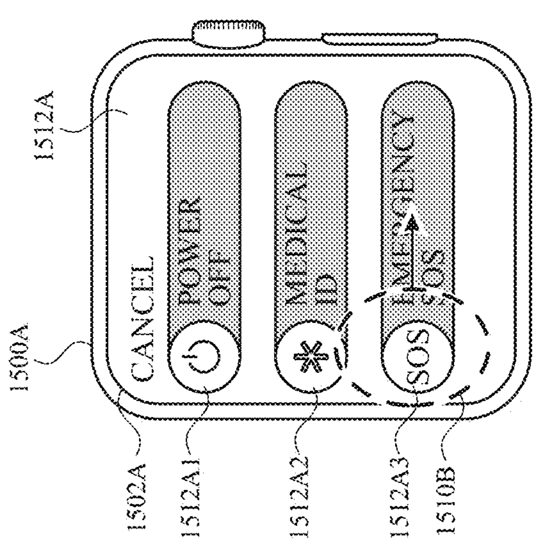
Figure 15E:
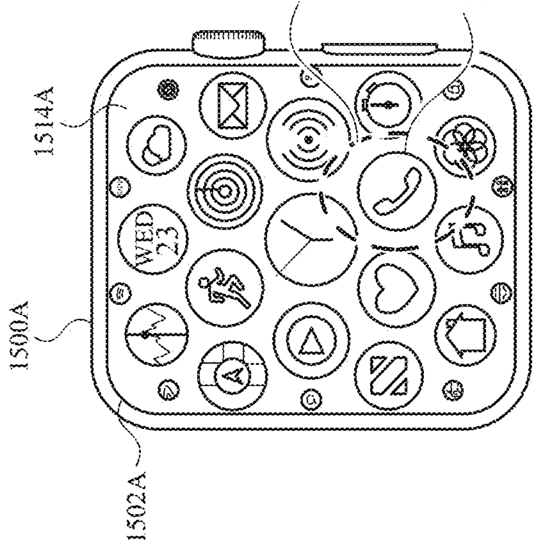
Figure 15F:
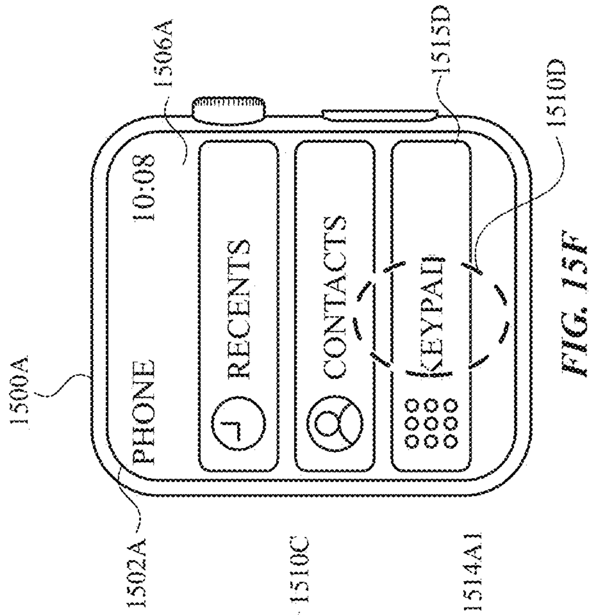
Figure 15G:
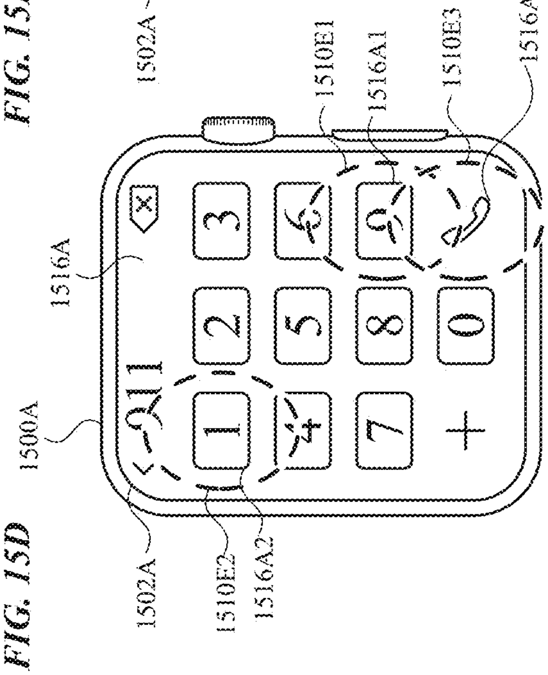

FIGS. 15E-15G illustrate an alternative or additional technique for initiating a call to emergency services. In FIG. 15E, computer system 1500A displays home screen 1514A (also referred to as a springboard or a launch screen), which includes selectable icons corresponding to respective applications that, when selected, cause computer system 1500A to open or launch the respective application. In response to detecting input 1510C (e.g., a tap gesture or other selection input) selecting icon 1514A1, which corresponds to a phone application, computer system 1500A displays menu user interface 1506A of the phone application, as shown in FIG. 15F. In response to detecting input 1510D (e.g., a tap gesture or other selection input) selecting keypad option 1515D, computer system 1500A displays keypad user interface 1516A of the phone application, as shown in FIG. 15G. In FIG. 15G, computer system 1500A detects a set of inputs including input 1510E1 (e.g., a tap gesture or other selection input on "9" button 1516A1), input 1510E2 (e.g., two tap gestures or other selection inputs on "1" button 1516A2), and 1510E3 (e.g., a tap gesture or other selection input on call button 1516A3). In response to detecting the set of inputs in FIG. 15G, computer system 1500A attempts to initiate a communication with emergency services (e.g., 911) via computer system 1500B.

Figure 15H:
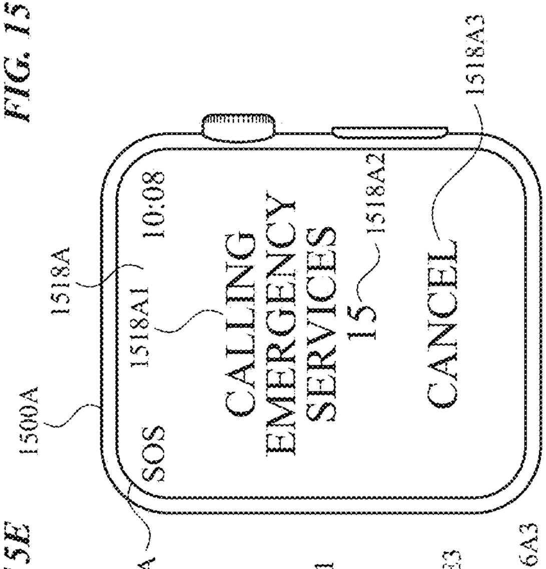

FIG. 15H illustrates an alternative or additional technique for initiating a call to emergency services. In some embodiments, computer system 1500A is capable of detecting that a user has fallen. In response to detecting that a user has fallen, computer system 1500A initiates a process for attempting to communicate with (e.g., make a call to) an emergency service and/or an emergency contact. In some embodiments, in response to detecting that a user has fallen, computer system 1500A displays menu user interface 1512A shown in FIG. 15D, which provides a user with easy access to emergency SOS option 1512A3 to initiate a communication with emergency services. In some embodiments, if computer system 1500A does not detect an input for a predetermined amount of time (e.g., 5 seconds, 10 seconds, 30 seconds, or one minute), computer system displays user interface 1518A, as shown in FIG. 15H. User interface 1518A includes indication 1518A1, countdown timer 1518A2, and cancel option 1518A3. Indication 1518A1 indicates that computer system 1500A will initiate a call to emergency services. Countdown timer 1518A2 displays an amount of time (e.g., a number of seconds) until computer system 1500A will automatically initiate a call to emergency services. A user can select cancel option 1518A3 (e.g., via a tap gesture) to end the countdown and prevent computer system 1500A from automatically initiating a call to emergency services. If the countdown reaches zero before being cancelled, computer system 1500A automatically initiates a call to emergency services. In some embodiments, in response to detecting that a user has fallen, computer system displays user interface 1518A and initiates a countdown without first displaying menu user interface 1512A.

Figure 15J:
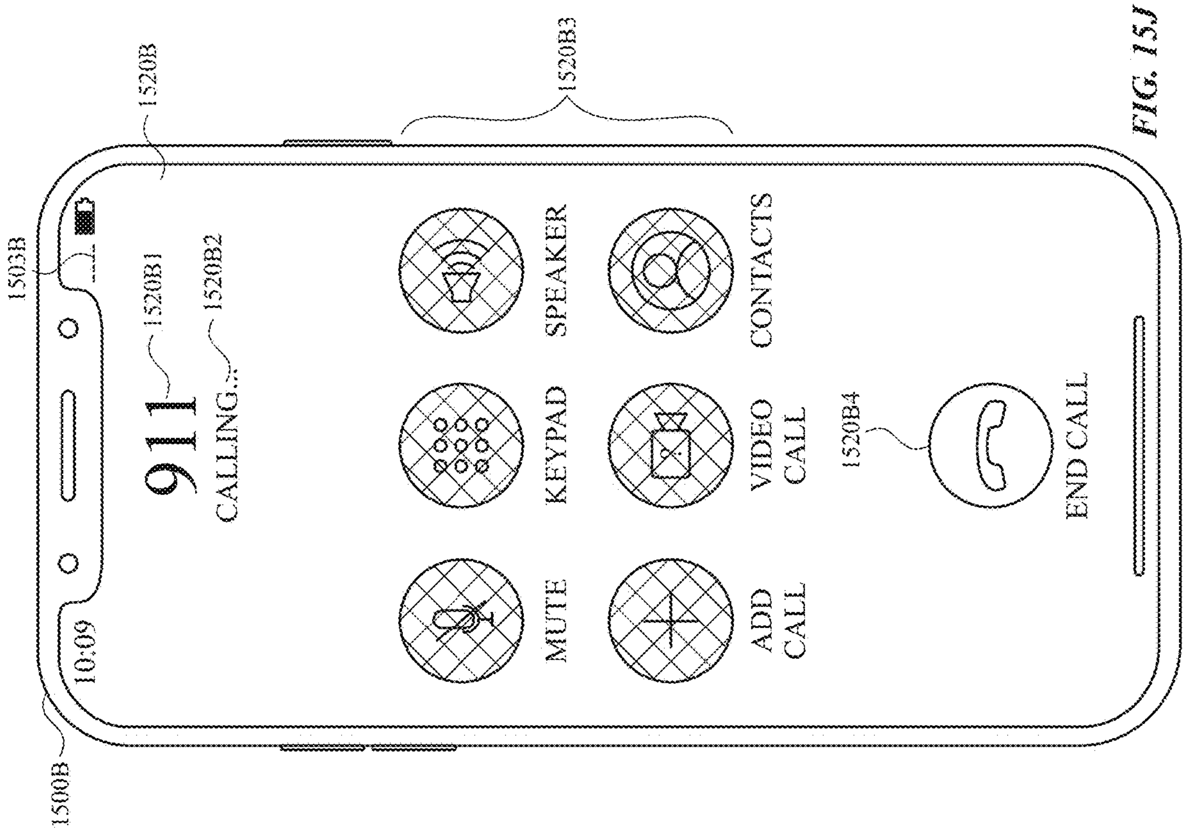
Figure 15I:
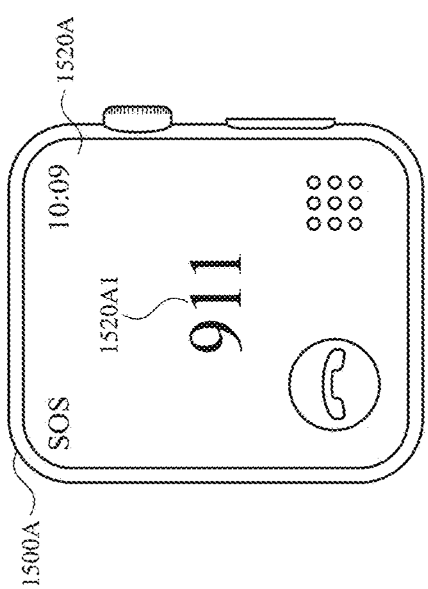

Once computer system 1500A initiates a call to emergency services via computer system 1500B according to the techniques described with reference to FIGS. 15C-15H, computer system 1500A displays calling interface 1520A (e.g., as shown in FIG. 15I) and computer system 1500B displays corresponding calling interface 1520B (e.g., as shown in FIG. 15J). Calling interface 1520A includes recipient indicator 1520A1, which indicates that a call is being made to 911. Calling interface 1520B includes recipient indicator 1520B1, call status indicator 1520B2, call management options 1520B3, and end call affordance 1520B4. In some embodiments, calling interface 1520B is calling interface 1503B displayed and described in FIG. 15A. In some embodiments, calling interface 1520B is calling interface 602K or 602L displayed and described in FIGS. 6K and 6L, respectively. In some embodiments, call management options 1520B3 include one or more (e.g., all or a subset) of call management buttons 603 displayed and described in FIGS. 6K-6L.

Figure 15L:
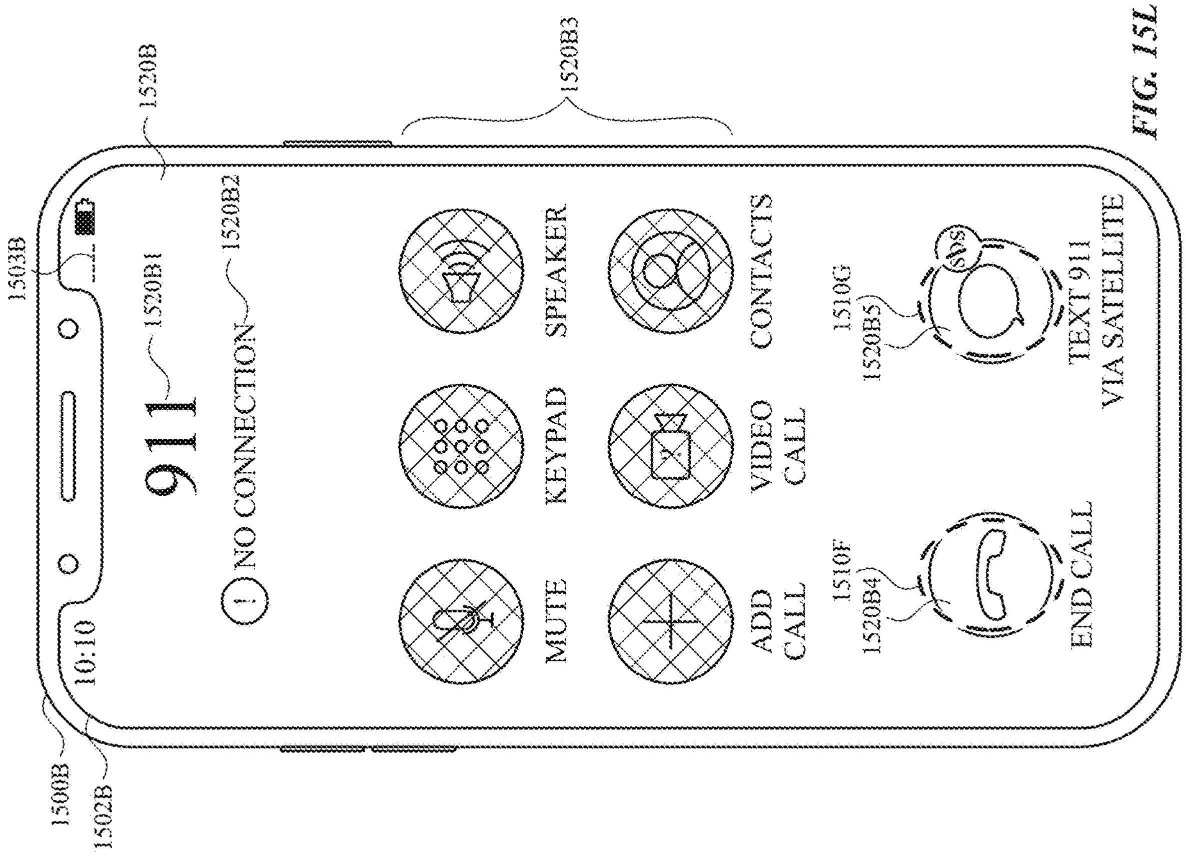
Figure 15K:
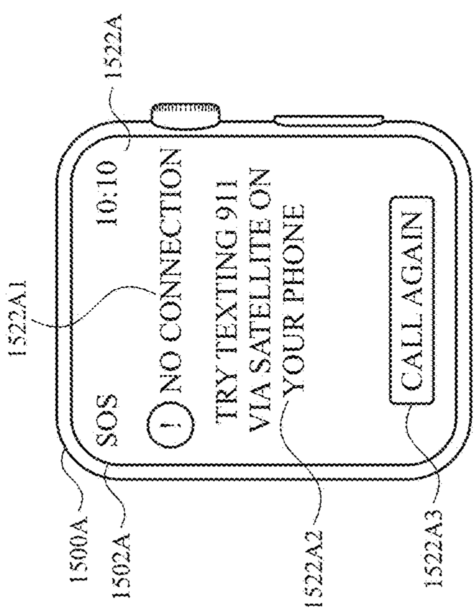

In FIG. 15J, network indicator 1503B indicates that computer system 1500B does not have a cellular connection. Because computer system 1500B does not have a cellular connection, and is therefore unable to initiate a call with 911, and because the call is to an emergency service, computer system 1500A displays satellite communication button 1520B5 (e.g., as shown in FIG. 15L) and computer system 1500A displays prompt 1522A2 (e.g., as shown in FIG. 15K), which includes instructions for a user to try texting 911 via satellite on computer system 1500B. In some embodiments, satellite communication button 1520B5 is (or provides the same functionality as) satellite communication button 604G in FIG. 6G, satellite communication button 604I in FIG. 6I, or satellite communication button 904A in FIG. 9A.

In FIG. 15K, since computer system 1500B does not have a cellular connection, in addition to (e.g., concurrently with) prompt 1522A2, computer system 1500A displays call status indicator 1522A1, which indicates a status of no connection with a warning graphic (e.g., a circle with an exclamation point inside), and call again option 1522A3 (e.g., as described with reference to FIG. 15O) in user interface 1522A. In some embodiments, computer system 1500A replaces user interface 1520A with user interface 1522A (e.g., computer system 1500A ceases display of user interface 1520A and displays user interface 1522A). In some embodiments, in addition to or instead of call again option 1522A3, computer system 1500A displays a dismission option that, when selected, causes computer system 1500A to cease display of user interface 1522A, display a phone user interface (e.g., 1506A, 1516A, 1520A) or other user interface, and, optionally, end the attempt to initiate the call. In some embodiments, computer system 1500A ceases display of user interface 1522A, displays a phone user interface (e.g., 1506A, 1516A, or 1520A) or other user interface, and, optionally, ends the attempt to initiate the call in response to detecting an input (e.g., a press of rotatable input mechanism 1505A, a rotation of rotatable input mechanism 1505A, and/or a press of hardware button 1507A).

In FIG. 15L, since computer system 1500B does not have a cellular connection, call status indicator 1520B2 displays (or is updated to display) a status of no connection with a warning graphic (e.g., a circle with an exclamation point inside). In response to detecting input 1510F (e.g., a tap gesture or other selection input) selecting end call option 1520B4 in FIG. 15L, computer system 1500B stops attempting to initiate a call with 911. In response to detecting input 1510G (e.g., a tap gesture or other selection input) selecting satellite communication button 1520B5 in FIG. 15L, computer system 1500B initiates a process for aligning computer system 1500B with a satellite and/or sending a communication via a satellite communication network, as described in FIGS. 6M-6Y and/or 9A-9U. In some embodiments, in response to detecting input 1510G selecting satellite communication button 1520B5 when computer system 1500B is not properly aligned for communication with a satellite, computer system 1500B initiates an alignment process and/or displays one or more alignment interfaces or elements, such as alignment interfaces 902C-902J and 902O-902P depicted and described in FIGS. 9C-9J and 9O-9P, banner 926 depicted and described in FIGS. 9K-9N1, and/or graphical element 931 depicted and described in FIGS. 9K-9N1.

In some embodiments, if computer system 1500B does not detect selection of satellite communication button 1520B5 within a predetermined amount of time, computer system 1500B automatically sends (or initiates a process to send) a communication via a satellite communication network, as described in FIGS. 6I, 6M-6Y, and/or 9A-9B.

Figure 15N:
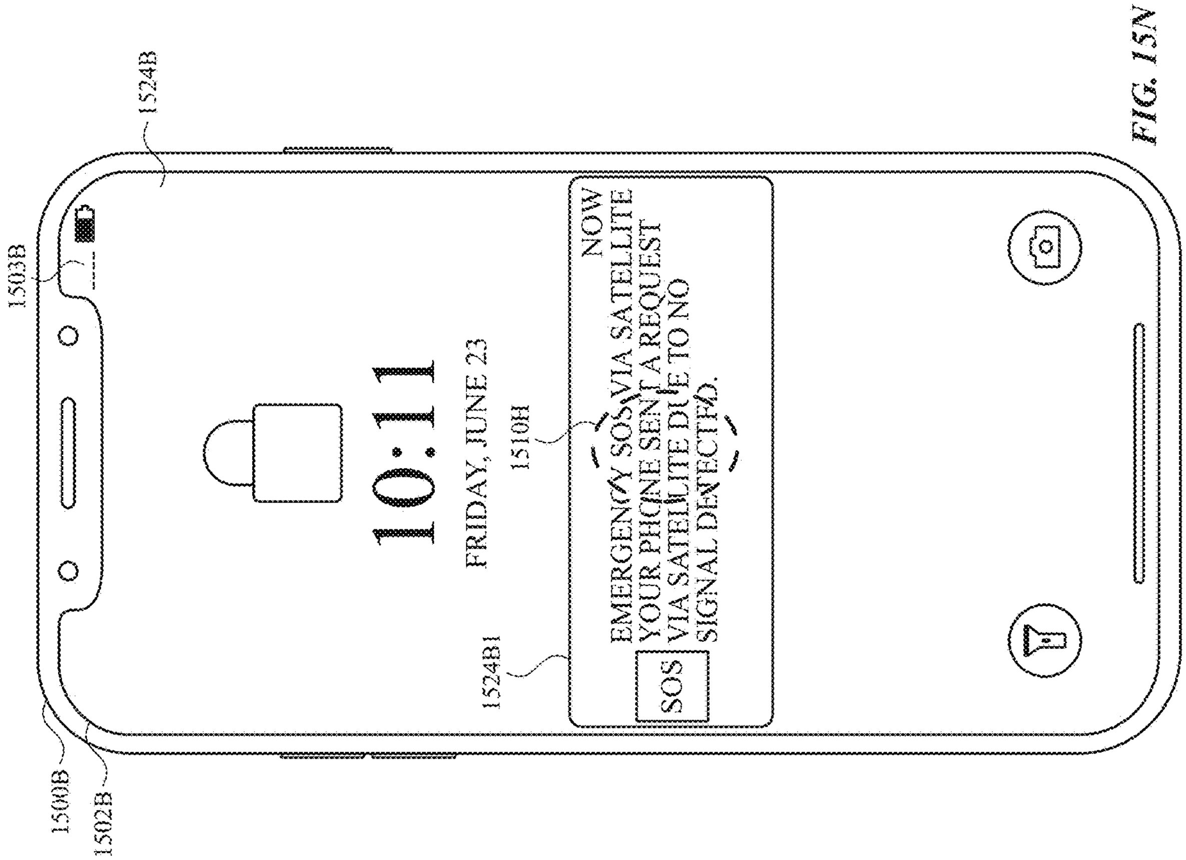
Figure 15M:

After a communication has been sent via a satellite communication network, computer system 1500A maintains display of user interface 1522A (e.g., as shown in FIG. 15M) and computer system 1500B displays notification 1524B1 (e.g., as shown in FIG. 15N). In some embodiments, user interface 1522A is updated to indicate a change in cellular signal status and either maintains display of prompt 1522A1 or ceases display of prompt 1522A1. Notification 1524B1 informs the user that computer system 1500B sent a request via satellite. In FIG. 15N, notification 1524B1 is displayed on lock screen 1524B. In some embodiments, when computer system 1500B is in a sleep state or a low-power state, computer system 1500B displays notification 1524B1 as shown in FIG. 15N. In some embodiments, when computer system 1500B is in an active state (e.g., not in a locked state and not in a sleep state or a low-power state), notification 1524B1 is displayed as a banner (e.g., at or near the top of display 1502B). In some embodiments, computer system 1500B displays notification 1524B1 in accordance with a determination that (e.g., only if) a communication was sent automatically via satellite automatically (e.g., without user input and/or because the user was unresponsive).

Figure 15P:
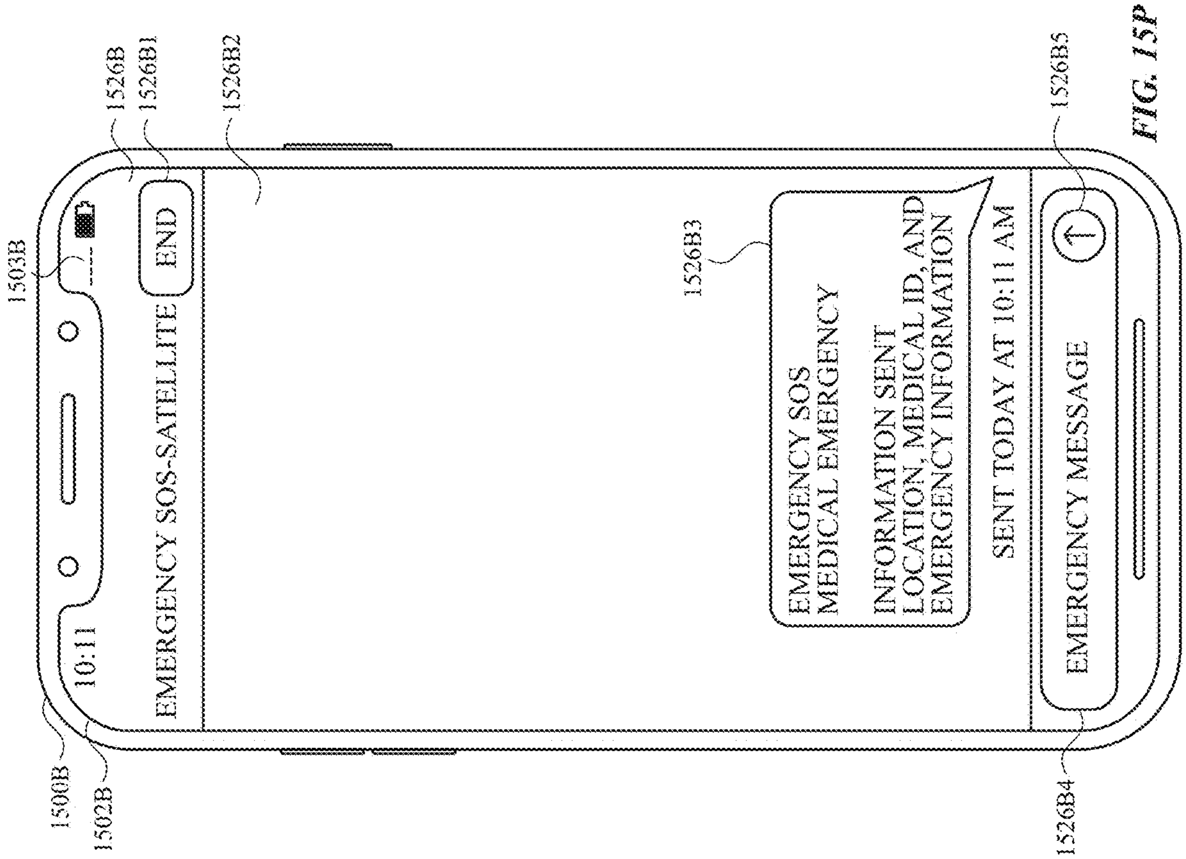

In FIG. 15N, computer system 1500B detects input 1510H (e.g., a tap gesture or other selection input) selecting notification 1524B1. In response to detecting input 1510H, computer system 1500B displays reporting interface 1526B, as shown in FIG. 15P. In some embodiments, reporting interface 1526B includes end button 1526B1, message region 1526B2, text message 1526B3, text entry field 1526B4, and send button 1526B5. In some embodiments, reporting interface 1526B is (or provides the same functionality as) messaging interface 602T described in FIG. 6T, reporting interface 602U described in FIG. 6U, or summary interface 602W described in FIG. 6W.

Figure 15O:
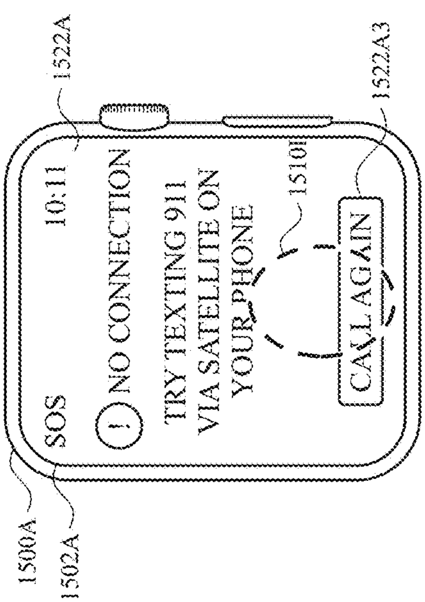
Figure 15R:
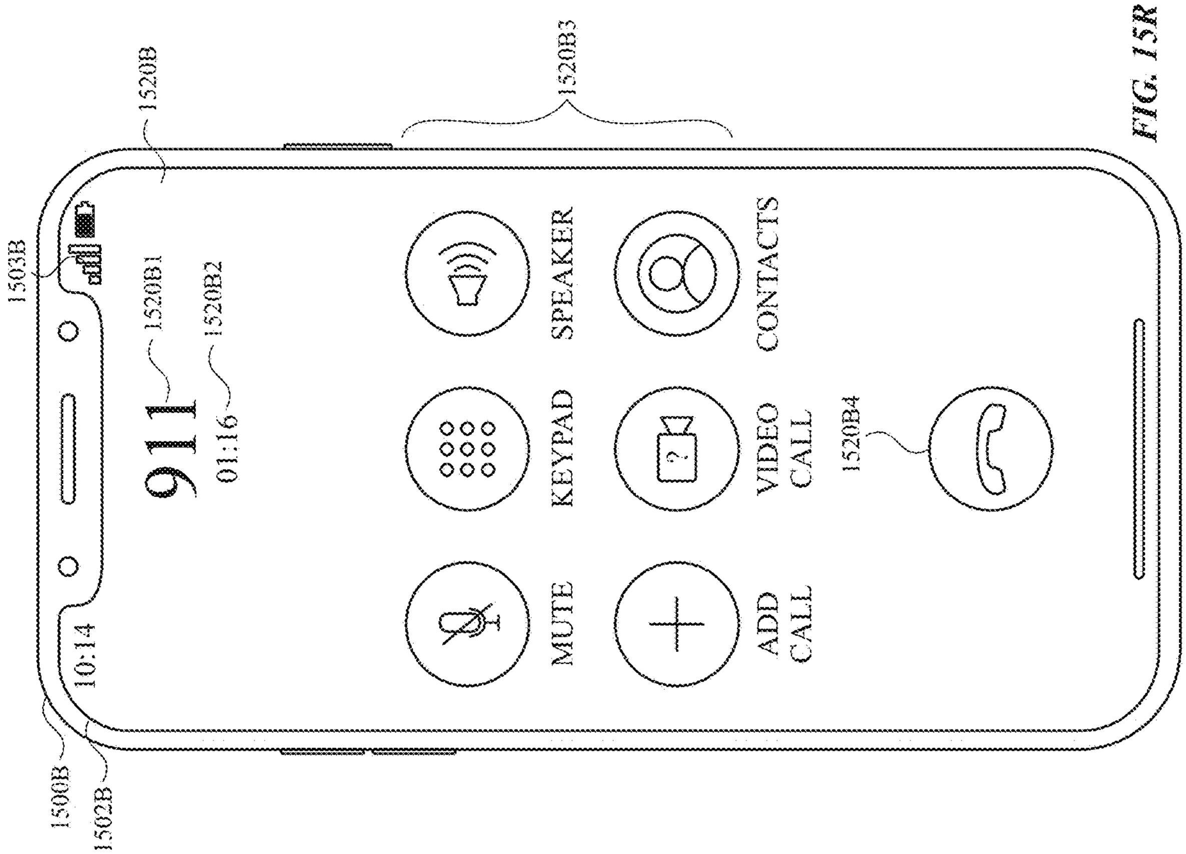
Figure 15Q:

In FIG. 15O, computer system 1500A detects input 1510I (e.g., a tap gesture or other selection input) selecting call again option 1522A3. In response to detecting input 1510I, computer system 1500A attempts (e.g., re-attempts) to initiate a call with emergency services via computer system 1500B. Since computer system 1500B has cellular service when computer system 1500A attempts to initiate the call (e.g., as indicated by network indicator 1503B in FIG. 15P), computer system 1500A and computer system 1500B are able to establish a call with 911, as shown in FIGS. 15Q and 15R. In FIG. 15Q, computer system 1500A displays calling interface 1520A, which shows the recipient (911) and the duration of the call (1 min 16 secs). In FIG. 15R, computer system 1500B displays calling interface 1520B. Compared to calling interface 1520B displayed when cellular service is not available (e.g., as shown in FIG. 15J and FIG. 15L), call status indicator 1520B2 displays the duration of the call and call management options 1520B3 are enabled.

Figure 15T:
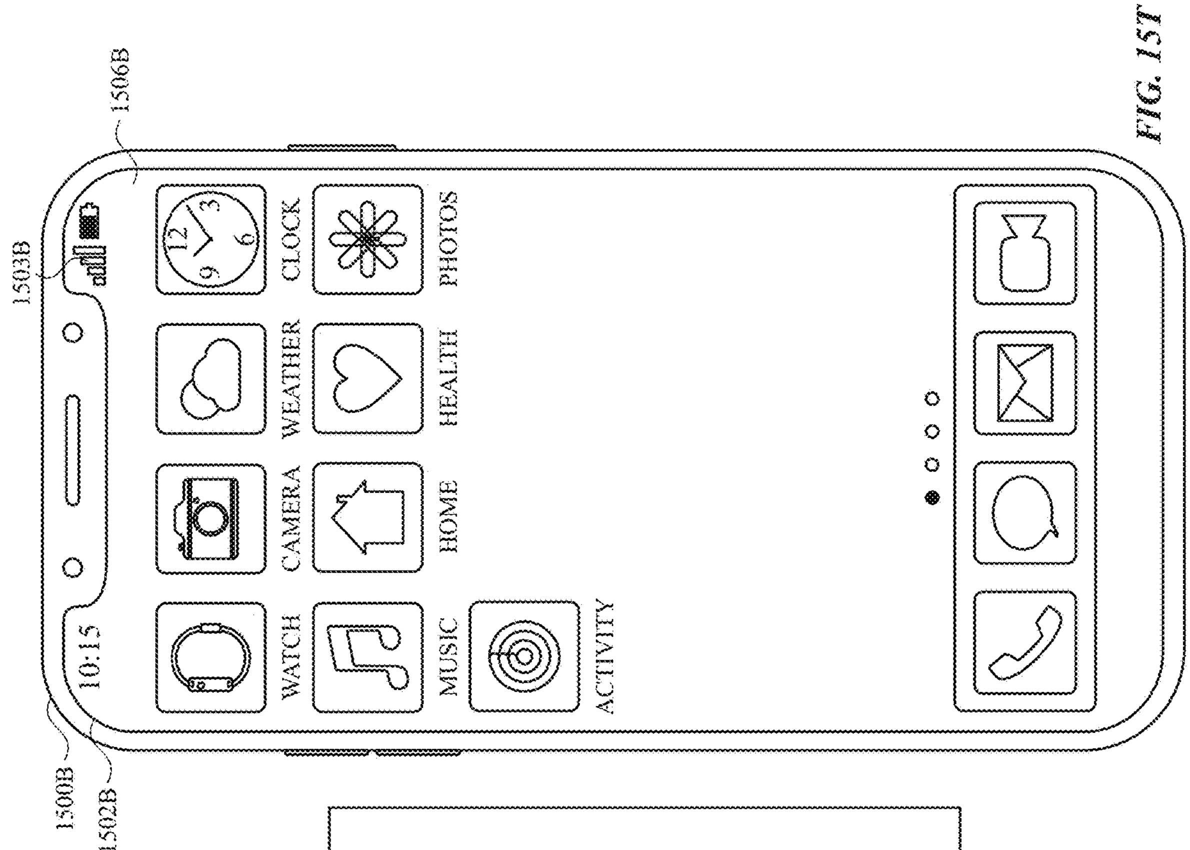
Figure 15S:
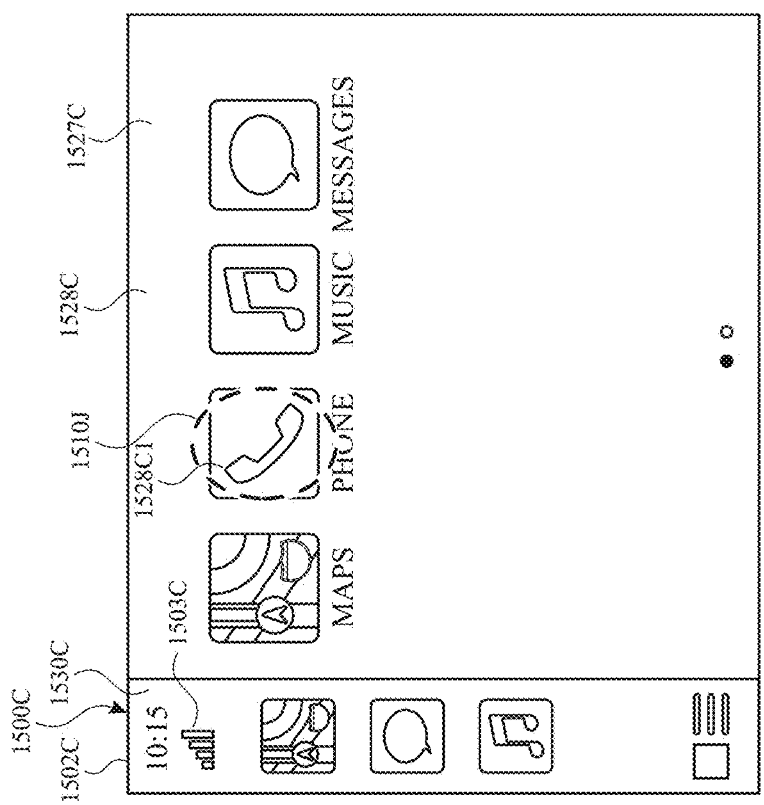

FIGS. 15S-15AF illustrate techniques for attempting to initiate a call with computer system 1500B and computer system 1500C, and for sending a communication via satellite if a cellular communication network is not available. FIG. 15S illustrates computer system 1500C, which includes display 1502C (e.g., a touch-sensitive display). In some embodiments, computer system 1500C is included in a vehicle (e.g., a car or truck). In some embodiments, computer system 1500C is or includes an in-car infotainment system. In some embodiments, computer system 1500C displays a user interface on a display in a vehicle (e.g., on a console of a vehicle). In some embodiments, the user interfaces displayed by computer system 1500C are controlled by computer system 1500B (e.g., via a wired or wireless communication link). In some embodiments, the user interfaces displayed by computer system 1500C are generated by computer system 1500B. In some embodiments, the user interfaces displayed by computer system 1500C are generated by computer system 1500C and displays information provided by computer system 1500B (e.g., computer system 1500B coordinates with computer system 1500C to display information).

In FIG. 15S, computer system 1500C displays user interface 1527C, which includes home screen 1528C and dock 1530C. Home screen 1528C includes selectable icons corresponding to respective applications that, when selected, open and/or launch the respective application. Dock 1530C includes network indicator 1503C. In some embodiments, network indicator 1503C indicates the network status of computer system 1500B. In some embodiments, network indicator 1503C indicates the network status of computer system 1500C (e.g., if computer system 1500C is enabled to independently communicate via cellular communication). In FIG. 15T, while computer system 1500C displays the user interface shown in FIG. 15S, computer system 1500B displays home screen 1506B, described with reference to FIG. 15B.

Figure 15V:
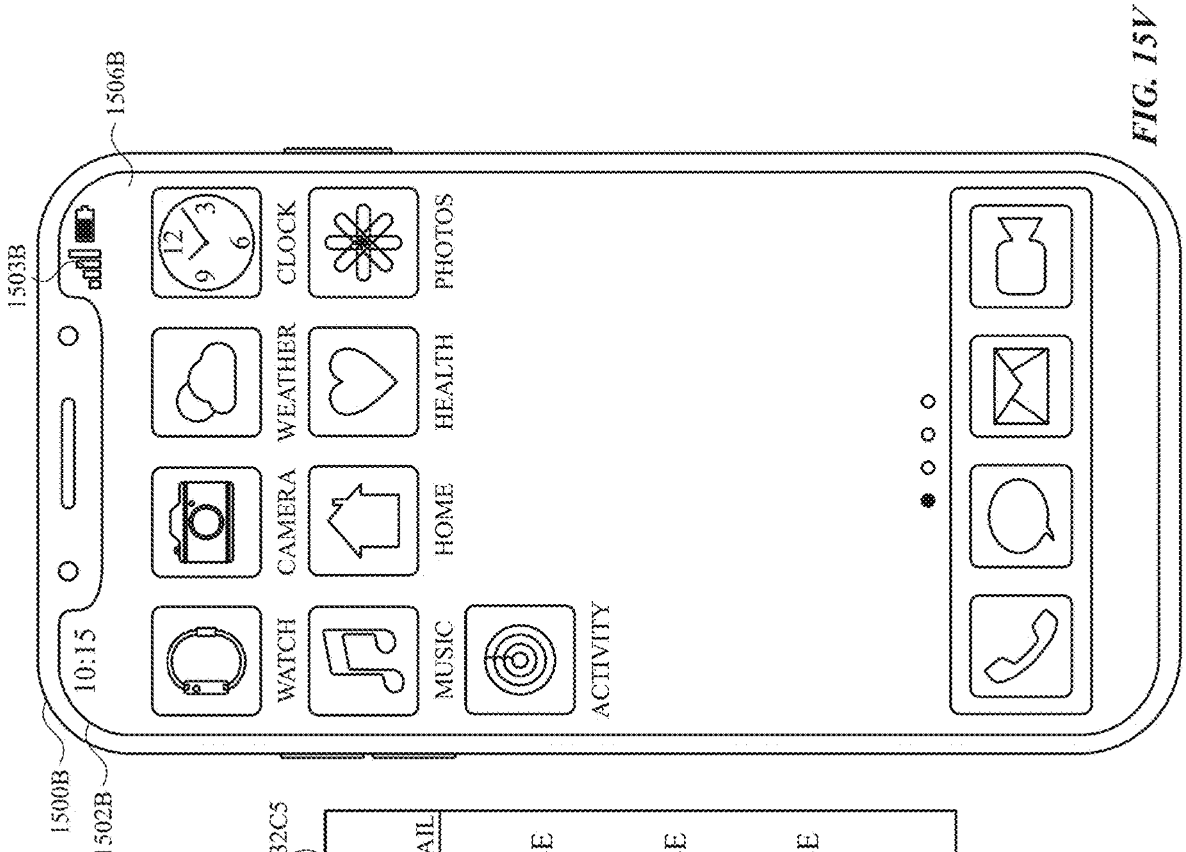
Figure 15U:
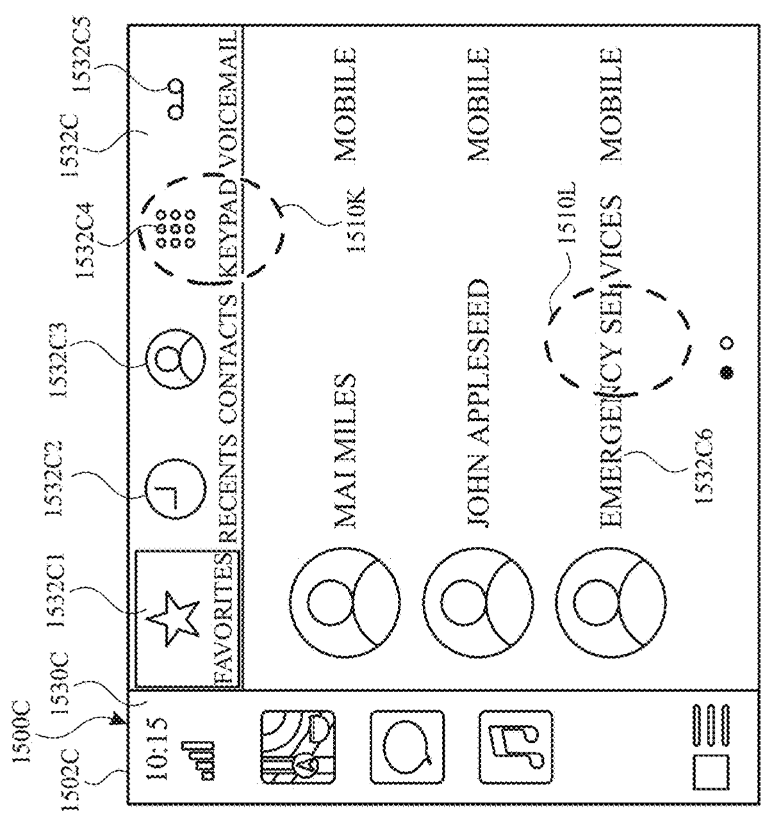

In FIG. 15S, computer system 1500C detects input 1520J (e.g., a tap gesture or other selection input) selecting icon 1528C1 corresponding to a phone application. In response to detecting input 1520J, computer system 1500C displays phone user interface 1532C of the phone application corresponding to icon 1528C1, as shown in FIG. 15U. Phone user interface 1532C includes options 1532C1-1532C5 (e.g., tabs) that can be selected to display favorite contactable users, recently contacted users, a contacts list (e.g., a list of contactable users associated with computer system 1500C), a keypad, and voicemails, respectively. In FIG. 15U, since favorites option 1532C1 is selected (e.g., as indicated by the outline around favorites option 1532C1), computer system 1500C displays a list of designated contactable entities, including emergency services option 1532C6 associated with emergency services. In FIG. 15V, user interface 1506B displayed on computer system 1500B remains unchanged compared to FIG. 15T.

Figure 15X:
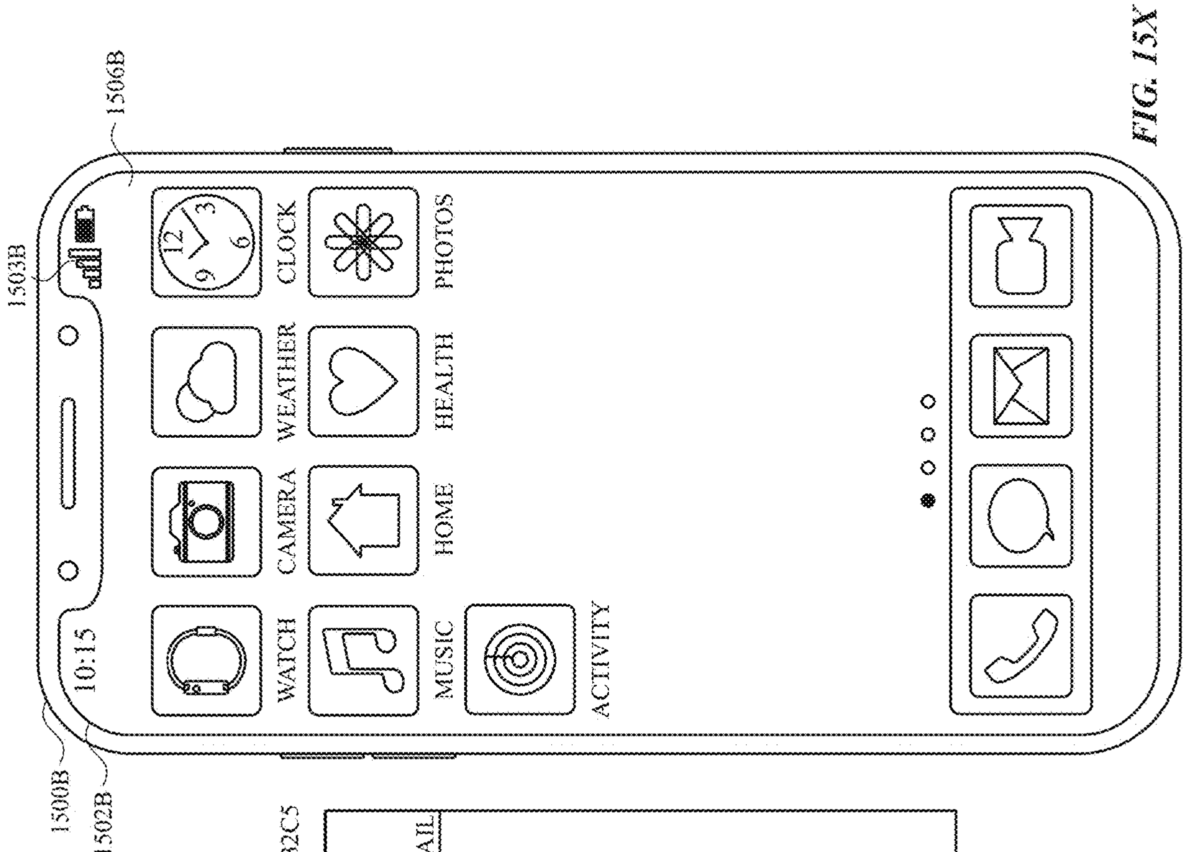

In FIG. 15U, computer system 1500C detects input 1510K (e.g., a tap gesture or other selection input) selecting keypad option 1532C6. In response to detecting input 1510K, computer system 1500C displays keypad 1532C7, recipient indicator 1532C8, and call option 1532C9. In FIG. 15X, while computer system 1500C displays the user interface shown in FIG. 15W, user interface 1506B displayed on computer system 1500B remains unchanged compared to FIG. 15V.

Figure 15W:
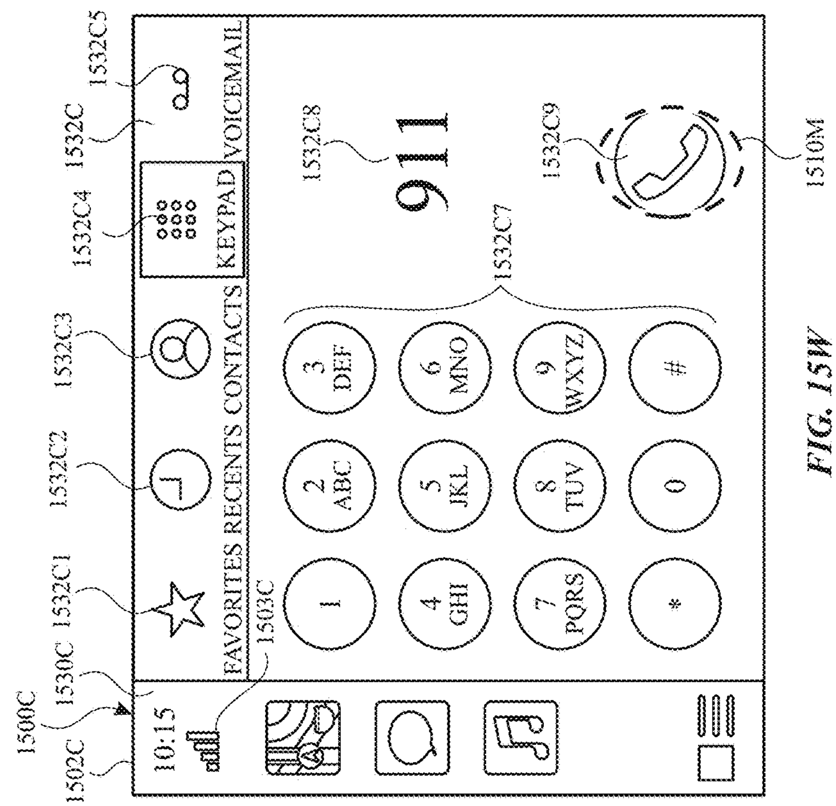
Figure 15Z:
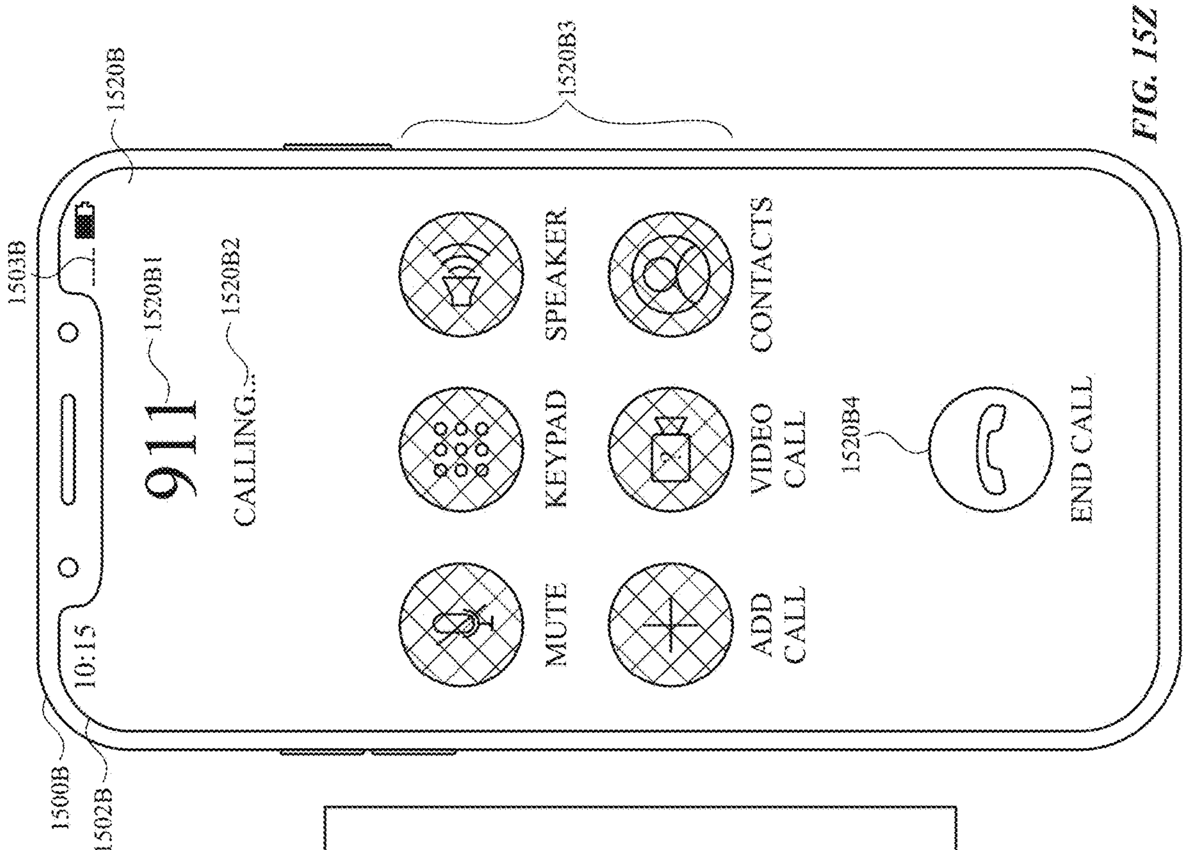
Figure 15Y:
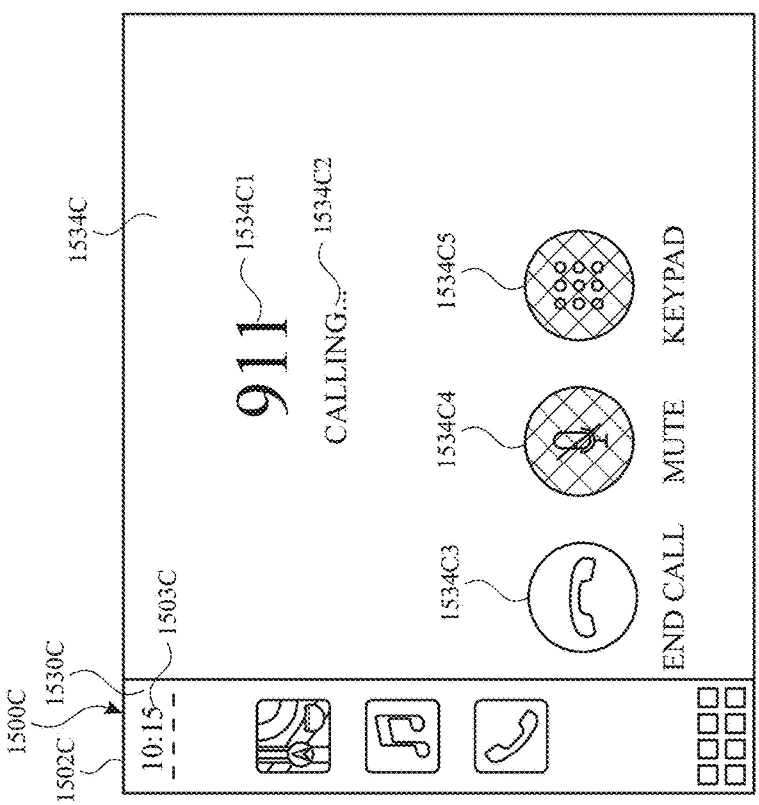
Figure 15A:
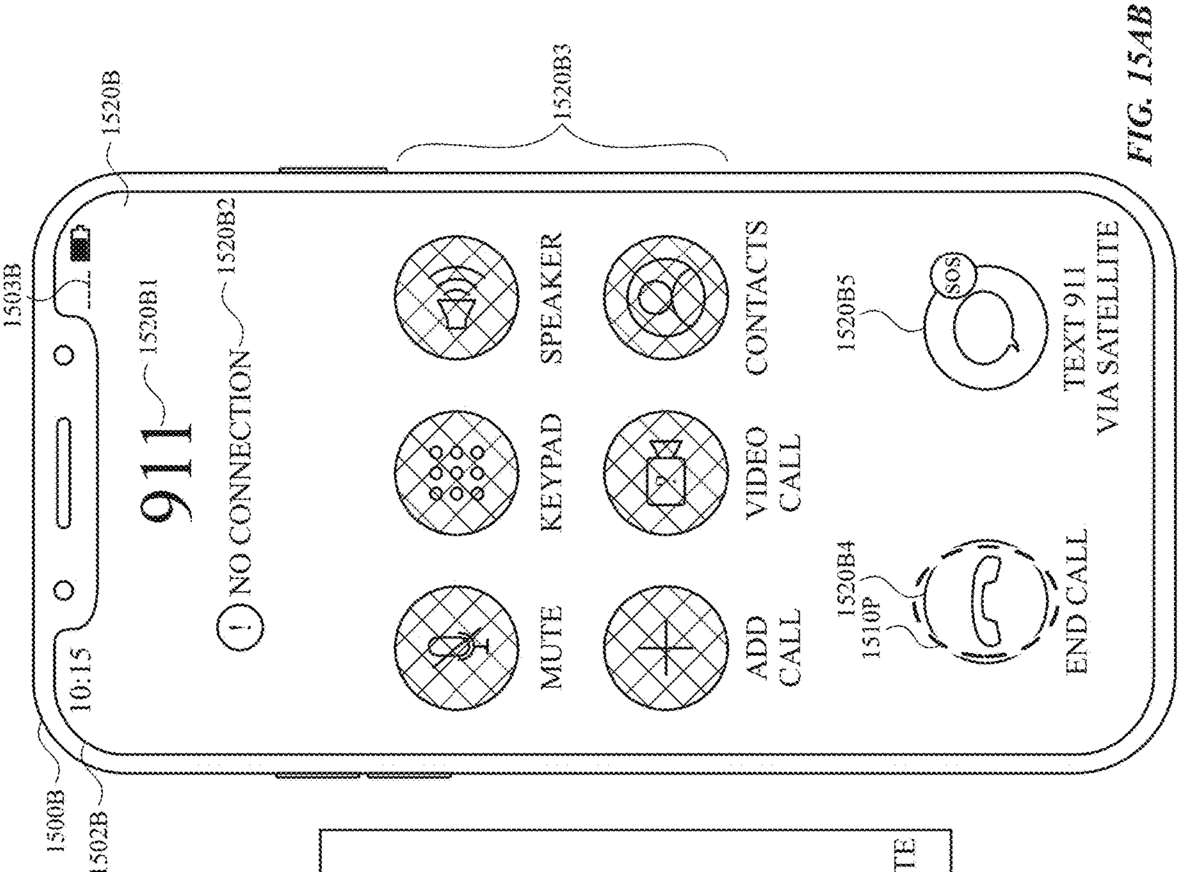
Figure 15A:
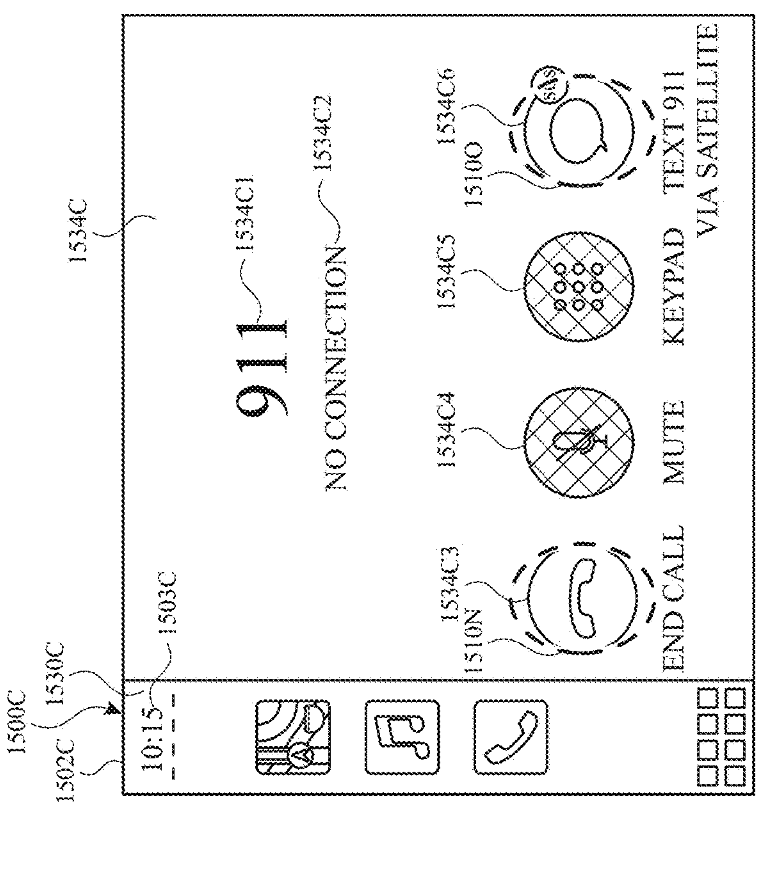
Figure 15A:
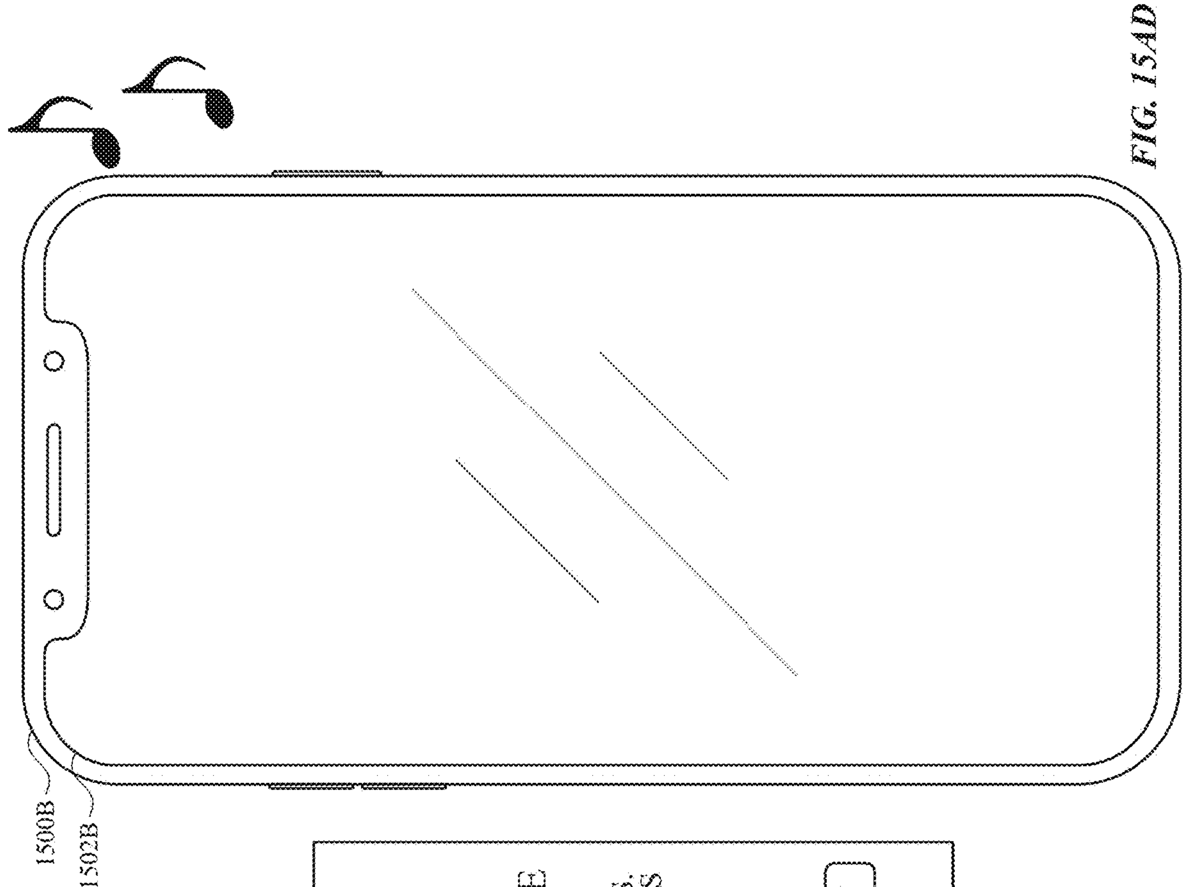
Figure 15A:
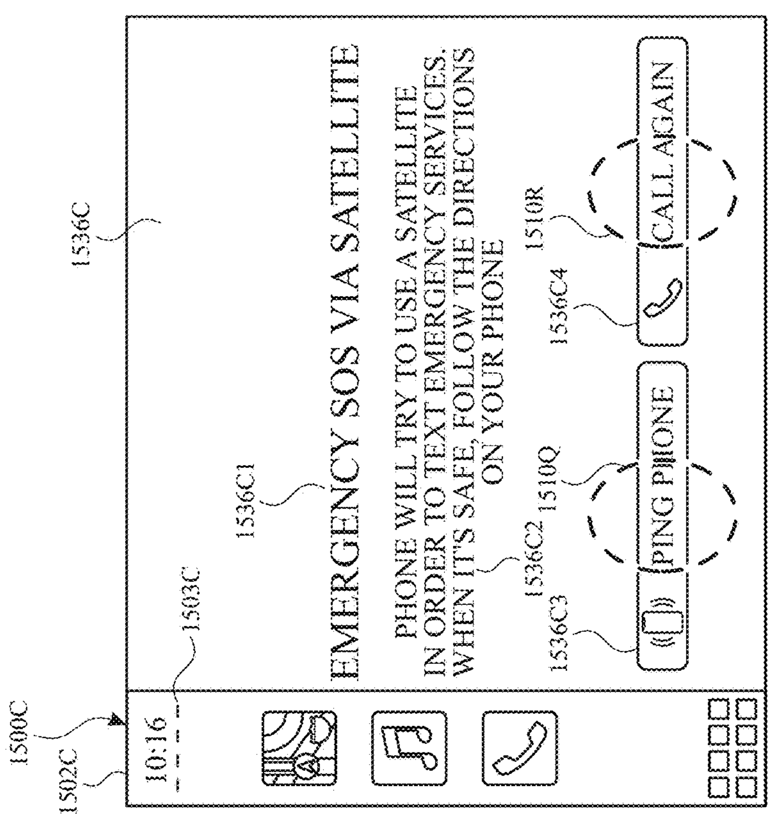
Figure 15A:
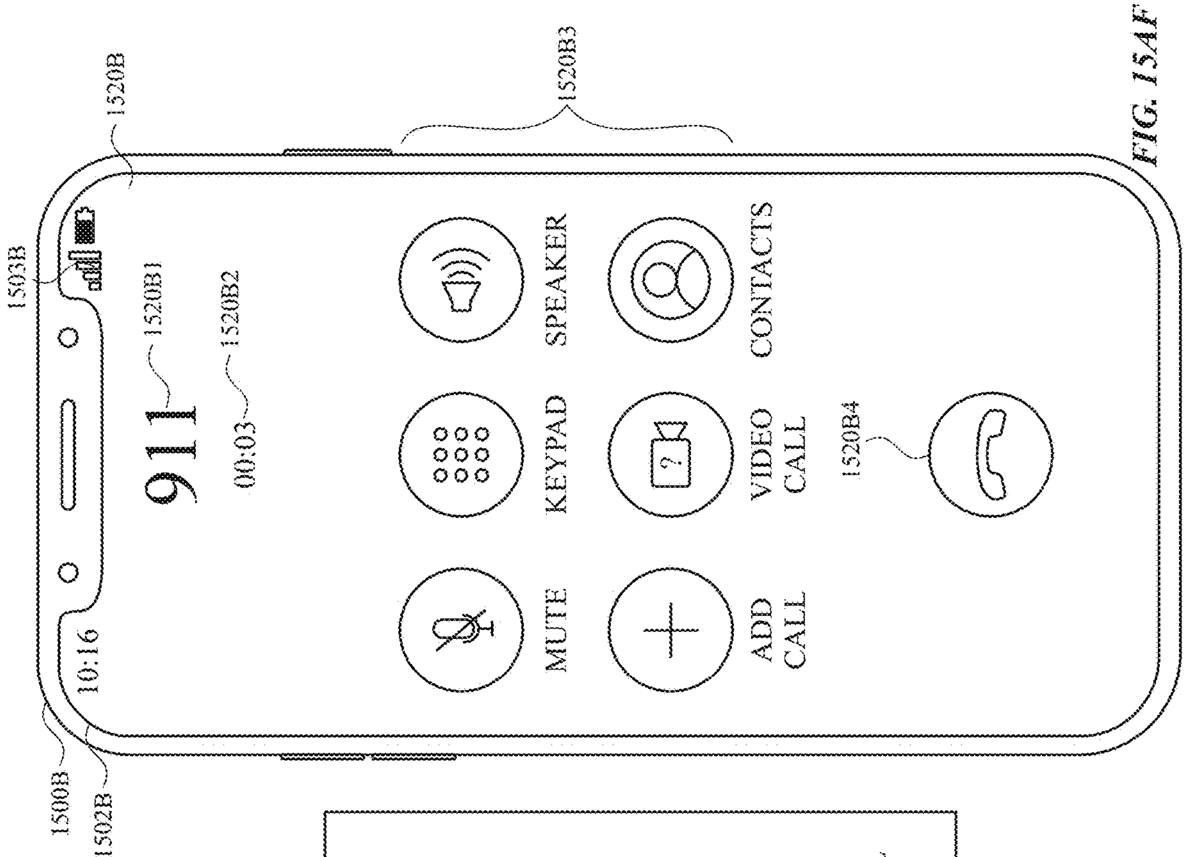
Figure 15A:
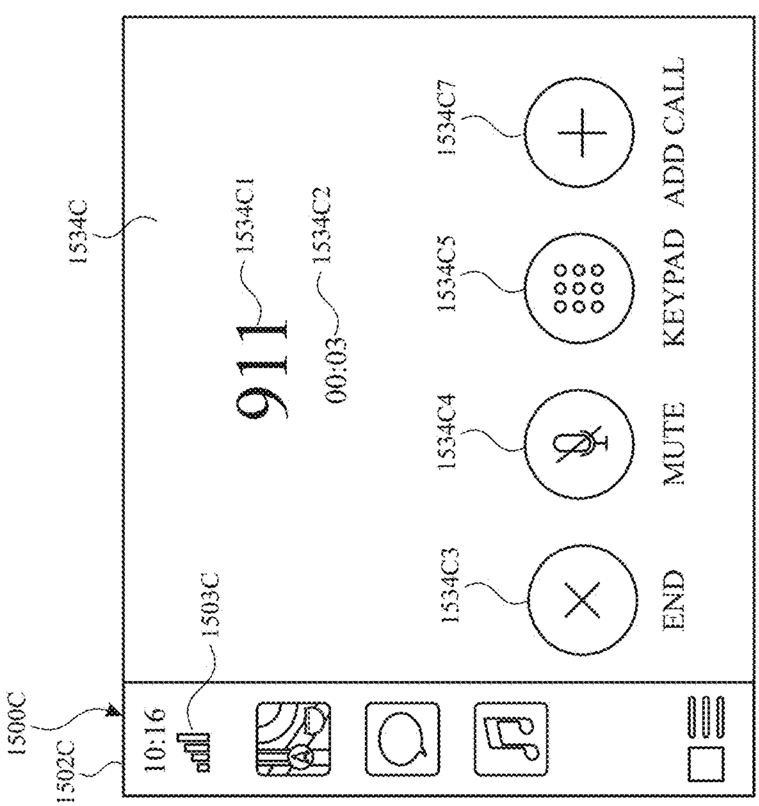

In FIG. 15W, keypad 1532C7 has been used to enter the digits 911, as indicated by recipient indicator 1532C8, and computer system 1500C detects input 1510M (e.g., a tap gesture or other selection input) selecting call option 1532C9. In response to detecting input 1510M, computer system 1500C displays calling interface 1534C (e.g., as shown in FIG. 15Y) and computer system 1500B displays calling interface 1520B (e.g., as shown in FIG. 15Z). Calling interface 1534C includes recipient indicator 1534C1, call status indicator 1534C2, and call management options 1534C3-1534C7, which include end call option 1534C3, mute option 1534C4, and keypad option 1534C5. In some embodiments, call management options 1534C3-1534C7 perform functions analogous to call management buttons 603 displayed and described in FIGS. 6K-6L. In some embodiments, computer system 1500C displays calling interface 1534C (e.g., as shown in FIG. 15Y) and computer system 1500B displays calling interface 1520B (e.g., as shown in FIG. 15Z) in response to detecting input 1510L (e.g., a tap gesture or other selection input) selecting emergency services option 1532C6 in FIG. 15U.

Network indicator 1503C in FIG. 15Y and network indicator 1503B in FIG. 15Z indicate that cellular service is not available. Because cellular service is not available and the attempted call is to emergency services, computer system 1500C and computer system 1500B display options to send a communication via satellite, as shown in FIGS. 15AA and 15AB. Computer system 1500C displays satellite communication button 1534C6 on calling interface 1534C, and computer system 1500B displays satellite communication button 1520B5 (e.g., described above with reference to FIG. 15L) on calling interface 1520B. In some embodiments, satellite communication button 1534C6 is (or provides the same functionality as) satellite communication button 604G in FIG. 6G, satellite communication button 604I in FIG. 6I, or satellite communication button 904A in FIG. 9A.

In FIG. 15AA, in response to detecting input 1510N (e.g., a tap gesture or other selection input) selecting end call option 1534C3, computer system 1500C causes the call to end. Similarly, in FIG. 15AB, in response to detecting input 1510P (e.g., a tap gesture or other selection input) selecting end call option 1520B4, computer system 1500B causes the call to end. In response to detecting input 1510O (e.g., a tap gesture or other selection input) selecting satellite communication button 1534C6 in FIG. 15AA, computer system 1500C initiates a process for aligning computer system 1500B with a satellite and/or sending a communication via a satellite communication network, as described in FIGS. 6M-6Y and/or 9A-9U. In some embodiments, in response to detecting input 1510O selecting satellite communication button 1534C6 when computer system 1500B is not properly aligned for communication with a satellite, computer system 1500B initiates an alignment process and/or displays one or more alignment interfaces or elements, such as alignment interfaces 902C-902J and 902O-902P depicted and described in FIGS. 9C-9J and 9O-9P, banner 926 depicted and described in FIGS. 9K-9N1, and/or graphical element 931 depicted and described in FIGS. 9K-9N1.

In some embodiments, if computer system 1500C and computer system 1500B do not receive any input while displaying user interface 1534C in FIG. 15AA and user interface 1520B in FIG. 15AB, respectively, computer system 1500B will attempt to use satellite in order to text emergency services, as indicated on user interface 1536C displayed on computer system 1500C in FIG. 15AC. User interface 1536C includes indication 1536C1 that emergency communication via satellite is available, indication 1536C2 that computer system 1500B will attempt to use satellite in order to text emergency services, ping option 1536C3, and call again option 1536C4. In response to detecting input 1510Q (e.g., a tap gesture or other selection input) selecting ping option 1536C3, computer system 1500C causes (e.g., sends instructions to) computer system 1500B to output audio, as shown in FIG. 15AD, in order to help a user locate computer system 1500B. In response to detecting input 1510R (e.g., a tap gesture or other selection input) selecting call again option 1536C4, computer system 1500C attempts (e.g., re-attempts) to initiate a call to emergency services using a cellular communication network (e.g., either independently or via computer system 1500B). In response to detecting input 1510R selecting call again option 1536C4 in FIG. 15AC, a call to emergency services is able to be established because a cellular communication network is available, as indicated by network indicator 1503C in FIG. 15AE and network indicator 1503B in FIG. 15AF. FIG. 15AE illustrates calling interface 1534C displayed on computer system 1500C in response to detecting input 1510R selecting call again option 1536C4 in FIG. 15AC, and indicates that the call has been established by displaying the call duration in call status indicator 1534C2 and by enabling call management options 1534C3-1534C7. Similarly, FIG. 15AF illustrates calling interface 1520B displayed on computer system 1500B in response to detecting input 1510R selecting call again option 1536C4 in FIG. 15AC, and indicates that the call has been established by displaying the call duration in call status indicator 1520B2 and by enabling call management options 1520B3.

FIG. 16 is a flow diagram illustrating a method for initiating a communication using a computer system in accordance with some embodiments. Method 1600 is performed at a computer system (e.g., 100, 300, 500, 600, 900, 1100, 1300A, 1300B, 1500A, and/or 1500C) (e.g., a device connected wired and/or wirelessly to an external computer system, an in-car infotainment device, a smartwatch, a laptop computer, a tablet computer, a smartphone, a desktop computer, or a head mounted device (e.g., a head mounted augmented reality and/or extended reality device)) that is in communication with an output generation component (e.g., a display controller, a display generation component, a touch-sensitive display system, a speaker, a haptic generation component, and/or a head mounted display system), one or more input devices (e.g., 1502A, 1502B, or 1502C) (e.g., a touch-sensitive surface, a touchscreen, a button, an accelerometer, a heartrate sensor, a blood oxygen monitor, and/or a microphone), and an external computer system (e.g., 1500B) (e.g., a smartphone, a smart watch, a laptop, and/or a tablet). In some embodiments, the computer system is in communication with the external computer system via a wired and/or wireless network (e.g., Bluetooth and/or Wi-Fi). Some operations in method 1600 are, optionally, combined, the orders of some operations are, optionally, changed, and some operations are, optionally, omitted.

As described below, method 1600 provides an intuitive way for initiating a communication. The method reduces the cognitive burden on a user for initiating a communication, thereby creating a more efficient human-machine interface. For battery-operated computing devices, enabling a user to initiate a communication faster and more efficiently conserves power and increases the time between battery charges.

The computer system receives (1602) a request (e.g., 1510A, 1510B, 1510C, 1510D, 1510E1, 1510E2, 1510E3, 1510I, 1510J, 1510K, 1510L, 1510M, and/or 1510R) (e.g., an input on: a selectable option, an affordance, a button, a graphical element, a graphical object, and/or an icon displayed on the output generation component), via the one or more input devices, to initiate a communication (e.g., to emergency services, and/or to an emergency contact). In some embodiments, the request is a voice command. In some embodiments, the request to initiate a communication is to an external computer system. In response to receiving the request to initiate the communication (1604): in accordance with a determination that the external computer system is connected to (e.g., in communication with) a terrestrial wireless communication network (e.g., as indicated by cellular status indicator 1303A, 1503A, 1503B and/or 1503C) (e.g., a cellular network and/or Wi-Fi network), the computer system initiates (1606) a process for communicating (e.g., communicating with emergency services or a contact, sending a text, initiating an audio call, sending an email, and/or initiating an audio/video conference) via a terrestrial wireless communication network (e.g., as shown in FIGS. 15Q, 15R, 15AE, and/or 15AF); and in accordance with a determination that the external computer system is not connected to a terrestrial wireless communication network (e.g., the external computer system is not connected to the terrestrial wireless communication network and/or the computer system is unable to receive a signal with sufficient reception and/or consistency to communicate via the terrestrial wireless communication network), the computer system provides (1608), via the output generation component, a prompt (e.g., 1522A2 or 1534C6) (e.g., a notification, an audio output, a haptic output, a visual notification, textual instructions, video instructions, a graphical element, a graphical object, and/or an icon) to use the external computer system to connect to (e.g., to connect the computer system and/or the external computer system to) a non-terrestrial network (e.g., satellite communication network and/or a low-bandwidth communication network). Providing a prompt to use the external computer system to connect to a non-terrestrial network in accordance with a determination that the external computer system is not connected to the terrestrial wireless network provides the user with information about an operation available on the external computer system and guides the user to the appropriate device to initiate the communication, which provides improved visual feedback and reduces the number of inputs needed to perform an operation.

In some embodiments, the terrestrial wireless communication network is a cellular network associated with the computer system (e.g., provided by the user's cellular service provider) or another cellular network (e.g., provided by another cellular service provider). In some embodiments, for an emergency call, the computer system can use a network provided by a network provider other than a provider associated with the computer system. In some embodiments, the external computer system is connected to a terrestrial wireless communication network when the external computer system is receiving sufficient cellular service and/or consistency of connection to communicate. In some embodiments, the prompt was not previously displayed. In some embodiments, in accordance with the determination that the external computer system is connected to the terrestrial wireless communication network, the computer system forgoes providing the prompt to use the external computer system to connect to a non-terrestrial network (e.g., initiates the process for communicating via a terrestrial wireless communication network without providing the prompt to use the external computer system to connect to a non-terrestrial network). In some embodiments, in response to receiving the request to initiate the communication, the computer system provides the prompt to use the external computer system to connect to the non-terrestrial network in accordance with a determination that the external computer system is configured to connect to the non-terrestrial network, is connected to the non-terrestrial network, and/or is configured to communicate via the non-terrestrial network. In some embodiments, in response to receiving the request to initiate the communication, the computer system forgoes providing the prompt to use the external computer system to connect to the non-terrestrial network in accordance with a determination that the external computer system is not configured to connect to the non-terrestrial network, is not connected to the non-terrestrial network, and/or is not configured to communicate via the non-terrestrial network.

In some embodiments, the prompt to use the external computer system to connect to the non-terrestrial network includes an indication (e.g., instructions, text, and/or graphical indicator(s)) that satellite communication is available (e.g., that the external computer system is capable of connecting to a satellite communication network and/or that the external computer system is capable of communication, such as sending a text message, via satellite communication) (e.g., "TRY TEXTING 911 VIA SATELLITE ON YOUR PHONE" in 1522A2 and/or "TEXT 911 VIA SATELLITE" displayed below satellite communication button 1534C6). Displaying an indication that satellite communication is available provides the user with additional information about the type of communication that can be performed with the external computer system, which improves visual feedback to the user and reduces the number of inputs needed to perform an operation.

In some embodiments, after receiving the request to initiate the communication (e.g., 1510A, 1510B, 1510C, 1510D, 1510E1, 1510E2, 1510E3, 1510I, 1510J, 1510K, 1510L, 1510M, and/or 1510R): in accordance with a determination that an attempt to communicate via the non-terrestrial network has been made (or, optionally, that a communication has been sent) (e.g., by the computer system and/or by the external computer system), the computer system causes output (e.g., display) of (e.g., on the computer system and/or the external computer system) an attempted-communication notification (e.g., 1524B1) (e.g., a visual notification, a textual notification, a tactile notification, and/or an audio notification) that an attempt to communicate via the non-terrestrial network has been made. In some embodiments, the attempted-communication notification is displayed on a wake screen (e.g., a lock screen). Providing a notification in accordance with a determination that an attempt to communicate via the non-terrestrial network has been made provides a user with information about an operation performed by the computer system of which a user may not have been aware, which provides improved visual feedback.

In some embodiments, the computer system is wearable (e.g., the computer system is 1500A) (e.g., the computer system includes a wearable device, a watch, a band, a strap, and/or an operating system on a wearable device). A wearable computer system provides convenient access to information and an efficient way to provide inputs, which provides improved visual feedback and reduces the number of inputs needed to perform an operation. In some embodiments, the computer system is included in a vehicle (e.g., the computer system is 1500C) (e.g., a car or truck; the computer system is or includes an in-car infotainment system). In some embodiments, the computer system displays a user interface on a display in a vehicle (e.g., on a console of a vehicle). In some embodiments, the user interface is controlled by the external computer system (e.g., via a wired or wireless communication link). In some embodiments, the user interface is generated by the external computer system. In some embodiments, the user interface is generated by the computer system and displays information provided by the external computer system (e.g., the external computer system coordinates with the computer system to display information). Including the computer system in a vehicle provides convenient access to the prompt to use the external computer system to connect to a non-terrestrial network when a user is in a vehicle, which provides improved visual feedback and reduces the number of inputs needed to perform an operation.

In some embodiments, while providing the prompt to use the external computer system to connect to the non-terrestrial network, the computer system attempts (e.g., continues to attempt) to communicate via the terrestrial wireless communication network (e.g., while computer system 1500A displays prompt 1522A2 in FIGS. 15K, 15M, and/or 150, computer system 1500A and/or computer system 1500B attempts to communicate via a cellular communication network; while computer system 1500C displays satellite communication button 1534C6 in FIG. 15AA, computer system 1500C and/or computer system 1500B attempts to communicate via a cellular communication network). In some embodiments, the computer system and/or the external computer system attempts to communicate via the terrestrial wireless communication network while providing the prompt to use the external computer system to connect to the non-terrestrial network. In some embodiments, attempting to communicate via the terrestrial wireless communication network while providing the prompt to use the external computer system to connect to the non-terrestrial network is performed in accordance with a determination that the request to initiate communication is a request to initiate communication with an emergency service. In some embodiments, the computer system (and/or, optionally, the external computer system) forgoes attempting (or continuing to attempt) to communicate via the terrestrial wireless communication network while providing the prompt to use the external computer system to connect to the non-terrestrial network in accordance with a determination that the request to initiate communication is not a request to initiate communication with an emergency service (e.g., the computer system and/or the external computer system attempt to communicate via the terrestrial wireless communication network while providing the prompt to use the external computer system to connect to the non-terrestrial network only for requests to initiate communication with an emergency service). Attempting to communicate via the terrestrial wireless communication network allows the computer system to continue to attempt one communication method (e.g., a more data dense method), without additional user input, while providing an option for another communication method, which reduces the number of inputs needed by a user to perform an action and, provides additional control options without cluttering the user interface.

In some embodiments, after attempting to communicate via the terrestrial wireless communication network while providing the prompt to use the external computer system to connect to the non-terrestrial network: in accordance with a determination that attempting to communicate via the terrestrial wireless communication network has stopped (e.g., in response to receiving an input corresponding to a request to stop attempting to communicate or in accordance with a determination that a time threshold is met), the computer system changes (e.g., updating) a user interface (e.g., computer system 1500A ceases display of 1522A2 and, optionally, displays user interface 1506A, 1508A, 1514A, or 1516A; computer system 1500C ceases display of satellite communication button 1534C6 and, optionally, displays user interface 1527C, 1532C in FIG. 15U, 1532C in FIG. 15W, or 1536C). Changing the user interface in accordance with a determination that attempts to communicate via the terrestrial wireless communication network have stopped provides the user with feedback that the computer system and/or the external computer system are no longer attempting to communicate via the terrestrial wireless communication network and indicates to the user that further user input may be required to re-initiate attempts to communicate via the terrestrial wireless communication network, which provides improved visual feedback and reduces the number of inputs needed to perform an operation. In some embodiments, the computer system and/or the external computer system stop attempting to communicate via the terrestrial wireless communication network in response to detecting a user input corresponding to a request to stop attempting to communicate via the terrestrial wireless communication network. In some embodiments, changing the user interface is performed in response to detecting the user input corresponding to a request to stop attempting to communicate via the terrestrial wireless communication network. In some embodiments, changing the user interface includes changing one or more elements (e.g., a notification, a prompt, text, and/or a graphical indication) of the user interface. In some embodiments, the computer system and/or the external computer system stop attempting to communicate via the terrestrial wireless communication network in accordance with a determination that a time threshold has been met, such as a predetermined amount of time after receiving the request to initiate the communication or after providing the prompt for a predetermined amount of time. In some embodiments, changing the user interface includes displaying an option that, when selected, causes the computer system and/or the external computer system to attempt to communicate (e.g., to call or re-dial emergency services) via the terrestrial wireless communication network. In some embodiments, changing the user interface includes replacing an end call option and/or a dismiss option with an option that, when selected, causes the computer system and/or the external computer system to attempt to communicate (e.g., to call or re-dial emergency services) via the terrestrial wireless communication network.

In some embodiments, while providing the prompt (e.g., 1522A2 and/or 1534C6) to use the external computer system to connect to the non-terrestrial network and attempting (e.g., continuing to attempt) to communicate via the terrestrial wireless communication network, the computer system detects a user input (e.g., 1510I, a press of rotatable input mechanism 1505A, a rotation of rotatable input mechanism 1505A, and/or a press of hardware button 1507A, such as input 1510A) (e.g., a tap gesture or other selection input on a dismiss option, and/or a voice command) corresponding to a request to dismiss the prompt to use the external computer system to connect to the non-terrestrial network; and in response to detecting the user input corresponding to a request to dismiss the prompt to use the external computer system to connect to the non-terrestrial network, the computer system displays a phone user interface (e.g., 1506A, 1516A, or 1532C in FIG. 15U or 15W) (e.g., a user interface of a phone application and/or a calling user interface). In some embodiments, the phone user interface includes an indication that an attempt to communicate via the terrestrial wireless communication network is being made (e.g., by the computer system and/or by the external computer system). In some embodiments, the phone user interface includes options to control a phone call (e.g., to end a phone call and/or to attempt to initiate a phone call), to control a speaker function, to control a mute function, to display a keypad, and/or to view and/or select contactable users. In some embodiments, the phone user interface is displayed prior to providing the prompt to use the external computer system to connect to the non-terrestrial network (e.g., the phone user interface is re-displayed in response to detecting the user input corresponding to a request to dismiss the prompt to use the external computer system to connect to the non-terrestrial network). In some embodiments, in response to detecting the user input corresponding to a request to dismiss the prompt to use the external computer system to connect to the non-terrestrial network, the computer system and/or the external computer system ceases attempting to communicate via the terrestrial wireless communication network. In some embodiments, in response to detecting the user input corresponding to a request to dismiss the prompt to use the external computer system to connect to the non-terrestrial network, the computer system and/or the external computer system ceases displaying an option to dismiss the prompt to use the external computer system to connect to the non-terrestrial network. Displaying a phone user interface in response to detecting the user input corresponding to a request to dismiss the prompt to use the external computer system to connect to the non-terrestrial network informs the user of a status of an attempt to communicate via the terrestrial wireless communication network and provides a user with quick access to the ability to attempt (or re-attempt) to initiate communication (either with an emergency service or another entity) via a terrestrial wireless communication network, which provides improved visual feedback to the user and reduces the number of inputs needed to perform an operation.

In some embodiments, attempting to communicate via the terrestrial wireless communication network includes automatically (e.g., without user input) attempting to initiate the communication (e.g., a phone call and/or a test message) via the terrestrial wireless communication network in response to receiving the request (e.g., 1510A, 1510B, 1510C, 1510D, 1510E1, 1510E2, 1510E3, 1510I, 1510J, 1510K, 1510L, 1510M, and/or 1510R) to initiate the communication, and after (or, optionally, while) attempting to communicate via the terrestrial wireless communication network and while providing the prompt (e.g., 1522A2 and/or 1534C6) to use the external computer system to connect to the non-terrestrial network, a phone user interface (e.g., 1505B or 1520B) is displayed by the external computer system (e.g., 1500B). In some embodiments, the phone user interface includes an indication that an attempt to communicate via the terrestrial wireless communication network is being made (e.g., by the computer system and/or by the external computer system). In some embodiments, the phone user interface includes options to control a phone call (e.g., to end a phone call and/or to attempt to initiate a phone call), to control a speaker function, to control a mute function, to display a keypad, and/or to view and/or select contactable users. Automatically attempting to initiate the communication via the terrestrial wireless communication network and displaying a phone user interface enables communication without requiring a user input which can be beneficial in emergency situations where a user cannot provide a user input to initiate the communication via a terrestrial wireless network, which provides improved visual feedback and reduces the number of inputs needed to perform an operation.

In some embodiments, in response to receiving the request (e.g., 1510A, 1510B, 1510C, 1510D, 1510E1, 1510E2, 1510E3, 1510I, 1510J, 1510K, 1510L, 1510M, and/or 1510R) to initiate the communication, and in accordance with a determination that the external computer system (e.g., 1500B) is not connected to a terrestrial wireless communication network, the computer system displays, via the output generation component, an option (e.g., 1534C6) that, when selected (e.g., via a tap gesture on the option), initiates a process (e.g., on the computer system and/or the external computer system) for communicating (e.g., sending a text message, an instant message, a voice message, and/or an email) via a non-terrestrial network (e.g., using the computer system and/or the external computer system). In some embodiments, the prompt to use the external computer system to connect to a non-terrestrial network includes the option that, when selected, initiates a process for communicating via a non-terrestrial network. Displaying an option to initiate a process for communicating via a non-terrestrial network in response to receiving the request to initiate the communication, and in accordance with a determination that the external computer system is not connected to a terrestrial wireless communication network, provides the user with an option to initiate communication using a method that is less data intense compared to a call or other forms of communication, which can be beneficial in situations where the computer system is unable to communicate via other forms of communication, which provides improved visual feedback and reduces the number of inputs needed to perform an operation.

In some embodiments, the request to initiate the communication includes data indicating that a user of the computer system has fallen (e.g., as described with reference to FIG. 15H). In some embodiments, in response to receiving the request to initiate the communication: the computer system automatically (e.g., without user input) attempts to communicate (e.g., via the terrestrial wireless communication network and/or the non-terrestrial wireless communication network) with a predetermined entity (e.g., 911, emergency services, and/or one or more predetermined contactable entities, such as a designated emergency contact) (e.g., as described with reference to FIG. 15H). In some embodiments, the computer system is in communication with one or more motion sensors (e.g., accelerometers and/or gyroscopes) that are configured to detect motion of the computer system. In some embodiments, a determination is made that a user has fallen when motion (e.g., a detected velocity and/or acceleration) of the computer system (or another device associated with the user) meets a set of motion criteria (e.g., meets or exceeds a threshold velocity and/or acceleration). In some embodiments, the computer system is in communication with one or more biometric sensors (e.g., a heartrate sensor and/or a blood oxygen monitor) that can be used to determine that a user has fallen. In some embodiments, in response to receiving the request to initiate the communication, and prior to automatically attempting to communicate, the computer system displays a countdown (e.g., a numeric countdown of an amount of time until the computer system will automatically attempt to communicate). In some embodiments, the computer system displays, concurrently with the countdown, a selectable option to cancel the countdown (e.g., if the option to cancel the countdown is selected before the countdown ends, the computer system does not automatically attempt to communicate). In some embodiments, the computer system displays the countdown, displays the option to cancel the countdown, and/or automatically attempts to communicate in accordance with a determination that a user of the computer system has fallen. Automatically attempting to communicate in response to detecting that a user has fallen provides a user with a means to communicate when the user is injured and/or unable to interact with the computer system (e.g., if the user is unable to initiate the communication), which reduces the number of inputs needed to perform an operation.

In some embodiments, after automatically attempting to communicate with a predetermined entity: in accordance with a determination that a message was automatically sent via a non-terrestrial network (e.g., via one or more satellites), the computer system (e.g., 1500A, 1500B, and/or 1500C) displays an indication (e.g., 1524B1, 1526B3, and/or 1536C2) (e.g., a summary user interface, a notification, text, and/or a graphic) that a message was automatically sent via a non-terrestrial network. In some embodiments, the indication that a message was automatically sent via a non-terrestrial network is displayed on the external computer system (e.g., in accordance with a determination that a message was automatically sent via a non-terrestrial network). In some embodiments, displaying the indication that a message was automatically sent via a non-terrestrial network includes displaying a summary of information (e.g., location, medical information, and/or identifying information) that was included in the message. Displaying a an indication that a message was automatically sent via a non-terrestrial network in accordance with a determination that a message was automatically sent via a non-terrestrial network provides a user with information about the message, enables a user to take remedial action if the attempt to communicate (e.g., an attempted call to emergency services) was not needed or desired, and/or enables a user to provide additional information, which provides improved visual feedback to the user.

In some embodiments, after (or, optionally, in response to) receiving the request to initiate the communication, the computer system displays, via the output generation component, a selectable sound option (e.g., 1536C3) (e.g., a button, an affordance, and/or a graphical indication) that, when selected, causes the external computer system to output audio (e.g., as shown in FIG. 15AD). In some embodiments, the computer system displays the selectable sound option in accordance with a determination that the external computer system is not connected to a terrestrial wireless communication network. In some embodiments, the computer system displays the selectable sound option concurrently with the prompt to use the external computer system to connect to a non-terrestrial network. In some embodiments, the computer system displays the selectable sound option in response to detecting a selection of the prompt to use the external computer system to connect to a non-terrestrial network. In some embodiments, the computer system displays the selectable sound option concurrently with an option (e.g., a call again option) that, when selected, causes the computer system and/or the external computer system to attempt (or re-attempt) to call a predetermined entity via a terrestrial wireless communication network. Displaying a selectable sound option provides the user with a technique to locate the external computer system, which reduces the amount of time a user needs to locate the external computer system and provides additional control options without cluttering the user interface.

In some embodiments, after receiving the request to initiate the communication, the computer system attempts to communicate via the terrestrial wireless communication network; and after attempting (e.g., unsuccessfully) to communicate via the terrestrial wireless communication network, the computer system displays, via the output generation component, a selectable call option (e.g., 1522A3 and/or 1536C4) (e.g., a button, an affordance, and/or a graphical indication) that, when selected, initiates an attempt (e.g., another attempt) to communicate via the terrestrial wireless communication network. In some embodiments, the selectable call option is displayed concurrently with the prompt to use the external computer system to connect to the non-terrestrial network. Displaying the selectable call option after attempting to communicate via the terrestrial wireless communication network provides the user with an efficient means to re-attempt to communicate via the terrestrial wireless communication network (which may be a preferred method of communication), which improves visual feedback to the user and reduces the number of inputs needed to perform an operation.

In some embodiments, providing the prompt to use the external computer system to connect to a non-terrestrial network is performed in accordance with a determination that the request to initiate the communication includes a request to initiate communication with a predefined entity (e.g., emergency services or a contactable user that a user associated with computer system has designated as an emergency contact) (e.g., computer system 1500A displays prompt 1522A2 for the call to 911 in FIG. 15I). In some embodiments, in response to receiving the request to initiate the communication: in accordance with a determination that the external computer system is not connected to a terrestrial wireless communication network and that the request to initiate the communication does not include a request to initiate communication with a predefined entity, the computer system forgoes providing the prompt to use the external computer system to connect to a non-terrestrial network (e.g., computer system 1500A does not display prompt 1522A2 for the number called in FIG. 15A) (e.g., the computer system provides the prompt to use the external computer system to connect to a non-terrestrial network only in response to a request to initiate communication with a predefined entity). Providing (or forgoing providing) the prompt to use the external computer system to connect to a non-terrestrial network based on whether or not the request to initiate the communication includes a request to initiate communication with a predefined entity provides the prompt when it is contextually relevant and avoids distracting the user with options that are unlikely to be relevant under typical circumstances, which provides improved visual feedback, performs an operation when a set of conditions has been met without requiring further user input, and provides additional control options without cluttering the user interface. Forgoing providing the prompt to use the external computer system to connect to a non-terrestrial network when the request to initiate the communication does not include a request to initiate communication with a predefined entity (e.g., emergency services) reduces non-emergency use of bandwidth when bandwidth is constrained, which increases the likelihood that sufficient bandwidth will be available for emergency communications.

In some embodiments, providing the prompt (e.g., 1522A2 and/or 1534C6) to use the external computer system to connect to the non-terrestrial network is performed in accordance with a determination that the external computer system (e.g., 1500B) is capable of connecting to (or, optionally, communicating via) the non-terrestrial network (e.g., the external computer system includes hardware and/or software that enables the external computer system to connect to and communicate via the non-terrestrial network). In some embodiments, in response to receiving the request to initiate the communication: in accordance with a determination that the external computer system is not connected to a terrestrial wireless communication network and that the external computer system is capable of connecting to (or, optionally, communicating via) the non-terrestrial network, the computer system forgoes providing the prompt to use the external computer system to connect to a non-terrestrial network (e.g., the computer system provides the prompt to use the external computer system to connect to a non-terrestrial network only if the external computer system is capable of connecting to and/or communicating via the non-terrestrial network). Providing (or forgoing providing) the prompt to use the external computer system to connect to a non-terrestrial network based on whether or not the external computer system is capable of connecting to the non-terrestrial network provides the prompt when it is contextually relevant and avoids distracting the user with options that are not available based on the capabilities of the external computer system, which provides improved visual feedback, performs an operation when a set of conditions has been met without requiring further user input, and provides additional control options without cluttering the user interface.

Note that details of the processes described above with respect to method 1600 (e.g., FIG. 16) are also applicable in an analogous manner to the methods described above. For example, method 700, 800, 1000, 1200, 1400, 1800, 2000, and/or 2200 optionally includes one or more of the characteristics of the various methods described above with reference to method 1600. For example, method 700, 800, 1000, 1200, and/or 1400 optionally include the techniques for initiating a communication described in method 1600. For example, method 1800 can initiate a communication according to method 1600 from a messaging application. For example, initiating a communication as described in method 1600 can be simulated in the alternative communication network test mode in method 2000. For example, initiating a communication as described in method 1600 can be the process corresponding to the user interface object in method 2200. For brevity, these details are not repeated below.

FIGS. 17A-17R illustrate exemplary user interfaces for initiating communication via an alternative communication network, in accordance with some embodiments. The user interfaces in these figures are used to illustrate the processes described below, including the processes in FIG. 18. In some embodiments, initiating and/or completing communication via an alternative communication network includes performing one or more of the methods described with reference to FIGS. 7, 8, and/or 10 (e.g., methods 700, 800, and/or 1000).

In some embodiments, any of the selections, requests, and/or inputs described herein (e.g., 1750*a*-1750*z*) is or includes a touch input (e.g., a tap gesture and/or a swipe gesture). In some embodiments, any of the selections, requests, and/or inputs described herein (e.g., 1750*a*-1750*z*) is or includes a voice input (e.g., a voice command to select a user interface element or to activate a feature or perform a function, such as a feature or function associated with a user interface element). In some embodiments, any of the selections, requests, and/or inputs described herein (e.g., 1750*a*-1750*z*) is or includes an air gesture (e.g., an air gesture to select a user interface element or to activate a feature or perform a function, such as a feature or function associated with a user interface element). In some embodiments, any of the selections, requests, and/or inputs described herein (e.g., 1750*a*-1750*z*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIGS. 17A-17R illustrate computer system 600, described above with reference to, e.g., FIG. 6A. Notably, FIGS. 17C-17F illustrate embodiments in which computer system 600 has cellular service, and FIGS. 17G-17R illustrate embodiments in which computer system 600 does not have cellular service, as indicated by cellular status indicator 1701.

In FIG. 17A, computer system displays home screen 1700, which includes selectable application icons for launching corresponding applications, including messaging application icon 1700*a*. In response to detecting selection 1750*a* of messaging application icon 1700*a*, computer system 600 displays user interface 1702 of the messaging application, as shown in FIG. 17B. User interface 1702 includes new message option 1702*a* and a list of messaging conversations (e.g., previous and/or existing messaging conversations) between a user associated with computer system 600 and one or more other entities. The list of messaging conversations in user interface 1702 includes conversation item 1702*b* corresponding to a message conversation with an emergency service, conversation item 1702*c* corresponding to a message conversation with 911 (e.g., an emergency number), and conversation item 1702*d* corresponding to a message conversation with a non-emergency service or number (e.g., contactable user named Trevor).

In response to detecting selection 1750*b* of new message option 1702*a*, computer system 600 displays new message interface 1704 for sending a new message, as shown in FIG. 17C. New message interface 1704 includes recipient field 1704*a*, message compose field 1704*c* for entering content (e.g., text, images, and/or icons) of a new message, send option 1704*d* for sending a message that includes content entered into message compose field 1704*c*, and keyboard 1704*e* for selecting text to enter into message compose field 1704*c*. In FIG. 17C, a user has entered an emergency number (e.g., 911, or other local emergency number) into recipient field 1704*a* (e.g., via inputs 1750*x* and 1750*y* on keys "9" and "1", respectively, in keyboard 1704*e*). In some embodiments, as shown in FIG. 17C, in response to entry of the emergency number into recipient field 1704*a*, computer system 600 displays recipient suggestion 1704*b* corresponding to an emergency service because an emergency number was entered into recipient field 104*a*. In some embodiments, computer system 600 does not display an emergency service as a suggested recipient (e.g., recipient suggestion 1704*b*) in response to an emergency number being entered into recipient field 1704*a*.

In response to detecting selection 1750*g* of message compose field 1704*c* in FIG. 17C, computer system 600 displays a message conversation with the emergency number, as shown in FIG. 17D. Message region 1706 includes previous messages between a user associated with computer system 600 and 911, including message 1706*b* from the user associated with computer system 600 to the emergency number and message 1706*c* from the emergency number to the user associated with computer system 600. Time indicator 1706*a* indicates the time at message 1706*b* was sent. In new message interface 1704, a user can user keyboard 1704*e* to generate a message in message compose field 1704*c* and select send option 1704*d* to send the message to the emergency number.

Turning to FIG. 17E, computer system 600 displays user interface 1708 (e.g., of the messaging application or an emergency messaging application), which includes a message conversation between an emergency service and the user associated with computer system 600. In some embodiments, user interface 1708 is (or includes features of) messaging interface 602T, reporting interface 602U, messaging interface 902K, messaging interface 902L, messaging interface 902M, messaging interface 902N, and/or reporting interface 1526B. In some embodiments, computer system 600 displays user interface 1708 in response to detecting selection 1750*f* in FIG. 17C of recipient suggestion 1704*b* corresponding to the emergency service. In some embodiments, computer system 600 displays user interface 1708 as shown in FIG. 17E in response to detecting selection 1750*c* in FIG. 17B of conversation item 1702*b* corresponding to the emergency service when computer system 600 has cellular service.

In FIG. 17E, user interface 1708 includes text emergency number option 1710*a* and call emergency number option 1710*b*. In response to detecting selection of call emergency number option 1710*b*, computer system 600 initiates a call to an emergency number (e.g., 911 or other emergency number). In response to detecting selection 1750*h* of text emergency number option 1710*a*, computer system 600 initiates a process for sending a text message to an emergency number. For example, in some embodiments, in response to detecting selection 1750*h* of text emergency number option 1710*a*, computer system 600 initiates a new text message to an emergency number (e.g., displays new message interface 1704 as shown in FIG. 17D with the recipient field pre-populated with the emergency number and, optionally, displaying previous message conversation 1706 with 911). In some embodiments, when computer system 600 has cellular service, user interface 1708 includes message compose field 1708*b*, send option 1708*c*, and, optionally, keyboard 1706*d* (e.g., as shown in FIG. 17I).

In some embodiments, as shown in FIG. 17F, in response to detecting selection 1750*h* of text emergency number option 1710*a*, computer system 600 displays user interface 1712 of the messaging application with message region 1712*a*, message compose field 1712*b*, send message option 1712*c*, and keyboard 1712*d*. Message region 1712*a* includes message 1706*b* from the user associated with computer system 600 to 911 and message 1706*c* from 911 to the user associated with computer system 600 (e.g., the same messages as in message region 1706). In user interface 1712, a user can user keyboard 1712*d* to generate a message in message compose field 1712*b* and select send option 1712*b* to send the message to 911. In some embodiments, computer system 600 displays user interface 1712 in response to detecting selection 1750*d* in FIG. 17B of conversation item 1702*c*.

FIG. 17G illustrates an embodiment in which computer system 600 does not have cellular service, as indicated by cellular status indicator 1701. In some embodiments, as shown in FIG. 17G, in response to entry of an emergency number (e.g., 911) into recipient field 1704*a* of new message interface 1704 (e.g., via inputs 1750*x* and 1750*y* on keys "9" and "1", respectively, in keyboard 1704*e*) when computer system 600 does not have a cellular connection, computer system 600 displays recipient suggestion 1704*b* corresponding to an emergency service and call emergency number option 1704*f* (e.g., because an emergency number was entered into recipient field 1704*a* and computer system 600 does not have a cellular connection). Call emergency number option 1704*f* indicates that computer system 600 is attempting to connect to a cellular network (e.g., "Looking for service . . . "). In some embodiments, in response to detecting selection of call emergency number option 1704*f*, computer system 600 attempts to initiate a call to an emergency number (e.g., as shown in FIG. 6E).

In FIG. 17G, computer system 600 detects selection 1750*r* of message compose field 1704*c*. As shown in FIG. 17H, in response to detecting selection 1750*r* of message compose field 1704*c*, computer system 600 displays message region 1706, including time indicator 1706*a*, message 1706*b* from the user associated with computer system 600 to the emergency number, and message 1706*c* from the emergency number to the user associated with computer system 600 (e.g., as described in FIG. 17D). Because computer system 600 does not have cellular service in FIG. 17H (e.g., for standard communication and/or emergency communication purposes), computer system 600 displays connect via satellite option 1706*d* (e.g., in message region 1706). In some embodiments, computer system 600 displays connect via satellite option 1706*d* when message region 1706 is initially displayed (e.g., in response to detecting selection 1750*r* of message compose field 1704*c* in FIG. 17G). In some embodiments, computer system 600 displays connect via satellite option 1706*d* when a user attempts to send a message to the emergency number (e.g., in response to detecting selection of content to include in message compose field 1704*c* (such as input 1750*u* on keyboard 1704*e*) and/or selection 1750*t* of send option 1704*d*) when computer system 600 does not have cellular service.

In some embodiments, as shown in FIG. 17I, in response to detecting selection 1750*j* of connect via satellite option 1706*d*, computer system 600 displays user interface 1708 for sending a message to an emergency service via a satellite communication network. User interface 1708 includes a message conversation between the emergency service and the user associated with computer system 600. In some embodiments, user interface 1708 is (or includes features of) messaging interface 602T, reporting interface 602U, messaging interface 902K, messaging interface 902L, messaging interface 902M, messaging interface 902N, and/or reporting interface 1526B. In some embodiments, because computer system 600 does not have cellular service, user interface 1708 includes message compose field 1708*b*, send option 1708*c*, and keyboard 1706*d* (e.g., instead of text emergency number option 1710*a* and/or call emergency number option 1710*b*, as described above with reference to FIG. 17E). In user interface 1708 shown in FIG. 17I, a user can user keyboard 1708*d* to generate a message in message compose field 1708*b* and select send option 1708*c* to send the message to the emergency service. In some embodiments, computer system 600 displays user interface 1708 as shown in FIG. 17I in response to detecting selection 1750*c* in FIG. 17B of conversation item 1702*b* corresponding to the emergency service when computer system 600 does not have cellular service.

Turning to FIG. 17J, computer system 600 displays user interface 1712 of the messaging application (e.g., described above with reference to FIG. 17F). In some embodiments, computer system 600 displays user interface 1712 as shown in FIG. 17J in response to detecting selection 1750*d* of conversation item 1702*c* in FIG. 17B when computer system 600 does not have cellular service.

In FIG. 17J, because computer system 600 does not have cellular service (e.g., in contrast to FIG. 17F), user interface 1712 includes connect via satellite option 1706*d* (e.g., in message region 1712). In some embodiments, computer system 600 displays connect via satellite option 1706*d* when user interface 1712 is initially displayed (e.g., in response to detecting selection 1750*d* of conversation item 1702*c* in FIG. 17B when computer system 600 does not have cellular service). In some embodiments, computer system 600 displays connect via satellite option 1706*d* when a user attempts to send a message to the emergency number (e.g., in response to detecting selection of content to include in message compose field 1712*b* (such as input 1750*v* on keyboard 1712*d*) and/or selection 1750*s* of send option 1712*c*) when computer system 600 does not have cellular service.

In some embodiments, in response to detecting selection 1750*k* of connect via satellite option 1706*d*, computer system 600 displays user interface 1708 for sending a message to an emergency service, as shown and described with reference to FIG. 17I.

In some embodiments, in response to detecting selection of connect via satellite option 1706*d* (e.g., selection 1750*j* in FIG. 17H or selection 1750*k* in FIG. 17J), computer system 600 initiates a process for generating a communication to be sent to the emergency service and/or connecting computer system 600 to an alternative communication network, such as, e.g., a non-terrestrial wireless communication network (e.g., a satellite communication network). For example, in response to detecting selection of connect via satellite option 1706*d*, computer system 600 performs the processes described in FIGS. 6M-6Y, method 800, the processes described in FIGS. 9C-9U, and/or method 1000. In some embodiments, computer system 600 performs the processes described in FIGS. 6M-6Y, method 800, the processes described in FIGS. 9C-9U, and/or method 1000 in response to detecting selection 1750*d* of conversation item 1702*c* in FIG. 17B when computer system 600 does not have cellular service. In some embodiments, computer system 600 performs the processes described in FIGS. 6M-6Y, method 800, the processes described in FIGS. 9C-9U, and/or method 1000 in response to detecting an attempt to send a message to an emergency number (e.g., selection 1750*t* of send option 1704*d* in FIG. 17H and/or selection 1750*s* of send option 1712*c* in FIG. 17J) when computer system 600 does not have cellular service.

In some embodiments, in response to detecting selection 1750*k* of connect via satellite option 1706*d* in FIG. 17J, computer system 600 displays reporting interface 1714 for generating a communication to be sent via an alternative communication network, as shown in FIG. 17K. In some embodiments, computer system displays reporting interface 1714 in response to selection 1750*j* of connect via satellite option 1706*d* in FIG. 17H. In some embodiments, computer system displays reporting interface 1714 in response to detecting selection 1750*d* of conversation item 1702*c* in FIG. 17B when computer system 600 does not have cellular service. In some embodiments, computer system displays reporting interface 1714 in response to detecting an attempt to send a message to an emergency number (e.g., selection 1750*t* of send option 1704*d* in FIG. 17H and/or selection 1750*s* of send option 1712*c* in FIG. 17J) when computer system 600 does not have cellular service.

In some embodiments, reporting interface 1714 is (or includes features of) reporting interface 602M (e.g., as described with reference to FIG. 6M). In FIG. 17K, reporting interface 1714 includes an interface for receiving a selection of a type of emergency option via selection of an option from set of options 1714*a*. Set of options 1714*a* includes selectable options for various types of emergencies (e.g., vehicle issue, sickness/injury, crime, lost or trapped, and fire). In response to receiving a selection of a type of emergency (e.g., an option of set of options 1714*a*), the type of emergency is included in the communication to be sent to emergency services. For example, set of options 1714*a* includes lost or trapped option 1714*a*1.

In response to detecting selection 1750*l* on lost or trapped option 1714*a*1, computer system 600 displays reporting interface 1716, as shown in FIG. 17L. Reporting interface 1716 includes set of options 1716*a* for providing additional information about the selected type of emergency. For example, as shown in FIG. 17L, set of option 1716*a* includes options for selecting who needs help.

In response to detecting selection 1750*m* of multiple people option 1716*a*1, computer system 600 displays summary 1718*a* of the content selected for the communication to be sent to the emergency service, as shown in summary interface 1718 in FIG. 17M. In some embodiments, computer system 600 displays one or more additional sets of options for content to include in the communication before displaying summary interface 1718. In some embodiments, summary interface 1718 is (or is analogous to or includes features of) summary interface 602R and/or summary interface 602S.

In response to detecting selection 1750*n* of send report option 1718*b* or expiration of timer 1718*c* in FIG. 17M, computer system 600 initiates a process for sending the communication summarized in summary interface 1718. In some embodiments, if computer system 600 is connected to the alternative communication network, then computer system 600 begins sending the communication (e.g., displays user interface 1722 described with reference to FIG. 17P) in response to detecting selection 1750*n* of send report option 1718*b* or expiration of timer 1718*c* in FIG. 17M.

In some embodiments, as shown in FIG. 17N, if computer system 600 is not aligned with and/or connected to the alternative communication network, then computer system 600 initiates a process for aligning computer system 600 with the alternative communication network and/or connecting computer system 600 with the alternative communication network. In some embodiments, the process for aligning computer system 600 with the alternative communication network and/or connecting computer system 600 with the alternative communication network is (or includes features of) the process described in FIGS. 9C-9Q and/or method 1000.

For example, in some embodiments, if computer system 600 is not aligned with the alternative communication network, computer system 600 displays alignment interface 1720, as shown in FIG. 17N. For example, if computer system 600 is not aligned with the alternative communication network, then computer system 600 displays alignment interface 1720 as shown in FIG. 17N in response to detecting selection 1750*n* of send report option 1718*b* or expiration of timer 1718*c* in FIG. 17M.

In some embodiments, alignment interface 1720 is (or includes features of) alignment interface 902C, alignment interface 902D, alignment interface 902E, alignment interface 902F, alignment interface 902G, alignment interface 902H, alignment interface 902I, alignment interface 902J, alignment interface 902O, alignment interface 902O1, and/or alignment interface 902P, depending on the alignment and/or connection between computer system 600 and the alternative communication network, any obstructions between computer system 600 and the alternative communication network, and/or the availability of the alternative communication network (e.g., the position of one or more satellites and/or whether a satellite is in range). For example, in some embodiments, alignment interface 1720 includes alignment element 909 as described with reference to FIGS. 9C-9J and 9O-9P.

In FIG. 17N, alignment interface 1720 includes alignment element 1720*a*, connection status indicator 1720*b*, and connection information 1720*c*. Alignment element 1720*a* provides a graphical representation of the alignment and/or connection status between computer system 600 and the alternative communication network. In some embodiments, alignment element 1720*a* is (or includes features of) graphical element 931. Connection status indicator 1720*b* provides a textual indication of the connection status between computer system 600 and the alternative communication network (e.g., looking for signal, connected, connecting, not connected, poor connection, satellite out of range, and/or satellite moving out of range). Connection information 1720*c* includes additional information about the connection status and/or instructions for connecting (or staying connected) to the alternative communication network. In some embodiments, connection status indicator 1720*b* and/or connection information 1720*c* are (or include) textual element 908C, textual element 908D, textual element 908E, textual element 908F, textual element 908G, textual element 908H, textual element 908I, textual element 908J, textual element 908O, textual element 908O1, and/or textual element 908P as described with reference to FIGS. 9C-9J and 9O-9P, depending on the alignment and/or connection between computer system 600 and the alternative communication network, any obstructions between computer system 600 and the alternative communication network, and/or the availability of the alternative communication network (e.g., the position of one or more satellites and/or whether a satellite is in range).

In FIG. 17N, as indicated by connection status indicator 1720*b*, computer system 600 is looking for a signal (e.g., computer system 600 has just started attempting to connect, there is an obstruction between computer system 600 and a satellite, and/or there is no satellite in range). Accordingly, alignment element 1720*a* shows no connection nor an indication of an action for the user to take, and connection information 1720*c* provides general guidance to track a satellite to send and receive messages.

Turning to FIG. 17O, computer system 600 is connected to the alternative communication network, and alignment interface 1720 (including alignment element 1720*a* and connection status indicator 1720*b*) has been updated accordingly. For example, in FIG. 17O, computer system 600 is in the same connection state as in FIG. 9J, and alignment interface 1720 is similar to alignment interface 902J described with reference to FIG. 9J, including display of opening messages option 1720*d*.

In response to detecting selection 1750*o* of opening messages option 1720*d* (or expiration of a time threshold), computer system 600 displays messaging interface 1722 as shown in FIG. 17P. Messaging interface 1722 is (or includes features of), e.g., messaging interface 902K. For example, messaging interface 1722 includes banner 1724 (e.g., banner 926), message region 1722*a*, message compose field 1722*b* (e.g., text box 912*k*), send option 1722*c* (e.g., send affordance 916K), and message 1722*d*. In response to selection 1750*p* of message compose field 1722*b*, computer system 600 displays a keyboard. A user can send a message to emergency services via messaging interface 1722 by entering content into message compose field 1722*b* and selecting send option 1722*c*.

In some embodiments, computer system 600 performs the process for aligning computer system 600 with the alternative communication network and/or connecting computer system 600 with the alternative communication network (e.g., the process described in FIGS. 17N-17P, the process described in FIGS. 9C-9U, and/or method 1000) before the process of generating and/or initiating sending of the communication (e.g., the process described with reference to FIGS. 17K-17M, the process described in FIGS. 6M-6Y, and/or method 800). For example, in some embodiments, computer system 600 displays alignment interface 1720 in response to detecting selection 1750*k* of connect via satellite option 1706*d* in FIG. 17J, in response to selection 1750*j* of connect via satellite option 1706*d* in FIG. 17H, in response to detecting selection 1750*d* of conversation item 1702*c* in FIG. 17B when computer system 600 does not have cellular service, and/or in response to detecting an attempt to send a message to an emergency number (e.g., selection 1750*t* of send option 1704*d* in FIG. 17H and/or selection 1750*s* of send option 1712*c* in FIG. 17J) when computer system 600 does not have cellular service.

Turning to FIG. 17Q, computer system 600 displays new message interface 1704 described with reference to FIGS. 17C-17D and 17G-17H. In FIG. 17Q, the text "TREVOR" has been entered into recipient field 1704*a* (e.g., via inputs 1750*z* on keyboard 1704*e*). In response to entry of "TREVOR" into recipient field 1704*a*, computer system 600 displays recipient suggestion 1704*g* corresponding to a contactable user named Trevor, which is a non-emergency service or number. Notably, unlike new message interface 1704 in FIGS. 17C and 17G, since the recipient entered into recipient field 1704*a* is not an emergency number, computer system 600 does not display an option to contact an emergency service (e.g., does not display recipient suggestion 1704*b* corresponding to an emergency service or call emergency number option 1704*f*), even though computer system 600 does not have cellular service (e.g., as indicted by cellular status indicator 1701).

In some embodiments, in response to detecting selection 1750*q* of recipient suggestion 1704*g* (or in response to detecting selection 1750*e* of conversation item 1702*d* in FIG. 17B), computer system 600 displays messaging interface 1726 of a message conversation in a messaging application between the user associated with computer system 600 and the contactable user Trevor, as shown in FIG. 17R. Messaging interface 1726 includes message region 1726*a*, message compose field 1726*b*, send option 1726*c*, and keyboard 1726*d*. Message region 1726*a* includes message 1726*e* from the user associated with computer system 600 to contactable user Trevor and message 1726*f* from contactable user Trevor to the user associated with computer system 600. Notably, unlike new message interface 1704 in FIG. 17H and user interface 1712 in FIG. 17J, since the message conversation is not with an emergency number, messaging interface 1726 does not include an option to connect and/or send a message via an alternative communication network (e.g., messaging interface 1726 does not include connect via satellite option 1706*d*), even though computer system 600 does not have cellular service (e.g., as indicted by cellular status indicator 1701).

FIG. 18 is a flow diagram illustrating a method for initiating communication via an alternative communication network using a computer system in accordance with some embodiments. Method 1800 is performed at a computer system (e.g., 100, 300, 500, 600, 900, 1100, 1300A, 1300B, 1500A, 1500B, 1500C, a smartphone, smartwatch, laptop computer, desktop computer, and/or tablet computer) that is in communication with an output generation component (e.g., a display generation component, a display controller, a display device, a monitor, a touch-sensitive display system, one or more speakers, and/or one or more haptic output generators) and one or more input devices (e.g., 601, 901, 1106, 1302A, 1302B, 1502A, 1502B, 1502C, a touch-sensitive surface, a touchscreen, a button, a keyboard, a mouse, a camera, a rotatable input mechanism, and/or a microphone). Some operations in method 1800 are, optionally, combined, the orders of some operations are, optionally, changed, and some operations are, optionally, omitted.

As described below, method 1800 provides an intuitive way for initiating communication via an alternative communication network. The method reduces the cognitive burden on a user for initiating communication via an alternative communication network, thereby creating a more efficient human-machine interface. For battery-operated computing devices, enabling a user to initiate communication via an alternative communication network faster and more efficiently conserves power and increases the time between battery charges.

The computer system detects (1802), via the one or more input devices, a set of one or more inputs (e.g., 1750*b*, 1750*d*, 1750*g*, 1750*x*, 1750*y*, entry of "911" in 1704*a*, selection 1750*r* of 1704*c* in FIG. 17G, a contact and/or touch gesture on a touch-sensitive surface, an air gesture, a mouse click, a key press, a button press, and/or a voice command) that includes selection of a respective number (or, in some embodiments, a respective recipient) for text-based communication (e.g., SMS, MMS, instant messaging, IP based messaging, or other text-based messaging communication). In some embodiments, the respective number is associated with and/or corresponds to a contactable entity (e.g., a person, user, business, and/or service). In some embodiments, selection of the respective number includes entry of the respective number (e.g., via a keypad) or selection of a contactable entity associated with the respective number from a menu or list (e.g., a contacts list and/or list of search results). In some embodiments, selection of the respective number for text-based communication includes selecting the respective number as an intended recipient of text-based communication. In some embodiments, the computer system detects the set of one or more inputs in (e.g., while displaying) a user interface of a messaging application (e.g., a text messaging application and/or an instant messaging application; the set of one or more inputs corresponds to selection of an intended recipient for a new text message, a search request for the respective number in the messaging application, and/or selection of an existing or previous text message conversation that includes the respective number). In some embodiments, the text message conversation that includes the respective number is included in a list of existing and/or previous text messages and/or text message conversations.

In response (1804) to detecting the set of one or more inputs that includes selection of the respective number (or, in some embodiments, the respective recipient) for text-based communication: in accordance with (1806) a determination that a set of alternative communication criteria is met, wherein the set of alternative communication criteria includes a first criterion that is met when the respective number (or, in some embodiments, the respective recipient) is a respective type of number (or, in some embodiments, a respective type of recipient) and a second criterion that is met when a respective communication network (or, in some embodiments, a respective communication service, a respective communication protocol, a respective type of communication network, a respective type of communication service, or a respective type of communication protocol) is not available (e.g., when a terrestrial communication network, such as a cellular communication network or a Wi-Fi network, is not available; when no terrestrial communication network is available): the computer system outputs (1808), via the output generation component, a prompt (e.g., 1704*b* and/or 1706*d*) that includes an indication (e.g., a visual appearance, text, a font, highlighting, an animation, a color, a graphic, a sound, and/or a haptic output) that communication with the respective number (or, in some embodiments, the respective recipient or an emergency service) can be performed (e.g., using the computer system) via an alternative communication network (or, in some embodiments, an alternative communication service, an alternative communication protocol, an alternative type of communication network, an alternative type of communication service, or an alternative type of communication protocol) that is different from the respective communication network. Outputting a prompt that includes an indication that communication with the respective number can be performed via an alternative communication network in accordance with a determination that a set of alternative communication criteria is met informs the user that communication with the respective number is possible even though the respective communication network is not available and can provide a quick and efficient means for communicating via the alternative communication network, which provides improved feedback to the user, reduces the number of inputs needed to perform an operation, provides additional control options without cluttering the user interface with additional displayed controls, and performs an operation when a set of conditions has been met without requiring further user input. Providing quick and efficient access to a respective number enables the computer system to be more quickly and efficiently controlled, which is particularly important in emergency situations because a user may be stressed and more prone to making mistakes.

In some embodiments, the respective type of number is a number associated with an emergency service, a number designated as an emergency number, and/or a number associated with an emergency contact (e.g., a contactable entity that is designated as an emergency contact) Examples of numbers associated with an emergency service include 911 in the United States, 999 in the United Kingdom, 112 in Europe, 110 and/or 119 in Japan, and 000 in Australia. In some embodiments, the respective communication network is a terrestrial communication network, a wireless terrestrial communication network, a cellular communication network, and/or a Wi-Fi network. In some embodiments, the second criterion is met only if no terrestrial communication network is available, including cellular communication networks of service providers that are not associated with the computer system. In some embodiments, the set of alternative communication criteria is not met if the first criterion is not met and/or the second criterion is not met (e.g., the first criterion and the second criterion are necessary to meet the set of alternative communication criteria). In some embodiments, a communication network is not available if a strength and/or consistency of a signal and/or connection of the communication network is insufficient (e.g., does not meet a set of signal criteria) for the computer system to communicate via the communication network (e.g., to make a phone call and/or send a text message via the communication network). In some embodiments, a communication network (e.g., a Wi-Fi network) is not available if the computer system is not authorized to use or join the communication network (e.g., the computer system has not provided a required authentication and/or password). In some embodiments, outputting the prompt includes displaying the prompt, outputting audio, and/or generating a haptic output. In some embodiments, the prompt includes (or is) a graphical user interface object, an icon, a graphic, an animation, a selectable graphical user interface object, an affordance, a button, text, a sound, a haptic output, a pop-up menu, and/or a selectable option (such as an option in a list of selectable options of methods for communicating with the respective number). Examples of methods for communicating with the respective number include, but are not limited to, phone call, text message (e.g., via a terrestrial communication network, such as a cellular communication network or a Wi-Fi network, or a non-terrestrial communication network, such as a satellite communication network), video call, and email.

In some embodiments, the alternative communication network is a non-terrestrial communication network (e.g., a satellite communication network). In some embodiments, the alternative communication network has a lower communication bandwidth (e.g., data rate) than a communication bandwidth of the respective communication network.

In some embodiments, in response to detecting the set of one or more inputs that includes selection of the respective number for text-based communication: in accordance with a determination that the respective number is not the respective type of number (e.g., that the respective number is not a number associated with an emergency service; and/or that the set of alternative communication criteria is not met), the computer system forgoes output of the prompt (e.g., neither 1704*b* nor 1706*d* is displayed in FIG. 17P or FIG. 17Q). Forgoing output of the prompt in accordance with a determination that the respective number is not the respective type of number enables the computer system to provide the prompt only for particular types of number (e.g., emergency numbers) and avoids cluttering the user interface with options when they are not needed, which provides improved feedback to the user, provides additional control options without cluttering the user interface with additional displayed controls, and performs an operation when a set of conditions has been met without requiring further user input.

In some embodiments, the respective communication network is a terrestrial wireless communication network (e.g., a cellular network and/or a Wi-Fi network). In some embodiments, the second criterion is met when a terrestrial wireless communication network is not available (e.g., when no terrestrial wireless communication network is available; and/or the computer system has a lack of connectivity to a terrestrial wireless communication network). Providing the prompt when a terrestrial wireless communication network is not available (among other criteria) enables the computer system to provide the prompt only when a preferred (e.g., higher speed, higher bandwidth, and/or lower power) communication network is unavailable and avoids cluttering the user interface with the prompt when it is not needed, which provides improved visual feedback to the user and provides additional control options without cluttering the user interface with additional displayed controls.

In some embodiments, after outputting the prompt, the computer system detects a set of one or more inputs (e.g., 1750*i*, 1750*j*, 1750*k*, selection 1750*r* of 1704*c* in FIG. 17G, and/or selection 1750*s* of 1712*c* in FIG. 17J) that includes a request to communicate with (e.g., to send a message to) a respective entity (e.g., the respective number and/or an emergency service) via the alternative communication network; and in response to detecting the set of one or more inputs that includes the request to communicate with the respective entity via the alternative communication network, the computer system displays a set of selectable communication-content options (e.g., 1714*a*, 1716*a*, 604M, 604N, 604O, 604P, and/or 604Q as shown in FIGS. 6M-6Q) corresponding to respective content for a communication (e.g., 1722*d*). In some embodiments, the set of selectable communication-content options are specific to a mode for communicating via the alternative communication network (e.g., a low-bandwidth communication mode). In some embodiments, in response to detecting the set of one or more inputs that includes the request to communicate with the respective entity via the alternative communication network, the computer system performs the operations described in FIGS. 6M-6W and/or method 800. Displaying a set of selectable communication-content options corresponding to respective content for a communication in response to detecting the set of one or more inputs that includes the request to communicate with the respective entity via the alternative communication network provides options that are optimal (e.g., require limited bandwidth) for communicating via the alternative communication network, reduces the number of inputs required to generate a message (e.g., without using a keyboard), and guides a user through the process for communicating via the alternative communication network, which provides improved visual feedback to the user, reduces the number of inputs needed to perform an operation, provides additional control options without cluttering the user interface with additional displayed controls.

In some embodiments, after outputting the prompt, the computer system detects a set of one or more inputs (e.g., 1750*i*, 1750*j*, 1750*k*, 1750*n*, selection 1750*r* of 1704*c* in FIG. 17G, and/or selection 1750*s* of 1712*c* in FIG. 17J) that includes a request to communicate with (e.g., to send a message to) a respective entity (e.g., the respective number and/or an emergency service) via the alternative communication network; and in response to detecting the set of one or more inputs that includes the request to communicate with the respective entity via the alternative communication network, the computer system initiates a process for connecting to the alternative communication network (or, in some embodiments, if the computer system is already connected to the alternative communication network, remaining connected to the alternative communication network), wherein the process for connecting to the alternative communication network includes displaying a prompt (e.g., 1720*a*, 1720*c*, 1724, a notification, a banner, text, a graphical element, audio, and/or instructions; and/or 908C, 908D, 908E, 908F, 908G, 908H, 908I, 908J, 908O, 908O1, 908P, 926, and/or 931) for a user to take an action to connect the computer system to (or, in some embodiments, to keep the computer system connected to) the alternative communication network. In some embodiments, the process for connecting to the alternative communication network includes the user interfaces and/or features described in FIGS. 9C-9Q and method 1000. In some embodiments, the prompt for a user to take an action to connect to the alternative communication network includes instructions to move and/or position at least a portion of the computer system in a particular direction or location (e.g., turn left, point up, and/or move outside). In some embodiments, the computer system displays the prompt for a user to take an action to connect to the alternative communication network in accordance with a determination that the computer system is not connected to the alternative communication network (e.g., is not properly aligned for communication with one or more satellites of the alternative communication network). In some embodiments, the process for connecting to the alternative communication network includes displaying an indication of a status of a connection between the compute system and the alternative communication network (e.g., not connected, poor connection, trying to connect, connecting, and/or connected). Initiating a process for connecting to the alternative communication network in response to detecting the request to communicate with the respective entity via the alternative communication network provides the user with a quick an efficient method for communicating via the alternative communication network, which reduces the number of inputs needed to perform an operation and provides additional control options without cluttering the user interface. Displaying a prompt for a user to take an action to connect to the alternative communication network (e.g., providing connection assistance) allows the user to resolve issues (e.g., misalignment and/or obstruction) that prevent the computer system from connecting to the alternative communication network quickly and efficiently with fewer inputs, which provides improved visual feedback and reduces the number of inputs needed to perform an operation.

In some embodiments, after outputting the prompt, the computer system detects a set of one or more inputs (e.g., 1750*l*. 1750*m*, and/or 1750*n*) that includes a request (or, in some embodiments, a command) to send a message (e.g., a text message) via the alternative communication network; and in response to detecting the set of one or more inputs that includes the request to send the message via the alternative communication network, the computer system sends the message via the alternative communication network. In some embodiments, the set of one or more inputs that includes the request to send the message via the alternative communication network includes selection of an option to generate a message, selection of content of the message (e.g., via a keyboard and/or selection of predefined content options), and/or selection of an option to send the generated message. Sending a message via the alternative communication network enables the user to send a message even though a primary communication network is unavailable, which provides additional control options without cluttering the user interface with additional displayed controls.

In some embodiments, in accordance with (or, in some embodiments, in response to) a determination that the respective communication network is not available, the computer system displays, via the display generation component, an indication (e.g., 1701 in FIGS. 17G-17Q, a graphical indication, icon, color, font, text, animation, symbol, thumbnail, image, and/or glyph) of a communication capability of the computer system (e.g., an indication of the capability of the computer system to communicate with a respective number or entity, such as an emergency number or emergency service); and in accordance with a determination that the respective communication network is available, the computer system forgoes display of the indication of the communication capability status of the computer system (e.g., 1701 in FIGS. 17A-17F does not include "SOS"). In some embodiments, the indication of the communication capability of the computer system is displayed in a portion of a user interface that includes one or more indicators of a status of the computer system (e.g., cellular status, Wi-Fi status, time, short range communication status, and/or battery level). In some embodiments, the indication of the communication capability of the computer system is displayed at a location of a display and/or user interface at which a cellular status indicator is displayed when cellular service is available. Displaying (or forgoing display of) an indication of a communication capability of the computer system based on whether or not the respective communication network is available automatically provides the user with relevant information about the communication capability of the computer system when the information is needed (e.g., when the respective communication network is not available) and prevents cluttering the user interface when the respective communication network is available, which provides improved visual feedback to the user and performs an operation when a set of conditions has been met without requiring further user input.

In some embodiments, displaying the indication of the communication capability of the computer system includes displaying an indication (e.g., 607*c*) of a capability of the computer system to communicate via a satellite communication network (e.g., an indication of satellite connectivity and/or an image, glyph, or other graphical representation of a satellite). In some embodiments, the computer system displays the indication of the capability of the computer system to communicate via a satellite communication network if (e.g., only if) a Wi-Fi capability of the computer system is disabled (e.g., Wi-Fi is turned off), and forgoes display of the indication of the capability of the computer system to communicate via a satellite communication network if the Wi-Fi capability of the computer system is enabled (e.g., Wi-Fi is turned on). Displaying the indication of the capability of the computer system to communicate via a satellite communication network provides the user with clear feedback that communication is possible via satellite even though the respective communication network is not available and without the user having to navigate a user interface to determine the communication capability of the computer system, which provides improved visual feedback to the user and reduces the number of inputs needed to perform an operation. Feedback about the communication capability of the computer system that enables the computer system to be more quickly and efficiently controlled is particularly important in situations where the user is responding to an emergency or stressful situation.

In some embodiments, displaying the indication of the communication capability of the computer system includes: in accordance with a determination that the computer system is displaying a first type of user interface (e.g., 602Y, a user interface with a full or expanded region for displaying status icons and/or a control center user interface that includes selectable controls for setting operational parameters and/or activating functions of the computer system), displaying an indication (e.g., 607*c*) of a capability of the computer system to communicate via a satellite communication network (e.g., an indication of satellite connectivity and/or an image, glyph, or other graphical representation of a satellite); and in accordance with a determination that the computer system is displaying a second type of user interface (e.g., 602J, a user interface with a reduced-size or compacted region for displaying status icons), forgoing display of the indication of the capability of the computer system to communicate via a satellite communication network. Displaying the indication of the capability of the computer system to communicate via a satellite communication network based on the type of user interface displayed by the computer system provides the user with clear feedback, when there is adequate room on the user interface, that communication is possible via satellite even though the respective communication network is not available and without the user having to navigate a user interface to determine the communication capability of the computer system, while forgoing display of the indication when there is less room on the user interface, which provides improved visual feedback to the user, reduces clutter on the user interface, and reduces the number of inputs needed to perform an operation. Feedback about the communication capability of the computer system that enables the computer system to be more quickly and efficiently controlled is particularly important in situations where the user is responding to an emergency or stressful situation.

In some embodiments, the respective type of number is an emergency number (e.g., 911 in the United States, 999 in the United Kingdom, 112 in Europe, 110 and/or 119 in Japan, or 000 in Australia), and: in response to detecting the set of one or more inputs (e.g., 1750*b*, 1750*d*, 1750*g*, 1750*x*, 1750*y*, entry of "911" in 1704*a*, selection 1750*r* of 1704*c* in FIG. 17G) that includes selection of the respective number for text-based communication: in accordance with a determination that the set of alternative communication criteria is met (and, in some embodiments, that no terrestrial communication network is available), the computer system displays an option (e.g., 1704*b* and/or 1706*d*)a selectable option, an icon, a button, an affordance, and/or a user-interactive graphical user interface object) to initiate a process for communicating with an emergency service. In some embodiments, in response to a request to send a message to an emergency number or to search for an emergency number (e.g., to start a new conversation or continue a previous conversation), the computer system initiates the process for communicating with an emergency service or displays an option to initiate the process for communicating with an emergency service. In some embodiments, if a user selects 911 as a recipient of a text message when the respective communication network is not available, the computer system displays an option to initiate the process for sending a message to the emergency service. In some embodiments, in response to detecting selection of the option to initiate the process for sending a message to the emergency service, the computer system displays a set of user interfaces for generating and/or sending a message to the emergency service (e.g., as shown in FIGS. 6M-6S) and/or for aligning and/or connecting the computer system with the alternative communication network (e.g., as shown in FIGS. 9C-9P). In some embodiments, in response to detecting selection of the option to initiate the process for sending a message to the emergency service, the computer system displays a messaging interface (e.g., of a messaging application) for sending a message to the emergency service. In some embodiments, if a user selects 911 as a recipient of a text message when the respective communication network is not available, the computer system automatically (e.g., without displaying the option to initiate the process for sending a message to the emergency service) displays: a set of user interfaces for generating and/or sending a message to the emergency service (e.g., as shown in FIGS. 6M-6S); a set of user interfaces for aligning and/or connecting the computer system with the alternative communication network (e.g., as shown in FIGS. 9C-9P); and/or a messaging interface (e.g., of a messaging application) for sending a message to the emergency service. Displaying an option to initiate a process for communicating with an emergency service in accordance with a determination that the set of alternative communication criteria is met provides the user with feedback about the ability to communicate in an emergency and provides the user with a quick an efficient way of communicating in an emergency without cluttering the user interface under non-emergency circumstances, which provides improved visual feedback to the user, provides additional control options without cluttering the user interface with additional displayed controls, and performs an operation when a set of conditions has been met without requiring further user input. Feedback about the communication capability of the computer system that enables the computer system to be more quickly and efficiently controlled is particularly important in situations where the user is responding to an emergency or stressful situation.

In some embodiments, in response to detecting the set of one or more inputs that includes selection of the respective number for text-based communication: in accordance with a determination that the respective communication network is available, the computer system displays an option (e.g., 1704*b* in FIG. 17C, 1710*a*, 1710*b*, a selectable option, an icon, a button, an affordance, and/or a user-interactive graphical user interface object) to initiate a process for communicating with the emergency service via the respective communication network (e.g., a process for calling and/or sending a text message to the emergency service). Displaying an option to initiate a process for communicating with the emergency service via the respective communication network in accordance with a determination that the respective communication network is available provides the user with feedback about the ability to communicate in an emergency and enables the user to more quickly and easily communicate with the emergency service, which provides improved visual feedback to the user, reduces the number of inputs needed to perform an operation, provides additional control options without cluttering the user interface with additional displayed controls, and performs an operation when a set of conditions has been met without requiring further user input. Feedback about the communication capability of the computer system that enables the computer system to be more quickly and efficiently controlled is particularly important in situations where the user is responding to an emergency or stressful situation.

In some embodiments, the computer system detects a set of one or more inputs (e.g., 1750*d* and/or 1750*r*) that includes a request to display a message conversation with the respective number (e.g., a user interface of a messaging application that includes a message conversation between a user associated with the computer system and the respective number, where the message conversation includes one or more messages between the user associated with the computer system and the respective number); in response to detecting the set of one or more inputs that includes the request to display the message conversation with the respective number, the computer system displays the message conversation with the respective number (e.g., 1706 in FIG. 17H and/or 1712*a* in FIG. 17I); and while displaying the message conversation with the respective number: in accordance with a determination that a set of message communication criteria is met (e.g., the set of alternative communication criteria), wherein the set of message communication criteria includes a criterion that is met when the respective communication network is not available (or, in some embodiments, when no terrestrial communication network is available), the computer system displays an option (e.g., 1706*d*, a selectable option, an icon, a button, an affordance, and/or a user-interactive graphical user interface object) to connect to the alternative communication network (and/or, in some embodiments, an option to initiate a process for connecting to the alternative communication network). Displaying an option to connect to the alternative communication network while displaying the message conversation with the respective number and in accordance with a determination that a set of message communication criteria is met provides the user with provides the user with feedback about the ability to communicate in an emergency and a quick and efficient means for connecting to the alternative communication network without navigating the user interface when the option is likely to be needed and without cluttering the user interface when the option is not needed, which provides improved visual feedback to the user, reduces the number of inputs needed to perform an operation, provides additional control options without cluttering the user interface with additional displayed controls, and performs an operation when a set of conditions has been met without requiring further user input. Feedback about the communication capability of the computer system that enables the computer system to be more quickly and efficiently controlled is particularly important in situations where the user is responding to an emergency or stressful situation.

In some embodiments, displaying the option to connect to the alternative communication network in accordance with the determination that the set of message communication criteria is met occurs in response to detecting the set of one or more inputs that includes the request to display a message conversation with the respective number (e.g., display 1706*d* when 1706 and/or 1712 is displayed) (e.g., if the respective communication network is not available, the computer system displays the option to connect to the alternative communication network when the message conversation is displayed). Displaying the option to connect to the alternative communication network in response to detecting the request to display a message conversation with the respective number enables the computer system to display the option when the message conversation is displayed without requiring the user to navigate the user interface and without cluttering the user interface when the option is not needed, which provides improved visual feedback to the user, reduces the number of inputs needed to perform an operation, and provides additional control options without cluttering the user interface with additional displayed controls.

In some embodiments, displaying the option to connect to the alternative communication network in accordance with the determination that the set of message communication criteria is met occurs in response to detecting a set of one or more inputs that includes a request to send a message to the respective number (e.g., display 1706*d* when 1706*c* and/or 1712*c* is selected) (e.g., to send a new message in the message conversation) (e.g., if the respective communication network is not available, the computer system displays the option to connect to the alternative communication network in response to receiving a request to send a text message to the respective number in the message conversation). Displaying the option to connect to the alternative communication network in response to detecting the request to send a message to the respective number enables the computer system to avoid displaying the option until the user indicates an intent to send a message and without requiring the user to navigate the user interface for an option to connect to the alternative communication network, which provides improved visual feedback to the user, reduces the number of inputs needed to perform an operation, and provides additional control options without cluttering the user interface with additional displayed controls.

In some embodiments, outputting the prompt (e.g., 1704*b* and/or 1706*d*) includes displaying the prompt in a user interface of a messaging application (e.g., 1704, 1712, an application that provides user interfaces for generating and/or sending text messages and/or for displaying message conversations between two or more participants of a message conversation). Displaying the prompt in a user interface of a messaging application automatically informs the user that communication with the respective number can be performed via an alternative communication network in a context in which the user has indicated an intent to send a communication, which provides improved visual feedback to the user, reduces the number of inputs needed to perform an operation, and provides additional control options without cluttering the user interface with additional displayed controls.

Note that details of the processes described above with respect to method 1800 (e.g., FIG. 18) are also applicable in an analogous manner to the methods described below and above. For example, method 700, 800, 1000, 1200, 1400, 1600, 2000, and/or 2200 optionally includes one or more of the characteristics of the various methods described above with reference to method 1800. For example, initiating a communication according to method 1800 can initiate display of the sets of option in method 800. For example, initiating a communication according to method 1800 can initiate display of the alignment element in method 1000. For brevity, these details are not repeated below.

FIGS. 19A-19O illustrate exemplary user interfaces for providing an alternative communication network test mode, in accordance with some embodiments. The user interfaces in these figures are used to illustrate the processes described below, including the processes in FIG. 20. In some embodiments, providing the alternative communication network test mode includes performing one or more of the methods described with reference to FIGS. 7, 8, and/or 10 (e.g., method 700, 800, and/or 1000).

In some embodiments, any of the selections, requests, and/or inputs described herein (e.g., 1950*a*-1950*s*) is or includes a touch input (e.g., a tap gesture and/or a swipe gesture). In some embodiments, any of the selections, requests, and/or inputs described herein (e.g., 1950*a*-1950*s*) is or includes a voice input (e.g., a voice command to select a user interface element or to activate a feature or perform a function, such as a feature or function associated with a user interface element). In some embodiments, any of the selections, requests, and/or inputs described herein (e.g., 1950*a*-1950*s*) is or includes an air gesture (e.g., an air gesture to select a user interface element or to activate a feature or perform a function, such as a feature or function associated with a user interface element). In some embodiments, any of the selections, requests, and/or inputs described herein (e.g., 1950*a*-1950*s*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 19A illustrates computer system 600 described above with reference to, e.g., FIG. 6A. In FIG. 6A, computer system 600 has cellular service, as indicated by network indicator 607, and displays home screen 1900, which includes application icons for launching, opening, and/or displaying corresponding applications and/or user interfaces. Computer system detects request 1950*a* (e.g., one or more presses on button 617*a* and/or button 617*b*; in some embodiments, 617*a* and button 617*b* are pressed concurrently) to display a selectable option for displaying medical information of a user associated with computer system 600. In response to detecting request 1950*a*, computer system 600 displays user interface 1902, as shown in FIG. 19B, which includes displaying power off option 1902*a*, medical ID option 1902*b*, and emergency communication option 1902*c*. In FIG. 19B, computer system 600 detects selection 1950*c* (e.g., a touch and drag or swipe to the right, a tap, and/or other selection input) of medical ID option 1902*b*.

In response to detecting selection 1950*c* of medial ID option 1902*b*, computer system 600 displays user interface 1904, as shown in FIG. 19C, which includes medical information about a user associated with computer system 600 that is related to the user's medical history and/or status, or that may be relevant in a medical emergency. The medical information includes, but is not limited to, e.g., the user's name, age, medical condition(s), allergies and reactions, medications, blood type, weight, and/or height. Displaying user interface 1904 includes displaying emergency communication object 1906 (e.g., user interface 1904 includes emergency communication object 1906). Emergency communication object 1906 includes description 1906*a* about an emergency communication capability of computer system 600 to connect to a satellite and communicate with emergency services when cellular service is not available (e.g., Emergency SOS via Satellite: Your phone can help start a satellite connection to contact emergency services when a call won't go through"). Emergency communication object 1906 includes demo option 1906*b* for starting an alternative communication network test mode that demonstrates and/or simulates the emergency communication capability. For example, in response to detecting selection 1950*o* of demo option 1906*b* (e.g., a tap on demo option 1906*b* and/or other input selecting demo option 1906*b*), computer system 600 displays tutorial user interface 1912 shown in FIG. 19F.

Returning to FIG. 19A, computer system 600 detect selection 1950*b* of settings icon 1900*a* (e.g., a tap on settings icon 1900*a* and/or other input selecting settings icon 1900*a*). In response to detecting selection 1950*b* of settings icon 1900*a*, computer system 600 displays settings menu user interface 1908, as shown in FIG. 19D. Settings menu user interface 1908 includes emergency SOS option 1908*a*. In FIG. 19D, computer system 600 detects selection 1950*d* of emergency SOS option 1908*a* (e.g., a tap on emergency SOS option 1908*a* and/or other input selecting emergency SOS option 1908*a*).

In response to detecting selection of emergency SOS option 1908*a*, computer system 600 displays emergency SOS settings user interface 1910, as shown in FIG. 19E. Emergency SOS settings user interface 1910 includes information and settings options for emergency communication features of computer system 600, such as, e.g., how to make an emergency call. Emergency SOS settings user interface 1910 includes emergency communication object 1906 described with reference to FIG. 19C. In some embodiments, as shown in FIG. 19E, emergency communication object 1906 is displayed in a prominent position (e.g., overlaid on or at or near a top of emergency SOS settings user interface 1910). By displaying emergency communication object 1906 in a prominent position, computer system 600 prompts the user to use the alternative communication network test mode, suggests the alternative communication network test mode to the user, and/or provides emergency communication object 1906 as a tip to notify the user that the alternative communication network test mode is available. In some embodiments, emergency communication object 1906 is displayed in a different position in emergency settings user interface 1910 (e.g., further from the top, at or near the middle, and/or towards the bottom of emergency settings user interface 1910). In some embodiments, computer system 600 displays emergency communication object 1906 overlaid on or at or near the top of user interface 1904 shown in FIG. 19C to prompt the user to use the alternative communication network test mode, suggest the alternative communication network test mode to the user, and/or provide emergency communication object 1906 as a tip to notify the user that the alternative communication network test mode is available.

In FIG. 19E, computer system 600 detects selection 1950*e* of demo option 1906*b* (e.g., a tap on demo option 1906*b* and/or other input selecting demo option 1906*b*). In response to detecting selection 1950*e* of demo option 1906*b*, computer system 600 displays tutorial user interface 1912 shown in FIG. 19F. Tutorial user interface 1912 includes text (e.g., 1912*b*), graphics (e.g., 1912*a*), animations, demonstrations, and/or other information about the emergency communication capability and/or the alternative communication network test mode.

In FIG. 19E, tutorial user interface includes next button 1912*c* and computer system 600 detects selection 1950*f* of next button 1912*c* (e.g., a tap on next button 1912*c* and/or other input selecting next button 1912*c*). In response to detecting selection 1950*f* of next button 1912*c*, computer system 600 displays notification 1914 shown in FIG. 19G. Notification 1914 includes prompt 1914*a* (e.g., "Temporarily turn off cellular to test satellite connection"), which indicates that a cellular communication capability of computer system 600 is disabled during the alternative communication network test mode and prompts a user to turn off the cellular communication capability (e.g., to test a satellite connection). Notification 1914 includes turn off option 1914*b* and cancel option 1914. In response to detecting selection of cancel option 1914*c*, computer system 600 ceases display of notification 1914 and forgoes turning off the cellular communication capability (e.g., keeps the cellular communication capability enabled and/or turned on).

In FIG. 19G, computer system 600 detects selection 1950*g* of turn off option 1914*b*. In response to detecting selection 1950*g* of turn off option 1914*b*, computer system 600 turns off the cellular communication capability (e.g., as indicated by network indicator 607) and displays demo reporting interface 1916 shown in FIG. 19H. Demo reporting interface 1916 is similar to reporting interface 602M (e.g., shown in FIG. 6M) displayed in response to, e.g., selection of text via satellite communication button 604G (e.g., as shown in FIG. 6G). For example, demo reporting interface 1916 includes a set of options 1916*a* corresponding to information for a test report to be sent in the alternative communication network test mode.

In contrast to reporting interface 602M (and other reporting interfaces displayed for generating a report as described with reference to, e.g., FIGS. 6M-6Y), demo reporting interface 1916 includes demo notification 1918 (e.g., at the top of demo reporting interface 1916) to inform the user that the alternative communication network test mode is activated and that demo reporting interface 1916 is for demonstration and/or test purposes and not for reporting a real emergency (e.g., "Emergency SOS Demo: This is not a real emergency"). In some embodiments, demo notification 1918 is persistently displayed while computer system 600 is in the alternative communication network test mode to constantly remind the user that the user interfaces are for demonstration and/or test purposes.

FIG. 19H shows satellite 1975, which indicates that computer system 600 is capable of connecting to a satellite for communication in the alternative communication network test mode. In FIG. 19H, there is a blank space between computer system 600 and satellite 1975, which indicates that computer system 600 is not connected to satellite 1975.

As shown in FIG. 19H, computer system 600 detects selection 1950*h* of option 1916*a*1, which corresponds to a hypothetical emergency in which a person is lost or trapped. In response to selection 1950*h* of option 1916*a*1, computer system 600 displays demo reporting interface 1917, which includes another set of options 1917*a* corresponding to further information about the hypothetical emergency, as shown in FIG. 19H1. In response to selection 1950*p* of multiple people option 1917*a*1, computer system 600 displays summary interface 1919 shown in FIG. 19H2, which includes summary 1919*a* of a demo report, timer 1919*b*, and send option 1919*c*. In some embodiments, computer system 600 displays options to generate and send a demo report analogous to the options and user interfaces described with reference to FIGS. 6M-6Y. In some embodiments, as shown in FIGS. 19H, 19H1, and 19H2, computer system 600 maintains display of demo notification 1918 while displaying the options for generating and sending the demo report in the alternative communication network test mode.

After transmission of a demo report is initiated (e.g., in response to selection 1950*q* of send option 1919*c*, or in response to expiration of timer 1919*b*), computer system 600 displays alignment interface 1922 (e.g., similar to alignment interface 902F and/or alignment interface 902G) and continues to display demo notification 1918, as shown in FIG. 19I. Alignment interface 1922 includes graphical element 1922*a*, connection status indicator 1922*b*, and connection instructions 1922*c*. Graphical element 1922*a* provides a graphical indication of a status of an alignment between computer system 600 and satellite 1975 (e.g., similar to or the same as graphical element 931). In FIG. 19I, graphical element 1922*a* indicates that computer system 600 is not aligned with a satellite and that computer system 600 needs to be turned to the left to find a satellite. Connection status indicator 1922*b* provides a textual indication of the status of a connection between computer system 600 and satellite 1975. In FIG. 19I, connection status indicator 1922*b* indicates that computer system 600 is looking for a signal with satellite 1975. Connection instructions 1922*c* provide instructions for aligning and/or connecting computer system 600 with satellite 1975. In FIG. 19I, connection instructions 1922*c* prompt the user to turn left to find satellite 1975.

Turning to FIG. 19J, computer system 600 is connected to satellite 1975 (e.g., was turned left to align with satellite 1975 and established a communication connection) as indicated by the two-way arrow between computer system 600 and satellite 1975. Graphical element 1922*a* and connection status indicator 1922*b* (e.g., "Connected") indicate that computer system 600 is connected to satellite 1975. In FIG. 19J, connection instructions 1922*c* instruct the user to keep pointing computer system 600 at satellite 1975. Since computer system 600 is connected to satellite 1975 in FIG. 19J, alignment interface 1922 includes opening messages option 1922*d* to indicate that computer system is opening a messaging application (e.g., automatically, without further user input). In some embodiments, in response to detecting selection 1950*r* of opening messages option 1922*d*, computer system 600 opens the messaging application (e.g., before the messaging application is automatically displayed).

In some embodiments, computer system 600 updates alignment interface 1922, including graphical element 1922*a*, connection status indicator 1922*b*, and connection instructions 1922*c*, based on the alignment and/or connection status of computer system 600, as described with respect to alignment interfaces 902C, 902D, 902E, 902F, 902G, 902H, 902I, 902J, 902O, 902O1, and/or 902P shown in FIGS. 9C-9J and 9O-9P, and/or method 1000.

Turning to FIG. 19K, computer system 600 displays messaging interface 1924 and maintains display of demo notification 1918. In some embodiments, messaging interface 1924 is similar to messaging interface 902K, 902L, 902M, and/or 902N. In FIG. 19K, messaging interface 1924 displays demo message 1924*a*, which includes a summary of a demo report sent via a satellite communication network in the alternative communication network test mode based on the options selected in demo reporting interface 1916 and/or other options selected while generating the report (e.g., as described with reference to FIGS. 6M-6Y and/or method 800).

Messaging interface 1924 includes message entry field 1924*b* for generating a message, send option 1924*c* for sending a generated message, and demo indicator 1924*d*, which indicates that the messages sent and/or received via messaging user interface 1924 are an example conversation with emergency services.

In FIG. 19K, computer system 600 displays banner 926 according to the techniques described with reference to FIGS. 9K-9N1 (e.g., based on the alignment of computer system 600 and satellite 1975 and/or the status of the message between computer system 600 and satellite 1975).

Turning to FIG. 19L, computer system 600 has received demo response 1924*e* via satellite communication from a demo communication service (e.g., a communication service to which demo report 1924*a* was sent). Demo response 1924*e* include an indication that demo response 1924*e* is an example response for testing purposes (e.g., "Emergency services response example"). Since computer system 600 is still in the alternative communication network test mode, computer system 600 continues to display demo notification 1918.

In FIG. 19L, a user has entered a demo message into message entry field 1924*b* (e.g., via inputs 1950*s* on soft keyboard 1924*g*) and computer system 600 detects selection 1950*i* (e.g., a tap and/or other selection input) of send option 1924*c*. As shown in FIG. 19M, in response to detecting selection 1950*i* of send option 1924*c*, computer system 600 sends a via satellite communication with the text entered into message entry field 1924*b*, and message 1924*f* is added to the conversation, e.g., in message conversation region 1924*h* of messaging interface 1924. Banner 926 indicates that computer system 600 is sending the message and instructs the user to keep pointing computer system 600 at satellite 1975.

In FIG. 19M, computer system 600 detects a request to exit the alternative communication network test mode. In some embodiments, the request to exit the alternative communication network test mode includes a press (e.g., 1950*k*) of a physical button (e.g., 617*a*, 617*b*, and/or 617*c*), selection (e.g., 1950*j*, a tap, and/or other selection input) of end option 1920, and/or a request (e.g., 1950*l*, such as tap and/or swipe gesture at a predetermined location of messaging interface 1924) to display a home screen.

In response to detecting the request to exit the alternative communication network test mode, computer system 600 displays confirmation prompt 1926 (e.g., a pop-up object, a user interface, and/or a notification) and shades messaging interface 1924, as shown in FIG. 19N. In response to detecting a request to remain in the alternative communication network test mode (e.g., input 1950*m*, such as a tap or other input that is not directed to confirmation prompt 1926), computer system 600 removes confirmation prompt 1926 and displays messaging interface 1924 (e.g., without shading).

Confirmation prompt 1926 includes indication 1926*a* that the alternative communication network test mode has ended and that the cellular capability and Wi-Fi capability of computer system 600 will be enabled (e.g., turned on). In some embodiments, Wi-Fi capability of computer system 600 is not turned off during the alternative communication network test mode and, in such embodiments, confirmation prompt 1926 does not indicate that Wi-Fi capability of computer system 600 will be enabled.

Confirmation prompt 1926 includes confirmation option 1926*b*. In response to detecting selection 1950*n* (e.g., a tap and/or other selection input) of confirmation option 1926*b*, computer system 600 exits the alternative communication network test mode, displays, e.g., user interface 1928, and enables the cellular capability of computer system 600, as indicated by network indicator 607, as shown in FIG. 19O.

FIG. 20 is a flow diagram illustrating a method for testing an alternative communication network using a computer system in accordance with some embodiments. Method 2000 is performed at a computer system (e.g., 100, 300, 500, 600, 900, 1100, 1300A, 1300B, 1500A, 1500B, 1500C, a smartphone, smartwatch, laptop computer, desktop computer, and/or tablet computer) that is in communication with a display generation component (e.g., 601, 901, 1106, 1302A, 1302B, 1502A, 1502B, 1502C, a display controller, a display device, a monitor, and/or a touch-sensitive display system) and one or more input devices (e.g., 601, 901, 617*a*, 617*b*, 617*c*, a touch-sensitive surface, a touchscreen, a button, a keyboard, a mouse, a camera, a rotatable input mechanism, and/or a microphone), where the computer system is configured to communicate via an alternative communication network (e.g., a non-terrestrial communication network, such as a satellite communication network) while a respective communication network (e.g., a terrestrial communication network, such as a cellular communication network or a Wi-Fi network) is not available (e.g., while no terrestrial communication network is available). In some embodiments, the computer system is configured to communicate via the alternative communication network only when the respective communication network is not available (e.g., the capability to communicate via the respective communication network is disabled and/or a connection with the respective communication network sufficient for communication cannot be established). Some operations in method 2000 are, optionally, combined, the orders of some operations are, optionally, changed, and some operations are, optionally, omitted.

As described below, method 2000 provides an intuitive way for testing an alternative communication network. The method reduces the cognitive burden on a user for testing an alternative communication network, thereby creating a more efficient human-machine interface. For battery-operated computing devices, enabling a user to test an alternative communication network faster and more efficiently conserves power and increases the time between battery charges.

While a capability of the computer system to communicate via (and/or to connect to) the respective communication network is enabled (e.g., Wi-Fi and/or cellular communication capability is enabled), the computer system detects (2002), via the one or more input devices, a set of one or more inputs (e.g., 1950*a*, 1950*b*, 1950*c*, 1950*o*, 1950*d*, 1950*e*, 1950*f*, 1950*g*, a contact and/or touch gesture on a touch-sensitive surface, an air gesture, a mouse click, a key press, a button press, and/or a voice command) corresponding to a request to activate an alternative communication network test mode (e.g., an operational mode of the computer system that simulates a process for connecting to and/or sending a communication via an alternative communication network). In some embodiments, the computer system is capable of sending a communication via the alternative communication network while in the alternative communication network test mode. In some embodiments, the computer system is not capable of sending a communication via the alternative communication network (e.g., a capability to communicate via the alternative communication network is disabled) while in the alternative communication network test mode. In some embodiments, while the computer system is operating in the alternative communication network test mode, the computer system is configured to send communications to a recipient (e.g., a non-emergency services recipient and/or a test recipient) via the alternative communication network that the computer system is not configured to send communications to via the alternative communication network when the computer system is not operating in the alternative communication network test mode.

In response to detecting the set of one or more inputs corresponding to a request to activate the alternative communication network test mode, the computer system activates (2004) the alternative communication network test mode (e.g., as shown in FIG. 19F, FIG. 19G, or FIG. 19H). While the alternative communication network test mode is activated (e.g., while the computer system is operating in the alternative communication network test mode), the computer system displays (2006), via the display generation component, a set of user interfaces (e.g., 1916, 1922, 926, and/or 1924). Activating an alternative communication network test mode and displaying a set of user interfaces provides the user with a means for testing a feature that is only appropriate to use in an emergency under non-emergency circumstances so that the user knows how to use the feature in an emergency with fewer errors (e.g., so that the user does not have to learn how to use the feature during an actual emergency), which enables the user to use the computer system more quickly and efficiently and reduces the number of inputs needed to perform an operation.

In some embodiments, activating the alternative communication network test mode includes disabling a capability of the computer system to communicate via (and/or, in some embodiments, to connect to) the respective communication network (e.g., turn off Wi-Fi and/or cellular capability) (e.g., as shown in FIGS. 19G and 19H). Disabling a capability of the computer system to communicate via the respective communication network enables the computer system to more accurately simulate a process of connecting to and/or communicating via the alternative communication network, disables a communication antenna, reduces electromagnetic interference with the alternative communication network, and/or reduces the amount of emitted energy, which reduces power usage and improves battery life.

In some embodiments, displaying the set of user interfaces includes displaying (e.g., the set of user interfaces includes): a user interface (e.g., 1922, 1924, 926, and/or a connection assistant user interface) that includes an indication (e.g., a graphical indication, icon, color, font, text, animation, symbol, thumbnail, image, and/or glyph; and/or 1922*a*, 1922*b*, 908C, 908D, 908E, 908F, 908G, 908H, 908I, 908J, 908O, 908O1, 908P, 926, and/or 931) of a status of a connection with the alternative communication network and instructions (e.g., 1922*a*, 1922*c*, 908C, 908D, 908E, 908F, 908G, 908H, 908I, 908J, 908O, 908O1, 908P, 926, and/or 931) for establishing a connection (or, in some embodiments, maintaining a connection) with the alternative communication network; and a user interface (e.g., 1916, 602M, 602N, 602O, 602P, 602Q, 602R, 602S, 602T, 602U, 602V, and/or 602W) for generating a communication (e.g., 1924*a*, a text message, and/or an audio message) that is capable of being sent via the alternative communication network while the alternative communication network test mode is activated. In some embodiments, the user interface that includes the indication of a status of a connection with the alternative communication network and instructions for establishing a connection with the alternative communication network includes the user interfaces and/or features described in FIGS. 9C-9Q and method 1000. In some embodiments, the user interface for generating the communication includes the user interfaces, options, and/or operations described in FIGS. 6M-6W and/or method 800. Displaying a user interface that includes an indication of a status of a connection with alternative communication network allows the user to resolve issues (e.g., misalignment and/or obstruction) that prevent the computer system from connecting to the alternative communication network quickly and efficiently with fewer inputs, which provides improved visual feedback and reduces the number of inputs needed to perform an operation. Displaying a user interface for generating a communication that is capable of being sent via the alternative communication network enables the computer system to provide options that are optimal (e.g., require limited bandwidth) for communicating via the alternative communication network, to reduce the number of inputs required to generate a message (e.g., without using a keyboard), and to guide a user through the process for communicating via the alternative communication network, which provides improved visual feedback to the user, reduces the number of inputs needed to perform an operation, provides additional control options without cluttering the user interface with additional displayed controls.

In some embodiments, the computer system detects a set of one or more inputs (e.g., 1950*h*) directed to the user interface for generating the communication (e.g., selection of one or more options that correspond to information to include in the communication); and after (e.g., in response to) detecting the set of one or more inputs directed to the user interface for generating the communication, the computer system sends the communication (e.g., 1924*a*) via the alternative communication network, wherein the communication includes content that is based on the set of one or more inputs directed to the user interface for generating the communication (e.g., 1924*a* is based on 1950*h*). In some embodiments, the content of the communication includes a text message composed by a user (e.g., using a keyboard). In some embodiments, the content of the communication includes a representation of responses by the user to questions and/or prompts (e.g., a questionnaire, 1916*a*, 604M, 604N, 604O, 604P, and/or 604Q) in the user interface for generating the communication (e.g., 1916, 602M, 602N, 602O, 602P, and/or 602Q). Sending a communication via the alternative communication network that includes content based on the set of one or more inputs directed to the user interface for generating the communication enables a user to quickly and efficiently generate a message, which provides improved visual feedback to the user and reduces the number of inputs needed to perform an operation.

In some embodiments, activating the alternative communication network test mode simulates an emergency communication process (e.g., a low-bandwidth communication process that can be used to communicate with emergency services when a higher-bandwidth communication network is not available; e.g., as indicated by 1918). Simulating an emergency communication process enables a user to test an emergency communication feature under non-emergency circumstances so that the user can use the computer system more quickly and efficiently in emergency situations, which reduces power usage and improves battery life of the computer system.

In some embodiments, the alternative communication network is a non-terrestrial communication network (e.g., a satellite communication network). Activating a mode for testing communication via a non-terrestrial communication network enables the computer system to provide user interfaces that are not required for communication via a terrestrial communication network, such as interfaces for aligning with the non-terrestrial communication network and generating a low-bandwidth message so that the user can use the computer system more quickly and efficiently in emergency situations, which reduces the number of inputs needed to perform an operation, reduces power usage, and improves battery life of the computer system.

In some embodiments, displaying the set of user interfaces includes displaying an indication (e.g., 1922*a*, 931, 926, a graphical indication, icon, color, font, text, animation, symbol, thumbnail, image, and/or glyph) of an alignment of the computer system with one or more elements (e.g., satellites, transmitters, and/or receivers) of the non-terrestrial communication network. Displaying an indication of an alignment of the computer system with one or more elements of the non-terrestrial communication network enables the user to align the computer system with the one or more elements of the non-terrestrial communication network with fewer errors, which provides improved visual feedback to the user and reduces the number of inputs needed to perform an operation.

In some embodiments, displaying the set of user interfaces includes outputting an indication (e.g., 1914, 1914*a*, a graphical indication, sound, haptic output, icon, color, font, text, animation, symbol, thumbnail, image, and/or glyph) that a capability of the computer system to communicate via (and/or, in some embodiments, to connect to) the respective communication network will be disabled (e.g., Wi-Fi and/or cellular capability will be turned off) while the alternative communication network test mode is activated (e.g., that a cellular antenna of the computer system will be turned off during the alternative communication network test mode). Outputting an indication that a capability of the computer system to communicate via the respective communication network will be disabled while the alternative communication network test mode is activated notifies the user that a potentially primary means of communication will not be available and that there may be missed communications during the test mode (e.g., communication that require the respective communication network to be received), which provides improved feedback to the user.

In some embodiments, while the alternative communication network test mode is activated, the computer system sends a communication (e.g., 1924*a*) to a non-emergency entity via the alternative communication network (e.g., an entity that is different from the entity to which a communication is sent when performing the actual process that is simulated by the alternative communication network test mode). In some embodiments, the computer system does not communicate, and/or is not capable of communicating, with emergency services while the alternative communication network test mode is activated. Sending a communication to a non-emergency entity via the alternative communication network enables the computer system to realistically simulate communication via the alternative communication network and for the user to test communicating via the alternative communication network quickly and efficiently without contacting an emergency service and preventing the emergency service from attending to actual emergency messages, which enables the user to use the computer system more quickly and efficiently, reduces power usage, and improves battery life.

In some embodiments, while the alternative communication network test mode is activated and after sending the communication to the non-emergency entity via the alternative communication network, the computer system receives a communication (e.g., 1924*b*) from the non-emergency entity via the alternative communication network (e.g., in response to the communication that was sent to the non-emergency entity). Receiving a communication from the non-emergency entity via the alternative communication network provides quick feedback to the user that communication via the alternative communication network is successful without burdening the emergency service and preventing the emergency service from attending to actual emergency messages, which enables the user to use the computer system more quickly and efficiently, reduces power usage, and improves battery life.

ISE the communication from the non-emergency entity includes predetermined content (e.g., a canned response, a predetermined message, and/or content that is not based on the communication that was sent to the non-emergency entity; e.g., 1924*b* includes predetermined content). In some embodiments, a communication from an emergency service includes a custom response with content that is responsive to the emergency and/or the content of the message sent to the emergency service. Receiving a communication with predetermined content enables the computer system to indicate to the user that the communication was for test purposes (e.g., that the communication was not sent to an emergency service) and to provide quick feedback to the user that communication via the alternative communication network is successful without burdening the emergency service and preventing the emergency service from attending to actual emergency messages, and allow the computer system to, which enables the user to use the computer system more quickly and efficiently, reduces power usage, and improves battery life.

In some embodiments, while the alternative communication network test mode is activated, communication with (and/or, in some embodiments, connection to) the alternative communication network is restricted in a manner in which communication with (and/or, in some embodiments, connection to) the alternative communication network is restricted when the alternative communication network test mode is not activated (e.g., during the actual process that is simulated by the alternative communication network test mode; e.g., computer system 600 is restricted in a same manner in FIGS. 19H-19M as in FIGS. 6M-6W and/or 9B-9M). In some embodiments, while the alternative communication network test mode is activated, the computer system cannot send a message via the alternative communication network unless the computer system is aligned with and connected to one or more satellites. Restricting communication with the alternative communication network in a manner in which communication with the alternative communication network is restricted when the alternative communication network test mode is not activated enables the computer system to more accurately simulate the process for connecting to and/or communicating via the alternative communication network in an emergency so that the user can use the computer system more quickly and efficiently in emergency situations, which reduces power usage and improves battery life.

In some embodiments, the computer system displays a settings user interface (e.g., 1908 and/or 1910) that includes options (e.g., selectable options, icons, buttons, affordances, and/or user-interactive graphical user interface objects; e.g., the list of options in FIG. 19O8 and/or the options in 1910 such as "Call with Hold" and "Call with 5 Presses") for controlling one or more settings of the computer system and an option (e.g., 1906 and/or 1906*b*) for initiating activation of (e.g., activating) the alternative communication network test mode, wherein the set of one or more inputs corresponding to the request to activate the alternative communication network test mode includes an input (e.g., 1950*o* and/or 1950*e*) selecting the option for initiating activation of the alternative communication network test mode. In some embodiments, in response to detecting selection of a respective option of the options for controlling one or more settings of the computer system, the computer system adjusts a respective setting of the computer system corresponding to the selected respective option. In some embodiments, in response to detecting selection of the option for initiating activation of the alternative communication network test mode, the computer system initiates activation of the alternative communication network test mode. Displaying an option for initiating activation of the alternative communication network test mode in a setting user interface informs the user of the availability of the alternative communication network test mode and provides a quick and efficient means for accessing the alternative communication network test mode, which reduces the number of inputs needed to perform an operation.

In some embodiments, the computer system displays a medical ID option (e.g., 1902*b*, a selectable option, an icon, a button, an affordance, and/or a user-interactive graphical user interface object); the computer system detects selection (e.g., 1950*c*) of the medical ID option; and in response to detecting selection of the medical ID option, the computer system displays information (e.g., 1904) of a user who is associated with the computer system and an option (e.g., 1906, 1906*b*, a selectable option, an icon, a button, an affordance, and/or a user-interactive graphical user interface object) for initiating activation of (e.g., activating) the alternative communication network test mode, wherein the set of one or more inputs corresponding to the request to activate the alternative communication network test mode includes an input (e.g., 1950*o* and/or 1950*e*) selecting the option for initiating activation of the alternative communication network test mode. In some embodiments, the information of the user includes the user's name, the user's age, the user's weight, the user's height, allergies, blood type, medical conditions, a designated contact (e.g., a name of an emergency contact), and/or contact information (e.g., a phone number) of the designated contact. Displaying an option for initiating activation of the alternative communication network test mode in response to detecting selection of the medical ID option informs the user of the availability of the alternative communication network test mode in a relevant location and provides a quick and efficient means for accessing the alternative communication network test mode, which reduces the number of inputs needed to perform an operation.

In some embodiments, the computer system displays a prompt (e.g., 1906) that includes a suggestion (e.g., 1906*a*, a tip and/or a notice that a feature is available) related to the alternative communication network test mode, wherein the prompt includes an option (e.g., 1906*b*, a selectable option, an icon, a button, an affordance, and/or a user-interactive graphical user interface object) for initiating activation of (e.g., activating) the alternative communication network test mode, wherein the set of one or more inputs corresponding to the request to activate the alternative communication network test mode includes an input (e.g., 1950*o* and/or 1950*e*) selecting the option for initiating activation of the alternative communication network test mode. Displaying an option for initiating activation of the alternative communication network test mode in a prompt that includes a suggestion relate to the alternative communication network test mode informs the user of the availability of the alternative communication network test mode and provides a quick and efficient means for accessing the alternative communication network test mode, which reduces the number of inputs needed to perform an operation.

In some embodiments, before activating the alternative communication test mode (and, in some embodiments, in response to detecting the set of one or more inputs corresponding to a request to activate the alternative communication network test mode), the computer system displays a tutorial (e.g., 1912, 1912*a*, and/or 1912*b*) that includes information (e.g., instructions and/or a demonstration) about the alternative communication network test mode (and/or, in some embodiments, information about the actual process that is simulated by the alternative communication network test mode). In some embodiments, activating the alternative communication network test mode includes displaying the tutorial, e.g., in an initial user interface upon activating the alternative communication network test mode. In some embodiments, the computer system displays the tutorial in an initial user interface of the set of user interfaces. Displaying a tutorial that includes information about the alternative communication network test mode before activating the alternative communication test mode provides the user with information about the test mode before the user attempts to use the test mode and enables the user to use the test mode with fewer errors, which provides improved visual feedback to the user and reduces the number of inputs needed to perform an operation.

In some embodiments, while the alternative communication network test mode is activated, the computer system displays an indication (e.g., 1918, a graphical indication, icon, color, font, text, animation, symbol, thumbnail, image, and/or glyph) that the alternative communication network test mode is activated that is not displayed during a process of communicating via (and/or, in some embodiments, connecting to) the alternative communication network when the alternative communication network test mode is not activated (e.g., during the actual process that is simulated by the alternative communication network test mode; e.g., 1918 is not displayed in FIGS. 6M-6W and/or 9B-9Q). In some embodiments, the computer system maintains display of the indication that the alternative communication network test mode is activated until the alternative communication network test mode is deactivated (e.g., the indication is persistent). Displaying an indication that the alternative communication network test mode is activated informs the user about the state of the computer system and prevents the user from providing inputs that are not relevant to the state of the computer system, which provides improved visual feedback to the user and reduces the number of inputs needed to perform an operation.

In some embodiments, the computer system detects a set of one or more inputs (e.g., 1950*j*, 1950*k*, 1950*l*, and/or 1950*n*) that includes a request to exit (e.g., end, close, disable, and/or deactivate) the alternative communication network test mode; and in response to detecting the set of one or more inputs that includes the request to exit the alternative communication network test mode, the computer system exits (e.g., ending, closing, disabling, and/or deactivating) the alternative communication network test mode (e.g., as shown in FIG. 19N and/or FIG. 19O), including enabling (e.g., turning on) a capability of the computer system to communicate via (and/or, in some embodiments, to connect to) the respective communication network (e.g., turn on Wi-Fi and/or cellular capability). Enabling the capability of the computer system to communicate via the respective communication network in response to detecting the request to exit the alternative communication network test mode allows the user to automatically resume communication via the respective communication network without having to manually enable the capability to communicate via the respective communication network, which reduces the number of inputs needed to perform an operation. Enabling the capability of the computer system to communicate via the respective communication network in response to detecting the request to exit the alternative communication network test mode enables the computer system to automatically enable (or re-enable) the capability of the computer system to communicate via the respective communication network so that the computer system can send and receive information using the respective communication network (e.g., if a user has disabled the capability of the computer system to communicate via the respective communication network and does not (or forgets to) turn on the capability of the computer system to communicate via the respective communication network), which reduces the number of inputs needed to perform an operation. Enabling the capability of the computer system to communicate via the respective communication network in response to detecting the request to exit the alternative communication network test mode enables the computer system to automatically operate in (or switch to) a lower power mode (e.g., if a user has enabled the computer system to operate in a higher power mode in the alternative communication network test mode and does not (or forgets to) turn off the higher power mode), which reduces power usage and improves battery life.

In some embodiments, the set of one or more inputs that includes the request to exit the alternative communication network test mode includes a request (e.g., 1950*j* and/or 1950*l*) to close an application (and/or, in some embodiments, a user interface of an application) that provides (e.g., runs) the alternative communication network test mode (e.g., the computer system exits the alternative communication network test mode in response to detecting a request to close the application). Exiting the alternative communication network test mode in response to a request to close an application that provides the alternative communication network test mode provides a quick and efficient method for ending the alternative communication network test mode, which reduces the number of inputs needed to perform an operation. Exiting the alternative communication network test mode in response to a request to close an application that provides the alternative communication network test mode enables the computer system to automatically enable (or re-enable) the capability of the computer system to communicate via the respective communication network so that the computer system can send and receive information using the respective communication network (e.g., if a user has disabled the capability of the computer system to communicate via the respective communication network and does not (or forgets to) turn on the capability of the computer system to communicate via the respective communication network), which reduces the number of inputs needed to perform an operation. Exiting the alternative communication network test mode in response to a request to close an application that provides the alternative communication network test mode enables the computer system to automatically operate in (or switch to) a lower power mode (e.g., if a user has enabled the computer system to operate in a higher power mode in the alternative communication network test mode and does not (or forgets to) turn off the higher power mode), which reduces power usage and improves battery life.

In some embodiments, the set of one or more inputs that includes the request to exit the alternative communication network test mode includes a request (e.g., 1950*k*) to lock a user interface of the computer system (and/or, in some embodiments, a request to put the computer system in a sleep state, low-power state, and/or wake state) (e.g., the computer system exits the alternative communication network test mode in response to detecting a request to lock a user interface of the computer system). Exiting the alternative communication network test mode in response to a request to lock a user interface of the computer system provides a quick and efficient method for ending the alternative communication network test mode without additional user inputs, which reduces the number of inputs needed to perform an operation. Exiting the alternative communication network test mode in response to a request to lock a user interface of the computer system enables the computer system to automatically enable (or re-enable) the capability of the computer system to communicate via the respective communication network so that the computer system can send and receive information using the respective communication network (e.g., if a user has disabled the capability of the computer system to communicate via the respective communication network and does not (or forgets to) turn on the capability of the computer system to communicate via the respective communication network), which reduces the number of inputs needed to perform an operation. Exiting the alternative communication network test mode in response to a request to lock a user interface of the computer system enables the computer system to automatically operate in (or switch to) a lower power mode (e.g., if a user has enabled the computer system to operate in a higher power mode in the alternative communication network test mode and does not (or forgets to) turn off the higher power mode), which reduces power usage and improves battery life.

Note that details of the processes described above with respect to method 2000 (e.g., FIG. 20) are also applicable in an analogous manner to the methods described below and above. For example, method 700, 800, 1000, 1200, 1400, 1600, 1800, and/or 2200 optionally includes one or more of the characteristics of the various methods described above with reference to method 2000. For example, the alternative communication network test mode in method 2000 can simulate method 700, 800, 1000, 1200, 1400, 1600, 1800, and/or 2200. For brevity, these details are not repeated below.

FIGS. 21A-21L illustrate exemplary user interfaces for providing a user interface object corresponding to a process, in accordance with some embodiments. The user interfaces in these figures are used to illustrate the processes described below, including the processes in FIG. 22. In some embodiments, the process associated with the user interface object includes one or more of the methods described with reference to FIGS. 7, 8, and/or 10 (e.g., methods 700, 800, and/or 1000).

In some embodiments, any of the selections, requests, and/or inputs described herein (e.g., 2150*a*-2150*l*) is or includes a touch input (e.g., a tap gesture and/or a swipe gesture). In some embodiments, any of the selections, requests, and/or inputs described herein (e.g., 2150*a*-2150*l*) is or includes a voice input (e.g., a voice command to select a user interface element or to activate a feature or perform a function, such as a feature or function associated with a user interface element). In some embodiments, any of the selections, requests, and/or inputs described herein (e.g., 2150*a*-2150*l*) is or includes an air gesture (e.g., an air gesture to select a user interface element or to activate a feature or perform a function, such as a feature or function associated with a user interface element). In some embodiments, any of the selections, requests, and/or inputs described herein (e.g., 2150*a*-2150*l*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 21A illustrates computer system 600 described above in, e.g., FIG. 6A. In FIG. 21A, computer system 600 displays call management interface 602G, described in FIG. 6G, and detects selection 2150*a* (e.g., a tap or other selection input) of text via satellite communication button 604G. In response to detecting selection of text via satellite communication button 604G, computer system 600 initiates a process for sending a communication via satellite communication, such as, e.g., process 700, 800, and/or 1000.

In some embodiments, the process for sending the communication via satellite communication initiated in response to detecting selection of text via satellite communication button 604G includes displaying one or more reporting interfaces (e.g., 602M, 602N, 602O, 602P, and/or 602Q), such as reporting interface 602M illustrated in FIG. 21B and described with reference to FIG. 6M. While displaying reporting interface 602M, computer system 600 detects a request to cease display of reporting interface 602M (e.g., a request to display a system user interface such as a lock screen, a wake screen, or a home screen). In FIG. 21B, input 2150*b* (e.g., a press of a physical button) corresponds to a request to lock a user interface of computer system 600, and input 2150*c* (e.g., a tap, an upward swipe starting from a predefined portion of display 601 and/or interface 602N, and/or other input) corresponds to a request to display a home screen (e.g., 1304 described in FIG. 13A). In some embodiments, in response to detecting input 2150*c*, computer system 600 displays home screen 2108 and activity user interface object 2106 as described in greater detail with reference to FIG. 21D.

In response to detecting input 2150*b*, computer system 600 locks a user interface of computer system 600, which includes turning off or dimming display 601, or displaying user interface 2102 as shown in FIG. 21C. In some embodiments, computer system 600 displays user interface 2102 in response to detecting input 2150*b*. In some embodiments, computer system 600 turns off display 601 in response to input 2150*b* and then displays user interface 2102 in response to detecting further input, such as, e.g., a press of a button on computer system 600, a contact on display 601, and/or movement of computer system 600 (e.g., movement that satisfies movement criteria). In FIG. 21C, user interface 2102 is a system user interface such as a lock screen or a wake screen that is displayed when computer system 600 transitions from a low-power state (e.g., when computer system 600 turns on display 601).

In some embodiments, computer system 600 continues to run the process for sending the communication while displaying user interface 2102 (e.g., as a background process). In FIG. 21C, computer system 600 displays activity user interface object 2106 corresponding to the process for sending the communication (e.g., the activity of sending the communication) and notifications from different applications (e.g., notification 2112*a* of an email in an email application and notification 2112*b* of a message in a messaging application). In some embodiments, computer system 600 displays activity user interface object 2106 concurrently with (e.g., on or in) user interface 2102 and/or concurrently with notification 2112*a* and/or notification 2112*b*. In some embodiments, as shown in FIG. 21C, computer system 600 displays notifications in a stacked configuration (e.g., a stack of notifications that is separate from activity user interface object 2106).

Activity user interface object 2106 includes process indicator 2106*a*, process graphic 2106*b*, and process status indicator 2106*c*. Process indicator 2106*a* indicates the process and/or application associated with activity user interface object 2106 (e.g., the process for sending the communication). Process graphic 2106*b* is a graphic that indicates the process and/or application associated with activity user interface object 2106 (e.g., the process for sending the communication). Process status indicator 2106*c* indicates a current status or state of the process for sending the communication via satellite communication. For example, process status indicator 2106*c* is based on the current status or state of the process for sending the communication. In some embodiments, process graphic 2106*b* is based on the current status or state of the process for sending the communication. Since computer system 600 was displaying reporting interface 602N at the time of receiving input 2150*b*, the process for sending the communication is in a state of prompting a user to answer questions and/or provide responses for generating content of the communication. Based on the process for sending the communication being in a state of prompting a user to answer questions and/or provide responses for generating content of the communication, process status indicator 2106*c* includes content (e.g., text and/or graphics) that indicates that the process for sending the communication is in a state of prompting a user to answer questions and/or provide input for generating content of the communication. In the embodiment illustrated in FIG. 21C, process status indicator 2106*c* indicates that the process for sending the communication is in a state of prompting a user to answer questions and/or provide input for generating content of the communication by displaying text that prompts a user to answer questions and/or provide input to generate the content of the communication (e.g., "Answer questions to help get a faster response").

In some embodiments, computer system 600 does not display (e.g., ceases display of) activity user interface object 2106 when a non-system user interface (e.g., a user interface of an application, such as an email application, web browsing application, and/or messaging application) is displayed. In some embodiments, in accordance with a determination that the displayed user interface is a respective type of user interface (e.g., a system user interface), computer system 600 displays activity user interface object 2106; and in accordance with a determination that the user interface is not the respective type of user interface, computer system 600 displays the user interface without displaying activity user interface object 2106.

In FIG. 21C, computer system 600 detects request 2150*d* (e.g., an upward swipe from a predefined portion of user interface 2102 and/or other input) to unlock the user interface of computer system 600 and/or display a home screen. In response to detecting request 2150*d*, computer system 600 displays home screen 2108 shown in FIG. 21D. Home screen 2108 is a system user interface that includes application icons for launching, opening, and/or displaying user interfaces of corresponding applications. While displaying home screen 2108, computer system 600 displays activity user interface object 2106. Compared to FIG. 21C, in which activity user interface object 2106 is displayed on user interface 2102, activity user interface object 2106 is displayed in (e.g., moved to) a different location relative to home screen 2108 (e.g., at or near the top of home screen 2108). In some embodiments, activity user interface object 2106 has the same appearance when displayed with home screen 2108 as when displayed with user interface 2102 (e.g., process indication 2106*a*, process graphic 2106*b*, and process status indicator 2106*c* are the same in FIG. 21C as in FIG. 21D). In some embodiments, the appearance and/or content of activity user interface object 2106 does not depend (e.g., is not based on) the user interface with which activity user interface object 2106 is displayed.

In FIG. 21D, computer system 600 detects selection 2150*f* (e.g., a tap and/or other selection input) of activity user interface object 2106. In response to detecting selection 2150*f* of activity user interface object 2106, computer system 600 displays a user interface of the process for sending the communication that corresponds to the current status of the process indicated by activity user interface object 2106. For example, in response to detecting selection 2150*f* of activity user interface object 2106 in FIG. 21D, computer system 600 displays (e.g., returns to) reporting interface 602M since reporting interface 602M was displayed when computer system 600 detected the request to navigate away from the process for sending the communication (e.g., and the process did not advance since detecting the request to navigate away from the process), as shown in FIG. 21E.

In some embodiments, computer system 600 displays (e.g., returns to) reporting interface 602M as shown in FIG. 21E in response to detecting selection 2150*e* of activity user interface object 2106 in user interface 2102 of FIG. 21C. In some embodiments, computer system 600 displays (e.g., returns to) reporting interface 602M as shown in FIG. 21E in response to detecting selection 2150*e* of activity user interface object 2106 and in accordance with a determination (e.g., via facial identification) that a user is authorized to unlock computer system 600. In some embodiments, in response to detecting selection 2150*e* of activity user interface object 2106, computer system initiates a process for unlocking a user interface of computer system 600 (e.g., via facial ID, fingerprint ID, and/or entry of a personal identification number), and displays reporting interface 602M as shown in FIG. 21E once computer system 600 is unlocked.

After displaying reporting interface 602M in FIG. 21E, computer system 600 detects one or more inputs (e.g., selection 2150*j* of an option in set of options 604M or selection 2150*k* of skip button 616) to proceed with generating the content of the communication. In some embodiments, generating the content of the communication and sending the communication is performed according to the techniques described in FIGS. 6M-6Y. For example, in some embodiments, in response to selection of an option in set of options 604M (e.g., selection 2150*j*) or selection 2150*k* of skip button 616, computer system 600 displays one or more additional sets of options (e.g., 604N, 604O, and/or 604P) and/or selection of additional options (e.g., 608N, 608O, and/or 608P) and then displays a summary interface according to the selected options, such as, e.g., summary interface 2109 in FIG. 21E1.

In some embodiments, the process for sending the communication includes aligning with and/or connecting to a communication network. For example, in some embodiments, in response to detecting selection 2150*a* of text via satellite communication button 604G in FIG. 21A or after initiating transmission of the communication (e.g., in response to detecting selection 21501 of send option 2109*c* or expiration of timer 2109*b* in FIG. 21E1), computer system 600 provides user interfaces, prompts, and/or output for aligning with and/or connecting to a satellite communication network as described with reference to FIGS. 9C-9U and/or process 1000, such as alignment user interface 2110 shown in FIG. 21F. Alignment user interface 2110 includes alignment element 909 described with reference to, e.g., FIGS. 9C-9J and 9O-9P.

While the process for sending the communication is in a state of aligning and/or connecting with the satellite communication network, computer system 600 can detect a request to cease display of the user interface of the process for sending the communication. For example, while displaying alignment user interface 2110, computer system 600 detects a request to cease display of alignment user interface 2110 (e.g., a request to display a system user interface such as a lock screen, a wake screen, or a home screen). In FIG. 21F, input 2150*h* (e.g., a press of a physical button) corresponds to a request to lock a user interface of computer system 600, and input 2150*h* (e.g., a tap, an upward swipe starting from a predefined portion of display 601 and/or interface 2110, and/or other input) corresponds to a request to display a home screen (e.g., 1304 described in FIG. 13A). In some embodiments, in response to detecting input 2150*h*, computer system 600 displays activity user interface object 2106 as shown in FIG. 21G on home screen 2108 as shown in FIG. 21D.

In response to detecting input 2150*g*, computer system 600 locks a user interface of computer system 600, which includes turning off or dimming display 601, or displaying user interface 2102 as shown in FIG. 21G. In some embodiments, computer system 600 displays user interface 2102 in response to detecting input 2150*g*. In some embodiments, computer system 600 turns off display 601 in response to input 2150*g* and then displays user interface 2102 in response to detecting further input, such as, e.g., a press of a button on computer system 600, a contact on display 601, and/or movement of computer system 600 (e.g., movement that satisfies movement criteria). As described with reference to, e.g., FIG. 21C, user interface 2102 is a system user interface such as a lock screen or a wake screen that is displayed when computer system 600 transitions from a low-power state (e.g., when computer system 600 turns on display 601).

In FIG. 21G, computer system 600 displays notification 2112*a*, notification 2112*b*, and activity user interface object 2106 on user interface 2102. As described with reference to FIGS. 21C and 21D, the appearance of activity user interface object 2106 is based on the current status of the process for sending the communication via satellite communication. Compared to activity user interface object 2106 in FIGS. 21C and 21D, process indicator 2106*a* is the same (e.g., activity user interface object 2106 corresponds to the same process in FIG. 21G as in FIGS. 21C and 21D), while process graphic 2106*b* and process status indicator 2106*c* are different since the state of the process for sending the communication in FIG. 21G is different from the state of the process for sending the communication in FIGS. 21C and 21D.

In FIG. 21G, since the process for sending the communication is in a state of aligning and/or connecting with the satellite communication network, process graphic 2106*b* displays a graphical element (e.g., 931) that corresponds to the state of aligning with the satellite communication network and indicates an action that a user can take to align with the satellite communication network (e.g., a curved arrow instructing to turn computer system 600 left). Similarly, since the process for sending the communication is in a state of aligning and/or connecting with the satellite communication network, process status indicator 2106*c* displays a connection status between computer system 600 and the satellite communication network (e.g., "Not Connected"), an action that a user can take to align with the satellite communication network (e.g., "Turn left to find satellite"), and a graphical indication (e.g., an exclamation mark inside a circle) that computer system 600 is not connected to the satellite communication network. In some embodiments, when the process for sending the communication is in a state of aligning and/or connecting with the satellite communication network, activity user interface object 2106 is (or includes the features of) banner 926 described with reference to, e.g., FIGS. 9K-9M1.

When the connection status of computer system 600 changes, activity user interface object 2106 updates to reflect the current connection status of computer system 600. For example, when computer system 600 is turned left as instructed in action user interface object 2106 in FIG. 21G by an amount that properly aligns computer system 600 with the satellite communication network, computer system 600 begins to establish a connection with the satellite communication network. In response to the change in the status of the process for sending the communication (e.g., the change in connection status from not being aligned to being aligned), computer system 600 updates activity user interface object 2106 as shown in FIG. 21H. In particular, computer system 600 updates process graphic 2106*b* to indicate that computer system 600 is properly aligned and updates process status indicator 2106*c* to indicate that computer system 600 is connecting (e.g., "Connecting . . . "), to instruct the user to keep device pointed in the current direction (e.g., "Keep pointing at satellite to send and receive messages"), and displays a progress indicator of the progress of connecting to the satellite communication network and/or sending the communication (e.g., a ring in which the portion of the ring that is filled represents the amount of progress).

Turning to FIG. 21I, computer system 600 has successfully connected to the satellite communication network (e.g., computer system 600 is connected) and the communication has been sent. In response, process status indicator 2106*c* indicates that computer system 600 is connected (e.g., by changing "Connecting . . . " to "Connected") and updates the progress indicator to indicate that the message has been sent (e.g., the ring is completely filled or another indication of the message being sent is displayed in the user interface).

Turning to FIG. 21J, computer system 600 is no longer connected to the satellite communication network because a satellite has moved out of range of computer system 600. In response, computer system 600 updates process graphic 2106*b* to indicate that computer system 600 is not connected and that alignment is not currently possible (e.g., process graphic 2106*b* does not indicate an action to align computer system 600). Computer system 600 updates process status indicator 2106*c* to indicate that satellite communication is not currently available (e.g., by changing "Connected" to "Service Unavailable"), to indicate the amount of time until a next satellite will be available (e.g., "Next satellite available in 4 minutes"), and to display a graphical indication of the status (e.g., an exclamation mark in an octagon or other indication of the status).

Turning to FIG. 21K, computer system 600 has successfully reestablished connection to the satellite communication network. In response, computer system 600 updates (e.g., returns) process status indicator 2106*c* to the same state as in FIG. 21I, except without the progress indicator since no new message is being sent. In FIG. 21K, computer system 600 has received a message from an emergency service. In some embodiments, the emergency service is the recipient of the communication, and the message from the emergency service is a response to the communication. In response to receiving the message from the emergency service, computer system 600 displays message notification 2114 on user interface 2102. For example, as shown in FIG. 2K, computer system 600 updates the stack of notifications to display message notification 2114 as a top or first notification in the stack of notifications that includes notification 2112*a* and/or notification 2112*b*. Message notification 2114 includes an indication of the application associated with the notification (e.g., an icon of a speech bubble that represents a messaging application), an indication of the sender (e.g., text "Emergency SOS" and a circle with "SOS" inside), at least a portion of the content of the message (e.g., "Hi, we have received your request"), and an indication of a time that the message was received (e.g., "now"). In some embodiments, as shown in FIG. 21K, activity user interface object 2106 is moved (e.g., upward) in order to display message notification 2114 (e.g., activity user interface object 2106 is not removed and/or replaced by message notification 2114; and/or activity user interface object 2106 is displayed concurrently with message notification 2114). In some embodiments, computer system 600 is unlocked in response to a user aligning a sensor (e.g., a camera) with the user's face for facial recognition, a user placing a finger on a fingerprint sensor for fingerprint ID, and/or entry of a personal identification number or password.

Figure 21L:
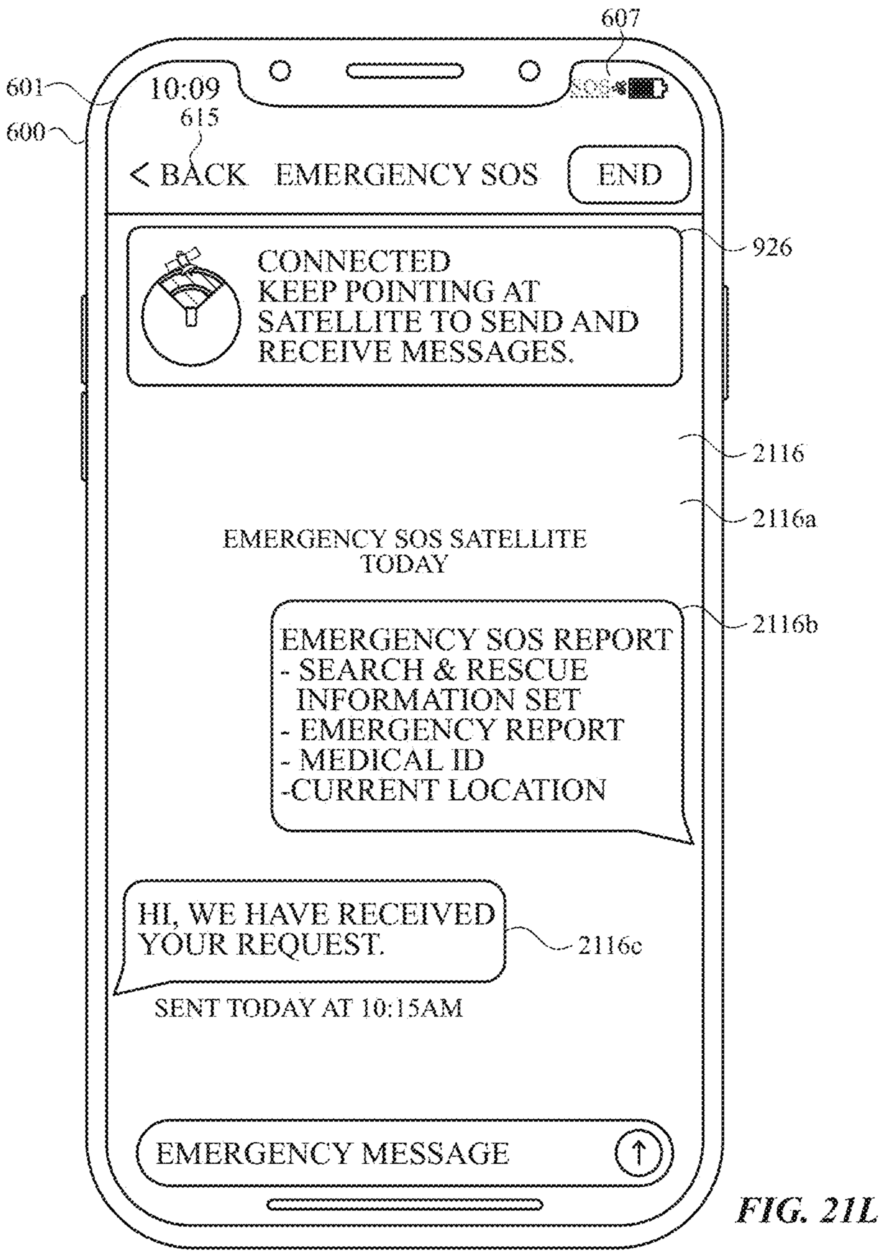

In FIG. 21K, computer system 600 detect selection 2150*i* (e.g., a tap or other selection input) of message notification 2114. In response to detecting selection of message notification 2114 (and, in some embodiments, input to unlock computer system 600), computer system 600 displays messaging user interface 2116 of a messaging application, as shown in FIG. 21L. Messaging user interface 2116 includes a message region 2116*a* that includes messages between a user associated with computer system 600 and the emergency service. In FIG. 21L, message region 2116*a* includes message 2116*b*, which includes a summary of the communication that was sent to the emergency service as a result of the process for sending the communication via satellite communication, and message 2116*c* received from the emergency service, which corresponds to the message associated with message notification 2114.

In some embodiments, while displaying messaging user interface 2116 (e.g., in response to selection 2150*i*), computer system 600 does not display (e.g., ceases display of) activity user interface object 2106, e.g., because messaging user interface 2116 is not a system user interface. In FIG. 21L, while displaying messaging user interface 2116, computer system 600 displays banner 926 described with reference to FIGS. 9K-9N1 (e.g., instead of activity user interface object 2106).

FIG. 22 is a flow diagram illustrating a method for providing a user interface object corresponding to a process using a computer system in accordance with some embodiments. Method 2200 is performed at a computer system (e.g., 100, 300, 500, 600, 900, 1100, 1300A, 1300B, 1500A, 1500B, 1500C, a smartphone, smartwatch, laptop computer, desktop computer, and/or tablet computer) that is in communication with a display generation component (e.g., 601, 901, 1106, 1302A, 1302B, 1502A, 1502B, 1502C, a display controller, a display device, a monitor, and/or a touch-sensitive display system) and one or more input devices (e.g., 601, 901, 1106, 1302A, 1302B, 1502A, 1502B, 1502C, 617*a*, 617*b*, 617*c*, a touch-sensitive surface, a touch-screen, a button, a keyboard, a mouse, a camera, a rotatable input mechanism, and/or a microphone). Some operations in method 2200 are, optionally, combined, the orders of some operations are, optionally, changed, and some operations are, optionally, omitted.

As described below, method 2200 provides an intuitive way for providing a user interface object corresponding to a process. The method reduces the cognitive burden on a user for providing a user interface object corresponding to a process, thereby creating a more efficient human-machine interface. For battery-operated computing devices, enabling a user to interact with a user interface object corresponding to a process faster and more efficiently conserves power and increases the time between battery charges.

The computer system detects (2202), via the one or more input devices, a set of one or more inputs (e.g., 2150*a*, 616M, 612M, 613M, 608N, 610N, 608O, 608P, 608Q, 604R, 604S, 906A, 906B, a contact and/or touch gesture on a touch-sensitive surface, an air gesture, a mouse click, a key press, a button press, and/or a voice command) corresponding to a request to initiate a process for sending a communication (e.g., an emergency communication, a text message, and/or an audio message) to a respective recipient (e.g., an emergency service, a designated entity, and/or an emergency contact). In response to detecting the set of one or more inputs corresponding to the request to initiate a process for sending a communication to the respective recipient, the computer system initiates (2204) a process for sending a communication to the respective recipient (e.g., the processes described in FIGS. 6M-6Y, method 800, FIGS. 9B-9U, and/or method 1000, or portions thereof). During the process for sending the communication to the respective recipient (e.g., while the process for sending the communication to the respective recipient is active and/or while displaying a user interface associated with (e.g., unique to and/or specific to) the process for sending the communication to the respective recipient), the computer system detects (2206), via the one or more input devices, a set of one or more inputs (e.g., 2150*b*, 2150*c*, 2150*d*, 2150*g*, and/or 2150*h*) corresponding to a request to display a system user interface (e.g., 2102, 2108, 1900, 1304, 1506B, 1508A, 1514A, 1524B, a user interface that is different from a user interface associated with the process for sending the communication to the respective recipient).

In response to detecting the set of one or more inputs corresponding to a request to display a system user interface, the computer system displays (2208) (e.g., concurrently displaying), via the display generation component, the system user interface (e.g., a user interface of an operating system, such as a lock screen, wake screen, home screen, notification center, or other system user interface rather than an application for sending messages or another application) and a user interface object (e.g., 2106) corresponding to the communication (e.g., corresponding to a process for sending the communication) (e.g., a notification, text, graphic, icon, button, affordance, banner, pop-up window, and/or selectable graphical user interface object) (in some embodiments, the user interface object is overlaid on the system user interface), including: in accordance with a determination that the process for sending the communication to the respective recipient is in a first state (e.g., 600 in FIG. 21B), the computer system displays (2210) the user interface object corresponding to the communication with a first appearance (e.g., 2106 in FIG. 21C, a first visual appearance, text, graphic, image, icon, color, font, highlighting, and/or animation; an appearance that indicates the first state of the process for sending the communication to the respective recipient); and in accordance with a determination that the process for sending the communication to the respective recipient is in a second state (e.g., 600 in FIG. 21F) different from the first state, the computer system displays (2212) the user interface object corresponding to the communication with a second appearance (e.g., 2106 in FIG. 21G, a second visual appearance, text, graphic, image, icon, color, font, highlighting, and/or animation; an appearance that indicates the second state of the process for sending the communication to the respective recipient) that is different from the first appearance (e.g., the appearance of the user interface object is based on the current state of the process for sending the communication to the respective recipient). In some embodiments, the user interface object corresponding to the communication is displayed concurrently with (or overlaid on) a user interface for an application other than the application that is used to generate, compose, and/or send the communication, instead of or in addition to being displayed concurrently with the system user interface. Displaying the system user interface and the user interface object corresponding to the communication, where the appearance of the user interface object is based on the state of the process for sending the communication provides the user with information about the state of the process and enables the user to interact with the process (e.g., align the computer system with a satellite, send a message, and/or view a received message) with fewer errors while the system user interface is displayed, which provides improved visual feedback to the user, reduces the number of inputs needed to perform an operation, and performs an operation when a set of conditions has been met without requiring further user input. Displaying the system user interface and the user interface object corresponding to the communication, where the appearance of the user interface object is based on the state of the process for sending the communication allows the computer system to be used for other purposes while performing the process for sending the communication via the alternative communication network (e.g., generating the communication and/or connecting to the alternative communication network) and optimizes use of limited space on a display, which enables the user to operate the computer system more quickly and efficiently, reduces power usage, and improves battery life.

In some embodiments, the process for sending the communication to the respective recipient includes displaying a set of one or more user interfaces (e.g., 602M, 602N, 602O, 602P, 602Q, 602R, 602S, 602T, 602U, 602V, and/or 602W) for generating the communication (e.g., generating content of the communication); detecting the set of one or more inputs (e.g., 2150*b* and/or 2150*c*) corresponding to the request to display the system user interface occurs while displaying the set of one or more user interfaces for generating the communication; and the appearance of the user interface object corresponding to the communication indicates that the process for sending the communication to the respective recipient is in a state of displaying the set of one or more user interfaces for generating the communication (e.g., 2106 in FIG. 21C). In some embodiments, the process for sending the communication to the respective recipient includes displaying a set of selectable communication-content options corresponding to respective content for the communication. In some embodiments, the set of selectable communication-content options are specific to a mode for communicating via the alternative communication network (e.g., a low-bandwidth communication mode). In some embodiments, the set of one or more user interface for generating the communication includes the user interfaces, options, and/or operations described in FIGS. 6M-6Y and/or method 800. Displaying a user interface for generating the communication enables the computer system to provide options that are optimal (e.g., require limited bandwidth) for the communication, to reduce the number of inputs required to generate the communication (e.g., without using a keyboard), and to guide a user through the process for generating the communication, which provides improved visual feedback to the user, reduces the number of inputs needed to perform an operation, provides additional control options without cluttering the user interface with additional displayed controls. Indicating that the process is in a state of displaying user interfaces for generating the communication allows the computer system to be used for other purposes while generating the communication and optimizes use of limited space on a display, which enables the user to operate the computer system more quickly and efficiently, reduces power usage, and improves battery life.

In some embodiments, the process for sending the communication to the respective recipient includes displaying a prompt (e.g., a notification, a banner, text, a graphical element, audio, and/or instructions; and/or 908C, 908D, 908E, 908F, 908G, 908H, 908I, 908J, 908O, 908O1, 908P, 909, 926, and/or 931) for a user to take an action to connect to (or, in some embodiments, to remain connected to) an alternative communication network via which the communication is to be sent; detecting the set of one or more inputs (e.g., 2150*g* and/or 2150*h*) corresponding to the request to display the system user interface occurs while displaying the prompt for a user to take an action to connect to the alternative communication network; and the appearance of the user interface object corresponding to the communication indicates that the process for sending the communication to the respective recipient is in a state of displaying the prompt for a user to take an action to connect to the alternative communication network (e.g., 2106 in FIG. 21G, 21H, 21I, 21J, or 21K). In some embodiments, the user interface object corresponding to the communication includes graphical element 931 and/or the content of textual element 908C, 908D, 908E, 908F, 908G, 908H, 908I, 908J, 908O, 908O1, or 908P, depending on the state of the alignment and/or connection between the computer system and the alternative communication network. In some embodiments, the user interface object corresponding to the communication is (or includes the content of) banner 926 in FIG. 9K, 9L, 9M, or 9M1, depending on the state of the alignment and/or connection between the computer system and the alternative communication network. In some embodiments, the process for sending the communication to the respective recipient includes the user interfaces and/or features described in FIGS. 9C-9Q and method 1000. In some embodiments, the prompt for a user to take an action to connect to the alternative communication network includes instructions to move and/or position at least a portion of the computer system in a particular direction or location (e.g., turn left, point up, and/or move outside). In some embodiments, the computer system displays the prompt for a user to take an action to connect to the alternative communication network in accordance with a determination that the computer system is not connected to the alternative communication network (e.g., is not properly aligned for communication with one or more satellites of the alternative communication network). In some embodiments, the process for sending the communication to the respective recipient includes displaying an indication of a status of a connection between the compute system and the alternative communication network (e.g., not connected, poor connection, trying to connect, connecting, and/or connected). Displaying a prompt for a user to take an action to connect to an alternative communication network (e.g., providing connection assistance) allows the user to resolve issues (e.g., misalignment and/or obstruction) that prevent the computer system from connecting to the alternative communication network quickly and efficiently with fewer inputs, which provides improved visual feedback and reduces the number of inputs needed to perform an operation. Displaying a prompt for a user to take an action to connect to an alternative communication network (e.g., providing connection assistance) allows the computer system to be used for other purposes while connecting to the alternative communication network and optimizes use of limited space on a display, which enables the user to operate the computer system more quickly and efficiently, reduces power usage, and improves battery life.

In some embodiments, displaying the user interface object corresponding to the communication includes displaying the user interface object with an appearance that is based on a status (e.g., sending, sent, receiving, or waiting to receive) of the communication (e.g., 2106*c* in FIG. 21H includes a partially filled message progress ring; 2106*c* in FIG. 21I includes a completely filled message progress ring). In some embodiments, the first state is a first message status and the first appearance indicates the first message status (e.g., "sending"); and the second state is a second message status and the second appearance indicates the second message status (e.g., "receiving"). Displaying the user interface object with an appearance that is based on a status of the communication provides the user with information about the progress of the communication and enables the user to interact with the process with fewer errors while the system user interface is displayed, which provides improved visual feedback to the user, and reduces the number of inputs needed to perform an operation. Displaying the user interface object with an appearance that is based on a status of the communication allows the computer system to be used for other purposes while monitoring the status of the communication and optimizes use of limited space on a display, which enables the user to operate the computer system more quickly and efficiently, reduces power usage, and improves battery life.

In some embodiments, the system user interface is a displayed user interface (e.g., 2108, 1304, 1506B, 1514A, user interface 400, a home screen, and/or an application springboard) that includes user interface objects corresponding to respective applications that, when activated, causes the computer system to display the respective application corresponding to the activated user interface object. Displaying the user interface object and a user interface that includes user interface objects corresponding to respective applications provides the user with access to other applications, allows the computer system to be used for other purposes while monitoring the status of the process for sending the communication to the respective recipient, and optimizes use of limited space on a display, which enables the user to operate the computer system more quickly and efficiently, reduces power usage, and improves battery life.

In some embodiments, the system user interface is a wake screen user interface (e.g., 2102, 1110, 1344A, 1524B, a wake screen and/or a lock screen) that the computer system displays when coming out of an inactive state (e.g., a low-power state, a sleep state, and/or a dimmed state).

Displaying the user interface object and a user interface that the computer system displays when coming out of an inactive state provides the user with the status of the process for sending the communication to the respective recipient immediately when the computer system comes out of an inactive state and enables the user to interact with the process more efficiently (e.g., without manually requesting the status of the process) and/or with fewer errors, which provides improved visual feedback to the user, reduces the number of inputs needed to perform an operation, enables the user to operate the computer system more quickly and efficiently, reduces power usage, and improves battery life.

In some embodiments, the process for sending the communication to the respective recipient includes a first sub-process for generating (e.g., composing) the communication (e.g., the first sub-process includes user interfaces (such as 602M, 602N, 602O, 602P, 602Q, 602R, 602S, 602T, 602U, 602V, and/or 602W), options, and/or operations described in FIGS. 6M-6Y and/or method 800) and a second sub-process for connecting to a communication network (e.g., the second sub-process includes the user interfaces (such as 2110, 902C, 902D, 902E, 902F, 902G, 902H, 902I, 902J, 902O, 902O1, or 902P,) and/or features described in FIGS. 9C-9Q and method 1000). Performing a first sub-process process for generating the communication enables the computer system to provide options that are optimal (e.g., require limited bandwidth) for the communication, to reduce the number of inputs required to generate the communication (e.g., without using a keyboard), and to guide a user through the process for generating the communication, which provides improved visual feedback to the user, reduces the number of inputs needed to perform an operation, provides additional control options without cluttering the user interface with additional displayed controls. Performing a second sub-process for connecting to a communication network enables the computer system to provide user interfaces that allows the user to resolve issues (e.g., misalignment and/or obstruction) that prevent the computer system from connecting to the communication network quickly and efficiently with fewer inputs, which provides improved visual feedback and reduces the number of inputs needed to perform an operation.

In some embodiments, displaying the system user interface and the user interface object corresponding to the communication includes concurrently displaying the system user interface (e.g., 2102, 1110, 1344A, or 1524B) and the user interface object corresponding to the communication (e.g., the computer system displays the user interface object corresponding to the communication in (or overlaid on) the system user interface), and: while concurrently displaying the system user interface and the user interface object corresponding to the communication, the computer system detects a set of one or more inputs (e.g., 2150*d*) corresponding to a request to display a second system user interface that is different from the system user interface; and in response to detecting the set of one or more inputs corresponding to a request to display a second system user interface, the computer system concurrently displays the second system user interface (e.g., 2108, 1304, 1506B, or 1514A) and the user interface object corresponding to the communication (e.g., the computer system displays the user interface object corresponding to the communication in the second system user interface; and/or the computer system maintains display of the user interface object corresponding to the communication when the system user interface is changed). In some embodiments, the system user interface and/or the second system user interface is a wake screen, a home screen, a lock screen, and/or a user interface that includes two or more notifications. Displaying the user interface object with multiple different system user interfaces allows the computer system to be used for other purposes and optimizes use of limited space on a display while enabling the user to monitor the status of the process for sending the communication to the respective recipient and to interact with the process more efficiently (e.g., with fewer user inputs) while navigating different user interfaces, which reduces the number of inputs needed to perform an operation, enables the user to operate the computer system more quickly and efficiently, reduces power usage, and improves battery life.

In some embodiments, after displaying the user interface object corresponding to the communication with a third appearance (e.g., the first appearance or the second appearance) (e.g., in response to detecting the set of one or more inputs corresponding to the request to display a system user interface): in accordance with a determination that the process for sending the communication to the respective recipient has changed state (e.g., in response to detecting a change in the state of the process for sending the communication to the respective recipient), the computer system displays the user interface object corresponding to the communication with a fourth appearance that is different from the third appearance, wherein the fourth appearance provides information about the changed state of the process for sending the communication to the respective recipient (e.g., the computer system changes and/or updates the appearance of the user interface object corresponding to the communication over time as the state of the process for sending the communication to the respective recipient changes). For example, user interface object 2106 changes appearance from FIG. 21G to FIG. 21H, from FIG. 21H to FIG. 21I, from FIG. 21I to FIG. 21J, and from FIG. 21J to FIG. 21K. Changing the appearance of the user interface object in response to a determination that the process for sending the communication to the respective recipient has changed state allows the computer system to be used for other purposes while providing the user with up-to-date information about the status of the process, allows the user to interact with the process more efficiently (e.g., with fewer user inputs), and optimizes use of limited space on a display, which provides improved visual feedback to the user, reduces the number of inputs needed to perform an operation, and performs an operation when a set of conditions has been met without requiring further user input.

In some embodiments, the determination that the process for sending the communication to the respective recipient has changed state includes a determination that a connection status (e.g., not connected, poor connection, trying to connect, connecting, and/or connected) (and/or, in some embodiments, an alignment status) of the computer system with an alternative communication network (e.g., a non-terrestrial wireless communication network, such as a satellite communication network) via which the communication is to be sent has changed from a first connection status to a second connection status (e.g., from not connected in FIG. 21G to connecting in FIG. 21H, from connecting in FIG. 21H to connected in FIG. 21I, from connected in FIG. 21I to service unavailable in FIG. 21J, and from service unavailable in FIG. 21J to connected in FIG. 21K); displaying the user interface object corresponding to the communication with the third appearance includes displaying, in the user interface object corresponding to the communication, a prompt (e.g., 2106*b*, 2106*c*, a notification, a banner, text, a graphical element, audio, and/or instructions) for a user to take a first action to connect to (or, in some embodiments, to remain connected to) the alternative communication network based on the first connection status; and displaying the user interface object corresponding to the communication with the fourth appearance includes displaying, in the user interface object corresponding to the communication, a prompt (e.g., 2106*b*, 2106*c*, a notification, a banner, text, a graphical element, audio, and/or instructions) for a user to take a second action, different from the first action, to connect to (or, in some embodiments, to remain connected to) the alternative communication network based on the second connection status (e.g., 2106*b* and/or 2106*c* vary in FIGS. 21G-21K based on the connection status of computer system 600). Displaying a prompt for a user to take and action to connect to an alternative communication network based on a connection status of the computer system with the alternative communication network enables the user to resolve issues (e.g., misalignment and/or obstruction) that prevent the computer system from connecting to the alternative communication network quickly and efficiently with fewer inputs, which provides improved visual feedback and reduces the number of inputs needed to perform an operation. Displaying a prompt for a user to take and action to connect to an alternative communication network based on a connection status of the computer system with the alternative communication network allows the computer system to be used for other purposes while connecting to the alternative communication network and optimizes use of limited space on a display, which enables the user to operate the computer system more quickly and efficiently, reduces power usage, and improves battery life.

In some embodiments, while displaying the user interface object corresponding to the communication, the computer system displays an indication (e.g., 2114, a notification, graphical indication, icon, color, font, text, animation, symbol, thumbnail, image, and/or glyph) of a message received from the respective recipient. Displaying an indication of the message received from the respective recipient notifies the user about the received message, optimizes use of limited space on a display, and allows the user to monitor incoming messages and the status of the process, and to interact with the process more efficiently (e.g., with fewer user inputs), while displaying the system user interface, which provides improved visual feedback to the user, reduces the number of inputs needed to perform an operation, enables the user to operate the computer system more quickly and efficiently, reduces power usage, and improves battery life.

In some embodiments, displaying the indication of the message received from the respective recipient includes displaying the indication of the message received from the respective recipient with an appearance that is based on content (e.g., text and/or images) of the message received from the respective recipient (e.g., the content of 2114 is based on (and/or includes) the content of 2116*c*). In some embodiments, in accordance with a determination that the message from the respective recipient includes first content, the computer system displays the indication with a first appearance (e.g., the first content of the message); and in accordance with a determination that the message from the respective recipient includes second content that is different from the first content, the computer system displays the indication with a second appearance (e.g., the second content of the message) that is different from the first appearance of the indication. Displaying the indication of the message received from the respective recipient with an appearance that is based on content of the message received from the respective recipient allows the computer system to be used for other purposes while providing the user with information about the content of the message, enables the user to interact with the process more efficiently (e.g., with fewer user inputs), and optimizes use of limited space on a display, which provides improved visual feedback to the user, reduces the number of inputs needed to perform an operation, enables the user to operate the computer system more quickly and efficiently, reduces power usage, and improves battery life.

In some embodiments, the computer system detects a selection (e.g., 2150*e* or 2150*f*) of the user interface object corresponding to the communication (e.g., a tap or other touch input on the user interface object corresponding to the communication, a press of a button while the user interface object corresponding to the communication is designated and/or in focus, and/or a voice command to select the user interface object corresponding to the communication); and in response to detecting the selection of the user interface object corresponding to the communication, the computer system displays a user interface (e.g., 602M, 602N, 602O, 602P, 602Q, 602R, 602S, 602T, 602U, 602V, 602W, 902C, 902D, 902E, 902F, 902G, 902H, 902I, 902J, 902K, 902L, 902M, 902O, 902O1, or 902P, based on the state of the process for sending the communication to the respective recipient via the alternative communication network) that provides more detailed information about the process for sending the communication to the respective recipient via the alternative communication network (e.g., information about the status of sending and/or receiving communications, options for sending and/or receiving communications, and/or controls for performing operations associated with sending and/or receiving communications). For example, in response to selection of 2106 in FIG. 21G, 21H, 21I, 21J, or 21K, computer system 600 displays user interface 2110 in the state corresponding to the state of 2106 at the time of selection. Displaying a user interface that provides more detailed information about the process for sending the communication to the respective recipient via the alternative communication network in response to detecting the selection of the user interface object corresponding to the communication provides an quick and efficient method for accessing and/or interacting with the process for sending the communication to the respective recipient, which reduces the number of inputs needed to perform an operation, provides additional control options without cluttering the user interface with additional displayed controls, enables the user to operate the computer system more quickly and efficiently, reduces power usage, and improves battery life.

Note that details of the processes described above with respect to method 2200 (e.g., FIG. 22) are also applicable in an analogous manner to the methods described above. For example, method 700, 800, 1000, 1200, 1400, 1600, 1800, and/or 2000 optionally includes one or more of the characteristics of the various methods described above with reference to method 2200. For example, method 700, 800, 1000, 1200, 1400, 1600, 1800, and/or 2000 can be the process corresponding to the user interface object in method 2200. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources provide efficient methods and interfaces for managing communications. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver suggested content and emergency information that is of greater use to the user. Accordingly, use of such personal information data enables users to have more efficient emergency user interfaces with relevant emergency information and suggested recipients. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing communications, the present technology can be configured to allow users to select to "opt in" or "opt out" of participation in the collection of personal information data during registration for services or anytime thereafter. In another example, users can select not to provide emergency data for targeted content delivery services. In yet another example, users can select to limit the length of time emergency-associated data is maintained or entirely prohibit the development of a baseline emergency profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, emergency information and suggested recipients can be selected and delivered to users by interring preferences based on non-personal information data or a bare minimum amount of personal information, such as the content being requested by the device associated with a user, other non-personal information available to the emergency services, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

while displaying, via the display generation component, a user interface of a messaging application, detecting, via the one or more input devices, a set of one or more inputs that includes selection of a respective number for text-based communication; and in response to detecting the set of one or more inputs that includes selection of the respective number for text-based communication:

in accordance with a determination that a set of alternative communication criteria is met, wherein the set of alternative communication criteria includes a first criterion that is met when the respective number is an emergency service number and a second criterion that is met when a respective communication network is not available, wherein the respective communication network is a terrestrial communication network:

displaying, via the display generation component, a prompt in the user interface of the messaging application, wherein the prompt includes a first indication that communication with the respective number can be performed via an alternative communication network that is different from the respective communication network, wherein the alternative communication network is a non-terrestrial communication network; and displaying, via the display generation component, a second indication that the respective communication network is not available; and in accordance with a determination that the set of alternative communication criteria is not met because the respective number is not the emergency service number, forgoing display of the prompt.

2. The computer system of claim 1, wherein the one or more programs further include instructions for:

after displaying the prompt, detecting a set of one or more inputs that includes a request to communicate with a respective entity via the alternative communication network; and in response to detecting the set of one or more inputs that includes the request to communicate with the respective entity via the alternative communication network, displaying a set of selectable communication-content options corresponding to respective content for a communication.

3. The computer system of claim 1, wherein the one or more programs further include instructions for:

after displaying the prompt, detecting a set of one or more inputs that includes a request to communicate with a respective entity via the alternative communication network; and in response to detecting the set of one or more inputs that includes the request to communicate with the respective entity via the alternative communication network, initiating a process for connecting to the alternative communication network, wherein the process for connecting to the alternative communication network includes displaying a prompt for a user to take an action to connect the computer system to the alternative communication network.

4. The computer system of claim 1, wherein the one or more programs further include instructions for:

after displaying the prompt, detecting a set of one or more inputs that includes a request to send a message via the alternative communication network; and in response to detecting the set of one or more inputs that includes the request to send the message via the alternative communication network, sending the message via the alternative communication network.

5. The computer system of claim 1, wherein the one or more programs further include instructions for:

in accordance with a determination that the respective communication network is not available, displaying, via the output generation component, an indication of a communication capability of the computer system; and in accordance with a determination that the respective communication network is available, forgoing display of the indication of the communication capability of the computer system.

6. The computer system of claim 5, wherein displaying the indication of the communication capability of the computer system includes displaying an indication of a capability of the computer system to communicate via a satellite communication network.

7. The computer system of claim 5, wherein displaying the indication of the communication capability of the computer system includes:

in accordance with a determination that the computer system is displaying a first type of user interface, displaying an indication of a capability of the computer system to communicate via a satellite communication network; and in accordance with a determination that the computer system is displaying a second type of user interface, forgoing display of the indication of the capability of the computer system to communicate via a satellite communication network.

8. The computer system of claim 1, wherein the one or more programs further include instructions for:

in response to detecting the set of one or more inputs that includes selection of the respective number for text-based communication:

in accordance with a determination that the set of alternative communication criteria is met, displaying an option to initiate a process for communicating with an emergency service.

9. The computer system of claim 8, wherein the one or more programs further include instructions for:

in response to detecting the set of one or more inputs that includes selection of the respective number for text-based communication:

in accordance with a determination that the respective communication network is available, displaying an option to initiate a process for communicating with the emergency service via the respective communication network.

10. The computer system of claim 1, wherein the one or more programs further include instructions for:

detecting a set of one or more inputs that includes a request to display a message conversation with the respective number;

in response to detecting the set of one or more inputs that includes the request to display the message conversation with the respective number, displaying the message conversation with the respective number; and while displaying the message conversation with the respective number:

in accordance with a determination that a set of message communication criteria is met, wherein the set of message communication criteria includes a criterion that is met when the respective communication network is not available, displaying an option to connect to the alternative communication network.

11. The computer system of claim 10, wherein displaying the option to connect to the alternative communication network in accordance with the determination that the set of message communication criteria is met occurs in response to detecting the set of one or more inputs that includes the request to display a message conversation with the respective number.

12. The computer system of claim 10, wherein displaying the option to connect to the alternative communication network in accordance with the determination that the set of message communication criteria is met occurs in response to detecting a set of one or more inputs that includes a request to send a message to the respective number.

13. The computer system of claim 1, wherein the respective number for text-based communication is associated with a respective contactable entity.

14. The computer system of claim 1, wherein the prompt includes a third indication that text-based communication between the computer system and the respective number can be performed via the alternative communication network that is different from the respective communication network.

15. The computer system of claim 1, wherein the one or more programs further include instructions for:

in response to detecting the set of one or more inputs that includes selection of the respective number for text-based communication:

in accordance with a determination that the respective number is not the emergency service number and that the respective communication network is available:

forgoing display of the prompt; and initiating a process for communicating with the respective number via the respective communication network.

16. A non-transitory computer-readable storage medium storing one or more programs configured to be executed by one or more processors of a computer system that is in communication with a display generation component and one or more input devices, the one or more programs including instructions for:

while displaying, via the display generation component, a user interface of a messaging application, detecting, via the one or more input devices, a set of one or more inputs that includes selection of a respective number for text-based communication; and in response to detecting the set of one or more inputs that includes selection of the respective number for text-based communication:

in accordance with a determination that a set of alternative communication criteria is met, wherein the set of alternative communication criteria includes a first criterion that is met when the respective number is an emergency service number and a second criterion that is met when a respective communication network is not available, wherein the respective communication network is a terrestrial communication network:

displaying, via the display generation component, a prompt in the user interface of the messaging application, wherein the prompt includes a first indication that communication with the respective number can be performed via an alternative communication network that is different from the respective communication network, wherein the alternative communication network is a non-terrestrial communication network; and displaying, via the display generation component, a second indication that the respective communication network is not available; and in accordance with a determination that the set of alternative communication criteria is not met because the respective number is not the emergency service number, forgoing display of the prompt.

17. The non-transitory computer-readable storage medium of claim 16, wherein the one or more programs further include instructions for:

after displaying the prompt, detecting a set of one or more inputs that includes a request to communicate with a respective entity via the alternative communication network; and in response to detecting the set of one or more inputs that includes the request to communicate with the respective entity via the alternative communication network, displaying a set of selectable communication-content options corresponding to respective content for a communication.

18. The non-transitory computer-readable storage medium of claim 16, wherein the one or more programs further include instructions for:

after displaying the prompt, detecting a set of one or more inputs that includes a request to communicate with a respective entity via the alternative communication network; and in response to detecting the set of one or more inputs that includes the request to communicate with the respective entity via the alternative communication network, initiating a process for connecting to the alternative communication network, wherein the process for connecting to the alternative communication network includes displaying a prompt for a user to take an action to connect the computer system to the alternative communication network.

19. The non-transitory computer-readable storage medium of claim 16, wherein the one or more programs further include instructions for:

after displaying the prompt, detecting a set of one or more inputs that includes a request to send a message via the alternative communication network; and in response to detecting the set of one or more inputs that includes the request to send the message via the alternative communication network, sending the message via the alternative communication network.

20. The non-transitory computer-readable storage medium of claim 16, wherein the one or more programs further include instructions for:

in accordance with a determination that the respective communication network is not available, displaying, via the output generation component, an indication of a communication capability of the computer system; and in accordance with a determination that the respective communication network is available, forgoing display of the indication of the communication capability of the computer system.

21. The non-transitory computer-readable storage medium of claim 20, wherein displaying the indication of the communication capability of the computer system includes displaying an indication of a capability of the computer system to communicate via a satellite communication network.

22. The non-transitory computer-readable storage medium of claim 20, wherein displaying the indication of the communication capability of the computer system includes:

in accordance with a determination that the computer system is displaying a first type of user interface, displaying an indication of a capability of the computer system to communicate via a satellite communication network; and in accordance with a determination that the computer system is displaying a second type of user interface, forgoing display of the indication of the capability of the computer system to communicate via a satellite communication network.

23. The non-transitory computer-readable storage medium of claim 16, wherein the one or more programs further include instructions for:

in response to detecting the set of one or more inputs that includes selection of the respective number for text-based communication:

in accordance with a determination that the set of alternative communication criteria is met, displaying an option to initiate a process for communicating with an emergency service.

24. The non-transitory computer-readable storage medium of claim 23, wherein the one or more programs further include instructions for:

in response to detecting the set of one or more inputs that includes selection of the respective number for text-based communication:

in accordance with a determination that the respective communication network is available, displaying an option to initiate a process for communicating with the emergency service via the respective communication network.

25. The non-transitory computer-readable storage medium of claim 16, wherein the one or more programs further include instructions for:

detecting a set of one or more inputs that includes a request to display a message conversation with the respective number;

in response to detecting the set of one or more inputs that includes the request to display the message conversation with the respective number, displaying the message conversation with the respective number; and while displaying the message conversation with the respective number:

in accordance with a determination that a set of message communication criteria is met, wherein the set of message communication criteria includes a criterion that is met when the respective communication network is not available, displaying an option to connect to the alternative communication network.

26. The non-transitory computer-readable storage medium of claim 25, wherein displaying the option to connect to the alternative communication network in accordance with the determination that the set of message communication criteria is met occurs in response to detecting the set of one or more inputs that includes the request to display a message conversation with the respective number.

27. The non-transitory computer-readable storage medium of claim 25, wherein displaying the option to connect to the alternative communication network in accordance with the determination that the set of message communication criteria is met occurs in response to detecting a set of one or more inputs that includes a request to send a message to the respective number.

28. The non-transitory computer-readable storage medium of claim 16, wherein the respective number for text-based communication is associated with a respective contactable entity.

29. The non-transitory computer-readable storage medium of claim 16, wherein the prompt includes a third indication that text-based communication between the computer system and the respective number can be performed via the alternative communication network that is different from the respective communication network.

30. The non-transitory computer-readable storage medium of claim 16, wherein the one or more programs further include instructions for:

in response to detecting the set of one or more inputs that includes selection of the respective number for text-based communication:

in accordance with a determination that the respective number is not the emergency service number and that the respective communication network is available:

forgoing display of the prompt; and initiating a process for communicating with the respective number via the respective communication network.

31. A method, comprising:

at a computer system that is in communication with a display generation component and one or more input devices:

while displaying, via the display generation component, a user interface of a messaging application, detecting, via the one or more input devices, a set of one or more inputs that includes selection of a respective number for text-based communication; and in response to detecting the set of one or more inputs that includes selection of the respective number for text-based communication:

in accordance with a determination that a set of alternative communication criteria is met, wherein the set of alternative communication criteria includes a first criterion that is met when the respective number is an emergency service number and a second criterion that is met when a respective communication network is not available, wherein the respective communication network is a terrestrial communication network:

displaying, via the display generation component, a prompt in the user interface of the messaging application, wherein the prompt includes a first indication that communication with the respective number can be performed via an alternative communication network that is different from the respective communication network, wherein the alternative communication network is a non-terrestrial communication network; and displaying, via the display generation component, a second indication that the respective communication network is not available; and in accordance with a determination that the set of alternative communication criteria is not met because the respective number is not the emergency service number, forgoing display of the prompt.

32. The method of claim 31, further comprising:

after displaying the prompt, detecting a set of one or more inputs that includes a request to communicate with a respective entity via the alternative communication network; and in response to detecting the set of one or more inputs that includes the request to communicate with the respective entity via the alternative communication network, displaying a set of selectable communication-content options corresponding to respective content for a communication.

33. The method of claim 31, further comprising:

after displaying the prompt, detecting a set of one or more inputs that includes a request to communicate with a respective entity via the alternative communication network; and in response to detecting the set of one or more inputs that includes the request to communicate with the respective entity via the alternative communication network, initiating a process for connecting to the alternative communication network, wherein the process for connecting to the alternative communication network includes displaying a prompt for a user to take an action to connect the computer system to the alternative communication network.

34. The method of claim 31, further comprising:

after displaying the prompt, detecting a set of one or more inputs that includes a request to send a message via the alternative communication network; and in response to detecting the set of one or more inputs that includes the request to send the message via the alternative communication network, sending the message via the alternative communication network.

35. The method of claim 31, further comprising:

in accordance with a determination that the respective communication network is not available, displaying, via the output generation component, an indication of a communication capability of the computer system; and in accordance with a determination that the respective communication network is available, forgoing display of the indication of the communication capability of the computer system.

36. The method of claim 35, wherein displaying the indication of the communication capability of the computer system includes displaying an indication of a capability of the computer system to communicate via a satellite communication network.

37. The method of claim 35, wherein displaying the indication of the communication capability of the computer system includes:

in accordance with a determination that the computer system is displaying a first type of user interface, displaying an indication of a capability of the computer system to communicate via a satellite communication network; and in accordance with a determination that the computer system is displaying a second type of user interface, forgoing display of the indication of the capability of the computer system to communicate via a satellite communication network.

38. The method of claim 31, further comprising:

in response to detecting the set of one or more inputs that includes selection of the respective number for text-based communication:

in accordance with a determination that the set of alternative communication criteria is met, displaying an option to initiate a process for communicating with an emergency service.

39. The method of claim 38, further comprising:

in response to detecting the set of one or more inputs that includes selection of the respective number for text-based communication:

in accordance with a determination that the respective communication network is available, displaying an option to initiate a process for communicating with the emergency service via the respective communication network.

40. The method of claim 31, further comprising:

detecting a set of one or more inputs that includes a request to display a message conversation with the respective number;

in response to detecting the set of one or more inputs that includes the request to display the message conversation with the respective number, displaying the message conversation with the respective number; and while displaying the message conversation with the respective number:

in accordance with a determination that a set of message communication criteria is met, wherein the set of message communication criteria includes a criterion that is met when the respective communication network is not available, displaying an option to connect to the alternative communication network.

41. The method of claim 40, wherein displaying the option to connect to the alternative communication network in accordance with the determination that the set of message communication criteria is met occurs in response to detecting the set of one or more inputs that includes the request to display a message conversation with the respective number.

42. The method of claim 40, wherein displaying the option to connect to the alternative communication network in accordance with the determination that the set of message communication criteria is met occurs in response to detecting a set of one or more inputs that includes a request to send a message to the respective number.

43. The method of claim 31, wherein the respective number for text-based communication is associated with a respective contactable entity.

44. The method of claim 31, wherein the prompt includes a third indication that text-based communication between the computer system and the respective number can be performed via the alternative communication network that is different from the respective communication network.

45. The method of claim 31, further comprising:

in response to detecting the set of one or more inputs that includes selection of the respective number for text-based communication:

in accordance with a determination that the respective number is not the emergency service number and that the respective communication network is available:

forgoing display of the prompt; and initiating a process for communicating with the respective number via the respective communication network.

* * * * *